(12) United States Patent
Sasaki et al.

(10) Patent No.: US 8,861,940 B2
(45) Date of Patent: Oct. 14, 2014

(54) RECORDING MEDIUM, PLAYBACK DEVICE AND INTEGRATED CIRCUIT

(75) Inventors: Taiji Sasaki, Osaka (JP); Hiroshi Yahata, Osaka (JP); Tomoki Ogawa, Osaka (JP); Takeshi Tanaka, Osaka (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 12/715,548

(22) Filed: Mar. 2, 2010

(65) Prior Publication Data

US 2010/0232767 A1 Sep. 16, 2010

Related U.S. Application Data

(60) Provisional application No. 61/156,597, filed on Mar. 2, 2009.

(51) Int. Cl.
*H04N 5/76* (2006.01)
*H04N 1/40* (2006.01)
(Continued)

(52) U.S. Cl.
CPC .............. *H04N 7/462* (2013.01); *H04N 9/8042* (2013.01); *H04N 21/4347* (2013.01); *H04N 7/26335* (2013.01); *H04N 7/26702* (2013.01); *H04N 21/845* (2013.01); *H04N 9/7921* (2013.01); *H04N 21/2365* (2013.01); *G11B 27/105* (2013.01); *H04N 5/85* (2013.01); *H04N 9/8063* (2013.01); *H04N 19/00769* (2013.01); *G11B 2220/2541* (2013.01); *H04N 21/42646* (2013.01); *H04N 13/0055* (2013.01); *H04N 7/26946* (2013.01)
USPC ........... 386/341; 386/329; 386/353; 386/359; 345/419; 345/420; 348/42; 348/43; 348/51; 358/448; 725/131

(58) Field of Classification Search
USPC .................... 386/341, 329, 353, 359, E5.003, 386/E5.007; 345/582, 629, 419, 420; 348/42, 554, 725, E5.002, E5.1, 348/E5.108, E5.114, E7.02, E13.04, 348/E13.062, 43, 51, E13.001, E1.075, 348/E13.075; 725/131, 151; 382/100, 276, 382/293, 298, 305; 358/448
See application file for complete search history.

(56) References Cited

U.S. PATENT DOCUMENTS 5,923,869 A 7/1999 Kashiwagi et al.
6,072,831 A 6/2000 Chen
(Continued)

FOREIGN PATENT DOCUMENTS

EP 1 011 268 6/2000
EP 1 843 597 10/2007
(Continued)

OTHER PUBLICATIONS

Extended European Search Report mailed Feb. 21, 2013 in corresponding European Application No. 10746017.2.
(Continued)

*Primary Examiner* — Thai Tran
*Assistant Examiner* — Syed Hasan
(74) *Attorney, Agent, or Firm* — Wenderoth, Lind & Ponack, L.L.P.

(57) ABSTRACT

A main-view stream and a sub-view stream are recorded on a recording medium. The main-view stream is used for monoscopic video playback. The sub-view stream is used for stereoscopic video playback in combination with the main-view stream are recorded. The main-view stream includes a plurality of main-view pictures, and the sub-view stream includes a plurality of sub-view pictures. The main-view pictures and the sub-view pictures are in one-to-one correspondence. A B picture is not used as a reference picture for compression of any of the sub-view pictures whose corresponding main-view picture is one of an I picture and a P picture.

1 Claim, 100 Drawing Sheets

(51) Int. Cl.

| | | |
|---|---|---|
| *H04N 5/77* | (2006.01) | |
| *H04N 5/93* | (2006.01) | |
| *H04N 5/917* | (2006.01) | |
| *H04N 7/173* | (2011.01) | |
| *H04N 13/00* | (2006.01) | |
| *H04N 13/04* | (2006.01) | |
| *G06T 15/00* | (2011.01) | |
| *G06T 17/00* | (2006.01) | |
| *H04N 21/434* | (2011.01) | |
| *H04N 19/00* | (2014.01) | |
| *H04N 19/42* | (2014.01) | |
| *H04N 21/845* | (2011.01) | |
| *H04N 9/79* | (2006.01) | |
| *H04N 21/2365* | (2011.01) | |
| *G11B 27/10* | (2006.01) | |
| *H04N 5/85* | (2006.01) | |
| *H04N 19/597* | (2014.01) | |
| *H04N 19/51* | (2014.01) | |
| *H04N 21/426* | (2011.01) | |
| *H04N 9/804* | (2006.01) | |
| *H04N 9/806* | (2006.01) | |

(56) References Cited

U.S. PATENT DOCUMENTS

| | | |
|---|---|---|
| 6,393,574 B1 | 5/2002 | Kashiwagi et al. |
| 6,470,460 B1 | 10/2002 | Kashiwagi et al. |
| 6,484,266 B2 | 11/2002 | Kashiwagi et al. |
| 6,502,199 B2 | 12/2002 | Kashiwagi et al. |
| 6,502,200 B2 | 12/2002 | Kashiwagi et al. |
| 6,516,138 B2 | 2/2003 | Kashiwagi et al. |
| 6,516,139 B2 | 2/2003 | Kashiwagi et al. |
| 6,519,414 B2 | 2/2003 | Kashiwagi et al. |
| 6,526,226 B2 | 2/2003 | Kashiwagi et al. |
| 6,546,195 B2 | 4/2003 | Kashiwagi et al. |
| 6,573,819 B1 | 6/2003 | Oshima et al. |
| 6,574,423 B1 | 6/2003 | Oshima et al. |
| 6,907,190 B2 | 6/2005 | Kashiwagi et al. |
| 6,925,250 B1 | 8/2005 | Oshima et al. |
| 6,954,584 B2 | 10/2005 | Kashiwagi et al. |
| 7,194,194 B2 | 3/2007 | Kashiwagi et al. |
| 7,317,868 B2 | 1/2008 | Oshima et al. |
| 7,679,616 B2 * | 3/2010 | Nomura et al. ............... 345/419 |
| 8,050,521 B2 * | 11/2011 | Judelson ....................... 382/293 |
| 2001/0053281 A1 | 12/2001 | Kashiwagi et al. |
| 2001/0055474 A1 | 12/2001 | Kashiwagi et al. |
| 2002/0001454 A1 | 1/2002 | Kashiwagi et al. |
| 2002/0001455 A1 | 1/2002 | Kashiwagi et al. |
| 2002/0003944 A1 | 1/2002 | Kashiwagi et al. |
| 2002/0003945 A1 | 1/2002 | Kashiwagi et al. |
| 2002/0003950 A1 | 1/2002 | Kashiwagi et al. |
| 2002/0003951 A1 | 1/2002 | Kashiwagi et al. |
| 2002/0025143 A1 | 2/2002 | Kashiwagi et al. |
| 2002/0085014 A1 * | 7/2002 | Yuda et al. .................... 345/582 |
| 2003/0053797 A1 | 3/2003 | Oshima et al. |
| 2003/0108341 A1 | 6/2003 | Oshima et al. |
| 2003/0138238 A1 | 7/2003 | Kashiwagi et al. |
| 2004/0175133 A1 | 9/2004 | Kashiwagi et al. |
| 2004/0179820 A1 | 9/2004 | Kashiwagi et al. |
| 2005/0028220 A1 * | 2/2005 | Baer et al. .................... 725/131 |
| 2005/0180735 A1 | 8/2005 | Oshima et al. |
| 2007/0247477 A1 * | 10/2007 | Lowry et al. ................. 345/629 |
| 2007/0253482 A1 | 11/2007 | Kazui et al. |
| 2008/0056686 A1 | 3/2008 | Oshima et al. |
| 2008/0063385 A1 | 3/2008 | Oshima et al. |
| 2008/0063386 A1 | 3/2008 | Oshima et al. |
| 2008/0101767 A1 | 5/2008 | Oshima et al. |
| 2008/0292287 A1 | 11/2008 | Oshima et al. |
| 2009/0142041 A1 * | 6/2009 | Nagasawa et al. ........... 386/124 |
| 2009/0220215 A1 | 9/2009 | Oshima et al. |
| 2009/0252483 A1 | 10/2009 | Oshima et al. |
| 2010/0020158 A1 | 1/2010 | Oshima et al. |
| 2010/0111503 A1 | 5/2010 | Oshima et al. |
| 2011/0149036 A1 * | 6/2011 | Suh et al. ....................... 348/43 |

FOREIGN PATENT DOCUMENTS

| | | |
|---|---|---|
| JP | 11-191895 | 7/1999 |
| JP | 3935507 | 3/2007 |
| WO | 2006/072992 | 7/2006 |

OTHER PUBLICATIONS

Yung-Lyul Lee et al., H.264/MPEG-4 AVC-based Multi-view Video Coding (MVC) Jan. 2006, pp. 1-20.

Chi-Cheng Ju et al., A multi-format Blu-ray player Soc in 90nm CMOS, IEEE International Solid-State Circuits Conference, Feb. 2009, pp. 151-154.

* cited by examiner

FIG. 3A

| PID=0x1011 | |
|---|---|
| 0x1100 | Primary video stream |
| 0x1101 | Primary audio stream |
| 0x1200 | Primary audio stream |
| 0x1201 | PG stream |
| 0x1400 | PG stream |
| 0x1A00 | IG stream |
| 0x1B00 | Secondary audio stream |
| | Secondary video stream |

FIG. 3B

| PID=0x1012 | |
|---|---|
| 0x1220 | Primary video stream |
| 0x1221 | Left-view PG stream |
| 0x1240 | Left-view PG stream |
| 0x1241 | Right-view PG stream |
| 0x1420 | Right-view PG stream |
| 0x1440 | Left-view IG stream |
| 0x1B20 | Right-view IG stream |
| | Secondary video stream |

FIG. 3C

| PID=0x1013 | |
|---|---|
| 0x1260 | Primary video stream |
| 0x1261 | Depth map PG stream |
| 0x1460 | Depth map PG stream |
| 0x1B40 | Depth map IG stream |
| | Secondary video stream |

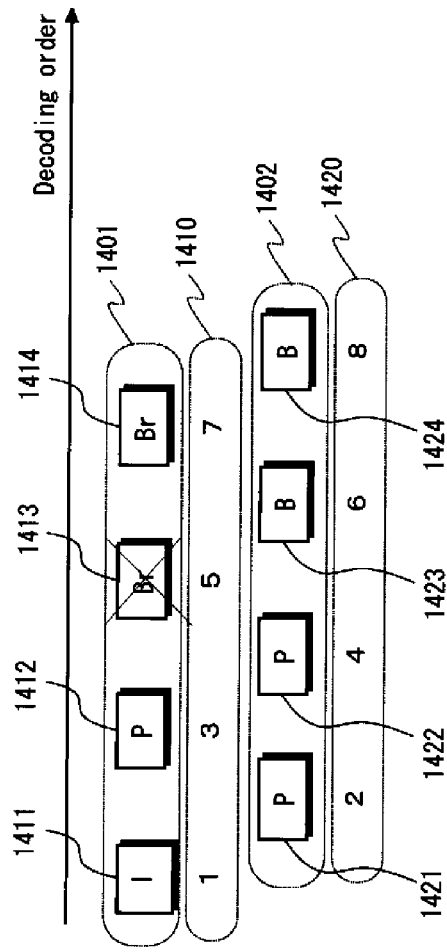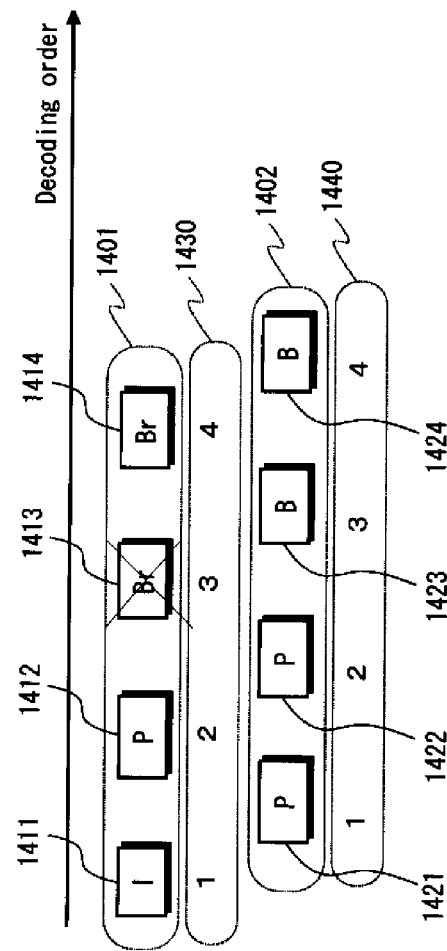

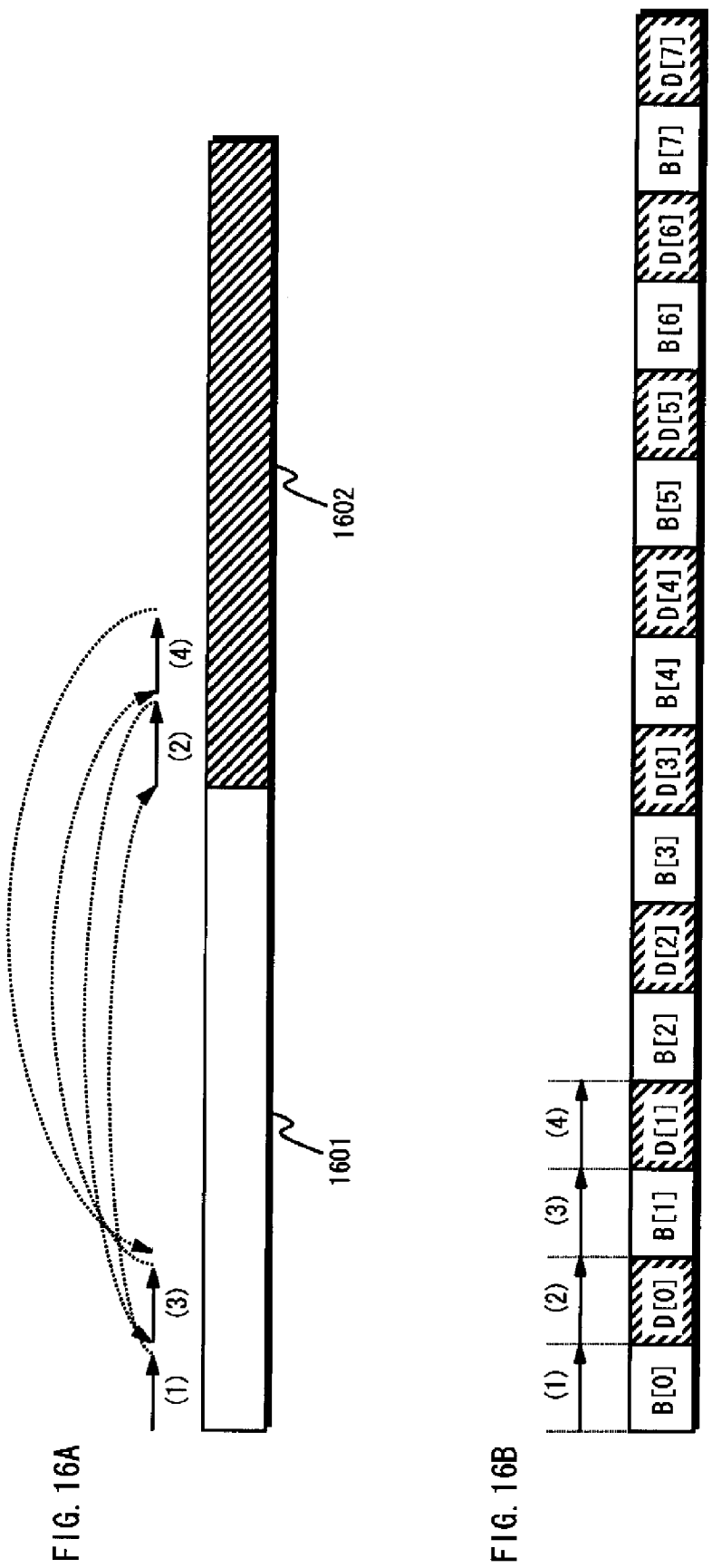

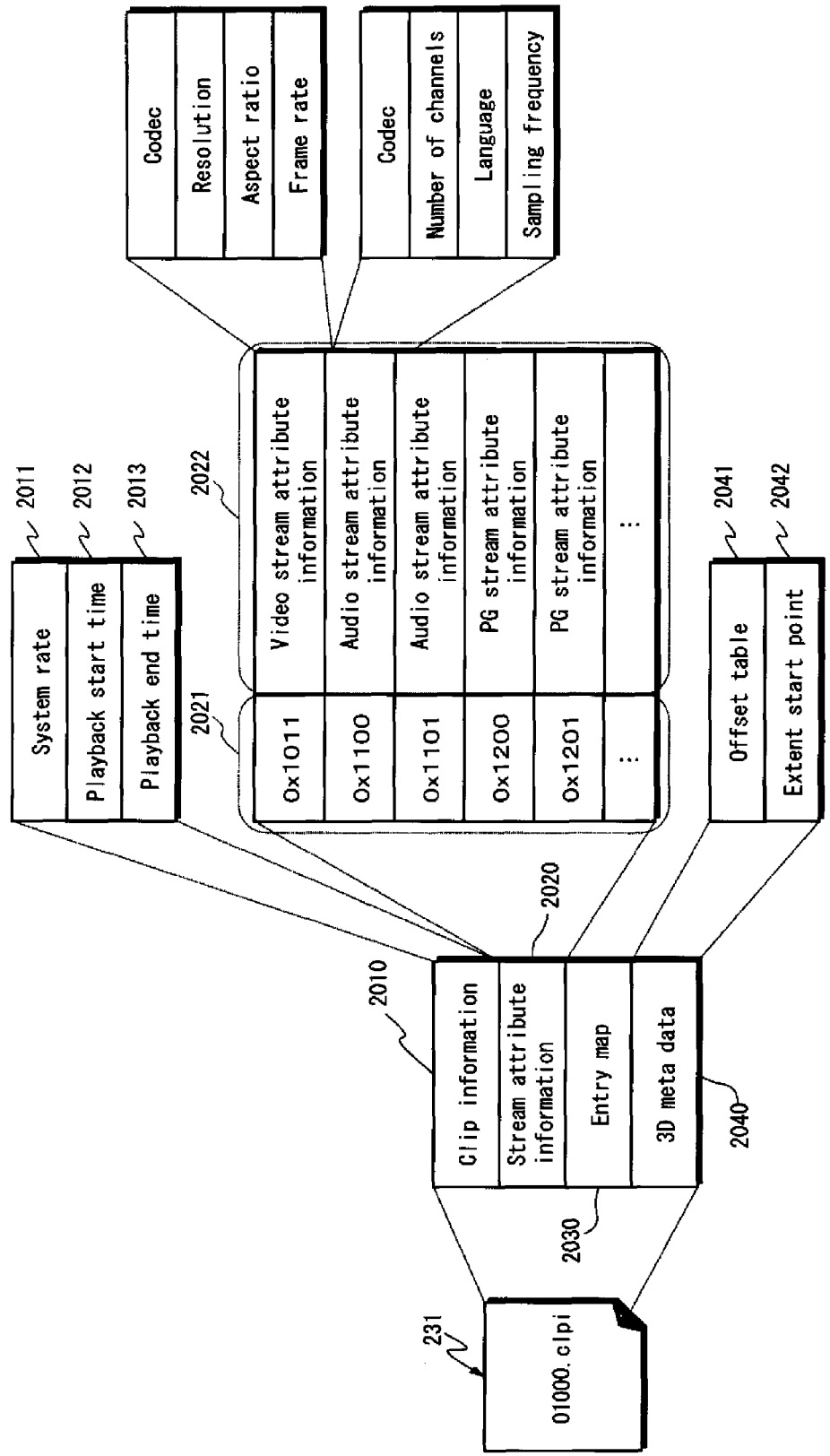

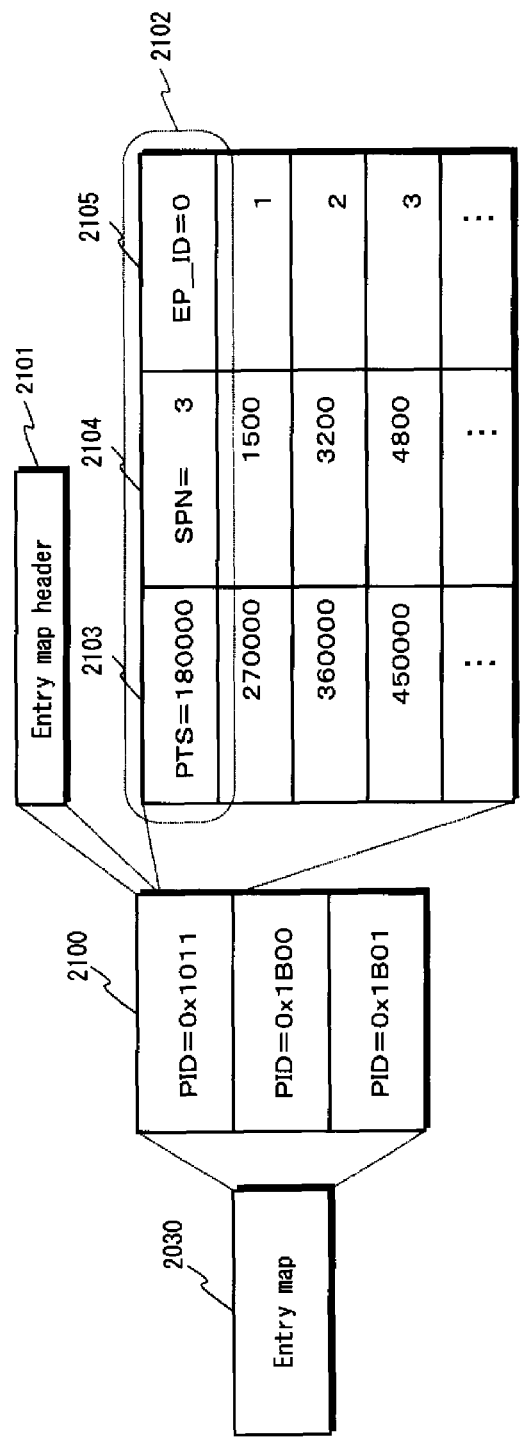
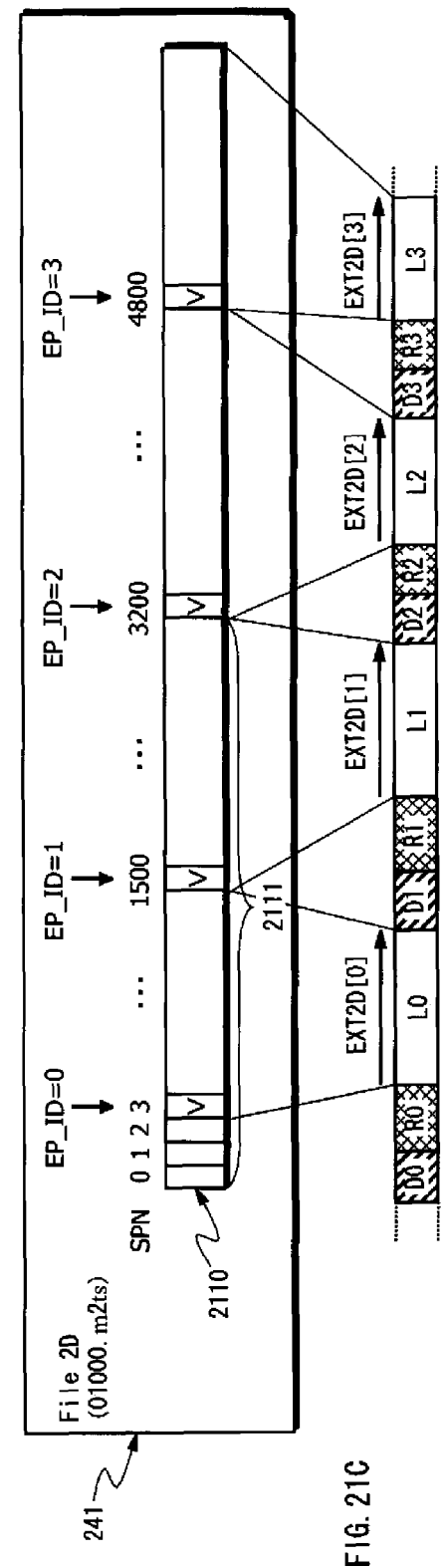
FIG. 21A
FIG. 21B
FIG. 21C

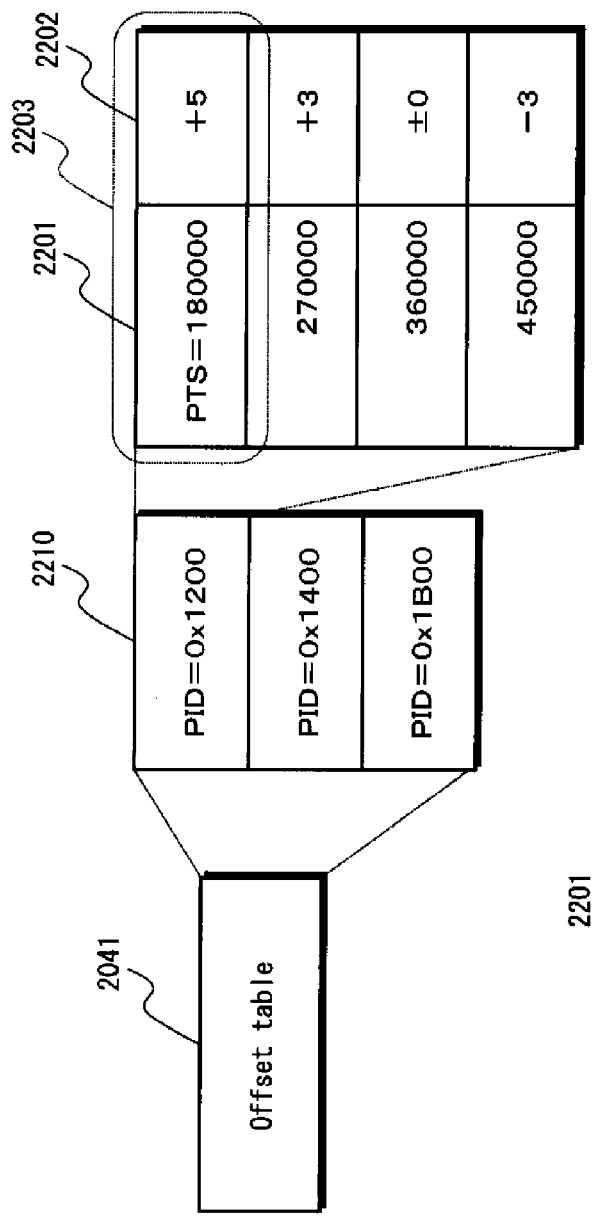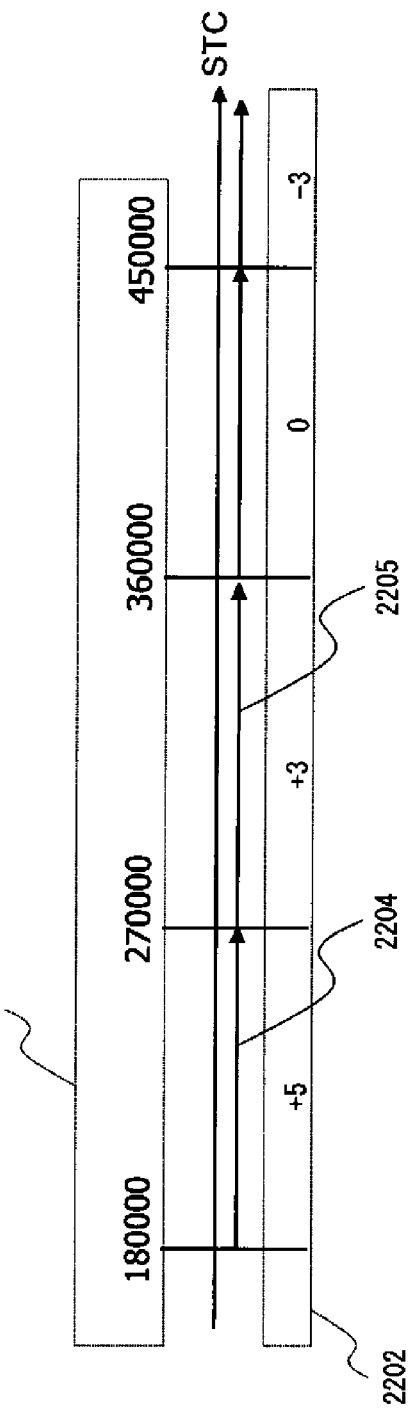
FIG. 22A
FIG. 22B

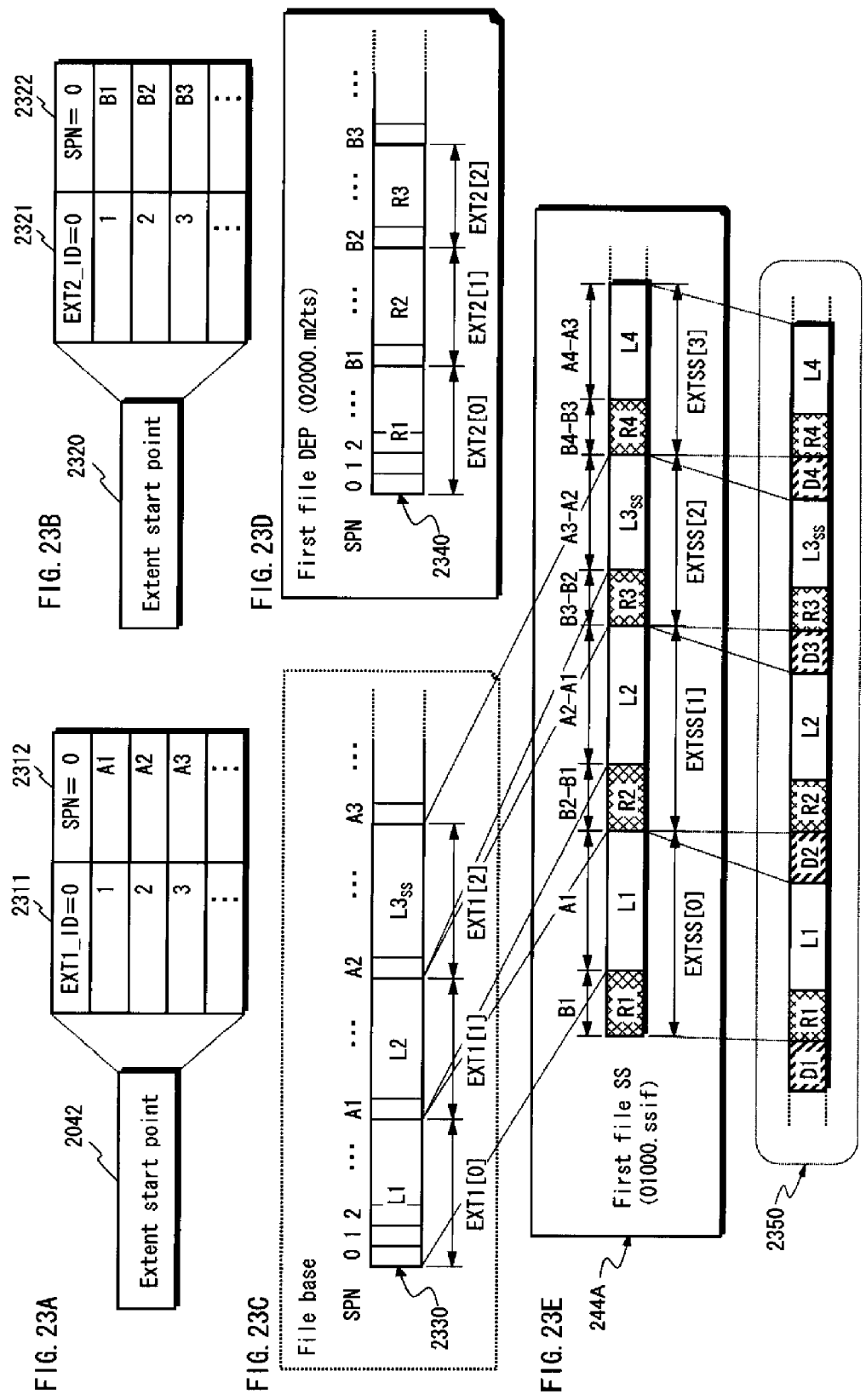

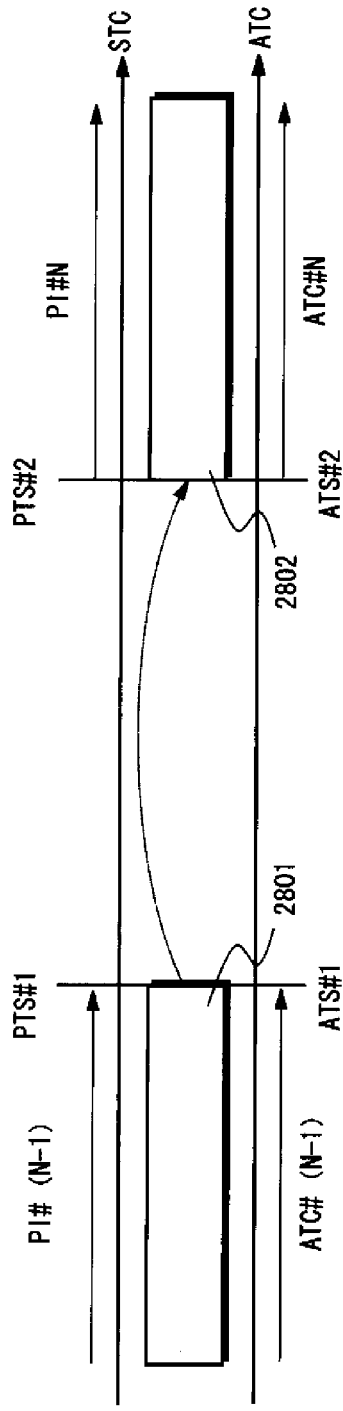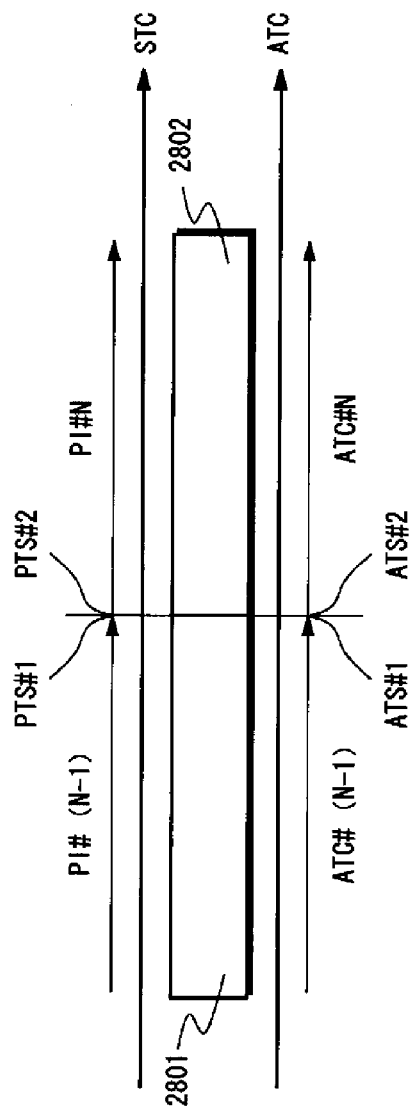
FIG. 28A
FIG. 28B

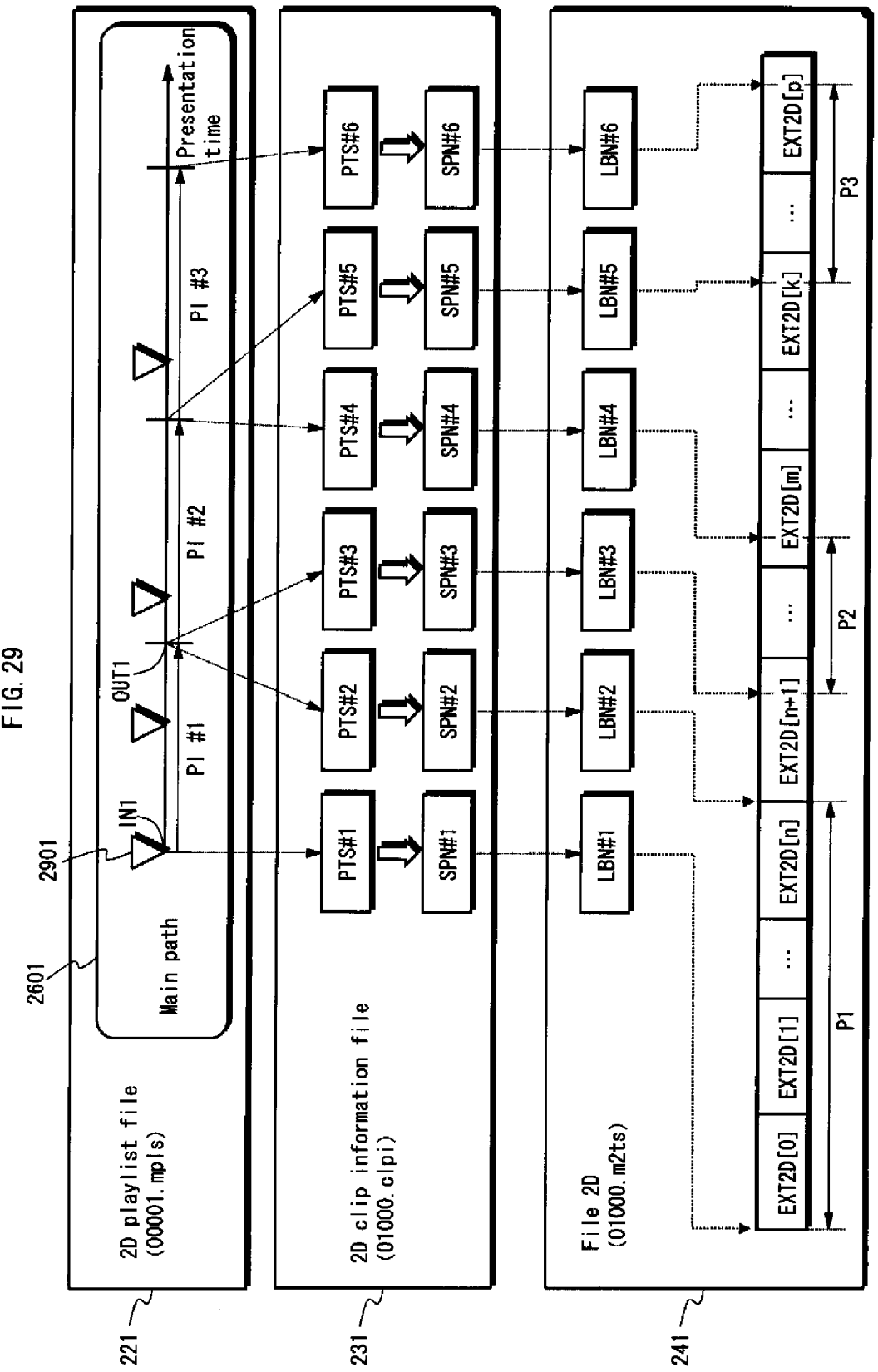

| 3701 | 3702 |
|---|---|
| 0 | Language Code |
| 1 | Audio stream number |
| 2 | Subtitle stream number |
| 3 | Angle number |
| 4 | Title number |
| 5 | Chapter number |
| 6 | Program number |
| 7 | Cell number |
| 8 | Key name |
| 9 | Navigation timer |
| 10 | Current playback time |

| 3701 | 3702 |
|---|---|
| 11 | Player audio mixing mode for Karaoke |
| 12 | Country code for parental management |
| 13 | Parental level |
| 14 | Player configuration for Video |
| 15 | Player configuration for Audio |
| 16 | Language code for AST |
| 17 | Language code ext. for AST |
| 18 | Language code for STST |
| 19 | Language coded ext. for STST |
| 20 | Player region code |
| 21 | Secondary Video Stream number |

| 3701 | 3702 |
|---|---|
| 22 | Secondary Audio Stream number |
| 23 | Player status |
| 24 | reserved |
| 25 | reserved |
| 26 | reserved |
| 27 | reserved |
| 28 | reserved |
| 29 | reserved |
| 30 | reserved |
| 31 | reserved |
| 32 | reserved |

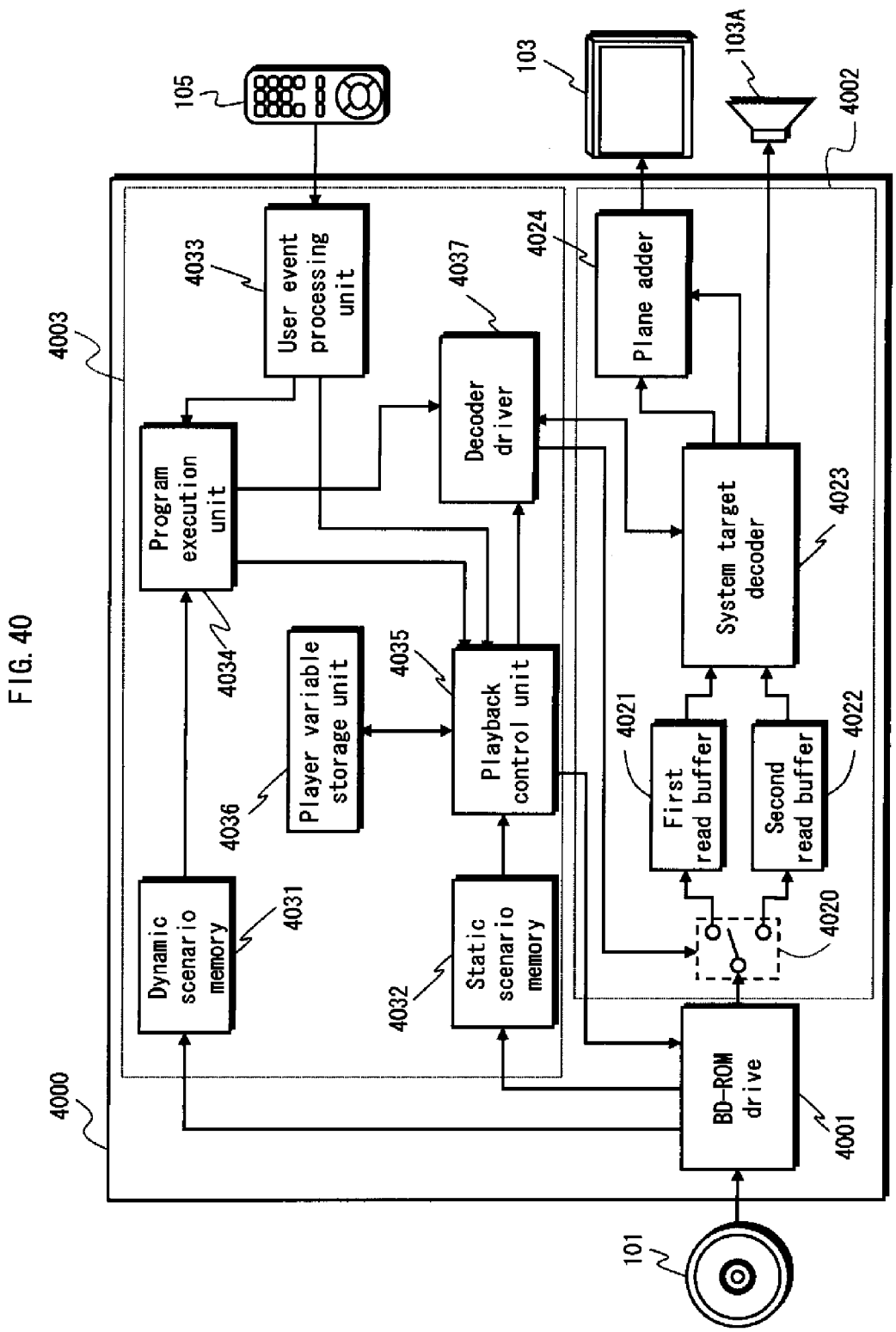

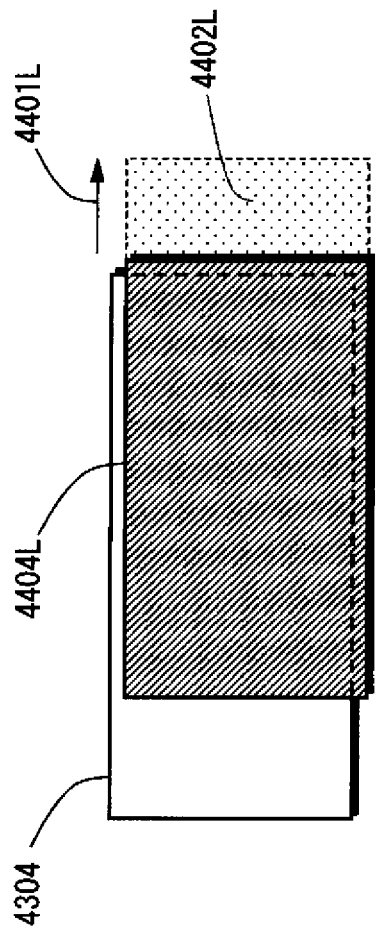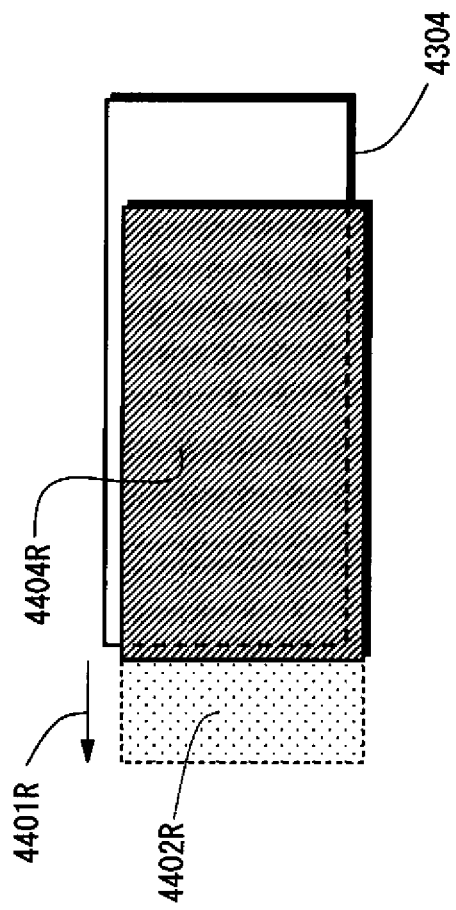
FIG. 44A
FIG. 44B

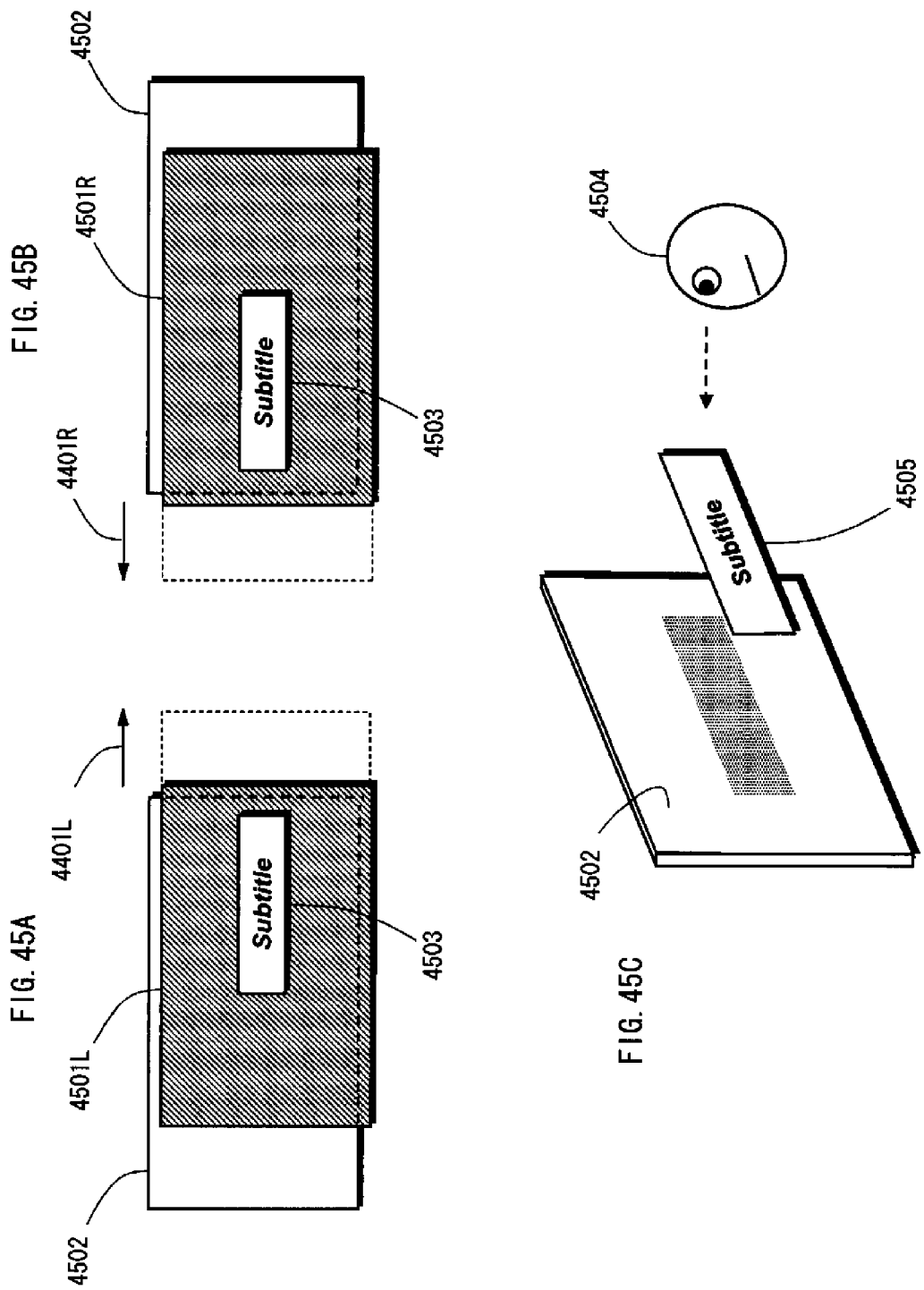

FIG. 57

| $S_{jump}$ (sectors) | 0 | 1 – 10000 | 10001 – 20000 | 20001 – 40000 | 40000 – 1/10 stroke | 1/10 stroke or greater |
|---|---|---|---|---|---|---|
| $T_{jump-max}$ (ms) | $50 = T_{jump}0$ | 250 | 300 | 350 | 700 | 1400 |

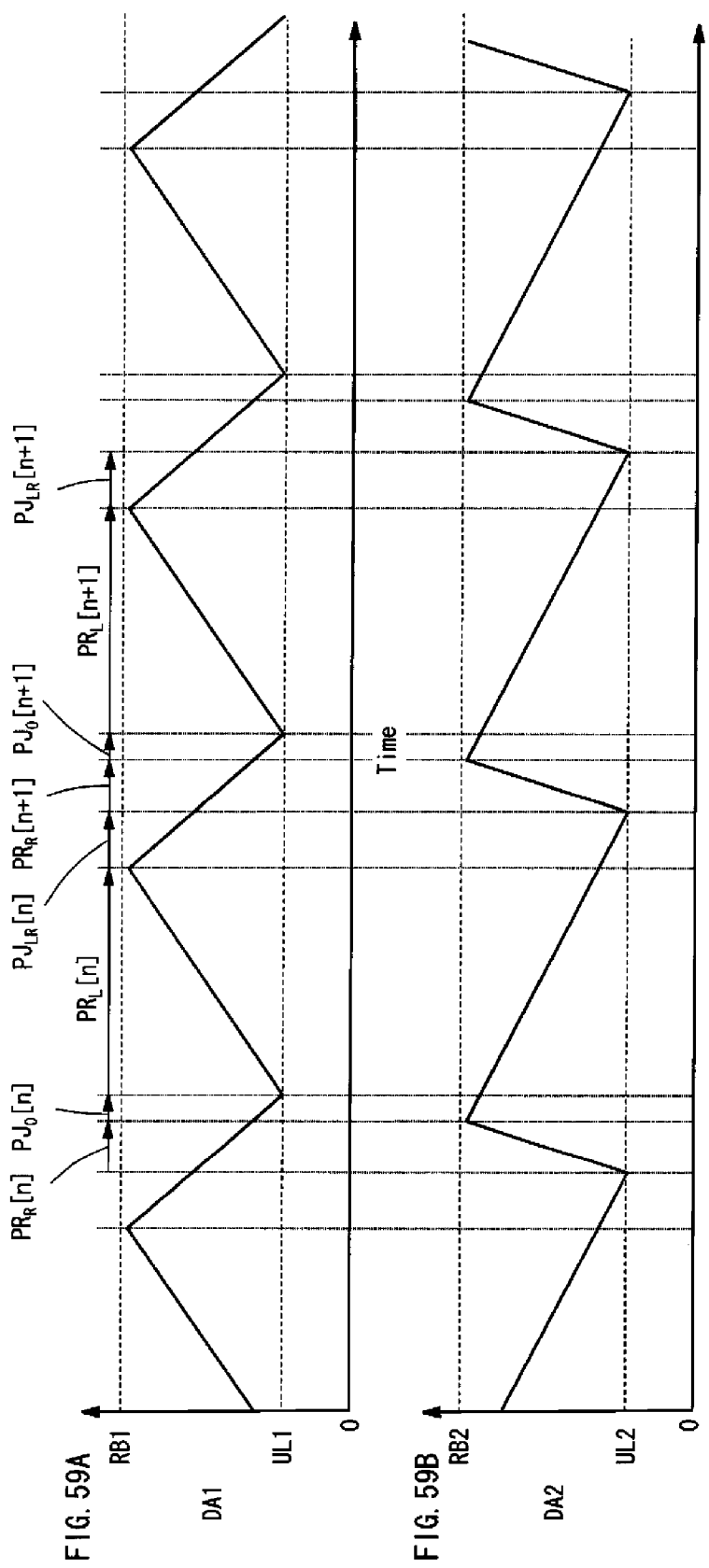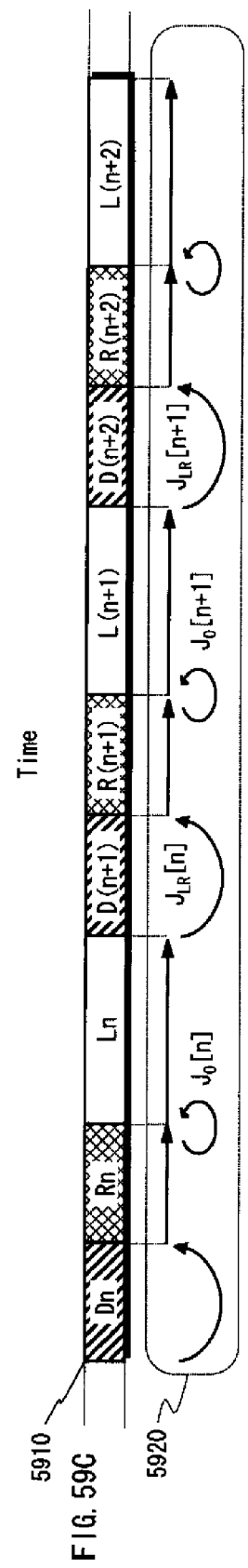
FIG. 59A
FIG. 59B
FIG. 59C

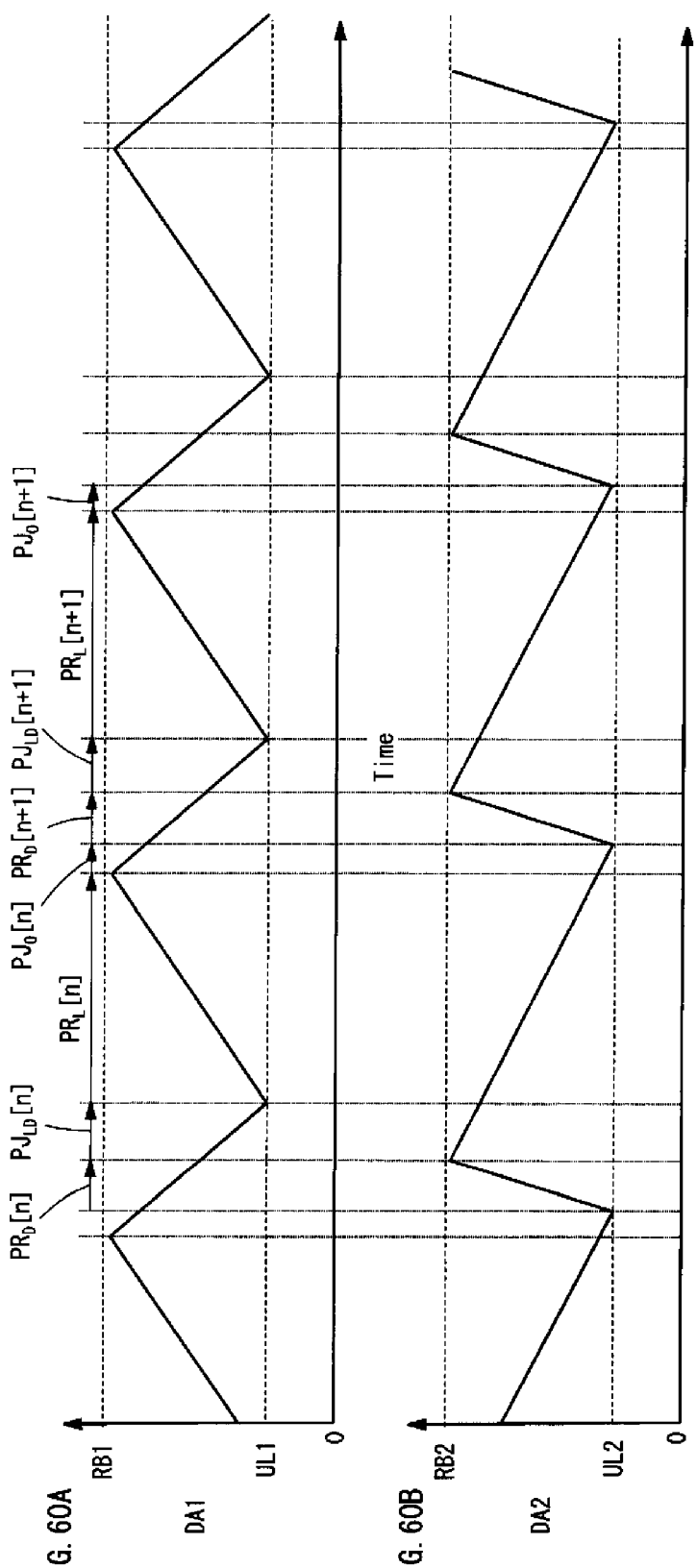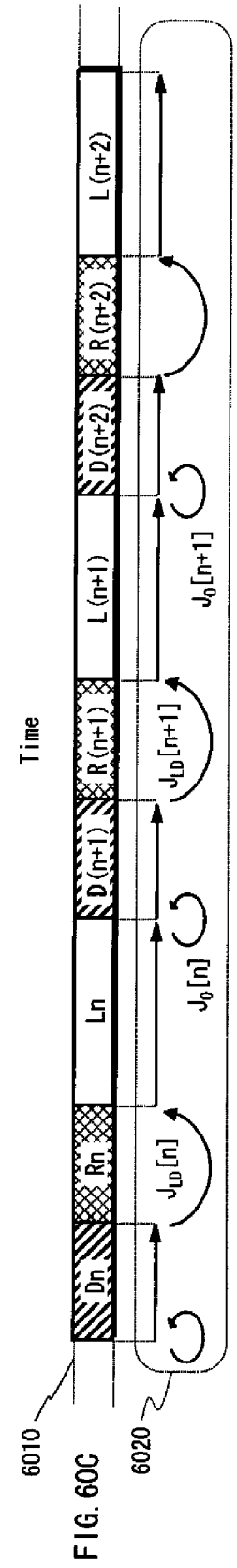
FIG. 60A
FIG. 60B
FIG. 60C

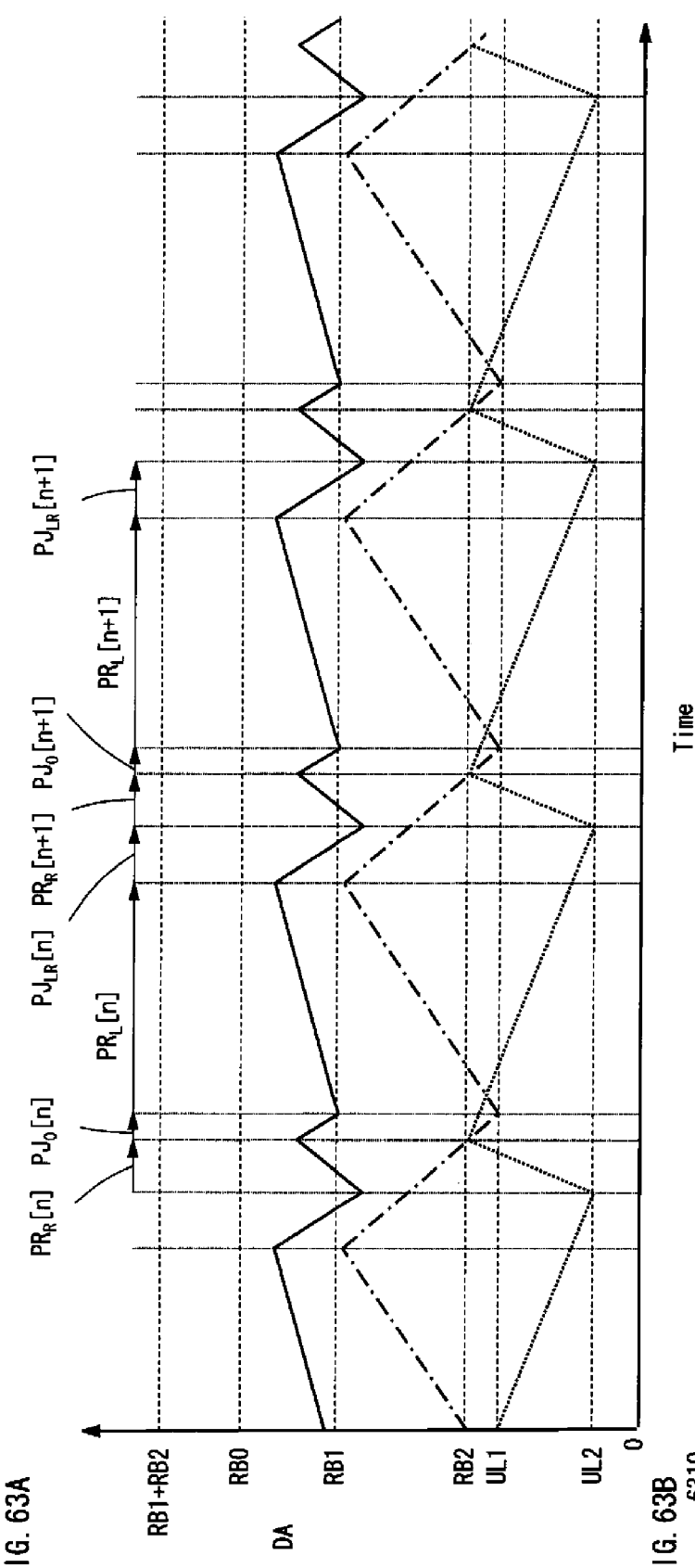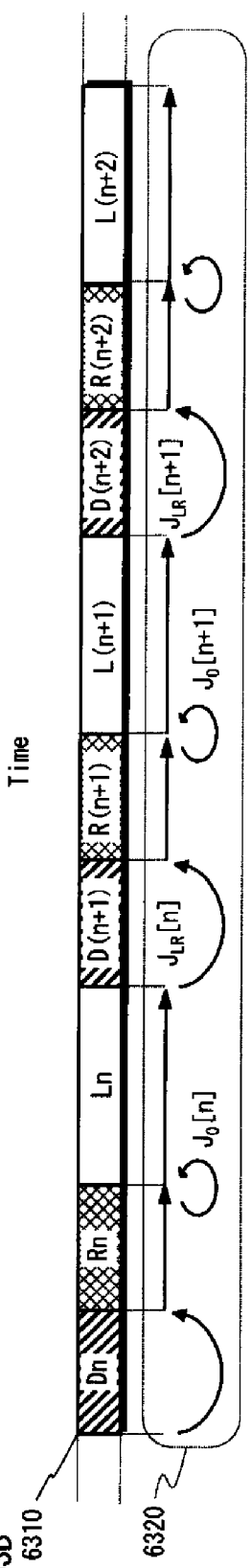
FIG. 63A
FIG. 63B

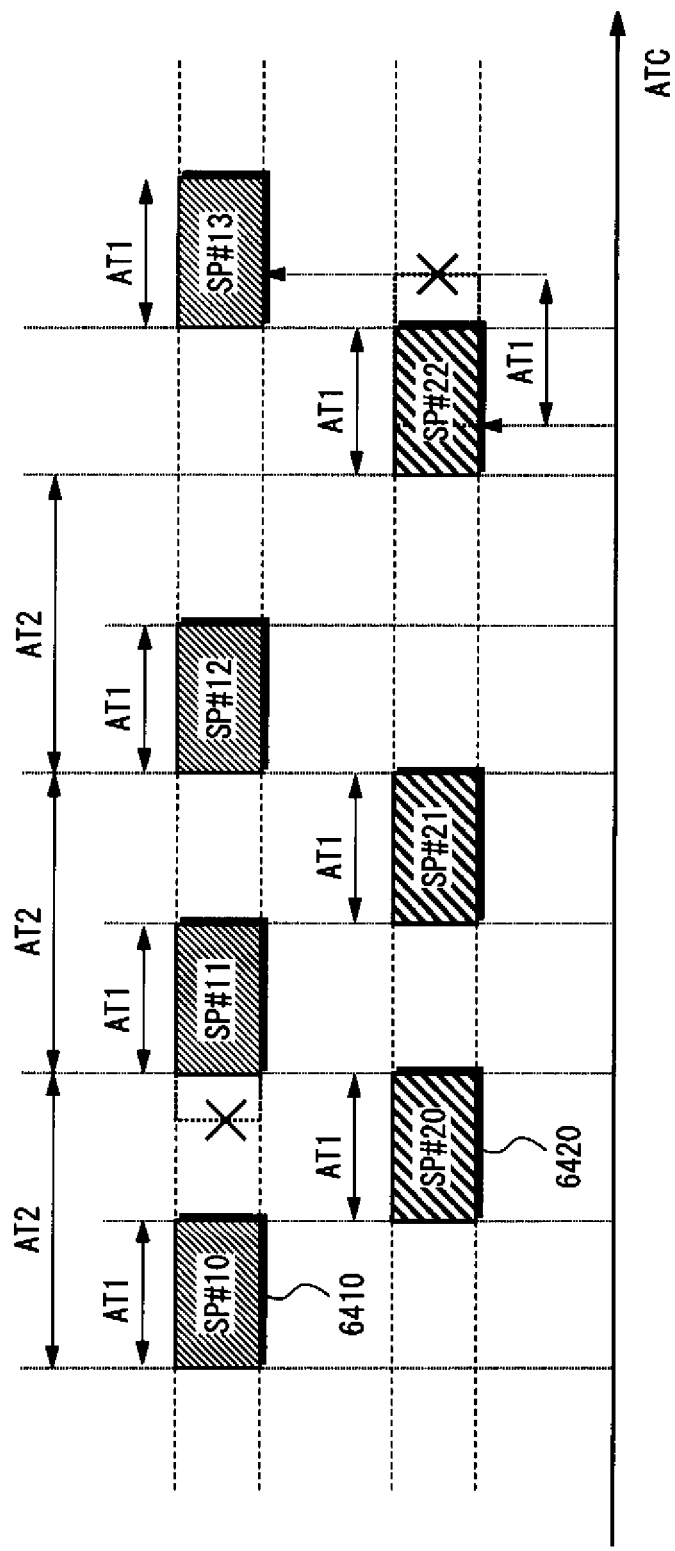

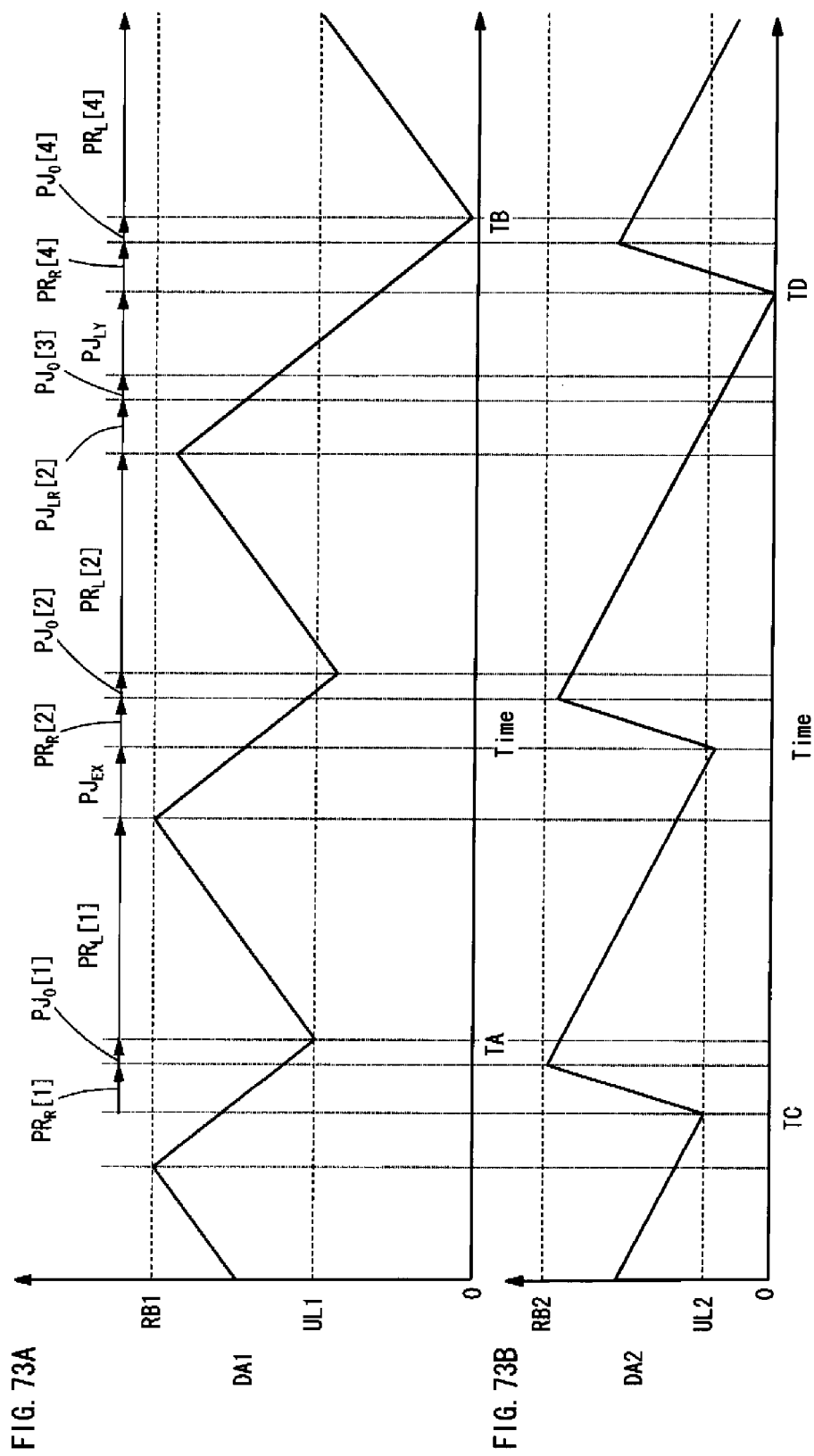

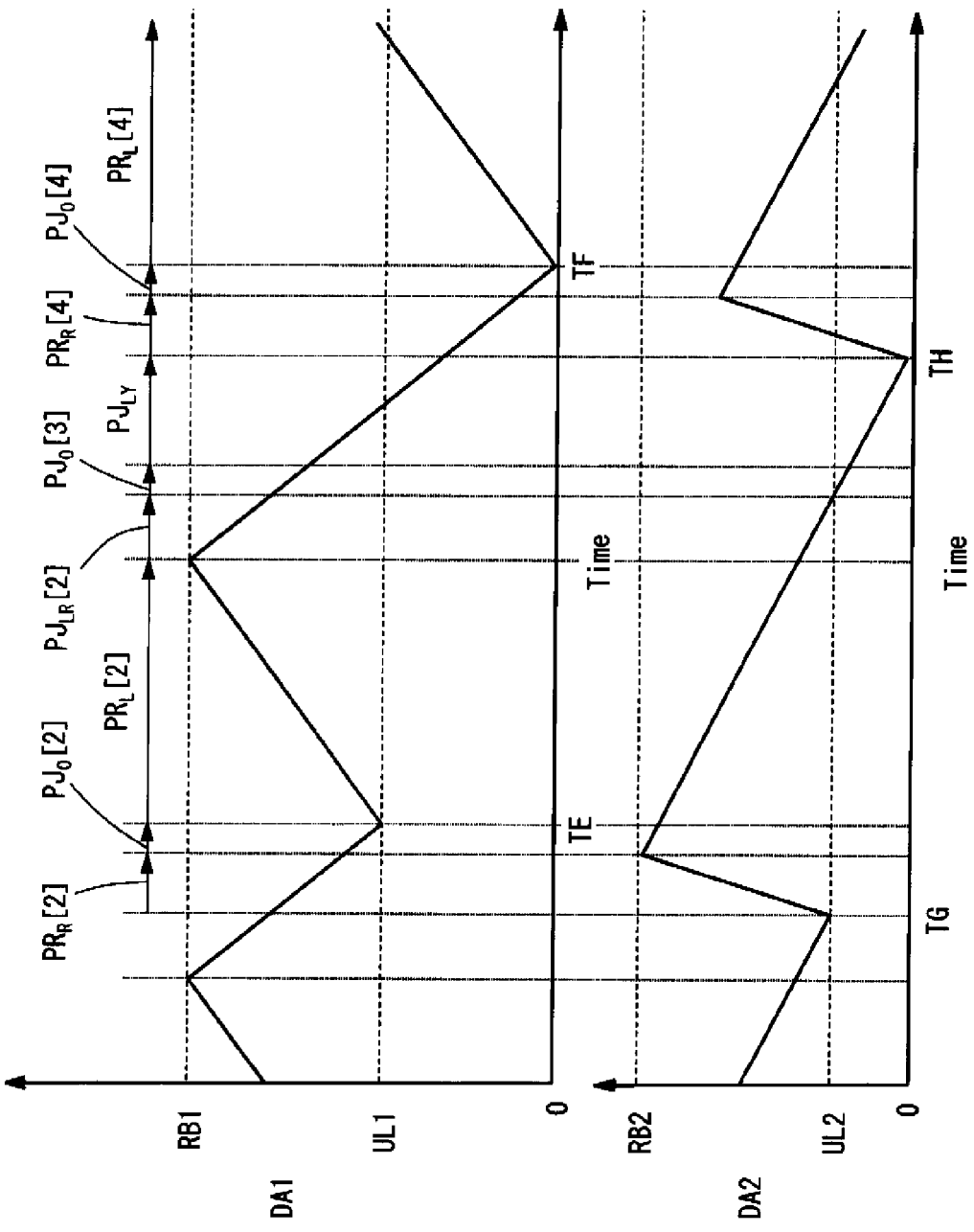

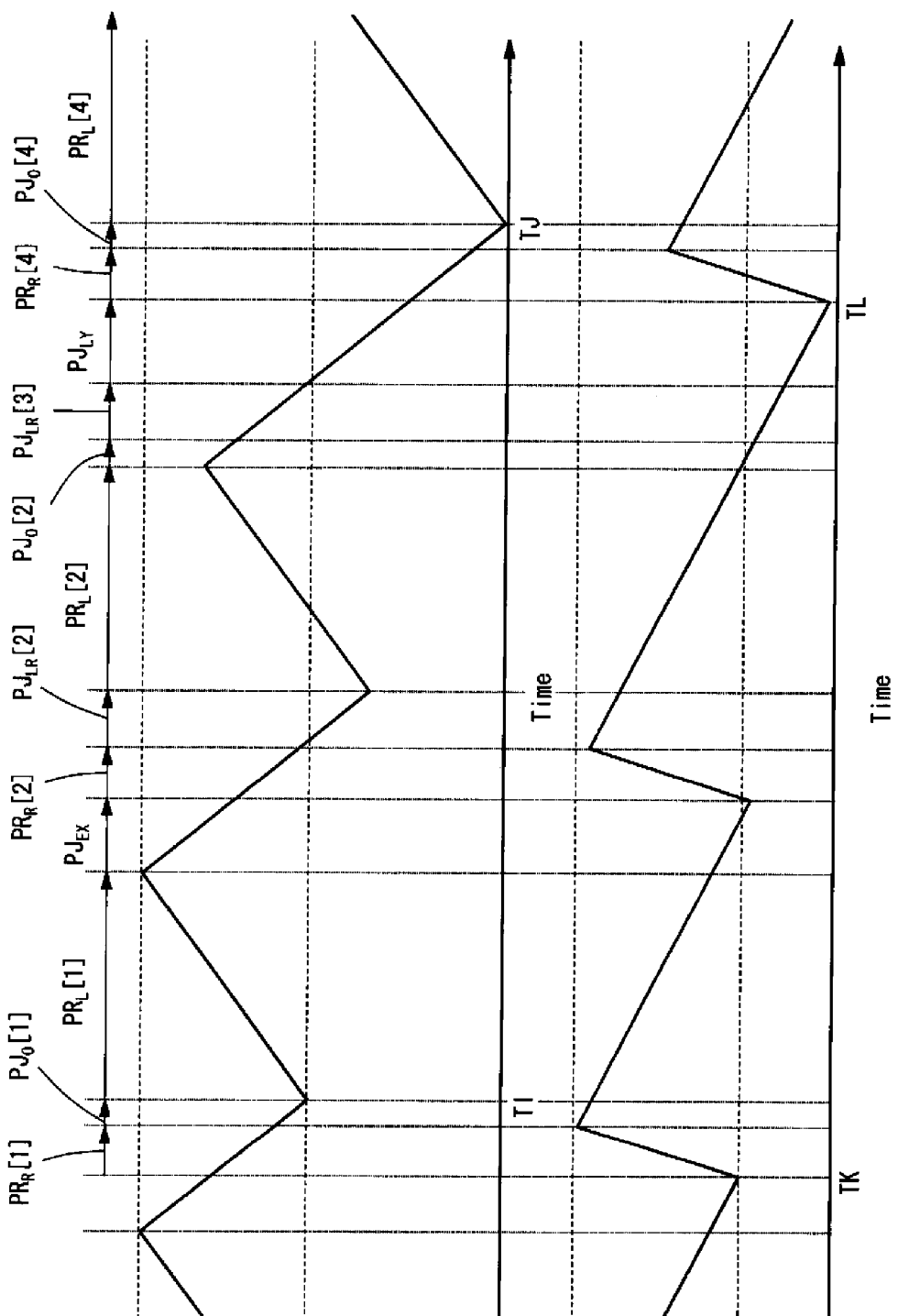

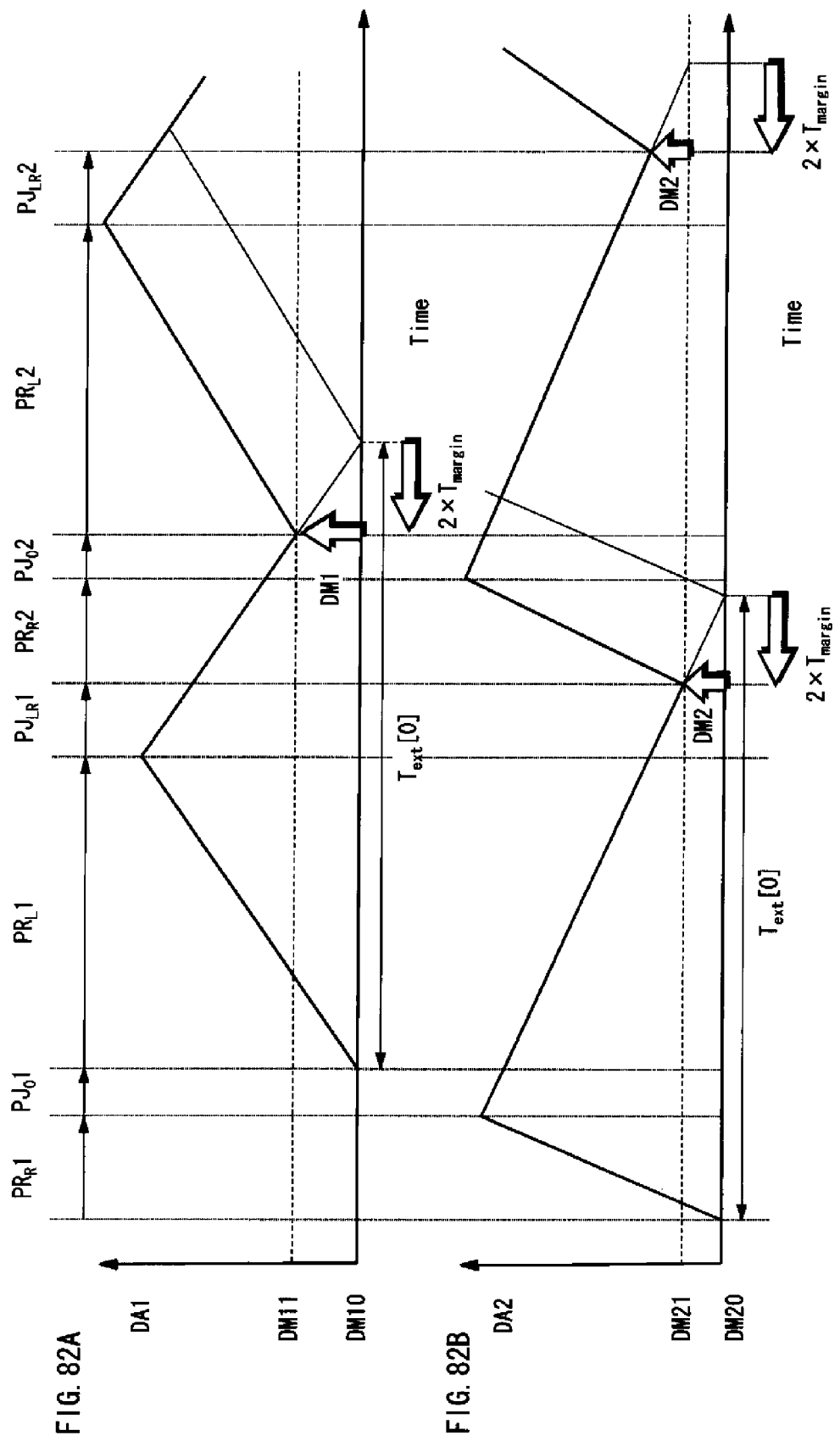

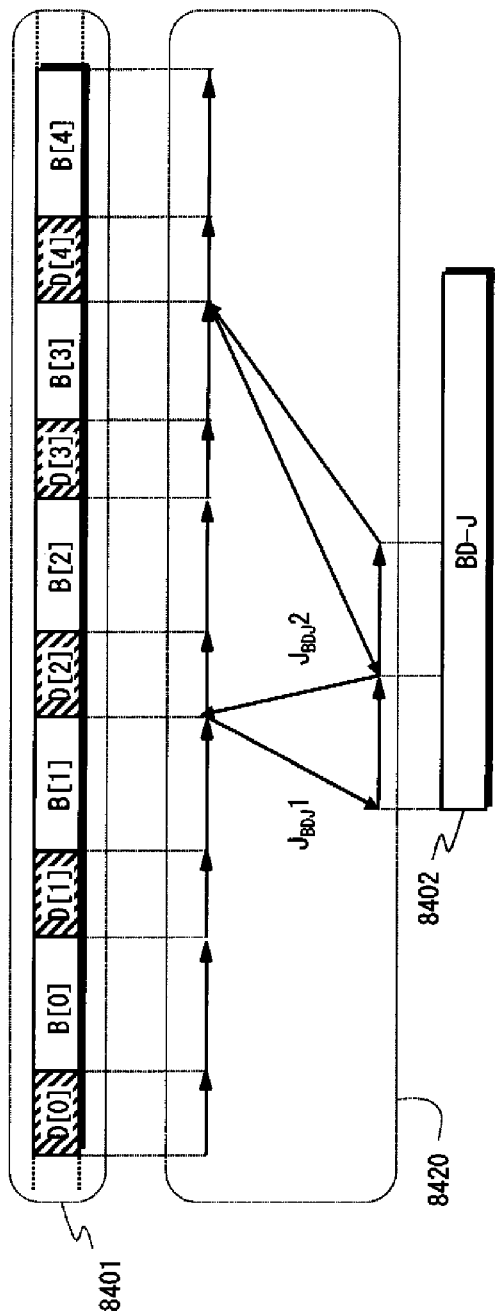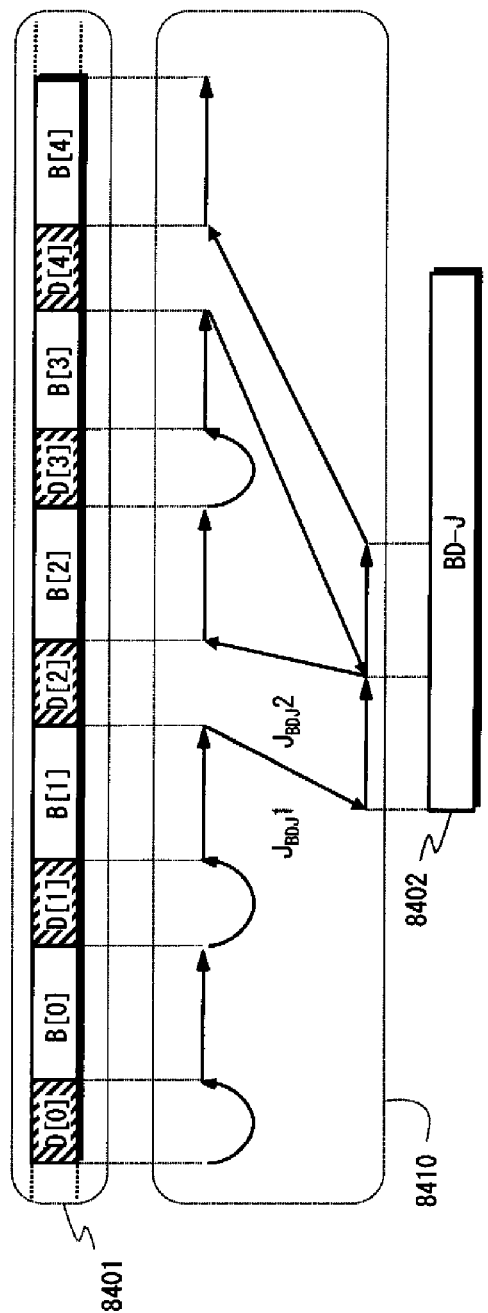
FIG. 84A
FIG. 84B

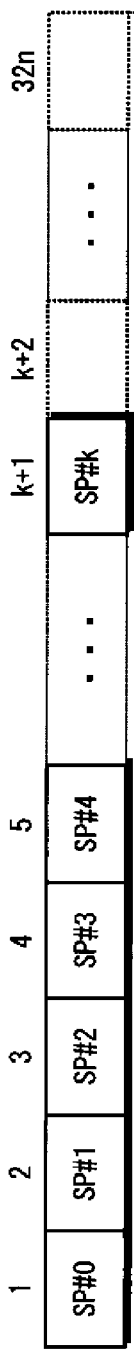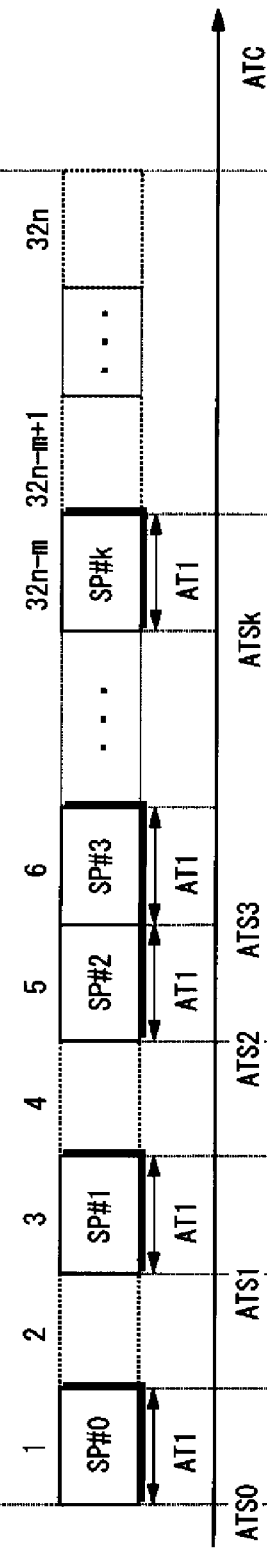
FIG. 85A
FIG. 85B
FIG. 85C

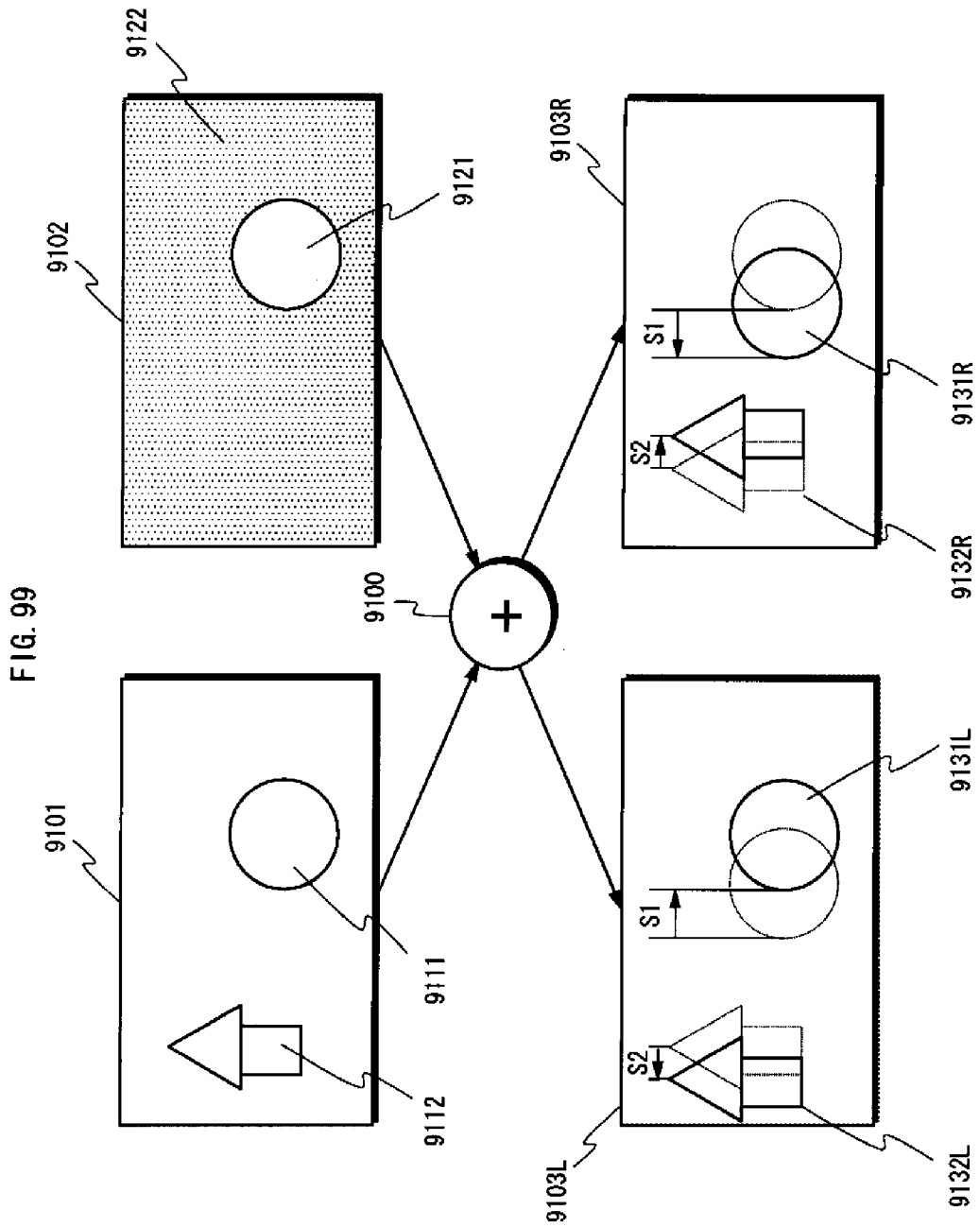

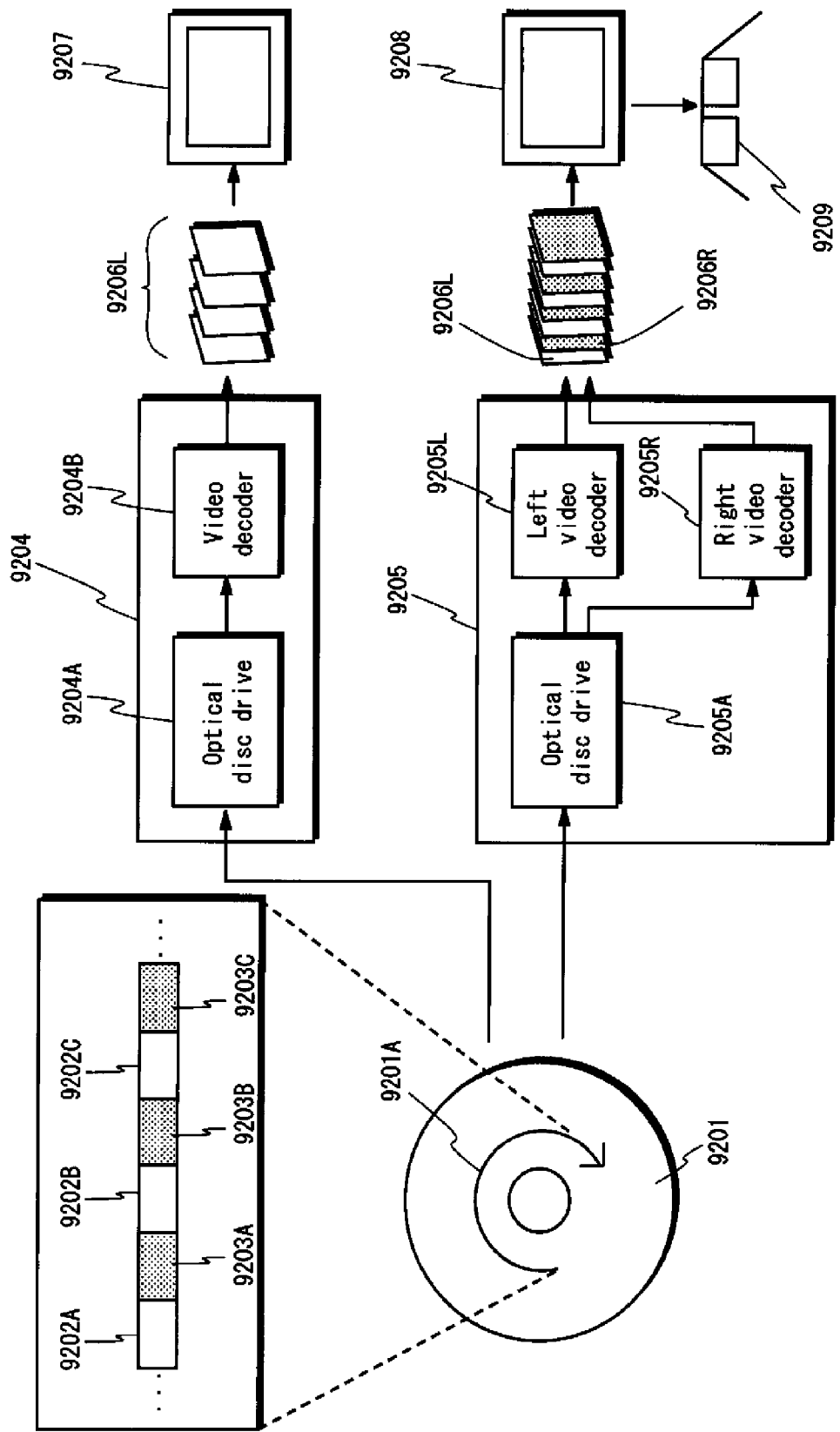

RECORDING MEDIUM, PLAYBACK DEVICE AND INTEGRATED CIRCUIT

This application claims benefit to the provisional U.S. application 61/156,597, filed Mar. 2, 2009.

BACKGROUND OF THE INVENTION (1) Field of the Invention

The present invention relates to a technology for stereoscopic, i.e. three-dimensional (3D), video playback and especially to decoding of the video stream.

(2) Description of the Related Art

In recent years, general interest in 3D video has been increasing. For example, amusement park attractions that incorporate 3D video images are popular. Furthermore, throughout the country, the number of movie theaters showing 3D movies is increasing. Along with this increased interest in 3D video, the development of technology that enables playback of 3D video images in the home has also been progressing. There is demand for this technology to store 3D video content on a portable recording medium, such as an optical disc, while maintaining the 3D video content at high image quality. Furthermore, there is demand for the recording medium to be compatible with a two-dimensional (2D) playback device. That is, it is preferable for a 2D playback device to be able to play back 2D video images and a 3D playback device to be able to play back 3D video images from the same 3D video content recorded on the recording medium. Here, a "2D playback device" refers to a conventional playback device that can only play back monoscopic video images, i.e. 2D video images, whereas a "3D playback device" refers to a playback device that can play back 3D video images. Note that in the present description, a 3D playback device is assumed to be able to also play back conventional 2D video images.

FIG. 100 is a schematic diagram illustrating the technology for ensuring the compatibility of an optical disc storing 3D video content with 2D playback devices (see Patent Literature 1). An optical disc 9201 stores two types of video stream files. One is a 2D/left-view video stream file, and the other is a right-view video stream file. A "2D/left-view video stream" represents a 2D video image to be shown to the left eye of a viewer during 3D playback, i.e. a "left-view". During 2D playback, this stream constitutes the 2D video image. A "right-view video stream" represents a 2D video image to be shown to the right eye of a viewer during 3D playback, i.e. a "right-view". The left and right video streams have the same frame rate but different presentation times shifted from each other by half a frame period. For example, when the frame rate of each video stream is 24 frames per second, the frames of the 2/D left-view video stream and the right-view video stream are alternately displayed every ⅟₄₈ seconds.

As shown in FIG. 100, the left-view and right-view video streams are divided into a plurality of extents 9202A-C and 9203A-C respectively on the optical disc 9201. Each extent contains at least one group of pictures (GOP), GOPs being read together from the optical disc. Hereinafter, the extents belonging to the 2D/left-view video stream are referred to as "2D/left-view extents", and the extents belonging to the right-view video stream are referred to as "right-view extents". The 2D/left-view extents 9202A-C and the right-view extents 9203A-C are alternately arranged on a track 9201A of the optical disc 9201. Each two adjacent extents 9202A-9203A, 9202B-9203B, and 9202C-9203C has the same length of playback time. Such an arrangement of extents is referred to as an interleaved arrangement. A group of extents recorded in an interleaved arrangement on a recording medium is used both in 3D video playback and 2D video image playback, as described below.

From among the extents recorded on the optical disc 9201, a 2D playback device 9204 causes an optical disc drive 9204A to read only the 2D/left-view extents 9202A-C sequentially from the start, skipping the reading of right-view extents 9203A-C. Furthermore, an image decoder 9204B sequentially decodes the extents read by the optical disc drive 9204A into a video frame 9206L. In this way, a display device 9207 only displays left-views, and viewers can watch normal 2D video images.

A 3D playback device 9205 causes an optical disc drive 9205A to alternately read 2D/left-view extents and right-view extents from the optical disc 9201. When expressed as codes, the extents are read in the order 9202A, 9203A, 9202B, 9203B, 9202C, and 9203C. Furthermore, from among the read extents, those belonging to the 2D/left-view video stream are supplied to a left video decoder 9205L, whereas those belonging to the right-view video stream are supplied to a right-video decoder 9205R. The video decoders 9205L and 9205R alternately decode each video stream into video frames 9206L and 9206R, respectively. As a result, left-views and right-views are alternately displayed on a display device 9208. In synchronization with the switching of the views by the display device 9208, shutter glasses 9209 cause the left and right lenses to become opaque alternately. Therefore, a viewer wearing the shutter glasses 9209 sees the views displayed by the display device 9208 as 3D video images.

When 3D video content is stored on any recording medium, not only on an optical disc, the above-described interleaved arrangement of extents is used. In this way, the recording medium can be used both for playback of 2D video images and 3D video images.

REFERENCES

Patent Documents

Patent Document 1
Japanese Patent No. 3935507

SUMMARY OF THE INVENTION

Problems to be Solved by the Invention

In the technology for playback of 3D video images shown in FIG. 100, as described above, a pair of left-view and right-view frame data is necessary to display one frame of a 3D video image. Accordingly, the 3D playback device 9205 is required to have at least twice the processing speed of the 2D playback device 9204. The decoding of stream data places a particularly large burden on the playback device, and reducing this burden is extremely effective in increasing reliability of the playback device.

It is an object of the present invention both to provide a recording medium that stores stream data, which represents 3D video images, in a data structure that reduces the processing burden on the playback device for decoding the stream data, and to provide a playback device that offers increased reliability by performing the decoding processing efficiently.

Means for Solving the Problems

A main-view stream and a sub-view stream are recorded on a recording medium according to an embodiment of the present invention. The main-view stream is used for monoscopic video playback, and the sub-view stream is used for stereoscopic video playback in combination with the main-view stream. The main-view stream includes a plurality of main-view pictures, and the sub-view stream includes a plurality of sub-view pictures.

On a recording medium according to a first aspect of the present invention, the main-view pictures and the sub-view pictures are in one-to-one correspondence. When a sub-view picture corresponds to a main-view picture that is one of an I picture and a P picture, any reference picture used for compression of the sub-view picture is one of an I picture and a P picture.

On a recording medium according to a second aspect of the present invention, the main-view stream further includes at least one main-view picture header, and the sub-view stream further includes at least one sub-view picture header. Each main-view picture header includes information indicating a coding method of a main-view picture. Each sub-view picture header includes information indicating a coding method of a sub-view picture. Each main-view picture refers to the main-view picture header but does not refer to the sub-view picture header. Each sub-view picture refers to the sub-view picture header but does not refer to the main-view picture header.

A playback device according to an embodiment of the present invention is a playback device for playing back video images from a main-view stream and a sub-view stream and comprises a decoding unit and a control unit. The main-view stream is used for monoscopic video playback. The sub-view stream is used for stereoscopic video playback in combination with the main-view stream. The decoding unit is operable to extract a compressed picture from each of the main-view stream and the sub-view stream, analyze a header included in the compressed picture, and decode the compressed picture. The control unit is operable to determine a decoding method of the compressed picture from the header of the compressed picture analyzed by the decoding unit and indicate the decoding method to the decoding unit. During a period when the control unit determines the decoding method of a compressed picture included in the main-view stream from the header of the compressed picture, the decoding unit performs one of header analysis and decoding of a compressed picture included in the sub-view stream. During a period when the control unit determines the decoding method of a compressed picture included in the sub-view stream from the header of the compressed picture, the decoding unit decodes a compressed picture included in the main-view stream.

Advantageous Effect of the Invention

In the recording medium according to the first aspect of the present invention, when an I picture or P picture is selectively decoded from the main-view stream, a 3D video image can be played back if the corresponding picture is decoded from the sub-view stream. Accordingly, this recording medium can reduce the processing burden on the playback device for decoding stream data, particularly during trickplay of 3D video images. On the other hand, in the recording medium according to the second aspect of the present invention, a main-view picture and sub-view picture do not refer to each other's picture headers. Accordingly, the recording medium can further reduce the processing burden on the 3D playback device for determining the coding method of each picture.

In a playback device according to the above embodiments of the present invention, while the decoding unit is decoding a picture, the control unit determines the decoding method for the next picture. As a result, the playback device can decode stream data more efficiently, thereby increasing reliability.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3A is a list of elementary streams multiplexed in the main TS on the BD-ROM disc 101 shown in FIG. 2, FIG. 3B is a list of elementary streams multiplexed in the first sub-TS on this BD-ROM disc 101, and FIG. 3C is a list of elementary streams multiplexed in the second sub-TS on this BD-ROM disc;

FIGS. 14A and 14B are schematic diagrams showing two examples of decoding counters assigned to each picture in the base-view video stream 1401 and in the dependent-view video stream 1402;

FIG. 16A is a schematic diagram showing the arrangement of a main TS 1601 and sub-TS 1602 recorded separately and contiguously on a BD-ROM disc, and FIG. 16B a schematic diagram showing the interleaved arrangement of the base-view data blocks B[0], B[1], B[2], . . . and dependent-view data blocks D[0], D[1], D[2], . . . recorded on a BD-ROM disc according to embodiment 1 of the present invention;

FIG. 20 is a schematic diagram showing the data structure of the 2D clip information file (01000.clip) 231 shown in FIG. 2;

FIG. 21A is a schematic diagram showing the data structure of the entry map 2030 shown in FIG. 20, FIG. 21B is a schematic diagram showing source packets in a source packet group 2110 belonging to the file 2D 241, shown in FIG. 2, that are associated with each EP_ID 2105 by the entry map 2030, and FIG. 21C is a schematic diagram showing the relationships between the source packet group 2110 and the data block group Dn, Rn, Ln (n=0, 1, 2, 3, . . . ) on a BD-ROM disc;

FIG. 22A is a schematic diagram showing the data structure of an offset table 2041, and FIG. 22B is a schematic diagram showing the valid section of an offset entry;

FIG. 23A is a schematic diagram showing the data structure of the extent start points 2042 shown in FIG. 20, FIG. 23B is a schematic diagram showing the data structure of extent start points 2320 included in the right-view clip information file (02000.clpi) shown in FIG. 2, FIG. 23C is a schematic diagram representing the base-view data blocks L1, L2, . . . extracted from the first file SS (01000.ssif) 244A shown in FIG. 2 by the playback device 102 in L/R mode, FIG. 23D is a schematic diagram representing the relationship between right-view extents EXT2[0], EXT2[1], . . . belonging to the first file DEP (02000.m2ts) 242 shown in FIG. 2 and the SPNs 2322 shown by the extent start points 2320 shown in FIG. 233, and FIG. 23E is a schematic diagram showing an example of the relationship between 3D extents EXTSS[0], EXTSS[1], . . . belonging to the first file SS 244A and a data block group 2350 on a BD-ROM disc;

FIGS. 28A and 28B are schematic diagrams showing the relationship between playback sections 2801 and 2802 that are to be connected when the connection condition 2704 shown in FIG. 27 respectively indicates "5" and "6";

FIG. 29 is a schematic diagram showing the relationships between the PTSs indicated by the 2D playlist file 221 shown in FIG. 26 and the sections played back from the file 2D (01000.m2ts) 241 shown in FIG. 2;

FIG. 37 is a list of system parameters in the player variable storage unit 3608 shown in FIG. 36;

FIG. 40 is a functional block diagram of the playback device 102 according to embodiment 1 of the present invention in 3D playback mode;

FIGS. 44A and 44B are schematic diagrams showing cropping processing by the second cropping processing unit 4332 shown in FIG. 43;

FIGS. 45A, 45B, and 45C are schematic diagrams respectively showing the left-view and right-view PG planes generated by the cropping processing shown in FIG. 44, as well as the 3D video image perceived by a viewer based on these PG planes;

FIG. 57 is an example of a correspondence table between jump distances $S_{jump}$ and maximum jump times $T_{jump\_max}$ for a BD-ROM disc;

FIGS. 59A and 59B are graphs showing the change in data amounts DA1 and DA2 stored in read buffers 4021 and 4022 when the playback device 102 shown in FIG. 58 operates in L/R mode, and FIG. 59C is a schematic diagram showing the relationship between a data block group 5910 for playback and a playback path 5920 in L/R mode;

FIGS. 60A and 60B are graphs showing the change in the data amounts DA1 and DA2 stored in the read buffers 4021 and 4022 when the playback device 102 shown in FIG. 58 operates in depth mode, and FIG. 60C is a schematic diagram showing the relationship between a data block group 6010 for playback and a playback path 6020 in depth mode;

FIG. 63A is a graph showing changes in the data amount DA stored in the read buffers 6101, 4021, and 4022 when the playback processing systems shown in FIGS. 58 and 61 read a data block group 6310 in an interleaved arrangement according to a playback path 6320 in L/R mode for a data block group 6310, and FIG. 63B is a schematic diagram showing a playback path 6320;

FIG. 64 is a schematic diagram showing settings of ATSs for each base-view and dependent-view extent read by the playback processing system shown in FIG. 61;

FIGS. 73A and 73B are graphs showing changes in the data amounts DA1 and DA2 stored in the read buffers 4021 and 4022 during a read period of data blocks in accordance with the playback path 7220 in L/R mode shown in FIG. 72B;

FIGS. 76A and 76B are graphs showing changes in the data amounts DA1 and DA2 stored in the read buffers 4021 and 4022 during a read period of data blocks in accordance with the playback path 7520 in L/R mode shown in FIG. 75B;

FIGS. 78A and 78B are graphs showing changes in the data amounts DA1 and DA2 stored in the read buffers 4021 and 4022 during a read period of data blocks in accordance with the playback path 7720 in L/R mode shown in FIG. 77B;

FIGS. 82A and 823 are graphs showing changes in the data amounts DA1 and DA2 stored in the read buffers 4021 and 4022 when a sequence of 3D extent blocks that satisfy expressions 50-53 is read by the playback device 102 in L/R mode;

FIG. 84A is a schematic diagram showing the case when a BD-J object file is read during the period in which 3D video images are played back from a 3D extent block 8401 in accordance with a playback path 8420 in L/R mode, and FIG. 84B is a schematic diagram showing the case when a BD-J object file is read while 2D video images are being played back from a 3D extent block 8401 in accordance with a playback path 8410 in 2D playback mode;

FIG. 85A is a schematic diagram representing (k+1) source packets SP #0, SP #1, SP #2, . . . , SP #k to be included in one 3D extent, FIG. 85B is a schematic diagram showing the source packets SP #0-SP ##k along an ATC time axis in order of ATS, and FIG. 85C is a schematic diagram showing NULL packets inserted into the empty regions shown in FIG. 85B;

FIG. 99 is a schematic diagram showing an example of constructing a left-view 9103L and a right-view 9103R from the combination of a 2D video image 9101 and a depth map 9102; and FIG. 100 is a schematic diagram showing technology to guarantee compatibility of an optical disc on which 3D video content is recorded with a 2D playback device.

DESCRIPTION OF THE PREFERRED EMBODIMENTS

The following describes a recording medium and a playback device pertaining to preferred embodiments of the present invention with reference to the drawings.

Embodiment 1

Figure 1:
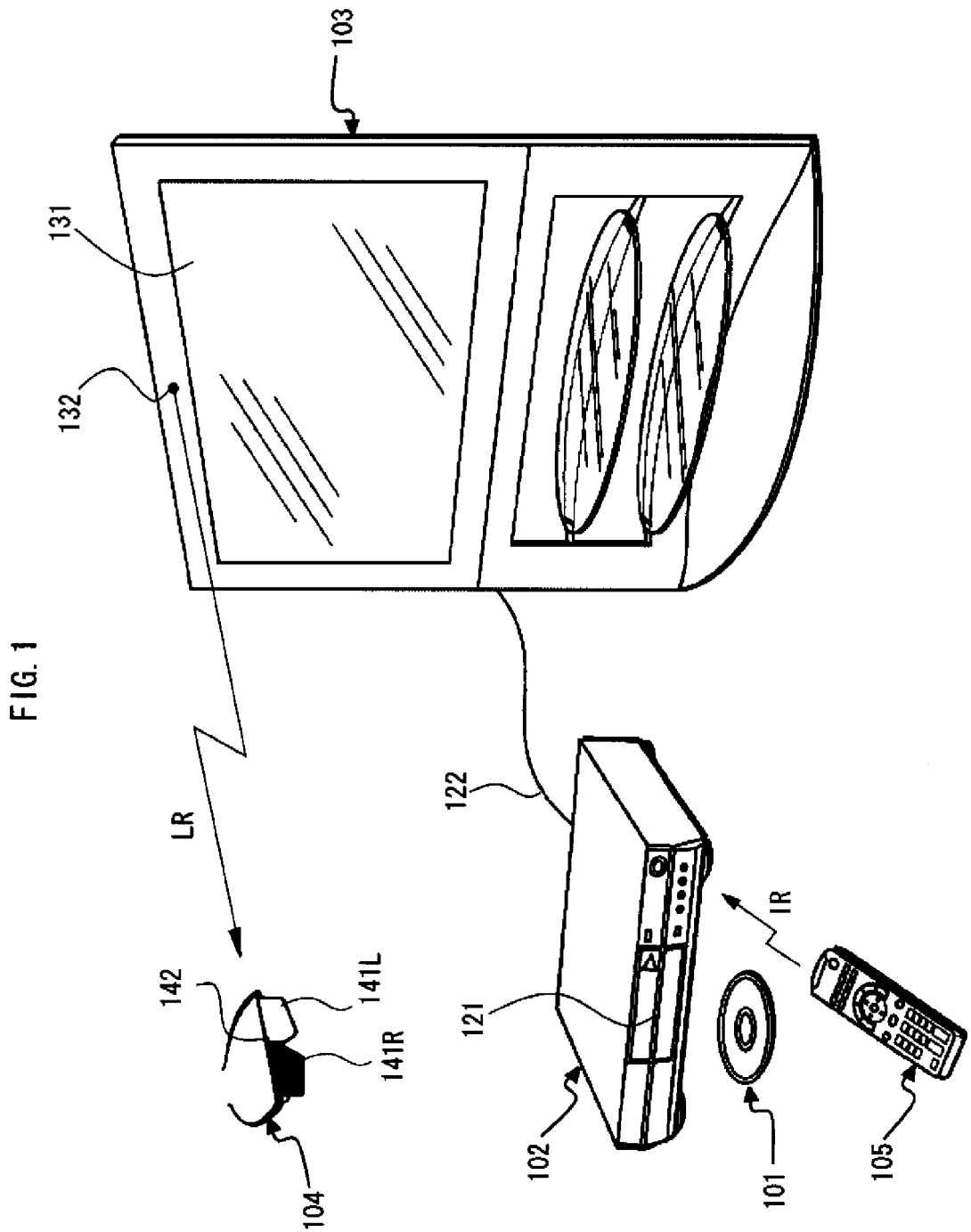
FIG. 1 is a schematic diagram showing a home theater system that uses a recording medium according to embodiment 1 of the present invention.

FIG. 1 is a schematic diagram showing a home theater system using a recording medium according to embodiment 1 of the present invention. This home theater system adopts a 3D video image (stereoscopic video image) playback method that uses parallax video images, and in particular adopts an alternate-frame sequencing method as a display method (see <Supplementary Explanation> for details). As shown in FIG. 1, this home theater system plays back a recording medium 101 and includes a playback device 102, a display device 103, shutter glasses 104, and a remote control 105.

The recording medium 101 is a read-only Blu-ray disc (BD)™, i.e. a BD-ROM disc. The recording medium 101 can be a different portable recording medium, such as an optical disc with a different format such as DVD or the like, a removable hard disk drive (HDD), or a semiconductor memory element such as an SD memory card. This recording medium, i.e. the BD-ROM disc 101, stores a movie content as 3D video images. This content includes video streams representing a left-view and a right-view for the 3D video images. The content may further include a video stream representing a depth map for the 3D video images. These video streams are arranged on the BD-ROM disc 101 in units of data blocks and are accessed using a file structure described below. The video streams representing the left-view or the right-view are used by both a 2D playback device and a 3D playback device to play the content back as 2D video images. Conversely, a pair of video streams representing a left-view and a right-view, or a pair of video streams representing either a left-view or a right-view and a depth map, are used by a 3D playback device to play the content back as 3D video images.

A BD-ROM drive 121 is mounted on the playback device 102. The BD-ROM drive 121 is an optical disc drive conforming to the BD-ROM format. The playback device 102 uses the BD-ROM drive 121 to read content from the BD-ROM disc 101. The playback device 102 further decodes the content into video data/audio data. The playback device 102 is a 3D playback device and can play the content back as both 2D video images and as 3D video images. Hereinafter, the operational modes of the playback device 102 when playing back 2D video images and 3D video images are respectively referred to as "2D playback mode" and "3D playback mode". In 2D playback mode, video data only includes either a left-view or a right-view video frame. In 3D playback mode, video data includes both left-view and right-view video frames.

3D playback mode is further divided into left/right (L/R) mode and depth mode. In "L/R mode", a pair of left-view and right-view video frames is generated from a combination of video streams representing the left-view and right-view. In "depth mode", a pair of left-view and right-view video frames is generated from a combination of video streams representing either a left-view or a right-view and a depth map. The playback device 102 is provided with an L/R mode. The playback device 102 may be further provided with a depth mode.

The playback device 102 is connected to the display device 103 via an HDMI (High-Definition Multimedia Interface) cable 122. The playback device 102 converts the video data/audio data into a video signal/audio signal in the HDMI format and transmits the signals to the display device 103 via the HDMI cable 122. In 2D playback mode, only one of either the left-view or the right-view video frame is multiplexed in the video signal. In 3D playback mode, both the left-view and the right-view video frames are time-multiplexed in the video signal. Additionally, the playback device 102 exchanges CEC messages with the display device 103 via the HDMI cable 122. In this way, the playback device 102 can ask the display device 103 whether it supports playback of 3D video images.

The display device 103 is a liquid crystal display. Alternatively, the display device 103 can be another type of flat panel display, such as a plasma display, an organic EL display, etc., or a projector. The display device 103 displays video on the screen 131 in accordance with a video signal, and causes the speakers to produce audio in accordance with an audio signal. The display device 103 supports playback of 3D video images. During playback of 2D video images, either the left-view or the right-view is displayed on the screen 131. During playback of 3D video images, the left-view and right-view are alternately displayed on the screen 131.

The display device 103 includes a left/right signal transmitting unit 132. The left/right signal transmitting unit 132 transmits a left/right signal LR to the shutter glasses 104 via infrared rays or by radio transmission. The left/right signal LR indicates whether the image currently displayed on the screen 131 is a left-view or a right-view image. During playback of 3D video images, the display device 103 detects switching of frames by distinguishing between a left-view frame and a right-view frame from a control signal that accompanies a video signal. Furthermore, the display device 103 switches the left/right signal LR synchronously with the detected switching of frames.

The shutter glasses 104 include two liquid crystal display panels 141L and 141R and a left/right signal receiving unit 142. Each of the liquid crystal display panels 141L and 141R constitute each of the left and right lens parts. The left/right signal receiving unit 142 receives a left/right signal LR, and in accordance with changes therein, transmits the signal to the left and right liquid crystal display panels 141L and 141R. In accordance with the signal, each of the liquid crystal display panels 141L and 141R either lets light pass through the entire panel or shuts light out. For example, when the left/right signal LR indicates a left-view display, the liquid crystal display panel 141L for the left eye lets light pass through, while the liquid crystal display panel 141R for the right eye shuts light out. When the left/right signal LR indicates a right-view display, the display panels act oppositely. In this way, the two liquid crystal display panels 141L and 141R alternately let light pass through in sync with the switching of frames. As a result, when a viewer looks at the screen 131 while wearing the shutter glasses 104, the left-view is shown only to the viewer's left eye, and the right-view is shown only to the right eye. At that time, the viewer is made to perceive the difference between the images seen by each eye as the binocular parallax for the same stereoscopic image, and thus the video image appears to be stereoscopic.

The remote control 105 includes an operation unit and a transmitting unit. The operation unit includes a plurality of buttons. The buttons correspond to each of the functions of the playback device 102 and the display device 103, such as turning the power on or off, starting or stopping playback of the BD-ROM disc 101, etc. The operation unit detects when the user presses a button and conveys identification information for the button to the transmitting unit as a signal. The transmitting unit converts this signal into a signal IR and outputs it via infrared rays or radio transmission to the playback device 102 or the display device 103. On the other hand, the playback device 102 and display device 103 each receive this signal IR, determine the button indicated by this signal IR, and execute the function associated with the button. In this way, the user can remotely control the playback device 102 or the display device 103.

<Data Structure of the BD-ROM Disc>

Figure 2:
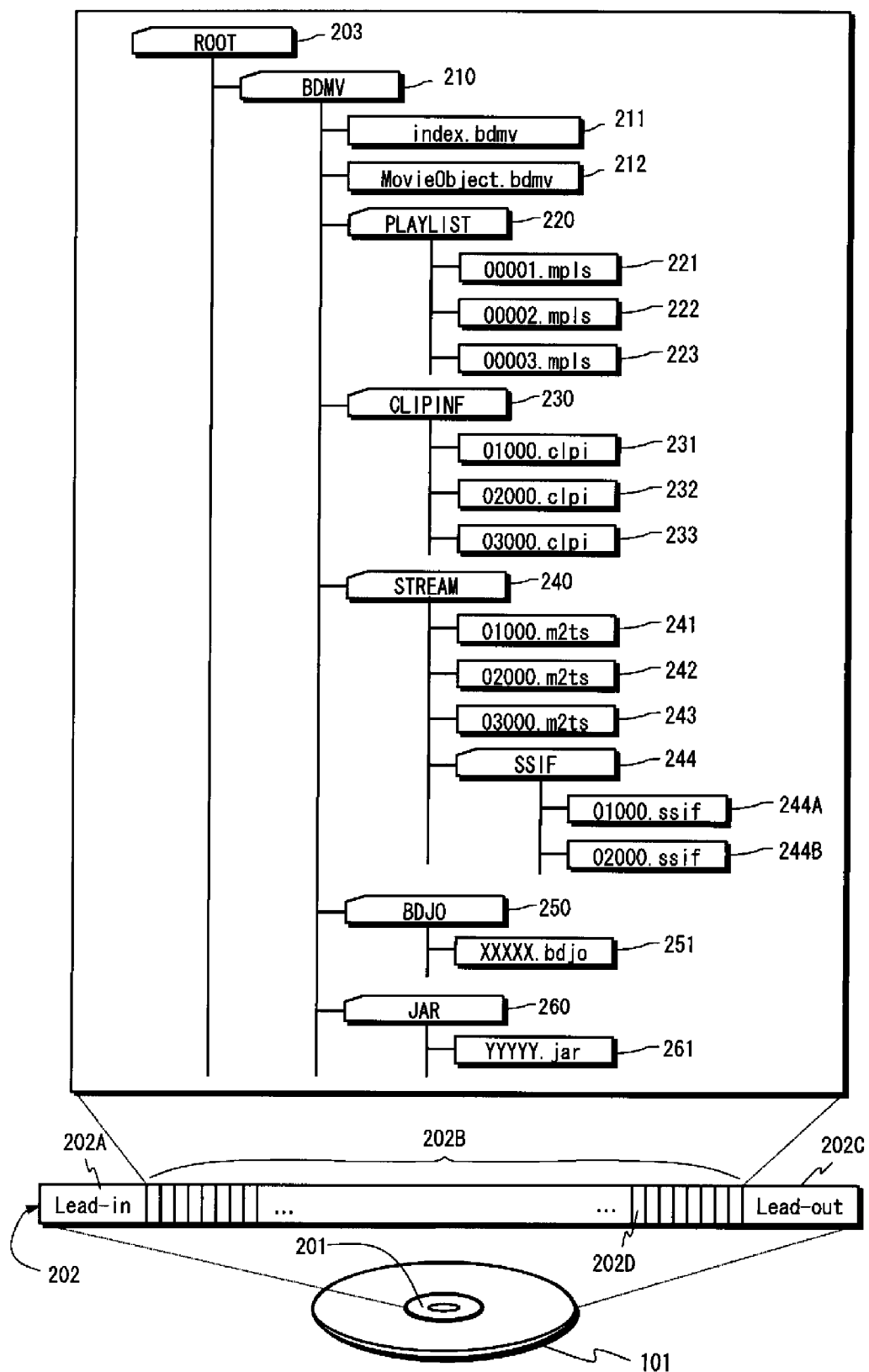
FIG. 2 is a schematic diagram showing the data structure of a BD-ROM disc 101 according to embodiment 1 of the present invention.

FIG. 2 is a schematic diagram showing the data structure of the BD-ROM disc 101. As shown in FIG. 2, a BCA (Burst Cutting Area) 201 is provided at the innermost part of the data recording area on the BD-ROM disc 101. Only the BD-ROM drive 121 is permitted to access the BCA, and access by application programs is prohibited. In this way, the BCA 201 can be used as technology for copyright protection. In the data recording area outside of the BCA 201, tracks spiral from the inner to the outer circumference. In FIG. 2, the track 202 is schematically extended in a transverse direction. The left side represents the inner circumferential part of the disc 101, and the right side represents the outer circumferential part. As shown in FIG. 2, track 202 contains a lead-in area 202A, a volume area 202B, and a lead-out area 202C in order from the inner circumference. The lead-in area 202A is provided immediately on the outside edge of the BCA 201. The lead-in area 202A includes information necessary for the BD-ROM drive 121 to access the volume area 202B, such as the size, the physical address, etc. of the data recorded in the volume area 202B. The lead-out area 202C is provided on the outermost circumferential part of the data recording area and indicates the end of the volume area 202B. The volume area 202B includes application data such as video images, audio, etc.

The volume area 202B is divided into small areas 202D called "sectors". The sectors have a common size, for example 2048 bytes. Each sector 202D is consecutively assigned a number in order from the top of the volume area 202B. These consecutive numbers are called logical block numbers (LBN) and are used in logical addresses on the BD-ROM disc 101. During reading of data from the BD-ROM disc 101, data to be read is specified through designation of the LBN for the destination sector. In this way, the volume area 202B can be accessed in units of sectors. Furthermore, on the BD-ROM disc 101, logical addresses are substantially the same as physical addresses. In particular, in an area where the LBNs are consecutive, the physical addresses are also substantially consecutive. Accordingly, the BD-ROM drive 121 can consecutively read data pieces having consecutive LBNs without making the optical pickup perform a seek.

The data recorded in the volume area 202B is managed under a predetermined file system. UDF (Universal Disc Format) is adopted as this file system. Alternatively, the file system may be ISO9660. The data recorded on the volume area 202B is represented in a directory/file format in accordance with the file system (see the <Supplementary Explanation> for details). In other words, the data is accessible in units of directories or files.

<<Directory/File Structure on the BD-ROM Disc>>

FIG. 2 further shows the directory/file structure of the data stored in the volume area 202B on a BD-ROM disc 101. As shown in FIG. 2, in this directory/file structure, a BD movie (BDMV) directory 210 is located directly below a ROOT directory 203. Below the BDMV directory 210 are an index file (index.bdmv) 211 and a movie object file (MovieObject.bdmv) 212.

The index file 211 contains information for managing as a whole the content recorded on the BD-ROM disc 101. In particular, this information includes information to make the playback device 102 recognize the content, as well as an index table. The index table is a correspondence table between a title constituting the content and a program to control the operation of the playback device 102. This program is called an "object". Object types are a movie object and a BD-J (BD Java™) object.

The movie object file 212 generally stores a plurality of movie objects. Each movie object stores a sequence of navigation commands. A navigation command is a control command causing the playback device 102 to execute playback processes similarly to general DVD players. Types of navigation commands are, for example, a read-out command to read out a playlist file corresponding to a title, a playback command to play back stream data from an AV stream file indicated by a playlist file, and a transition command to make a transition to another title. Navigation commands are written in an interpreted language and are deciphered by an interpreter, i.e. a job control program, included in the playback device to make the control unit execute the desired job. A navigation command is composed of an opcode and an operand. The opcode describes the type of operation that the playback device is to execute, such as dividing, playing back, or calculating a title, etc. The operand indicates identification information targeted by the operation such as the title's number, etc. The control unit of the playback device 102 calls a movie object in response, for example, to a user operation and executes navigation commands included in the called movie object in the order of the sequence. Thus, in a manner similar to general DVD players, the playback device 102 first makes the display device 103 display a menu to allow the user to select a command. The playback device 102 then executes playback start/stop of a title, switches to another title, etc. in response to the selected command, thereby dynamically changing the progress of video playback.

As shown in FIG. 2, the BDMV directory 210 further contains a playlist (PLAYLIST) directory 220; a clip information (CLIPINF) directory 230; a stream (STREAM) directory 240; a BD-J object (BDJO: BD Java Object) directory 250; and a Java archive (JAR: Java Archive) directory 260.

Three types of AV stream files, (01000.m2ts) 241, (02000.m2ts) 242, and (03000.m2ts) 243, as well as a stereoscopic interleaved file (SSIF) directory 244 are located directly under the STREAM directory 240. Two types of AV stream files, (01000.ssif) 244A and (02000.ssif) 244B are located directly under the SSIF directory 244.

An "AV stream file" refers to a file, from among an actual video content recorded on a BD-ROM disc 101, that complies with the file format determined by the file system. Such an actual video content generally refers to stream data in which different types of stream data representing video, audio, subtitles, etc., i.e. elementary streams, have been multiplexed. This multiplexed stream data can be, broadly divided into a main transport stream (TS) and a sub-TS depending on the type of the internal primary video stream. A "main TS" is multiplexed stream data that includes a base-view video stream as a primary video stream. A "base-view video stream" is a video stream that can be played back independently and that represents 2D video images. Note that the base view is referred to as the "main view". A "sub-TS" is multiplexed stream data that includes a dependent-view video stream as a primary video stream. A "dependent-view video stream" is a video stream that requires a base-view video stream for playback and represents 3D video images by being combined with the base-view video stream. Note that the dependent view is referred to as the "sub view". The types of dependent-view video streams are a right-view video stream, left-view video stream, and depth map stream. When the 2D video images represented by a base-view video stream are used as the left-view of 3D video images by a playback device in L/R mode, a "right-view video stream" is used as the video stream representing the right-view of the 3D video images. The reverse is true for a "left-view video stream". When the 2D video images represented by a base-view video stream are used to project 3D video images on a virtual 2D screen by a playback device in depth mode, a "depth map stream" is used as the video stream representing a depth map for the 3D video images.

Depending on the type of internal multiplexed stream data, an AV stream file can be divided into three types: file 2D, dependent file (hereinafter, abbreviated as "file DEP"), and interleaved file (hereinafter, abbreviated as "file SS"). A "file 2D" is an AV stream file for playback of 2D video in 2D playback mode and includes a main TS. A "file DEP" is an AV stream file that includes a sub-TS. An "file SS" is an AV stream file that includes a main TS and a sub-TS representing the same 3D video images. In particular, a file SS shares its main TS with a certain file 2D and shares its sub-TS with a certain file DEP. In other words, in the file system on the BD-ROM disc 101, a main TS can be accessed by both a file SS and a file 2D, and a sub TS can be accessed by both a file SS and a file DEP. This setup, whereby a sequence of data recorded on the BD-ROM disc 101 is common to different files and can be accessed by all of the files, is referred to as "file cross-link".

In the example shown in FIG. 2, the first AV stream file (01000.m2ts) 241 is a file 2D, and the second AV stream file (02000.m2ts) 242 and third AV stream file (03000.m2ts) 243 are both files DEP. In this way, files 2D and files DEP are located directly below the STREAM directory 240. The first AV stream file, i.e. the base-view video stream that includes the file 2D 241, represents a left-view of 3D video images. The second AV stream file, i.e. the dependent-view video stream that includes the first file DEP 242, is a right-view video stream. The third AV stream file, i.e. the dependent-view video stream that includes the second file DEP 243, is a depth map stream.

In the example shown in FIG. 2, the fourth AV stream file (01000.ssif) 244A and the fifth AV stream file (02000.ssif) 244B are both a file SS. In this way, files SS are located directly below the SSIF directory 244. The fourth AV stream file, i.e. the first file SS 244A, shares a main TS, and in particular a base-view video stream, with the file 2D 241 and shares a sub-TS, in particular a right-view video stream, with the first file DEP 242. The fifth AV stream file, i.e. the second file SS 244B, shares a main TS, and in particular a base-view video stream, with the file 2D 241 and shares a sub-TS, in particular a depth map stream, with the second file DEP 243.

Three types of clip information files, (01000.clpi) 231, (02000.clpi) 232, and (03000.clpi) 233 are located in the CLIPINF directory 230. A "clip information file" is a file associated on a one-to-one basis with a file 2D and a file DEP and in particular contains the entry map for each file. An "entry map" is a correspondence table between the presentation time for each scene represented by a file 2D or a file DEP and the address within each file at which the scene is recorded. Among the clip information files, a clip information file associated with a file 2D is referred to as a "2D clip information file", and a clip information file associated with a file DEP is referred to as a "dependent-view clip information file". Furthermore, when a file DEP includes a right-view video stream, the corresponding dependent-view clip information file is referred to as a "right-view clip information file". When a file DEP includes a depth map stream, the corresponding dependent-view clip information file is referred to as a "depth map clip information file". In the example shown in FIG. 2, the first clip information file (01000.clpi) 231 is a 2D clip information file and is associated with the file 2D 241. The second clip information file (02000.clpi) 232 is a right-view clip information file and is associated with the first file DEP 242. The third clip information file (03000.clpi) 233 is a depth map clip information file and is associated with the second file DEP 243.

Three types of playlist files, (00001.mpls) 221, (00002.mpls) 222, and (00003.mpls) 223 are located in the PLAYLIST directory 220. A "playlist file" is a file that specifies the playback path of an AV stream file, i.e. the part of an AV stream file to decode, and the order of decoding. The types of playlist files are a 2D playlist file and a 3D playlist file. A "2D playlist file" specifies the playback path of a file 2D. A "3D playlist file" specifies, for a playback device in 2D playback mode, the playback path of a file 2D, and for a playback device in 3D playback mode, the playback path of a file SS. As shown in the example in FIG. 2, the first playlist file (00001.mpls) 221 is a 2D playlist file and specifies the playback path of the file 2D 241. The second playlist file (00002.mpls) 222 is a 3D playlist file that specifies, for a playback device in 2D playback mode, the playback path of the file 2D 241, and for a playback device in L/R mode, the playback path of the first file SS 244A. The third playlist file (00003.mpls) is a 3D playlist file that specifies, for a playback device in 2D playback mode, the playback path of the file 2D 241, and for a playback device in depth mode, the playback path of the second file SS 244B.

A BD-J object file (XXXXX.bdjo) 251 is located in the BDJO directory 250. The BD-J object file 251 includes a single BD-J object. The BD-J object is a bytecode program to cause a Java virtual machine mounted on the playback device 102 to execute the processes of title playback and graphics rendering. The BD-J object is written in a compiler language such as Java or the like. The BD-J object includes an application management table and identification information for the playlist file to which is referred. The "application management table" is a list of the Java application programs to be executed by the Java virtual machine and their period of execution (lifecycle). The "identification information of the playlist file to which is referred" identifies a playlist file that corresponds to a title to be played back. The Java virtual machine calls a BD-J object in response to a user operation or an application program, and executes the Java application program according to the application management table included in the BD-J object. Consequently, the playback device 102 dynamically changes the progress of the video for each title played back, or causes the display device 103 to display graphics independently of the title video.

A JAR file (YYYYY.jar) 261 is located in the JAR directory 260. The JAR directory 261 generally includes a plurality of actual Java application programs to be executed in accordance with the application management table shown in the BD-J object. A Java application program is a bytecode program written in a compiler language such as Java or the like, as is the BD-J object. Types of Java application programs include programs causing the Java virtual machine to execute playback of a title process and programs causing the Java virtual machine to execute graphics rendering. The JAR file 261 is a Java archive file, and when it is read by the playback device 102, it is extracted in internal memory. In this way, a Java application program is stored in memory.

<<Structure of Multiplexed Stream Data>>

FIG. 3A is a list of elementary streams multiplexed in a main TS on a BD-ROM disc 101. The main TS is a digital stream in MPEG-2 transport stream (TS) format and includes the file 2D 241 shown in FIG. 2. As shown in FIG. 3A, the main TS includes a primary video stream 301 and primary audio streams 302A and 302B. The main TS may additionally include presentation graphics (PG) streams 303A and 303B, an interactive graphics (IG) stream 304, a secondary audio stream 305, and a secondary video stream 306.

The primary video stream 301 represents the primary video of a movie, and the secondary video stream 306 represents secondary video of the movie. The primary video is the major video of a content, such as the main feature of a movie, and is displayed on the entire screen, for example. On the other hand, the secondary video is displayed simultaneously with the primary video with the use, for example, of a picture-in-picture method, so that the secondary video images are displayed in a smaller window presented on the full screen displaying the primary video image. The primary video stream 301 and the secondary video stream 306 are both a base-view video stream. Each of the video streams 301 and 306 is encoded by a video compression encoding method, such as MPEG-2, MPEG-4 AVC, or SMPTE VC-1.

The primary audio streams 302A and 302B represent the primary audio of the movie. In this case, the two primary audio streams 302A and 302B are in different languages. The secondary audio stream 305 represents secondary audio to be mixed with the primary audio. Each of the audio streams 302A, 302B, and 305 is encoded by a method such as AC-3, Dolby Digital Plus ("Dolby Digital" is a registered trademark), Meridian Lossless Packing™ (MLP), Digital Theater System™ (DTS), DTS-HD, or linear pulse code modulation (PCM).

Each of the PG streams 303A and 303B represent subtitles or the like via graphics and are graphics video images to be displayed superimposed on the video images represented by the primary video stream 301. The two PG streams 303A and 303B represent, for example, subtitles in a different language. The IG stream 304 represents graphical user interface (GUI) graphics components, and the arrangement thereof, for constructing an interactive screen on the screen 131 in the display device 103.

The elementary streams 301-306 are identified by packet IDs (PIDs). PIDs are assigned, for example, as follows. Since one main TS includes only one primary video stream, the primary video stream 301 is assigned a hexadecimal value of 0x1011. When up to 32 other elementary streams can be multiplexed by type in one main TS, the primary audio streams 302A and 302B are each assigned any value from 0x1100 to 0x111F. The PG streams 303A and 303B are each assigned any value from 0x1200 to 0x121F. The IG stream 304 is assigned any value from 0x1400 to 0x141F. The secondary audio stream 305 is assigned any value from 0x1A00 to 0x1A1F. The secondary video stream 306 is assigned any value from 0x1B00 to 0x1B1F.

FIG. 3B is a list of elementary streams multiplexed in the first sub-TS on a BD-ROM disc 101. The first sub-TS is multiplexed stream data in MPEG-2 TS format and is included in the first file DEP 242 shown in FIG. 2. As shown in FIG. 3B, the first sub-TS includes a primary video stream 311. The first sub-TS may additionally include left-view PG streams 312A and 312B, right-view PG streams 313A and 3133, a left-view IG stream 314, right-view IG stream 315, and secondary video stream 316. The primary video stream 311 is a right-view video stream, and when the primary video stream 301 in the main TS represents the left-view for 3D video images, the primary video stream 311 represents the right-view for the 3D video images. When graphics video images for subtitles or the like are represented as 3D video images, pairs formed by the left-view or right-view and a PG stream, i.e. 312A+313A and 312B+313B, represent the corresponding left-view and right-view. When graphics video images for an interactive display are represented as 3D video images, pairs formed by the left-view or right-view and the IG streams 314 and 315 represent the corresponding left-view and right-view. The secondary video stream 316 is a right-view video stream, and when the secondary video stream 306 in the main TS represents the left-view for 3D video images, the secondary video stream 316 represents the right-view for the 3D video images.

PIDs are assigned to the elementary streams 311-316, for example, as follows. The primary video stream 311 is assigned a value of 0x1012. When up to 32 other elementary streams can be multiplexed by type in one sub-TS, the left-view PG streams 312A and 312B are assigned any value from 0x1220 to 0x123F, and the right-view PG streams 313A and 313B are assigned any value from 0x1240 to 0x125F. The left-view IG stream 314 is assigned any value from 0x1420 to 0x143F, and the right-view IG stream 315 is assigned any value from 0x1440 to 0x145F. The secondary video stream 316 is assigned any value from 0x1B20 to 0x1B3F.

FIG. 3C is a list of elementary streams multiplexed in the second sub-TS on a BD-ROM disc 101. The second sub-TS is multiplexed stream data in MPEG-2 TS format and is included in the second file DEP 243 shown in FIG. 2. As shown in FIG. 3C, the second sub-TS includes a primary video stream 321. The second sub-TS may additionally include depth map PG streams 323A and 323B, a depth map IG stream 324, and secondary video stream 326. The primary video stream 321 is a depth map stream and represents 3D video images in combination with the primary video stream 301 in the main. TS. When the 2D video images represented by the PG streams 323A and 323B in the main TS are used to project 3D video images on a virtual 2D screen, the depth map PG streams 323A and 323B are used as the PG streams representing a depth map for the 3D video images. When the 2D video images represented by the IG stream 304 in the main TS are used to project 3D video images on a virtual 2D screen, the depth map IG stream 324 is used as the IG stream representing a depth map for the 3D video images. The secondary video stream 326 is a depth map stream and represents 3D video images in combination with the secondary video stream 306 in the main TS.

PIDs are assigned to the elementary streams 321-326, for example, as follows. The primary video stream 321 is assigned a value of 0x1013. When up to 32 other elementary streams can be multiplexed by type in one sub-TS, the depth map PG streams 323A and 323B are assigned any value from 0x1260 to 0x127F. The depth map IG stream 324 is assigned any value from 0x1460 to 0x147F. The secondary video stream 326 is assigned any value from 0x1B40 to 0x1B5F.

Figure 4:
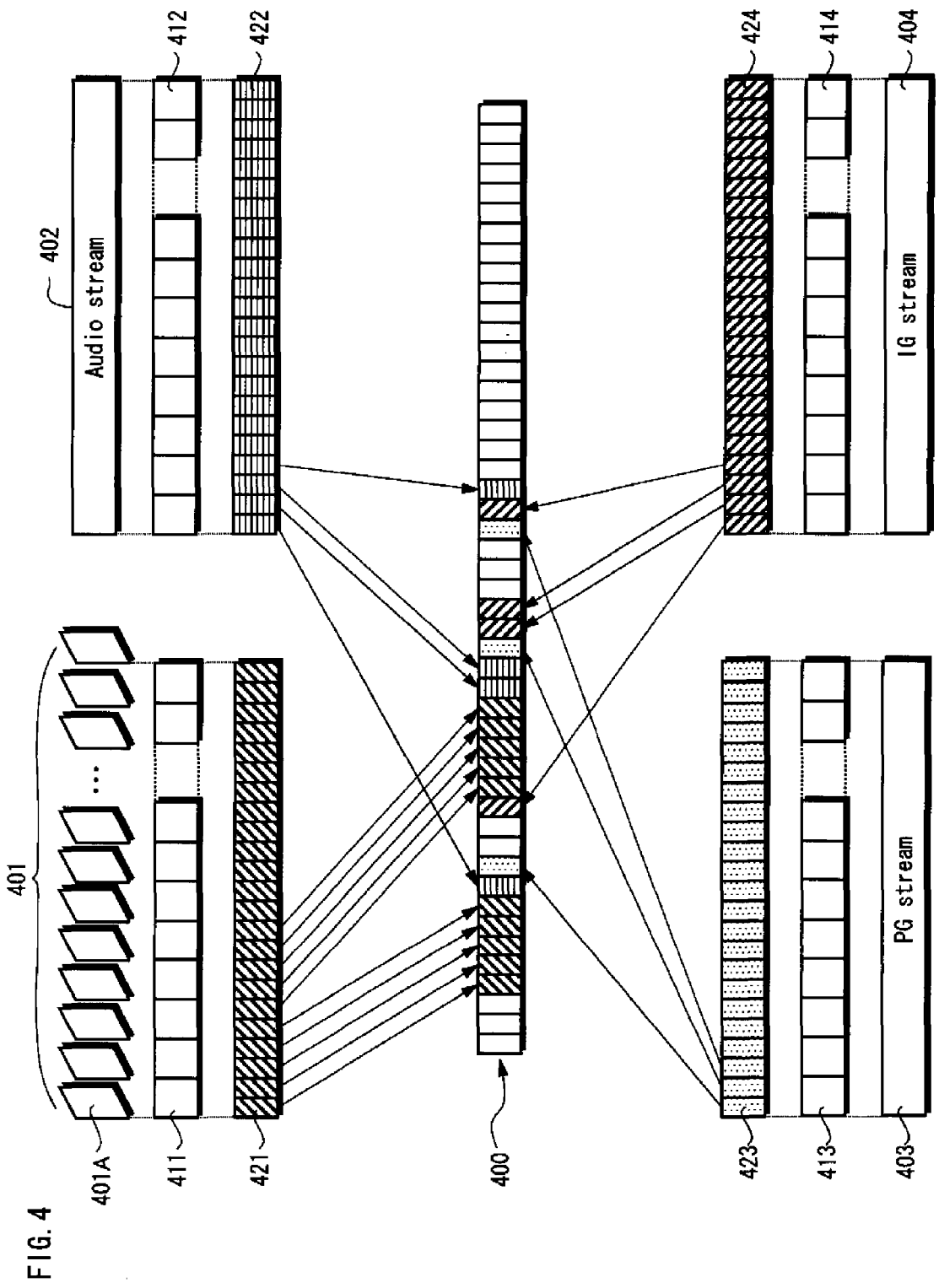
FIG. 4 is a schematic diagram showing the arrangement of TS packets belonging to each elementary stream shown in FIG. 3A.

FIG. 4 is a schematic diagram showing the arrangement of TS packets in the multiplexed stream data 400. The main TS and sub TS share this packet structure. In the multiplexed stream data 400, the elementary streams 401, 402, 403, and 404 are respectively converted into sequences of TS packets 421, 422, 423, and 424. For example, in the video stream 401, each frame 401A or each field is first converted into a packetized elementary stream (PES) packet 411. Next, each PES packet 411 is generally converted into a plurality of TS packets 421. Similarly, the audio stream 402, PG stream 403, and IG stream 404 are each first converted into a sequence of PES packets 412, 413, and 414, after which they are converted into TS packets 422, 423, and 424. Finally, the TS packets 421, 422, 423, and 424 obtained from the elementary streams 401, 402, 403, and 404 are time-multiplexed into one piece of stream data, i.e. the main TS 400.

Figure 5:
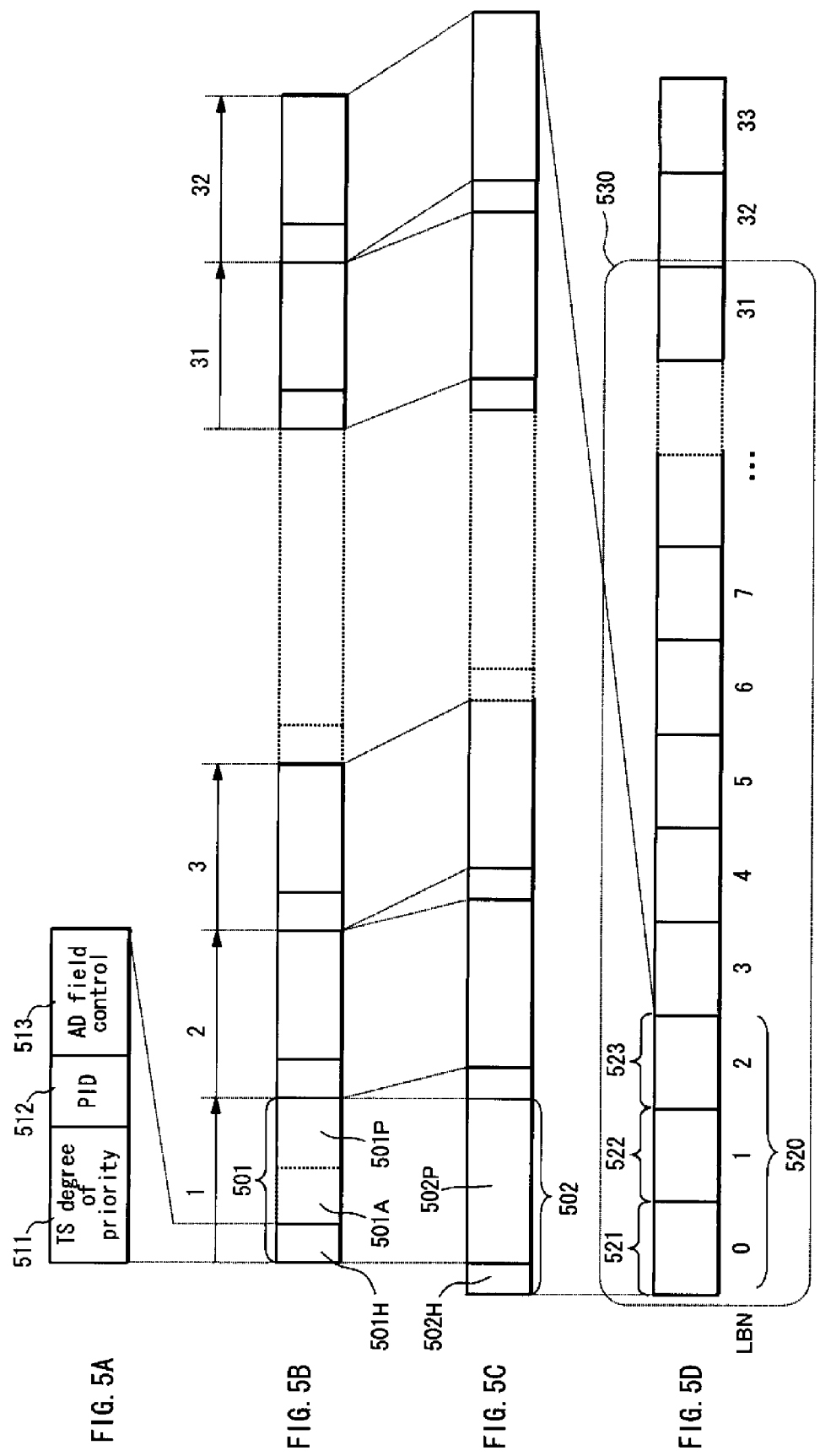
FIG. 5A is a schematic diagram showing the data structure of a header for each TS packet shown in FIG. 4.
FIG. 5B is a schematic diagram of a TS packet sequence.
FIG. 5C is a schematic diagram of a source packet sequence composed of the TS packet sequence.
FIG. 5D is a schematic diagram of a sector group, in which a sequence of source packets are consecutively recorded, in a volume area of a BD-ROM disc.

FIG. 5B is a schematic diagram of a TS packet sequence constituting multiplexed stream data. Each TS packet 501 is 188 bytes long. As shown in FIG. 5B, each TS packet 501 includes a TS header 501H and either, or both, a TS payload 501P and an adaptation field (hereinafter abbreviated as "AD field") 501A. The TS payload 501P and AD field 501A together constitute a 184 byte long data area. The TS payload 501P is used as a storage area for a PES packet. The PES packets 411-414 shown in FIG. 4 are typically divided into multiple parts, and each part is stored in a different TS payload 501P. The AD field 501A is an area for storing stuffing bytes (i.e. dummy data) when the amount of data in the TS payload 501P does not reach 184 bytes. Additionally, when the TS packet 501 is, for example, a program clock reference (PCR) as described below, the AD field 501A is used to store such information. The TS header 501H is a four-byte long data area.

FIG. 5A is a schematic diagram showing the data structure of a TS header 501H. As shown in FIG. 5A, the TS header 501H includes a TS degree of priority (transport_priority) 511, PID 512, and AD field control (adaptation_field_control) 513. The PID 512 indicates the PID for the elementary stream whose data is stored in the TS payload 501P of the TS packet 501 containing the PID 512. The TS degree of priority 511 indicates the degree of priority of the TS packet 501 among the TS packets that share the value indicated by the PID 512. The AD field control 513 indicates whether the TS packet 501 contains an AD field 501A and/or a TS payload 501P. For example, if the AD field control 513 indicates "1", then the TS packet 501 does not include an AD field 501A but includes a TS payload 501P. If the AD field control 513 indicates "2", then the reverse is true. If the AD field control 513 indicates "3", then the TS packet 501 includes both an AD field 501A and a TS payload 501P.

FIG. 5C is a schematic diagram showing the formation of a source packet sequence composed of the TS packet sequence for multiplexed stream data. As shown in FIG. 5C, each source packet 502 is 192 bytes long and includes one TS packet 501, shown in FIG. 5B, and a four-byte long header (TP_Extra_Header) 502H. When the TS packet 501 is recorded on the BD-ROM disc 101, a source packet 502 is constituted by attaching a header 502H to the TS packet 501. The header 502H includes an ATS (Arrival_Time_Stamp). The "ATS" is time information used as follows. When a source packet 502 is sent from the BD-ROM disc 101 to a system target decoder in the playback device 102, the TS packet 502P is extracted from the source packet 502 and transferred to a PID filter in the system target decoder. The ATS in the header 502H indicates the time at which this transfer is to begin. The "system target decoder" is a device that decodes multiplexed stream data one elementary stream at a time. Details regarding the system target decoder and its use of the ATS are provided below.

Figure 32:
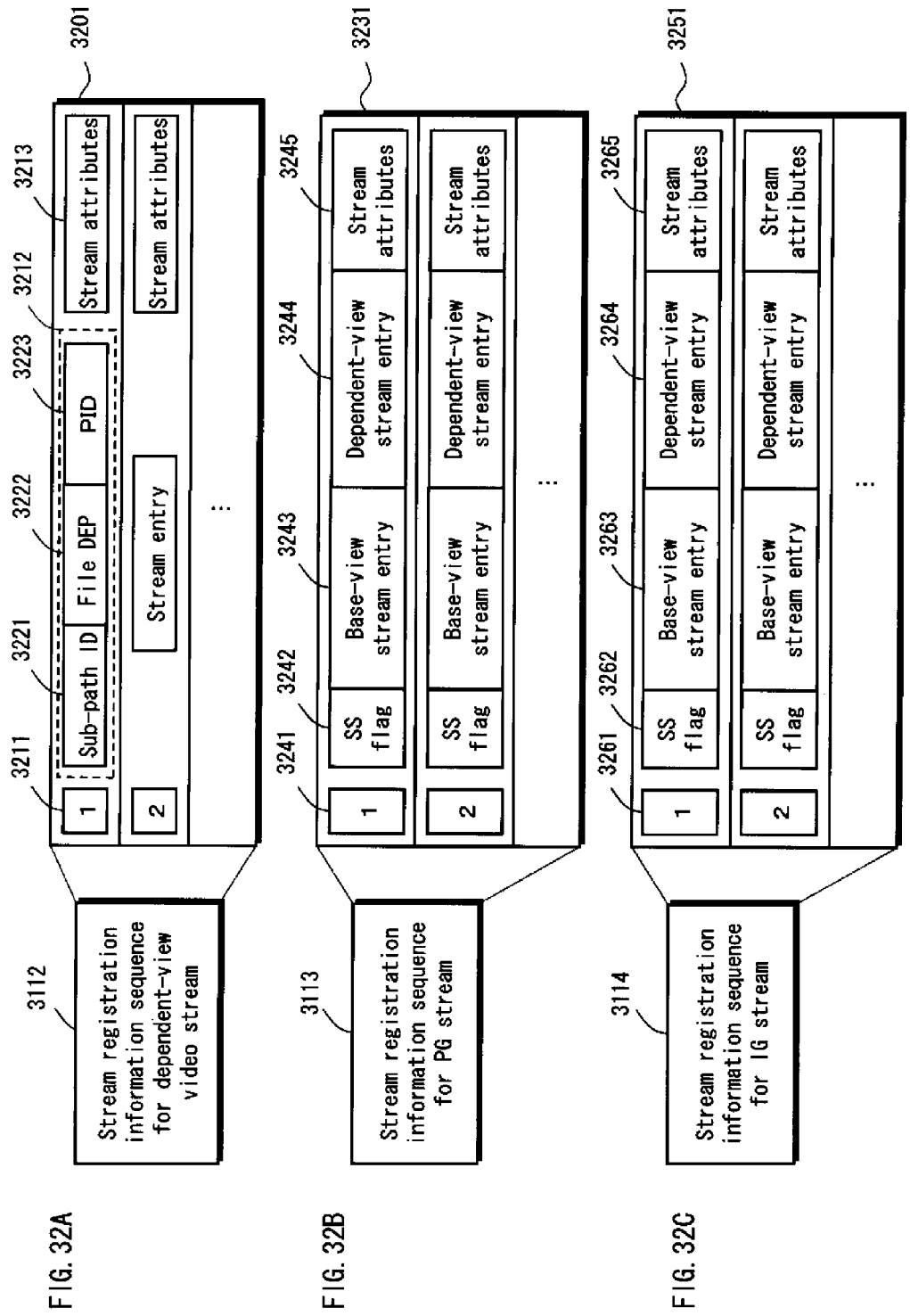
FIGS. 32A, 32B, and 32C are schematic diagrams respectively showing the data structures of a stream registration information sequence 3112 for dependent-view video streams, stream registration information sequence 3113 for PG streams, and stream registration information sequence 3114 for IG streams, which are shown in FIG. 31.

FIG. 5D is a schematic diagram of a sector group, in which a sequence of source packets 502 is consecutively recorded, in the volume area 202B of the BD-ROM disc 101. As shown in FIG. 5D, 32 source packets 502 are recorded at a time as a sequence in three consecutive sectors 521, 522, and 523. This is because the data amount for 32 source packets, i.e. 192 bytes×32=6144 bytes, is the same as the total size of three sectors, i.e. 2048 bytes×3=6144 bytes. 32 source packets 502 that are recorded in this way in three consecutive sectors 521, 522, and 523 are referred to as an "aligned unit" 520. The playback device 102 reads source packets 502 from the BD-ROM disc 101 by each aligned unit 520, i.e. 32 source packets at a time. Also, the sector group 511, 512, 513, . . . is divided into 32 pieces in order from the top, and each forms one error correction code block 530. The BD-ROM drive 121 performs error correction processing for each ECC block 530.

<<Data Structure of the Video Stream>>

Each of the pictures included in the video stream represents one frame or one field and are compressed by a video compression encoding method, such as MPEG-2, MPEG-4 AVC, etc. This compression uses the picture's spatial or temporal redundancy. Here, picture encoding that only uses the picture's spatial redundancy is referred to as "intra-picture encoding". On the other hand, picture encoding that uses the similarity between data for multiple pictures displayed sequentially is referred to as "inter-picture predictive encoding". In inter-picture predictive encoding, first, a picture earlier or later in presentation time is assigned to the picture to be encoded as a reference picture. Next, a motion vector is detected between the picture to be encoded and the reference picture, and then motion compensation is performed on the reference picture using the motion vector. Furthermore, the difference value between the picture obtained by motion compensation and the picture to be encoded is sought, and temporal redundancy is removed using the difference value. In this way, the amount of data for each picture is compressed.

Figure 6:
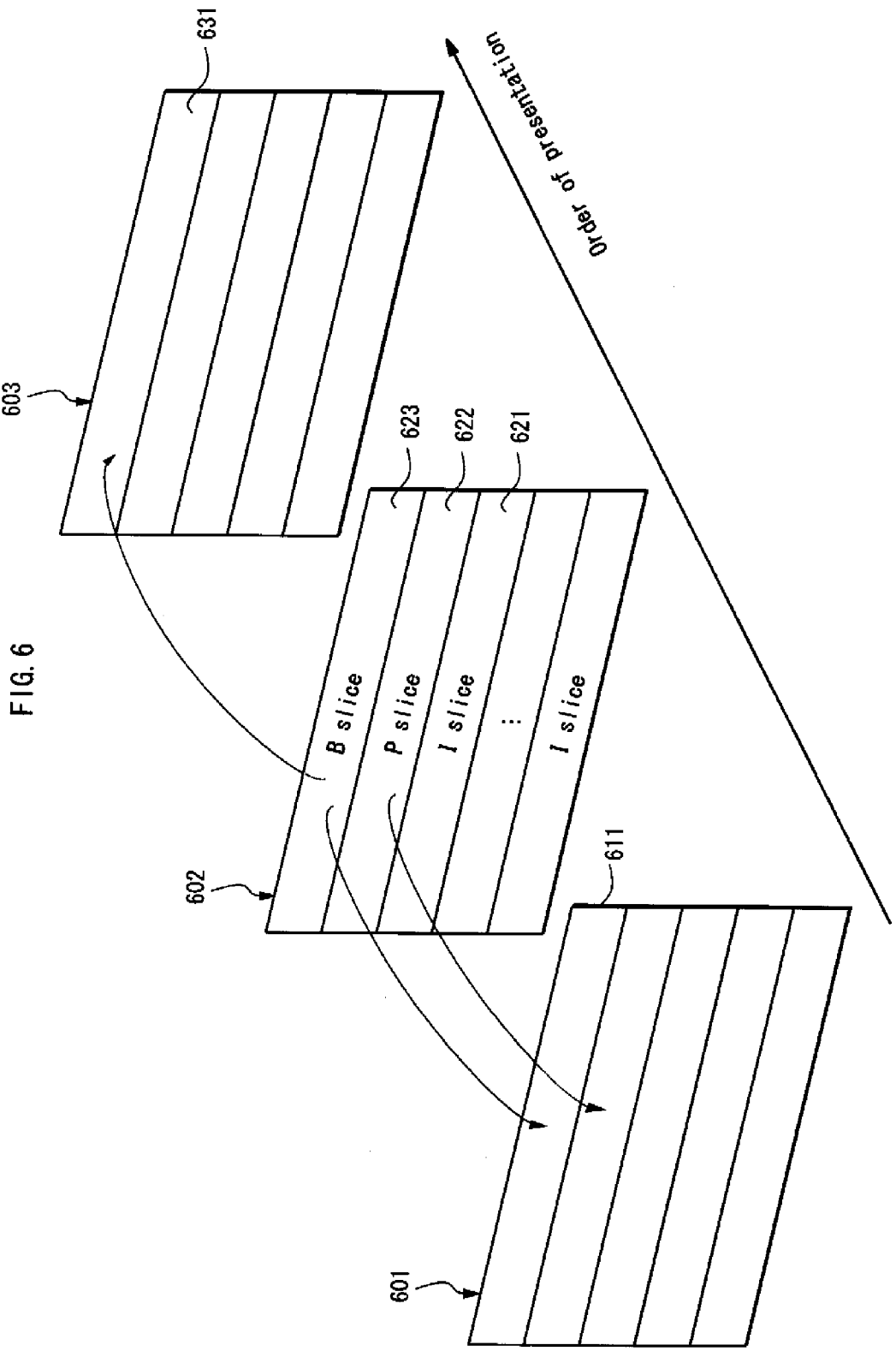
FIG. 6 is a schematic diagram showing, in order of presentation time, three pictures 601, 602, and 603 included in a video stream.

FIG. 6 is a schematic diagram showing, in order of presentation time, three pictures 601, 602, and 603 included in a video stream. As shown in FIG. 6, the pictures 601, 602, and 603 are typically divided into a plurality of slices 611, . . . , 621, 622, 623, . . . , 631, . . . . A "slice" is a band-shaped region formed by macroblocks that typically line up horizontally. A "macroblock" is a pixel matrix of a predetermined size, such as 16×16. While not shown in FIG. 6, one slice may be composed of two or more rows of macroblocks. In the above-mentioned encoding method, pictures are compressed one slice at a time. After compression, a slice is classified into one of three types: I slice, P slice, and B slice. An "I (Intra) slice" 621 refers to a slice compressed by intra-picture encoding. A "P (Predictive) slice" 622 refers to a slice compressed by inter-picture predictive encoding, having used as a reference picture one picture 601 that has an earlier presentation time. A "B (Bidirectionally Predictive) slice" 623 refers to a slice compressed by inter-picture predictive encoding, having used two pictures 601, 603 that have an earlier or later presentation time. In FIG. 6, the pictures to which a P slice 622 and a B slice 623 refer are indicated by arrows. In MPEG-4 AVC, as shown in FIG. 6, one picture 602 may include different types of slices. In MPEG-2, however, one picture only includes slices of the same type.

For the sake of convenience, in the following explanation it is assumed that one picture only includes slices of the same type, regardless of the encoding method. In this case, after compression a picture is classified into one of three types, in accordance with the type of the slice: I picture, P picture, and B picture. Furthermore, B pictures that are used as a reference picture for other pictures in inter-picture predictive encoding are particularly referred to as "Br (reference B) pictures".

Figure 7:
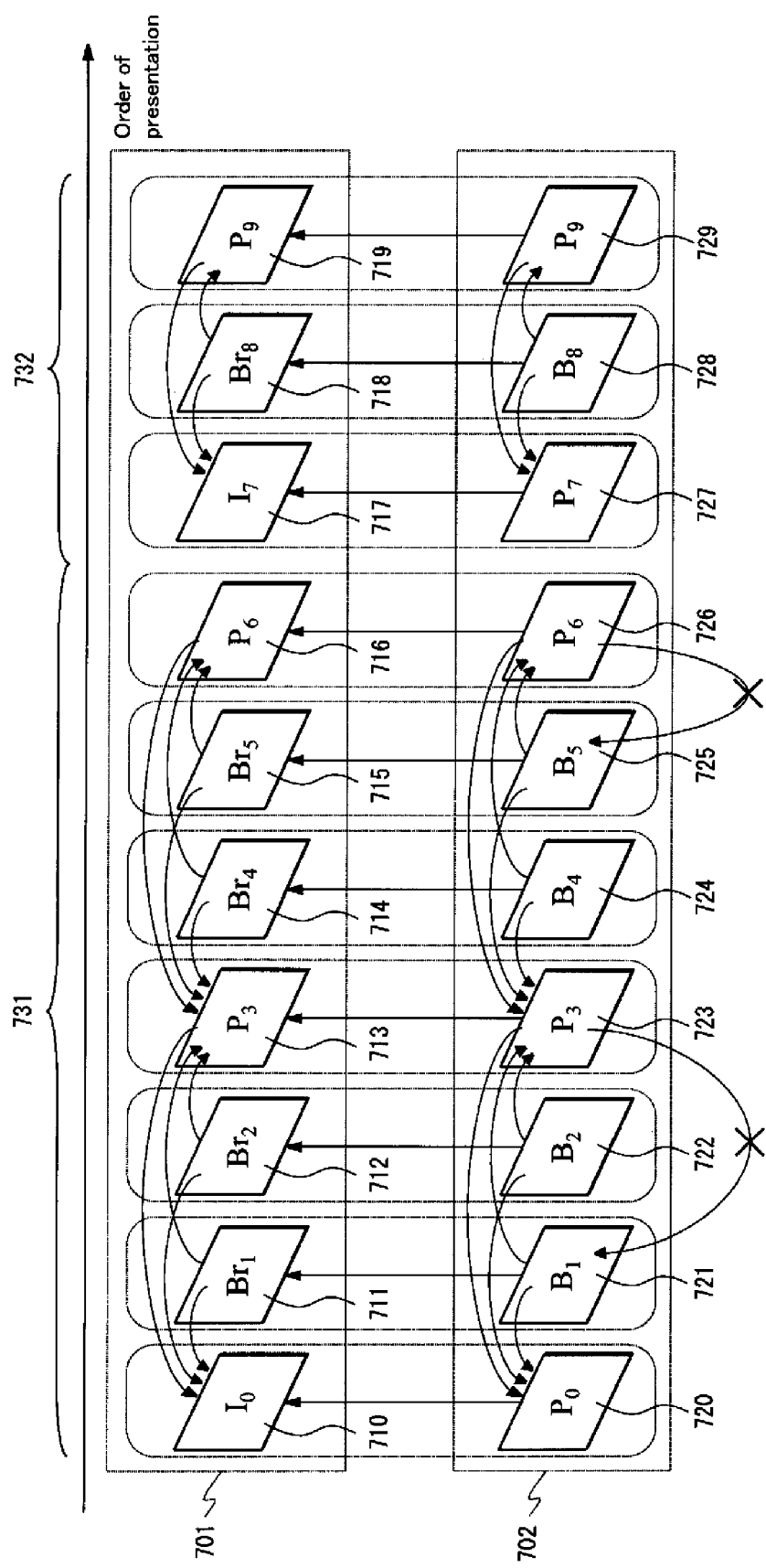
FIG. 7 is a schematic diagram showing the picture groups respectively included in the base-view video stream shown in FIG. 3A and in the right-view video stream shown in FIG. 3B in order of presentation time.

FIG. 7 is a schematic diagram showing the pictures for a base-view video stream 701 and a right-view video stream 702 in order of presentation time. As shown in FIG. 7, the base-view video stream 701 includes pictures 710, 711, 712, . . . , 719 (hereinafter "base-view pictures"), and the right-view video stream 702 includes pictures 720, 721, 722, . . . , 729 (hereinafter "right-view pictures"). Each of the pictures 710-719 and 720-729 represents one frame or field and is compressed by a video Compression encoding method, such as MPEG-2, MPEG-4 AVC, etc.

As shown in FIG. 7, the base-view pictures 710-719 are typically divided into a plurality of GOPs 731 and 732. A "GOP" refers to a sequence of pictures having an I picture at the top of the sequence. The pictures in the GOPs 731 and 732 are compressed in the following order. In the first GOP 731, the top picture is compressed as $I_0$ picture 710. The subscripted number indicates the sequential number allotted to each picture in the order of presentation time. Next, the fourth picture is compressed as $P_3$ picture 713 using $I_0$ picture 710 as a reference picture. The arrows shown in FIG. 7 indicate that the picture at the head of the arrow is a reference picture for the picture at the tail of the arrow. Next, the second and third pictures are respectively compressed as $Br_1$ picture 711 and $Br_2$ picture 712, using both $I_0$ picture 710 and $P_3$ picture 713 as reference pictures. Furthermore, the seventh picture is compressed as $P_6$ picture 716 using $P_3$ picture 713 as a reference Picture. Next, the fourth and fifth pictures are respectively compressed as $Br_4$ picture 714 and $Br_5$ picture 715, using both $P_3$ picture 713 and $P_6$ picture 716 as reference pictures. Similarly, in the second GOP 732, the top picture is first compressed as $I_7$ picture 717. Next, the third picture is compressed as $P_9$ picture 719 using $I_7$ picture 717 as a reference picture. Subsequently, the second picture is compressed as $Br_8$ picture 718 using both $I_7$ picture 717 and $P_9$ picture 719 as reference pictures.

In the base-view video stream 701, each GOP 731 and 732 always contains an I picture at the top, and thus pictures can be decoded GOP by GOP. For example, in the first GOP 731, the $I_0$ picture 710 is first decoded independently. Next, the $P_3$ picture 713 is decoded using the decoded $I_0$ picture 710. Then the $Br_1$ picture 711 and $Br_2$ picture 712 are decoded using both the decoded $I_0$ picture 710 and $P_3$ picture 713. The subsequent picture group 714, 715, ... is similarly decoded. In this way, the base-view video stream 701 can be decoded independently and furthermore can be randomly accessed in units of GOPs.

As further shown in FIG. 7, the pictures 720-729 are compressed by inter-picture encoding. However, the encoding method differs from the encoding method for the pictures 710-719, since in addition to redundancy in the temporal direction of video images, redundancy between the left and right video images is also used. In particular, as shown by the arrows in FIG. 7, the base-view picture having the same presentation time as each right-view picture is selected as a reference picture for that right-view picture. These pictures represent a right-view and a left-view for the same 3D video image, i.e. a parallax video image. On the other hand, when the base-view picture is either an I picture or a P picture, a B picture is not selected as a reference picture during compression of the corresponding right-view picture.

Specifically, the top right-view picture is compressed as $P_0$ picture 720 using $I_0$ picture 710 in the base-view video stream 701 as a reference picture. These pictures 710 and 720 represent the left-view and right-view of the top frame in the 3D video images. Next, the fourth right-view picture is compressed as $P_3$ picture 723 using $P_3$ picture 713 in the base-view video stream 701 and $P_0$ picture 720 as reference pictures. In this case, the base-view picture corresponding to $P_3$ picture 723 is $P_3$ picture 713. Accordingly, during compression of $P_3$ picture 723, a B picture is not selected as a reference picture. For example, as shown by the cross in FIG. 7, $B_1$ picture 721 is prohibited from being selected as a reference picture. Next, the second picture is compressed as $B_1$ picture 721, using $Br_1$ picture 711 in the base-view video stream 701 in addition to $P_0$ picture 720 and $P_3$ picture 723 as reference pictures. Similarly, the third picture is compressed as $B_2$ picture 722, using $Br_2$ picture 712 in the base-view video stream 701 in addition to $P_0$ picture 720 and $P_3$ picture 723 as reference pictures. Similarly, for subsequent pictures 724-729, the pictures for which the presentation time is substantially equal are used as reference pictures. In particular, since $P_6$ picture 726, $P_7$ picture 727, and $P_9$ picture 729 respectively correspond to $P_6$ picture 716, $P_7$ picture 717, and $P_9$ picture 719 in the base-view video stream 701, a B picture is not selected as a reference picture during compression of each of these pictures. For example, during compression of $P_6$ picture 726, as shown by the cross in FIG. 7, $B_5$ picture 725 is prohibited from being selected as a reference picture.

The revised standards for MPEG-4 AVC/H.264, called multiview video coding (MVC), are known as a video compression encoding method that makes use of correlation between left and right video images as described previously. MVC was created in July of 2008 by the joint video team (JVT), a joint project between ISO/IEC MPEG and ITU-T VCEG, and is a standard for collectively encoding video that can be seen from a plurality of perspectives. With MVC, not only is temporal similarity in video images used for inter-video predictive encoding, but so is similarity between video images from differing perspectives. This type of predictive encoding has a higher video compression ratio than predictive encoding that individually compresses data of video images seen from each perspective.

As described previously, right-view pictures 720-729 and base-view pictures 710-719 are in one-to-one correspondence in presentation order, and during compression of a right-view picture, the corresponding base-view picture is used as one of the reference pictures. Therefore, unlike the base-view video stream 701, the right-view video stream 702 cannot be decoded independently. On the other hand, however, the difference between parallax images is generally very small, that is, the correlation between the left-view and the right-view is high. Accordingly, the right-view pictures 720-729 generally have a significantly higher compression rate than the base-view pictures 710-719, meaning that the amount of data is significantly smaller.

Furthermore, when a base-view picture is either an I picture or a P picture, the corresponding right-view picture is encoded without using a B picture as a reference picture. As a result, when an I picture or P picture is selectively decoded from the base-view video stream, a 3D video image can be played back as long as the corresponding picture is decoded from the right-view video stream. Accordingly, during trick-play of 3D video images, the burden on the 3D playback device of decoding the video stream can be further reduced.

Figure 8:
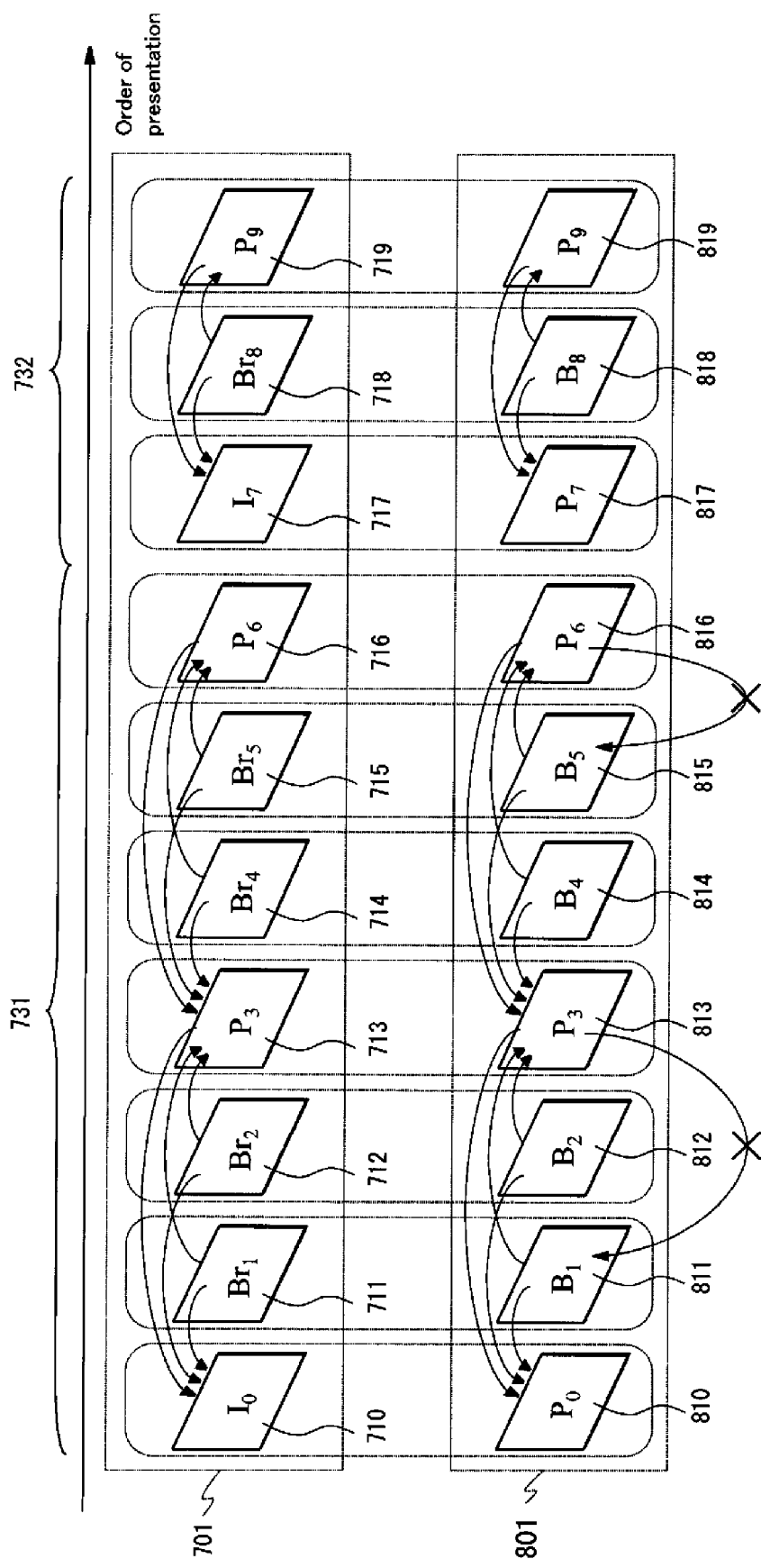
FIG. 8 is a schematic diagram showing the picture groups respectively included in the base-view video stream shown in FIG. 3A and in the depth map stream shown in FIG. 3C in order of presentation time.

FIG. 8 is a schematic diagram showing the pictures in the base-view video stream 701 and in the depth map stream 801 in order of presentation time. As shown in FIG. 8, the base-view video stream 701 is the same as the one shown in FIG. 7. Accordingly, a detailed description thereof can be found in the description of FIG. 7. On the other hand, the depth map stream 801 includes depth maps 810, 811, 812, . . . , 819. The depth maps 810-819 are in one-to-one correspondence with the base-view pictures 710-719 and represent a depth map for the 2D video image for one frame or field shown by each picture.

The depth maps 810-819 are compressed by a video compression encoding method, such as MPEG-2, MPEG-4 AVC, etc., in the same way as the base-view pictures 710-719. In particular, inter-picture encoding is used in this encoding method. In other words, each picture is compressed using another depth map as a reference picture. Furthermore, when a base-view picture is either an I picture or a P picture, a B picture is not selected as a reference picture during compression of the depth map corresponding to the base-view picture.

As shown in FIG. 8, first the top of the depth map group corresponding to the first GOP 731 is compressed as $I_0$ picture 810. The subscripted number indicates the sequential number allotted to each picture in the order of presentation time. Next, the fourth depth map is compressed as $P_3$ picture 813 using $I_0$ picture 810 as a reference picture. The arrows shown in FIG. 8 indicate that the picture at the head of the arrow is a reference picture for the picture at the tail of the arrow. In this case, the base-view picture corresponding to $P_3$ picture 813 is $P_3$ picture 713. Accordingly, during compression of $P_3$ picture 813, a B picture is not selected as a reference picture. For example, as shown by the cross in FIG. 8, $B_1$ picture 811 is prohibited from being selected as a reference picture. Next, the second and third depth maps are respectively compressed as $B_1$ picture 811 and $B_2$ picture 812, using both $I_0$ picture 810 and $P_3$ picture 813 as reference pictures. Furthermore, the seventh depth map is compressed as $P_6$ picture 816 using $P_3$ picture 813 as a reference picture. In this case, the base-view picture corresponding to $P_6$ picture 816 is $P_6$ picture 716. Accordingly, during compression of $P_6$ picture 816, a B picture is not selected as a reference picture. For example, as shown by the cross in FIG. 8, $B_5$ picture 815 is prohibited from being selected as a reference picture. Next, the fourth and fifth depth maps are respectively compressed as $B_4$ picture 814 and $B_5$ picture 815, using both $P_3$ picture 813 and $P_6$ picture 816 as reference pictures. Similarly, in the depth map group corresponding to the second GOP 832, the top depth map is first compressed as $I_7$ picture 817. Next, the third depth map is compressed as $P_9$ picture 819 using $I_7$ picture 817 as a reference picture. In this case, since $I_7$ picture 817 and $P_9$ picture 819 respectively correspond to $I_7$ picture 717 and $P_9$ picture 719 in the base-view video stream 701, a B picture is not selected as a reference picture during compression of either of these pictures. Subsequently, the second depth map is compressed as $B_8$ picture 818 using $I_7$ picture 817 and $P_9$ picture 819 as reference pictures.

The depth map stream 801 is divided into units of GOPs in the same way as the base-view video stream 701, and each GOP always contains an I picture at the top. Accordingly, depth maps can be decoded GOP by GOP. For example, the $I_0$ picture 810 is first decoded independently. Next, the $P_3$ picture 813 is decoded using the decoded $I_0$ picture 810. Then, the $B_1$ picture 811 and $B_2$ picture 812 are decoded using both the decoded $I_0$ picture 810 and $P_3$ picture 813. The subsequent picture group 614, 815, . . . is similarly decoded. However, since a depth map itself is only information representing the depth of each part of a 2D video image pixel by pixel, the depth map stream 801 cannot be used independently for playback of video images.

Furthermore, when a base-view picture is either an I picture or a P picture, the corresponding depth map is encoded without using a B picture as a reference picture. As a result, when an I picture or P picture is selectively decoded from the base-view video stream, a 3D video image can be played back as long as the corresponding depth map is decoded from the depth map stream. Accordingly, during trickplay of 3D video images, the burden on the 3D playback device of decoding the video stream can be further reduced.

The same encoding method is used for compression of the right-view video stream 702 and the depth map stream 801. For example, if the right-view video stream 702 is encoded in MVC format, the depth map stream 801 is also encoded in MVC format. In this case, during playback of 3D video images, the playback device 102 can smoothly switch between L/R mode and depth mode, while maintaining a constant encoding method.

Figure 9:
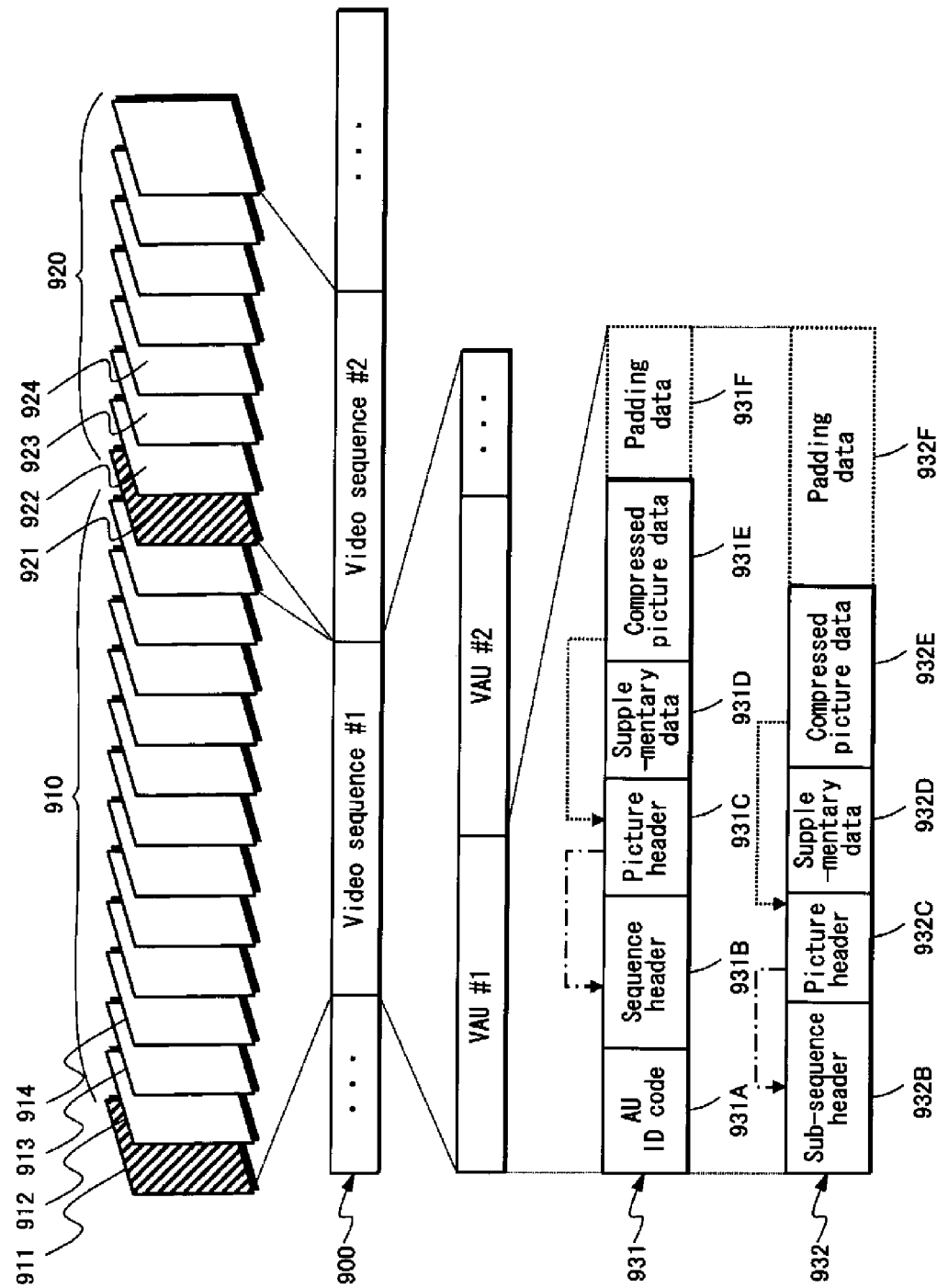
FIG. 9 is a schematic diagram showing the data structure of the top section of a video sequence included in a video stream.
Figure 10:
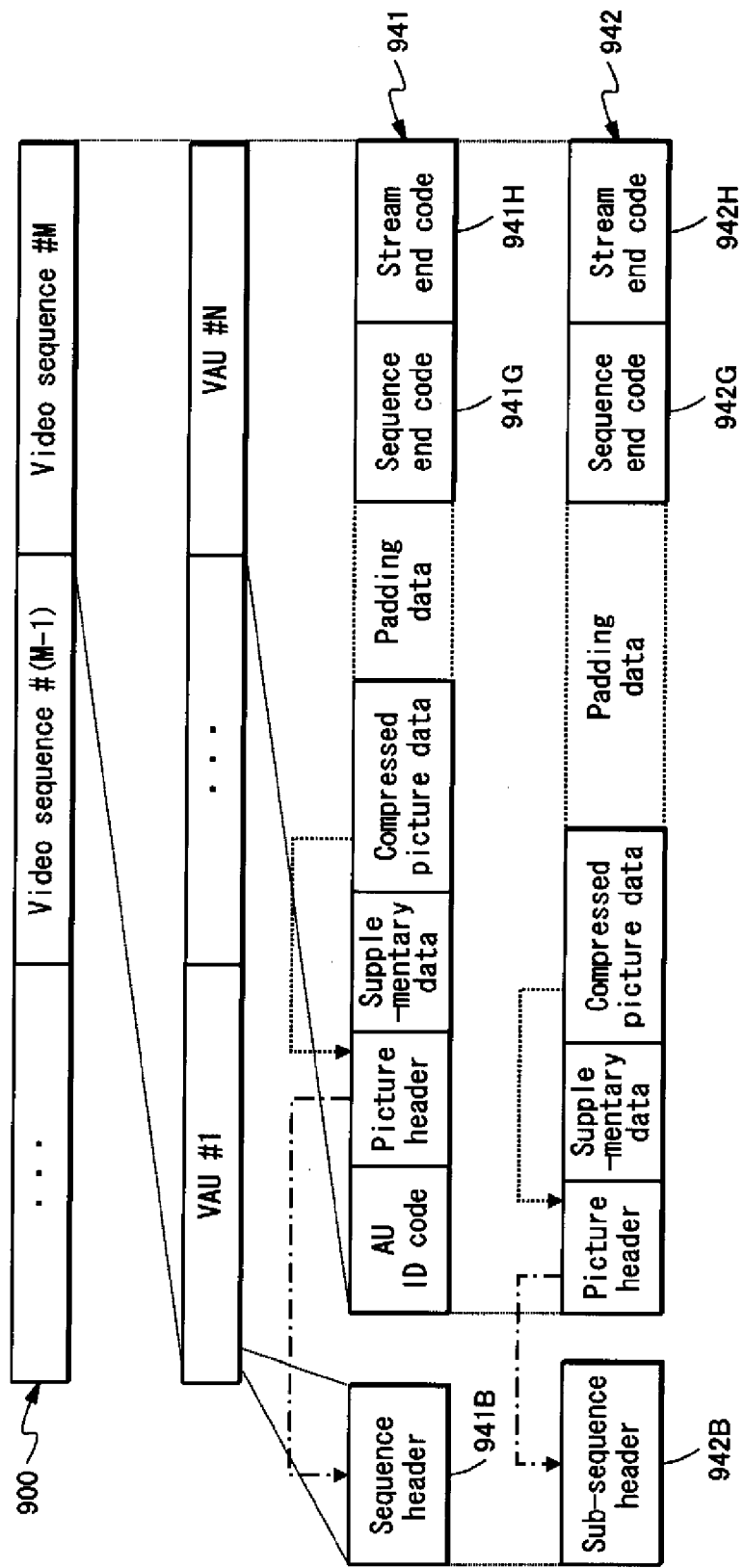
FIG. 10 is a schematic diagram showing the data structure of the end section of the video sequence shown in FIG. 9.

FIGS. 9 and 10 are schematic diagrams showing details on the data structure of a video stream 900. As shown in FIGS. 9 and 10, the video stream 900 is typically composed of a series of video sequences #1, #2, . . . , #M (an integer M is one or more). As shown in FIG. 9, a "video sequence" is a combination of pictures 911, 912, 913, 914, . . . that constitute a single GOP 910 and to which additional information, such as a header, has been individually attached. The combination of this additional information and a picture is referred to as a "video access unit (VAU)". That is, in each video sequence #1, #2, . . . , #M, a single VAU is formed for each picture. Each picture can be read from the video stream 900 in units of VAUs. The base-view video stream and dependent-view video stream substantially share this VAU structure.

As further shown in FIG. 9, the structure of the VAU #1 located at the top of each video sequence differs between the base-view video stream and the dependent-view video stream.

The VAU #1 931 includes an access unit (AU) identification code 931A, sequence header 931B, picture header 931C, supplementary data 931D, and compressed picture data 931E. The AU identification code 931A is a predetermined code indicating the top of the VAU #1 931. The sequence header 931B, also called a GOP header, includes an identification number for the video sequence #1 which includes the VAU #1 931. The sequence header 931B further includes information shared by the whole GOP 910, e.g. resolution, frame rate, aspect ratio, and bit rate. The picture header 931C indicates its own identification number, the identification number for the video sequence #1, and information necessary for decoding the picture, such as the type of encoding method. The supplementary data 931D includes additional information regarding matters other than the decoding of the picture, for example closed caption text information, information on the GOP structure, and time code information. In particular, the supplementary data 931D includes decode switch information, described below. The compressed picture data 931E includes a base-view picture 911 at the top of a GOP 910, i.e. an I picture. A header is provided in the compressed picture data 931E for each slice in the I picture 911. Hereinafter, this header is referred to as a "slice header". All of the slice headers include the identification number of the picture header 931C. As shown by the arrow on the dashed line in FIG. 9, by referring to a picture header 931C with the same identification number, the information necessary to decode each slice can be retrieved from the picture header 931C. Furthermore, it is clear that each slice belongs to the video sequence #1 from the identification number of the video sequence #1 shown by the picture header 931C. Also, as shown by the arrow on the alternating long and short dashed line in FIG. 9, by referring to a sequence header 931B using the identification number for the video sequence #1, the resolution, frame rate, aspect ratio, and bit rate for each slice can be retrieved from the sequence header 931B. Additionally, the VAU #1 931 may include padding data 931F as necessary. Padding data 931F is dummy data. By adjusting the size of this padding data 931F in conjunction with the size of the compressed picture data 931E, the bit rate of the VAU #1 931 can be maintained at a predetermined value.

The VAU #1 932 includes a sub-sequence header 932B, picture header 932C, supplementary data 932D, and compressed picture data 932E. The sub-sequence header 932B includes the identification number for the video sequence #1 which includes the VAU #1 932. The sub-sequence header 932B further includes information shared by the whole GOP 910, e.g. resolution, frame rate, aspect ratio, and bit rate. In particular, these values are set to match the values set to the corresponding GOP in the base-view video stream. In other words, these values equal the values shown by the sequence header 931B in the VAU #1 931. The picture header 932C indicates its own identification number, the identification number for the video sequence #1, and information necessary for decoding the picture, such as the type of encoding method. The supplementary data 932D includes additional information regarding matters other than the decoding of the picture, for example closed caption text information, information on the GOP structure, and time code information. In particular, the supplementary data 932D includes decode switch information, described below. The compressed picture data 932E includes a dependent-view picture 911 at the top of a GOP 910, i.e. a P picture or an I picture. A slice header is provided in the compressed picture data 932E for each slice in the dependent-view picture 911. All of the slice headers include the identification number of the picture header 932C. As shown by arrow on the dashed line in FIG. 9, by referring to the picture header 932C with the same identification number, the information necessary to decode each slice can be retrieved from the picture header 932C. Furthermore, it is clear that each slice belongs to the video sequence #1 from the identification number of the video sequence #1 shown by the picture header 932C. Also, as shown by arrow on the alternating long and short dashed line in FIG. 9, by referring to a sequence header 932B using the identification number for the video sequence #1, the resolution, frame rate, aspect ratio, and bit rate for each slice can be retrieved from the sequence header 932B. Additionally, the VAU #1 932 may include padding data 932F as necessary. Padding data 932F is dummy data. By adjusting the size of this padding data 932F in conjunction with the size of the compressed picture data 932E, the bit rate of the VAU #1 932 can be maintained at a predetermined value.

As further shown in FIG. 10, the structures of the second and subsequent VAU #N (N=2, 3, . . . ) included in each video sequence differ between the base-view video stream and dependent-view video stream.

The VAU #N 941 in the base-view video stream differs from the VAU #1 931 shown in FIG. 9 as follows. First, the VAU #N 941 does not include a sequence header. In this case, the picture header 941C indicates the same identification number for the video sequence as the value shown by the sequence header 941B in VAU #1 located at the top of the video sequence #M that includes the VAU #N 941. That is, the picture header 941C indicates the identification number for the video sequence #M. Accordingly, as shown by the arrow on the alternating long and short dashed line in FIG. 10, by referring to a sequence header 941B using the identification number for the video sequence #M, the resolution, frame rate, aspect ratio, and bit rate for each slice can be retrieved from the sequence header 941B. The VAU #1 941 may further include a sequence end code 941G. The sequence end code 941G indicates that the VAU #N 941 is located at the end of the video sequence #M. The sequence end code 941G may additionally indicate that the VAU #N 941 is located at a boundary of a continuous playback area in the video stream 900 (see modification [I] for details). The VAU #N 941 may also include a stream end code 941H in addition to the sequence end code 941G. The stream end code 941H indicates the end of the video stream 900.

The VAU #N 942 in the dependent-view video stream differs from the VAU #1 932 shown in FIG. 9 as follows. First, the VAU #N 942 does not include a sequence header. In this case, the picture header 942C indicates the same identification number for the video sequence as the value shown by the sequence header 942B in VAU #1 located at the top of the video sequence #M that includes the VAU #N 942. That is, the picture header 942C indicates the identification number for the video sequence #M. Accordingly, as shown by the arrow on the alternating long and short dashed line in FIG. 10, by referring to a sequence header 942B using the identification number for the video sequence #M, the resolution, frame rate, aspect ratio, and bit rate for each slice can be retrieved from the sequence header 942B. The VAU #1 942 may further include a sequence end code 942G. The sequence end code 942G indicates that the VAU #N 942 is located at the end of the video sequence #M. The sequence end code 942G may additionally indicate that the VAU #N 942 is located at a boundary of a continuous playback area in the video stream 900 (see modification [I] for details). The VAU #N 942 may also include a stream end code 942H in addition to the sequence end code 942G. The stream end code 942H indicates the end of the video stream 900.

The specific content of each component in a VAU differs according to the encoding method of the video stream 900. For example, when the encoding method is MPEG-4 AVC, the components in the VAUs shown in FIGS. 9 and 10 are composed of a single network abstraction layer (NAL) unit. Specifically, the AU identification code 931A, sequence header 931B, picture header 931C, supplementary data 931D, compression picture data 931E, padding data 931F, sequence end code 941G, and stream end code 941H respectively correspond to an access unit delimiter (AU delimiter), sequence parameter set (SPS), picture parameter set (PPS), supplemental enhancement information (SEI), slice data, filler data, end of sequence, and end of stream.

Figure 11:
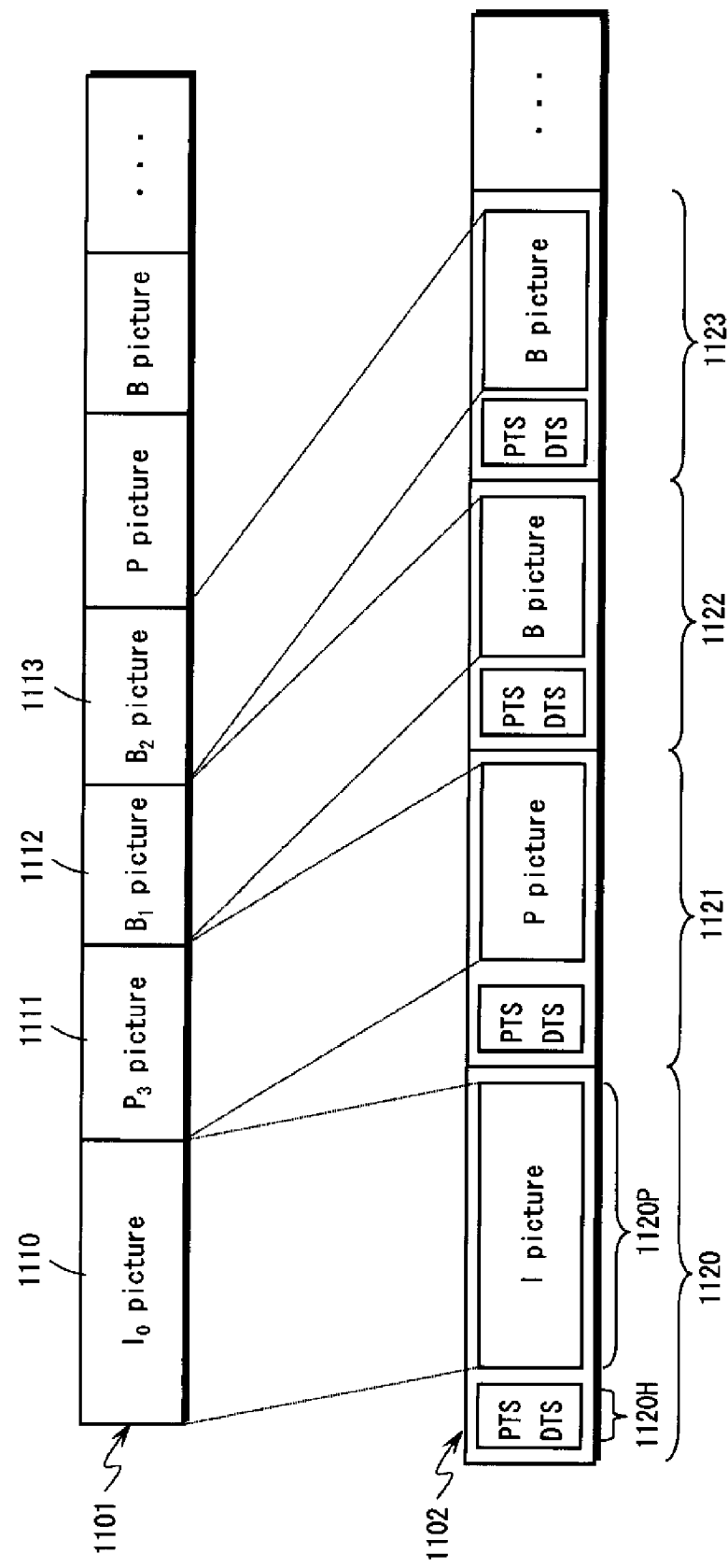
FIG. 11 is a schematic diagram showing the method for storing a video stream 1101 into a PES packet sequence 1102.

FIG. 11 is a schematic diagram showing details on the method for storing the video stream 1101 into a PES packet sequence 1102. The video stream 1101 may be either a base-view video stream or a dependent-view video stream. As shown in FIG. 11, in the actual video stream 1101, pictures are multiplexed in the order of encoding, not in the order of presentation time. In other words, as shown in FIG. 11, in each VAU comprising the video stream 1101, $I_0$ picture 1110, $P_3$ picture 1111, B1 picture 1112, $B_2$ picture 1113, . . . are stored in order from the top. The subscripted number indicates the sequential number allotted to each picture in the order of presentation time. $I_0$ picture 1110 is used as a reference picture for encoding $P_3$ picture 1111, and both $I_0$ picture 1110 and $P_3$ picture 1111 are used as reference pictures for encoding $B_1$ picture 1112 and $B_2$ picture 1113. Each of these VAUs is stored as a different PES packet 1120, 1121, 1122, 1123, . . . , and each PES packet 1120, . . . includes a PES payload 1120P and a PES header 1120H. VAUs are stored in a PES payload 1120P. PES headers 1120H include a presentation time, (presentation time-stamp, or PTS), and a decoding time (decoding time-stamp, or DTS), for the picture stored in the PES payload 1120P in the same PES packet 1120.

As with the video stream 1101 shown in FIG. 11, the other elementary streams shown in FIGS. 3 and 4 are stored in PES payloads in a sequence of PES packets. Furthermore, the PES header in each PES packet includes the PTS for the data stored in the PES payload for the PES packet.

Figure 12:
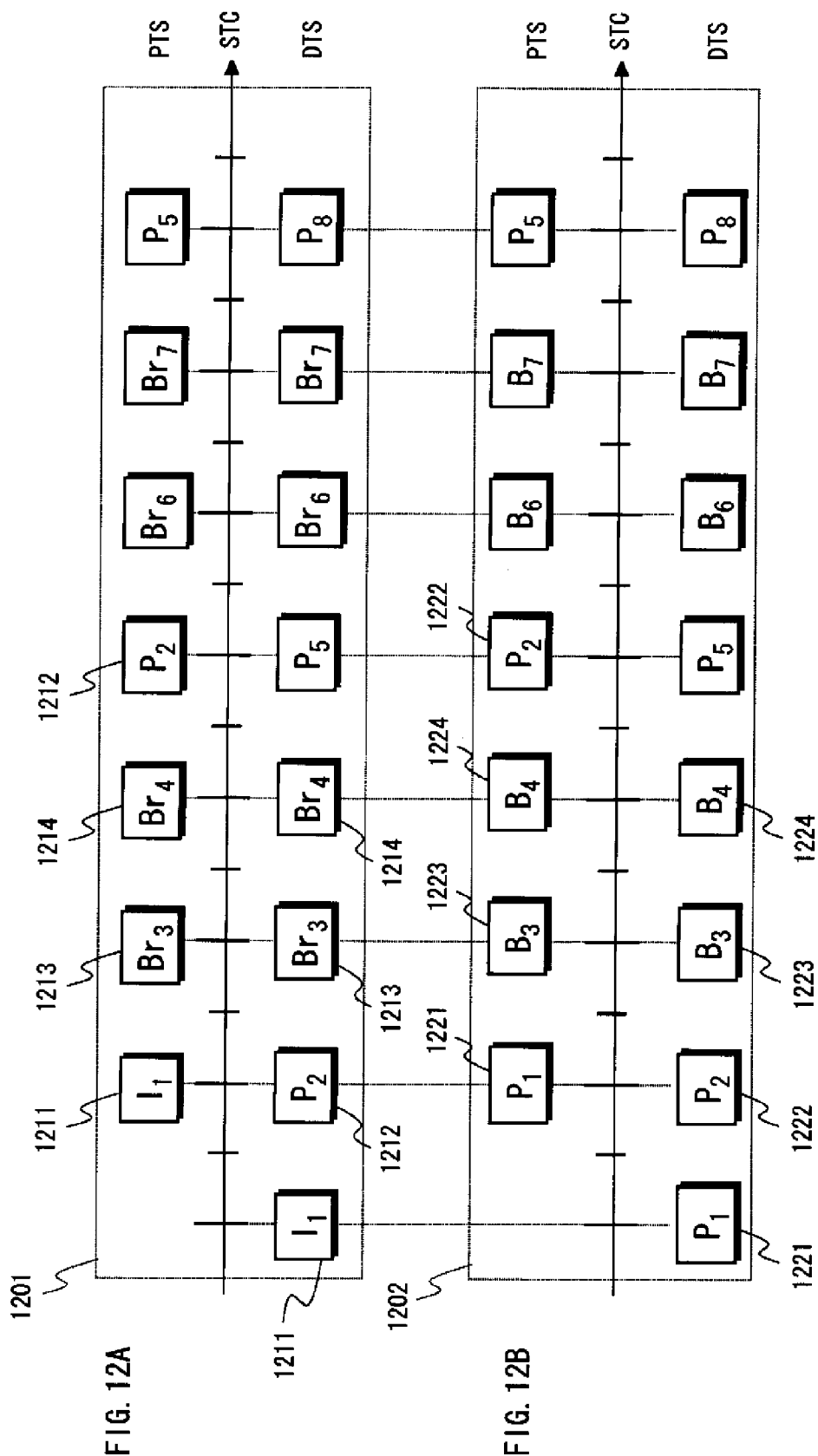
FIG. 12A is a schematic diagram showing the relationship between the PTSs and DTSs assigned to each picture in a base-view video stream 1201.
FIG. 12B is a schematic diagram showing the relationship between the PTSs and DTSs assigned to each picture in a dependent-view video stream 1202.

FIGS. 12A and 12B are schematic diagrams showing the relationship between the PTS and DTS assigned to each picture in the base-view video stream 1201 and in the dependent-view video stream 1202. As shown in FIG. 12, between the video streams 1201 and 1202, the same PTSs and DTSs are assigned to a pair of pictures representing the same frame or field in a 3D video image. For example, the top frame or field in the 3D video image is rendered from a combination of $I_1$ picture 1211 in the base-view video stream 1201 and $P_1$ picture 1221 in the dependent-view video stream 1202. Accordingly, the PTS and DTS for these two pictures 1211 and 1221 are the same. The subscripted numbers indicate the sequential number allotted to each picture in the order of DTSs. Also, when the dependent-view video stream 1202 is a depth map stream, $P_1$ picture 1221 is replaced by an I picture representing a depth map for the picture 1211. Similarly, the PTS and DTS for the pair of second pictures in the video streams 1201 and 1202, i.e. $P_2$ pictures 1212 and 1222, are the same. The PTS and DTS are both the same for the pair of third pictures in the video streams 1201 and 1202, i.e. $Br_3$ picture 1213 and $B_3$ picture 1223. The same is also true for the pair $Br_4$ picture 1214 and $B_4$ picture 1224.

A pair of VAUs that include pictures for which the PTS and DTS are the same between the base-view video stream 1201 and the dependent-view video stream 1202 is called a "3D VAU". A "3D VAU" may simply be referred to as an "access unit", and the above-described VAU may be referred to as a "view component". Using the allocation of PTSs and DTSs shown in FIG. 12, it is easy to cause the decoder in the playback device 102 in 3D mode to process the base-view video stream 1201 and the dependent-view video stream 1202 in parallel in units of 3D VAUs. In this way, the decoder definitely processes a pair of pictures representing the same frame or field in a 3D video image in parallel. Furthermore, the sequence header in the 3D VAU at the top of each GOP includes the same resolution, the same frame rate, and the same aspect ratio. In particular, this frame rate is equal to the value when the base-view video stream 1201 is decoded independently in 2D playback mode.

Figure 13:
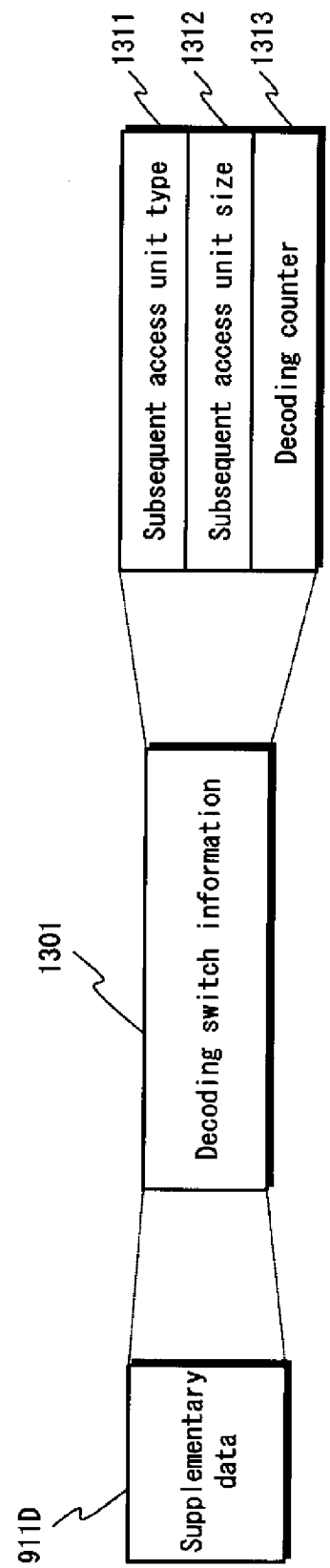
FIG. 13 is a schematic diagram showing the data structure of supplementary data 931D shown in FIG. 9.

FIG. 13 is a schematic diagram showing the data structure of supplementary data 931D shown in FIG. 9. Supplementary data 931D corresponds to a type of NAL unit, "SEI", in particular in MPEG-4 AVC. As shown in FIG. 13, supplementary data 931D includes decoding switch information 1301. The decoding switch information 1301 is included in each VAU in both the base-view video stream and the dependent-view video stream. The decoding switch information 1301 is information to cause the decoder in the playback device 102 to easily specify the next VAU to decode. As described below, the decoder alternately decodes the base-view video stream and the dependent-view video stream in units of VAUs. At that time, the decoder generally specifies the next VAU to be decoded in alignment with the time shown by the DTS assigned to each VAU. Many types of decoders, however, continue to decode VAUs in order, ignoring the DTS. For such decoders, it is preferable for each VAU to include decoding switch information 1301 in addition to a DTS.

As shown in FIG. 13, decoding switch information 1301 includes a subsequent access unit type 1311, subsequent access unit size 1312, and decoding counter 1313. The subsequent access unit type 1311 indicates whether the next VAU to be decoded belongs to a base-view video stream or a dependent-view video stream. For example, when the value of the subsequent access unit type 1311 is "1", the next VAU to be decoded belongs to a base-view video stream, and when the value of the subsequent access unit type 1311 is "2", the next VAU to be decoded belongs to a dependent-view video stream. When the value of the subsequent access unit type 1311 is "0", the current VAU is located at the end of the stream targeted for decoding, and the next VAU to be decoded does not exist. The subsequent access unit size 1312 indicates the size of the next VAU that is to be decoded. By referring to the subsequent access unit size 1312, the decoder in the playback device 102 can specify the size of a VAU without analyzing its actual structure. Accordingly, the decoder can easily extract VAUs from the buffer. The decode counter 1313 shows the decoding order of the VAU to which it belongs. The order is counted from a VAU that includes an I picture in the base-view video stream.

FIG. 14A is a schematic diagram showing an example of decoding counters, 1410 and 1420, assigned to each picture in the base-view video stream 1401 and in the dependent-view video stream 1402. As shown in FIG. 14A, the decode counters 1410 and 1420 are incremented alternately between the two video streams 1401 and 1402. For example, for VAU 1411 that includes an I picture in the base-view video stream 1401, a value of "1" is assigned to the decode counter 1410. Next, a value of "2" is assigned to the decode counter 1420 for the VAU 1421 that includes the next P picture to be decoded in the dependent-view video stream 1402. Furthermore, a value of "3" is assigned to the decode counter 1410 for the VAU 1412 that includes the next P picture to be decoded in the base-view video stream 1401. By assigning values in this way, even when the decoder in the playback device 102 fails to read one of the VAUs due to some error, the decoder can immediately specify the missing picture using the decode counters 1410 and 1420. Accordingly, the decoder can perform error processing appropriately and promptly.

In the example shown in FIG. 14A, an error occurs during the reading of the third VAU 1413 in the base-view video stream 1401, and the Br picture is missing. During decoding processing of the P picture contained in the second VAU 1422 in the dependent-view video stream 1402, however, the decoder has read the decode counter 1420 for this VAU 1422 and retained the value. Accordingly, the decoder can predict the decode counter 1410 for the next VAU to be processed. Specifically, the decode counter 1420 in the VAU 1422 that includes the P picture is "4". Therefore, the decode counter 1410 for the next VAU to be read can be predicted to be "5". The next VAU that is actually read, however, is the fourth VAU 1414 in the base-view video stream 1401, whose decode counter 1410 is "7". The decoder thus detects that it failed to read a VAU. Accordingly, the decoder can execute the following processing: "skip decoding processing of the B picture extracted from the third VAU 1423 in the dependent-view video stream 1402, since the Br picture to be used as a reference is missing". In this way, the decoder checks the decode counters 1410 and 1420 during each decoding process. Consequently, the decoder can promptly detect errors during reading of VAUs and can promptly execute appropriate error processing. As a result, the decoder can prevent noise from contaminating the playback video.

FIG. 14B is a schematic diagram showing another example of decoding counters, 1430 and 1440, assigned to each picture in the base-view video stream 1401 and in the dependent-view video stream 1402. As shown in FIG. 14B, decode counters 1430 and 1440 are incremented separately in the video streams 1401 and 1402. Therefore, the decode counters 1430 and 1440 are the same for a pair of pictures in the same 3D VAU. In this case, when the decoder has decoded a VAU in the base-view video stream 1401, it can predict that "the decode counter 1430 is the same as the decode counter 1440 for the next VAU to be decoded in the dependent-view video stream 1402". Conversely, when the decoder has decoded a VAU in the dependent-view video stream 1402, it can predict that "the decode counter 1430 for the next VAU to be decoded in the base-view video stream 1401 is the same as the decode counter 1440 plus one". Accordingly, at any point in time, the decoder can promptly detect an error in reading a VAU using the decode counters 1430 and 1440 and can promptly execute appropriate error processing. As a result, the decoder can prevent noise from contaminating the playback video.

<<Interleaved Arrangement of Multiplexed Stream Data>>

For seamless playback of 3D video images, the physical arrangement of the base-view video stream and dependent-view video stream on the BD-ROM disc 101 is important. This "seamless playback" refers to playing back video and audio from multiplexed stream data without interruption.

Figure 15:
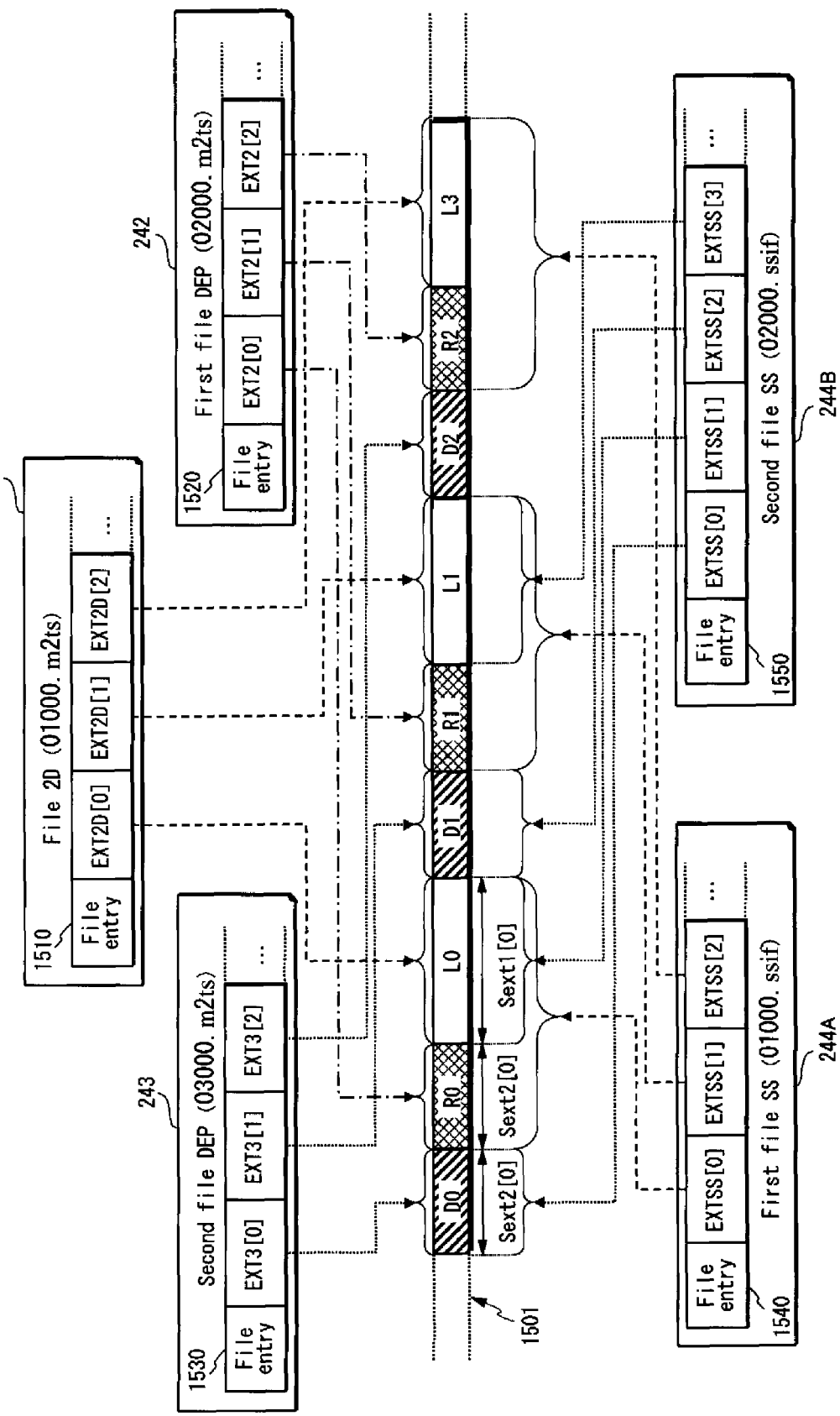
FIG. 15 is a schematic diagram showing the physical arrangement on a BD-ROM disc of data block groups belonging to the main TS, first sub-TS, and second sub-TS shown in FIGS. 3A, 3B, and 3C.

FIG. 15 is a schematic diagram showing the physical arrangement on the BD-ROM disc 101 of a data block group belonging to the main TS, first sub-TS, and second sub-TS respectively shown in FIGS. 3A, 3B, and 3C. A "data block" refers to a sequence of data recorded on a contiguous area on the BD-ROM disc 101, i.e. a plurality of physically contiguous sectors. Since physical addresses and logical addresses on the BD-ROM disc 101 are substantially the same, the LBNs within each data block are also continuous. Accordingly, the BD-ROM drive 121 can continuously read a data block without causing the optical pickup to perform a seek. Hereinafter, data blocks L0, L1, L2, . . . belonging to a main TS are referred to as "base-view data blocks", and data blocks R0, R1, R2, . . . , D0, D1, D2, . . . belonging to a sub-TS are referred to as "dependent-view data blocks". In particular, the data blocks R0, R1, R2, . . . belonging to the first sub-TS are referred to as "right-view data blocks", and the data blocks D0, D1, D2, . . . belonging to the second sub-TS are referred to as "depth map data blocks". As shown in FIG. 15, a data block group is recorded continuously along track 1501 on the BD-ROM disc 101. Furthermore, the base-view data blocks L0, L1, L2, . . . , right-view data blocks R0, R1, R2, . . . , and depth map data blocks D0, D1, D2, . . . are arranged alternately one by one. This type of arrangement of data blocks is referred to as an "interleaved arrangement".

In the interleaved arrangement according to embodiment 1 of the present invention, the extent ATC time is the same between the three types of contiguous data blocks. For example, in FIG. 15, the top depth map data block D0, top right-view data block R0, and top base-view data block L0 are contiguous. The extent ATC time is the same between these data blocks D0, R0, and L0. In this context, an "Arrival Time Clock (ATC)" refers to a clock that acts as a standard for an ATS. Also, the "extent ATC time" is defined by the value of the ATC and represents the range of the ATS assigned to source packets in an extent, i.e. the time interval from the ATS of the source packet at the top of the extent to the ATS of the source packet at the top of the next extent. In other words, the extent ATC time is the same as the time required to transfer all of the source packets in the extent from the read buffer in the playback device 102 to the system target decoder. Note that the "read buffer" is a buffer memory in the playback device 102 where data blocks read from the BD-ROM disc 101 are temporarily stored before being transmitted to the system target decoder. Details on the read buffer are provided below.

Furthermore, in the interleaved arrangement according to embodiment 1 of the present invention, the three contiguous data blocks with the same extent ATC time are arranged in the order of the depth map block, right-view data block, and base-view data block, that is, starting with the smallest amount of data. For example, in FIG. 15, the picture included in the top right-view data block R0 is compressed using the picture included in the top base-view data block L0 as a reference picture, as shown in FIG. 7. Accordingly, the size $S_{ext2}[0]$ of the top right-view data block R0 is equal to or less than the size $S_{ext1}[0]$ of the top base-view data block L0: $S_{ext2}[0] \leq S_{ext1}[0]$. On the other hand, the amount of data per pixel in the depth map, i.e. the number of bits of the depth value, is in general smaller than the amount of data per pixel of the picture included in the base-view video stream, i.e. the sum of the number of bits of a chromatic coordinate value and an α value (opaqueness). Furthermore, as shown in FIGS. 3A and 3B, unlike the second sub-TS, the main TS includes other elementary streams, such as a primary audio stream, in addition to the primary video stream. Therefore, in FIG. 15 the size of the top depth map data block D0, $S_{ext3}[0]$, is equal to or less than the size of the top base-view data block L0, $S_{ext1}[0]$: $S_{ext3}[0] \leq S_{ext1}[0]$. Therefore, in FIG. 15, the top depth map data block D0, the top right-view data block R0, and the top base-view data block L1 are recorded in that order. The same is true for the next three contiguous data blocks D1, R1, and L1.

The VAUs located at the top of data blocks with the same extent ATC time belong to the same 3D VAU, and in particular include the top picture of the GOP representing the same 3D video image. For example, in FIG. 15, among the three contiguous data blocks Dn, Rn, Ln (n=0, 1, 2, . . . ) with the same extent ATC time, the top of the depth map data block Dn includes an I picture for the depth map stream, the top of the right-view data block Rn includes a P picture for the right-view video stream, and the top of the base-view data block Ln includes an I picture for the base-view video stream. The I picture for the depth map stream represents a depth map for the 2D video image represented by the I picture for the base-view video stream. The P picture for the right-view video stream represents the right-view when the 2D video image represented by the I picture in the base-view video stream is used as the left-view. In particular, the P picture, as shown in FIG. 7, is compressed using the I picture for the base-view video stream as a reference picture. Accordingly, the playback device 102 in 3D playback mode can start playback of 3D video images from any set of data blocks Dn, Rn, and Ln.

<<Significance of Dividing Multiplexed Stream Data into Data Blocks>>

In order to play 3D video images back seamlessly from the BD-ROM disc 101, the playback device 102 has to process the main TS and sub-TS in parallel. The read buffer capacity usable in such processing, however, is generally limited. In particular, there is a limit to the amount of data that can be continuously read into the read buffer from the BD-ROM disc 101. Accordingly, the playback device 102 has to read sections of the main TS and sub-TS with the same extent ATC time by dividing the sections.

FIG. 16A is a schematic diagram showing the arrangement of the main TS 1601 and sub-TS 1602 recorded separately and consecutively on a BD-ROM disc. When the playback device 102 processes the main TS 1601 and sub-TS 1602 in parallel, as shown by the arrows (1)-(4) on the solid lines in FIG. 16A, the BD-ROM drive 121 alternately reads sections of the main TS 1601 and the sub-TS 1602 that have the same extent ATC time. At this time, as shown by the dashed lines with arrows in FIG. 16A, during read processing the BD-ROM drive 121 has to make a large change in the area to be read on the BD-ROM disc. For example, after the top section of the main TS 1601 shown by arrow (1) is read, the BD-ROM drive 121 temporarily stops the read operation by the optical pickup and increases the rotation speed of the BD-ROM disc. In this way, the BD-ROM drive 121 rapidly moves the sector on the BD-ROM disc on which the top section of the sub-TS 1602 shown by arrow (2) is recorded to the position of the optical pickup. This operation to temporarily stop reading by the optical pickup and, while reading is stopped, position the optical pickup above the next area to be read is referred to as a "jump". The dashed lines with arrows shown in FIG. 16A indicate the range of the jumps necessary during read processing. During each jump period, read processing by the optical pickup stops, and only decoding processing by the decoder progresses. In the example shown in FIG. 16A, the jumps are so large that it makes it difficult to cause read processing to keep up with decoding processing. As a result, it is difficult to stably maintain seamless playback.

FIG. 16B is a schematic diagram showing the arrangement of base-view data blocks B[0], B[1], B[2], . . . and dependent-view data blocks D[0], D[1], D[2], . . . recorded alternately on a BD-ROM disc 101 according to embodiment 1 of the present invention. As shown in FIG. 16B, the main TS and sub-TS are divided into a plurality of data blocks and are arranged alternately. In this case, during playback of 3D video images, the playback device 102 reads data blocks B[0], D[0] B[1], D[1] . . . in order from the top, as shown by arrows (1)-(4) in FIG. 16B. By simply reading these data blocks in order, the playback device 102 can smoothly read the main TS and sub-TS alternately. In particular, since no jump occurs during read processing, seamless playback of 3D video images can be stably maintained.

<<Significance of Providing Contiguous Data Blocks with the Same Extent ATC Time>>

Figures 17A, 17B:
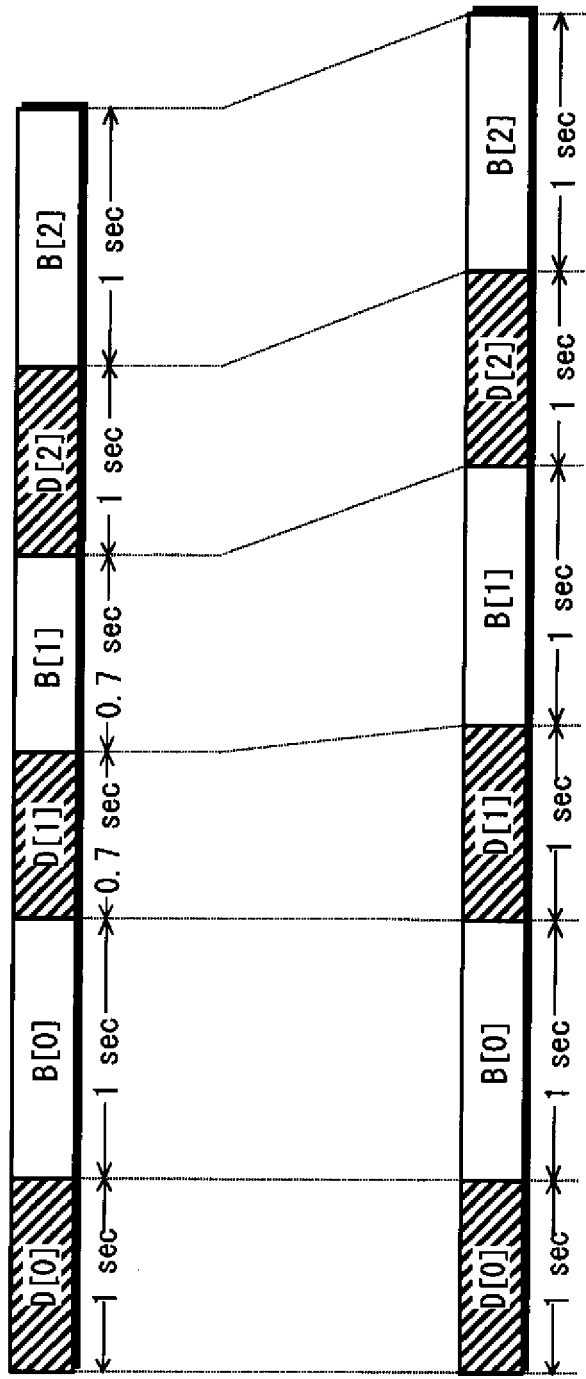
FIGS. 17A and 17B are schematic diagrams showing two examples of extent ATC times for a dependent-view data block group D[0], D[1], D[2] and a base-view data block group B[0], B[1], B[2] recorded in an interleaved arrangement.

FIG. 17A is a schematic diagram showing an example of extent ATC times for a dependent-view data block group D[0], D[1], D[2] and a base-view data block group B[0], B[1], B[2] recorded in an interleaved arrangement. As shown in FIG. 17A, the extent ATC time is equal for a pair of a dependent-view data block D[n] (n=0, 1, 2) and an immediately subsequent base-view data block B[n]. For example, the extent ATC time is one second for each data block in the top data block pair D[0], B[0]. Accordingly, when the pair of data blocks D[0], B[0] is read into the read buffer in the playback device 102, all of the TS packets therein are transferred from the read buffer to the system target decoder over a one second interval. Similarly, since the extent ATC time is 0.7 seconds for each data block in the second data block pair D[1], B[1], all of the TS packets in each data block are transferred from the read buffer to the system target decoder over a 0.7 second interval.

FIG. 17B is a schematic diagram showing another example of extent ATC times for a dependent-view data block group D[0], D[1], D[2] and a base-view data block group B[0], B[1], B[2] recorded in an interleaved arrangement. As shown in FIG. 17B, the extent ATC time is one second for all of the data blocks D[n], B[n] (n=0, 1, 2). Accordingly, when the data blocks D[n], B[n] are read into the read buffer in the playback device 102, all of the TS packets therein are transferred from the read buffer to the system target decoder over a one second interval.

As described above, the compression ratio is higher for dependent-view data blocks than for base-view data blocks. Accordingly, decoding of dependent-view data blocks is generally faster than decoding of base-view data blocks. On the other hand, when the extent ATC time is the same, the data amount for a dependent-view data block is less than a base-view data block. Accordingly, when the extent ATC time is equal between contiguous data blocks, as in FIGS. 17A and 17B, then it is easy to maintain the rate at which data to be decoded is provided to the system target decoder in equilibrium with the rate at which this data is processed. In other words, the system target decoder can easily synchronize decoding of base-view data blocks and decoding of dependent-view data blocks and can particularly do so even during interrupt playback.

<<Cross-Linking of AV Stream Files to Data Blocks>>

In the file system for the BD-ROM disc 101, each data block belonging to multiplexed stream data can be accessed as a single extent in either a file 2D or a file DEP. In other words, the logical address for each data block can be known from the file entry of a file 2D or file DEP (see <Supplementary Explanation> for details).

In the examples shown in FIGS. 2 and 15, the file entry 1510 in the file 2D (01000.m2ts) 241 indicates the sizes of the base-view data blocks L0, L1, L2, . . . and the LBNs of their tops. Accordingly, the base-view data blocks L0, L1, L2, . . . can be accessed as extents EXT2D[0], EXT2D[1], EXT2D [2], . . . in the file 2D 241. Hereinafter, the extents EXT2D[0], EXT2D[1], EXT2D[2], . . . belonging to the file 2D 241 are referred to as "2D extents".

The file entry 1520 in the first file DEP (02000.m2ts) indicates the sizes of the right-view data blocks R0, R1, R2, . . . and the LBNs of their tops. Accordingly, the right-view data blocks R0, R1, R2, . . . can be accessed as extents EXT2[0], EXT2[1], EXT2[2], . . . in the first file DEP 242. Hereinafter, the extents EXT2[0], EXT2[1], EXT2[2], . . . belonging to the first file DEP 242 are referred to as "right-view extents".

The file entry 1530 in the second file DEP (02000.m2ts) indicates the sizes of the depth map data blocks D0, D1, D2, . . . and the LBNs of their tops. Accordingly, the depth map data blocks D1, D2, D3, . . . can be accessed as extents EXT3[0], EXT3[1], EXT3[2], . . . in the second file DEP 243. Hereinafter, the extents EXT3[0] EXT3[1], EXT3[2], . . . belonging to the second file DEP 243 are referred to as "depth map extents". Furthermore, extents that belong to any file DEP, as do right-view extents and depth map extents, are collectively referred to as "dependent-view extents".

For the data block group shown in FIG. 15, the AV stream files are cross-linked as follows.

The file entry 1540 in the first file SS (01000.ssif) 244A considers pairs of adjacent right-view data blocks and base-view data blocks R0+L0, R1+L1, R2+L2, . . . to each be one extent, indicating the size of each and the LBN of the top thereof. Accordingly, the pairs of data blocks R0+L0, R1+L1, R2+L2, . . . can be accessed as extents EXTSS[0], EXTSS[1], EXTSS[2], . . . in the first file SS 244A. Hereinafter, the extents EXTSS[0], EXTSS[1], EXTSS[2], . . . belonging to the first file SS 244A are referred to as "3D extents". The 3D extents EXTSS[n] (n=0, 1, 2, . . . ) have base-view data blocks Ln in common with the file 2D 241 and right-view data blocks Rn in common with the first file DEP 242.

The file entry 1550 alternately indicates the size of depth map data blocks D0, D1, D2, . . . and base-view data blocks L0, L1, L2, . . . and the LBNs of their tops. Accordingly, the data blocks D1, L1, D2, L2, . . . can be accessed as extents EXTSS[0], EXTSS[1], EXTSS[2], EXTSS[3], . . . in the second file SS 244B. The extents in the second file SS 244B have base-view data blocks Ln in common with the file 2D 241 and depth map data blocks Dn in common with the second file DEP 243.

<<Playback Path for a Data Block Group in an Interleaved Arrangement>>

Figure 18:
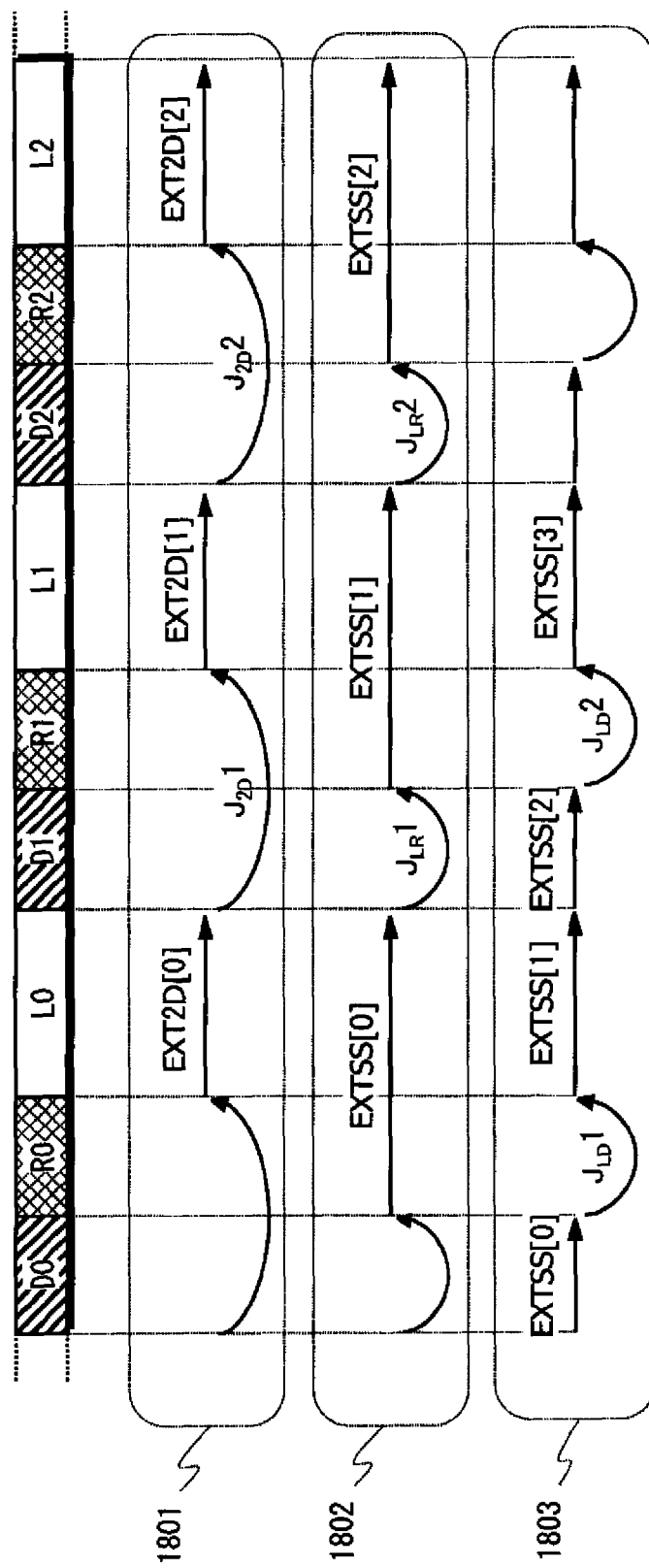
FIG. 18 is a schematic diagram showing a playback path 1801 in 2D playback mode, playback path 1802 in L/R mode, and playback path 1803 in depth mode for the data block groups shown in FIG. 15.

FIG. 18 is a schematic diagram showing a playback path 1801 in 2D playback mode, playback path 1802 in L/R mode, and playback path 1803 in depth mode for the data block groups shown in FIG. 15.

In 2D playback mode, the playback device 102 plays back the file 2D 241. Accordingly, as the playback path 1801 for 2D playback mode shows, the base-view data blocks L0, L1, and L2 are read in order as 2D extents EXT2D[0], EXT2D[1], and EXT2D[2]. That is, the top base-view data block L0 is first read, then reading of the immediately subsequent depth map data block D1 and right-view data block R1 is skipped by a first jump $J_{2D}1$. Next, the second base-view data block L1 is read, and then reading of the immediately subsequent depth map data block D2 and right-view data block R2 is skipped by a second jump $J_{2D}2$. Subsequently, the third base-view data block L2 is read.

In L/R mode, the playback device 102 plays back the first file SS 244A. Accordingly, as the playback path 1802 for L/R playback mode shows, pairs of adjacent right-view data blocks and base-view data blocks R0+L0, R1+L1, and R2+L2 are read in order as 3D extents EXTSS[0], EXTSS[1], and EXTSS[2]. That is, the top right-view data block R0 and the immediately subsequent base-view data block L0 are first continuously read, then reading of the immediately subsequent depth map data block D1 is skipped by a first jump $J_{LR}1$. Next, the second right-view data block R1 and the immediately subsequent base-view data block L1 are continuously read, and then reading of the immediately subsequent depth map data block D2 is skipped by a second jump $J_{LR}2$. Subsequently, the third right-view data block R2 and base-view data block L2 are continuously read.

In depth mode, the playback device 102 plays back the second file SS 244B. Accordingly, as the playback path 1803 for depth mode shows, depth map data blocks D0, D1, . . . and base-view data blocks L0, L1, . . . are alternately read as extents EXTSS[0], EXTSS[1], EXTSS[2], EXTSS[3], . . . in the second file SS 244B. That is, the top depth map data block D0 is first read, then reading of the immediately subsequent right-view data block R0 is skipped by a first jump $J_{LD}1$. Next, the top base-view data block L0 and the immediately subsequent depth map extent D1 are continuously read. Furthermore, reading of the immediately subsequent right-view extent R1 is skipped by a second jump $J_{LD}2$, and the second base-view data block L1 is read.

As shown by the playback paths 1801-1803 in FIG. 18, in the area in which a data block group is recorded in an interleaved arrangement, the playback device 102 can substantially read the data block groups in order from the top. In this case, jumps occur during read processing. The distance of the jumps, however, differs from the jumps shown in FIG. 16A and is sufficiently shorter than the entire length of either the main TS or the sub-TS. Furthermore, for each pair of a base-view data block and dependent-view data block with the same extent ATC time, the dependent-view data block, which is comparatively small in size, is read first. Therefore, the read buffer capacity of the playback device 102 can be reduced more than if the data blocks were read in opposite order.

In L/R mode, the playback device 102 reads a data block group as an extent group in the first file SS 244A. That is, the playback device 102 reads the LBN of the top of each 3D extents EXTSS[0], EXTSS[1], . . . , as well as the size thereof, from the file entry 1540 in the first file SS 244A and then outputs the LBNs and sizes to the BD-ROM drive 121. The BD-ROM drive 121 continuously reads data having the input size from the input LBN. In such processing, control of the BD-ROM drive 121 is easier than processing to read the data block groups as the extents in the first file DEP 242 and the file 2D 241 for the following reasons (A) and (B): (A) the playback device 102 can refer in order to extents using a file entry in one location, and (B) since the total number of extents to be read substantially halves, the total number of pairs of an LBN and a size that need to be output to the BD-ROM drive 121 halves. Advantage (A) is also true for processing to read the data block group as extents in the second file SS 244B in depth mode. However, after the playback device 102 has read the 3D extents EXTSS[0], EXTSS[1], . . . , it needs to separate each into a right-view data block and a base-view data block and output them to the decoder. The clip information file is used for this separation processing. Details are provided below.

<<Other TS Packets Included in the AV Stream File>>

The types of the TS packets contained in the AV stream file include not only those that are converted from the elementary streams shown in FIGS. 3A, 3B, and 3C, but also a program association table (PAT), program map table (PMT), and program clock reference (PCR). The PCR, PMT, and PAT are specified by the European Digital Broadcasting Standard and are intended to regulate the partial transport stream constituting a single program. By using PCR, PMT, and PAT, the AV stream file can also be regulated in the same way as the partial transport stream. Specifically, the PAT shows the PID of a PMT included in the same AV stream file. The PID of the PAT itself is 0. The PMT includes the PIDs for the elementary streams representing video, audio, subtitles, etc. included in the same AV stream file, as well as the attribute information for the elementary streams. The PMT also includes various descriptors relating to the AV stream file. The descriptors particularly include copy control information showing whether copying of the AV stream file is permitted or not. The PCR includes information indicating the value of a system time clock (STC) to be associated with the ATS assigned to the PCR itself. The STC referred to here is a clock used as a reference for the PTS and the DTS by a decoder in the playback device 102. This decoder uses the PCR to synchronize the STC with the ATC.

Figure 19:
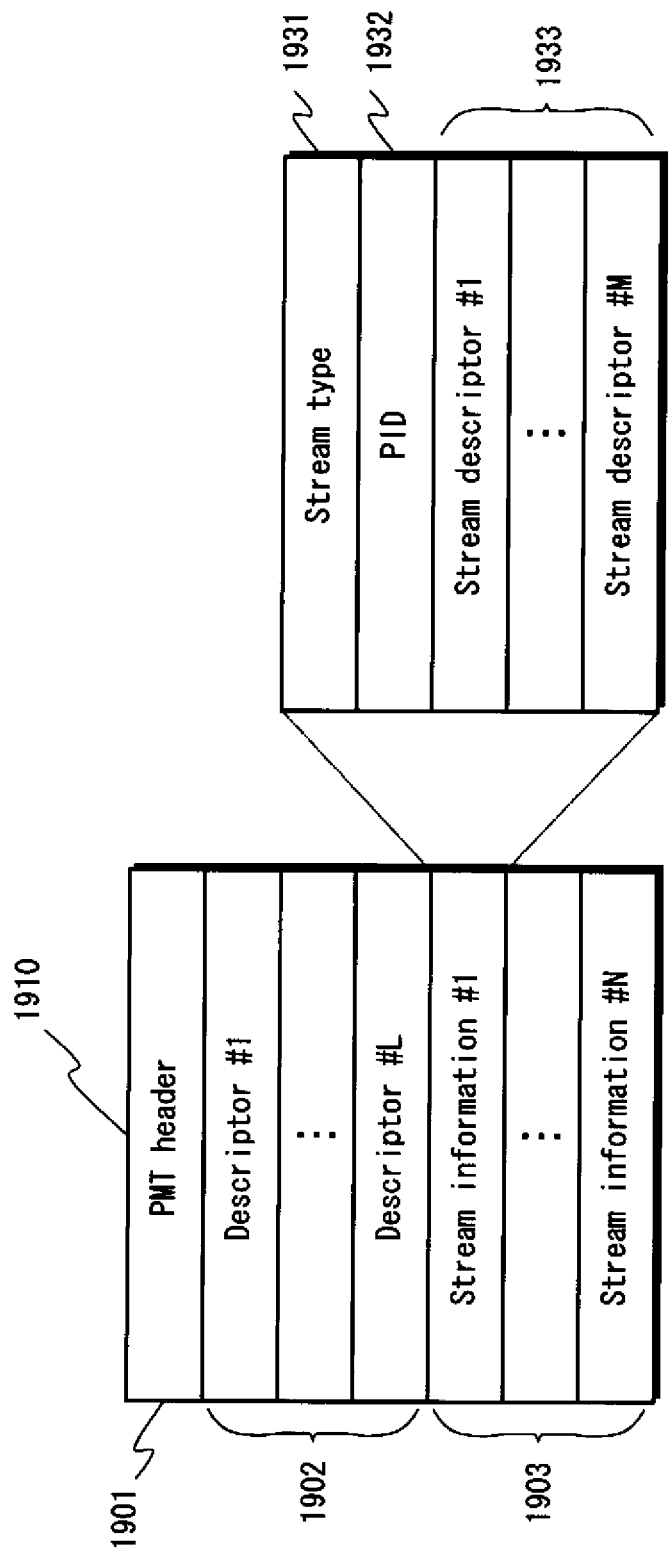
FIG. 19 is a schematic diagram showing the data structure of a PMT 1910.

FIG. 19 is a schematic diagram showing the data structure of a PMT 1910. The PMT 1910 includes a PMT header 1901, descriptors 1902, and pieces of stream information 1903. The PMT header 1901 indicates the length of data, etc. stored in the PMT 1910. Each descriptor 1902 relates to the entire AV stream file that includes the PMT 1910. The copy control information is included in one of the descriptors 1902. Each piece of stream information 1903 relates to one of the elementary streams included in the AV stream file and is assigned to a different elementary stream. Each piece of stream information 1903 includes a stream type 1931, a PID 1932, and stream descriptors 1933. The stream type 1931 includes identification information for the codec used for compressing the elementary stream. The PID 1932 indicates the PID of the elementary stream. The stream descriptors 1933 include attribute information of the elementary stream, such as a frame rate and an aspect ratio.

By using PCR, PMT, and PAT, the decoder in the playback device 102 can be made to process the AV stream file in the same way as the partial transport stream in the European Digital Broadcasting Standard. In this way, it is possible to ensure compatibility between a playback device for the BD-ROM disc 101 and a terminal device conforming to the European Digital Broadcasting Standard.

<<Clip Information File>>

FIG. 20 is a schematic diagram showing the data structure of the first clip information file (01000.clpi), i.e. the 2D clip information file 231. The dependent-view clip information files (02000.clip, 03000.clpi) 232 and 233 have the same data structure. Below, the data structure common to all clip information files is first described, using the data structure of the 2D clip information file 231 as an example. Afterwards, the differences in data structure between a 2D clip information file and a dependent-view clip information file are described.

As shown in FIG. 20, the 2D clip information file 231 includes clip information 2010, stream attribute information 2020, an entry map 2030, and 3D meta data 2040. The 3D meta data 2040 includes an offset table 2041 and an extent start point 2042.

As shown in FIG. 20, the clip information 2010 includes a system rate 2011, a playback start time 2012, and a playback end time 2013. The system rate 2011 indicates the maximum value of the transfer speed at which "TS packets" belonging to the file 2D (01000.m2ts) 241 are transferred from the read buffer in the playback device 102 to the system target decoder. The interval between the ATSs of the source packets in the file 2D 241 is set so that the transfer speed of the TS packets is limited to the system rate or lower. The playback start time 2012 indicates the PTS of the VAU located at the top of the file 2D 241, e.g. the PTS of the top video frame. The playback end time 2012 indicates the value of the STC delayed a predetermined time from the PTS of the VAU located at the end of the file 2D 241, e.g. the sum of the PTS of the last video frame and the playback time of one frame.

As shown in FIG. 20, the stream attribute information 2020 is a correspondence table between the PID 2021 for each elementary stream included in the file 2D 241 with pieces of attribute information 2022. Each piece of attribute information 2022 is different for a video stream, audio stream, PG stream, and IG stream. For example, the attribute information corresponding to the PID 0x1011 for the primary video stream includes a codec type used for the compression of the video stream, as well as a resolution, aspect ratio, and frame rate for each picture constituting the video stream. On the other hand, the attribute information corresponding to the PID 0x1101 for the primary audio stream includes a codec type used for compressing the audio stream, number of channels included in the audio stream, language, and sampling frequency. The playback device 102 uses this attribute information 2022 to initialize the decoder.

[Entry Map]

FIG. 21A is a schematic diagram showing the data structure of an entry map 2030. As shown in FIG. 21A, the entry map 2030 includes tables 2100. There is the same number of tables 2100 as there are video streams multiplexed in the main TS, and tables are assigned one-by-one to each video stream. In FIG. 31A, each table 2100 is distinguished by the PID of the video stream to which it is assigned. Each table 2100 includes an entry map header 2101 and an entry point 2102. The entry map header 2101 includes the PID corresponding to the table 2100 and the total number of entry points 2102 included in the table 2100. The entry point 2102 associates a pair of a PTS 2103 and source packet number (SPN) 2104 with one of individually differing entry points ID (EP_ID) 2105. The PTS 2103 is equivalent to the PTS for one of the I pictures included in the video stream for the PID indicated by the entry map header 2101. The SPN 2104 is equivalent to the SPN for the top of the source packet group stored in the corresponding I picture. An "SPN" refers to the number assigned consecutively from the top to a source packet group belonging to one AV stream file. The SPN is used as the address for each source packet in the AV stream file. In the entry map 2030 in the 2D clip information file 231, the SPN refers to the number assigned to the source packet group belonging to the file 2D 241, i.e. the source packet group constituting the main TS. Accordingly, the entry point 2102 expresses the relationship between the PTS and the address, i.e. the SPN, of each I picture included in the file 2D 241.

An entry point 2102 does not need to be set for all of the I pictures in the file 2D 241. However, when an I picture is located at the top of a GOP, and the TS packet that includes the top of that I picture is located at the top of a 2D extent, an entry point 2102 has to be set for that I picture.

FIG. 21B is a schematic diagram showing source packets in a source packet group 2110 belonging to the file 2D 241 that are associated with each EP_ID 2105 by the entry map 2030.

FIG. 21C is a schematic diagram showing the relationships between the source packet group 2110 and the data block group Dn, Rn, Ln (n=0, 1, 2, 3, . . . ) on a BD-ROM disc. When the playback device 102 plays back 2D video images from the file 2D 241, it refers to the entry map 2030 to specify the SPN for the source packet that includes a frame representing an arbitrary scene from the PTS for that frame. Specifically, when for example a PTS=360000 is indicated as the PTS for a specific entry point for the position to start playback, the playback device 102 first retrieves the SPN=3200 allocated to this PTS in the entry map 2030. Next, the playback device 102 seeks the quotient SPN×192/2048, i.e. the value of the SPN multiplied by 192 bytes, the data amount per source packet, and divided by 2048 bytes, the data amount per sector. As can be understood from FIGS. 5B and 5C, this value is the same as the total number of sectors recorded in the main TS prior to the source packet to which the SPN is assigned. In the example shown in FIG. 21B, this value is 3200×192/2048=300, and is equal to the total number of sectors on which source packet groups 2111 are recorded from SPN 0 through 3199. Next, the playback device 102 refers to the file entry in the file 2D 241 and specifies the LBN of the (total number+1)$^{th}$ sector, counting from the top of the sector groups in which 2D extent groups are recorded. In the example shown in FIG. 21C, within the sector groups in which the base-view data blocks L0, L1, L2, . . . which can be accessed as 2D extents EXT2D[0], EXT2D[1] EXT2D[2], . . . are recorded, the LBN of the 301$^{st}$ sector counting from the top is specified. The playback device 102 indicates this LBN to the BD-ROM drive 121. In this way, base-view data block groups are read as aligned units in order from the sector for this LBN. Furthermore, from the first aligned unit that is read in, the playback device 102 selects the source packet indicated by the entry point for the position to start playback and decodes an I picture. From then on, subsequent pictures are decoded in order referring to already decoded pictures. In this way, the playback device 102 can play back 2D video images from the file 2D 241 from a specified PTS onwards.

Furthermore, the entry map 2030 is useful for efficient processing during trickplay such as fast forward, reverse, etc. For example, the playback device 102 in 2D playback mode first refers to the entry map 2030 to read SPNs starting at the position to start playback, e.g. to read SPN=3200, 4800, . . . in order from the entry points EP_ID=2, 3, . . . that include PTSs starting at PTS=360000. Next, the playback device 102 refers to the file entry in the file 2D 241 to specify the LBN of the sectors corresponding to each SPN. The playback device 102 then indicates each LBN to the BD-ROM drive 121. Aligned units are thus read from the sector for each LBN. Furthermore, from each aligned unit, the playback device 102 selects the source packet indicated by each entry point and decodes an I picture. The playback device 102 can thus selectively play back an I picture from the file 2D 241 without analyzing the 2D extent group EXT2D[n] itself.

[Offset Table]

FIG. 22A is a schematic diagram showing the data structure of an offset table 2041. The offset table 2041 is information used for cropping processing by the playback device 102 in 3D playback mode. "Cropping processing" refers to processing to generate, from a table representing a 2D video image, a pair of pieces of plane data that represent a left-view and a right-view. A piece of "plane data" refers to a two-dimensional array of pixel data. The size of the array is the same as the resolution of a video frame. A piece of pixel data consists of a chromatic coordinate value and an α value. The chromatic coordinate value is expressed as an RGB value or a YCrCb value. The target of cropping processing includes the pieces of plane data generated from the PG streams, IG streams, and secondary video streams in the main TS, as well as the pieces of image plane data generated in accordance with a BD-J object. Cropping processing changes the horizontal position of each piece of pixel data in a piece of plane data. Accordingly, in the pair of pieces of plane data obtained via cropping processing, the presentation positions in the left-view and right-view are shifted to the left and right from the original presentation position in the 2D video image. A viewer is made to perceive a pair of a left-view and a right-view as a single 3D video image due to the binocular parallax produced by these shifts.

As shown in FIG. 22A, the offset table 2041 includes a table 2210 for each PID in PG streams, IG streams, and secondary video streams. Each table 2210 is a correspondence table between PTSs 2201 and offset values 2202. The PTS 2201 represents each piece of plane data generated from PG streams, IG streams, and secondary video streams. The offset value 2202 represents the signed number of pixels by which each piece of pixel data is shifted horizontally by cropping processing. For example, a positive sign represents a shift to the right, and a negative sign a shift to the left. The sign of the offset value 2202 is determined by whether the 3D video image is deeper than the screen or closer to the viewer. Hereinafter, a pair 2203 of a PTS 2201 and an offset value 2202 is referred to as an "offset entry".

FIG. 22B is a schematic diagram showing the valid section of an offset entry. The valid section of an offset entry is, within the time measured by an STC, the interval from the time indicated by the PTS of the offset entry until the time indicated by the PTS of the next offset entry. When the PTS for a piece of plane data belongs to a valid section of a certain offset entry, then during cropping processing, the presentation position of the pixel data in that piece of plane data shifts by the offset value in the offset entry. In the example shown in FIG. 22A, the PTS of offset entry #1 is 180000, the PTS of offset entry 442 is 270000, and the PTS of offset entry 443 is 360000. In this case, as shown in FIG. 22B, an offset value of "+5" in the offset entry #1 is valid in an STC range 2204 from 180000 to 270000, and an offset value of "+3" in the offset entry #2 is valid in an STC range 2205 from 270000 to 360000.

[Extent Start Point]

FIG. 23A is a schematic diagram showing the data structure of extent start points 2042. As shown in FIG. 23A, the "extent start point" 2042 includes a base-view extent ID (EXT1_ID) 2311 and an SPN 2312. The EXT1_ID 2311 is a serial number assigned consecutively from the top to the base-view data blocks belonging to the first file SS (01000.ssif) 244A. One SPN 2312 is assigned to each EXT1_ID 2311 and is the same as the SPN for the source packet located at the top of the base-view data block identified by the EXT1_ID 2311. This SPN is a serial number assigned from the top to the source packets included in the base-view data block group belonging to the first file SS 244A.

In the data block group in an interleaved arrangement shown in FIG. 15, the file 2D (01000.m2ts) and the first file SS 244A share the base-view data blocks in common. However, a data block group recorded at a location where a long jump is necessary, such as a boundary between recording layers, generally includes a base-view data block belonging only to either the file 2D 241 or first file SS 244A (see modification [0] for details). Accordingly, the SPN 2312 that indicates the extent start point 2042 generally differs from the SPN for the source packet located at the top of the 2D extent belonging to the file 2D 241.

FIG. 23B is a schematic diagram showing the data structure of extent start points 2320 included in the second clip information file (02000.clpi), i.e. the right-view clip information file 232. As shown in FIG. 23B, the extent start point 2320 includes right-view extent IDs (EXT2_ID) 2321 and SPNs 2322. The EXT2_IDs 2321 are serial numbers assigned from the top to the right-view data blocks belonging to the first file SS 244A. One SPN 2322 is assigned to each EXT2_ID 2321 and is the same as the SPN for the source packet located at the top of the right-view data block identified by the EXT2_ID 2321. This SPN is a serial number assigned in order from the top to the source packets included in the right-view data block group belonging to the first file SS 244A.

FIG. 23D is a schematic diagram representing the relationship between right-view extents EXT2[0], EXT2[1], belonging to the first file DEP (02000.m2ts) 242 and the SPNs 2322 shown by the extent start points 2320. As shown in FIG. 15, the first file DEP 242 and first file SS 244A share right-view data blocks. Accordingly, as shown in FIG. 23D, each SPN 2322 shown by the extent start point 2320 is the same as the SPN for the source packet located at the top of each right-view extent EXT2[0], EXT2[1], . . . .

As described below, the extent start point 2042 in the 2D clip information file 231 and the extent start point 2320 in the right-view clip information file 232 are used to detect the boundary of data blocks included in each 3D extent when playing back 3D video images from the first file SS 244A.

FIG. 23E is a schematic diagram showing an example of the relationship between 3D extents EXTSS[0], EXTSS[1], . . . belonging to the first file SS 244A and a data block group 2350 on the BD-ROM disc 101. As shown in FIG. 23E, the data block group 2350 is recorded in an interleaved arrangement like the data block group shown in FIG. 15. Note that the following description similarly holds for other arrangements as well. In the data block 2350, the pairs of contiguous right-view data blocks and base-view data blocks R1+L1, R2+L2, R3+L3, and R4+L4 can respectively be accessed as 3D extents EXTSS[0], EXTSS[1], EXTSS[2], and EXTSS[3]. Furthermore, in the $n^{th}$ 3D extent EXTSS[n] (n=0, 1, 2, . . . ), the number of source packets included in the base-view data block L (n+1) is, in the extent start point 2042, the same as the difference A (n+1)−An between SPNs corresponding to EXT1_ID=n+1 and n (here, A0=0). On the other hand, the number of source packets included in the right-view data block R(n+1) is, in the extent start point 2320, the same as the difference B(n+1)−Bn between SPNs corresponding to EXT2_ID=n+1 and n (here, B0=0).

When the playback device 102 in L/R mode plays back 3D video images from the first file SS 244A, in addition to the entry maps in the clip information files 231 and 232, it also refers to the extent start points 2042 and 2320 to specify, from the PTS for a frame representing the right-view of an arbitrary scene, the LBN for the sector on which a right-view data block that includes the frame is recorded. Specifically, the playback device 102 for example first retrieves the SPN associated with the PTS from the entry map in the right-view clip information file 232. Suppose the source packet indicated by the SPN is included in the third right-view extent EXT2[2] in the first file DEP 242, i.e. the right-view data block R3. Next, the playback device 102 retrieves "B2", the largest SPN before the target SPN, from among the SPNs 2322 shown by the extent start points 2320 in the right-view clip information file 232. The playback device 102 also retrieves the corresponding EXT2_ID "2". Then the playback device 102 retrieves the value "A2" for the SPN 2312 corresponding to the EXT1_ID which is the same as the EXT2_ID "2". The playback device 102 further seeks the sum B2+A2 of the retrieved SPNs 2322 and 2312. As can be seen from FIG. 23E, this sum B2+A2 is the same as the total number of source packets included in the data blocks located before the third right-view data block R3 among the data blocks included in the 3D extent group EXTSS[0], EXTSS[1], .... Accordingly, this sum B2+A2 multiplied by 192 bytes, the data amount per source packet, and divided by 2048 bytes, the data amount per sector, i.e. (B2+A2)×192/2048, is the same as the number of sectors from the top of the 3D extent group until immediately before the third right-view data block R3. Using this quotient, the LBN for the sector on which the top of the right-view data block R3 is recorded can be specified by referring to the file entry for the first file SS 244A.

After specifying the LBN via the above-described procedure, the playback device 102 indicates the LBN to the BD-ROM drive 121. In this way, the 3D extent group recorded starting with the sector for this LBN, i.e. the 3D extent group starting with the third right-view data block R3, is read as aligned units.

The playback device 102 further refers to the extent start points 2042 and 2320 to extract dependent-view data blocks and base-view data blocks alternately from the read 3D extents. For example, assume that the 3D extent group EXTSS[n] (n=0, 1, 2, ...) is read in order from the data block group 2350 shown in FIG. 23E. The playback device 102 first extracts B1 source packets from the top of the 3D extent EXTSS[0] as the dependent-view data block R1. Next, the playback device 102 extracts the B1$^{th}$ source packet and the subsequent (A1−1) source packets, a total of A1 source packets, as the first base-view data block L1. The playback device 102 then extracts the (B1+A1)$^{th}$ source packet and the subsequent (B2−B1−1) source packets, a total of (B2−B1) source packets, as the second dependent-view data block R2. The playback device 102 further extracts the (A1+B2)$^{th}$ source packet and the subsequent (A2−A1−1) source packets, a total of (A2−A1) source packets, as the second base-view data block L2. Thereafter, the playback device 102 thus continues to detect the boundary between data blocks in each 3D extent based on the number of read source packets, thereby alternately extracting dependent-view and base-view data blocks. In parallel, the extracted base-view and right-view data blocks are transmitted to the system target decoder and decoded.

In this way, the playback device 102 in L/R mode can play back 3D video images from the first file SS 244A starting at a specific PTS. As a result, the playback device 102 can in fact benefit from the above-described advantages (A) and (B) regarding control of the BD-ROM drive 121.

<<File Base>>

FIG. 23C is a schematic diagram representing the base-view data blocks L1, L2, . . . extracted from the first file SS 244A by the playback device 102 in L/R mode. As shown by FIG. 23C, the SPNs 2312 shown by the extent start points 2042 are the same as the SPNs for the source packets located at the tops of base-view data blocks. Base-view data block groups extracted from a single file SS by referring to extent start points, like the base-view data block group 2330, are referred to as a "file base". Furthermore, the base-view data blocks included in a file base are referred to as "base-view extents". Each base-view extent, as shown in FIG. 23C, is referred to by an extent start point in a 2D clip information file.

A base-view extent shares the same data, i.e. base-view data block, with a 2D extent. Accordingly, the file base includes the same main TS as the file 2D. Unlike 2D extents, however, base-view extents are not referred to by a file entry.

As described above, base-view extents refer to extent start points in a clip information file to extract 3D extents from the file SS. The file base thus differs from a conventional file by not including a file entry and by needing an extent start point as a reference for a base-view extent. In this sense, the file base is a "virtual file". In particular, the file base is not recognized by the file system and does not appear in the directory/file structure shown in FIG. 2.

Figure 24:
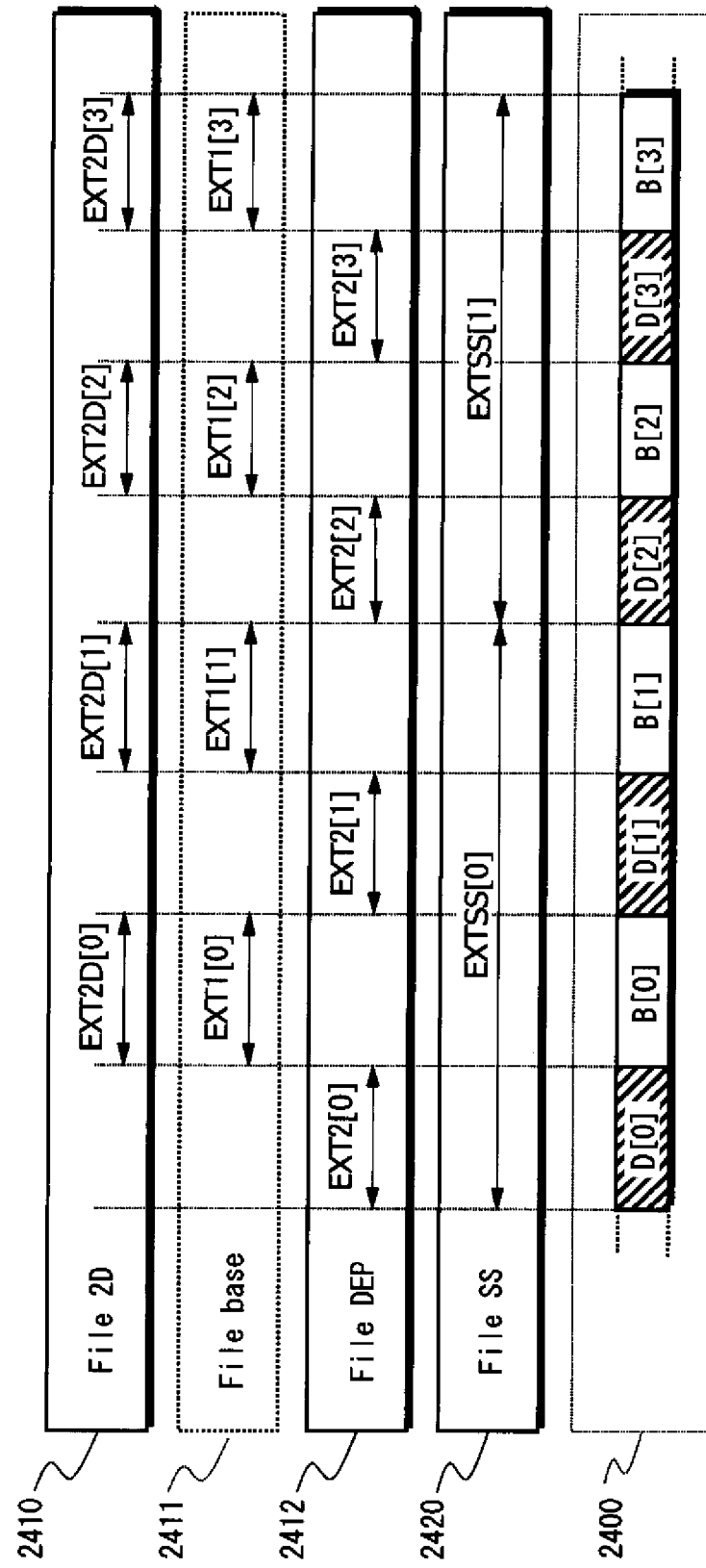
FIG. 24 is a schematic diagram showing an example of the relationships between each extent group in a data block group 2400, file 2D 2410, file base 2411, file DEP 2412, and file SS 2420 which include 3D video content and are recorded on a BD-ROM disc according to embodiment 1 of the present invention.

The 3D video content recorded on the BD-ROM disc 101 may have only one type of sub-TS corresponding to the main TS. FIG. 24 is a schematic diagram showing the relationships between each extent group in a data block group 2400, file 2D 2410, file base 2411, file DEP 2412, and file SS 2420 which include the content. As shown in FIG. 24, unlike the data block groups shown in FIG. 15, the data block group 2400 alternately includes one dependent-view data block D[n] (n= . . . , 0, 1, 2, 3, . . . ) and one base-view data block B[n]. Base-view data blocks B[n] belong to the file 2D 2410 as 2D extents EXT2D[n]. Dependent-view data blocks D[n] belong to the file DEP 2412 as dependent-view extents EXT2[n]. Two contiguous dependent-view data blocks and base-view data blocks, the pairs D[0]+B[0] and D[1]+B[1], belong to the file SS 2420 as one 3D extent EXTSS[0]. Similarly, two contiguous dependent-view data blocks and base-view data blocks, the pairs D[2]+B[2] and D[3]+B[3], belong to the file SS 2420 as one 3D extent EXTSS[0]. The 3D extents EXTSS[0], EXTSS[1] share the base-view data blocks B[n] with the 2D extents EXT2D[n] and share the dependent-view data blocks D[n] with the dependent-view extents EXT2D[n]. After the 3D extents EXTSS[0], EXTSS[1] have been read into the playback device 102, they are separated into dependent-view data blocks D[n] and base-view data blocks B[n]. These base-view data blocks B[n] belong to the file base 2411 as base-view extents EXT1[n]. The boundary between a base-view extent EXT1[n] and dependent-view extent EXT2[n] in each 3D extent EXTSS[n] is specified referring to the extent start points in the clip information files respectively assigned to the file 2D 2410 and file DEP 2412.

<<Dependent-View Clip Information File>>

The dependent-view clip information file has the same data structure as the 2D clip information file shown in FIGS. 20-23. Accordingly, the following description covers the differences between the dependent-view clip information file and the 2D clip information file. Details on the similarities can be found in the above description.

A dependent-view clip information file differs from a 2D clip information file mainly in the following three points: (i) conditions are placed on the stream attribute information, (ii) conditions are placed on the entry points, and (iii) the 3D meta data does not include offset tables.

(i) When the base-view video stream and the dependent-view video stream are to be used for playback of 3D video images by a playback device 102 in L/R mode, as shown in FIG. 7, the dependent-view video stream is compressed using the base-view video stream. At this point, the video stream attributes of the dependent-view video stream become equivalent to the base-view video stream. The video stream attribute information for the base-view video stream is associated with PID=0x1011 in the stream attribute information 2020 in the 2D clip information file. On the other hand, the video stream attribute information for the dependent-view video stream is associated with PID=0x1012 or 0x1013 in the stream attribute information in the dependent-view clip information file. Accordingly, the items shown in FIG. 20, i.e. the codec, resolution, aspect ratio, and frame rate, have to match between these two pieces of video stream attribute information. If the codec type matches, then a reference relationship between pictures in the base-view video stream and the dependent-view video stream is established during coding, and thus each picture can be decoded. If the resolution, aspect ratio, and frame rate all match, then on-screen presentation of the left and right videos can be synchronized. Therefore, these videos can be shown as 3D video images without making the viewer feel uncomfortable.

(ii) The entry map in the dependent-view clip information file includes a table allocated to the dependent-view video stream. Like the table 2100 shown in FIG. 21A, this table includes an entry map header and entry points. The entry map header indicates the PID for the dependent-view video stream allocated to the table, i.e. either 0x1012 or 0x1013. In each entry point, a pair of a PTS and an SPN is associated with a single EP_ID. The PTS for each entry point is the same as the PTS for the top picture in one of the GOPs included in the dependent-view video stream. The SPN for each entry point is the same as the top SPN of the source packet group stored in the picture indicated by the PTS belonging to the same entry point. This SPN refers to a serial number assigned consecutively from the top to the source packet group belonging to the file DEP, i.e. the source packet group constituting the sub-TS. The PTS for each entry point has to match the PTS, within the entry map in the 2D clip information file, for the entry point in the table allotted to the base-view video stream. In other words, whenever an entry point is set to the top of a source packet group that includes one of a set of pictures included in the same 3D VAU, an entry point always has to be set to the top of the source packet group that includes the other picture.

Figure 25:
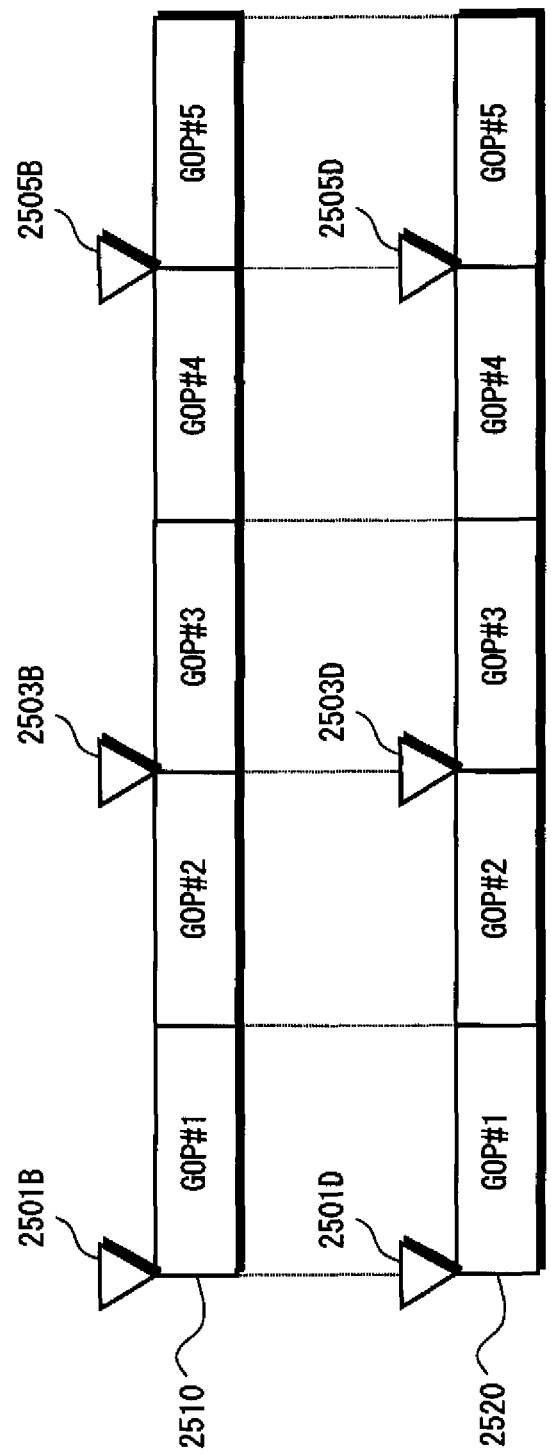
FIG. 25 is a schematic diagram showing an example of entry points set in a base-view video stream 2510 and a dependent-view video stream 2520 on a BD-ROM disc according to embodiment 1 of the present invention.

FIG. 25 is a schematic diagram showing an example of entry points set in a base-view video stream 2510 and a dependent-view video stream 2520. In the two video streams 2510 and 2520, GOPs that are the same number from the top represent video for the same playback period. As shown in FIG. 25, in the base-view video stream 2510, entry points 2501B, 2503B, and 2505B are set to the top of the odd-numbered GOPS as counted from the top, i.e. GOP #1, GOP #3, and GOP #5. Accordingly, in the dependent-view video stream 2520 as well, entry points 2501D, 2503D, and 2505D are set to the top of the odd-numbered GOPS as counted from the top, i.e. GOP #1, GOP #3, and GOP #5. In this case, when the 3D playback device 102 begins playback of 3D video images from GOP #3, for example, it can immediately calculate the address of the position to start playback in the file SS from the SPN of the corresponding entry points 2503B and 2503D. In particular, when both entry points 2503B and 2503D are set to the top of a data block, then as can be understood from FIG. 23E, the sum of the SPNs of the entry points 2503B and 2503D equals the SPN of the position to start playback within the file SS. As described with reference to FIG. 33E, from this number of source packets, it is possible to calculate the LBN of the sector on which the part of the file SS for the position to start playback is recorded. In this way, even during playback of 3D video images, it is possible to improve response speed for processing that requires random access to the video stream, such as interrupt playback or the like.

<<2D Playlist File>>

Figure 26:
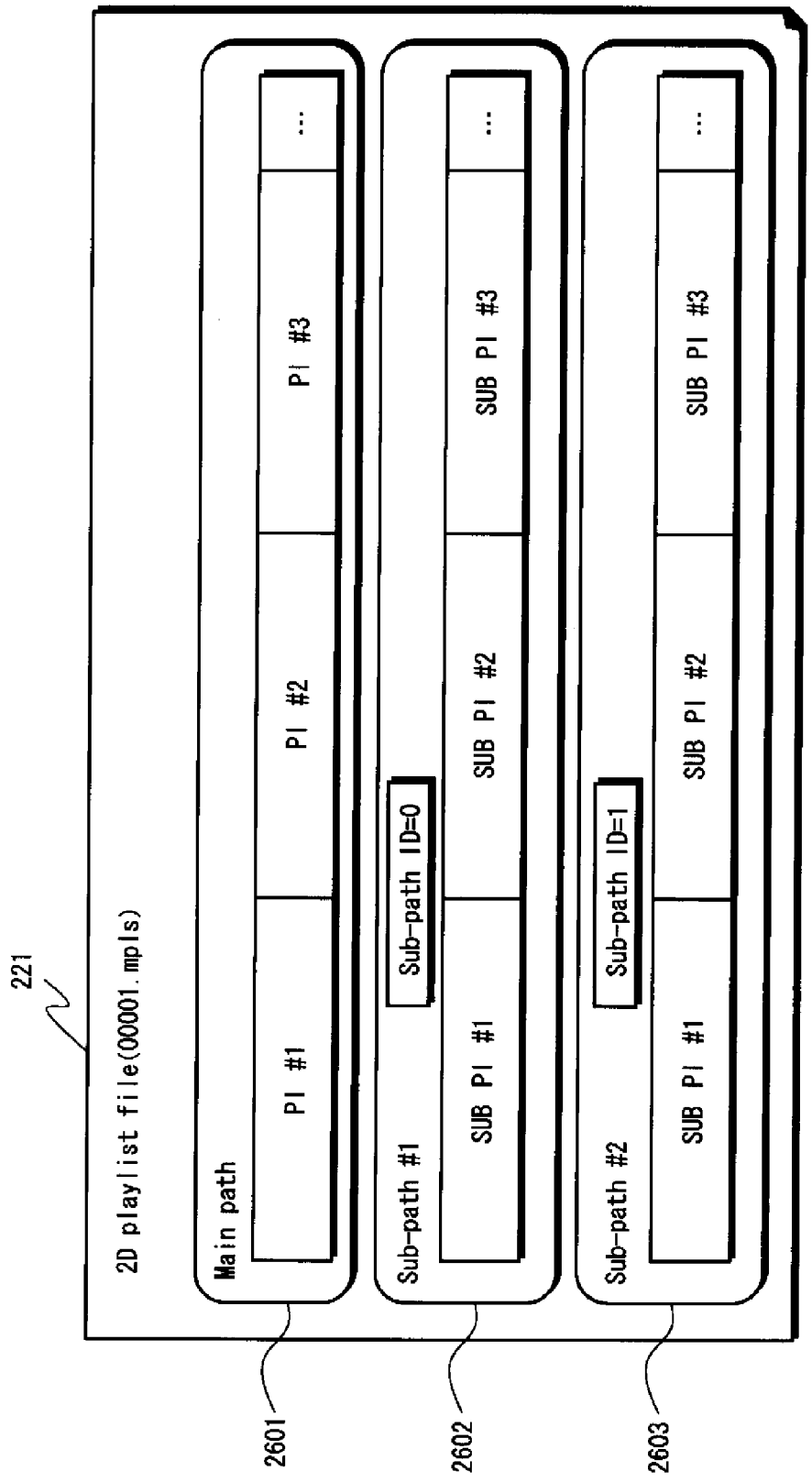
FIG. 26 is a schematic diagram showing the data structure of the 2D playlist file (00001.mpls) shown in FIG. 2.

FIG. 26 is a schematic diagram showing the data structure of a 2D playlist file. The first playlist file (00001.mpls) 221 shown in FIG. 2 has this data structure. As shown in FIG. 26, the 2D playlist file 221 includes a main path 2601 and two sub-paths 2602 and 2603.

The main path 2601 is a sequence of playitem information pieces (PI) that defines the main playback path for the file 2D 241, i.e. the section for playback and the section's playback order. Each PI is identified with a unique playitem ID=#N (N=1, 2, 3, . . . ). Each PI #N defines a different playback section along the main playback path with a pair of PTSs. One of the PTSs in the pair represents the start time (In-Time) of the playback section, and the other represents the end time (Out-Time). Furthermore, the order of the PIs in the main path 2601 represents the order of corresponding playback sections in the playback path.

Each of the sub-paths 2602 and 2603 is a sequence of sub-playitem information pieces (SUB_PI) that defines a playback path that can be associated in parallel with the main playback path for the file 2D 241. Such a playback path is a different section of the file 2D 241 than is represented by the main path 2601, or is a section of stream data multiplexed in another file 2D, along with the corresponding playback order. Such stream data represents other 2D video images to be played back simultaneously with 2D video images played back from the file 2D 241 in accordance with the main path 2601. These other 2D video images include, for example, sub-video in a picture-in-picture format, a browser window, a pop-up menu, or subtitles. Serial numbers "0" and "1" are assigned to the sub-paths 2602 and 2603 in the order of registration in the 2D playlist file 221. These serial numbers are used as sub-path IDs to identify the sub-paths 2602 and 2603. In the sub-paths 2602 and 2603, each SUB_PI is identified by a unique sub-playitem ID=#M (M=1, 2, 3, . . . ). Each SUB_PI #M defines a different playback section along the playback path with a pair of PTSs. One of the PTSs in the pair represents the playback start time of the playback section, and the other represents the playback end time. Furthermore, the order of the SUB_PIs in the sub-paths 2602 and 2603 represents the order of corresponding playback sections in the playback path.

Figure 27:
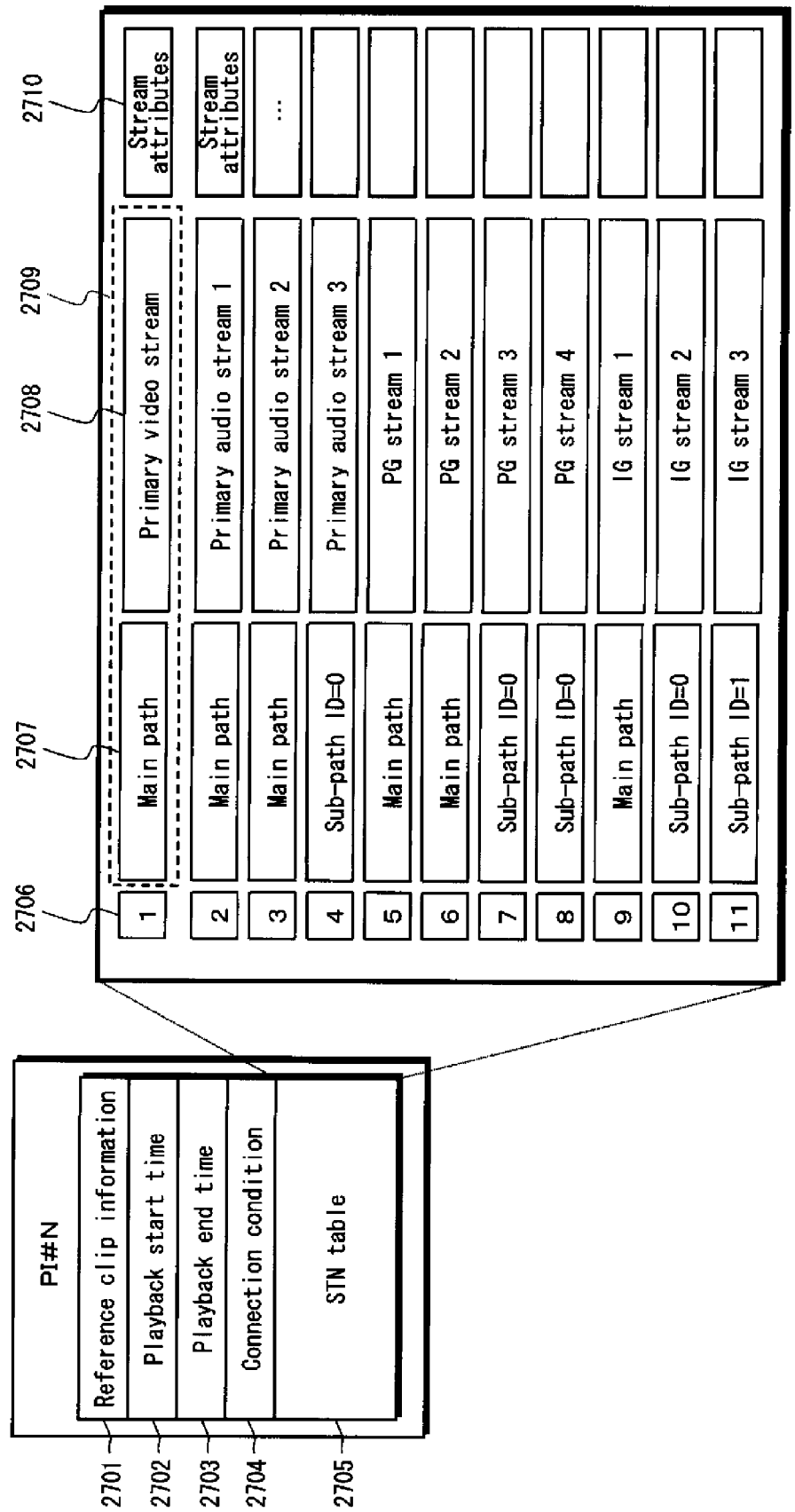
FIG. 27 is a schematic diagram showing the data structure of the PI #N shown in FIG. 26.

FIG. 27 is a schematic diagram showing the data structure of a PI #N. As shown in FIG. 27, a PI #N includes a piece of reference clip information 2701, playback start time (In Time) 2702, playback end time (Out_Time) 2703, connection condition 2704, and stream selection table (hereinafter referred to as "STN table" (stream number table)) 2705. The reference clip information 2701 is information for identifying the 2D clip information file 231. The playback start time 2702 and playback end time 2703 respectively indicate PTSs for the beginning and the end of the section for playback of the file 2D 241. The connection condition 2704 specifies a condition for connecting video in the playback section specified by a playback start time 2702 and a playback end time 2703 to video in the playback section specified by the previous PI # (N−1). The STN table 2705 is a list of elementary streams that can be selected from the file 2D 241 by the decoder in the playback device 102 from the playback start time 2702 until the playback end time 2703.

The data structure of a SUB_PI is the same as the data structure of the PI shown in FIG. 27 insofar as it includes reference clip information, a playback start time, and a playback end time. In particular, the playback start time and playback end time of a SUB_PI are expressed as values along the same time axis as a PI. The SUB_PI further includes an "SP connection condition" field. The SP connection condition has the same meaning as a PI connection condition.

[Connection Condition]

The connection condition 2704 can for example be assigned three types of values, "1", "5", and "6". When the connection condition 2704 is "1", the video to be played back from the section of the file 2D 241 specified by the PI #N does not need to be seamlessly connected to the video played back from the section of the file 2D 241 specified by the immediately preceding PI #N. On the other hand, when, the connection condition 2704 indicates "5" or "6", both video images need to be seamlessly connected.

FIGS. 28A and 28B are schematic diagrams showing the relationship between playback sections 2801 and 2802 that are to be connected when the connection condition 2704 shown in FIG. 27 indicates "5" and "6". In this case, the PI #N (N−1) specifies a first section 2801 in the file 2D 241, and the PI #N specifies a second section 2802 in the file 2D 241. As shown in FIG. 28A, when the connection condition 2704 indicates "5", the STCs of the PI # (N−1) and PI #N may be nonconsecutive. That is, the PTS #1 at the end of the first section 2801 and the PTS #2 at the top of the second section 2802 may be nonconsecutive. Several constraint conditions, however, need to be satisfied. For example, the first section 2801 and second section 2802 need to be created so that the decoder can smoothly continue to decode data even when the second section 2802 is supplied to the decoder consecutively after the first section 2801. Furthermore, the last frame of the audio stream contained in the first section 2801 needs to overlap the top frame of the audio stream contained in the second section 2802. On the other hand, as shown in FIG. 28B, when the connection condition 2704 indicates "6", the first section 2801 and the second section 2802 need to be able to be handled as successive sections for the decoder to duly decode. That is, STCs and ATCs need to be contiguous between the first section 2801 and the second section 2802. Similarly, when the SP connection condition is "5" or "6", STCs and ATCs need to be contiguous between sections of the file 2D specified by two contiguous SUB_PIs.

[STN Table]

Referring again to FIG. 27, the STN table 2705 is an array of stream registration information. "Stream registration information" is information individually listing the elementary streams that can be selected for playback from the main TS between the playback start time 2702 and playback end time 2703. The stream number (STN) 2706 is a serial number allocated individually to stream registration information and is used by the playback device 102 to identify each elementary stream. The STN 2706 further indicates priority for selection among elementary streams of the same type. The stream registration information includes a stream entry 2709 and stream attribute information 2710. The stream entry 2709 includes stream path information 2707 and stream identification information 2708. The stream path information 2707 is information indicating the file 2D to which the selected elementary stream belongs. For example, if the stream path information 2707 indicates "main path", the file 2D corresponds to the 2D clip information file indicated by reference clip information 2701. On the other hand, if the stream path information 2707 indicates "sub-path ID=1", the file 2D to which the selected elementary stream belongs corresponds to the 2D clip information file indicated by the reference clip information of the SUB_PI included in the sub-path with a sub-path ID=1. The playback start time and playback end time specified by this SUB_PI are both included in the interval from the playback start time 2702 until the playback end time 2703 specified by the PI included in the STN table 2705. The stream identification information 2708 indicates the PID for the elementary stream multiplexed in the file 2D specified by the stream path information 2707. The elementary stream indicated by this PID can be selected from the playback start time 2702 until the playback end time 2703. The stream attribute information 2710 indicates attribute information for each elementary stream. For example, the attribute information of an audio stream, a PG stream, and an IG stream indicates a language type of the stream.

[Playback of 2D Video Images in Accordance with a 2D Playlist File]

FIG. 29 is a schematic diagram showing the relationships between the PTSs indicated by the 2D playlist file (00001.mpls) 221 and the sections played back from the file 2D (01000.m2ts) 241. As shown in FIG. 29, in the main path 2601 in the 2D playlist file 221, the PI #1 specifies a PTS #1, which indicates a playback start time IN1, and a PTS #2, which indicates a playback end time OUT1. The reference clip information 2701 for the PI #1 indicates the 2D clip information file (01000.clpi) 231. When playing back 2D video images in accordance with the 2D playlist file 221, the playback device 102 first reads the PTS #1 and PTS #2 from the PI #1. Next, the playback device 102 refers to the entry map in the 2D clip information file 231 to retrieve from the file 2D 241 the SPN #1 and SPN #2 that correspond to the PTS #1 and PTS #2. The playback device 102 then calculates the corresponding numbers of sectors from the SPN #1 and SPN #2. Furthermore, the playback device 102 refers to these numbers of sectors and the file entry for the file 2D 241 to specify the LEN #1 and LBN. #2 at the beginning and end, respectively, of the sector group P1 on which the 2D extent group EXT2D[0], . . . , EXT2D[n] to be played back is recorded. Calculation of the numbers of sectors and specification of the LBNs are as per the description of FIGS. 21B and 21C. Finally, the playback device 102 indicates the range from LBN #1 to LBN #2 to the BD-ROM drive 121. The source packet group belonging to the 2D extent group EXT2D[0] EXT2D[n] is thus read from the sector group P1 in this range. Similarly, the pair PTS #3 and PTS #4 indicated by the PI #2 are first converted into a pair of SPN #3 and SPN #4 by referring to the entry map in the 2D clip information file 231. Then, referring to the file entry for the file 2D 241, the pair of SPN #3 and SPN #4 are converted into a pair of LBN #3 and LBN #4. Furthermore, a source packet group belonging to the 2D extent group is read from the sector group P2 in a range from the LBN #3 to the LBN #4. Conversion of a pair of PTS #5 and PTS #6 indicated by the PI #3 to a pair of SPN #5 and SPN #6, conversion of the pair of SPN #5 and SPN #6 to a pair of LBN #5 and LBN #6, and reading of a source packet group from the sector group P3 in a range from the LBN #5 to the LBN #6 are similarly performed. The playback device 102 thus plays back 2D video images from the file 2D 241 in accordance with the main path 2601 in the 2D playlist file 221.

The 2D playlist file 221 may include an entry mark 2901. The entry mark 2901 indicates a time point in the main path 2601 at which playback is actually to start. For example, as shown in FIG. 29, multiple entry marks 2901 can be set for the PI #1. The entry mark 2901 is particularly used for searching for a position to start playback during random access. For example, when the 2D playlist file 221 specifies a playback path for a movie title, the entry marks 2901 are assigned to the top of each chapter. Consequently, the playback device 102 can play back the movie title by chapters.

<<3D Playlist File>>

Figure 30:
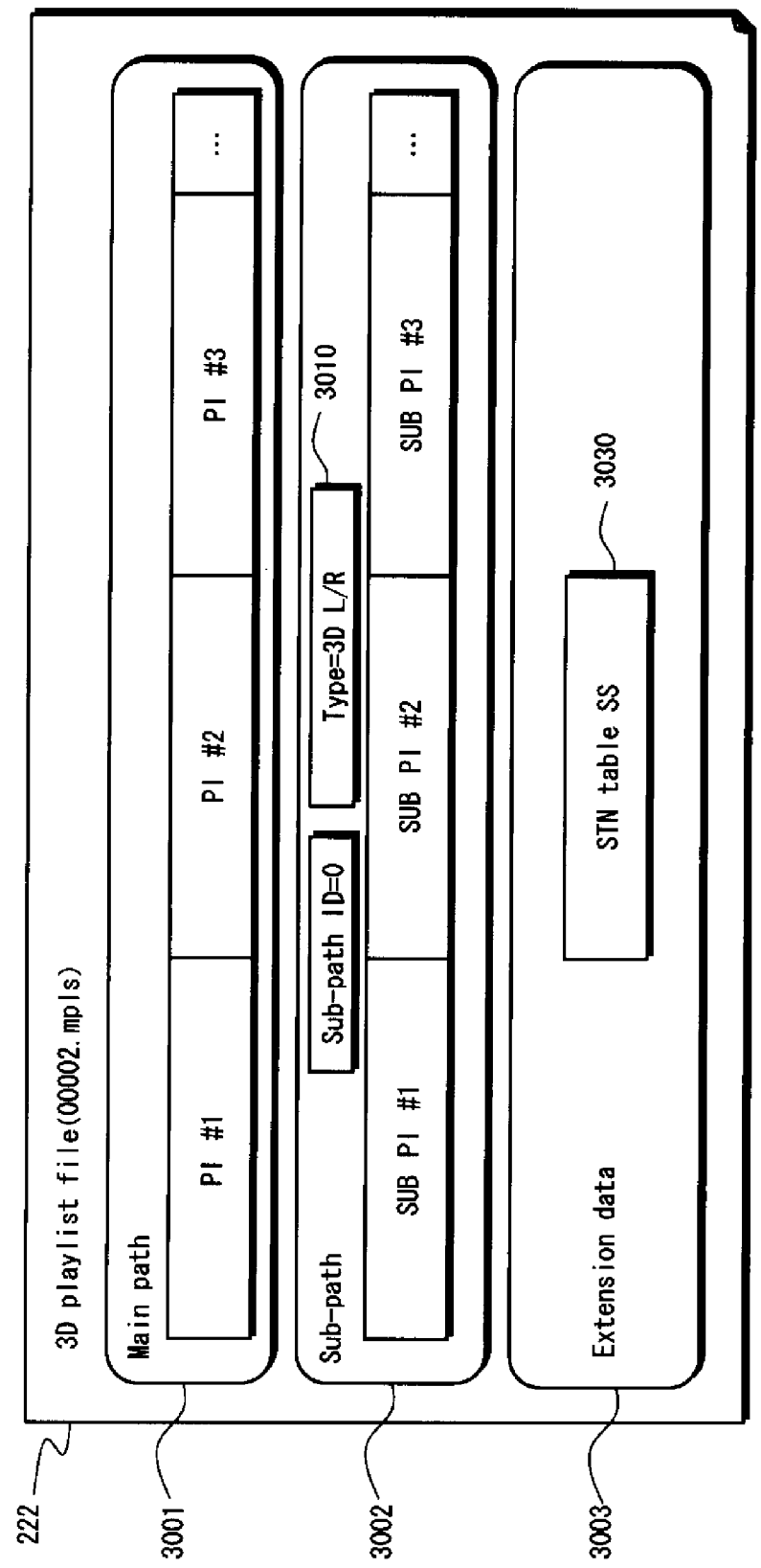
FIG. 30 is a schematic diagram showing the data structure of the 3D playlist file (00002.mpls) 222 shown in FIG. 2.

FIG. 30 is a schematic diagram showing the data structure of a 3D playlist file. The second playlist file (00002.mpls) 222 shown in FIG. 2 has this data structure, as does the second playlist file (00003.mpls) 223. As shown in FIG. 30, the 3D playlist file 222 includes a main path 3001, sub-path 3002, and extension data 3003.

The main path 3001 specifies the playback path of the main TS shown in FIG. 3A. Accordingly, the main path 3001 is the same as the main path 2601 for the 2D playlist file 221 shown in FIG. 26. The playback device 102 in 2D playback mode can play back 2D video images from the file 2D 241 in accordance with the main path 3001 in the 3D playlist file 222.

The sub-path 3002 specifies, the playback path for the sub-TSs shown in FIGS. 3B and 3C, i.e. the playback path for both the first file DEP 242 and the second file DEP 243. The data structure of the sub-path 3002 is the same as the data structure of the sub-paths 2602 and 2603 in the 2D playlist file 241 shown in FIG. 26. Accordingly, details on this similar data structure can be found in the description of FIG. 26, in particular details on the data structure of the SUB_PI.

The SUB_PI #N (N=1, 2, 3, . . . ) in the sub-path 3002 are in one-to-one correspondence with the PI #N in the main path 3001. Furthermore, the playback start time and playback end time specified by each SUB_PI #N is the same as the playback start time and playback end time specified by the corresponding PI #N. The sub-path 3002 additionally includes a sub-path type 3010. The "sub-path type" generally indicates whether playback processing should be synchronized between the main path and the sub-path. In the 3D playlist file 222, the sub-path type 3010 in particular indicates the type of the 3D playback mode, i.e. the type of the dependent-view video stream to be played back in accordance with the sub-path 3002. In FIG. 30, the value of the sub-path type 3010 is "3D L/R", thus indicating that the 3D playback mode is L/R mode, i.e. that the right-view video stream is to be played back. On the other hand, a value of "3D depth" for the sub-path type 3010 indicates that the 3D playback mode is depth mode, i.e. that the depth map stream is to be played back. When the playback device 102 in 3D playback mode detects that the value of the sub-path type 3010 is "3D L/R" or "3D depth", the playback device 102 synchronizes playback processing in accordance with the main path 3001 with playback processing in accordance with the sub-path 3002.

Only the playback device 102 in 3D playback mode interprets the extension data 3003; the playback device 102 in 2D playback mode ignores the extension data 3003. In particular, the extension data 3003 includes an extension stream selection table 3030. The "extension stream selection table (STN table SS)" (hereinafter abbreviated as STN table SS) is an array of stream registration information to be added to the STN tables indicated by each PI in the main path 3001. This stream registration information indicates elementary streams that can be selected for playback from the main TS.

Figure 31:
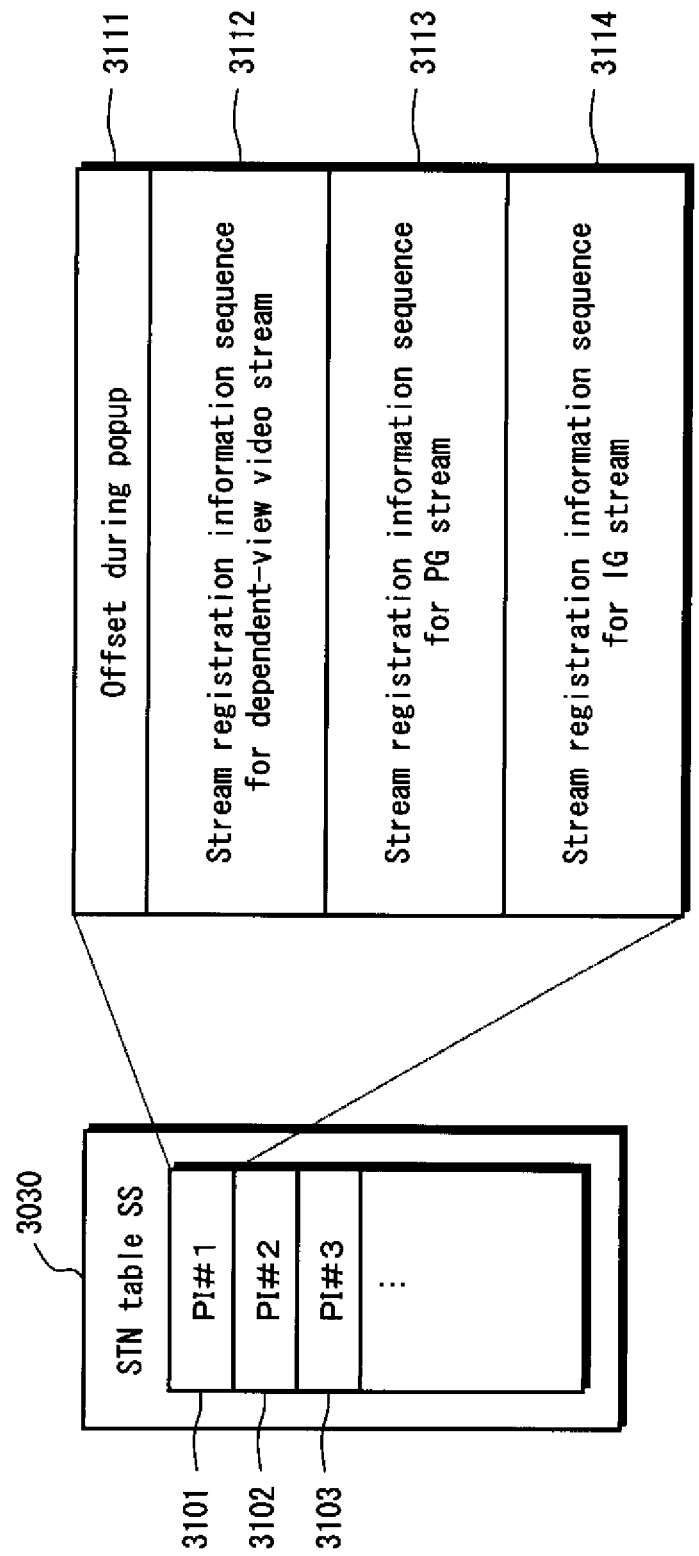
FIG. 31 is a schematic diagram showing the data structure of the STN table SS 3030 shown in FIG. 30.

FIG. 31 is a schematic diagram showing the data structure of an STN table SS 3030. As shown in FIG. 31, an STN table SS 3030 includes stream registration information sequences 3101, 3102, 3103, . . . . The stream registration information sequences 3101, 3102, 3103, . . . individually correspond to the PI #1, PI #2, PI #3, . . . in the main path 3001 and are used by the playback device 102 in 3D playback mode in combination with the stream registration information sequences included in the STN tables in the corresponding PIs. The stream registration information sequence 3101 corresponding to each PI includes an offset during popup (Fixed_offset_during_Popup) 3111, stream registration information sequence 3112 for the dependent-view video streams, stream registration information sequence 3113 for the PG stream, and stream registration information sequence 3114 for the IG stream.

The offset during popup 3111 indicates whether a popup menu is played back from the IG stream. The playback device 102 in 3D playback mode changes the presentation mode of the video plane and the PG plane in accordance with the value of the offset 3111. There are two types of presentation modes for the video plane: base-view (B)—dependent-view (D) presentation mode and B-B presentation mode. There are three types of presentation modes for the PG plane and IG plane: 2 plane mode, 1 plane+offset mode, and 1 plane+zero offset mode. For example, when the value of the offset during popup 3111 is "0", a popup menu is not played back from the IG stream. At this point, B-D presentation mode is selected as the video plane presentation mode, and 2 plane mode or 1 plane+offset mode is selected as the presentation mode for the PG plane. On the other hand, when the value of the offset during popup 3111 is "1", a popup menu is played back from the IG stream. At this point, B-B presentation mode is selected as the video plane presentation mode, and 1 plane+zero offset mode is selected as the presentation mode for the PG plane.

In "B-D presentation mode", the playback device 102 alternately outputs plane data decoded from the left-view and right-view video streams. Accordingly, since left-view and right-view video frames representing video planes are alternately displayed on the screen of the display device 103, a viewer perceives these frames as 3D video images. In "B-B presentation mode", the playback device 102 outputs plane data decoded only from the base-view video stream twice for a frame while maintaining the operation mode in 3D playback mode (in particular, maintaining the frame rate at the value for 3D playback, e.g. 48 frames/second). Accordingly, only either the left-view or right-view frames are displayed on the screen of the playback device 103, and thus a viewer perceives these frames simply as 2D video images.

In "2 plane mode", when the sub-TS includes both left-view and right-view graphics streams, the playback device 102 decodes and alternately outputs left-view and right-view graphics plane data from the graphics streams. In "1 plane+offset mode", the playback device 102 generates a pair of left-view plane data and right-view plane data from the graphics stream in the main TS via cropping processing and alternately outputs these pieces of plane data. In both of these modes, left-view and right-view PG planes are alternately displayed on the screen of the display device 103, and thus a viewer perceives these frames as 3D video images. In "1 plane+zero offset mode", the playback device 102 temporarily stops cropping processing and outputs plane data decoded from the graphics stream in the main TS twice for a frame while maintaining the operation mode in 3D playback mode. Accordingly, only either the left-view or right-view PG planes are displayed on the screen of the playback device 103, and thus a viewer perceives these planes simply as 2D video images.

The playback device 102 in 3D playback mode refers to the offset during popup 3111 for each PI and selects B-B presentation mode and 1 plane+zero offset mode when a popup menu is played back from an IG stream. While a pop-up menu is displayed, other 3D video images are thus temporarily changed to 2D video images. This improves the visibility and usability of the popup menu.

The stream registration information sequence 3112 for the dependent-view video stream, the stream registration information sequence 3113 for the PG streams, and the stream registration information sequence 3114 for the IG streams each include stream registration information indicating the dependent-view video streams, PG streams, and IG streams that can be selected for playback from the sub-TS. These stream registration information sequences 3112, 3113, and 3114 are each used in combination with stream registration information sequences, located in the STN table of the corresponding PI, that respectively indicate base-view streams, PG streams, and IG streams. When reading a piece of stream registration information from an STN table, the playback device 102 in 3D playback mode automatically also reads the stream registration information sequence, located in the STN table SS, that has been combined with the piece of stream registration information. When simply switching from 2D playback mode to 3D playback mode, the playback device 102 can thus maintain already recognized STNs and stream attributes such as language.

FIG. 32A is a schematic diagram showing the data structure of a stream registration information sequence 3112 for dependent-view video streams. As shown in FIG. 32A, this stream registration information sequence 3112 generally includes a plurality of pieces of stream registration information (SS_dependent_view_block) 3201. These are the same in number as the pieces of stream registration information in the corresponding PI that indicate the base-view video stream. Each piece of stream registration information 3201 includes an STN 3211, stream entry 3212, and stream attribute information 3213. The STN 3211 is a serial number assigned individually to pieces of stream registration information 3201 and is the same as the STN of the piece of stream registration information, located in the corresponding PI, with which each piece of stream registration information is combined. The stream entry 3212 includes sub-path ID reference information (ref_to_subpath_id) 3221, stream file reference information (ref_to_subclip_entry_id) 3222, and PID (ref_to_stream PID_subclip) 3223. The sub-path ID reference information 3221 indicates the sub-path ID of the sub-path that specifies the playback path of the dependent-view video stream. The stream file reference information 3222 is information to identify the file DEP storing this dependent-view video stream. The PID 3223 is the PID for this dependent-view video stream. The stream attribute information 3213 includes attributes for this dependent-view video stream, such as frame rate, resolution, and video format. In particular, these attributes are the same as those for the base-view video stream shown by the piece of stream registration information, located in the corresponding PI, with which each piece of stream registration information is combined.

FIG. 32B is a schematic diagram showing the data structure of a stream registration information sequence 3113 for PG streams. As shown in FIG. 32B, this stream registration information sequence 3113 generally includes a plurality of pieces of stream registration information 3231. These are the same in number as the pieces of stream registration information in the corresponding PI that indicates the PG streams. Each piece of stream registration information 3231 includes an STN 3241, stereoscopic flag (is_SS_PG) 3242, base-view stream entry (stream_entry_for_base_view) 3243, dependent-view stream entry (stream_entry_for_dependent_view) 3244, and stream attribute information 3245. The STN 3241 is a serial number assigned individually to pieces of stream registration information 3231 and is the same as the STN of the piece of stream registration information, located in the corresponding PI, with which each piece of stream registration information 3231 is combined. The stereoscopic flag 3242 indicates whether both base-view and dependent-view, e.g. left-view and right-view, PG streams are included on a BD-ROM disc 101. If the stereoscopic flag 3242 is on, both PG streams are included in the sub-TS. Accordingly, the playback device reads all of the fields in the base-view stream entry 3243, the dependent-view stream entry 3244, and the stream attribute information 3245. If the stereoscopic flag 3242 is off, the playback device ignores all of these fields 3243-3245. Both the base-view stream entry 3243 and the dependent-view stream entry 3244 include sub-path ID reference information, stream file reference information, and a PID. The sub-path ID reference information indicates the sub-path IDs of the sub-paths that specify the playback paths of the base-view and dependent-view PG streams. The stream file reference information is information to identify the file DEP storing the PG streams. The PIDs are the PIDs for the PG streams. The stream attribute information 3245 includes attributes for the PG streams, e.g. language type.

FIG. 32C is a schematic diagram showing the data structure of a stream registration information sequence 3114 for IG streams. As shown in FIG. 32C, this stream registration information sequence 3114 generally includes a plurality of pieces of stream registration information 3251. These are the same in number as the pieces of stream registration information in the corresponding PI that indicates the IG streams. Each piece of stream registration information 3251 includes an STN 3261, stereoscopic flag (is_SS_IG) 3262, base-view stream entry 3263, dependent-view stream entry 3264, and stream attribute information 3265. The STN 3261 is a serial number assigned individually to pieces of stream registration information 3251 and is the same as the STN of the piece of stream registration information, located in the corresponding PI, with which each piece of stream registration information 3251 is combined. The stereoscopic flag 3262 indicates whether both base-view and dependent-view, e.g. left-view and right-view, IG streams are included on a BD-ROM disc 101. If the stereoscopic flag 3262 is on, both IG streams are included in the sub-TS. Accordingly, the playback device reads all of the fields in the base-view stream entry 3263, the dependent-view stream entry 3264, and the stream attribute information 3265. If the stereoscopic flag 3262 is off, the playback device ignores all of these fields 3263-3265. Both the base-view stream entry 3263 and the dependent-view stream entry 3264 include sub-path ID reference information, stream file reference information, and a PID. The sub-path ID reference information indicates the sub-path IDs of the sub-paths that specify the playback paths of the base-view and dependent-view IG streams. The stream file reference information is information to identify the file DEP storing the IG streams. The PIDs are the PIDs for the IG streams. The stream attribute information 3265 includes attributes for the IG streams, e.g. language type.

[Playback of 3D Video Images in Accordance With a 3D Playlist File]

Figure 33:
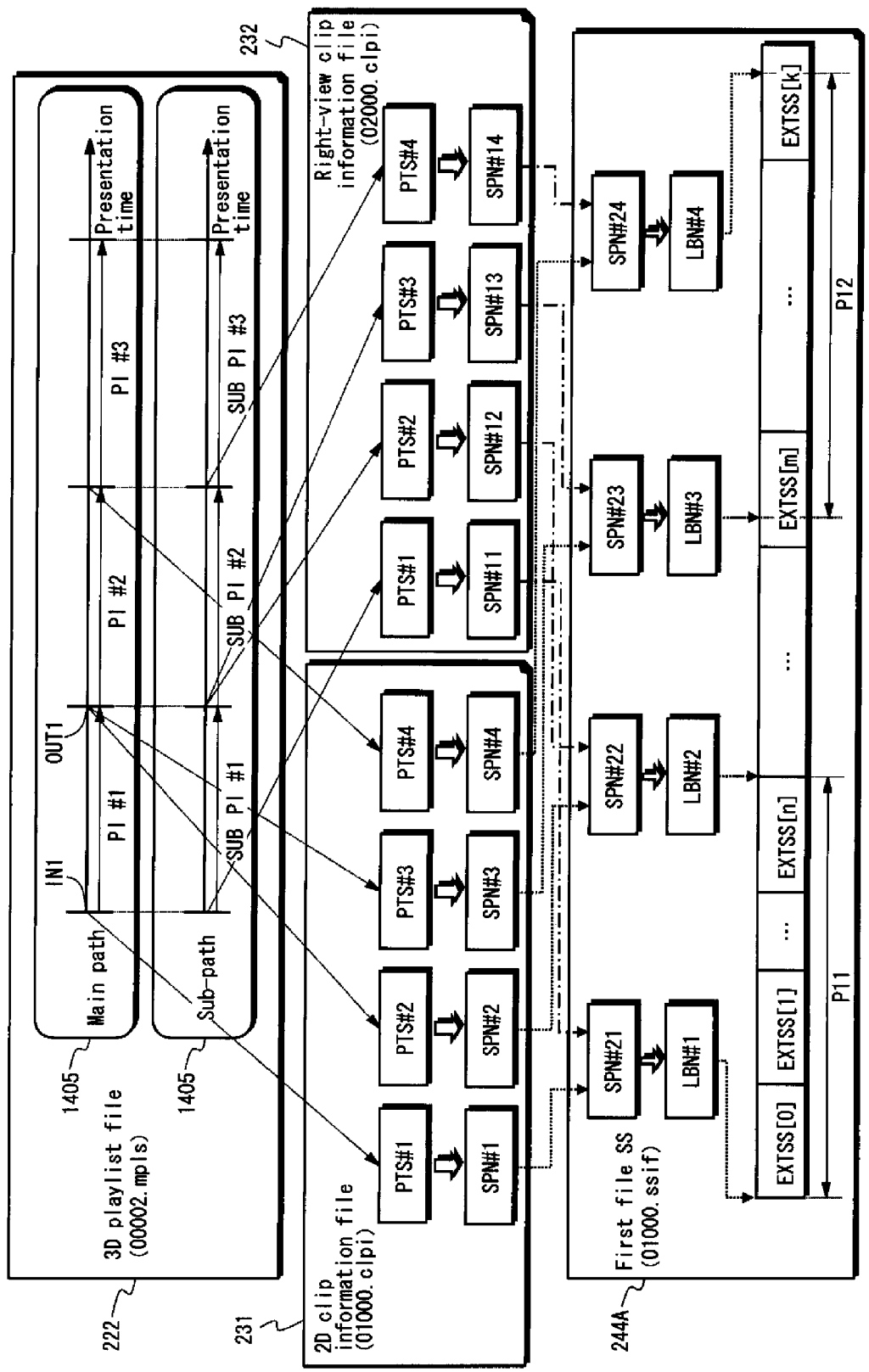
FIG. 33 is a schematic diagram showing the relationships between the PTSs indicated by the 3D playlist file (00002.mpls) 222 shown in FIG. 30 and the sections played back from the first file SS (01000.ssif) 244A shown in FIG. 2.

FIG. 33 is a schematic diagram showing the relationships between the PTSs indicated by the 3D playlist file (00002.mpls) 222 and the sections played back from the first file SS (01000.ssif) 244A. As shown in FIG. 33, in the main path 3001 of the 3D playlist file 222, the PI #1 specifies a PTS #1, which indicates a playback start time IN1, and a PTS #2, which indicates a playback end time OUT1. The reference clip information for the PI #1 indicates the 2D clip information file (01000.clpi) 231. In the sub-path 3002, which indicates that the sub-path type is "3D L/R", the SUB_PI #1 specifies the same PTS #1 and PTS #2 as the PI #1. The reference clip information for the SUB_PI #1 indicates the right-view clip information file (02000.clpi) 232.

When playing back 3D video images in accordance with the 3D playlist file 222, the playback device 102 first reads PTS #1 and PTS #2 from the PI #1 and SUB_PI #1. Next, the playback device 102 refers to the entry map in the 2D clip information file 231 to retrieve from the file 2D 241 the SPN #1 and SPN #2 that correspond to the PTS #1 and PTS #2. In parallel, the playback device 102 refers to the entry map in the right-view clip information file 232 to retrieve from the first file DEP 242 the SPN #11 and SPN #12 that correspond to the PTS #1 and PTS #2. As described with reference to FIG. 23E, the playback device 102 then uses the extent start points 2042 and 2320 in the clip information files 231 and 232 to calculate, from SPN #1 and SPN #11, the number of source packets SPN #21 from the top of the first file SS 244A to the position to start playback. Similarly, the playback device 102 calculates, from SPN #2 and SPN #12, the number of source packets SPN #22 from the top of the first file SS 244A to the position to start playback. The playback device 102 further calculates the numbers of sectors corresponding to the SPN #21 and SPN #22. Next, the playback device 102 refers to these numbers of sectors and the allocation descriptors in the file entry for the file SS 244A to specify the LBN #1 and LBN #2 at the beginning and end, respectively, of the sector group P11 on which the 3D extent group EXTSS[0], . . . , EXTSS[n] to be played back is recorded. Calculation of the numbers of sectors and specification of the LBNs are as per the description of FIG. 23E. Finally, the playback device 102 indicates the range from LBN #1 to LBN #2 to the BD-ROM drive 121. The source packet group belonging to the 3D extent group EXTSS[0], . . . , EXTSS[n] is thus read from the sector group P11 in this range. Similarly, the pair PTS #3 and PTS #4 indicated by the PI #2 and SUB_PI #2 are first converted into a pair of SPN #3 and SPN #4 and a pair of SPN #13 and SPN #14 by referring to the entry maps in the clip information files 231 and 232. Then, the number of source packets SPN #23 from the top of the first file SS 244A to the position to start playback is calculated from SPN #3 and SPN #13, and the number of source packets SPN #24 from the top of the first file SS 244A to the position to end playback is calculated from SPN #4 and SPN #14. Next, referring to the file entry for the first file SS 244A, the pair of SPN #23 and SPN #24 are converted into a pair of LBN #3 and LBN #4. Furthermore, a source packet group belonging to the 3D extent group is read from the sector group P12 in a range from the LBN #3 to the LEN #4.

In parallel with the above-described read processing, as described with reference to FIG. 23E, the playback device 102 refers to the extent start points 2042 and 2320 in the clip information files 231 and 232 to extract base-view extents from each 3D extent and decode the base-view extents in parallel with the remaining right-view extents. The playback device 102 can thus play back 3D video images from the first file SS 244A in accordance with the 3D playlist file 222.

<<Index Table>>

Figure 34:
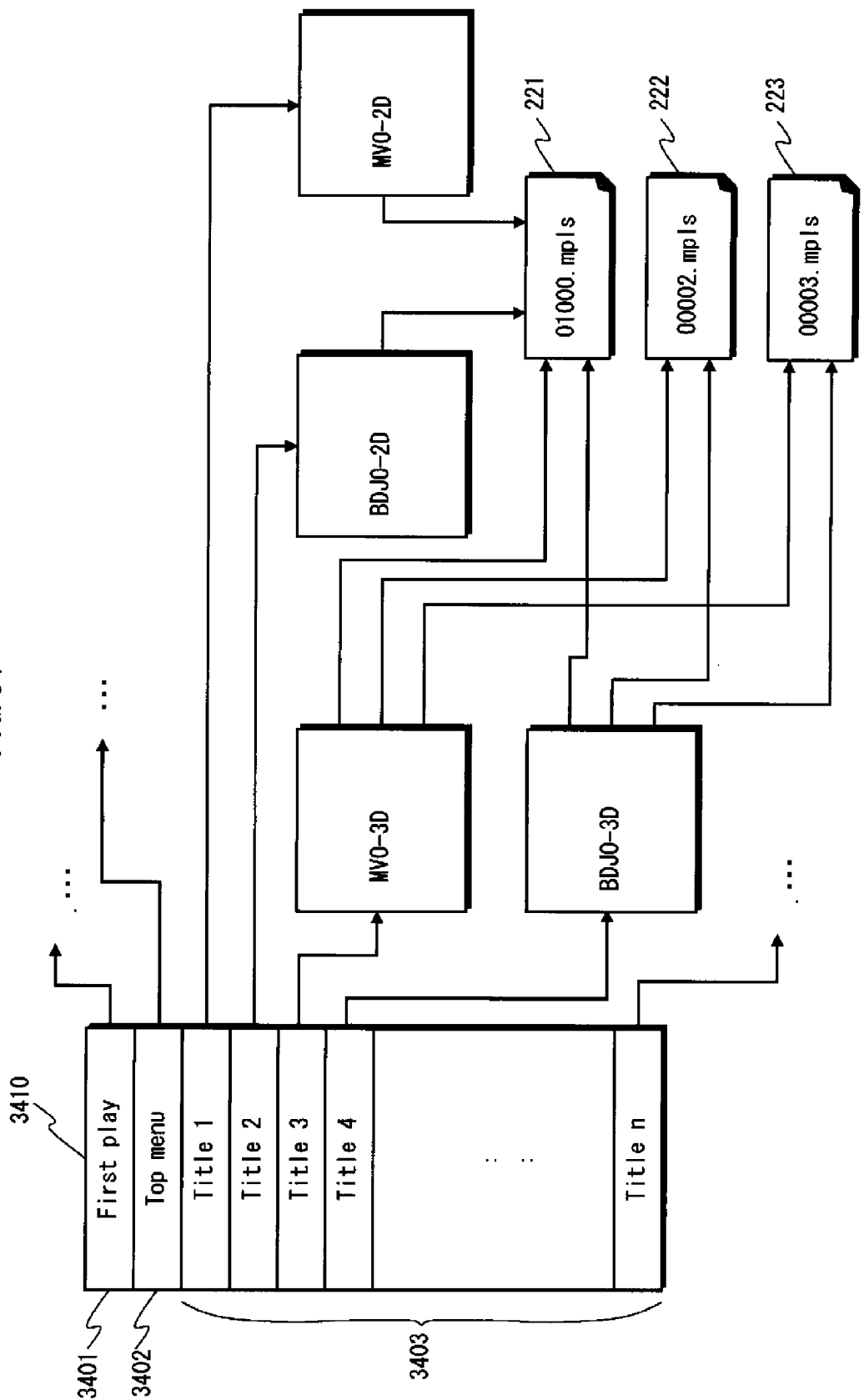
FIG. 34 is a schematic diagram showing an index table 3410 in the index file (index.bdmv) 211 shown in FIG. 2.

FIG. 34 is a schematic diagram showing an index table 3410 in the index file (index.bdmv) 211 shown in FIG. 2. As shown in FIG. 34, the index table 3410 stores the items "first play" 3401, "top menu" 3402, and "title k" 3403 (k=1, 2, . . . , n; an integer n is equal to or greater than one). Each item is associated with either a movie object MVO-2D, MVO-3D, . . . , or with a BD-J object BDJO-2D, BDJO-3D, . . . . Each time a title or a menu is called in response to a user operation or an application program, a control unit in the playback device 102 refers to a corresponding item in the index table 3410. Furthermore, the control unit calls an object associated with the item from the BD-ROM disc 101 and accordingly executes a variety of processes. Specifically, the "first play" 3401 specifies an object to be called when the disc 101 is loaded into the BD-ROM drive 121. The "top menu" 3402 specifies an object for displaying a menu on the display device 103 when a command "go back to menu" is input, for example, by user operation. In the "title k" 3403, the titles that constitute the content on the disc 101 are individually allocated. For example, when a title for playback is specified by user operation, in the item "title k" in which the title is allocated, the object for playing back a video from the AV stream file corresponding to the title is specified.

In the example shown in FIG. 34, the items "title 1" and "title 2" are allocated to titles of 2D video images. The movie object associated with the item "title 1", MVO-2D, includes a group of commands related to playback processes for 2D video images using the 2D playlist file (00001.mpls) 221. When the playback device 102 refers to the item "title 1", then in accordance with the movie object MVO-2D, the 2D playlist file 221 is read from the disc 101, and playback processes for 2D video images are executed in accordance with the playback path specified therein. The BD-J object associated with the item "title 2", BDJO-2D, includes an application management table related to playback processes for 2D video images using the 2D playlist file 221. When the playback device 102 refers to the item "title 2", then in accordance with the application management table in the BD-J object BDJO-2D, a Java application program is called from the JAR file 261 and executed. In this way, the 2D playlist file 221 is read from the disc 101, and playback processes for 2D video images are executed in accordance with the playback path specified therein.

Furthermore, in the example shown in FIG. 34, the items "title 3" and "title 4" are allocated to titles of 3D video images. The movie object associated with the item "title 3", MVO-3D, includes, in addition to a group of commands related to playback processes for 2D video images using the 2D playlist file 221, a group of commands related to playback processes for 3D video images using either 3D playlist file (00002.mpls) 222 or (00003.mpls) 223. In the BD-J object associated with the item "title 4", BDJO-3D, the application management table specifies, in addition to a Java application program related to playback processes for 2D video images using the 2D playlist file 221, a Java application program related to playback processes for 3D video images using either 3D playlist file 222 or 223.

When the playback device 102 refers to item "title 3", the following four determination processes are performed in accordance with the movie object MVO-3D: (1) does the playback device 102 itself support playback of 3D video images? (2) has the user selected playback of 3D video images? (3) does the display device 103 support playback of 3D video images? and (4) is the 3D video playback mode of the playback device 102 in L/R mode or depth mode? Next, in accordance with the results of these determinations, one of the playlist files 221-223 is selected for playback. When the playback device 102 refers to item "title 4", a Java application program is called from the JAR file 261, in accordance with the application management table in the BD-J object BDJO-3D, and executed. The above-described determination processes are thus performed, and a playlist file is then selected in accordance with the results of determination.

[Selection of Playlist File when Selecting a 3D Video Title]

Figure 35:
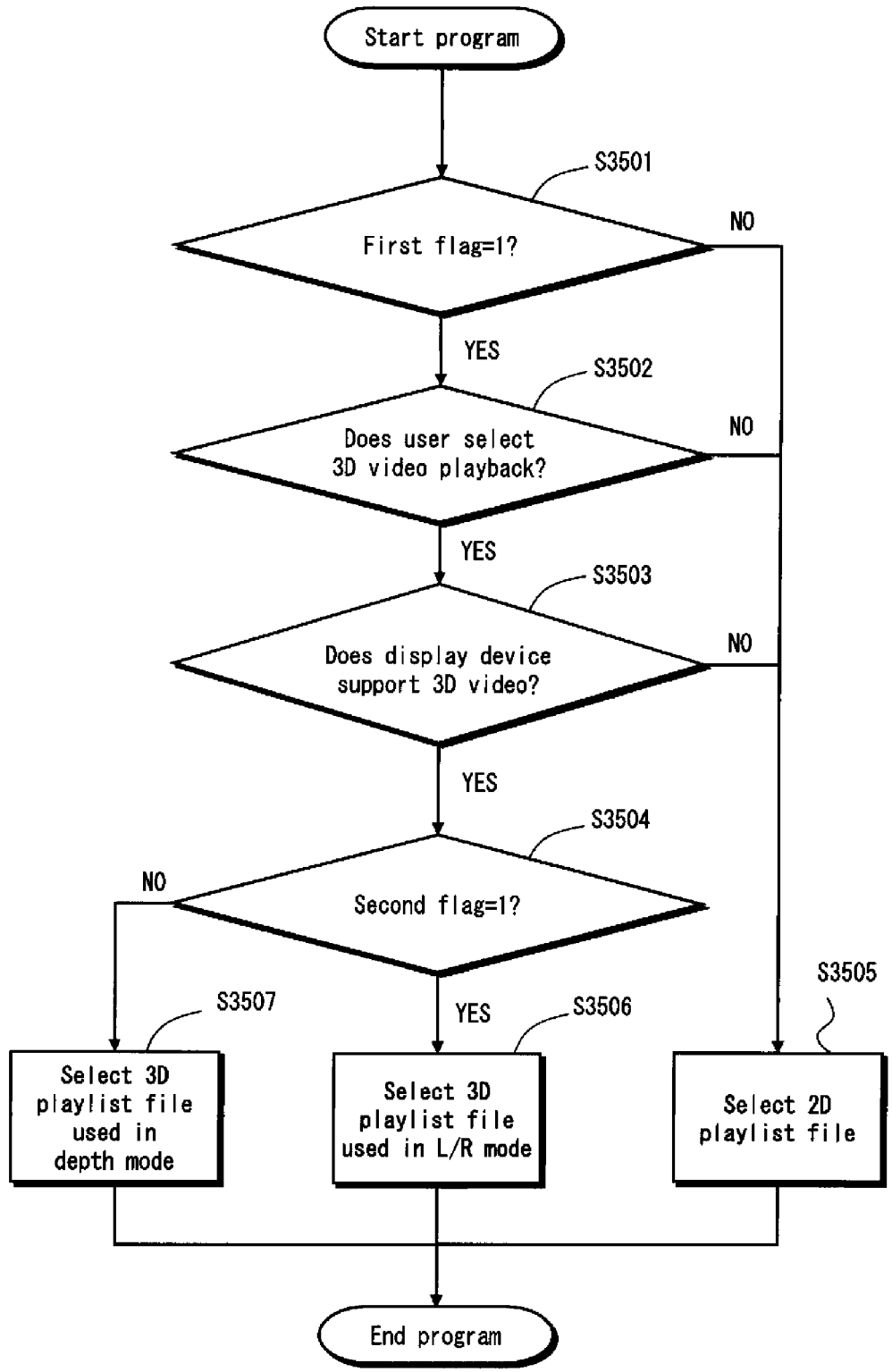
FIG. 35 is a flowchart of selection processing for a playlist file to be played back, the processing being performed when a 3D video title is selected by the playback device 102 according to embodiment 1 of the present invention.

FIG. 35 is a flowchart of selection processing for a playlist file to be played back, the processing being performed when a 3D video title is selected. In the index table 3410 shown in FIG. 34, selection processing is performed in accordance with the movie object MVO-3D when referring to the item "title 3", and selection processing is performed in accordance with the Java application program specified by the BD-J object BDJO-3D when referring to the item "title 4".

In light of this selection processing, it is assumed that the playback device 102 includes a first flag and a second flag. A value of "0" for the first flag indicates that the playback device 102 only supports playback of 2D video images, whereas "1" indicates support of 3D video images as well. A value of "0" for the second flag indicates that the playback device 102 is in L/R mode, whereas "1" indicates depth mode.

In step S3501, the playback device 102 checks the value of the first flag. If the value is "0", processing proceeds to step S3505. If the value is "1", processing proceeds to step S3502.

In step S3502, the playback device 102 displays a menu on the display device 103 for the user to select playback of either 2D or 3D video images. If the user selects playback of 2D video images via operation of a remote control 105 or the like, processing proceeds to step S3505, whereas if the user selects 3D video images, processing proceeds to step S3503.

In step S3503, the playback device 102 checks whether the display device 103 supports playback of 3D video images. Specifically, the playback device 102 exchanges CEC messages with the display device 103 via an HDMI cable 122 to check with the display device 103 as to whether it supports playback of 3D video images. If the display device 103 does support playback of 3D video images, processing proceeds to step S3504. If not, processing proceeds to step S3505.

In step S3504, the playback device 102 checks the value of the second flag. If this value is "0", processing proceeds to step S3506. If this value is "1", processing proceeds to step S3507.

In step S3505, the playback device 102 selects for playback the 2D playlist file 221. Note that, at this time, the playback device 102 may cause the display device 103 to display the reason why playback of 3D video images was not selected. Processing then terminates.

In step S3506, the playback device 102 selects for playback the 3D playlist file 222 used in L/R mode. Processing then terminates.

In step S3507, the playback device 102 selects for playback the 3D playlist file 223 used in depth mode. Processing then terminates.

<Structure of 2D Playback Device>

Figure 36:
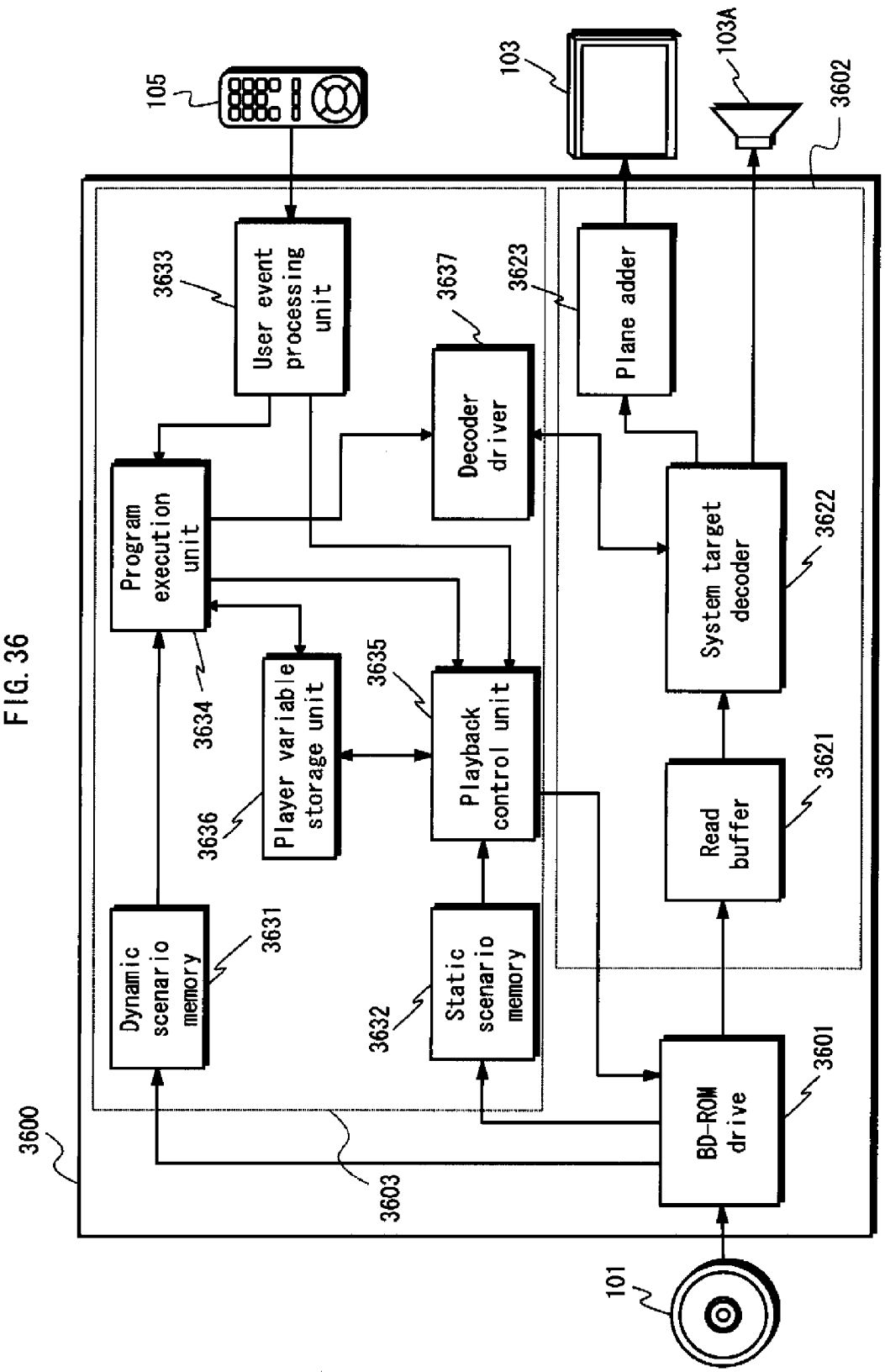
FIG. 36 is a functional block diagram of the playback device 102 according to embodiment 1 of the present invention in 2D playback mode.

When playing back 2D video contents from a BD-ROM disc 101 in 2D playback mode, the playback device 102 operates as a 2D playback device. FIG. 36 is a functional block diagram of a 2D playback device 3600. As shown in FIG. 36, the 2D playback device 3600 includes a BD-ROM drive 3601, playback unit 3602, and control unit 3603. The playback unit 3602 includes a read buffer 3621, system target decoder 3622, and plane adder 3623. The control unit 3603 includes a dynamic scenario memory 3631, static scenario memory 3632, user event processing unit 3633, program execution unit 3634, playback control unit 3635, player variable storage unit 3636, and decoder driver 3637. The playback unit 3602 and the control unit 3603 are each implemented on a different integrated circuit, but may alternatively be implemented on a single integrated circuit.

When the BD-ROM disc 101 is loaded into the BD-ROM drive 3601, the BD-ROM drive 3601 radiates laser light to the disc 101 and detects change in the light reflected from the disc 101. Furthermore, using the change in the amount of reflected light, the BD-ROM drive 3601 reads data recorded on the disc 101. Specifically, the BD-ROM drive 3601 has an optical pickup, i.e. an optical head. The optical head has a semiconductor laser, a collimate lens, a beam splitter, an objective lens, a collecting lens, and an optical detector. A beam of light radiated from the semiconductor laser sequentially passes through the collimate lens, the beam splitter, and the objective lens to be collected on a recording layer of the disc 101. The collected beam is reflected and diffracted by the recording layer. The reflected and diffracted light passes through the objective lens, the beam splitter, and the collecting lens, and is collected onto the optical detector. The optical detector generates a playback signal at a level in accordance with the amount of collected light. Furthermore, data is decoded from the playback signal.

The BD-ROM drive 3601 reads data from the BD-ROM disc 101 based on a request from the playback control unit 3635. Out of the read data, the extents in the file 2D, i.e. the 2D extents, are transferred to the read buffer 3621; dynamic scenario information is transferred to the dynamic scenario memory 3631; and static scenario information is transferred to the static scenario memory 3632. "Dynamic scenario information" includes an index file, movie object file, and BD-J object file. "Static scenario information" includes a 2D playlist file and a 2D clip information file.

The read buffer 3621, the dynamic scenario memory 3631, and the static scenario memory 3632 are each a buffer memory. A memory element in the playback unit 3602 is used as the read buffer 3621. Memory elements in the control unit 3603 are used as the dynamic scenario memory 3631 and the static scenario memory 3632. Alternatively, different areas in a single memory element may be used as part or all of these buffer memories 3621, 3631, and 3632. The read buffer 3621 stores 2D extents, the dynamic scenario memory 3631 stores dynamic scenario information, and the static scenario memory 3632 stores static scenario information.

The system target decoder 3622 reads 2D extents from the read buffer 3621 in units of source packets and demultiplexes the 2D extents. The system target decoder 3622 then decodes each of the elementary streams obtained by the demultiplexing. At this point, information necessary for decoding each elementary stream, such as the type of codec and attributes of the stream, is transferred from the playback control unit 3635 to the system target decoder 3622 via the decoder driver 3637. The system target decoder 3622 outputs a primary video stream, secondary video stream, IG stream, and PG stream respectively as primary video plane data, secondary video plane data, IG plane data, and PG plane data, in units of VAUs. On the other hand, the system target decoder 3622 mixes the decoded primary audio stream and secondary audio stream and transmits the resultant data to an audio output device, such as an internal speaker 103A of the display device 103. In addition, the system target decoder 3622 receives graphics data from the program execution unit 3634 via the decoder driver 3637. The graphics data is used for rendering graphics such as a GUI menu on a screen and is in a raster data format such as JPEG and PNG. The system target decoder 3622 processes the graphics data and outputs the data as image plane data. Details on the system target decoder 3622 are described below.

The plane adder 3623 receives primary video plane data, secondary video plane data, IG plane data, PG plane data, and image plane data from the system target decoder 3622 and superimposes these pieces of plane data to generate one composite video frame or field. The composited video data is transferred to the display device 103 for display on the screen.

The user event processing unit 3633 detects a user operation via the remote control 105 or the front panel of the playback device 102. Based on the user operation, the user event processing unit 3633 requests the program execution unit 3634 or the playback control unit 3635 to perform a relevant process. For example, when a user instructs to display a pop-up menu by pushing a button on the remote control 105, the user event processing unit 3633 detects the push and identifies the button. The user event processing unit 3633 further requests the program execution unit 3634 to execute a command corresponding to the button, i.e. a command to display the pop-up menu. On the other hand, when a user pushes a fast-forward or a rewind button on the remote control 105, for example, the user event processing unit 3633 detects the push, identifies the button, and requests the playback control unit 3635 to fast-forward or rewind the playlist currently being played back.

The program execution unit 3634 is a processor that reads programs from movie object files and BD-J object files stored in the dynamic scenario memory 3631 and executes these programs. Furthermore, the program execution unit 3634 performs the following operations in accordance with the programs. (1) The program execution unit 3634 orders the playback control unit 3635 to perform playlist playback processing. (2) The program execution unit 3634 generates graphics data for a menu or game as PNG or JPEG raster data and transfers the generated data to the system target decoder 3622 to be composited with other video data. Via program design, specific details on these processes can be designed relatively flexibly. In other words, during the authoring process of the BD-ROM disc 101, the nature of these processes is determined while programming the movie object files and BD-J object files.

The playback control unit 3635 controls transfer of different types of data, such as 2D extents, an index file, etc. from the BD-ROM disc 101 to the read buffer 3621, the dynamic scenario memory 3631, and the static scenario memory 3632. A file system managing the directory file structure shown in FIG. 2 is used for this control. That is, the playback control unit 3635 causes the BD-ROM drive 3601 to transfer the files to each of the buffer memories 3631, 3631, and 3632 using a system call for opening files. The "file opening" is composed of a series of the following processes. First, a file name to be detected is provided to the file system by a system call, and an attempt is made to detect the file name from the directory/file structure. When the detection is successful, the file entry for the target file is first transferred to memory in the playback control unit 3635, and an FCB (File Control Block) is generated in the memory. Subsequently, a file handle for the target file is returned from the file system to the playback control unit 3635. After this, the playback control unit 3635 can transfer the target file from the BD-ROM disc 101 to each of the buffer memories 3621, 3631, and 3632 by showing the file handle to the BD-ROM drive 3601.

The playback control unit 3635 decodes the file 2D to output video data and audio data by controlling the BD-ROM drive 3601 and the system target decoder 3622. Specifically, the playback control unit 3635 first reads a 2D playlist file from the static scenario memory 3632, in response to an instruction from the program execution unit 3634 or a request from the user event processing unit 3633, and interprets the content of the file. In accordance with the interpreted content, particularly with the playback path, the playback control unit 3635 then specifies a file 2D to be played back and instructs the BD-ROM drive 3601 and the system target decoder 3622 to read and decode this file. Such playback processing based on a playlist file is called "playlist playback". In addition, the playback control unit 3635 sets various types of player variables in the player variable storage unit 3636 using the static scenario information. With reference to the player variables, the playback control unit 3635 further specifies to the system target decoder 3622 elementary streams to be decoded and provides the information necessary for decoding the elementary streams.

The player variable storage unit 3636 is composed of a group of registers for storing player variables. Types of player variables include system parameters (SPRM) and general parameters (GPRM). FIG. 37 is a list of SPRMs. Each SPRM is assigned a serial number 3701, and each serial number 3701 is associated with a unique variable value 3702. The contents of major SPRMs are shown below. Here, the numbers in parentheses indicate the serial numbers 3701.

SPRM(0): Language code
SPRM(1): Primary audio stream number
SPRM(2): Subtitle stream number
SPRM(3): Angle number
SPRM(4): Title number
SPRM(5): Chapter number
SPRM(6): Program number
SPRM(7): Cell number
SPRM(8): Key name
SPRM(9): Navigation timer
SPRM(10): Current playback time
SPRM(11): Player audio mixing mode for Karaoke
SPRM(12): Country code for parental management
SPRM(13): Parental level
SPRM(14): Player configuration for Video
SPRM(15): Player configuration for Audio
SPRM(16): Language code for audio stream
SPRM(17): Language code extension for audio stream
SPRM(18): Language code for subtitle stream
SPRM(19): Language code extension for subtitle stream
SPRM(20): Player region code
SPRM(21): Secondary video stream number
SPRM(22): Secondary audio stream number
SPRM(23): Player status
SPRM(24): Reserved
SPRM(25): Reserved
SPRM(26): Reserved
SPRM(27): Reserved
SPRM(28): Reserved
SPRM(29): Reserved
SPRM(30): Reserved
SPRM(31): Reserved The SPRM(10) indicates the PTS of the picture currently being decoded and is updated every time a picture is decoded and written into the primary video plane memory. Accordingly, the current playback point can be known by referring to the SPRM(10).

The language code for audio stream in SPRM(16) and the language code for subtitle stream in SPRM(18) show default language codes of the playback device 102. These codes may be changed by a user with use of the on-screen display (OSD) or the like for the playback device 102, or may be changed by an application program via the program execution unit 3634. For example, if the SPRM(16) shows "English", in playback processing of a playlist, the playback control unit 3635 first searches the STN table in the PI for a stream entry having the language code for "English". The playback control unit 3635 then extracts the PID from the stream identification information of the stream entry and transmits the extracted PID to the system target decoder 3622. As a result, an audio stream having the same PID is selected and decoded by the system target decoder 3622. These processes can be executed by the playback control unit 3635 with use of the movie object file or the BD-J object file.

During playback processing, the playback control unit 3635 updates the player variables in accordance with the status of playback. The playback control unit 3635 updates the SPRM(1), SPRM(2), SPRM(21), and SPRM(22) in particular. These SPRM respectively show, in the stated order, the STN of the audio stream, subtitle stream, secondary video stream, and secondary audio stream that are currently being processed. For example, suppose that the audio stream number SPRM(1) has been changed by the program execution unit 3634. In this case, the playback control unit 3635 first refers to the STN shown by the new SPRM(1) and retrieves the stream entry that includes this STN from the STN table in the PI currently being played back. The playback control unit 3635 then extracts the PID from the stream identification information in the stream entry and transmits the extracted PID to the system target decoder 3622. As a result, the audio stream having the same PID is selected and decoded by the system target decoder 3622. This is how the audio stream targeted for playback is switched. The subtitle stream and the secondary video stream to be played back can be similarly switched.

The decoder driver 3637 is a device driver for the system target decoder 3622 and functions as an interface between the system target decoder 3622 on the one hand and the program execution unit 3634 and playback control unit 3635 on the other. Specifically, the program execution unit 3634 and playback control unit 3635 transmit instructions for the system target decoder 3622 to the decoder driver 3637. The decoder driver 3637 then converts these instructions into commands in conformity with the actual hardware in the system target decoder 3622 and transfers these commands to the system target decoder 3622.

Furthermore, when causing the system target decoder 3622 to decode pictures from 2D extents, the decoder driver 3637 participates in the decoding process as follows. The decoder driver 3637 first causes the system target decoder 3622 to analyze the header of the VAU that includes the picture to be decoded. This header includes the sequence header 931E, picture header 931C, and supplementary data 931D, as well as the slice headers in the compressed picture data 931E, which are shown in FIG. 9. The decoder driver 3637 then receives the results of analysis from the system target decoder 3622 and determines the decoding method for the picture based on the results. Subsequently, the decoder driver 3637 indicates the decoding method to the system target decoder 3622. The system target decoder 3622 begins to decode the picture according to the indicated decoding method. Details on these processes are provided below.

<<System Target Decoder>>

Figure 38:
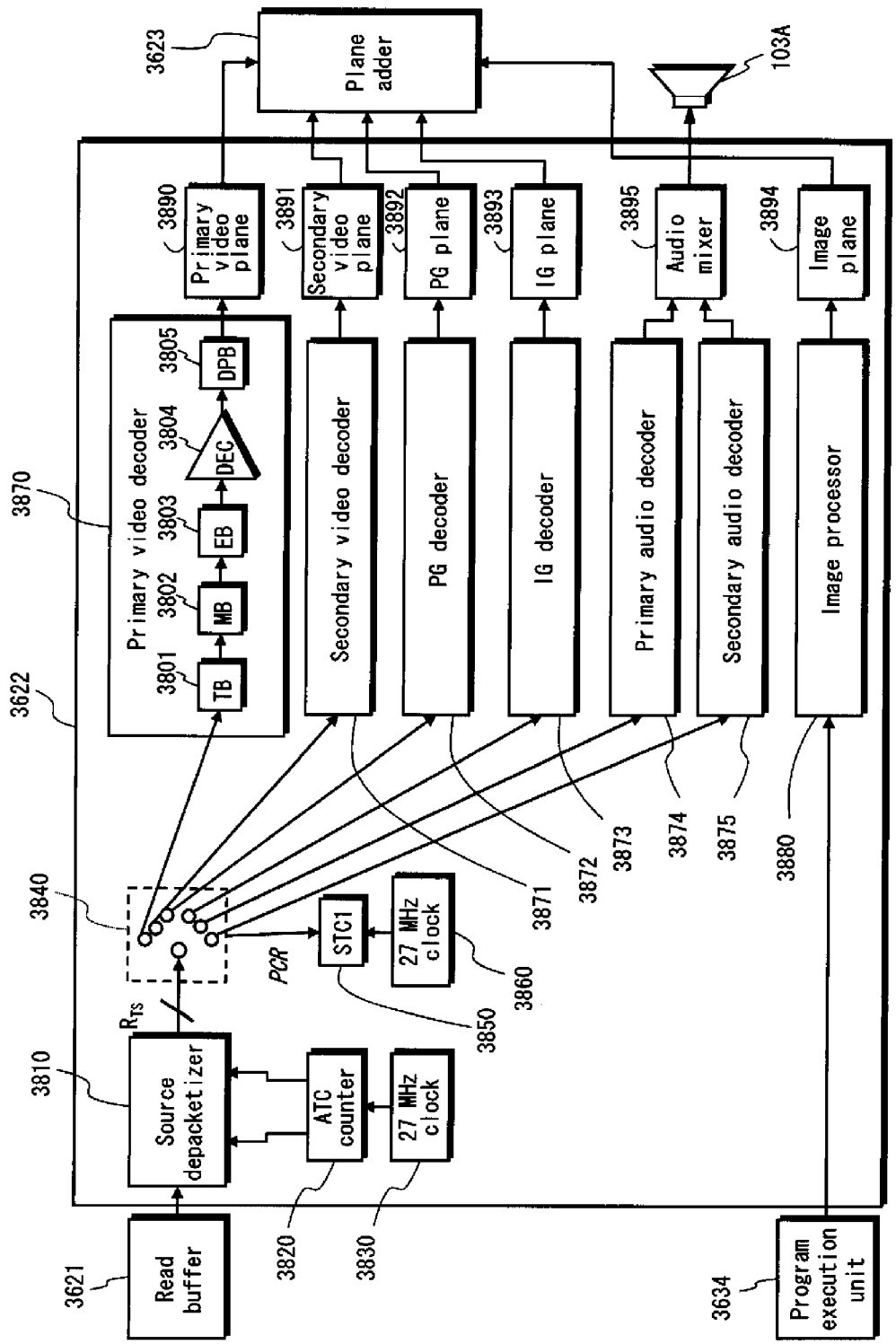
FIG. 38 is a functional block diagram of the system target decoder 3603 shown in FIG. 36.

FIG. 38 is a functional block diagram of the system target decoder 3622. As shown in FIG. 38, the system target decoder 3622 includes a source depacketizer 3810, ATC counter 3820, first 27 MHz clock 3830, PID filter 3840, STC counter (STC1) 3850, second 27 MHz clock 3860, primary video decoder 3870, secondary video decoder 3871, PG decoder 3872, IG decoder 3873, primary audio decoder 3874, secondary audio decoder 3875, image processor 3880, primary video plane memory 3890, secondary video plane memory 3891, PG plane memory 3892, IG plane memory 3893, image plane memory 3894, and audio mixer 3895.

The source depacketizer 3810 reads source packets from the read buffer 3621, extracts the TS packets from the read source packets, and transfers the TS packets to the PID filter 3840. Furthermore, the source depacketizer 3810 synchronizes the time of the transfer with the time shown by the ATS of each source packet. Specifically, the source depacketizer 3810 first monitors the value of the ATC generated by the ATC counter 3820. In this case, the value of the ATC depends on the ATC counter 3820, and is incremented in accordance with a pulse of the clock signal of the first 27 MHz clock 3830. Subsequently, at the instant the value of the ATC matches the ATS of a source packet, the source depacketizer 3810 transfers the TS packets extracted from the source packet to the PID filter 3840. By adjusting the time of transfer in this way, the mean transfer rate $R_{TS}$ of TS packets from the source depacketizer 3810 to the PID filter 3840 does not surpass the system rate 2011 shown by the 2D clip information file in FIG. 20.

The PID filter 3840 first monitors a PID that includes each TS packet outputted by the source depacketizer 3810. When the PID matches a PID pre-specified by the playback control unit 3635, the PID filter 3840 selects the TS packet and transfers it to the decoder 3870-3875 appropriate for decoding of the elementary stream indicated by the PID. For example, if a PID is 0x1011, the TS packets are transferred to the primary video decoder 3870, whereas TS packets with PIDs ranging from 0x1B00-0x1B1F, 0x1100-0x111F, 0x1A00-0x1A1F, 0x1200-0x121F, and 0x1400-0x141F are transferred to the secondary video decoder 3871, the primary audio decoder 3874, the secondary audio decoder 3875, the PG decoder 3872, and the IG decoder 3873, respectively.

The PID filter 3840 further detects a PCR from TS packets using the PIDs of the TS packets. At each detection, the PID filter 3840 sets the value of the STC counter 3850 to a predetermined value. Then, the value of the STC counter 3850 is incremented in accordance with a pulse of the clock signal of the second 27 MHz clock 3860. In addition, the value to which the STC counter 3850 is set is indicated to the PID filter 3840 from the playback control unit 3635 in advance. The decoders 3870-3875 each use the value of the STC counter 3850 as the STC. That is, the decoders 3870-3875 adjust the timing of decoding of the TS packets outputted from the PID filter 3840 in accordance with the times indicated by the PTSs or the DTSs included in the TS packets.

The primary video decoder 3870, as shown in FIG. 38, includes a transport stream buffer (TB) 3801, multiplexing buffer (MB) 3802, elementary stream buffer (EB) 3803, compressed video decoder (DEC) 3804, and decoded picture buffer (DPB) 3805.

The TB 3801, MB 3802, and EB 3803 are each a buffer memory and use an area of a memory element internally provided in the primary video decoder 3870. Alternatively, some or all of the TB 3801, MB 3802, and EB 3803 may be separated in discrete memory elements. The TB 3801 stores the TS packets received from the PID filter 3840 as they are. The MB 3802 stores PES packets reconstructed from the TS packets stored in the TB 3801. Note that when the TS packets are transferred from the TB 3801 to the MB 3802, the TS header is removed from each TS packet. The EB 3803 extracts encoded VAUs from the PES packets and stores the extracted, encoded VAUs therein. A VAU includes a compressed picture, i.e., an I picture, B picture, or P picture. Note that when data is transferred from the MB 3802 to the EB 3803, the PES header is removed from each PES packet.

The DEC 3804 is a hardware decoder specifically for decoding of compressed pictures and is composed of an LSI that includes, in particular, a function to accelerate the decoding. The DEC 3804 decodes a picture from each VAU in the EB 3803 at the time shown by the DTS included in the original TS packet. The DEC 3804 may also refer to the decoding switch information 1301 shown in FIG. 13 to decode pictures from VAUs sequentially, regardless of the DTSs. The DEC 3804 performs decoding in the following order. First, the DEC 3804 analyzes a VAU header in response to an instruction from the decoder driver 3637. Next, the DEC 3804 transmits the analysis results to the decoder driver 3637. Subsequently, upon receiving an instruction regarding the decoding method from the decoder driver 3637, the DEC 3804 starts to decode a picture from the VAU via the indicated method. Furthermore, the DEC 3804 transmits the decoded, uncompressed picture to the DPB 3805. Details on each step are provided below.

Like the TB 3801, MB 3802, and EB 3803, the DPB 3805 is a buffer memory that uses an area of a built-in memory element in the primary video decoder 3870. Alternatively, the DPB 3805 may be located in a memory element separate from the other buffer memories 3801, 3802, and 3803. The DPB 3805 temporarily stores the decoded pictures. When a P picture or B picture is to be decoded by the DEC 3804, the DPB 3805 retrieves reference pictures, in response to an instruction from the DEC 3804, from among stored, decoded pictures. The DPB 3805 then provides the reference pictures to the DEC 3804. Furthermore, the DPB 3805 writes each of the stored pictures into the primary video plane memory 3890 at the time shown by the PTS included in the original TS packet.

The secondary video decoder 3871 includes the same structure as the primary video decoder 3870. The secondary video decoder 3871 first decodes the TS packets of the secondary video stream received from the PID filter 3840 into uncompressed pictures. Subsequently, the secondary video decoder 3871 writes the uncompressed pictures into the secondary video plane memory 3891 at the time shown by the PTSs included in the TS packets.

The PG decoder 3872 decodes the TS packets received from the PID filter 3840 into uncompressed graphics data and writes the uncompressed graphics data to the PG plane memory 3892 at the time shown by the PTSs included in the TS packets.

The IG decoder 3873 decodes the TS packets received from the PID filter 3840 into uncompressed graphics data and writes the uncompressed graphics data to the IG plane memory 3893 at the time shown by the PTSs included in the TS packets.

The primary audio decoder 3874 first stores the TS packets received from the PID filter 3840 in a buffer provided therein. Subsequently, the primary audio decoder 3874 removes the TS header and the PES header from each TS packet in the buffer, and decodes the remaining data into uncompressed LPCM audio data. Furthermore, the primary audio decoder 3874 transmits the resultant audio data to the audio mixer 3895 at the time shown by the PTS included in the TS packet. The primary audio decoder 3874 selects the decoding method of the uncompressed audio data in accordance with the compression encoding format, e.g. AC-3 or DTS, and the stream attribute of the primary audio stream, which are included in the TS packet.

The secondary audio decoder 3875 has the same structure as the primary audio decoder 3874. The secondary audio decoder 3875 first decodes the TS packets of the secondary audio stream received from the PID filter 3840 into uncompressed LPCM audio data. Subsequently, the secondary audio decoder 3875 transmits the uncompressed LPCM audio data to the audio mixer 3895 at the times shown by the PTSs included in the TS packets. The secondary audio decoder 3875 changes decoding schemes of uncompressed audio data depending on the compression encoding format, e.g. Dolby Digital Plus or DTS-HD LBR, and the stream attribute of the secondary audio stream included in the TS packets.

The audio mixer 3895 receives uncompressed audio data from both the primary audio decoder 3874 and the secondary audio decoder 3875 and then mixes the received data (i.e. synthesizes sounds). The audio mixer 3895 also transmits the mixed audio data to, for example, an internal speaker 103A of the display device 103.

The image processor 3880 receives graphics data, i.e., PNG or JPEG raster data, along with the PTS thereof from the program execution unit 3634. Upon the reception of the graphics data, the image processor 3880 renders the graphics data and writes the graphics data to the image plane memory 3894.

<<Collaboration Between the Decoder Driver and DEC in a 2D Playback Device>>

Figure 39A:
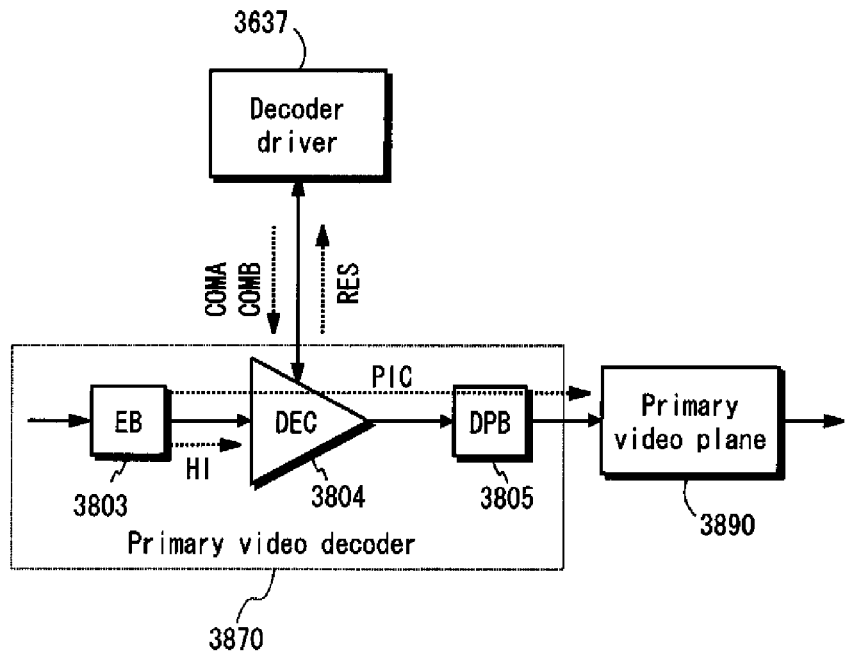
FIG. 39A is a schematic diagram showing the flow of data processed by a decoder driver 3637 and DEC 3804 during decoding of the primary video stream by the 2D playback device shown in FIGS. 36 and 38.

FIG. 39A is a schematic diagram showing the flow of data processed by the decoder driver 3637 and DEC 3804 during decoding of the primary video stream. As shown in FIG. 39A, processing to decode a single picture from the primary video stream is mainly composed of the following five steps, A-E.

Step A (header analysis/output of a decode start command): the decoder driver 3637 outputs a header analysis command, COMA, to the DEC 3804. The header analysis command, COMA, includes information indicating the VAU in which the next picture to be decoded is stored (for example, the AU identification code 931A shown in FIG. 9). Furthermore, when the picture decoding method has been determined in step E immediately before step A, the decoder driver 3637 outputs a decode start command, COMB, to the DEC 3804 along with the header analysis command, COMA. The decode start command, COMB, includes information indicating the decoding method determined in the immediately preceding step E.

Step B (header analysis): the DEC 3804 performs the following processing in response to the header analysis command, COMA. The DEC 3804 first retrieves the VAU indicated by the header analysis command, COMA, from the EB 3803. Next, the DEC 3804 reads the header HI in the VAU and analyzes the header HI. This header HI includes the sequence header and the picture header, as well as the slice headers in the compressed picture data, which are shown in FIG. 9. For example, when the encoding method is MPEG-4 AVC, the header HI includes an SPS, PPS, and slice header. In particular, the DEC 3804 retrieves the picture header by referring to the identification number for the picture header (e.g. the identification number of the PPS) included in the slice header, as shown by the arrow on the dashed line in FIG. 9. The type of encoding method for the slice is thus acquired from the picture header. Furthermore, the DEC 3804 retrieves the sequence header by referring to the identification number for the video sequence (e.g. the identification number of the SPS) indicated by the picture header, as shown by the arrow on the alternating long and short dashed line in FIG. 9. The resolution, frame rate, aspect ratio, and bit rate for the slice are thus acquired from the sequence header. Based on the data acquired in this way, the DEC 3804 generates analysis results for the header HI so as to contain information necessary to determine the decoding method of the picture.

Step C (output of notification of completion): upon completing the header analysis in step B, the DEC 3804 outputs a notification of completion RES to the decoder driver 3637. This notification of completion RES includes the analysis results for the header HI generated in step B.

Step D (determination of picture decoding method): in response to the notification of completion RES, the decoder driver 3637 performs processing preliminary to decoding of a picture. Specifically, the decoder driver 3637 refers to the resolution, frame rate, aspect ratio, bit rate, type of encoding method, etc. in the analysis results for the header HI indicated by the notification of completion RES and, based on these factors, determines the picture decoding method.

Step E (picture decoding): the DEC 3804 performs the following processing in response to the decode start command, COMB. The DEC 3804 first reads compressed picture data from the VAU specified in the immediately preceding step B. Next, the DEC 3804 decodes compressed picture data via the decoding method indicated by the decode start command, COMB. Furthermore, the DEC 3804 stores a decoded, uncompressed picture PIC in the DPB 3805. Afterwards, this uncompressed picture PIC is written into the primary video plane memory 3890 from the DPB 3805.

Figure 39B:
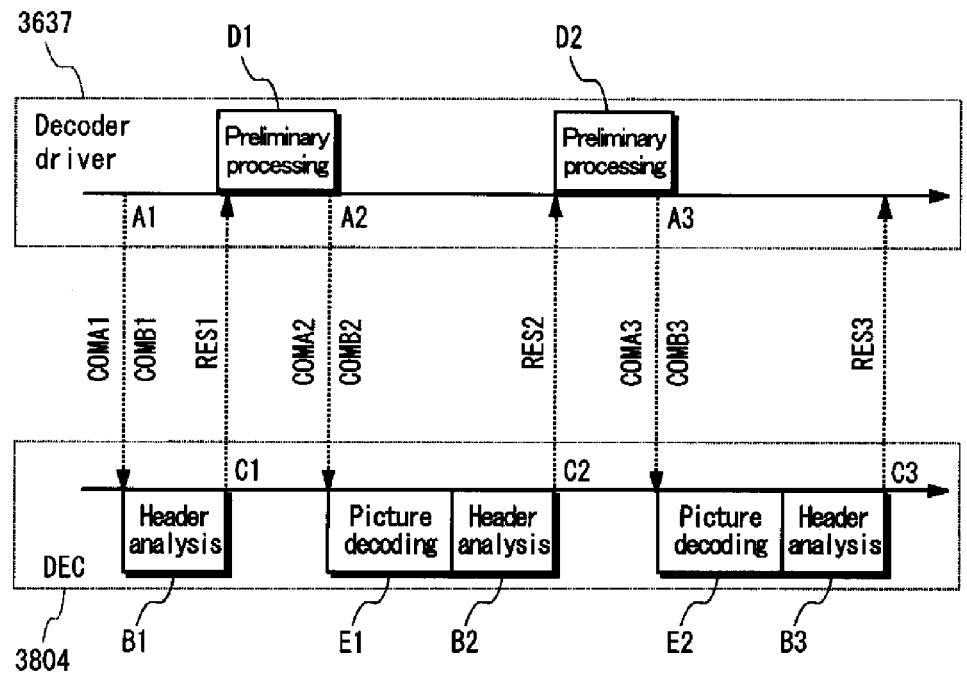
FIG. 39B is a schematic diagram showing the decoding processing.

FIG. 39B is a schematic diagram showing the flow of decoding in the primary video stream. As shown in FIG. 39B, during successive processing, the above five steps A-E are repeated as follows.

During the first step A, A1, the decoder driver 3637 outputs the first header analysis command, COMA1, to the DEC 3804. The DEC 3804 performs the first step B, B1 in response to the command COMA1. That is, the DEC 3804 reads the header HI in the VAU indicated by the command COMA1 from the EB 3803 and analyzes the header HI. After this step B, B1, the DEC 3804 performs the first step C, C1. That is, the DEC 3804 outputs the first notification of completion RES1 to the decoder driver 3637, thereby notifying the decoder driver 3637 of the analysis results for the header HI. In response to the notification RES1, the decoder driver 3637 performs the first step D, D1. That is, the decoder driver 3637 reads the analysis results for the header HI from the notification RES1 and, based on the analysis results, determines the picture decoding method. The decoder driver 3637 then performs the second step A, A2. That is, the decoder driver 3637 outputs the second header analysis command, COMA2, and the first decode start command, COMB1, to the DEC 3804. The DEC 3804 starts the first step E, E1, in response to the decode start command, COMB1. That is, the DEC 3804 uses the decoding method indicated by the command COMB1 to decode a picture from the VAU indicated by the first header analysis command, COMA1.

After the first step E, E1, the DEC 3804 performs the second step B, B2. That is, the DEC 3804 reads the header HI in the VAU indicated by the second header analysis command, COMA2, from the EB 3803 and analyzes the header HI. After this step B, B2, the DEC 3804 performs the second step C, C2. That is, the DEC 3804 outputs the second notification of completion RES2 to the decoder driver 3637, thereby notifying the decoder driver 3637 of the analysis results for the header HI. In response to the notification RES2, the decoder driver 3637 performs the second step D, D2. That is, the decoder driver 3637 reads the analysis results for the header HI from the notification RES2 and, based on the analysis results, determines the picture decoding method. The decoder driver 3637 then performs the third step A, A3. That is, the decoder driver 3637 outputs the third header analysis command, COMA3, and the second decode start command, COMB2, to the DEC 3804. The DEC 3804 starts the second step E, E2 in response to the decode start command, COMB2. That is, the DEC 3804 uses the decoding method indicated by the command COMB2 to decode a picture from the VAU indicated by the second header analysis command, COMA2.

The decoder driver 3637 and DEC 3804 similarly collaborate to decode the third and subsequent pictures by repeating steps A-E.

<Structure of 3D Playback Device>

When playing back 3D video contents from a BD-ROM disc 101 in 3D playback mode, the playback device 102 operates as a 3D playback device. The fundamental part of the device's structure is identical to the 2D playback device shown in FIGS. 36 to 39. Therefore, the following is a description of sections of the structure of the 2D playback device that are enlarged or modified. Details on the fundamental parts of the 3D playback device can be found in the above description of the 2D playback device. Regarding the playback processing of 2D video images in accordance with 2D playlist files, i.e. the playback processing of the 2D playlist, the 3D playback device has the same structure as the 2D playback device. Accordingly, the details on this structure can be found in the description of the 2D playback device. The following description assumes playback processing of 3D video images in accordance with 3D playlist files, i.e. 3D playlist playback processing.

FIG. 40 is a functional block diagram of the 3D playback device 4000. The 3D playback device 4000 includes a BD-ROM drive 4001, playback unit 4002, and control unit 4003. The playback unit 4002 includes a switch 4020, first read buffer 4021, second read buffer 4022, system target decoder 4023, and plane adder 4024. The control unit 4003 includes a dynamic scenario memory 4031, static scenario memory 4032, user event processing unit 4033, program execution unit 4034, playback control unit 4035, player variable storage unit 4036, and decoder driver 4037. The playback unit 4002 and control unit 4003 are mounted on a different integrated circuit, but may alternatively be mounted on a single integrated circuit. In particular, the dynamic scenario memory 4031, static scenario memory 4032, user event processing unit 4033, and program execution unit 4034 have an identical structure with the 2D playback device shown in FIG. 36. Accordingly, details thereof can be found in the above explanation of the 2D playback device.

The BD-ROM drive 4001 includes elements identical to the BD-ROM drive 3601 in the 2D playback device shown in FIG. 36. When the playback control unit 4035 indicates a range of LBN, the BD-ROM drive 4001 reads data from the sector group on the BD-ROM disc 101 indicated by the range. In particular, a source packet group belonging to extents in the file SS, i.e. 3D extents, is transferred from the BD-ROM drive 4001 to the switch 4020. In this case, each 3D extent includes one or more pairs of a base-view and dependent-view data block, as shown in FIG. 24. These data blocks need to be transferred in parallel to different read buffers, i.e. read buffers 4021 and 4022. Accordingly, the BD-ROM drive 4001 needs to have at least the same access speed as the BD-ROM drive 3601 in the 2D playback device.

The switch 4020 receives 3D extents from the BD-ROM drive 4001. On the other hand, the switch 4020 receives, from the playback control unit 4035, information indicating the boundary in each data block included in the 3D extents. This information indicates, for example, the number of source packets from the top of the 3D extent to each boundary. In this case, the playback control unit 4035 generates this information by referring to the extent start points in the clip information file. The switch 4020 further refers to this information to extract base-view extents from each 3D extent, thereafter transmitting the extents to the first read buffer 4021. Conversely, the switch 4020 transmits the remaining dependent-view extents to the second read buffer 4022.

The first read buffer 4021 and the second read buffer 4022 are buffer memories that use a memory element in the playback unit 4002. In particular, different areas in a single memory element are used as the read buffers 4021 and 4022. Alternatively, different memory elements may be used as the read buffers 4021 and 4022. The first read buffer 4021 receives base-view extents from the switch 4020 and stores these extents. The second read buffer 4022 receives dependent-view extents from the switch 4020 and stores these extents.

First, the system target decoder 4023 alternately reads base-view extents stored in the first read buffer 4021 and dependent-view extents stored in the second read buffer 4022. Next, the system target decoder 4023 separates elementary streams from each source packet via demultiplexing and furthermore, from the separated streams, decodes the data shown by the PID indicated by the playback control unit 4035. The system target decoder 4023 then writes the decoded elementary streams in internal plane memory according to the type thereof. The base-view video stream is written in the left video plane memory, and the dependent-view video stream is written in the right plane memory. On the other hand, the secondary video stream is written in the secondary video plane memory, the IG stream in the IG plane memory, and the PG stream in the PG plane memory. When stream data other than the video stream is composed of a pair of base-view stream data and dependent-view stream data, a pair of corresponding plane memories are prepared for the left-view plane data and right-view plane data. The system target decoder 4023 also renders graphics data from the program execution unit 4034, such as JPEG, PNG, etc. raster data, and writes this data in the image plane memory.

The system target decoder 4023 associates the output of plane data from the left-video and right-video plane memories with B-D presentation mode and B-B presentation mode as follows. When the playback control unit 4035 indicates B-D presentation mode, the system target decoder 4023 alternately outputs plane data from the left-video and right-video plane memories. On the other hand, when the playback control unit 4035 indicates B-B presentation mode, the system target decoder 4023 outputs plane data from only the left-video or right-video plane memory twice per frame while maintaining the operation mode in 3D playback mode.

Furthermore, the system target decoder 4023 associates the output of graphics plane data from the graphics plane memories with 2 plane mode, 1 plane mode+offset mode, and 1 plane+zero offset mode as follows. The graphics plane memories referred to here include the PG plane memory, IG plane memory, and image plane memory. When the playback control unit 4035 indicates 2 plane mode, the system target decoder 4023 alternately outputs left-view and right-view graphics plane data from each of the graphics plane memories. When the playback control unit 4035 indicates 1 plane+offset mode or 1 plane+zero offset mode, the system target decoder 4023 outputs graphics plane data from each of the graphics plane memories while maintaining the operation mode in 3D playback mode. When the playback control unit 4035 indicates 1 plane+offset mode, the system target decoder 4023 furthermore outputs the offset value designated by the playback control unit 4035 to the plane adder 4024. On the other hand, when the playback control unit 4035 indicates 1 plane+zero offset mode, the system target decoder 4023 outputs "0" as the offset value to the plane adder 4024.

Upon receiving a request from, for example, the program execution unit 4034 for performing 3D playlist playback processing, the playback control unit 4035 first refers to the 3D playlist file stored in the static scenario memory 4032. Next, in accordance with the 3D playlist file and following the sequence described with regards to FIG. 33E, the playback control unit 4035 indicates to the BD-ROM drive 4001 the ranges of the LBN for the sector group on which the 3D extent to be read is recorded. The playback control unit 4035 also refers to the extent start point in the clip information file stored in the static scenario memory 4032 to generate information indicating the boundaries of the data blocks included in each 3D extent. The playback control unit 4035 transmits this information to the switch 4020.

Additionally, the playback control unit 4035 refers to the STN table and STN table SS in the 3D playlist file to control the operation requirements of the system target decoder 4023 and the plane adder 4024. For example, the playback control unit 4035 selects the PID for the elementary stream to be played back and outputs the PID to the system target decoder 4023. The playback control unit 4035 also selects the presentation mode for each plane in accordance with the offset during popup 3111 in the STN table SS and indicates these presentation modes to the system target decoder 4023 and plane adder 4024.

As in the 2D playback device, the player variable storage unit 4036 includes the SPRM shown in FIG. 37. However, any two of the SPRM(24)-(32) that were reserved in FIG. 37 include the first flag and second flag shown in FIG. 35. For example, the SPRM(24) may include the first flag, and the SPRM(25) the second flag. In this case, when the SPRM (24) is "0", the playback device 102 only supports playback of 2D video images, and when it is "1", the playback device 102 also supports 3D video image playback. When the SPRM(25) is "0", the 3D video image playback mode of the playback device 102 is L/R mode, and when it is "1", the 3D video image playback mode is depth mode.

The plane adder 4024 receives each type of plane data from the system target decoder 4023 and superimposes the pieces of plane data to create one composite frame or field. In particular, in L/R mode, the left-video plane data represents the left-view video plane, and the right-video plane data represents the right-view video plane. Accordingly, from among the other pieces of plane data, the plane adder 4024 superimposes pieces that represent the left-view on the left-view plane data and pieces that represent the right-view on the right-view plane data. On the other hand, in depth mode, the right-video plane data represents a depth map for a video plane representing the left-video plane data. Accordingly, the plane adder 4024 first generates a pair of left-view video plane data and right-view video plane data from both pieces of video plane data. Subsequently, the plane adder 4024 performs the same composition processing as in L/R mode.

When receiving an indication of 1 plane+offset mode or 1 plane+zero offset mode from the playback control unit 4035 as the presentation mode for the secondary video plane, PG plane, IG plane, or image plane, the plane adder 4024 performs cropping processing on the plane data received from the system target decoder 4023. A pair of left-view plane data and right-view plane data is thus generated. In particular, when 1 plane+offset mode is indicated, the cropping processing refers to the offset value indicated by the system target decoder 4023 or the program execution unit 4034. On the other hand, when 1 plane+zero offset mode is indicated, the offset value is set to "0" during cropping processing. Accordingly, the same plane data is output repeatedly to represent the left-view and right-view. Subsequently, the plane adder 4024 performs the same composition processing as in L/R mode. The composited frame or field is output to the display device 103 and displayed on the screen.

<<System Target Decoder>>

Figure 41:
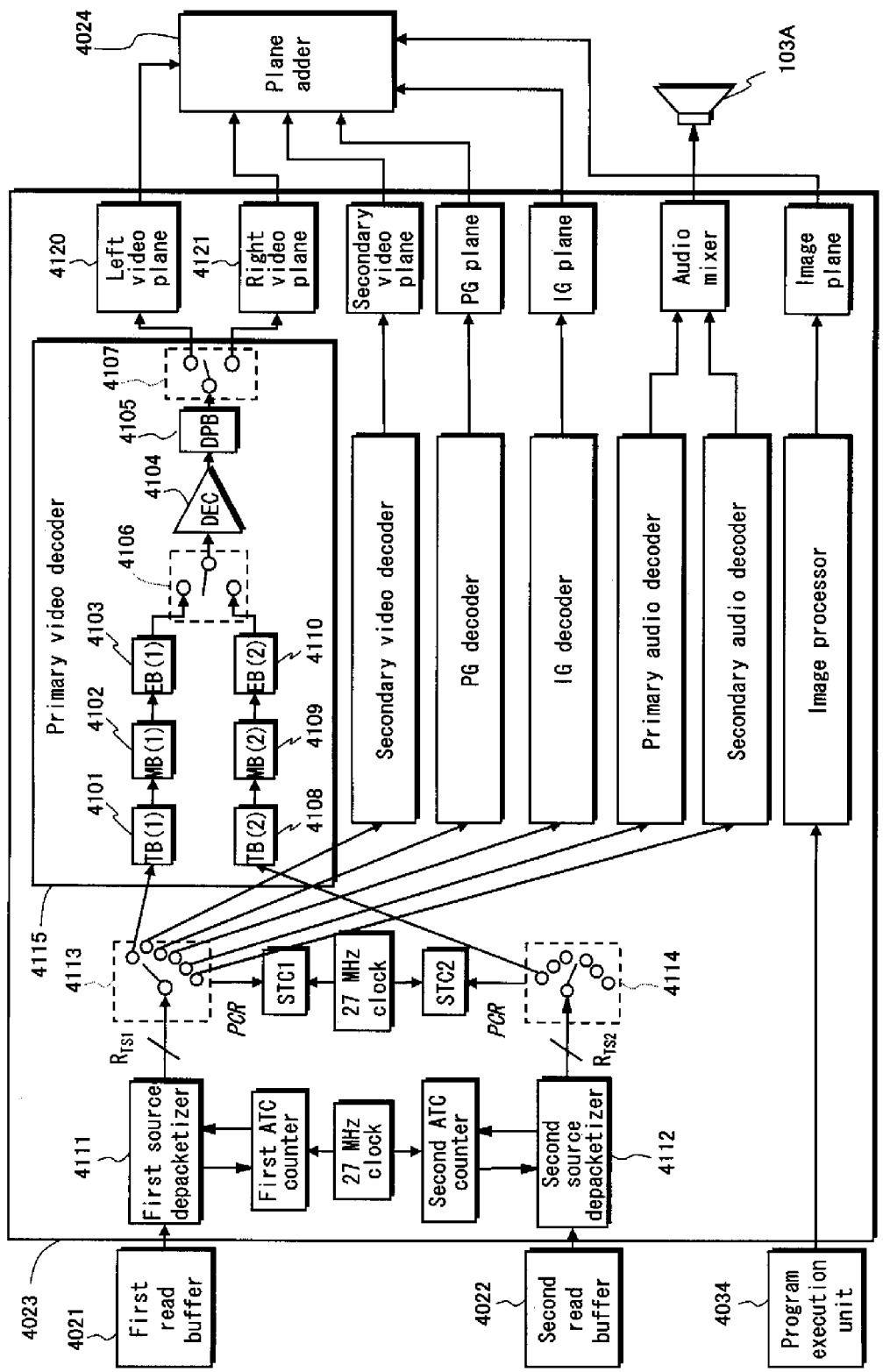
FIG. 41 is a functional block diagram of the system target decoder 4023 shown in FIG. 40.

FIG. 41 is a functional block diagram of the system target decoder 4023. The structural elements shown in FIG. 41 differ from the 2D playback device 3622 shown in FIG. 38 in the following two points: 1) the input channel from the read buffer to each decoder is doubled, and 2) the main video decoder supports 3D playback mode, and the secondary video decoder, PG decoder, and IG decoder support 2 plane mode. That is, these video decoders can all alternately decode a base-view stream and a dependent-view stream. On the other hand, the primary audio decoder, secondary audio decoder, audio mixer, image processor, and plane memories are similar to those in the 2D playback device shown in FIG. 38. Accordingly, among the structural elements shown in FIG. 41, those differing from the structural elements shown in FIG. 38 are described below, and details about similar structural elements can be found in the description of FIG. 38. Furthermore, since the video decoders each have a similar structure, only the structure of the primary video decoder 4115 is described below. Similar descriptions are applicable to the structure of other video decoders.

The first source depacketizer 4111 reads source packets from the first read buffer 4021, retrieves TS packets included in the source packets, and transmits the TS packets to the first PID filter 4113. The second source depacketizer 4112 reads source packets from the second read buffer 4022, retrieves TS packets included in the source packets, and transmits the TS packets to the second PID filter 4114. Furthermore, each of the source depacketizers 4111 and 4112 synchronizes the time of transferring the TS packets in accordance with the time shown by the ATS of each source packet. This synchronization is made with the same method as the source depacketizer 3810 shown in FIG. 38. Accordingly, a description thereof can be found in the description provided for FIG. 38. With this sort of adjustment of transfer time, the mean transfer rate $R_{TS1}$ of TS packets from the first source depacketizer 4111 to the first PID filter 4113 does not exceed the system rate 2011 indicated by the 2D clip information file shown in FIG. 20. Similarly, the mean transfer rate $R_{TS2}$ of TS packets from the second source depacketizer 4112 to the second PID filter 4114 does not exceed the system rate indicated by the dependent-view clip information file.

The first PID filter 4113 compares the PID of each TS packet received from the first source depacketizer 4111 with the selected PID. The playback control unit 4035 designates the selected PID beforehand in accordance with the STN table in the 3D playlist file. When the two PIDs match, the first PID filter 4113 transfers the TS packets to the decoder assigned to the PID. For example, if a PID is 0x1011, the TS packets are transferred to TB(1) 4101 in the primary video decoder 4115, whereas TS packets with PIDs ranging from 0x1B00-0x1B1F, 0x1100-0x111F, 0x1A00-0x1A1F, 0x1200-0x121F, and 0x1400-0x141F are transferred to the secondary video decoder, primary audio decoder, secondary audio decoder, PG decoder, or IG decoder respectively.

The second PID filter 4114 compares the PID of each TS packet received from the second source depacketizer 4112 with the selected PID. The playback control unit 4035 designates the selected PID beforehand in accordance with the STN table SS in the 3D playlist file. When the two PIDs match, the second PID filter 4114 transfers the TS packet to the decoder assigned to the PID. For example, if a PID is 0x1012 or 0x1013, the TS packets are transferred to TB(2) 4108 in the primary video decoder 4115, whereas TS packets with PIDs ranging from 0x1B20-0x1B3F, 0x1220-0x127F, and 0x1420-0x147F are transferred to the secondary video decoder, PG decoder, or IG decoder respectively.

The primary video decoder 4115 includes a TB(1) 4101, MB(1) 4102, EB(1) 4103, TB(2) 4108, MB(2) 4109, EB(2) 4110, buffer switch 4106, DEC 4104, DPB 4105, and picture switch 4107. The TB(1) 4101, MB(1) 4102, EB(1) 4103, TB(2) 4108, MB(2) 4109, EB(2) 4110 and DPB 4105 are all buffer memories, each of which uses an area of the memory elements included in the primary video decoder 4115. Note that some or all of these buffer memories may be separated on different memory elements.

The TB(1) 4101 receives TS packets that include a base-view video stream from the first PID filter 4113 and stores the TS packets as they are. The MB(1) 4102 stores PES packets reconstructed from the TS packets stored in the TB(1) 4101. The TS headers of the TS packets are removed at this point. The EB (1) 4103 extracts and stores encoded VAUs from the PES packets stored in the MB(1) 4102. The PES headers of the PES packets are removed at this point.

The TB(2) 4108 receives TS packets that include a dependent-view video stream from the second PID filter 4114 and stores the TS packets as they are. The MB(2) 4109 stores PES packets reconstructed from the TS packets stored in the TB(2) 4108. The TS headers of the TS packets are removed at this point. The EB(2) 4110 extracts and stores encoded VAUs from the PES packets stored in the MB(2) 4109. The PES headers of the PES packets are removed at this point.

The buffer switch 4106 transfers the headers of the VAUs stored in the EB(1) 4103 and the EB(2) 4110 in response to a request from the DEC 4104. Furthermore, the buffer switch 14106 transfers the compressed picture data for the VAUs to the DEC 4104 at the times indicated by the DTSs included in the original TS packets. In this case, the DTSs are equal between a pair of pictures belonging to the same 3D VAU between the base-view video stream and dependent-view stream. Accordingly, for a pair of VAUs that have the same DTS, the buffer switch 4106 first transmits the VAU stored in the EB(1) 4103 to the DEC 4104. Additionally, the buffer switch 4106 may cause the DEC 4104 to return the decode switch information 1301 in the VAU. In such a case, the buffer switch 4106 can determine if it should transfer the next VAU from the EB(1) 4103 or the EB(2) 4110 by referring to the decode switch information 1301.

Like the DEC 3804 shown in FIG. 38, the DEC 4104 is a hardware decoder specifically for decoding of compressed pictures and is composed of an LSI that includes, in particular, a function to accelerate the decoding. The DEC 4104 decodes the compressed picture data transferred from the buffer switch 4106 in order. In particular, the DEC 4104 performs such decoding with the following procedures. The DEC 4104 first acquires the header for a VAU from the EB(1) 4103 and the EB(2) 4110 in response to instructions from the decoder driver 4037. Next, the DEC 4104 analyzes the header and returns the results to the decoder driver 4037. Afterwards, upon receiving an instruction regarding the decoding method from the decoder driver 4037, the DEC 4104 starts to decode a picture from the VAU via the decoding method. Furthermore, the DEC 4104 transfers the decoded, uncompressed picture to the DPB 4105. Details on each procedure are provided below.

The DPB 4105 temporarily stores the decoded, uncompressed pictures. When the DEC 4104 decodes a P picture or a B picture, the DPB 4105 retrieves reference pictures from among the stored, uncompressed pictures in response to a request from the DEC 4104 and supplies the retrieved reference pictures to the DEC 4104.

The picture switch 4107 writes the uncompressed pictures from the DPB 4105 to either the left-video plane memory 4120 or the right-video plane memory 4121 at the time indicated by the PTS included in the original TS packet. In this case, the PTSs are equal between a base-view picture and a dependent-view picture belonging to the same 3D VAU. Accordingly, for a pair of pictures that have the same PTS and that are stored by the DPB 4105, the picture switch 4107 first writes the base-view picture in the left-video plane memory 4120 and then writes the dependent-view picture in the right-video plane memory 4121.

<<Collaboration Between the Decoder Driver and DEC in a 3D Playback Device>>

Figure 42A:
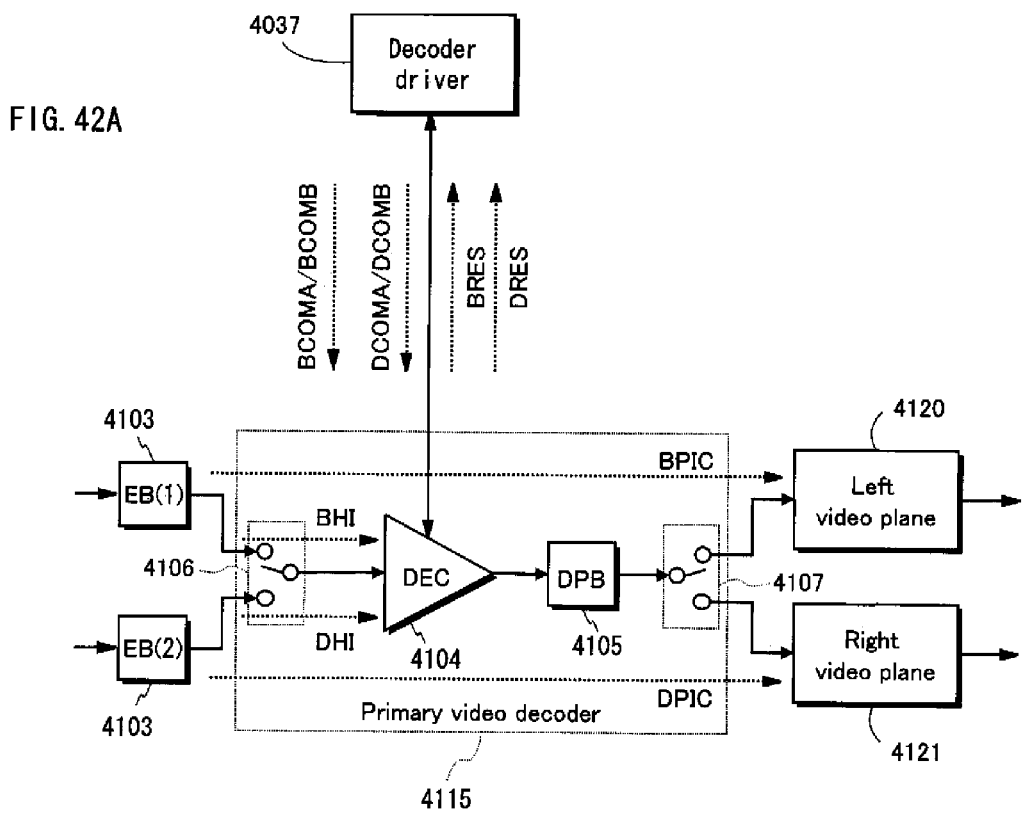
FIG. 42A is a schematic diagram showing the flow of data processed by a decoder driver 4037 and DEC 4104 during decoding of a pair of base-view and dependent-view primary video streams by the 3D playback device shown in FIGS. 40 and 41.

FIG. 42A is a schematic diagram showing the flow of data processed by the decoder driver 4037 and DEC 4104 during decoding of a pair of base-view and dependent-view primary video streams. As shown in FIG. 42A, processing to decode a pair of pictures from the pair of primary video streams includes the following five steps, A-E.

Step A (header analysis/output of a decode start command): the decoder driver 4037 outputs header analysis commands, BCOMA and DCOMA, to the DEC 4104. There are two types of header analysis commands: a base-view header analysis command, BCOMA, and a dependent-view header analysis command, DCOMA. The base-view header analysis command, BCOMA, includes information indicating the VAU in which the next base-view picture to be decoded is stored. The dependent-view header analysis command, DCOMA, includes information indicating the VAU in which the next dependent-view picture to be decoded is stored. Furthermore, when the picture decoding method has been determined in step E immediately before step A, the decoder driver 4037 outputs decode start commands, BCOMB and DCOMB, to the DEC 4104 along with the header analysis commands, BCOMA and DCOMA. The decode start commands, BCOMB and DCOMB, include information indicating the decoding method determined in the immediately preceding step D. There are two types of decode start commands: a base-view decode start command, BCOMB, and a dependent-view decode start command, DCOMB. The base-view decode start command, BCOMB, includes information indicating the decoding method of the base-view picture, and the dependent-view decode start command, DCOMB, includes information indicating the decoding method of the dependent-view picture.

Step B (header analysis): the DEC 4104 performs the following processing in response to the header analysis commands, BCOMA and DCOMA. The DEC 4104 first requests the buffer switch 4106 to transmit the headers BHI and DHI for the VAUs shown by the header analysis commands, BCOMA and DCOMA. The buffer switch 4106 retrieves the headers BHI and DHI for the VAUs from the EB(1) 4103 and EB(2) 4110 in response to the request. In this case, the header BHI retrieved from the EB(1) 4103 is included in the VAU for the base-view video stream. Accordingly, this header BHI includes the sequence header and the picture header, as well as the slice headers in the compressed picture data, which are shown in FIG. 9. On the other hand, the header DHI retrieved from the EB (2) 4110 is included in the VAU for the dependent-view video stream. Accordingly, this header DHI includes the sequence header and the picture header, as well as the slice headers in the compressed picture data, which are shown in FIG. 9. Next, the DEC 4104 analyzes the headers BHI and DHI received from the buffer switch 4106. In particular, the DEC 4104 retrieves the picture headers by referring to the identification number for the picture header (e.g. the identification number of the PPS) included in the slice headers, as shown by the arrows on the dashed lines in FIG. 9. The types of encoding methods for the slices are thus acquired from the picture headers. Furthermore, the DEC 4104 retrieves the sequence header and sub-sequence header by referring to the identification number for the video sequence (e.g. the identification number of the SPS) indicated by the picture headers, as shown by the arrows on the alternating long and short dashed lines in FIG. 9. The resolution, frame rate, aspect ratio, and bit rate for the slices are thus acquired from the sequence header and the sub-sequence header. Based on the data acquired in this way, the DEC 4104 generates analysis results for the header BHI and header DHI so as to contain information necessary to determine the decoding method of the picture.

Step C (output of notification of completion): upon completing the header analysis in step B, the DEC 4104 outputs a notification of completion, BRES or DRES, to the decoder driver 4037. There are two types of notifications: a notification of completion of base-view header analysis, BRES, and a notification of completion of dependent-view header analysis, DRES. The notification of completion of base-view header analysis, BRES, includes the analysis results for the header BHI for the VAU that includes the next base-view picture to be decoded. The notification of completion of dependent-view header analysis, DRES, includes the analysis results for the header DHI for the VAU that includes the next dependent-view picture to be decoded.

Step D (determination of picture decoding method): in response to each of the notifications of completion, BRES and DRES, the decoder driver 4037 performs processing preliminary to decoding of a picture. Specifically, the decoder driver 4037 refers to the resolution, frame rate, aspect ratio, bit rate, type of encoding method, etc. in the analysis results for the header BHI and header DHI indicated by the notifications of completion, BRES and DRES, and determines the picture decoding methods based on these factors.

Step E (picture decoding): the DEC 4104 performs the following processing in response to each of the decode start commands, BCOMB and DCOMB. The DEC 4104 first decodes compressed picture data, which has been transferred from the buffer switch 4106, via the decoding method indicated by the decode start command, BCOMB or DCOMB. Furthermore, the DEC 4104 stores a decoded, uncompressed base-view picture BPIC and dependent-view picture DPIC in the DPB 4105. Afterwards, the picture switch 4107 writes the uncompressed base-view picture BPIC into the left video plane memory 4120 from the DPB 4105 and writes the uncompressed dependent-view picture DPIC into the right video plane memory 4121 from the DPB 4105.

Figure 42B:
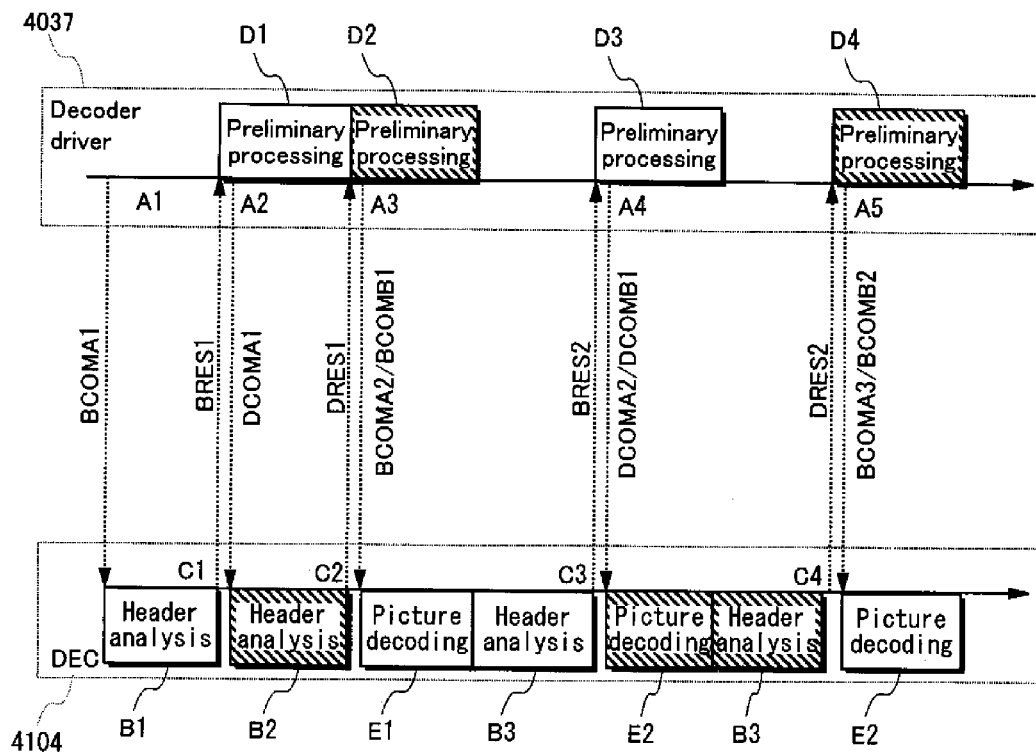
FIG. 42B is a schematic diagram showing the decoding processing.

FIG. 42B is a schematic diagram showing the flow of decoding of the pair of base-view and dependent-view primary video streams. As shown in FIG. 42B, during successive processing, the above five steps A-E are repeated as follows.

During the first step A, A1, the decoder driver 4037 outputs the first base-view header analysis command, BCOMA1, to the DEC 4104. The DEC 4104 performs the first step B, B1 in response to the command BCOMA1. That is, the DEC 4104 first requests the buffer switch 4106 to transfer the header BHI for the VAU indicated by the command BCOMA1. In response to this request, the buffer switch 4106 retrieves the header BHI from the EB(1) 4103 and transfers it to the DEC 4104. Next, the DEC 4104 analyzes the header BHI.

After this first step B, B1, the DEC 4104 performs the first step C, C1. That is, the DEC 4104 outputs the first notification of completion of base-view header analysis, BRES1, to the decoder driver 4037, thereby notifying the decoder driver 4037 of the analysis results for the header BHI. In response to the notification BRES1, the decoder driver 4037 performs the first step D, D1. That is, the decoder driver 4037 reads the analysis results for the BHI header from the notification BRES1 and, based on the analysis results, determines the base-view picture decoding method. At the start of the first step D, D1, the decoder driver 4037 performs the second step A, A2. That is, the decoder driver 4037 outputs the first dependent-view header analysis command, DCOMA1, to the DEC 4104. The DEC 4104 performs the second step B, B2, in response to the command DCOMA1. That is, the DEC 4104 first requests the buffer switch 4106 to transfer the header DHI for the VAU indicated by the command DCOMA1. In response to this request, the buffer switch 4106 retrieves the header DHI from the EB(2) 4110 and transfers it to the DEC 4104. Next, the DEC 4104 analyzes the header DHI. Accordingly, step B, B2, by the DEC 4104 proceeds in parallel with step D, D1, by the decoder driver 4037.

After the second step B, B2, the DEC 4104 performs the second step C, C2. That is, the DEC 4104 outputs the first notification of completion of dependent-view header analysis, DRES1, to the decoder driver 4037, thereby notifying the decoder driver 4037 of the header DHI analysis results. In response to the notification DRES1, the decoder driver 4037 performs the second step D, D2. That is, the decoder driver 4037 reads the analysis results for the DHI header from the notification DRES1 and, based on the analysis results, determines the dependent-view picture decoding method. At the start of the second step D, D2, the decoder driver 4037 performs the third step A, A3. That is, the decoder driver 4037 outputs the second base-view header analysis command, BCOMA2, and the first base-view decode start command, BCOMB1, to the DEC 4104. The DEC 4104 starts the first step E, E1, in response to the base-view decode start command, BCOMB1. That is, the DEC 4104 uses the decoding method indicated by the command BCOMB1 to decode a base-view picture from the VAU indicated by the first base-view header analysis command, BCOMA1. Accordingly, step E, E1, by the DEC 4104 proceeds in parallel with step D, D2, by the decoder driver 4037.

After the first step E, E1, the DEC 4104 performs the third step B, B3. That is, the DEC 4104 first requests the buffer switch 4106 to transfer the header BHI for the VAU indicated by the second base-view header analysis command, BCOMA2. In response to this request, the buffer switch 4106 retrieves the header BHI from the EB(1) 4103 and transfers it to the DEC 4104. Next, the DEC 4104 analyzes the header BHI.

After the third step B, B3, the DEC 4104 performs the third step C, C3. That is, the DEC 4104 outputs the second notification of completion of base-view header analysis, BRES2, to the decoder driver 4037, thereby notifying the decoder driver 4037 of the header BHI analysis results. In response to the notification BRES2, the decoder driver 4037 performs the third step D, D3. That is, the decoder driver 4037 reads the BHI header analysis results from the notification BRES2 and, based on the analysis results, determines the base-view picture decoding method. At the start of the third step D, D3, the decoder driver 4037 performs the fourth step A, A4. That is, the decoder driver 4037 outputs the second dependent-view header analysis command, DCOMA2 and the first dependent-view decode start command, DCOMB1, to the DEC 4104. The DEC 4104 starts the second step E, E2, in response to the decode start command, DCOMB1. That is, the DEC 4104 uses the decoding method indicated by the decode start command, DCOMB1, to decode a dependent-view picture from the VAU indicated by the first dependent-view header analysis command, DCOMA1. Accordingly, step E, E2, by the DEC 4104 proceeds in parallel with step D, D3, by the decoder driver 4037.

After the second step E, E2, the DEC 4104 performs the fourth step B, B4. That is, the DEC 4104 first requests the buffer switch 4106 to transfer the header DHI for the VAU indicated by the second dependent-view header analysis command, DCOMA2. In response to this request, the buffer switch 4106 retrieves the header DHI from the EB(2) 4110 and transfers it to the DEC 4104. Next, the DEC 4104 analyzes the header DHI.

After the fourth step B, B4, the DEC 4104 performs the fourth step C, C4. That is, the DEC 4104 outputs the second notification of completion of dependent-view header analysis, DRES2, to the decoder driver 4037, thereby notifying the decoder driver 4037 of the header DHI analysis results. In response to the notification DRES2, the decoder driver 4037 performs the fourth step D, D4. That is, the decoder driver 4037 reads the analysis results for the DHI header from the notification DRES2 and, based on the analysis results, determines the dependent-view picture decoding method. At the start of the fourth step D, D4, the decoder driver 4037 performs the fifth step A, A5. That is, the decoder driver 4037 outputs the third base-view header analysis command, BCOMA3, and the second base-view decode start command, BCOMB2, to the DEC 4104. The DEC 4104 starts the third step E, E3, in response to the decode start command, BCOMB2. That is, the DEC 4104 uses the decoding method indicated by the decode start command, BCOMB2, to decode a base-view picture from the VAU indicated by the second base-view header analysis command, BCOMA2. Accordingly, step E, E3, by the DEC 4104 proceeds in parallel with step D, D4, by the decoder driver 4037.

Thereafter, the decoder driver 4037 and the DEC 4104 collaborate in the above-described way, repeating steps A-E. In particular, step E by the DEC 4104 and step D by the decoder driver 4037 proceed in parallel. That is, while the decoder driver 4037 is determining the decoding method of a base-view picture, the DEC 4104 decodes a dependent-view picture. Conversely, while the decoder driver 4037 is determining the decoding method of a dependent-view picture, the DEC 4104 decodes a base-view picture.

In the processing flow shown in FIG. 42B, even if completion of step D by the decoder driver 4037 becomes delayed due to changes in the burden placed on the control unit 4003 by other processing, there is no danger of step E by the DEC 4104 being delayed. In other words, in this processing flow there is no danger of an excessively large interval between output of decoded pictures. For example, suppose that instead of this processing flow, step B, B2, through step E, E2, for decoding of a base-view picture take place after step B, B1, through step E, E1, for decoding of a dependent-view picture are complete, as in the flow shown in FIG. 39B. In this case, a decode start command, COMB1, is output in the next step A, A2, when preprocessing in step D, D1, is complete, rather than when preprocessing starts. Accordingly, if completion of the preprocessing is delayed, then output of the decode start command, COMB1, is also delayed. This delays the start of decoding of a dependent-view picture in the next step E, E2. As a result, there is a risk of the time between the picture switch 4107 writing a base-view picture in the left video plane memory 4120 and writing a dependent-view picture in the right video plane memory 4121 becoming excessively long. By contrast, in the processing flow shown in FIG. 42B, the second step D, D2, and the first step E, E1, for example, proceed in parallel. Accordingly, even if completion of step D, D2, is delayed, as shown by the alternating long and short dashed line in FIG. 42B, the start of step E, E1, is not delayed. As a result, the picture switch 4107 can reliably maintain writing of a base-view picture BPIC into the left video plane memory 4120 and of a dependent-view picture DPIC into the right video plane memory 4121 in succession.

As described above, in the playback device 102 according to embodiment 1 of the present invention, while the DEC 4104 is decoding a picture, the decoder driver 4037 determines the decoding method for the next picture. As a result, the primary video decoder 4115 can reliably write pictures into the video planes 4120 and 4121 in succession. The playback device 102 can thus decode the video stream more efficiently, which further increases reliability.

<<Plane Adders>>

Figure 43:
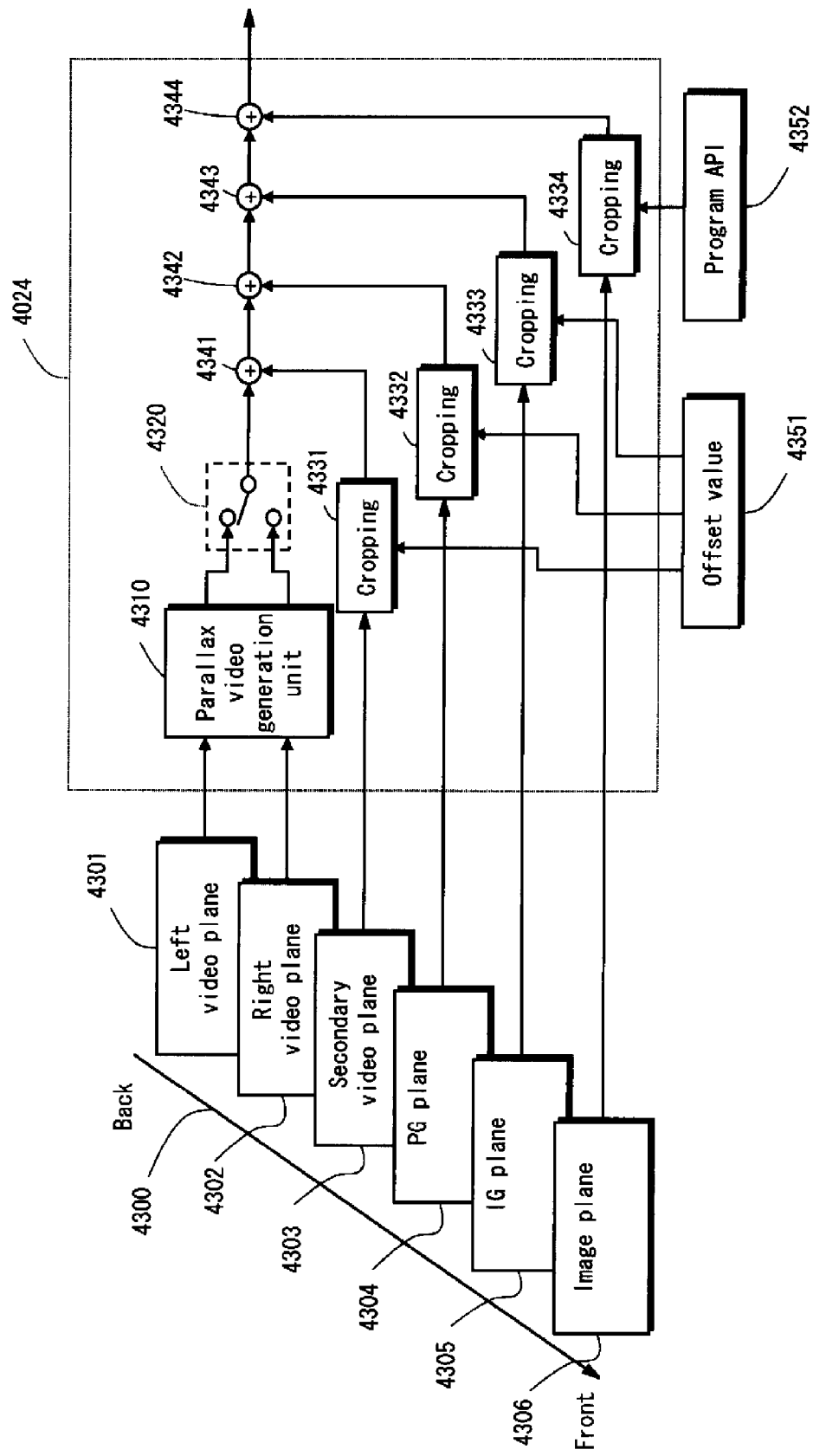
FIG. 43 is a functional block diagram of the plane adder 4024 shown in FIG. 40.

FIG. 43 is a functional block diagram of the plane adder 4024. As shown in FIG. 43, the plane adder 4024 includes a parallax video generation unit 4310, switch 4320, four cropping processing units 4331-4334, and four adders 4341-4344.

The parallax video generation unit 4310 receives left-video plane data 4301 and right-video plane data 4302 from the system target decoder 4023. In the playback device 102 in L/R mode, the left-video plane data 4301 represents the left-view video plane, and the right-video plane data 4302 represents the right-view video plane. At this point, the parallax video generation unit 4310 transmits the left-video plane data 4301 and the right-video plane data 4302 as they are to the switch 4320. On the other hand, in the playback device 102 in depth mode, the left-video plane data 4301 represents the video plane for 2D video images, and the right-video plane data 4302 represents a depth map for the 2D video images. In this case, the parallax video generation unit 4310 first calculates the binocular parallax for each element in the 2D video images using the depth map. Next, the parallax video generation unit 4310 processes the left-video plane data 4301 to shift the presentation position of each element in the video plane for 2D video images to the left or right according to the calculated binocular parallax. This generates a pair of video planes representing the left-view and right-view. Furthermore, the parallax video generation unit 4310 transmits the pair of video planes to the switch 4320 as a pair of pieces of left-video and right-video plane data.

When the playback control unit 4035 indicates B-D presentation mode, the switch 4320 transmits left-video plane data 4301 and right-video plane data 4302 with the same PTS to the first adder 4341 in that order. When the playback control unit 4035 indicates B-B presentation mode, the switch 4320 transmits one of the left-video plane data 4301 and right-video plane data 4302 with the same PTS twice per frame to the first adder 4341, discarding the other piece of plane data.

The cropping processing units 4331-4334 include the same structure as a pair of the parallax video generation unit 4310 and switch 4320. These structures are used in 2 plane mode. In particular, in the playback device 102 in depth mode, the parallax video generation unit located within each of the cropping processing units 4331-4334 converts the plane data from the system target decoder 4023 into a pair of left-view and right-view pieces of plane data. When the playback control unit 4035 indicates B-D presentation mode, the left-view and right-view pieces of plane data are alternately transmitted to each of the adders 4341-4344. On the other hand, when the playback control unit 4035 indicates B-B presentation mode, one of the left-view and right-view pieces of plane data is transmitted twice per frame to each of the adders 4341-4344, and the other piece of plane data is discarded.

In 1 plane+offset mode, the first cropping processing unit 4331 receives an offset value 4351 from the system target decoder 4023 and refers to this value to perform cropping on the secondary video plane data 4303. The secondary video plane data 4303 is thus converted into a pair of pieces of secondary video plane data that represent a left-view and a right-view and are alternately transmitted. On the other hand, in 1 plane+zero offset mode, the secondary video plane data 4303 is transmitted twice. Similarly, the second cropping processing unit 4332 performs cropping processing on the PG plane data 4304, and the third cropping processing unit 4333 performs cropping processing on the IG plane data 4305.

FIGS. 44A and 44B are schematic diagrams showing cropping processing by the second cropping processing unit 4332. As shown in FIGS. 44A and 44B, a pair of left-view PG plane data 4404L and right-view PG plane data 4404R is generated from one piece of PG plane data 4304 as follows. First, the second cropping processing unit 4332 retrieves the offset value assigned to the PG plane from the offset value 4351. Next, the second cropping processing unit 4332 shifts the presentation position of each graphics video image indicated by the PG plane data 4304 by the offset value. This yields a left-view and right-view pair of pieces of PG plane data 4404L and 4404R. Note that in 1 plane+zero offset mode, the offset value is "0", and thus the original PG plane data 4304 is preserved as is. The first cropping processing unit 4331 similarly processes the secondary video plane data 4303, and the third cropping processing unit 4333 similarly processes the IG plane data 4305.

As shown in FIG. 44A, when the sign of the offset value indicates that the depth of a 3D video image is closer than the screen, the second cropping processing unit 4332 first shifts each piece of pixel data in the PG plane data 4304 from its original position to the right by a number of pixels 4401L, which is the same as the offset value. When the sign of the offset value indicates that the depth of a 3D video image is deeper than the screen, the second cropping processing unit 4332 shifts pixel data to the left. Next, the second cropping processing unit 4332 removes the section of pixel data 4402L that protrudes outside the range of the PG plane data 4304 to the right (or left). The second cropping processing unit 4332 then outputs the remaining pixel data 4404L as the left-view PG plane data.

As shown in FIG. 44B, when the sign of the offset value indicates that the depth of a 3D video image is closer than the screen, the second cropping processing unit 4332 first shifts each piece of pixel data in the PG plane data 4304 from its original position to the left by a number of pixels 4401R, which is the same as the offset value. When the sign of the offset value indicates that the depth of a 3D video image is deeper than the screen, the second cropping processing unit 4332 shifts pixel data to the right. Next, the second cropping processing unit 4332 removes the section of pixel data 4402R that protrudes outside the range of the PG plane data 4304 to the left (or right). The second cropping processing unit 4332 then outputs the remaining pixel data 4404R as the right-view PG plane data.

FIGS. 45A, 45B, and 45C are schematic diagrams respectively showing the video images represented by the left-view and right-view PG plane data generated by the cropping processing shown in FIG. 44, i.e. the left-view and right-view PG planes, as well as the 3D video image perceived by a viewer based on these PG planes. As shown in FIG. 45A, the left-view PG plane 4501L is shifted to the right from the range of the screen 4502 by an offset value 4401L. As a result, the subtitle 2D video image 4503 in the left-view PG plane 4501L appears shifted to the right from its original position by the offset value 4401L. As shown in FIG. 45B, the right-view PG plane 4501R is shifted to the left from the range of the screen 4502 by an offset value 4401R. As a result, the subtitle 2D video image 4503 in the right-view PG plane 4501R appears shifted to the left from its original position by the offset value 4401R. When these PG planes 4501L and 4501R are alternately displayed on the screen 4502, then as shown in FIG. 45C, a viewer 4504 perceives the subtitle 3D video image 4505 as closer than the screen 4502. The distance between the 3D video image 4505 and the screen 4502 can be adjusted with the offset values 4401L and 4401R. When the position of each piece of pixel data in the PG plane data 4304 is shifted in the opposite direction than is shown in FIGS. 45A and 45B, the viewer 4504 perceives the subtitle 3D video image 4505 to be further back than the screen 4502.

In 1 plane+offset mode, cropping processing is thus used to generate a pair of a left-view and right-view pieces of plane data from a single piece of plane data. This allows a parallax video image to be displayed from just one piece of plane data. In other words, a sense of depth can be given to a planar image. In particular, a viewer can be made to perceive this planar image as closer or further back than the screen. Note that in 1 plane+zero offset mode, the offset value is "0", and thus the planar image is preserved as is.

Once again referring to FIG. 43, the image plane data 4306 is graphics data transmitted from the program execution unit 4034 to the system target decoder 4023 and decoded by the system target decoder 4023. The graphics data is raster data such as JPEG data or PNG data, and shows a GUI graphics component such as a menu. The fourth cropping processing unit 4334 performs the cropping processing on the image plane data 4306 as do the other cropping processing units 4331-4333. However, unlike the other cropping processing units 4331-4333, the fourth cropping processing unit 4334 receives the offset value from a program API 4352 instead of from the system target decoder 4023. In this case, the program API 4352 is executed by the program execution unit 4034. The offset value corresponding to the depth of the image represented by the graphics data is thus calculated and output to the fourth cropping processing unit 4334.

First, the first adder 4341 receives video plane data from the switch 4320 and receives secondary plane data from the first cropping processing unit 4331. Next, the first adder 4341 superimposes one set of video plane data and secondary plane data at a time, outputting the result to the second adder 4342. The second adder 4342 receives PG plane data from the second cropping processing unit 4332, superimposes the PG plane data on the plane data from the first adder 4341, and outputs the result to the third adder 4343. The third adder 4343 receives IG plane data from the third cropping processing unit 4333, superimposes the IG plane data on the plane data from the second adder 4342, and outputs the result to the fourth adder 4344. The fourth adder 4344 receives image plane data from the fourth cropping processing unit 4334, superimposes the image plane data on the plane data from the third adder 4343, and outputs the result to the display device 103. As a result, the secondary plane data 4303, PG plane data 4304, IG plane data 4305, and image plane data 4306 are superimposed on the left-video plane data 4301 and right-video plane data 4302 in the order shown by the arrow 4300 in FIG. 43. Via this composition processing, for each video image shown by plane data, the left-video image plane or right-video image plane, secondary video plane, IG plane, PG plane, and image plane appear to overlap in this order on the screen of the display device 103.

In addition to the above-stated processing, the plane adder 4024 performs processing to convert an output format of the plane data combined by the four adders 4341-4344 into a format that complies with the 3D display method adopted in a device such as the display device 103 to which the data is output. If an alternate-frame sequencing method is adopted in the device, for example, the plane adder 4024 outputs the composited plane data pieces as one frame or one field. On the other hand, if a method that uses a lenticular lens is adopted in the device, the plane adder 4024 composites a pair of left-view and right-view pieces of plane data as one frame or one field of video data with use of built-in buffer memory. Specifically, the plane adder 4024 temporarily stores and holds in the buffer memory the left-view plane data that has been composited first. Subsequently, the plane adder 4024 composites the right-view plane data, and further composites the resultant data with the left-view plane data held in the buffer memory. During composition, the left-view and right-view pieces of plane data are each divided, in a vertical direction, into small rectangular areas that are long and thin, and the small rectangular areas are arranged alternately in the horizontal direction in one frame or one field so as to re-constitute the frame or the field. In this way, the pair of left-view and right-view pieces of plane data is combined into one video frame or field, which the plane adder 4024 then outputs to the corresponding device.

<Modifications>

[A] When the VAU 931 for the base-view video stream and the VAU 932 for the dependent-view video stream shown in FIG. 9 belong to the same 3D VAU, the sequence header 931B and sequence header 932B may match, the picture headers 931C and 932C may match, and the slice headers in the compressed picture data 931E and 932E may match. The same is true for the VAU 941 and 942 shown in FIG. 10. In this case, during the processing to decode pictures shown in FIG. 42B, the decoding method of the dependent-view picture should be set to the same decoding method as the immediately preceding base-view picture. Accordingly, the decoder driver 4037 can omit steps D pertaining to the dependent-view pictures, like the second and fourth steps D, D2 and D4, shown in FIG. 42B. As a result, the burden on the decoder driver 4037 for decoding processing can be even further reduced.

Figure 46:
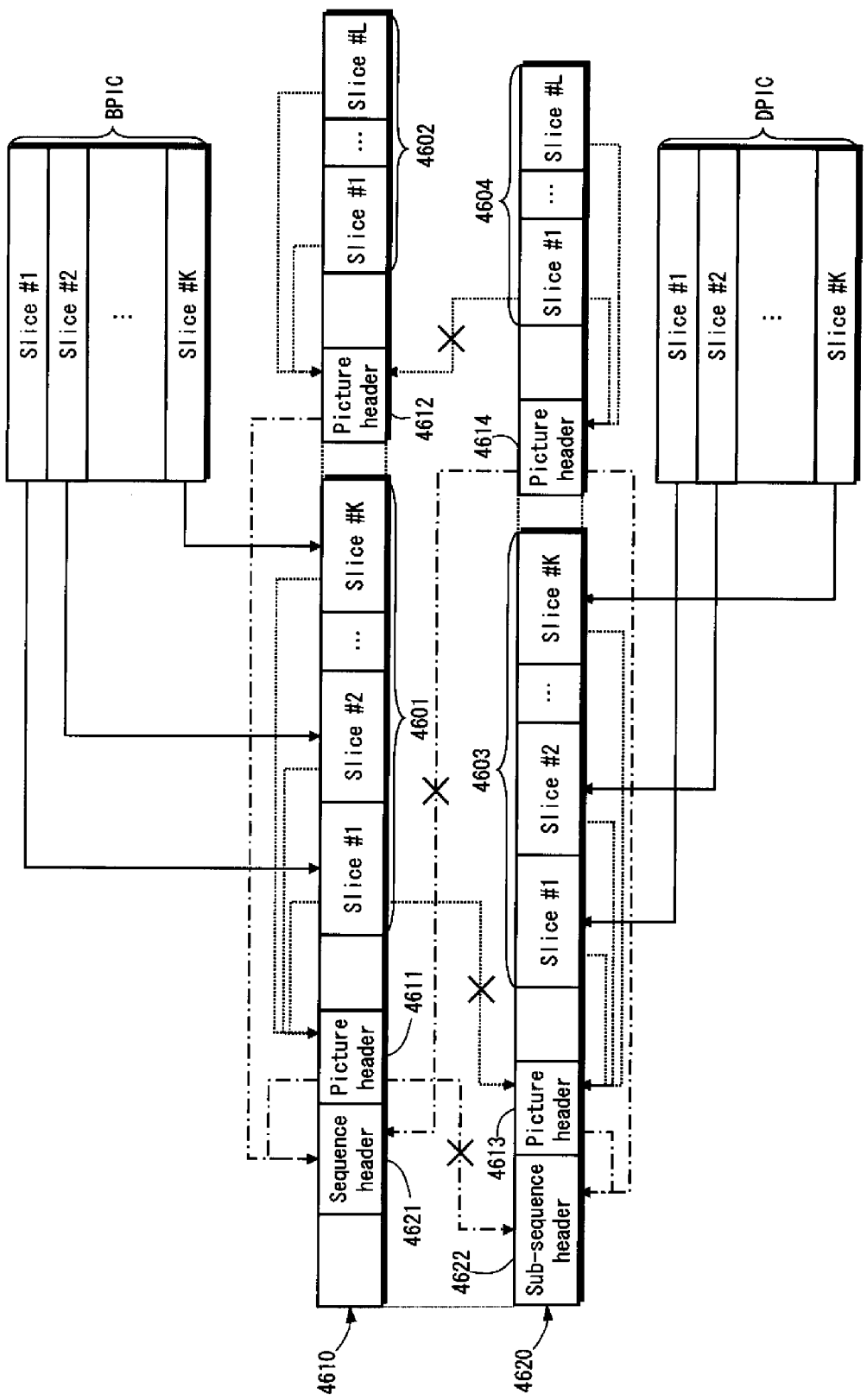
FIG. 46 is a schematic diagram showing reference relationships between headers of VAUs respectively found in a base-view video stream and dependent-view video stream according to modification [B] of embodiment 1 of the present invention.

[B] Reference to headers may be prohibited between the VAU for the base-view video stream and the VAU for the dependent-view video stream shown in FIGS. 9 and 10. FIG. 46 is a schematic diagram showing reference relationships between headers of VAUs respectively found in a base-view video stream 4610 and dependent-view video stream 4620. As shown in FIG. 46, in the base-view video stream 4610, the top picture BPIC is divided into slices #1-#K (an integer K is greater than or equal to 1) and stored in the compressed picture data 4601 for the VAU. A slice header is attached to each of the slices #1-#K. Each slice header includes the identification number for the picture header 4611 (for example, PPS number) in the same VAU. As shown by the arrow on the dashed lines in FIG. 46, the picture header 4611 to be referenced can thus be specified from the identification number indicated by each slice header. Similarly, another picture is divided into slices #1-#L (an integer L is greater than or equal to 1) and stored in the compressed picture data 4602 of another VAU. The slice header attached to each of the slices #1-#L includes the identification number for the picture header 4612 in the same VAU. As shown by the arrow on the dashed lines in FIG. 46, the picture header 4612 to be referenced can thus be specified from the identification number indicated by each slice header. Furthermore, the picture headers 4611 and 4612 include the identification number (for example, SPS number) for the sequence header 4621 in the same video sequence. As shown by the arrow on the alternating long and short dashed line in FIG. 46, the sequence header 4621 to be referenced can thus be specified from the identification number indicated by the picture headers 4611 and 4612.

Further referring to FIG. 46, in the dependent-view video stream 4620, the top picture DPIC is similarly divided into slices #1-#K and stored in the compressed picture data 4603 for the VAU. The slice header attached to each of the slices #1-#K includes the identification number for the picture header 4613 in the same VAU. As shown by the arrow on the dashed lines in FIG. 46, the picture header 4613 to be referenced can thus be specified from the identification number indicated by each slice header. Similarly, another picture is divided into slices #1-#L and stored in the compressed picture data 4604 of another VAU. The slice header attached to each of the slices #1-#L includes the identification number for the picture header 4614 in the same VAU. As shown by the arrow on the dashed lines in FIG. 46, the picture header 4614 to be referenced can thus be specified from the identification number indicated by each slice header. Furthermore, the picture headers 4613 and 4614 include the number for the sub-sequence header 4622 in the same video sequence. As shown by the arrow on the alternating long and short dashed line in FIG. 46, the sub-sequence header 4622 to be referenced can thus be specified from the identification number indicated by the picture headers 4613 and 4614.

As indicated by the arrows on the dashed lines with a cross in FIG. 46, in the base-view video stream 4610, the slice headers are prohibited from including the identification numbers for the picture headers 4613 and 4614 in the dependent-view video stream 4620. Conversely, in the dependent-view video stream 4620, the slice headers are prohibited from including the identification numbers for the picture headers 4611 and 4612 in the base-view video stream 4610. Furthermore, as indicated by the arrows on the alternating long and short dashed lines with a cross in FIG. 46, in the base-view video stream 4610, the picture headers 4611 and 4612 are prohibited from including the identification number for the sub-sequence header 4622 in the dependent-view video stream 4620. Conversely, in the dependent-view video stream 4620, the picture headers 4613 and 4614 are prohibited from including the identification number for the sequence header 4621 in the base-view video stream 4610.

As shown in FIG. 46, when reference between headers in the base-view and dependent-view video streams is prohibited, then in the steps B, B1-B4, and steps D, D1-D4, shown in FIG. 42B, analysis of the headers in the base-view and dependent-view video streams can be performed independently. Accordingly, both the burden on the DEC 4104 in step B and the burden on the decoder driver 4037 in step D can be reduced.

Figure 47:
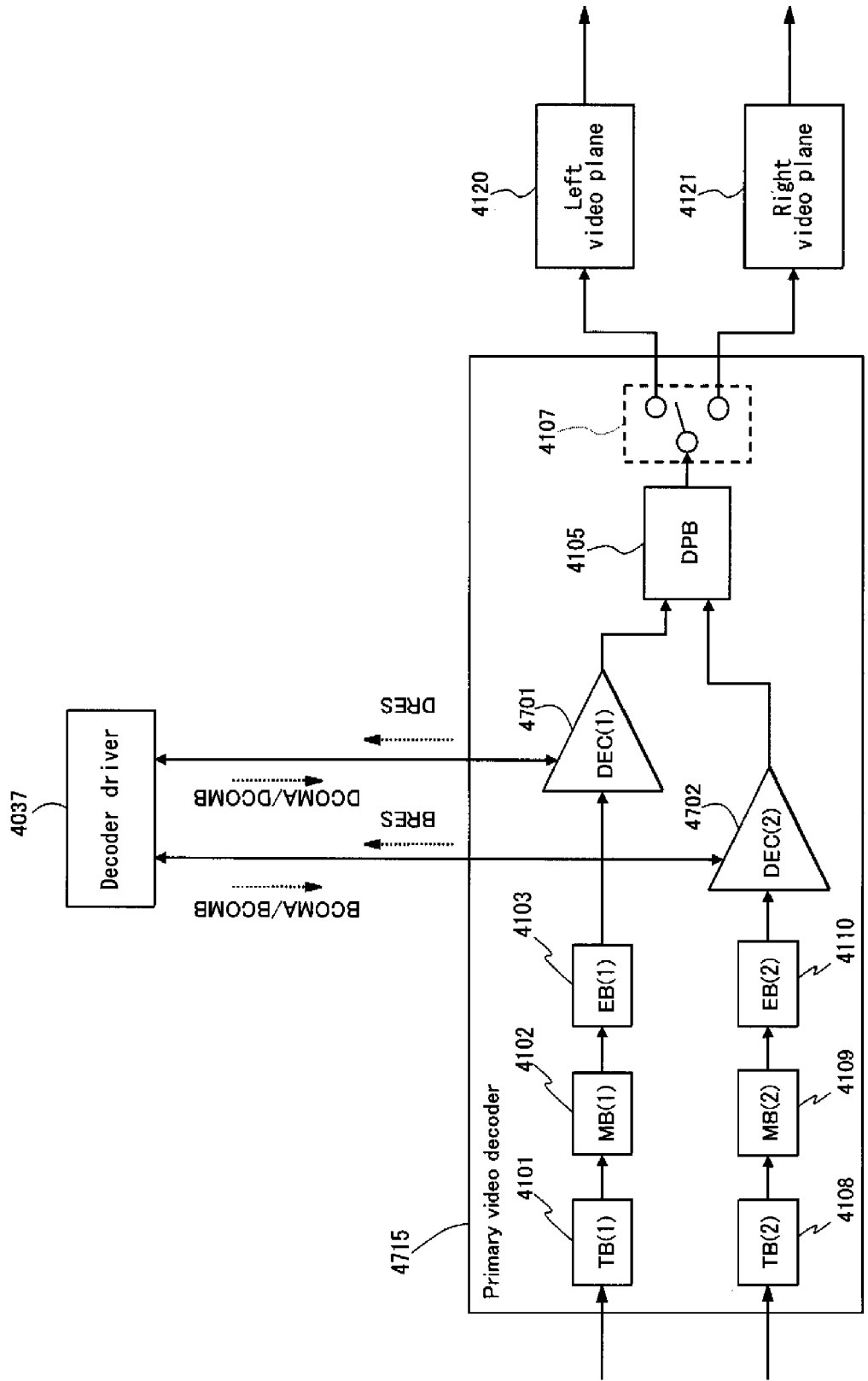
FIG. 47 is a schematic diagram showing the structure of a primary video decoder 4715, which is for decoding the video stream shown in FIG. 46.

When reference between headers in the base-view and dependent-view video streams is prohibited, then unlike the primary video decoder 4115 shown in FIG. 41, each video decoder may include two DECs. FIG. 47 is a schematic diagram showing the structure of the primary video decoder 4715 in such a case. In FIG. 47, elements that are the same as those shown in FIG. 41 bear the same labels as in FIG. 41. In FIG. 47, two DECs 4701 and 4702 are provided instead of the picture switch, unlike in FIG. 41. Both of the DECs 4701 and 4702 are hardware decoders similar to the DEC 3804 shown in FIG. 38. The DEC(1) 4701 decodes base-view pictures from the VAUs in the EB(1) 4103. The DEC(2) 4702 decodes dependent-view pictures from the VAUs in the EB (2) 4110. During decoding processing, the DEC(1) 4701 first analyzes the header of the VAU in response to a base-view header analysis command, BCOMA, from the decoder driver 4037, returning the results to the decoder driver 4037 via a notification of completion of base-view header analysis, BRES. Furthermore, when receiving a base-view decode start command, BCOMB, from the decoder driver 4037, the DEC(1) 4701 reads the decoding method from the decode start command, BCOMB, and starts to decode a base-view picture via this method. Similarly, the DEC(2) 4702 analyzes the header of the VAU in response to a dependent-view header analysis command, DCOMA, from the decoder driver 4037, returning the results to the decoder driver 4037 via a notification of completion of dependent-view header analysis, DRES. Furthermore, when receiving a dependent-view decode start command, DCOMB, from the decoder driver 4037, the DEC (2) 4702 reads the decoding method from the decode start command, DCOMB, and starts to decode a dependent-view picture via this method.

The burden placed on the DECs 4701 and 4702 by decoding processing is lighter than for the DEC 4104 shown in FIG. 41. Accordingly, the primary video decoder 4715 shown in FIG. 47 increases reliability of decoding processing even more than the primary video decoder 4115 shown in FIG. 41.

[C] Embodiment 1 of the present invention pertains to decoding technology for a 3D video stream. However, the present invention can also be used in decoding technology for high frame rate video. Specifically, the high frame rate video can for example be divided into an odd-numbered frame group and an even-numbered frame group, which can be considered as a base-view video stream and a dependent-view video stream and recorded on a recording medium with the same data structure as the data structure described in embodiment 1. A playback device that only supports video playback at a normal frame rate can play back the odd-numbered frame group from the recording medium. Conversely, a playback device that supports video playback at a high frame rate can selectively play back only the odd-numbered frame group or both frame groups. Compatibility with a playback device that only supports video playback at a normal frame rate can thus be ensured on a recording medium on which high frame rate video is stored.

[D] In embodiment 1 of the present invention, the base-view video stream represents the left-view, and the dependent-view video stream represents the right-view. Conversely, however, the base-view video stream may represent the right-view and the dependent-view video stream the left-view.

Figure 48:
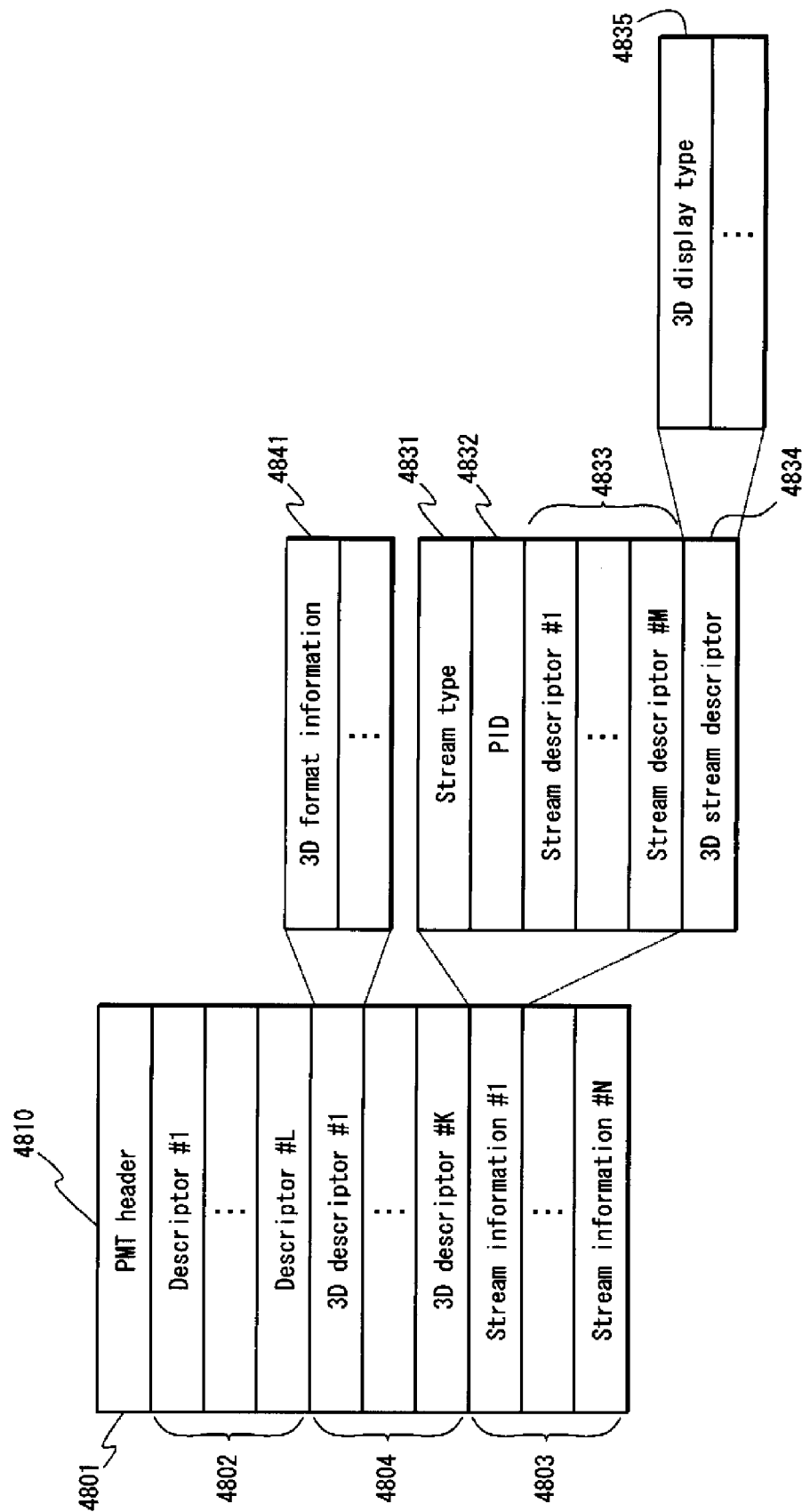
FIG. 48 is a schematic diagram showing the data structure of a PMT 4810 to which data related to the playback method of 3D video images has been added.

[E] In an AV stream file for 3D video images, data related to the playback format of 3D video images may be added to the PMT 1910 shown in FIG. 19. FIG. 48 is a schematic diagram showing the data structure of such a PMT 4810. As shown in FIG. 48, this PMT 4810 includes 3D descriptors 4804 in addition to a PMT header 4801, descriptors 4802, and pieces of stream information 4803. The PMT header 4801 and the descriptors 4802 are the same as the PMT header 1901 and descriptors 1902 shown in FIG. 19. The 3D descriptors 4804 are information that is related to the playback format of 3D video images and is common to the entire AV stream file. In particular, the 3D descriptors 4804 include pieces of 3D format information 4841. The pieces of 3D format information 4841 indicate the playback format, such as L/R mode, depth mode, etc., for the AV stream file for 3D video images.

Further referring to FIG. 48, each piece of stream information 4803 includes a 3D stream descriptor 4834 in addition to a stream type 4831, PID 4832, and stream descriptors 4833. The stream type 4831, PID 4832, and stream descriptors 4833 are the same as the stream type 1931, PID 1932, and stream descriptors 1933 shown in FIG. 19. The 3D stream descriptor 4834 indicates information related to the playback format of 3D video images for each elementary stream included in an AV stream file. In particular, the 3D stream descriptor 4834 for the video stream includes 3D display types 4835. When the video images indicated by the video stream are displayed in L/R mode, the 3D display types 4835 indicate whether the video images are for the left-view or right-view. Also, when the video images indicated by the video stream are displayed in depth mode, the 3D display types 4835 indicate whether the video images are 2D video images or depth maps.

As shown in FIG. 48, when the PMT 4810 includes information related to the playback format of 3D video images, information on the playback system for the video images can be acquired from only the AV stream file. Accordingly, this type of data structure is helpful when distributing 3D video contents via broadcast waves, for example.

[F] The offset table 2041 shown in FIG. 22A includes a table 2210 of offset entries 2204 for each PID. The offset table may additionally include a table of offset entries for each plane. In this case, analysis of the offset table by the 3D playback device can be simplified. Furthermore, a lower limit, such as one second, may be placed on the length of the valid section of an offset entry in conjunction with the capabilities of the 3D playback device with regards to plane composition.

[G] The 3D playlist file shown in FIG. 30 includes one sub-path indicating the playback path of the sub-TS. Alternatively, the 3D playlist file may include sub-paths indicating playback paths for different sub-TSs. For example, the sub-path type of one sub-path may be "3D L/R", and the sub-path type of another sub-path may be "3D depth". When 3D video images are played back in accordance with this 3D playlist file, the playback device 102 can easily switch between L/R mode and depth mode by switching the sub-path for playback between these two types of sub-paths. In particular, this switching processing can be performed faster than switching the 3D playlist file itself.

The 3D playlist file may include multiple sub-paths of the same sub-path type. For example, when 3D video images for the same scene are represented with different binocular parallaxes by using multiple right-views that share the same left-view, a different file DEP is recorded on the BD-ROM disc 101 for each different right-view video stream. The 3D playlist file then contains multiple sub-paths with a sub-path type of "3D L/R". These sub-paths individually specify the playback path for the different files DEP. Additionally, one file 2D may include two or more types of depth map stream. In this case, the 3D playlist file includes multiple sub-paths with a sub-path type of "3D depth". These sub-paths individually specify the playback path for the files DEP that include the depth map streams. When 3D video images are played back in accordance with such a 3D playlist file, the sub-path for playback can quickly be switched, for example in response to user operation, and thus the binocular parallax for 3D video images can be changed without substantial delay. In this way, users can easily be allowed to select a desired binocular parallax for 3D video images.

[H] In the data block group in the interleaved arrangement shown in FIG. 15, for three types of data blocks with equal extent ATC times, such as the top three data blocks D1, R1, and L1, the playback period may match, and the playback time of the video stream may be equal. In other words, the number of VAUs and the number of pictures in each of these data blocks may be equal. The significance of such equality is explained below.

Figure 49A:
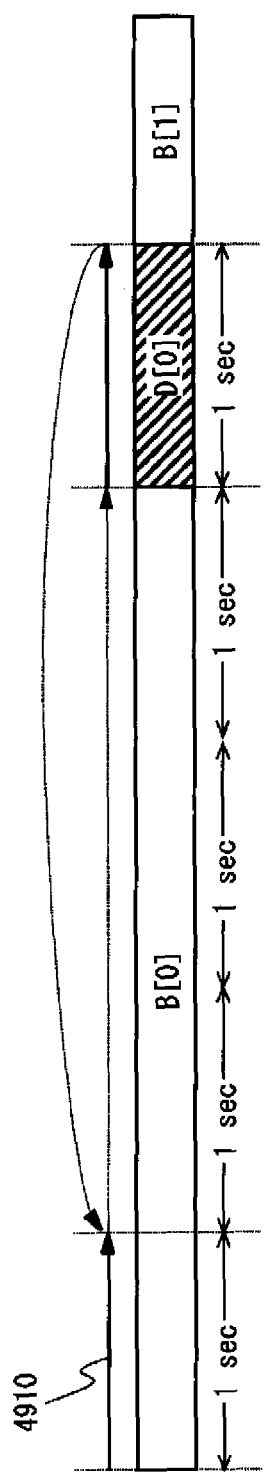
FIG. 49A is a schematic diagram showing the playback path when the extent ATC times and the playback times of the video stream differ between contiguous base-view data blocks and dependent-view data blocks.

FIG. 49A is a schematic diagram showing the playback path when the extent ATC times and the playback times of the video stream differ between contiguous base-view data blocks and dependent-view data blocks. As shown in FIG. 49A, the playback time of the top base-view data block B[0] is four seconds, and the playback time of the top dependent-view data block D[0] is one second. In this case, the section of the base-view data block that is necessary for decoding of the dependent-view data block D[0] has the same playback time as the dependent-view data block D[0]. Accordingly, to save read buffer capacity in the playback device 102, it is preferable, as shown by the arrow 4910 in FIG. 49A, to alternately read the base-view data block B[0] and the dependent-view data block D[0] into the buffer by the same amount of playback time, for example one second at a time. In that case, however, as shown by the dashed lines in FIG. 49A, jumps occur during read processing. As a result, it is difficult to cause read processing to keep up with decoding processing, and thus it is difficult to stably maintain seamless playback.

Figure 49B:
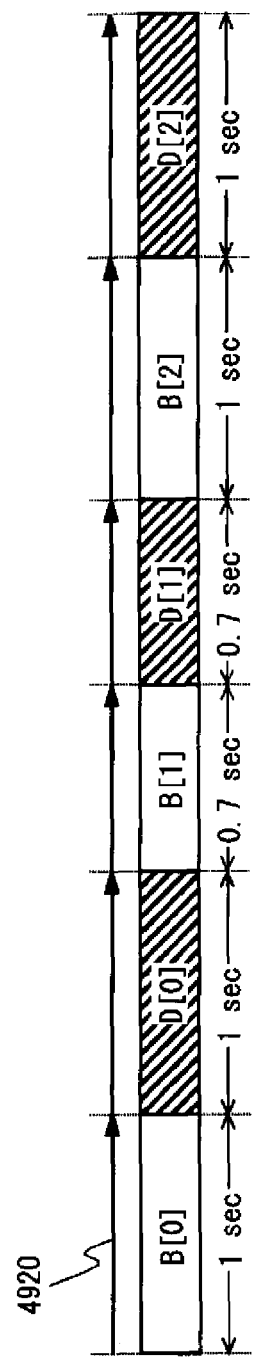
FIG. 49B is a schematic diagram showing a playback path when the playback times of the video stream are equal for contiguous base-view and dependent-view data blocks.

FIG. 49B is a schematic diagram showing the playback path when the playback times of the video stream are equal for contiguous base-view and dependent-view data blocks. On a BD-ROM disc 101 according to embodiment 1 of the present invention, as shown in FIG. 49B, the playback time of the video stream between a pair of adjacent data blocks may be the same. For example, for the pair of the top data blocks B[0] and D[0], the playback times of the video stream are both equal to one second, and the playback times of the video stream for the second pair of data blocks B[1] and D[1] are both equal to 0.7 seconds. In this case, during playback of 3D video images, the playback device 102 reads data blocks B[0], D[0], B[1], D[1] in order from the top, as shown by arrow 4920 in FIG. 49B. Simply in this way, the playback device 102 can smoothly read the main TS and sub-TS alternately. In particular, since no jump occurs during read processing, seamless playback of 3D video images can be stably maintained.

If the extent ATC time is actually the same between contiguous base-view and dependent-view data blocks, jumps do not occur during reading, and synchronous decoding can be maintained. Accordingly, even if the playback period or the playback time of the video stream are not equal, the playback device 102 can reliably maintain seamless playback of 3D video images by simply reading data block groups in order from the top, as in the case shown in FIG. 49B.

The number of any of the headers in a VAU, and the number of PES headers, may be equal for contiguous base-view and dependent-view data blocks. These headers are used to synchronize decoding between data blocks. Accordingly, if the number of headers is equal between data blocks, it is relatively easy to maintain synchronous decoding, even if the number of VAUs is not equal. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

Figure 50:
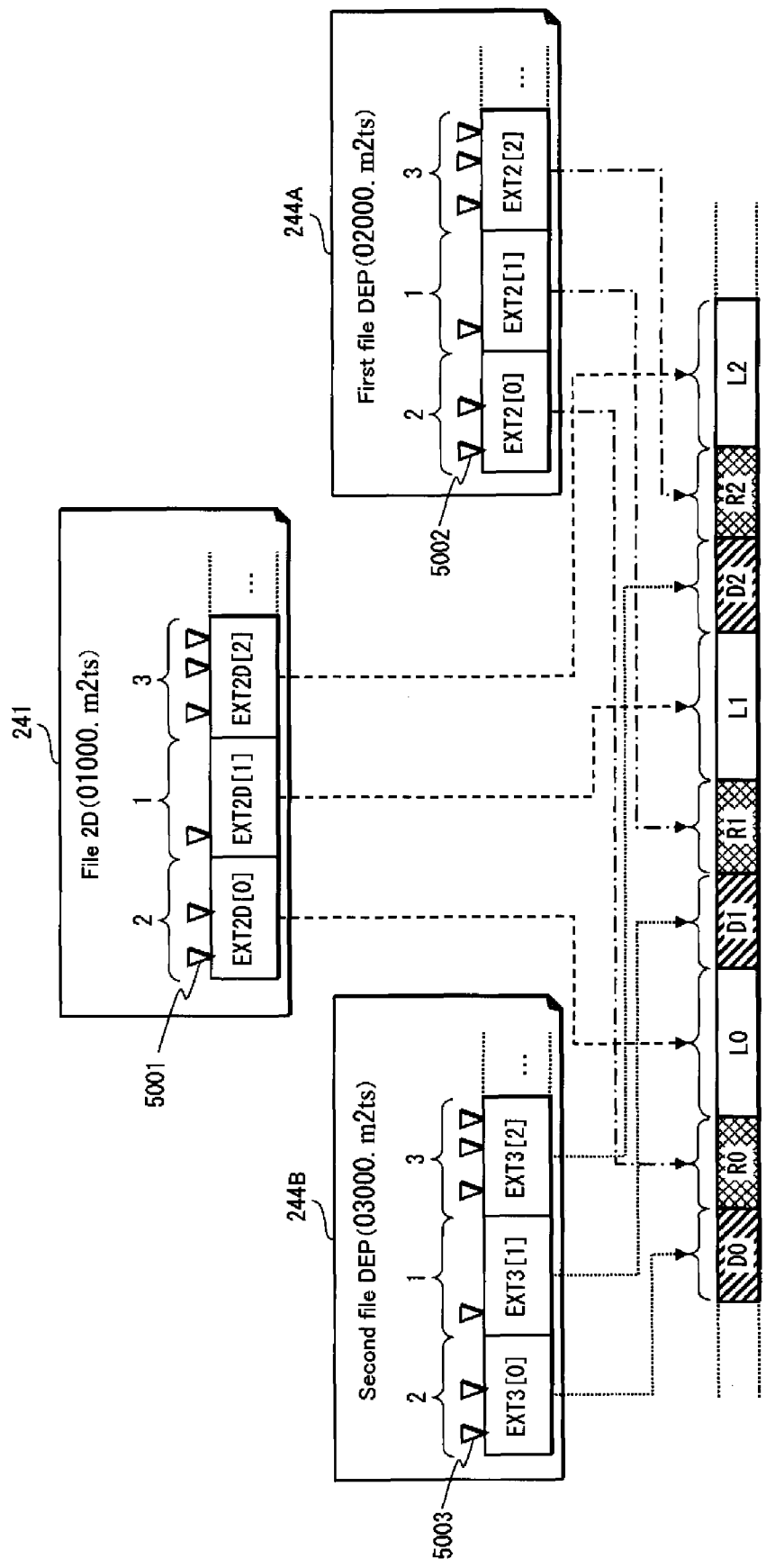
FIG. 50 is a schematic diagram showing the relationships between entry points and a data block group in an interleaved arrangement when the number of entry points is the same between contiguous base-view and dependent-view data blocks.

The number of entry points may be equal for contiguous base-view and dependent-view data blocks. FIG. 50 is a schematic diagram for such a case, showing the relationships between entry points and a data block group in an interleaved arrangement. As shown in FIG. 50, the 2D extents EXT1[$n$] ($n$=0, 1, 2, . . . ) in the file 2D 241 refer to base-view data blocks Ln, the right-view extents EXT2[$n$] in the first file DEP 242 refer to right-view data blocks Rn, and the depth map extents EXT3[$n$] in the second file DEP 243 refer to depth map data blocks Dn. In FIG. 50, entry points are shown by triangles 5001, 5002, and 5003, and the number of entry points included in each extent is indicated by a numeral. In the three files 241, 242, and 243, the extents EXT1[$n$], EXT2[$n$], and EXT3[$n$], located in the same order from the top, have the same number of entry points 5001, 5002, and 5003. When playing back 3D video images from a data block group Dn, Rn, and Ln, a jump occurs in L/R mode at each depth map data block Dn, and a jump occurs in depth mode at each right-view data block Rn. When the number of entry points is equal between data blocks, however, the playback time is substantially equal. Accordingly, it is easy to maintain synchronous decoding regardless of jumps. Furthermore, unlike when the number of VAUs is equal, all of the data in the VAUs need not be multiplexed in the same data block. Therefore, there is a high degree of freedom for multiplexing stream data during the authoring process of the BD-ROM disc 101.

[I] Conditions on Setting Sequence End Codes

As shown in FIG. 10, a VAU may include sequence end codes 941G and 942G. As described above, a sequence end code indicates the end of a video sequence. When the video decoder in the playback device 102 detects a sequence end code, it accordingly performs initialization processing, such as resetting the STC. Therefore, by using a sequence end code, the video decoder can be caused to detect a boundary of a video sequence from stream data for decoding without referring to a playlist file.

FIGS. 51A-51F are schematic diagrams showing conditions on setting a sequence end code for multiplexed stream data played back according to the main path in the 2D playlist file. In FIG. 51, each rectangle AU represents one VAU in the multiplexed stream data 5101 and 5102. In particular, sequence end codes are set in the VAUs indicated by rectangles AU that are emphasized by diagonal lines.

Figure 51A:
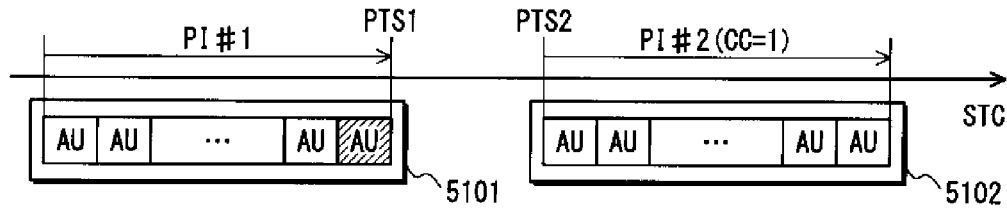
FIGS. 51A-51F are schematic diagrams showing conditions on setting a sequence end code for multiplexed stream data played back according to a main path in a 2D playlist file.

In FIG. 51A, the connection condition (CC) is "1" for PI #2, which follows PI #1. In this case, the video sequence differs between PI #1 and PI #2. In particular, the playback end time PTS1 of PI #1 differs from the playback start time PTS2 of PI #2. Accordingly, a sequence end code is set in the last VAU corresponding to the playback end time PTS1 in the multiplexed stream data 5101 for playback indicated by PI #1. Based on this sequence end code, the video decoder can detect that, between the multiplexed stream data 5101 and 5102 to be played back, there is a video sequence boundary.

Figure 51B:
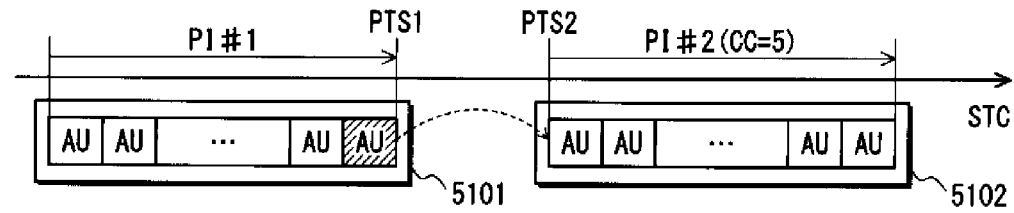

In FIG. 51B, the CC is "5" for PI #2, which follows PI #1. In this case, the multiplexed stream data 5101 and 5102 to be played back indicated by PI #1 and PI #2 is transmitted to the decoder successively. However, the video sequence differs between PI #1 and PI #2. In particular, the playback end time PTS1 of PI #1 differs from the playback start time PTS2 of PI #2. Accordingly, a sequence end code is set in the last VAU corresponding to the playback end time PTS1 in the multiplexed stream data 5101 for playback indicated by PI #1. Based on this sequence end code, the video decoder can detect that, between the multiplexed stream data 5101 and 5102 to be played back, there is a video sequence boundary.

Figure 51C:
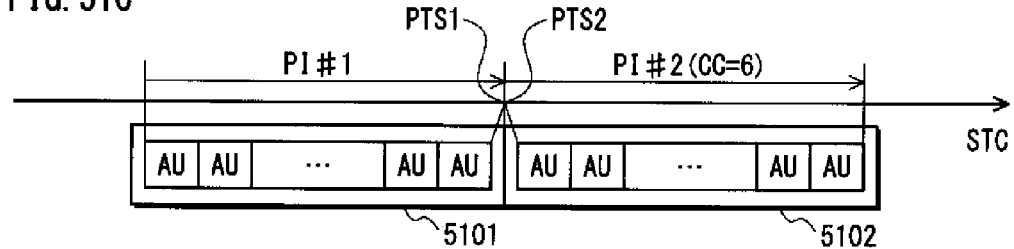

In FIG. 51C, the CC is "6" for PI #2, which follows PI #1. In this case, the video sequence is continuous between PI #1 and PI #2. In particular, the playback end time PTS1 of PI #1 equals the playback start time PTS2 of PI #2. Accordingly, it is preferable not to cause the video decoder to detect the boundary between the multiplexed stream data 5101 and 5102 to be played back indicated by PI #1 and PI #2 as a video sequence boundary. Therefore, unlike FIGS. 51A and 51B, a sequence end code is prohibited from being set in the last VAU corresponding to the playback end time PTS1 for PI #1.

Figure 51D:
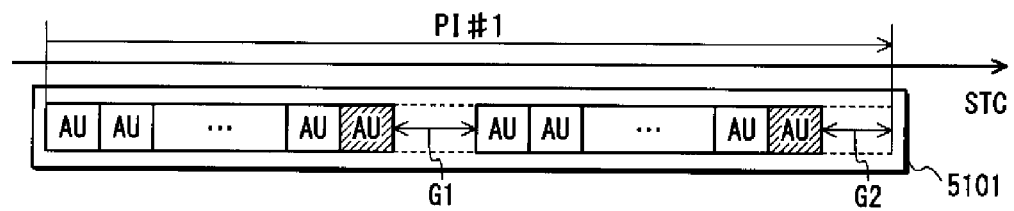

In FIG. 51D, the multiplexed stream data 5101 for playback indicated by PI #1 includes video gaps G1 and G2. A "video gap" refers to locations where the playback time of the video stream in the multiplexed stream data is interrupted. Accordingly, in this multiplexed stream data 5101, a sequence end code is set in each of the VAUs located immediately before the video gaps G1 and G2. The video decoder can detect the video gaps G1 and G2 based on these sequence end codes. As a result, the video decoder can avoid freezing during the video gaps G1 and G2, i.e. "waiting for the next VAU to be transmitted". It is thus possible to prevent the undesirable condition of "the video image represented by the data written into the video plane immediately before each of the video gaps G1 and G2 being continuously displayed".

Figure 51E:
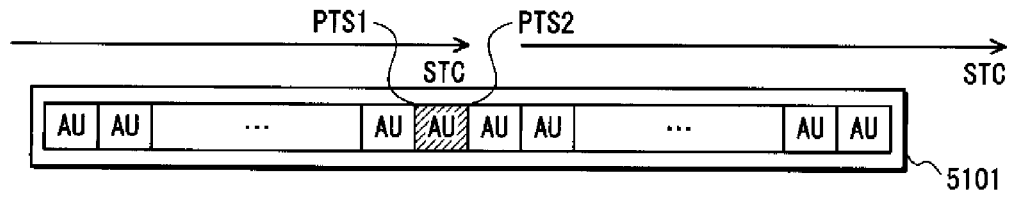

In FIG. 51E, the multiplexed stream data 5101 for playback indicated by PI #1 includes a discontinuous point in the STC sequence. An "STC sequence" refers to a sequence of data with continuous PTSs. Accordingly, a "discontinuous point in the STC sequence" refers to a location where the PTSs are not continuous. Such discontinuous points include the case of updating the STC value in accordance with the PCR. At the discontinuous point in the STC sequence shown in FIG. 51E, the PTSs are not continuous between two contiguous VAUs. In this case, a sequence end code is set in the earlier of the two VAUs. The video decoder can detect the discontinuous point in the STC sequence based on this sequence end code.

Figure 51F:
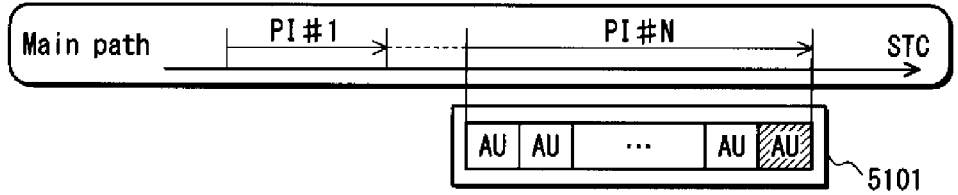

In FIG. 51F, PI #N is located at the end of the main path 5103 in the 2D playlist file. Accordingly, in the multiplexed stream data 5101 for playback indicated by the PI #N, the VAU corresponding to the playback end time PTS1 is located at the end of the video sequence. In this case, a sequence end code is set in this VAU. The video decoder can detect the end of the video sequence based on this sequence end code.

For cases other than the six cases shown in FIGS. 51A-51F, the playback section is continuous. Accordingly, setting of a sequence end code in a VAU is prohibited in the section of the multiplexed stream data corresponding to a continuous playback section.

Conditions on setting sequence end codes are the same for multiplexed stream data played back in accordance with the sub-path in the 2D playlist file. In other words, in FIGS. 51A-51F, "PI" can be replaced by "SUB_PI", and "connection condition" can be replaced by "SP connection condition".

Conditions on setting sequence end codes are the same for a main TS played back in accordance with the main path and for a sub-TS played back in accordance with the sub-path in the 3D playlist file. In particular, when a sequence end code is set in either the VAU in the main TS or the VAU in the sub-TS belonging to the same 3D VAU, a sequence end code also has to be set in the other VAU.

Note that for the setting of a stream end code, the condition that the stream end code be "set only when a sequence end code is set, and placed immediately thereafter" may be applied. Also, when the playback device can detect a video sequence boundary from information other than a sequence end code, part or all of the above condition may be waived in accordance with such detection ability. That is, whether or not a sequence end code is actually set in the VAUs emphasized with diagonal lines in FIGS. 51A-51F may be determined based on the playback device's detection ability.

When the above-described conditions are set on sequence end codes for the main TS and the sub-TS, the 3D playback device should be made not to detect a sequence end code from a VAU in the base-view video stream via the following method.

Figure 52:
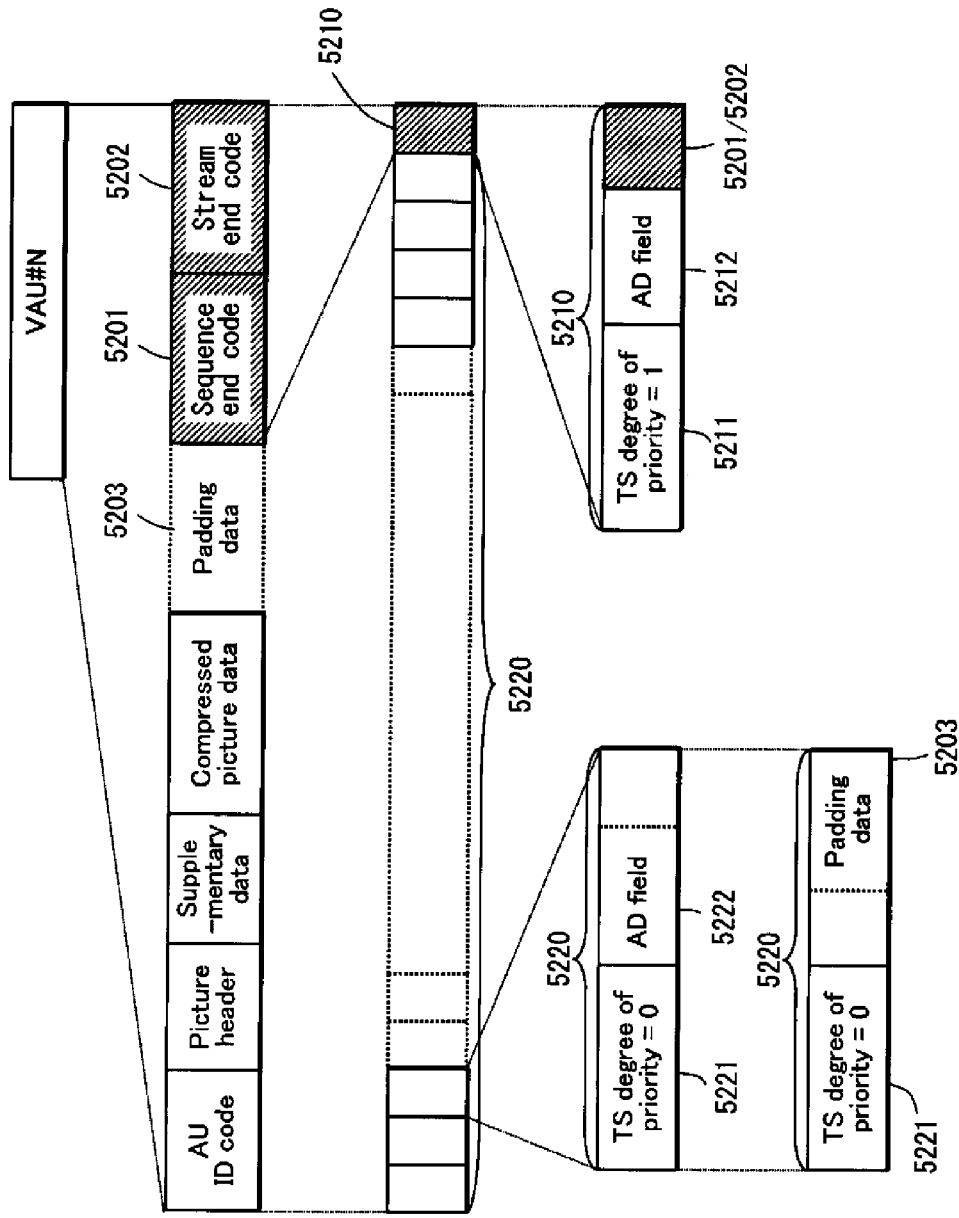
FIG. 52 is a schematic diagram showing the data structure of a TS packet sequence storing a VAU #N in a base-view video stream for which a sequence end code is set.

FIG. 52 is a schematic diagram showing the data structure of a TS packet sequence storing a VAU #N in a base-view video stream for which a sequence end code is set. As shown in FIG. 52, the VAU #N is generally divided into multiple parts and stored in TS packets 5210 and 5220, after a PES header has been attached to the top of the VAU #N. In the TS packets 5210 including the sequence end code 5201 and the stream end code 5202 in the VAU #N, the value of the TS degree of priority 5211 is "1". Conversely, in the TS packets 5220 containing the rest of the data in the VAU #N, the TS degree of priority 5221 is "0". These TS packets 5210 and 5220 are multiplexed in the base-view video stream. Note that the size of each of the TS packets 5210 and 5220 is equally set to 188 bytes, using the AD fields 5212 and 5222 for stuffing as necessary. In the TS packets 5220, having a value of "0" for the TS degree of priority 5221, padding data 5203 may be used for stuffing instead of the AD field 5222.

Figure 53:
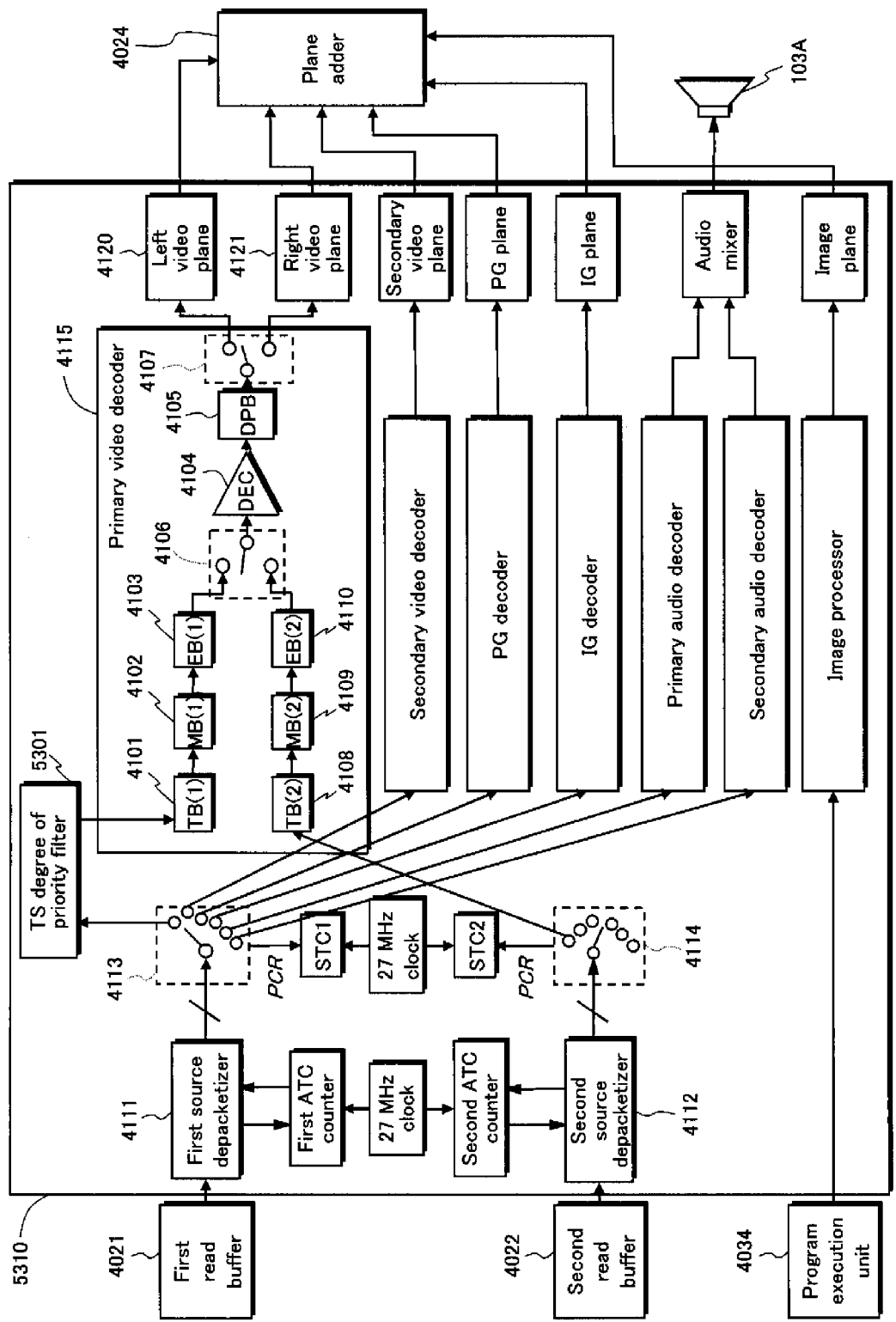
FIG. 53 is a functional block diagram of a system target decoder 5310 in a 3D playback device according to modification [I] of embodiment 1 of the present invention.

FIG. 53 is a functional block diagram of a system target decoder 5310 in a 3D playback device. Unlike the system target decoder 4023 shown in FIG. 41, this system target decoder 5310 includes a TS degree of priority filter 5301. Other elements are the same for the system target decoders 5310 and 4023. Accordingly, details on elements common to both decoders can be found in the description for the system target decoder 4023 shown in FIG. 41.

The TS degree of priority filter 5301 monitors the value of the TS degree of priority indicated by each TS packet transmitted from the first PID filter 4113 and, based on this value, filters the TS packets. Specifically, the TS degree of priority filter 5301 transmits TS packets having a TS degree of priority of "0" to the TB(1) 4101 and discards TS packets having a TS degree of priority of "1".

Figure 54:
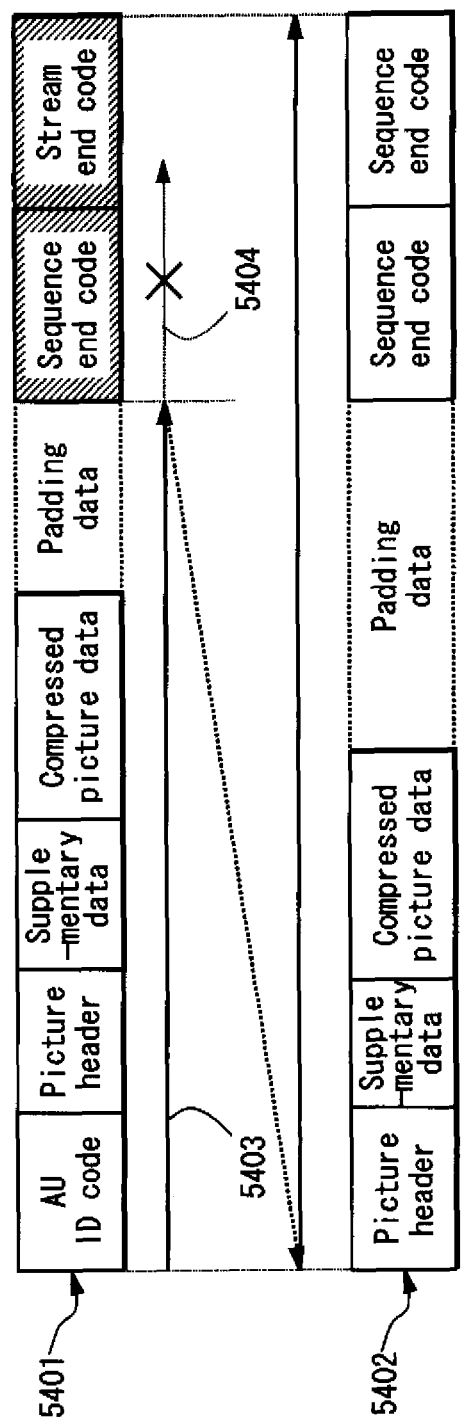
FIG. 54 is a schematic diagram showing the order of decoding, by the system target decoder 5301 shown in FIG. 53, of a base-view video stream VAU 5401 and a dependent-view video stream VAU 5402.

FIG. 54 is a schematic diagram showing the order of decoding, by the system target decoder 5310 shown in FIG. 53, of a base-view video stream VAU 5401 and a dependent-view video stream VAU 5402. The base-view video stream VAU 5401 is the VAU #N shown in FIG. 52. The dependent-view video stream VAU 5402 belongs to the same 3D VAU as the VAU #N. As shown by the arrow 5403 in FIG. 54, processing by the system target decoder 5310 proceeds in order from the TS packet included in the base-view video stream VAU 5401. As shown in FIG. 52, the data from the top of the VAU 5401 until the padding data is stored in TS packets 5220 that have a TS degree of priority of "0". Accordingly, the TS degree of priority filter 5301 stores these TS packets in the TB(1) 4101. On the other hand, the sequence end code and stream end code in the VAU 5401 are stored in TS packets 5210 that have a TS degree of priority of "1". Accordingly, the TS degree of priority filter 5301 discards these TS packets. As indicated by the cross in FIG. 54, decoding of the sequence end code and the stream end code is thus skipped.

Via the above-described method, the sequence end code and the stream end code in the base-view video stream VAU 5401 are not transferred to the primary video decoder 4115. Accordingly, the primary video decoder 4115 does not detect a sequence end code from the base-view video stream VAU 5401 before decoding the dependent-view video stream VAU 5402. This avoids the risk of misinterpreting the position of the sequence end code as a video sequence boundary, thus preventing a playback error in the last 3D VAU due to an interruption in decoding.

Note that, unlike FIG. 52, the sequence end code and stream end code for a base-view video stream VAU may be stored in TS packets with a TS degree of priority of "0", and other data may be stored in TS packets with a TS degree of priority of "1". In this case, the TS degree of priority filter 5301 discards TS packets having a TS degree of priority of "0" and transmits TS packets having a TS degree of priority of "1" to the TB(1) 4101. In the same way as shown in FIG. 54, the primary video decoder 4115 can thus be prevented from detecting the sequence end code in a base-view video stream VAU.

[J] Size of Data Blocks in the Interleaved Arrangement

On a BD-ROM disc 101 according to embodiment 1 of the present invention, base-view and dependent-view data block groups are formed in the interleaved arrangement shown in FIGS. 15 and 24. The interleaved arrangement is useful for seamless playback of both 2D video images and 3D video images. To further ensure such seamless playback, the size of each data block should meet the following conditions based on the capability of the playback device 102.

[J-1] Conditions Based on Capability in 2D Playback Mode

Figure 55:
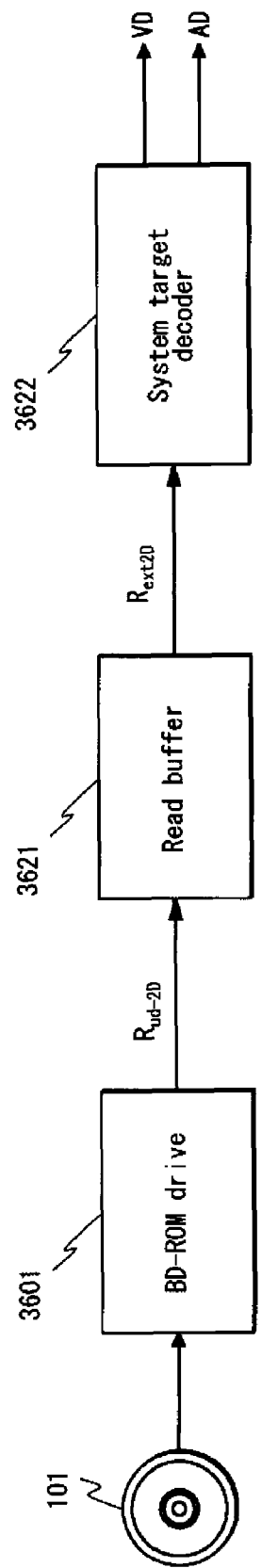
FIG. 55 is a schematic diagram showing the playback processing system in the playback device 102 in 2D playback mode shown in FIG. 36.

FIG. 55 is a schematic diagram showing the playback processing system in the playback device 102 in 2D playback mode. As shown in FIG. 55, this playback processing system includes the BD-ROM drive 3601, read buffer 3621, and system target decoder 3622 shown in FIG. 36. The BD-ROM drive 3601 reads 2D extents from the BD-ROM disc 101 and transfers the 2D extents to the read buffer 3621 at a read rate $R_{ud\text{-}2D}$. The system target decoder 3622 reads source packets from each 2D extent stored in the read buffer 3621 at a mean transfer rate $R_{ext2D}$ and decodes the source packets into video data VD and audio data AD.

The mean transfer rate $R_{ext2D}$ is the same as 192/188 times the mean transfer rate $R_{TS}$ of TS packets from the source depacketizer 3811 to the PID filter 3813 shown in FIG. 38. In general, this mean transfer rate $R_{ext2D}$ changes for each 2D extent. The maximum value $R_{max2D}$ of the mean transfer rate $R_{ext2D}$ is the same as 192/188 times the system rate for the file 2D. In this case, the 2D clip information file specifies the system rate, as shown in FIG. 20. Also, the above coefficient 192/188 is the ratio of bytes in a source packet to bytes in a TS packet. The mean transfer rate $R_{ext2D}$ is conventionally represented in bits/second and specifically equals the value of the size of a 2D extent expressed in bits divided by the extent ATC time. The "size of an extent expressed in bits" is eight times the product of the number of source packets in the extent and the number of bytes per source packet (=192 bytes). The extent ATC time is the same as the time required to transfer all of the source packets in the extent from the read buffer 3621 to the system target decoder 3622.

In order to accurately calculate the extent ATC time when evaluating the mean transfer rate, the size of each extent can be regulated as a fixed multiple of the source packet length. Furthermore, when a particular extent includes more source packets than this multiple, the extent ATC time of the extent can be calculated as follows: first, the number of source packets exceeding the multiple is multiplied by the transfer time per source packet (=188×8/system rate). This product is then added to the extent ATC time corresponding to the fixed multiple to yield the extent ATC time for the particular extent. Alternatively, the extent ATC time can be defined as the sum of (i) the value of the time interval from the ATS of the top source packet in an extent until the ATS of the last source packet in the same extent and (ii) the transfer time per source packet. In this case, reference to the next extent is unnecessary for calculation of the extent ATC time, and thus the calculation can be simplified. Note that in the above-described calculation of extent ATC time, the occurrence of wraparound in the ATS needs to be taken into consideration.

The read rate $R_{ud\text{-}2D}$ is conventionally expressed in bits/second and is set at a higher value, e.g. 54 Mbps, than the maximum value $R_{max2D}$ of the mean transfer rate $R_{ext2D}$: $R_{ud\text{-}2D} > R_{max2D}$. This prevents underflow in the read buffer 3621 due to decoding processing by the system target decoder 3622 while the BD-ROM drive 3601 is reading a 2D extent from the BD-ROM disc 101.

Figure 56:
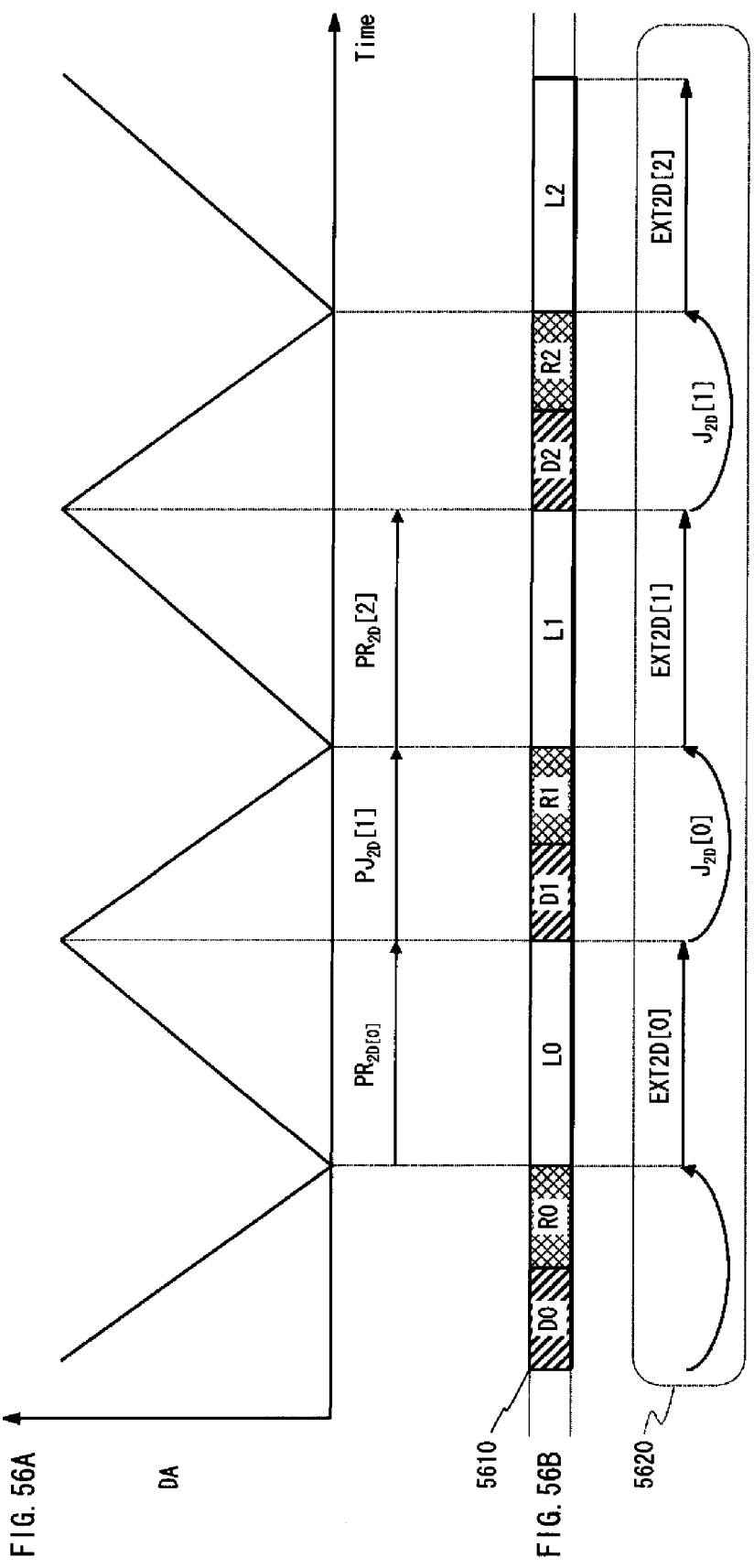
FIG. 56A is a graph showing the change in a data amount DA stored in a read buffer 3621 during operation of the playback device 102 in 2D playback mode shown in FIG. 55.
FIG. 56B is a schematic diagram showing the relationship between a data block group 5610 for playback and a playback path 5620 in 2D playback mode.

FIG. 56A is a graph showing the change in the data amount DA stored in the read buffer 3621 during operation in 2D playback mode. FIG. 56B is a schematic diagram showing the relationship between a data block group 5610 for playback and a playback path 5620 in 2D playback mode. As shown in FIG. 56B, the data block group 5610 is composed of a base-view data block group Ln (n=0, 1, 2, . . . ) and a dependent-view data block group Dn, Rn in the interleaved arrangement. In accordance with the playback path 5620, the base-view data blocks Ln are each treated as one 2D extent EXT2D[n] and are read from the BD-ROM disc 101 into the read buffer 3621. As shown in FIG. 56A, during the read period $PR_{2D}[n]$ for each base-view data block Ln, i.e. each 2D extent EXT2D [n], the stored data amount DA increases at a rate equal to $R_{ud\text{-}2D} - R_{ext2D}[n]$, the difference between the read rate $R_{ud\text{-}2D}$ and the mean transfer rate $R_{ext\text{-}2D}[n]$.

Reading and transfer operations by the BD-ROM drive 3601 are not actually performed continuously, but rather intermittently, as shown in FIG. 56A. During the read period $PR_{2D}[n]$ for each 2D extent, this prevents the stored data amount DA from exceeding the capacity of the read buffer 3621, i.e. overflow in the read buffer 3621. Accordingly, the graph in FIG. 56A represents what is actually a step-wise increase as an approximated straight increase.

A jump $J_{2D}[n]$, however, occurs between two contiguous 2D extents EXT2D[n−1] and EXT2D[n]. Since the reading of two contiguous dependent-view data blocks Dn and Rn is skipped during the corresponding jump period $PJ_{2D}[n]$, reading of data from the BD-ROM disc 101 is interrupted. Accordingly, the stored data amount DA decreases at a mean transfer rate $R_{ext2D}[n]$ during each jump period $PJ_{2D}[n]$.

In order to play back 2D video images seamlessly from the data block group 5610 shown in FIG. 5613, the following conditions [1] and [2] should be met.

[1] While data is continuously provided from the read buffer 3621 to the system target decoder 3622 during each jump period $PJ_{2D}[n]$, continual output from the system target decoder 3622 needs to be ensured. To do so, the following condition should be met: the size $S_{ext2D}[n]$ of each 2D extent EXT2D[n] is the same as the data amount transferred from the read buffer 3621 to the system target decoder 3622 from the read period $PR_{2D}[n]$ through the next jump period $PJ_{2D}[n+1]$. If this is the case, then as shown in FIG. 56A, the stored data amount DA at the end of the jump period $PJ_{2D}[n+1]$ does not fall below the value at the start of the read period $PR_{2D}[n]$. In other words, during each jump period $PJ_{2D}[n]$, data is continuously provided from the read buffer 3621 to the system target decoder 3622. In particular, underflow does not occur in the read buffer 3621. In this case, the length of the read period $PR_{2D}[n]$ equals $S_{ext2D}[n]/R_{ud-2D}$, the value obtained by dividing the size $S_{ext2D}[n]$ of a 2D extent EXT2D[n] by the read rate $R_{ud-2D}$. Accordingly, the size $S_{ext2D}[n]$ of each 2D extent EXT2D[n] should satisfy expression 1.

$$S_{ext2D}[n] \geq \left( \frac{S_{ext2D}[n]}{R_{ud-2D}} + T_{jump-2D}[n] \right) \times R_{ext2D}[n] \quad (1)$$

$$\therefore S_{ext2D}[n] \geq \mathrm{CEIL}\left( \frac{R_{ext2D}[n]}{8} \times \frac{R_{ud-2D}}{R_{ud-2D} - R_{ext2D}[n]} \times T_{jump-2D}[n] \right)$$

In expression 1, the jump time $T_{jump-2D}[n]$ represents the length of the jump period $PJ_{2D}[n]$ in seconds. The read rate $R_{ud-2D}$ and the mean transfer rate $R_{ext2D}$ are both expressed in bits per second. Accordingly, in expression 1, the mean transfer rate $R_{ext2D}$ is divided by 8 to convert the size $S_{ext2D}[n]$ of the 2D extent from bits to bytes. That is, the size $S_{ext2D}[n]$ of the 2D extent is expressed in bytes. The function CEIL( ) is an operation to round up fractional numbers after the decimal point of the value in parentheses.

[2] Since the capacity of the read buffer 3621 is limited, the maximum value of the jump period $T_{jump-2D}[n]$ is limited. In other words, even if the stored data amount DA immediately before a jump period $PJ_{2D}[n]$ is the maximum capacity of the read buffer 3621, if the jump time $T_{jump-2D}[n]$ is too long, the stored data amount DA will reach zero during the jump period $PJ_{2D}[n]$, and there is a danger of underfloor occurring in the read buffer 3621. Hereinafter, the time for the stored data amount DA to decrease from the maximum capacity of the read buffer 3621 to zero while data supply from the BD-ROM disc 101 to the read buffer 3621 has stopped, that is, the maximum value of the jump time $T_{jump-2D}$ that guarantees seamless playback, is referred to as the "maximum jump time".

In standards of optical discs, the relationships between jump distances and maximum jump times are determined from the access speed of the optical disc drive and other factors. "Jump distance" refers to the length of the area on the optical disc whose reading is skipped during a jump period. Jump distance is normally expressed as the number of sectors of the corresponding section. FIG. 57 is an example of a correspondence table between jump distances $S_{jump}$ and maximum jump times $T_{jump\_max}$ for a BD-ROM disc. As shown in FIG. 57, jump distances $S_{jump}$ are represented in units of sectors, and maximum jump times $T_{jump\_max}$ are represented in milliseconds. In this figure, one sector equals 2048 bytes. When a jump distance $S_{jump}$ is zero sectors or is within a range of 1-10000 sectors, 10001-20000 sectors, 20001-40000 sectors, 40001 sectors-1/10 of a stroke, and 1/10 of a stroke or greater, the corresponding maximum jump time $T_{jump\_max}$ is 50 ms, 250 ms, 300 ms, 350 ms, 700 ms, and 1400 ms, respectively.

When the jump distance $S_{jump}$ is equal to zero sectors, the maximum jump time is particularly referred to as a "zero sector transition time $T_{jump-0}$". A "zero sector transition" is a movement of the optical pickup between two consecutive data blocks. During a zero sector transition period, the optical pickup head temporarily suspends its read operation and waits. The zero sector transition time may include, in addition to the time for shifting the position of the optical pickup head via revolution of the BD-ROM disc 101, overhead caused by error correction processing. "Overhead caused by error correction processing" refers to excess time caused by performing error correction processing twice using an ECC block when the boundary for ECC blocks does not match the boundary for two data blocks. A whole ECC block is necessary for error correction processing. Accordingly, when two consecutive data blocks share a single ECC block, the whole ECC block is read and used for error correction processing during reading of either data block. As a result, each time one of these data blocks is read, a maximum of 32 sectors of excess data is additionally read. The overhead caused by error correction processing is assessed as the total time for reading the excess data, i.e. 32 sectors×2048 bytes×8 bits/byte×2 instances/read rate $R_{ud-2D}$. Note that by configuring each data block in ECC block units, the overhead caused by error correction processing may be removed from the zero sector transition time.

Based on the above considerations, the jump time $T_{jump-2D}[n]$ to be substituted into expression 1 is the maximum jump time specified for each jump distance by BD-ROM disc standards. Specifically, the jump distance $S_{jump}$ between the 2D extents EXT2D[n−1] and EXT2D[n] is substituted into expression 1 as the jump time $T_{jump-2D}[n]$. This jump distance $S_{jump}$ equals the maximum jump time $T_{jump\_max}$ that corresponds to the number of sectors from the end of the $n^{th}$ 2D extent EXT2D[n] to the top of the $(n+1)^{th}$ 2D extent EXT2D[n+1] as found in the table in FIG. 57.

Since the jump time $T_{jump-2D}[n]$ for the jump between two 2D extents EXT2D[n] and EXT2D[n+1] is limited to the maximum jump time $T_{jump\_max}$, the jump distance $S_{jump}$, i.e. the distance between the two 2D extents EXT2D[n] and EXT2D[n+1], is also limited. For example, when the maximum value $T_{jump\_max}$ of the jump time $T_{jump-2D}[n]$ is limited to 700 ms, then the jump distance $S_{jump}$ between the two 2D extents EXT2D[n] and EXT2D[n+1] is permitted to be a maximum of 1/10 of a stroke (approximately 1.2 GB). When the jump time $T_{jump}$ is at a maximum jump time $T_{jump\_max}$, the jump distance $S_{jump}$ reaches this maximum value, which is referred to as the "maximum jump distance $S_{jump\_max}$". For seamless playback of 2D video images, in addition to the size of 2D extents satisfying expression 1, the distance between 2D extents needs to be equal to or less than the maximum jump distance $S_{jump\_max}$.

[J-2] <<Conditions Based on Performance in 3D Playback Mode>>

Figure 58:
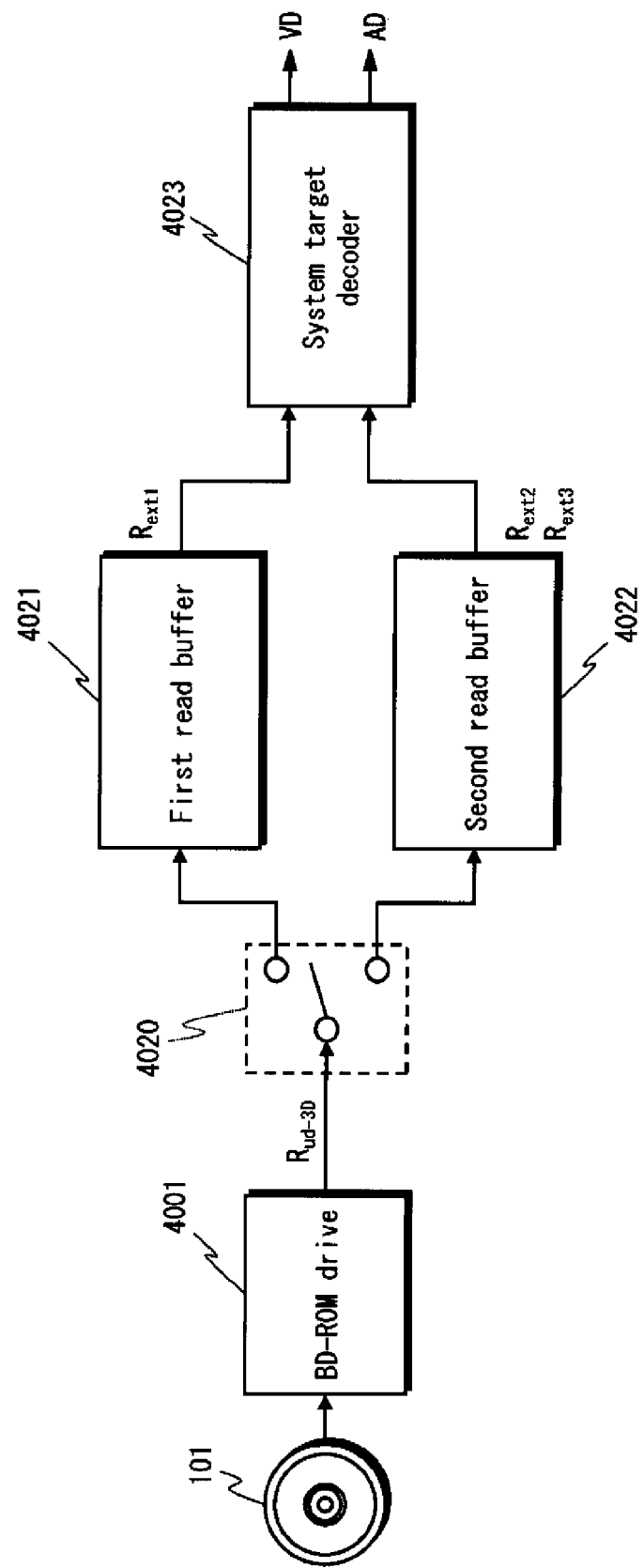
FIG. 58 is a schematic diagram showing the playback processing system in the playback device 102 in 3D playback mode shown in FIG. 40.

FIG. 58 is a schematic diagram showing the playback processing system in the playback device 102 in 3D playback mode. As shown in FIG. 58, from among the elements shown in FIG. 40, this playback processing system includes the BD-ROM drive 4001, switch 4020, pair of read buffers 4021 and 4022, and system target decoder 4023. The BD-ROM drive 4001 reads 3D extents from the BD-ROM disc 101 and transfers the 3D extents to the switch 4020 at a read rate $R_{ud-3D}$. The switch 4020 separates 3D extents into base-view extents and dependent-view extents. The base-view extents are stored in the first read buffer 4021, and the dependent-view extents are stored in the second read buffer 4022. The stored data in the second read buffer 4022 consists of right-view extents in L/R mode and of depth map extents in depth mode. The system target decoder 4023 reads source packets from the base-view extents stored in the first read buffer 4021 at a first mean transfer rate $R_{ext1}$. The system target decoder 4023 in L/R mode reads source packets from the right-view extents stored in the second read buffer 4022 at a second mean transfer rate $R_{ext2}$. The system target decoder 4023 in depth mode reads source packets from the depth map extents stored in the second read buffer 4022 at a third mean transfer rate $R_{ext3}$. The system target decoder 4023 also decodes pairs of read base-view extents and dependent-view extents into video data VD and audio data AD.

The first mean transfer rate $R_{ext1}$ is, referred to as the "base-view transfer rate". The base-view transfer rate $R_{ext1}$ equals 192/188 times the mean transfer rate $R_{TS1}$ of TS packets from the first source depacketizer 4111 to the first PID filter 4113 shown in FIG. 41. In general, this base-view transfer rate $R_{ext1}$ changes for each base-view extent. The maximum value $R_{max1}$ of the base-view transfer rate $R_{ext1}$ equals 192/188 times the system rate for the file 2D. The 2D clip information file specifies the system rate. The base-view transfer rate $R_{ext1}$ is conventionally represented in bits/second and specifically equals the value of the size of a base-view extent expressed in bits divided by the extent ATC time. The extent ATC time equals the time necessary to transfer all of the source packets in the base-view extent from the first read buffer 4021 to the system target decoder 4023.

The second mean transfer rate $R_{ext2}$ is referred to as the "right-view transfer rate", and the third mean transfer rate $R_{ext3}$ is referred to as the "depth map transfer rate". Both transfer rates $R_{ext2}$ and $R_{ext3}$ equal 192/188 times the mean transfer rate $R_{TS2}$ of TS packets from the second source depacketizer 4112 to the second PID filter 4114. In general, these transfer rates $R_{ext2}$ and $R_{ext3}$ change for each dependent-view extent. The maximum value $R_{max2}$ of the right-view transfer rate $R_{ext2}$ equals 192/188 times the system rate for the first file DEP, and the maximum value $R_{max3}$ of the depth map transfer rate $R_{ext3}$ equals 192/188 times the system rate for the second file DEP. The right-view clip information file and depth map clip information file specify the respective system rates. The transfer rates $R_{ext2}$ and $R_{ext3}$ are conventionally represented in bits/second and specifically equal the value of the size of each dependent-view extent expressed in bits divided by the extent ATC time. The extent ATC time equals the time necessary to transfer all of the source packets in each dependent-view extent from the second read buffer 4022 to the system target decoder 4023.

The read rate $R_{ud-3D}$ is conventionally expressed in bits/second and is set at a higher value, e.g. 72 Mbps, than the maximum values $R_{max1}$-$R_{max3}$ of the first through third mean transfer rates $R_{ext1}$-$R_{ext3}$: $R_{ud-3D} > R_{max1}$, $R_{ud-3D} > R_{max2}$, $R_{ud-3D} > R_{max3}$. This prevents underflow in the read buffers 4021 and 4022 due to decoding processing by the system target decoder 4023 while the BD-ROM drive 4001 is reading a 3D extent from the BD-ROM disc 101.

[L/R mode]

FIGS. 59A and 59B are graphs showing the change in data amounts DA1 and DA2 stored in the read buffers 4021 and 4022 during operation in L/R mode. FIG. 59C is a schematic diagram showing the relationship between a data block group 5910 for playback and a playback path 5920 in L/R mode. As shown in FIG. 59C, the data block group 5910 is composed of data block groups Dk, Rk, Lk (k=n−1, n, n+1, n+2, . . . ) in the same interleaved arrangement as the data block group 5610 shown in FIG. 56B. In accordance with the playback path 5920, each pair of adjacent right-view data blocks Rk and base-view data blocks Lk is read together as one 3D extent EXTSS[k]. Subsequently, the switch 4020 separates the 3D extent EXTSS[k] into a right-view extent and a left-view extent, which are stored in the read buffers 4021 and 4022.

For sake of simplicity, this description does not differentiate between a "base-view data block" and a "base view extent", nor between a "dependent-view data block" and a "dependent-view extent". Furthermore, it is assumed that (n−1) 3D extents have already been read, and that an integer n is sufficiently larger than one. In this case, the stored data amounts DA1 and DA2 in the read buffers 4021 and 4022 are already maintained at or above the respective lower limits UL1 and UL2. These lower limits UL1 and UL2 are referred to as a "buffer margin amount". Details on the buffer margin amounts UL1 and UL2 are provided below.

As shown in FIGS. 59A and 59B, during the read period $PR_R[n]$ of the $n^{th}$ right-view extent Rn, the stored data amount DA2 in the second read buffer 4022 increases at a rate equal to $R_{ud-3D} - R_{ext2}[n]$, the difference between the read rate $R_{ud-3D}$ and a right-view transfer rate $R_{ext2}[n]$, whereas the stored data amount DA1 in the first read buffer 4021 decreases at a base-view transfer rate $R_{ext1}[n-1]$. As shown in FIG. 59C, a zero sector transition $J_0[n]$ occurs between a contiguous right-view extent Rn and base-view extent Ln. As shown in FIGS. 59A and 59B, during the zero sector transition period $PJ_0[n]$, the stored data amount DA1 in the first read buffer 4021 continues to decrease at the base-view transfer rate $R_{ext1}[n-1]$, whereas the stored data amount DA2 in the second read buffer 4022 decreases at the right-view transfer rate $R_{ext2}[n]$.

As further shown in FIGS. 59A and 59B, during the read period $PR_L[n]$ for the $n^{th}$ base-view extent block Ln, the stored data amount DA1 in the first read buffer 4021 increases at a rate equal to $R_{ud-3D} - R_{ext1}[n]$, the difference between the read rate $R_{ud-3D}$ and a base-view transfer rate $R_{ext1}[n]$, whereas the stored data amount DA2 in the second read buffer 4022 continues to decrease at a right-view transfer rate $R_{ext2}[n]$. As further shown in FIG. 59C, a jump $J_{LR}[n]$ occurs between the base-view extent Ln and the next right-view extent R(n+1). As shown in FIGS. 59A and 59B, during the jump period $PJ_{LR}[n]$, the stored data amount DA1 in the first read buffer 4021 decreases at the base-view transfer rate $R_{ext1}[n]$, and the stored data amount DA2 in the second read buffer 4022 continues to decrease at the right-view transfer rate $R_{ext2}[n]$.

For seamless playback of 3D video images in L/R mode from the data block group 5910 shown in FIG. 59C, the following conditions [3], [4], and [5] should be met.

[3] The size $S_{ext2}[n]$ of the $n^{th}$ base-view extent Ln is at least equal to the data amount transferred from the first read buffer 4021 to the system target decoder 4023 from the corresponding read period $PR_L[n]$ through the jump period $PJ_{LR}[n]$, the read period $PR_R[n]$ of the next right-view extent R(n+1), and the zero sector transition period $PJ_0[n+1]$. In this case, at the end of this zero sector transition period $PJ_0[n+1]$, the stored data amount DA1 in the first read buffer 4021 does not fall below the first buffer margin amount UL1, as shown in FIG. 59A. The length of the read period $PR_L[n]$ for the $n^{th}$ base-view extent Ln equals $S_{ext1}[n]/R_{ud-3D}$, the value obtained by dividing the size $S_{ext1}[n]$ of this base-view extent Ln by the read rate $R_{ud-3D}$. On the other hand, the length of the read period $PR_R[n+1]$ for the $(n+1)^{th}$ right-view extent R(n+1) equals $S_{ext2}[n+1]/R_{ud-3D}$, the value obtained by dividing the size $S_{ext2}[n+1]$ of the $(n+1)^{th}$ right-view extent $R(n+1)$ by the read rate $R_{ud-3D}$. Accordingly, the size $S_{ext1}[n]$ of this base-view extent Ln should satisfy expression 2.

$$S_{ext1}[n] \geq \left( \frac{\frac{S_{ext1}[n]}{R_{ud-3D}} + T_{jump-3D}[n] +}{\frac{S_{ext2}[n+1]}{R_{ud-3D}} + T_{jump-0}[n+1]} \right) \times R_{ext1}[n] \quad (2)$$

$$\therefore S_{ext1}[n] \geq \text{CEIL} \left\{ \begin{array}{c} \frac{R_{ext1}[n]}{8} \times \frac{R_{ud-3D}}{R_{ud-3D} - R_{ext1}[n]} \times \\ \left( T_{jump-3D}[n] \frac{S_{ext2}[n+1]}{R_{ud-3D}} + \right. \\ \left. T_{jump-0}[n+1] \right) \end{array} \right\}$$

[4] The size $S_{ext2}[n]$ of the $n^{th}$ right-view extent Rn is at least equal to the data amount transferred from the second read buffer 4022 to the system target decoder 4023 from the corresponding read period $PR_R[n]$ through the zero sector transition period $PJ_0[n]$, the read period $PR_L[n]$ of the next base-view extent Ln, and the jump period $PJ_{LR}[n]$. In this case, at the end of this jump period $PJ_{LR}[n]$, the stored data amount DA2 in the second read buffer 4022 does not fall below the second buffer margin amount UL2, as shown in FIG. 59B. The length of the read period $PR_R[n]$ for the $n^{th}$ right-view extent Rn equals $S_{ext2}[n]/R_{ud-3D}$, the value obtained by dividing the size $S_{ext2}[n]$ of this right-view extent Rn by the read rate $R_{ud-3D}$. Accordingly, the size $S_{ext2}[n]$ of this right-view extent Rn should satisfy expression 3.

$$S_{ext2}[n] \geq \left( \frac{\frac{S_{ext2}[n]}{R_{ud-3D}} + T_{jump-0[n]} +}{\frac{S_{ext1}[n]}{R_{ud-3D}} + T_{jump-3D}[n]} \right) \times R_{ext1}[n] \quad (3)$$

$$\therefore S_{ext2}[n] \geq \text{CEIL} \left\{ \begin{array}{c} \frac{R_{ext2}[n]}{8} \times \frac{R_{ud-3D}}{R_{ud-3D} - R_{ext2}[n]} \times \\ \left( T_{jump-0}[n] \frac{S_{ext1}[n]}{R_{ud-3D}} + \right. \\ \left. T_{jump-3D}[n] \right) \end{array} \right\}$$

[5] The jump time $T_{jump-3D}[n]$ to be substituted into expressions 2 and 3 equals the jump distance $S_{jump}$ from the $n^{th}$ base-view extent Ln to the $(n+1)^{th}$ right-view extent $R(n+1)$. This jump distance $S_{jump}$ equals the maximum jump distance $T_{jump\_max}$ that corresponds to the number of sectors from the end of the $n^{th}$ base-view extent Ln to the top of the $(n+1)^{th}$ right-view extent $R(n+1)$ as found in, for example, the table in FIG. 57. Since the jump time $T_{jump-3D}[n]$ is thus limited to the maximum jump time $T_{jump\_max}$, the jump distance $S_{jump}$ is also limited to be equal to or less than the maximum jump distance $S_{jump\_max}$. In other words, for seamless playback of 3D video images in L/R mode, in addition to the size of extents satisfying expressions 2 and 3, the distance between the base-view extent Ln and the right-view extent $R(n+1)$ needs to be equal to or less than the maximum jump distance $S_{jump\_max}$.

[Depth Mode]

FIGS. 60A and 60B are graphs showing the change in data amounts DA1 and DA2 stored in the read buffers 4021 and 4022 during operation in depth mode. FIG. 60C is a schematic diagram showing the relationship between a data block group 6010 for playback and a playback path 6020 in depth mode. As shown in FIG. 60C, the data block group 6010 is composed of data block groups Dk, Rk, Lk in the same interleaved arrangement as the data block group 5610 shown in FIG. 56C. In accordance with the playback path 6020, depth map data blocks Dk and base-view data blocks Lk are read as one 3D extent. As in FIG. 56, it is assumed that (n−1) pairs of 3D extents have already been read, and that an integer n is sufficiently larger than one. In this case, the stored data amounts DA1 and DA2 in the read buffers 4021 and 4022 are already maintained at or above the respective buffer margin amounts UL1 and UL2.

As shown in FIGS. 60A and 60B, during the read period $PR_D[n]$ of the $n^{th}$ depth map extent Dn, the stored data amount DA2 in the second read buffer 4022 increases at a rate equal to $R_{ud-3D} - R_{ext3}[n]$, the difference between the read rate $R_{ud-3D}$ and a depth map transfer rate $R_{ext3}[n]$, and the stored data amount DA1 in the first read buffer 4021 decreases at the base-view transfer rate $R_{ext1}[n-1]$. As shown in FIG. 60C, a jump $J_{LD}[n]$ occurs from the depth map extent Dn until the base-view extent Ln. As shown in FIGS. 60A and 60B, during the jump period $PJ_{LD}[n]$, the stored data amount DA1 in the first read buffer 4021 continues to decrease at the base-view transfer rate $R_{ext1}[n-1]$, and the stored data amount DA2 in the second read buffer 4022 decreases at the depth map transfer rate $R_{ext3}[n]$.

As further shown in FIGS. 60A and 60B, during the read period $PR_L[n]$ for the $n^{th}$ base-view extent Ln, the stored data amount DA1 in the first read buffer 4021 increases at a rate equal to $R_{ud-3D} - R_{ext1}[n]$, the difference between the read rate $R_{ud-3D}$ and the base-view transfer rate $R_{ext1}[n]$. Conversely, the stored data amount DA2 in the second read buffer 4022 continues to decrease at the depth map transfer rate $R_{ext3}[n]$. As shown in FIG. 60C, a zero sector transition $J_0[n]$ occurs between a contiguous left-view extent Ln and depth map extent $D(n+1)$. As shown in FIGS. 60A and 60B, during the zero sector transition period $PJ_0[n]$, the stored data amount DA1 in the first read buffer 4021 decreases at the base-view transfer rate $R_{ext1}[n]$, and the stored data amount DA2 in the second read buffer 4022 continues to decrease at the depth map transfer rate $R_{ext3}[n]$.

For seamless playback of 3D video images in depth mode from the data block group 6010 shown in FIG. 60C, the following conditions [6], [7], and [8] should be met.

[6] The size $S_{ext1}[n]$ of the $n^{th}$ base-view extent Ln is at least equal to the data amount transferred from the first read buffer 4021 to the system target decoder 4023 from the corresponding read period $PR_L[n]$ through the zero sector transition period $PJ_0[n]$, the read period $PR_D[n]$ of the next depth map extent $D(n+1)$, and the jump period $PJ_{LD}[n+1]$. In this case, at the end of this jump period $PJ_{LD}[n+1]$, the stored data amount DA1 in the first read buffer 4021 does not fall below the first buffer margin amount UL1, as shown in FIG. 60A. The length of the read period $PR_L[n]$ for the $n^{th}$ base-view extent Ln equals $S_{ext1}[n]/R_{ud-3D}$, the value obtained by dividing the size $S_{ext1}[n]$ of this base-view extent Ln by the read rate $R_{ud-3D}$. On the other hand, the length of the read period $PR_D[n+1]$ for the $(n+1)^{th}$ depth map extent $D(n+1)$ equals $S_{ext3}[n+1]/R_{ud-3D}$, the value obtained by dividing the size $S_{ext3}[n+1]$ of the $(n+1)^{th}$ depth map extent $D(n+1)$ by the read rate $R_{ud-3D}$. Accordingly, the size $S_{ext1}[n]$ of this base-view extent Ln should satisfy expression 4.

$$S_{ext1}[n] \geq \left( \frac{\frac{S_{ext1}[n]}{R_{ud-3D}} + T_{jump-0}[n] +}{\frac{S_{ext3}[n+1]}{R_{ud-3D}} + T_{jump-3D}[n+1]} \right) \times R_{ext1}[n] \quad (4)$$

$$\therefore S_{ext1}[n] \geq \text{CEIL} \left\{ \begin{array}{c} \frac{R_{ext1}[n]}{8} \times \frac{R_{ud-3D}}{R_{ud-3D} - R_{ext1}[n]} \times \\ \left( T_{jump-0}[n] \frac{S_{ext1}[n+1]}{R_{ud-3D}} + \right. \\ \left. T_{jump-3D}[n+1] \right) \end{array} \right\}$$

[7] The size $S_{ext3}[n]$ of the $n^{th}$ depth map extent Dn is at least equal to the data amount transferred from the second read buffer 4022 to the system target decoder 4023 from the corresponding read period $PR_D[n]$ through the jump period $PJ_{LD}[n]$, the read period $PR_L[n]$ of the next base-view extent Ln, and the zero sector transition period $PJ_0[n]$. In this case, at the end of this zero sector transition period $PJ_0[n]$, the stored data amount DA2 in the second read buffer 4022 does not fall below the second buffer margin amount UL2, as shown in FIG. 60B. The length of the read period $PR_D[n]$ for the $n^{th}$ depth map extent Dn equals $S_{ext3}[n]/R_{ud-3D}$, the value obtained by dividing the size $S_{ext3}[n]$ of this depth map extent Dn by the read rate $R_{ud-3D}$. Accordingly, the size $S_{ext3}[n]$ of this depth map extent Dn should satisfy expression 5.

$$S_{ext3}[n] \geq \left( \frac{\frac{S_{ext3}[n]}{R_{ud-3D}} + T_{jump-3D}[n] +}{\frac{S_{ext1}[n]}{R_{ud-3D}} + T_{jump-0}[n]} \right) \times R_{ext3}[n] \quad (5)$$

$$\therefore S_{ext3}[n] \geq \text{CEIL} \left\{ \begin{array}{c} \frac{R_{ext3}[n]}{8} \times \frac{R_{ud-3D}}{R_{ud-3D} - R_{ext3}[n]} \times \\ \left( T_{jump-3D}[n] \frac{S_{ext1}[n]}{R_{ud-3D}} + \right. \\ \left. T_{jump-0}[n] \right) \end{array} \right\}$$

[8] The jump time $T_{jump-3D}[n]$ to be substituted into expressions 4 and 5 equals the jump distance $S_{jump}$ from the $n^{th}$ depth map extent Dn to the $n^{th}$ base-view extent Ln. This jump distance $S_{jump}$ equals the maximum jump distance $T_{jump\_max}$ that corresponds to the number of sectors from the end of the $n^{th}$ depth map extent Dn to the top of the $n^{th}$ base-view extent Ln as found in, for example, the table in FIG. 57. Since the jump time $T_{jump-3D}[n]$ is thus limited to the maximum jump time $T_{jump\_max}$, the jump distance $S_{jump}$ is also limited to be equal to or less than the maximum jump distance $S_{jump\_max}$. In other words, for seamless playback of 3D video images in depth mode, in addition to the size of extents satisfying expressions 4 and 5, the distance between the depth map extent Dn and the base-view extent Ln needs to be equal to or less than the maximum jump distance $S_{jump\_max}$.

Based on the above results, in order to permit seamless playback of 2D video images, of 3D video images in L/R mode, and of 3D video images in depth mode from data block groups in the interleaved arrangement, the size of each data block should be designed to satisfy all of the above expressions 1-5. In particular, the size of the base-view data block should be equal to or greater than the largest value among the right-hand side of expressions 1, 3, and 5. Hereinafter, the lower limit on the size of a data block that satisfies all of the expressions 1-5 is referred to as the "minimum extent size".

[J-3] Conditional Expressions for Data Block Groups Corresponding to L/P. Mode Only When only L/R mode is used for playback of 3D video images, the depth map data blocks in the arrangement in FIG. 56 may be removed. In other words, two types of data blocks, base-view data blocks B[n] (n=0, 1, 2, . . . ) and dependent-view data blocks D[n], may be recorded on the BD-ROM disc in the interleaved arrangement shown in FIG. 24. Conditions are similarly placed on this arrangement for the size of data blocks necessary for seamless playback of video images.

As shown in FIG. 24, during playback of 2D video images, only the 2D extents EXT2D[n] in file 2D 2410, i.e. the base-view data blocks B[n], are read, whereas reading of the dependent-view data blocks D[n] is skipped by jumps. The playback path for 2D video images differs from the playback path 5620 shown in FIG. 56 only by the jump distances. Accordingly, for seamless playback of 2D video images, the size $S_{ext1}[n]$ of the $n^{th}$ 2D extent EXT2D[n] should fulfill expression 1.

During playback of 3D video images, 3D extents EXTSS[n] are read from file SS 2420 and divided into base-view extents EXT1[$n$] and dependent-view extents EXT2[$n$]. In this case, the playback path for 3D video images differs from the playback path 5920 for 3D video images in L/R mode shown in FIG. 59 in that only zero sector transitions occur, whereas jumps do not occur. Accordingly, for seamless playback of 3D video images, the following condition should be met: the size $S_{ext1}[n]$ of the $n^{th}$ base-view extent EXT1[$n$], i.e. the base-view data block B[n], should fulfill expression 6 below instead of expression 2. On the other hand, the size $S_{ext2}[n]$ of the $n^{th}$ dependent-view extent EXT2[$n$], i.e. the dependent-view data block D[n], should fulfill expression 7 below instead of expression 3. Expressions 6 and 7 are the same as expressions 2 and 3, replacing the jump time $T_{jump-3D}$ with the zero sector transition time $T_{jump-0}$.

$$S_{ext1}[n] \geq \text{CEIL} \left\{ \begin{array}{c} \frac{R_{ext1}[n]}{8} \times \frac{R_{ud-3D}}{R_{ud-3D} - R_{ext1}[n]} \times \\ \left( T_{jump-0}[n] \frac{S_{ext2}[n+1]}{R_{ud-3D}} + \right. \\ \left. T_{jump-0}[n+1] \right) \end{array} \right\} \quad (6)$$

$$S_{ext2}[n] \geq \text{CEIL} \left\{ \begin{array}{c} \frac{R_{ext2}[n]}{8} \times \frac{R_{ud-3D}}{R_{ud-3D} - R_{ext2}[n]} \times \\ \left( T_{jump-0}[n] \frac{S_{ext1}[n]}{R_{ud-3D}} + \right. \\ \left. T_{jump-0}[n] \right) \end{array} \right\} \quad (7)$$

Accordingly, the size of the base-view data block B[n] should fulfill expressions 1 and 6. Note that during reading of a 3D extent EXTSS[n], the zero sector transition time $T_{jump-0}[n]$ may be considered to be 0. In this case, expressions 6 and 7 change into the following expressions.

$$S_{ext1}[n] \geq \text{CEIL}\left\{ \frac{R_{ext1}[n]}{8} \times \frac{R_{ud-3D}}{R_{ud-3D} - R_{ext1}[n]} \times \frac{S_{ext2}[n+1]}{R_{ud-3D}} \right\}$$

$$S_{ext2}[n] \geq \text{CEIL}\left\{ \frac{R_{ext2}[n]}{8} \times \frac{R_{ud-3D}}{R_{ud-3D} - R_{ext2}[n]} \times \frac{S_{ext1}[n]}{R_{ud-3D}} \right\}$$

[K] The playback device 102 in 3D playback mode may use a single read buffer instead of the two read buffers 4021 and 4022 shown in FIG. 40.

Figure 61:
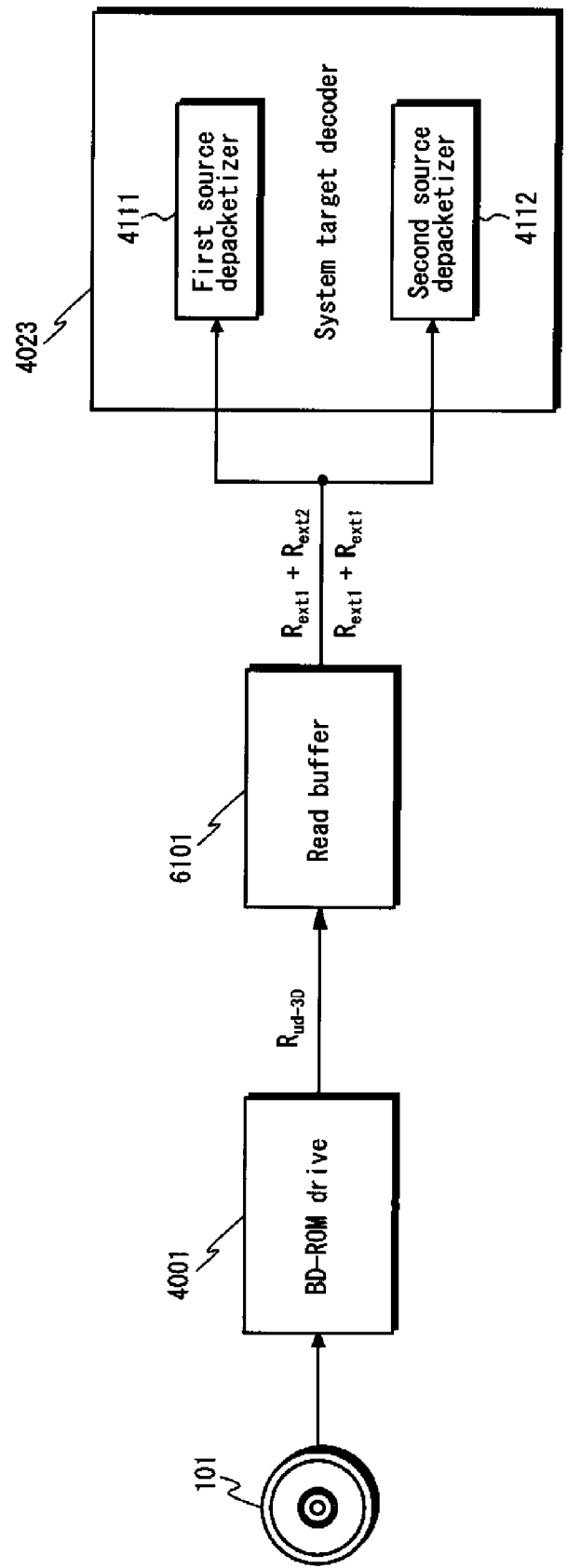
FIG. 61 is a schematic diagram showing a playback processing system when the playback device 102 in 3D playback mode according to the present invention uses a single read buffer.

FIG. 61 is a schematic diagram showing a playback processing system when the playback device 102 in 3D playback mode uses a single read buffer. As shown in FIG. 61, this playback processing system differs from the system shown in FIG. 58 by including a single read buffer 6101 instead of a switch 4020 and a pair of read buffers 4021 and 4022. The BD-ROM drive 4001 reads 3D extents from the BD-ROM drive 101 and transmits them to the read buffer 6101. The read buffer 6101 stores data for the 3D extents in the order they are transferred. The system target decoder 4023 receives information from the playback control unit 4035 indicating the boundary of each data block included in the 3D extent. Furthermore, the system target decoder 4023 uses this information to detect the boundary between data blocks from the 3D extents stored in the read buffer 6101. The system target decoder 4023 can thus identify regions in the read buffer 6101 in which base-view extents and dependent-view extents are stored. Furthermore, the system target decoder 4023 transmits source packets from the extents stored in each area in the read buffer 6101 to one of two source packetizers 4111 and 4112. The source packetizer 4111 or 4112 to which source packets are transmitted is selected in accordance with the type of extent stored in the area in the read buffer 6101 from which source packets are transmitted. Furthermore, the system target decoder 4023 reads source packets from the read buffer 6101 at a mean transfer rate equal to the sum of the base-view transfer rate and the right-view transfer rate (or the depth map transfer rate).

Figure 62A:
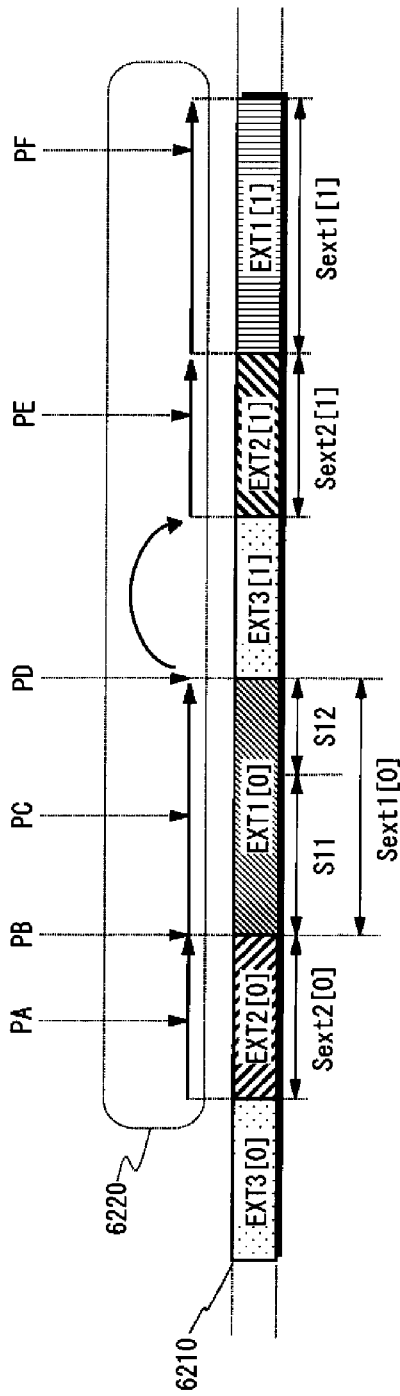
FIG. 62A is a schematic diagram showing a playback path 6220 in L/R mode for a data block group 6210 in an interleaved arrangement.
Figure 62B:
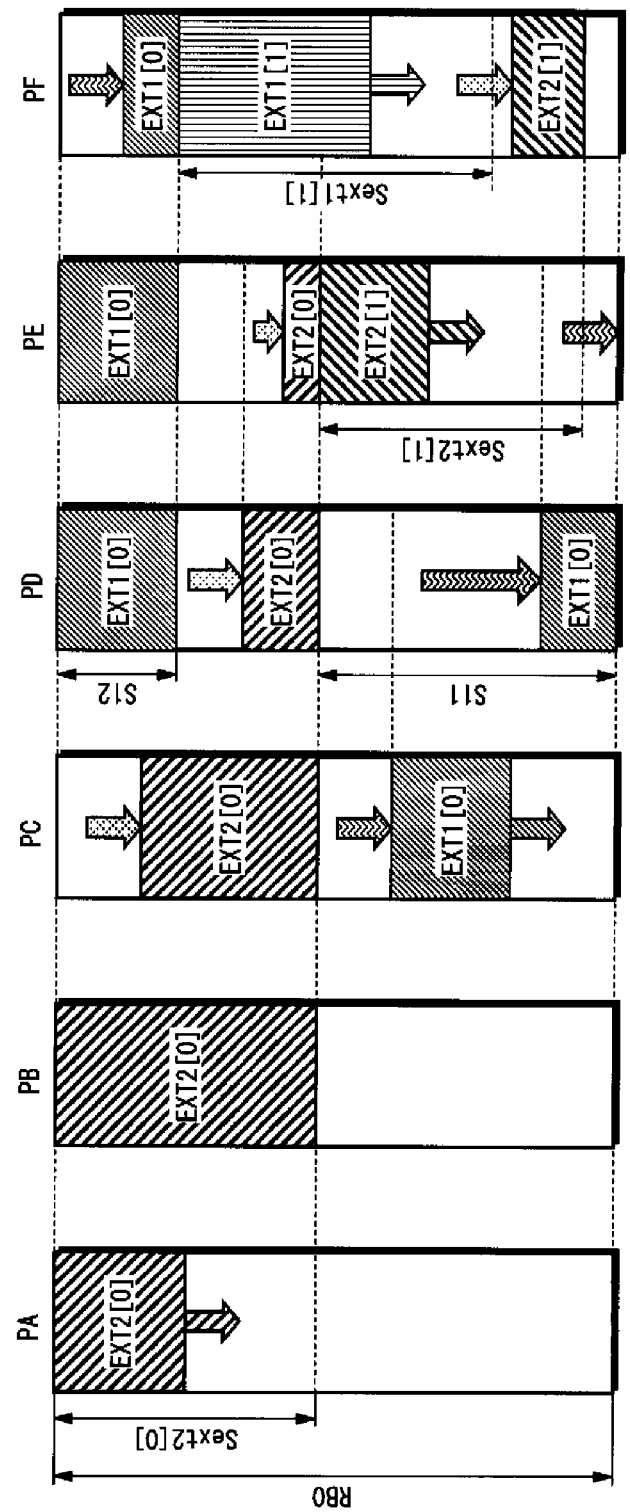
FIG. 62B is a schematic diagram showing changes in the area in which data is stored in a read buffer 6101 when the playback device 102 shown in FIG. 61 operates in accordance with a playback path 6220 shown in FIG. 62A.

FIGS. 62A and 62B are schematic diagrams showing changes in the area in which data is stored in the read buffer 6101 when a data block group 6210 in the interleaved arrangement is read in accordance with a playback path 6220.

At the first point in time PA on the playback path 6220, the top right-view extent EXT2[0] is stored in order from the top of the read buffer 6101. The system target decoder 4023 waits to start reading source packets from the read buffer 6101 until the playback path 6220 progresses until the second point in time PB, when the top right-view extent EXT2[0] is entirely stored in the read buffer 6101.

At the second point in time PB, the system target decoder 4023 detects the boundary between the top right-view extent EXT2[0] and the top base-view extent EXT1[0] in the read buffer 6101 and distinguishes between the areas in which these extents are stored. Furthermore, the system target decoder 4023 starts to transmit source packets from the read buffer 6101.

At the third point in time PC on the playback path 6220, the right-view extent EXT2[0] stored in the read buffer 6101 is read in order from the top of the read buffer 6101. On the other hand, the top base-view extent EXT1[0] is stored in the next area after the area in which the right-view extent EXT2[0] is stored and is read in order from the part that was stored first.

At the fourth point in time PD on the playback path 6220, the top base-view extent EXT1[0] has been completely stored in the read buffer 6101. After the point in time when data is stored at the end of the read buffer 6101, subsequent data is stored at the top of the read buffer 6101. This area is made available by the top right-view extent EXT2[0] being read. Accordingly, the top base-view extent EXT1[0] is divided into two parts S11 and S12 and stored in the read buffer 6101. Furthermore, at the fourth point in time PD, the system target decoder 4023 detects the boundary between the top base-view extent EXT1[0] and the second right-view extent EXT2[1] in the read buffer 6101 and distinguishes between the areas in which these extents are stored.

At the fifth point in time PE on the playback path 6220, the second right-view extent EXT2[1] is stored in the next area after the area in which the top right-view extent EXT2[0] is stored.

At the sixth point in time PF on the playback path 6220, the second right-view extent EXT2[1] is read in the order in which it was stored. Meanwhile, the second base-view extent EXT1[1] is stored in the next area after the area in which the top base-view extent EXT1[0] is stored. Furthermore, this area extends up to the area made available by the second right-view extent EXT2[1] being read.

As shown in FIG. 62B, by using the available area in the read buffer 6101, base-view extents EXT1[n] and right-view extents EXT2[n] can be stored alternately even in a single read buffer 6101. Furthermore, in this case, the capacity RB0 necessary in the read buffer 6101 can be reduced below the total capacity of the pair of read buffers 4021 and 4022 shown in FIG. 41.

FIG. 63B is a schematic diagram showing the playback path 6320 in L/R mode for a data block group 6310 in the interleaved arrangement. FIG. 63A is a graph showing changes in the data amount DA stored in the read buffers 6101, 4021, and 4022 when the playback processing systems in FIGS. 58 and 61 read the data block group 6310 according to the playback path 6320. In FIG. 63A, the solid line GR0 shows the changes in the stored data amount in the read buffer 6101, the alternating long and short dashed line GR1 shows the changes in the stored data amount in the first read buffer 4021, and the dashed line GR2 shows the changes in the stored data amount in the second read buffer 4022. As FIG. 62A illustrates, the stored data amount in the read buffer 6101 equals the total of the stored data amounts in the pair of read buffers 4021 and 4022. On the other hand, as shown in FIG. 63A, in the lines GR1 and GR2 for the stored data amounts in the pair of read buffers 4021 and 4022, the peaks of one line are closer to the other line's minimum points than to the other line's peaks. Accordingly, all of the peaks in the line GR0 for the stored data amount in the read buffer 6101 are well below the sum RB1+RB2 of the capacities of the pair of read buffers 4021 and 4022. Therefore, the capacity RB0 of the read buffer 6101 can be reduced below the sum RB1+RB2 of the capacities of the pair of read buffers 4021 and 4022.

In the playback processing system shown in FIG. 61, as in the system shown in FIG. 58, the timing of transmission of source packets from the read buffer 6101 to the system target decoder 4023 is adjusted in accordance with the ATS assigned to the source packets. Accordingly, when a base-view extent EXT1[n] and a dependent-view extent EXT2[n] stored in the read buffer 6101 include source packets with the same ATS, they cannot be transmitted from the read buffer 6101 to the system target decoder 4023 simultaneously. For example, if the extents EXT1[n] and EXT2[n] both include source packets with ATS=100, the transmission time of one of the source packets will be delayed past the time indicated by ATS=100 by the transmission time for one source packet. As a result, there is a risk of problems occurring, such as buffer underflow. This risk can be avoided, however, by setting ATSs for the base-view and dependent-view as follows.

FIG. 64 is a schematic diagram showing settings of such ATSs. In FIG. 64, rectangles 6410 indicating source packets SP#10, SP#11, SP#12, and SP#13 for base-view extents and rectangles 6420 indicating source packets SP#20, SP#21, SP#22, and SP#23 for dependent-view extents are arranged along the ATC time axis in order of the ATS for each source packet. The position of the top of each rectangle 6410 and 6420 represents the value of the ATS for that source packet. On the other hand, the length of each rectangle 6410 and 6420 represents the amount of time necessary to transfer one source packet from the read buffer 6101 to the system target decoder 4023 in the playback processing system in the 3D playback device shown in FIG. 61. Hereinafter, this time is referred to as the first time AT1. Conversely, the amount of time necessary to transfer one source packet from the read buffer 3621 to the system target decoder 3622 in the playback processing system in the 2D playback device shown in FIG. 55 is referred to as the second time AT2.

As shown in FIG. 64, in base-view extents, the interval between ATSs for contiguous source packets is set to at least AT2. For example, the ATS for SP#11 is prohibited from being set before the second time AT2 has passed after the ATS of SP#10. With this setting, the system target decoder 3622 in the 2D playback device can completely transmit the entire SP#10 from the read buffer 3621 in the time period from the ATS of SP#10 to the ATS of SP#11. Accordingly, the system target decoder 3622 can start transmitting SP#11 from the read buffer 3621 at the time indicated by the ATS of SP#11.

Furthermore, the time period from the ATS of each dependent-view extent source packet SP#20, SP#21, ... through the first time AT1 thereafter is not allowed to overlap the time period from the ATS of each base-view extent source packet SP#10, SP#11, ... through the first time AT1 thereafter. In other words, in FIG. 64, the time periods of the ATCs corresponding to the lengthwise ranges of the rectangles 6420 that represent the source packets SP#20, SP#21, ... are not allowed to overlap the time periods of the ATCs corresponding to the lengthwise ranges of the rectangles 6410 that represent the source packets SP#10, SP#11, .... For example, the interval between the ATS of SP#22 and the ATS of SP#13 is prohibited from being set shorter than the first time AT1. With this setting, the system target decoder 4023 in the 3D playback device can transmit SP#22 and SP#13 from the read buffer 6101 during different time periods. Two source packets to which the same ATS has been assigned can thus be prevented from being transmitted simultaneously from the read buffer 6101 to the system target decoder 4023.

Figures 65A, 65B:
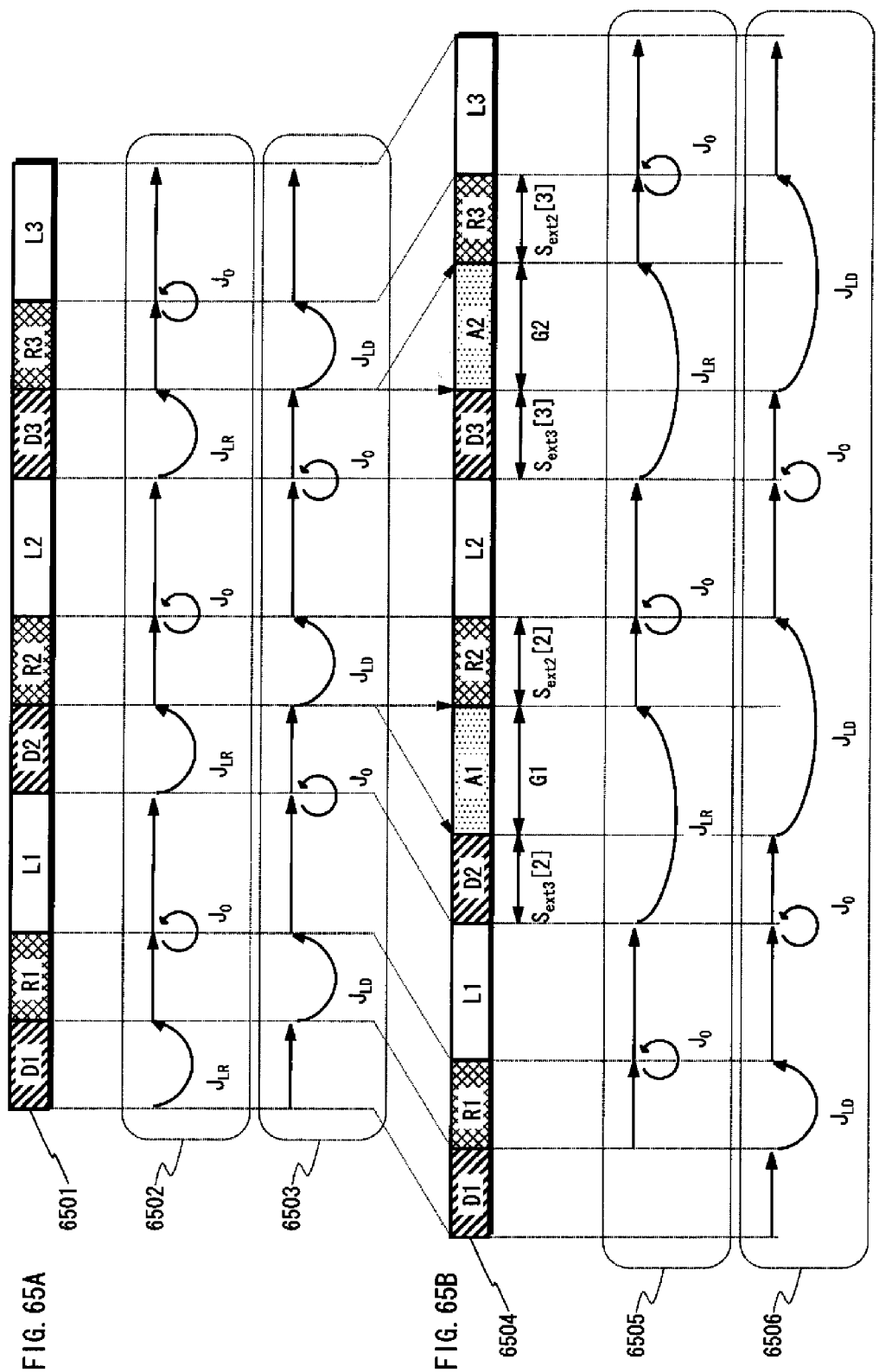
FIG. 65A is a schematic diagram showing a data block group in an interleaved arrangement that includes only multiplexed stream data, the data block group being recorded on the BD-ROM disc 101 according to embodiment 1 of the present invention.
FIG. 65B is a schematic diagram showing a data block group in an interleaved arrangement that includes extents belonging to a different file than the multiplexed stream data, the data block group being recorded on the BD-ROM disc 101 according to modification [L] of embodiment 1 of the present invention.

[L] Among data block groups in the interleaved arrangement, extents that belong to a different file, for example a BD-J object file, may be recorded. FIG. 65A is a schematic diagram showing data blocks in an interleaved arrangement that includes only multiplexed stream data. FIG. 65B is a schematic diagram showing data blocks in an interleaved arrangement that includes extents belonging to another file.

As shown in FIG. 65A, the data block group 6501 includes depth map data blocks D1, D2, and D3, right-view data blocks R1, R2, and R3, and base-view data blocks L1, L2, and L3 in an alternating arrangement. In the playback path 6502 in L/R mode, pairs of adjacent right-view and left-view data blocks R1+L1, R2+L2, and R3+L3 are read in order. In each pair, a zero sector transition $J_0$ occurs between the right-view data block and the base-view data block. Furthermore, reading of each depth map data block D1, D2, and D3 is skipped by a jump $J_{LR}$. In the playback path 6503 in depth mode, depth map data blocks D1, D2, and D3 and base-view data blocks L1, L2, and L3 are alternately read. A zero sector transition jump $J_0$ occurs between adjacent base-view data blocks and depth map data blocks. Furthermore, reading of each right-view data block R1, R2, and R3 is skipped by a jump $J_{LD}$.

On the other hand, as shown in FIG. 65B, extents A1 and A2 belonging to a different file are inserted among the data block group 6504, which is the same as in FIG. 65A. This "different file" may be, for example, a movie object file, BD-J object file, or JAR file. These extents A1 and A2 are both inserted between a depth map data block and right-view data block that are adjacent in FIG. 65A. In this case, in the playback path 6505 in L/R mode, the distance of the jump $J_{LR}$ is longer than in the playback path 6502 shown in FIG. 65A. However, the zero sector transition jump $J_0$ need not be changed into a regular jump, which is not the case if the extents A1 and A2 are inserted next to a base-view data block. The same is true for the playback path 6506 in depth mode. As is clear from FIG. 57, the maximum jump time generally increases more when changing a zero sector transition to a regular jump than when changing the jump distance. Accordingly, as is clear from expressions 2-5, the minimum extent size generally increases more when changing a zero sector transition to a regular jump than when changing the jump distance. Therefore, when inserting extents A1 and A2 into the data block group 6501, which is in the interleaved arrangement, the extents A1 and A2 are inserted between depth map data blocks and right-view data blocks, as shown in FIG. 65B. The increase in minimum extent size caused by this insertion is thereby suppressed, making it possible to avoid increasing the minimum capacity of the read buffers.

Furthermore, in the arrangement shown in FIG. 65B, the sizes in sectors G1 and G2 of the extents A1 and A2 may be restricted to be equal to or less than the maximum jump distance MAX_EXTJUMP3D: G1≤MAX_EXTJUMP3D and G2≤MAX_EXTJUMP3D. This maximum jump distance MAX_EXTJUMP3D represents, in sectors, the maximum jump distance among the jumps $J_{LR}$ and $J_{LD}$ occurring within the data block group 6504. With this restriction, the maximum jump time that is to be substituted in the right-hand side of expressions 2-5 does not easily increase, and thus the minimum extent size does not easily increase. Accordingly, it is possible to avoid an increase in the minimum capacity of the read buffers due to insertion of the extents A1 and A2.

Additionally, the sums of (i) the sizes G1 and G2 of the extents A1 and A2 and (ii) the sizes $S_{ext3}[2]$, $S_{ext2}[2]$, $S_{ext3}[3]$ and $S_{ext2}[3]$ of the dependent-view data blocks D2, R2, D3, and R3 contiguous with the extents A1 and A2 may be restricted to be equal to or less than the maximum jump distance MAX_EXTJUMP3D.

$$CEIL(S_{ext3}[2]/2048)+G1 \leq MAX\_EXTJUMP3D,$$

$$CEIL(S_{ext2}[2]/2048)+G1 \leq MAX\_EXTJUMP3D,$$

$$CEIL(S_{ext3}[3]/2048)+G2 \leq MAX\_EXTJUMP3D,$$

$$CEIL(S_{ext2}[3]/2048)+G2 \leq MAX\_EXTJUMP3D.$$

In these expressions, the size in bytes of a dependent-view data block is divided by 2048, the number of bytes per sector, to change the units of the size from bytes to sectors. As long as these conditions are met, the maximum jump time to be inserted into the right-hand side of expressions 2-5 does not exceed a fixed value. For example, if the maximum jump distance MAX_EXTJUMP3D is fixed at 40000 sectors, then the maximum jump time from FIG. 57 does not exceed 350 ms. Accordingly, the minimum extent size does not exceed a fixed value. It is thus possible to reliably avoid an increase in the minimum capacity of the read buffers due to insertion of the extents A1 and A2.

Apart from the above restrictions, the sums of (i) the sizes G1 and G2 of the extents A1 and A2 and (ii) the sizes $S_{ext3}[2]$ $S_{ext2}[2]$, $S_{ext3}[3]$ and $S_{ext2}[3]$ of the dependent-view data blocks D2, R2, D3, and R3 adjacent to the extents A1 and A2 may be further restricted to be equal to or less than the maximum jump distance MAX_JUMP(•) corresponding to the size of each dependent-view data block.

$$CEIL(S_{ext3}[2]/2048)+G1 \leq MAX\_JUMP(S_{ext3}[2]),$$

$$CEIL(S_{ext2}[2]/2048)+G1 \leq MAX\_JUMP(S_{ext2}[2]),$$

$$CEIL(S_{ext3}[3]/2048)+G2 \leq MAX\_JUMP(S_{ext3}[3]),$$

$$CEIL(S_{ext2}[3]/2048)+G2 \leq MAX\_JUMP(S_{ext2}[3]).$$

When the size of the dependent-view data block is expressed in sectors and the corresponding maximum jump time obtained from the table in FIG. 57, the maximum jump distance MAX_JUMP (•) refers to the maximum value of the range of sectors to which the maximum jump time corresponds. For example, if the size of the dependent-view data block is 5000 sectors, then the maximum jump time in the table in FIG. 57 for 5000 sectors is 250 ms, which corresponds to a range of "1-10000 sectors". Accordingly, the maximum jump distance MAX_JUMP (5000×2048 bytes) is the maximum value in this range, i.e. 10000 sectors. As long as the above conditions are met, the maximum jump time to be inserted into the right-hand side of expressions 2-5 does not change, and thus the minimum extent size does not change. Accordingly, it is possible to reliably avoid an increase in the minimum capacity of the read buffers due to insertion of the extents A1 and A2.

[M] Read Buffer Margin Amounts

The lower limits UL1 and UL2 of the stored data amounts DA1 and DA2 in the read buffers 4021 and 4022, shown in FIGS. 59A, 59B, 60A, and 60B, represent buffer margin amounts. The "buffer margin amount" is the lower limit of the stored data amount that is to be maintained in each read buffer during reading of data block groups in the interleaved arrangement. The buffer margin amount is set to the amount at which underflow in the read buffers can be prevented during a long jump.

A "long jump" is a collective term for jumps with a long seek time and specifically refers to a jump distance that exceeds a predetermined threshold value. This threshold value depends on the type of optical disc and on the disc drive's read processing capability and is specified, for example, as 40000 sectors in the BD-ROM standard. Long jumps particularly include focus jumps and track jumps. When the BD-ROM disc 101 has multiple recording layers, a "focus jump" is a jump caused by switching the recording layer from which the drive reads. A focus jump particularly includes processing to change the focus distance of the optical pickup. A "track jump" includes processing to move the optical pickup in a radial direction along the BD-ROM disc 101.

During reading of stream data, a long jump occurs when the recording layer being read is switched or when read processing is interrupted to read from another file. The term "another file" refers to a file other than the AV stream file shown in FIG. 2 and includes, for example, a movie object file 212, BD-J object file 251, and JAR file 261. The long jump is longer than jumps derived from expressions 2-5. Furthermore, the timing of a long jump caused by interruption to read another file is irregular and may occur even during the reading of a single data block. Accordingly, rather than setting the minimum extent size by substituting the maximum jump time of a long jump into expressions 2-5, it is more advantageous to maintain the buffer margin amount.

Figure 66:
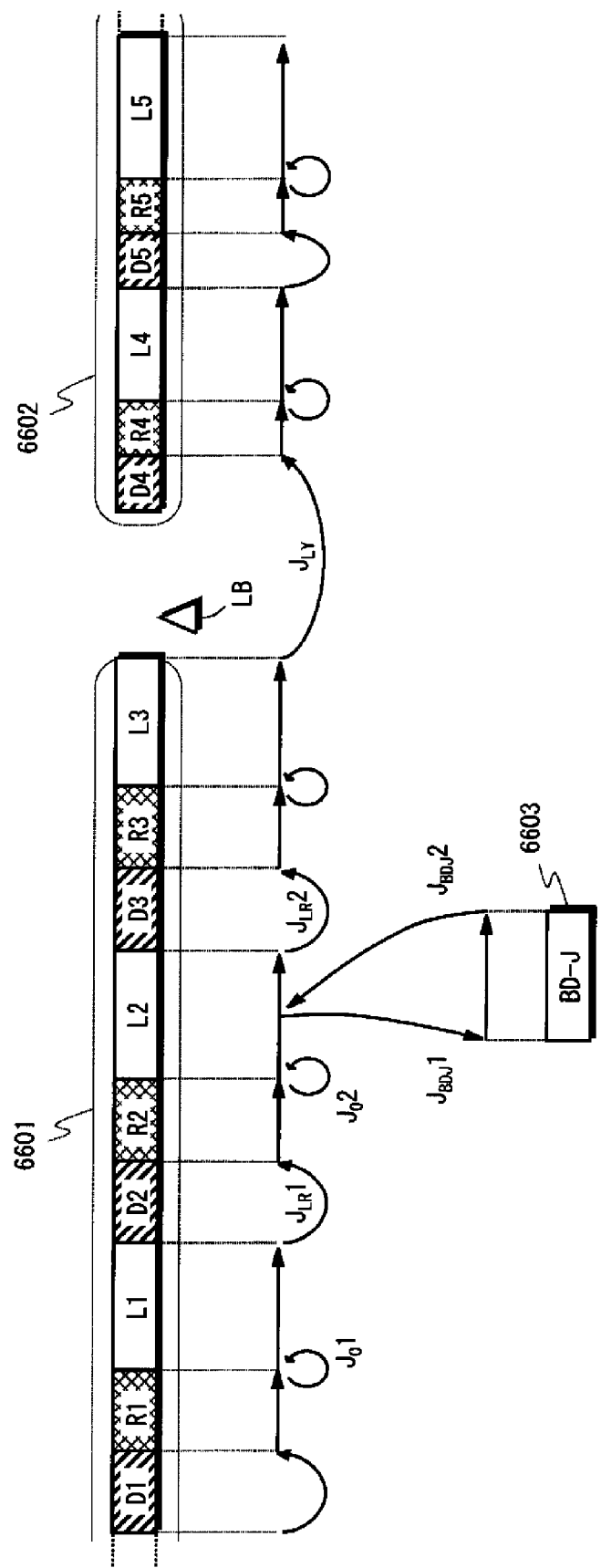
FIG. 66 is a schematic diagram showing long jumps $J_{LY}$, $J_{BDJ}1$, and $J_{BDJ}2$ occurring when the playback device 102 according to embodiment 1 of the present invention performs playback processing in L/R mode.

FIG. 66 is a schematic diagram showing the long jumps $J_{LY}$, $J_{BDJ}1$ and $J_{BDJ}2$ produced during playback processing in L/R mode. As shown in FIG. 66, a layer boundary LB represents a boundary between two recording layers. A first 3D extent block 6601 is recorded on the first recording layer, which is located before the layer boundary LB, and a second 3D extent block 6602 is recorded on the second recording layer, which is located after the layer boundary LB. A "3D extent block" refers to successive data block groups recorded in the interleaved arrangement. As shown in FIG. 65B, the 3D extent block may include extents from another file. Furthermore, a BD-J object file 6603 is recorded in an area distant from both 3D extent blocks 6601 and 6602. When playback processing proceeds from the first 3D extent block 6601 to the second 3D extent block 6602, a long jump $J_{LY}$ occurs due to switching layers. In contrast, reading of the first 3D extent block 6601 is interrupted for reading of the BD-J object file 6603, and thus a pair of long jumps $J_{BDJ}1$ and $J_{BDJ}2$ occur. The buffer margin amounts UL1 and UL2 necessary for the long jumps $J_{LY}$ and $J_{BDJ}$ are calculated as follows.

The maximum jump time $T_{jump-LY}$ for a long jump $J_{LY}$ caused by layer switching equals the sum of the layer switching time and the maximum jump time, as per the table in FIG. 57, corresponding to the jump distance of the first long jump $J_{LY}$. This jump distance equals the number of sectors between the end of the base-view data block L3, the last block in the first 3D extent block 6601, and the beginning of the top right-view data block R4 in the second 3D extent block 6602. The layer switching time refers to the time necessary to switch recording layers, such as for a focus jump, and for example equals 350 ms. Note also that the base-view transfer rate $R_{ext1}$ does not exceed the maximum value $R_{max1}$. It thus follows that the data amount read from the first read buffer 4021 during the long jump $J_{LY}$ does not exceed the product of the maximum value $R_{max1}$ of the base-view transfer rate and the maximum jump time $T_{jump-LY}$. The value of this product is set as the first buffer margin amount UL1. In other words, the first buffer margin amount UL1 is calculated via expression 8.

$$UL1 = \text{CEIL}\left(\frac{R_{max1}}{8} \times T_{jump-LY}\right) \quad (8)$$

For example, when the maximum jump distance is 40000 sectors, then as per the table in FIG. 57, the maximum jump time $T_{jump-LY}$ is 700 ms, which includes the layer switching time of 350 ms. Accordingly, when the system rate corresponding to the file 2D is 48 Mbps, the first buffer margin amount UL1 equals (48 Mbps×192/188)×0.7 seconds=approximately 4.09 MB.

Similarly, the maximum value of the data amount read from the second read buffer 4022 during the long jump $J_{LY}$, i.e. the product of the maximum value $R_{max2}$ of the right-view transfer rate and the maximum jump time $T_{jump-LY}$, is determined to be the second buffer margin amount UL2. In other words, the second buffer margin amount UL2 is calculated via expression 9.

$$UL2 = \text{CEIL}\left(\frac{R_{max2}}{8} \times T_{jump-LY}\right) \quad (9)$$

For example, when the maximum jump distance is 40000 sectors, meaning that the maximum jump time $T_{jump-LY}$ is 700 ms, and when the system rate corresponding to the first file DEP is 16 Mbps, the second buffer margin amount UL2 equals (16 Mbps×192/188)×0.7 seconds=approximately 1.36 MB.

Referring again to FIG. 66, when reading of the BD-J object file 6603 interrupts the read period of the first 3D extent block 6601, the first long jump $J_{BDJ}1$ occurs. In this way, the position targeted for reading shifts from the recording area of the second base-view data block L2 to the recording area of the BD-J object file 6603. The corresponding jump time $T_{BDJ}$ is set to a predetermined fixed value, e.g. 900 ms. Next, the BD-J object file 6603 is read. The time required for reading equals the value of eight times the size $S_{BDJ}$ of the extent belonging to the file 6603 divided by the read rate $R_{ud-3D}$ or $8 \times S_{BDJ}[n]/R_{ud-3D}$ (normally, the extent size $S_{BDJ}$ is expressed in bytes, and the read rate $R_{ud-3D}$ in bits/second; therefore, it is necessary to multiply by eight). Next, the second long jump $J_{BDJ}2$ occurs. The position targeted for reading thus returns from the recording area of the BD-J object file 6603 back to the recording area of the second base-view data block L2. The corresponding jump time $T_{BDJ}$ is equal to the first jump period, e.g. 900 ms. During the two jumps $J_{BDJ}1$ and $J_{BDJ}2$ and the reading of the BD-J object file 6603, data is not read into the first read buffer 4021. Accordingly, the maximum value of the amount of data read from the first read buffer 4021 during this time is determined to be the first read buffer margin amount UL1. In other words, the first read buffer margin amount UL1 is calculated via expression 10.

$$UL1 = \text{CEIL}\left(\frac{R_{max1}}{8} \times \left(2 \times T_{BDJ} + \frac{8 \times S_{BDJ}}{R_{ud-3D}}\right)\right) \quad (10)$$

Similarly, the maximum value of the data amount read from the second read buffer 4022 during the two long jumps $J_{BDJ}1$ and $J_{BDJ}2$ and reading of the BD-J object file 6603 is determined to be the second buffer margin amount UL2. In other words, the second buffer margin amount UL2 is calculated via expression 11.

$$UL2 = \text{CEIL}\left(\frac{R_{max2}}{8} \times \left(2 \times T_{BDJ} + \frac{8 \times S_{BDJ}}{R_{ud-3D}}\right)\right) \quad (11)$$

The first buffer margin amount UL1 is set to the larger of the values of the right-hand side of expressions 8 and 10. The second buffer margin amount UL2 is set to the larger of the values of the right-hand side of expressions 9 and 11.

[N] Minimum Capacity of the Read Buffers

During playback processing of the successive data block groups shown in FIGS. 59C and 60C, the minimum value of the capacity necessary for each of the read buffers 4021 and 4022 is calculated as follows.

When the $n^{th}$ base-view data block Ln (n=0, 1, 2, . . . ) is read in 3D playback mode, the capacity necessary for the first read buffer 4021, RB1[n], should be equal to or greater than the peak, among the peaks in the graphs shown in FIGS. 59A and 60A, at the time of completion of reading of the $n^{th}$ base-view data block Ln. Accordingly, the capacity RB1[n] should satisfy expression 12 in both L/R mode and depth mode.

$$RB1[n] \geq \text{CEIL}\left(UL1 + \frac{R_{ud-3D} - R_{ext}[n]}{8} \times \frac{S_{ext1}[n]}{R_{ud-3D}}\right) \quad (12)$$

When the $n^{th}$ right-view data block Rn is read in L/R mode, the capacity necessary for the second read buffer 4022, $RB2_{LR}[n]$, should be equal to or greater than the peak, among the peaks in the graph shown in FIG. 59B, at the time of completion of reading of the $n^{th}$ right-view data block Rn. Accordingly, the capacity $RB2_{LR}[n]$ should satisfy expression 13.

$$RB2_{LR}[n] \geq \max\left\{\text{CEIL}\left(UL2 + \frac{\frac{R_{ud-3D} - R_{ext2}[n]}{8} \times}{\frac{S_{ext2}[n]}{R_{ud-3D}}}\right), S_{ext2}[n]\right\} \quad (13)$$

Any of the right-view data blocks may be read first by interrupt playback. In such a case, the system target decoder 4023 does not read data from the second read buffer 4022 until the entire right-view data block that is read first is stored in the second read buffer 4022. Accordingly, unlike the capacity RB1[n] of the first read buffer 4021, the capacity $RB2_{LR}[n]$ of the second read buffer 4022 needs to further meet the condition of being "at least larger than the size $S_{ext2}[n]$ of the $n^{th}$ right-view data block Rn", as shown in expression 13.

Similarly, when reading the $n^{th}$ depth map data block Dn, the capacity $RB2_{LD}[n]$ of the second read buffer 4022 should satisfy expression 14.

$$RB2_{LD}[n] \geq \max\left\{\text{CEIL}\left(UL2 + \frac{\frac{R_{ud-3D} - R_{ext3}[n]}{8} \times}{\frac{S_{ext3}[n]}{R_{ud-3D}}}\right), S_{ext3}[n]\right\} \quad (14)$$

[O] Arrangement of Multiplexed Stream Data Before and After a Layer Boundary

When the BD-ROM disc 101 includes multiple recording layers, the main TS and sub-TS may be recorded across a layer boundary on two recording layers. In this case, a long jump occurs during reading of the main TS and sub-TS.

Figure 67A:
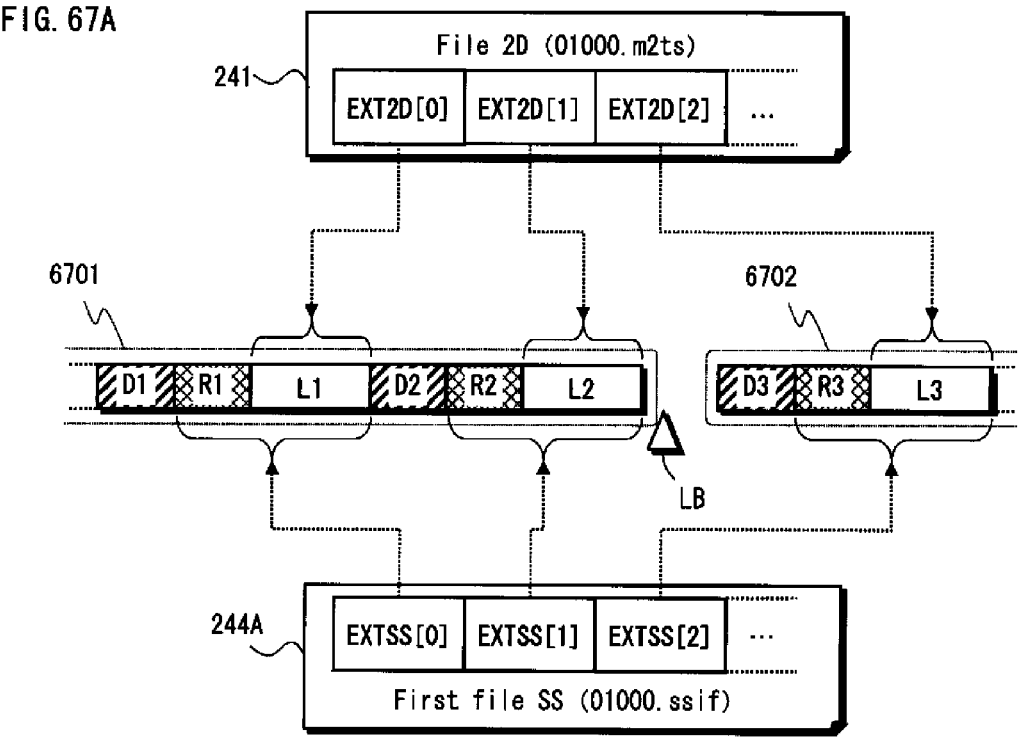
FIG. 67A is a schematic diagram showing data block groups 6701 and 6702 recorded before and after a layer boundary LB on a BD-ROM disc 101 according to embodiment 1 of the present invention.

FIG. 67A is a schematic diagram showing data block groups 6701 and 6702 recorded before and after a layer boundary LB. As shown in FIG. 67A, on the recording layer located before the layer boundary LB, the depth map data block group . . . , D1, D2, the right-view data block group . . . , R1, R2, and the base-view data block group . . . , L1, L2 are recorded in an interleaved arrangement, thus constituting the first 3D extent block 6701. On the other hand, on the recording layer located after the layer boundary LB, the depth map data block group D3, . . . , the right-view data block group R3, . . . , and the base-view data block group L3, . . . are recorded in an interleaved arrangement, thus constituting the second 3D extent block 6702. The interleaved arrangements of 3D extent blocks 6701 and 6702 are the same as the arrangement 1501 shown in FIG. 15. Furthermore, stream data is continuous between the three data blocks D2, R2, and L2 located at the end of the first 3D extent block 6701 and the three data blocks D3, R3, and L3 located at the top of the second 3D extent block 6702.

As in the arrangement 1501 shown in FIG. 15, the data blocks shown in FIG. 67A can be accessed as extents in a file 2D, file DEP, or file SS. In particular, the file 2D and file SS share the base-view data blocks. For example, base-view data blocks L1-L3 can each be accessed respectively as 2D extents EXT2D[0]-EXT2D[2] in file 2D 241. On the other hand, each pair of contiguous right-view data blocks and base-view data blocks R1+L1, R2+L2, and R3+L3 can respectively be accessed as 3D extents EXTSS[0], EXTSS[1], and EXTSS[2] in the first file SS 244A.

Figure 67B:
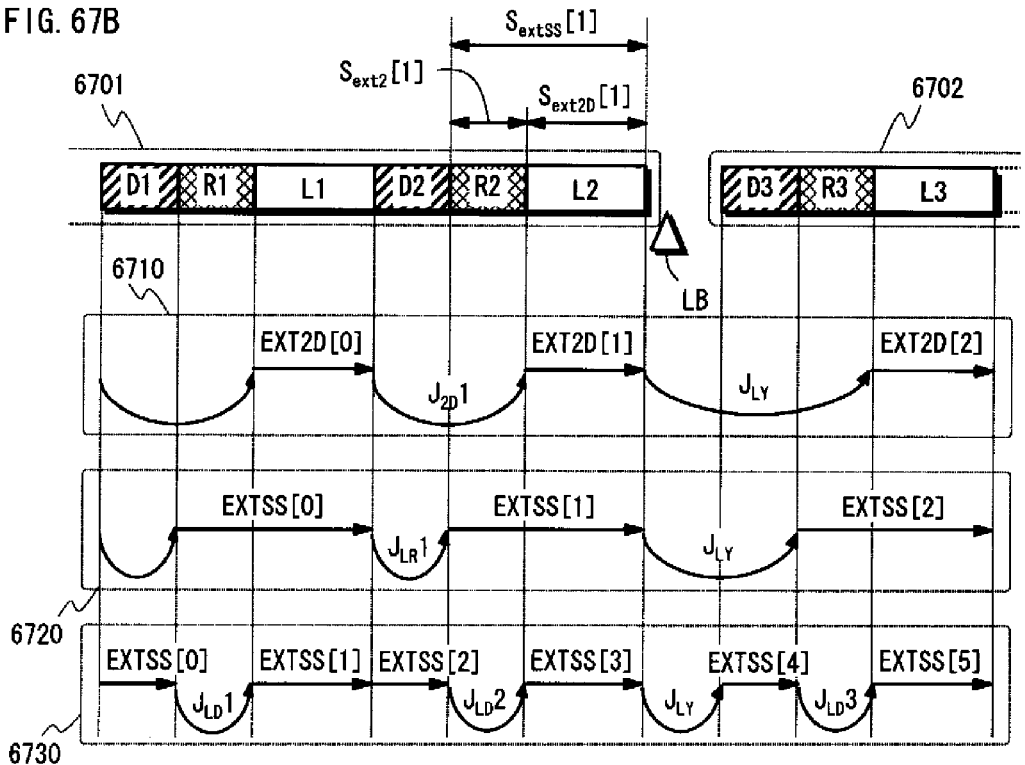
FIG. 67B is a schematic diagram showing playback paths 6710, 6711, and 6712 in each playback mode for 3D extent blocks 6701 and 6702.

FIG. 67B is a schematic diagram showing playback paths 6710, 6711, and 6712 in each playback mode for 3D extent blocks 6701 and 6702. As shown in FIG. 67B, both playback path 6710 in 2D playback mode and playback path 6711 in L/R mode traverse the same base-view data block L2 immediately before a long jump $J_{LY}$.

The playback device 102 in 2D playback mode plays back the file 2D 241. Accordingly, as shown by the playback path 6710 in 2D playback mode, the base-view data block L1 located second from the end in the first 3D extent block 6701 is first read as 2D extent EXT2D[0]. Reading of the immediately subsequent depth map data block D2 and right-view data block R2 is skipped by the first jump $J_{2D}1$. Next, the last base-view data block L2 in the first 3D extent block 6701 is read as the second 2D extent EXT2D[1]. Immediately thereafter, a long jump $J_{LY}$ occurs, and reading of the two data blocks D3 and R3 located at the top of the second 3D extent block 6702 is skipped. Subsequently, the top base-view data block L3 in the second 3D extent block 6702 is read as the third 2D extent EXT2D[2].

The playback device playback device 102 in L/R mode plays back the first file SS 244A. Accordingly, as shown by the playback path 6711 in L/R mode, the pair R1+L1 of the top right-view data block R1 and the immediately subsequent base-view data block L1 is consecutively read as the first 3D extent EXTSS[0]. Reading of the immediately subsequent depth map data block D2 is skipped by the first jump $J_{DR}1$. Next, the second right-view data block R2 and the last base-view data block L2 are consecutively read as the second 3D extent EXTSS[1]. A long jump $J_{LY}$ occurs immediately thereafter, and reading of the top depth map data block D3 in the second 3D extent block 6702 is skipped. Subsequently, the top right-view data block R3 and the immediately subsequent base-view data block L3 in the second 3D extent block 6702 are consecutively read as the third 3D extent EXTSS[2].

During the long jump $J_{LY}$, the BD-ROM drive stops reading, but the system target decoder continues to decode stream data. Accordingly, for the playback device 102 to play back video images seamlessly before and after the long jump $J_{LY}$, buffer underflow has to be prevented during a long jump $J_{LY}$.

The playback device 102 in L/R mode stores buffer margin amounts UL1 and UL2 in the read buffers 4021 and 4022 while decoding the first 3D extent block 6701. During a long jump $J_{LY}$, data corresponding to the buffer margin amounts UL1 and UL2 is decoded in addition to the data in the 3D extent EXTSS[1]=R2+L2 read immediately before the long jump $J_{LY}$. Accordingly, the buffer margin amounts UL1 and UL2 should be large enough to prevent buffer underflow in L/R mode.

For example, it is presumed that the buffer margin amounts UL1 and UL2 are sought via expressions 8 and 9, assuming that the jump distance $S_{jump\_max}$ for the long jump $J_{LY}$ is 40000 sectors. In this case, the buffer margin amounts UL1 and UL2 alone can prevent underflow in the read buffers 4021 and 4022 during the maximum jump time $T_{jump\_max}$=700 ms. This maximum jump time $T_{jump\_max}$ for the long jump $J_{LY}$ produced when changing layers includes a layer switching time of 350 ms in addition to the maximum jump time $T_{jump\_max}$=350 ms corresponding to the jump distance $S_{jump}$ as per the table in FIG. 57. Accordingly, as long as the actual jump time for the long jump $J_{LY}$ is equal to or less than 700 ms, the size of the data blocks R2 and L2 should be values Smin2 and Smin1 for which the buffer margin amounts can be maintained until immediately before a long jump $J_{LY}$. In other words, these values Smin2 and Smin1 should be calculated by substituting the maximum jump time $T_{jump\_max}$ for the long jump $J_{LY}$ minus the layer switching time into the right-hand side of expressions 3 and 2 as the jump time $T_{jump-3D}[n]$. As a result, the size Smin2 and Smin1 of the data blocks R2 and L2 equal the minimum extent size if "two 3D extent blocks 6701 and 6702 are contiguously recorded".

On the other hand, to prevent buffer underflow in 2D playback mode, the following two conditions should be met: first, the size $S_{ext2D}[1]$ of the 2D extent EXT2D[1], i.e. the base-view data block L2, should satisfy expression 1. Next, the number of sectors from the last 2D extent in the first 3D extent block 6701 to the top 2D extent in the second 3D extent block 6702 should be equal to or less than the maximum jump distance $S_{jump\_max}$ for the long jump $J_{LY}$ specified in accordance with the capabilities of the 2D playback device. The size $S_{ext2D}[1]$ satisfying expression 1 is generally larger than the minimum extent size Smin1 in L/R mode, as shown in FIG. 67B. Accordingly, the capacity of the first read buffer 4021 must be larger than the minimum value necessary for seamless playback in L/R mode. Furthermore, the extent ATC times are the same for the right-view data block R2 and base-view data block L2 included in the same 3D extent EXTSS[1]. Accordingly, the size $S_{ext2}[1]$ of the right-view data block R2 is generally larger than the minimum extent size Smin2 in L/R mode. Therefore, the capacity of the second read buffer 4022 has to be larger than the minimum value necessary for seamless playback in L/R mode.

As per the above description, seamless playback of video images is possible even during a long jump between two 3D extent blocks 6701 and 6702 in the arrangement shown in FIG. 67A. However, a sufficiently large capacity has to be guaranteed in the read buffers 4021 and 4022 in the playback device 102 in L/R mode.

To reduce the capacity of the read buffers 4021 and 4022 while still permitting seamless playback of video images during a long jump, changes may be made in the interleaved arrangement of data blocks before and after a position where a long jump is necessary, such as a layer boundary. These changes are represented, for example, by the following six types of arrangements 1-6. With any of the arrangements 1-6, as described below, the playback device 102 can easily perform seamless playback of video images during a long jump while keeping the necessary capacity of the read buffers 4021 and 4022 to a minimum.

[0-1] Arrangement 1

Figure 68A:
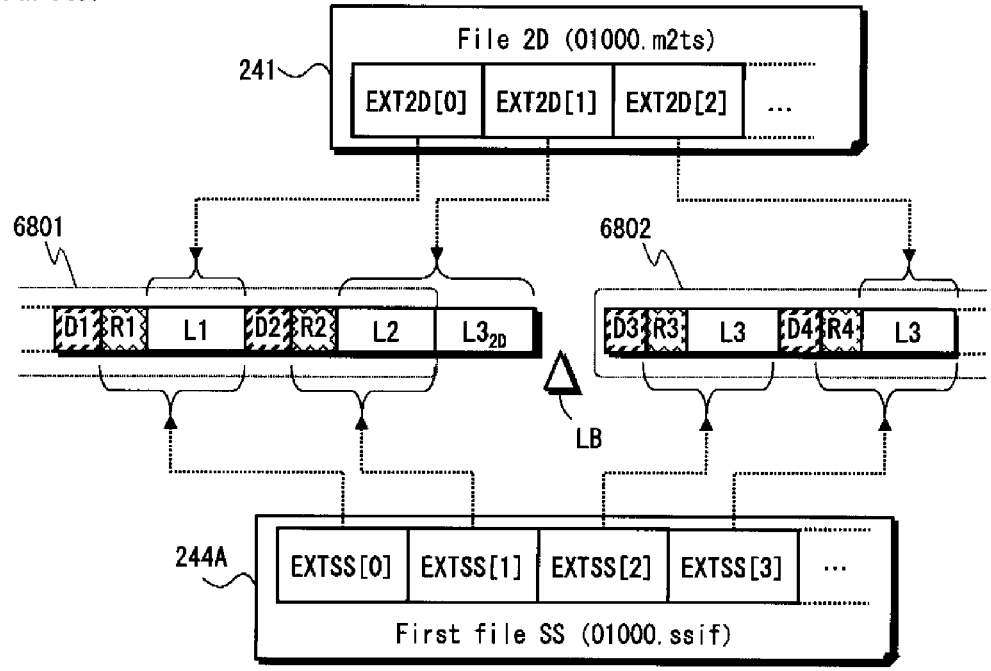
FIG. 68A is a schematic diagram showing a first example of a physical arrangement of data block groups recorded before and after a layer boundary LB on the BD-ROM disc 101 according to embodiment 1 of the present invention.

FIG. 68A is a schematic diagram showing a first example of a physical arrangement of a data block group recorded before and after a layer boundary LB on a BD-ROM disc 101. Hereinafter, this arrangement is referred to as "arrangement 1". As shown in FIG. 68A, the first 3D extent block 6801 is recorded before the layer boundary LB, and the second 3D extent block 6802 is recorded after the layer boundary LB. The 3D extent blocks 6801 and 6802 are the same as the blocks 6701 and 6702 shown in FIG. 67A. In arrangement 1, one base-view data block $L3_{2D}$ is further placed between the end L2 of the first 3D extent block 6801 and the layer boundary LB. This base-view data block $L3_{2D}$ matches bit-for-bit with a base-view data block $L3_{ss}$ at the top of the second 3D extent block 6802. Hereinafter, $L3_{2D}$ is referred to as a "block exclusively for 2D playback", and $L3_{ss}$ is referred to as a "block exclusively for 3D playback".

The data blocks shown in FIG. 68A can be accessed as extents in either file 2D or file DEP, with the exception of the block exclusively for 3D playback $L3_{ss}$. For example, the base-view data block L1 second from the end of the first 3D extent block 6801, the pair L2+$L3_{2D}$ of the last base-view data block L2 and the block exclusively for 2D playback $L3_{2D}$, and the second base-view data block L4 in the second 3D extent block 6802 can respectively be accessed as individual 2D extents EXT2D[0], EXT2D[1], and EXT2D[2] in the file 2D 241.

For the data block groups shown in FIG. 68A, cross-linking of AV stream files is performed as follows. Each pair of contiguous right-view and base-view data blocks R1+L1, R2+L2, R3+$L3_{ss}$, and R4+L4 in the 3D extent blocks 6801 and 6802 can be accessed respectively as individual 3D extents EXTSS[0], EXTSS[1], EXTSS[2], and EXTSS[3] in the first file SS 244A. In this case, with the exception of the 3D extent EXTSS[2] immediately after the layer boundary LB, the 3D extents EXTSS[0], EXTSS[1], and EXTSS[3] respectively share base-view data blocks L1, L2, and L4 with the file 2D 241. On the other hand, the block exclusively for 2D playback $L3_{2D}$ can be accessed as part of the extent EXT2D

[1] in the file 2D 241, the extent EXT2D[1] being located immediately before the layer boundary LB. Furthermore, the block exclusively for 3D playback L3$_{ss}$ can be accessed as part of the 3D extent EXTSS[2], located immediately after the layer boundary LB.

Figure 68B:
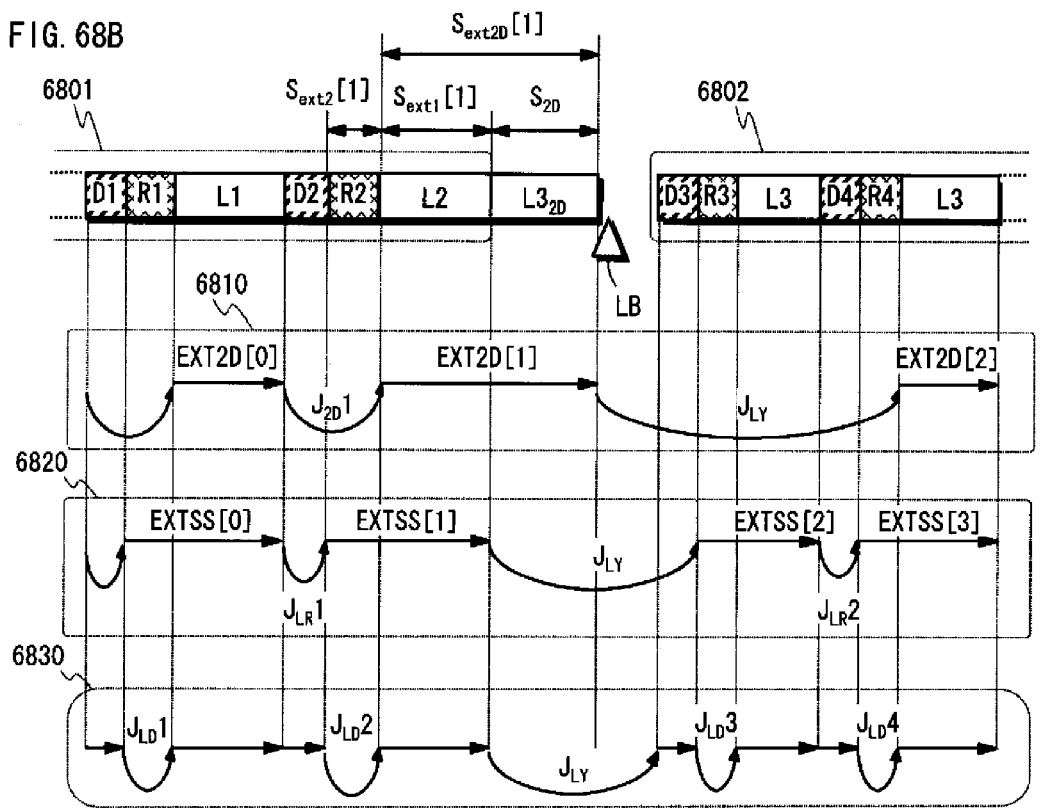
FIG. 68B is a schematic diagram showing a playback path 6810 in 2D playback mode, playback path 6820 in L/R mode, and a playback path 6830 in depth mode for the data block groups shown in FIG. 68A.

FIG. 68B is a schematic diagram showing a playback path 6810 in 2D playback mode, playback path 6820 in L/R mode, and a playback path 6830 in depth mode for the data block group shown in FIG. 68A.

The playback device 102 in 2D playback mode plays back the file 2D 241. Accordingly, as shown by the playback path 6810 in 2D playback mode, first the base-view data block L1, which is second from the end of the first 3D extent block 6801, is read as the first 2D extent EXT2D[0], and reading of the immediately subsequent depth map data block D2 and right-view data block R2 is skipped by a first jump $J_{2D}$1. Next, a pair L2+L3$_{2D}$ of the last base-view data block L2 in the first 3D extent block 6810 and the immediately subsequent block exclusively for 2D playback L3$_{2D}$ is continuously read as the second 2D extent EXT2D[1]. A long jump $J_{LY}$ occurs at the immediately subsequent layer boundary LB, and reading of the five data blocks D3, R3, L3$_{ss}$, D4, and R4, located at the top of the second 3D extent block 6802, is skipped. Next, the second base-view data block L4 in the second 3D extent block 6802 is read as the third 2D extent EXT2D[2].

The playback device 102 in L/R mode plays back the first file SS 244A. Accordingly, as shown by the playback path 6820 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by a first jump $J_{DR}$1. Next, the second right-view data block R2 and the immediately subsequent base-view data block L2 are read continuously as the second 3D extent EXTSS[1]. A long jump $J_{LY}$ occurs immediately thereafter, and reading of the block exclusively for 2D playback L3$_{2D}$ and the top depth map data block D3 in the second 3D extent block 6802 is skipped. Next, the top right-view data block R3 in the second 3D extent block 6802 and the immediately subsequent block exclusively for 3D playback L3$_{ss}$ are read continuously as the third 3D extent EXTSS[2], and reading of the immediately subsequent depth map data block D4 is skipped by a second jump $J_{LR}$2. Furthermore, the next right-view data block R4 and the immediately subsequent base-view data block L4 are read continuously as the fourth 3D extent EXTSS[3].

As shown in FIG. 68B, in 2D playback mode, the block exclusively for 2D playback L3$_{2D}$ is read, whereas reading of the block exclusively for 3D playback L3$_{ss}$ is skipped. Conversely, in L/R mode, reading of the block exclusively for 2D playback L3$_{2D}$ is skipped, whereas the block exclusively for 3D playback L3$_{ss}$ is read. However, since the data blocks L3$_{2D}$ and L3$_{ss}$ match bit-for-bit, the left-view video frames that are played back are the same in both playback modes. In arrangement 1, the playback path 6810 in 2D playback mode and the playback path 6820 in L/R mode are divided before and after the long jump $J_{LY}$ in this way. The same is also true for depth mode. Accordingly, unlike the arrangement shown in FIG. 67A, the size $S_{ext2D}$[1] of the 2D extent EXT2D[1] located immediately before the layer boundary LB and the size $S_{ext2}$[1] of the immediately preceding right-view data block R2 can be determined separately as follows.

The size $S_{ext2D}$[1] of the 2D extent EXT2D[1] equals $S_{ext1}$[1]+$S_{2D}$, the sum of the size $S_{ext1}$[1] of the base-view data block L2 and the size $S_{2D}$ of the block exclusively for 2D playback L3$_{2D}$. Accordingly, for seamless playback in 2D playback mode, this sum $S_{ext1}$[1]+$S_{2D}$ first should satisfy expression 1. Next, the number of sectors from the end of the block exclusively for 2D playback L3$_{2D}$ to the first 2D extent EXT2D[2]=L4 in the second 3D extent block 6802 should be equal to or less than the maximum jump distance $S_{jump\_max}$ for the long jump $L_{LY}$ specified in accordance with the capabilities of the 2D playback device.

On the other hand, for seamless playback in L/R mode, the sizes $S_{ext2}$[1] and $S_{ext1}$[1] of the right-view data block R2 and base-view data block L2 located immediately before the layer boundary LB should satisfy expressions 3 and 2. The maximum jump time $T_{jump\_max}$ for the long jump $J_{LY}$ minus the layer switching time should be substituted into the right-hand side of these expressions as the jump time $T_{jump\_3D}$. Next, the number of sectors from the end of the 3D extent EXTSS[1] to the top of the first 3D extent EXTSS[2] in the second 3D extent block 6802 should be equal to or less than the maximum jump distance $S_{jump\_max}$ for the long jump $J_{LY}$ specified in accordance with the capabilities of the 3D playback device.

Only the base-view data block L2 located at the front of the 2D extent EXT2D[1] is shared with the 3D extent EXTSS[1]. Accordingly, by appropriately enlarging the size $S_{2D}$ of the block exclusively for 2D playback L3$_{2D}$, the size $S_{ext1}$[1] of the base-view data block L2 can be further limited while keeping the size $S_{ext2D}$[1]=$S_{ext1}$[1]+$S_{2D}$ of the 2D extent EXT2D[1] constant. As a result, the size $S_{ext2}$[1] of the right-view data block R2 can also be further limited.

Since the block exclusively for 3D playback L3$_{ss}$ and the block exclusively for 2D playback L3$_{2D}$ match bit for bit, enlarging the size $S_{2D}$ of the block exclusively for 2D playback L3$_{2D}$ enlarges the size of the right-view data block R3 located immediately before the block exclusively for 3D playback L3$_{ss}$. However, this size can be made sufficiently smaller than the size of the right-view data block R2 located immediately before the layer boundary LB shown in FIG. 67A. The capacity of the read buffers 4021 and 4022 to be guaranteed in the playback device 102 in L/R mode can thus be brought even closer to the minimum amount necessary for seamless playback in L/R mode.

It is thus possible to set each data block in arrangement 1 to be a size at which seamless playback of video images during a long jump is possible in both 2D playback mode and L/R mode while keeping the read buffer capacity that is to be guaranteed in the playback device 102 to the minimum necessary. The same is also true for depth mode.

[0-2] Arrangement 1 Supporting L/R Mode Only

Figure 69:
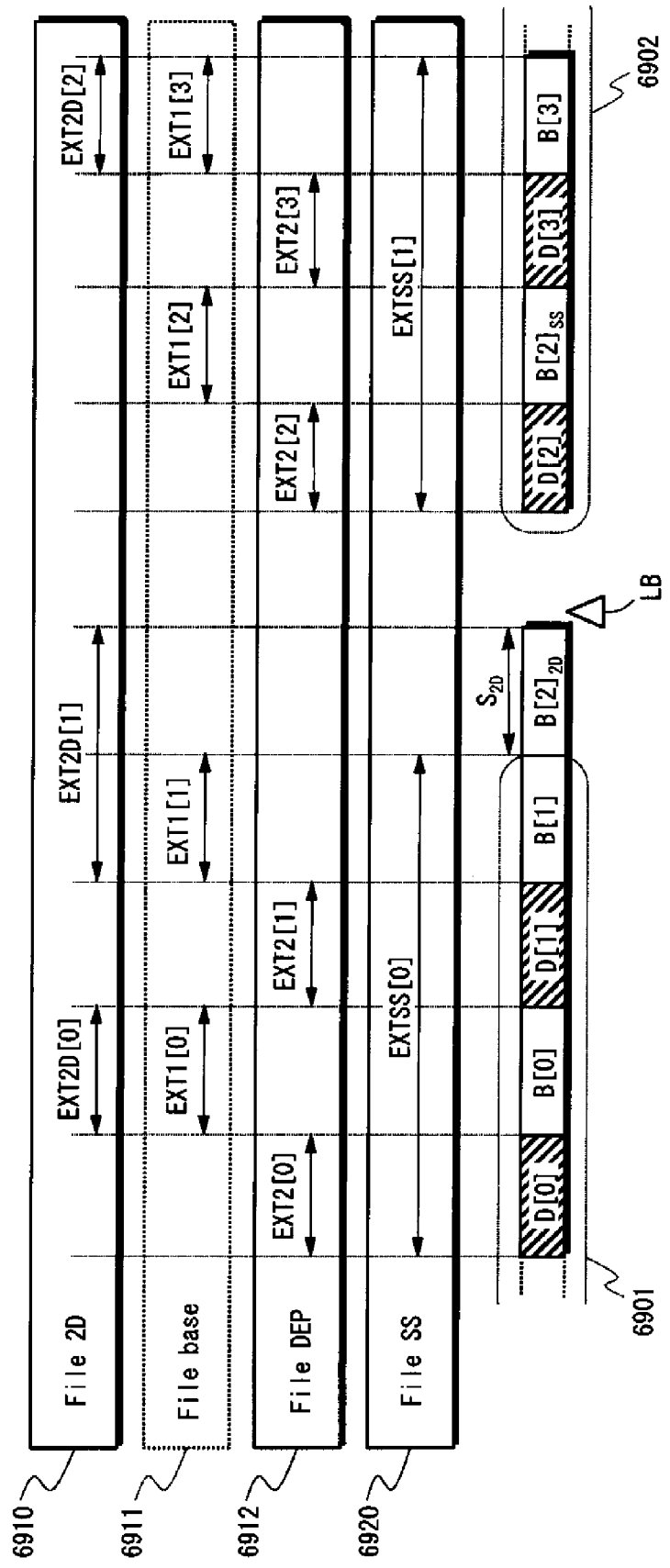
FIG. 69 is a schematic diagram showing arrangement 1 in FIG. 68A with the depth map data blocks removed.

When playing back 3D video images in L/R mode only, the depth map blocks may be removed from arrangement 1. FIG. 69 is a schematic diagram showing arrangement 1 in FIG. 68A with the depth map data blocks removed. As shown in FIG. 69, a dependent-view data block group . . . , D[0], D[1] and a base-view data block group . . . , B[0], B[1] are recorded in an interleaved arrangement in the first 3D extent block 6901 located before the layer boundary LB. On the other hand, a dependent-view data block group D[2], D[3], . . . and a base-view data block group B[2]$_{ss}$ B[3], . . . are recorded in an interleaved arrangement in the second 3D extent block 6902 located after the layer boundary LB. Furthermore, a block exclusively for 2D playback B[2]$_{2D}$ is placed between the end B[1] of the first 3D extent block 6901 and the layer boundary LB, and a block exclusively for 3D playback B[2]$_{ss}$ is placed at the top of the second 3D extent block 6902. These data blocks B[2]$_{2D}$ and B[2]$_{ss}$ match bit-for-bit.

In the interleaved arrangement of the 3D extent blocks 6901 and 6902, dependent-view data blocks D[n] and base-view data blocks B[n] alternate. Furthermore, the extent ATC time is equal for each set of two contiguous data blocks D[0], B[0]; D[1] B[1]; D[2], B[2]$_{ss}$; and D[3], B[3]. The content of each piece of stream data is continuous between the two data blocks D[1] and B[1] located at the end of the first 3D extent block 6901 and the two data blocks D[2] and B[2]$_{ss}$ located at the top of the second 3D extent block 6902.

With the exception of the block exclusively for 3D playback B[2]$_{ss}$, the data blocks shown in FIG. 69 can each be accessed as an extent in one of file 2D 6910 and file DEP 6912. For example, the base-view data block B[0] located second from the end in the first 3D extent block 6901, the pair B[1]+B[2]$_{2D}$ of the last base-view data block in the first 3D extent block 6901 and the block exclusively for 2D playback, and the second base-view data block B[3] in the second 3D extent block 6902 can respectively be accessed as individual 2D extents EXT2D[0], EXT2D[1], and EXT2D[2] in the file 2D 6910.

For the data block groups shown in FIG. 69, cross-linking of AV stream files is performed as follows. Each set of contiguous dependent-view and base-view data blocks D[0]+B [0]+D[1]+B[1] and D[2]+B[2]$_{ss}$+D[3]+B[3] in the 3D extent blocks 6901 and 6902 can be accessed respectively as individual 3D extents EXTSS[0] and EXTSS[1] in the file SS 6920. In this case, the 3D extents EXTSS[0] and EXTSS[1] share base-view data blocks B[0], B[1], and B[3] with the file 2D 6910. On the other hand, the block exclusively for 2D playback B[2]$_{2D}$ can be accessed as part of the 2D extent EXT2D[1] located immediately before the layer boundary LB. Furthermore, the block exclusively for 3D playback B[2]$_{ss}$ can be accessed as part of the 3D extent EXTSS[1], located immediately after the layer boundary LB.

The playback device 102 in 2D playback mode plays back the file 2D 6910. Accordingly, like the playback path 6810 in 2D playback mode shown in FIG. 68B, only the 2D extent EXT2D[0]=B[0], EXT2D[1]=B[1]+B[2]$_{2D}$, and EXT2D[2]=B[3] are read, whereas reading of other data blocks is skipped by jumps.

The playback device 102 in L/R mode plays back the file SS 6920. Accordingly, data blocks other than the block exclusively for 2D playback B[2]$_{2D}$ are consecutively read as 3D extents EXTSS[0] and EXTSS[1], and only the reading of the block exclusively for 2D playback B[2]$_{2D}$ is skipped.

As per the above description, in 2D playback mode, the block exclusively for 2D playback B[2]$_{2D}$ is read, whereas reading of the block exclusively for 3D playback B[2]$_{ss}$ is skipped. Conversely, in L/R mode, reading of the block exclusively for 2D playback B[2]$_{2D}$ is skipped, whereas the block exclusively for 3D playback B[2]$_{ss}$ is read. Since the data blocks B[2]$_{2D}$ and B[2]$_{ss}$ match bit-for-bit, however, the left-view video frames that are played back are the same in either playback mode. In arrangement 1 therefore, even in the case of supporting only L/R mode, the playback path in 2D playback mode and the playback path in L/R mode are separate before and after a long jump J$_{LY}$. Accordingly, by appropriately enlarging the size S$_{2D}$ of the block exclusively for 2D playback B[2]$_{2D}$, the following four conditions can simultaneously be met. (i) The size of the 2D extent EXT2D[1]=B [1]+B[2]$_{2D}$ satisfies expression 1. (ii) The number of sectors from the end of the block exclusively for 2D playback B[2]$_{2D}$ to the first 2D extent EXT2D[2]=B[3] in the second 3D extent block 6902 is equal to or less than the maximum jump distance S$_{jump\_max}$ for the long jump J$_{LY}$ specified in accordance with the capabilities of the 2D playback device. (iii) The sizes of the dependent-view data block D[1] and the base-view data block B[1] located immediately before the layer boundary LB satisfy expressions 3 and 2. The maximum jump time T$_{jump\_max}$ for the long jump J$_{LY}$ minus the layer switching time should be substituted into the right-hand side of these expressions as the jump time T$_{jump-3D}$. (iv) The number of sectors from the end of the 3D extent EXTSS[0] to the top of the first 3D extent EXTSS[1] in the second 3D extent block 6902 is equal to or less than the maximum jump distance S$_{jump\_max}$ for the long jump J$_{LY}$ specified in accordance with the capabilities of the 3D playback device. As a result of these conditions, the capacity of the read buffers 4021 and 4022 to be guaranteed in the playback device 102 in L/R mode can thus be brought even closer to the minimum amount necessary for seamless playback in L/R mode.

Even when arrangement 1 supports only L/R mode, it is thus possible to set each data block to be a size at which seamless playback of video images during a long jump is possible in both 2D playback mode and L/R mode while keeping the read buffer capacity that is to be guaranteed in the playback device 102 to the minimum necessary.

[0-3] Arrangement 2

Figure 70A:
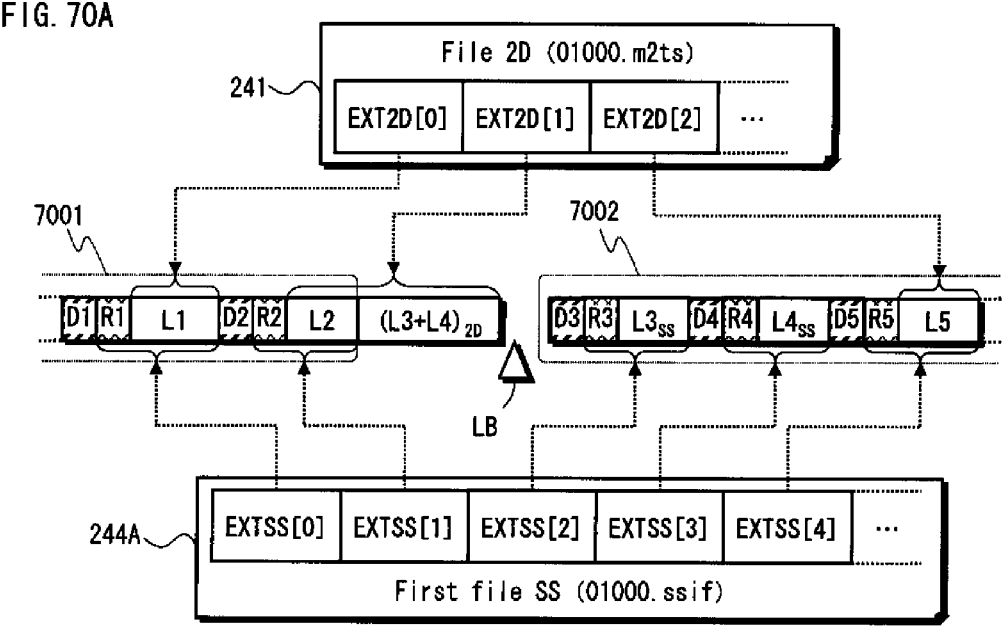
FIG. 70A is a schematic diagram showing a second example of a physical arrangement of data block groups recorded before and after a layer boundary LB on the BD-ROM disc 101 according to embodiment 1 of the present invention.

FIG. 70A is a schematic diagram showing a second example of a physical arrangement of data block groups recorded before and after a layer boundary LB on the BD-ROM disc 101. Hereinafter, this arrangement is referred to as "arrangement 2". As shown by comparing FIG. 70A with FIG. 68A, arrangement 2 differs from arrangement 1 by including two blocks exclusively for 3D playback L3$_{ss}$ and L4$_{ss}$ at the top of the second 3D extent block 7002. The blocks exclusively for 3D playback L3$_{ss}$ and L4$_{ss}$ match bit-for-bit with the block exclusively for 2D playback (L3+L4)$_{2D}$ located immediately before the layer boundary LB. The other characteristics of arrangement 2 are the same as arrangement 1, and thus a detailed description thereof can be found in the description for arrangement 1.

The data blocks shown in FIG. 70A can be accessed as extents in either file 2D or file DEP, with the exception of the blocks exclusively for 3D playback L3$_{ss}$ and L4$_{ss}$. For example, the base-view data block L1 second from the end of the first 3D extent block 7001, the pair L2+(L3+L4)$_{2D}$ of the last base-view data block L2 and the block exclusively for 2D playback (L3+L4)$_{2D}$, and the third base-view data block L5 in the second 3D extent block 7002 can respectively be accessed as individual 2D extents EXT2D[0], EXT2D[1], and EXT2D [2] in the file 2D 241.

For the data block groups shown in FIG. 70A, cross-linking of AV stream files is performed as follows. Each pair of contiguous right-view and base-view data blocks R1+L1, R2+L2, R3+L3$_{ss}$, R4+L4$_{ss}$, and R5+L5 in the 3D extent blocks 7001 and 7002 can be accessed respectively as individual 3D extents EXTSS[0], EXTSS[1], EXTSS[2], EXTSS [3], and EXTSS[4] in the first file SS 244A. In this case, with the exception of the two 3D extents EXTSS[2] and EXTSS[3] immediately after the layer boundary LB, the 3D extents EXTSS[0], EXTSS[1], and EXTSS[4] respectively share base-view data blocks L1, L2, and L5 with 2D extents EXT2D[0], EXT2D[1], and EXT2D[2]. On the other hand, the block exclusively for 2D playback (L3+L4)$_{2D}$ can be accessed as part of the 2D extent EXT2D[1]. Furthermore, the blocks exclusively for 3D playback L3$_{ss}$ and L4$_{ss}$ can be accessed as part of the 3D extents EXTSS[2] and EXTSS[3].

Figure 70B:
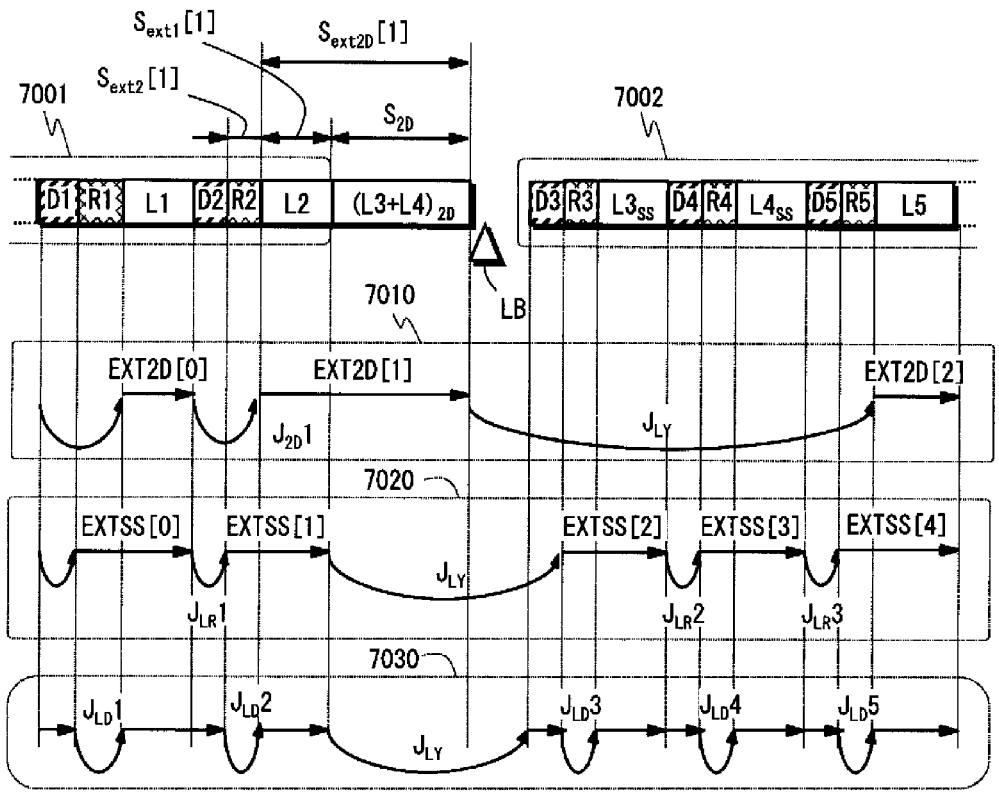
FIG. 70B is a schematic diagram showing a playback path 7010 in 2D playback mode, playback path 7020 in L/R mode, and a playback path 7030 in depth mode for the data block groups shown in FIG. 70A.

FIG. 70B is a schematic diagram showing a playback path 7010 in 2D playback mode, playback path 7020 in L/R mode, and a playback path 7030 in depth mode for the data block groups shown in FIG. 70A.

The playback device 102 in 2D playback mode plays back the file 2D 241. Accordingly, as shown by the playback path 7010 in 2D playback mode, first the base-view data block L1, which is second from the end of the first 3D extent block 7001, is read as the first 2D extent EXT2D[0], and reading of the immediately subsequent depth map data block D2 and right-view data block R2 is skipped by a first jump J$_{2D}$1. Next, a pair L2+(L3+L4)$_{2D}$ of the last base-view data block L2 in the first 3D extent block 7001 and the immediately subsequent block exclusively for 2D playback (L3+L4)$_{2D}$ is continuously read as the second 2D extent EXT2D[1]. A long jump J$_{LY}$ occurs at the immediately subsequent layer boundary LB, and reading of the eight data blocks D3, R3, L3$_{ss}$, D4, R4, L4$_{ss}$, D5, and R5, located at the top of the second 3D extent block 7002, is skipped. Next, the third base-view data block L5 in the second 3D extent block 7002 is read as the third 2D extent EXT2D[2].

The playback device 102 in L/R mode plays back the first file SS 244A. Accordingly, as shown by the playback path 7020 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by a first jump J$_{LR}$1. Next, the second right-view data block R2 and the immediately subsequent base-view data block L2 are read continuously as the second 3D extent EXTSS[1]. A long jump L$_{LY}$ occurs immediately thereafter, and reading of the block exclusively for 2D playback (L3+L4)$_{2D}$ and the top depth map data block D3 in the second 3D extent block 7002 is skipped. Next, the top right-view data block R3 in the second 3D extent block 7002 and the immediately subsequent block exclusively for 3D playback L3$_{ss}$ are read continuously as the third 3D extent EXTSS[2], and reading of the immediately subsequent depth map data block D4 is skipped by a second jump J$_{LR}$2. Similarly, the next right-view data block R4 and the immediately subsequent block exclusively for 3D playback L4$_{ss}$ are read continuously as the fourth 3D extent EXTSS[3], and reading of the immediately subsequent depth map data block D5 is skipped by a third jump J$_{LR}$3. Furthermore, the next right-view data block R5 and the immediately subsequent base-view data block L5 are read continuously as the fifth 3D extent EXTSS[4].

As shown in FIG. 70B, in 2D playback mode, the block exclusively for 2D playback (L3+L4)$_{2D}$ is read, whereas reading of the blocks exclusively for 3D playback L3$_{ss}$ and L4$_{ss}$ is skipped. Conversely, in L/R mode, reading of the block exclusively for 2D playback (L3+L4)$_{2D}$ is skipped, whereas the blocks exclusively for 3D playback L3$_{ss}$ and L4$_{ss}$ are read. However, since the block exclusively for 2D playback (L3+L4)$_{2D}$ matches the blocks exclusively for 3D playback L3$_{ss}$ and L4$_{ss}$ bit-for-bit, the left-view video frames that are played back are the same in both playback modes. In arrangement 2, the playback path 7010 in 2D playback mode and the playback path 7020 in L/R mode are divided before and after the long jump J$_{LY}$ in this way. Accordingly, the size S$_{ext2D}$[1] of the 2D extent EXT2D[1] located immediately before the layer boundary LB and the size S$_{ext2}$[1] of the immediately preceding right-view data block R2 can be determined separately as follows. The same is also true for depth mode.

The size S$_{ext2D}$[1] of the 2D extent EXT2D[1] equals S$_{ext1}$[1] S$_{2D}$, the sum of the size S$_{ext1}$[1] of the base-view data block L2 and the size S$_{2D}$ of the block exclusively for 2D playback (L3+L4)$_{2D}$. Accordingly, for seamless playback in 2D playback mode, this sum S$_{ext1}$[1]+S$_{2D}$ should first satisfy expression 1. Next, the number of sectors from the end of the block exclusively for 2D playback (L3+L4)$_{2D}$ to the first 2D extent EXT2D[2]=L5 in the second 3D extent block 7002 should be equal to or less than the maximum jump distance S$_{jump\_max}$ for the long jump J$_{LY}$ specified in accordance with the capabilities of the 2D playback device.

On the other hand, for seamless playback in L/R mode, the sizes S$_{ext2}$[1] and S$_{ext1}$[1] of the right-view data block R2 and base-view data block L2 located immediately before the layer boundary LB should satisfy expressions 3 and 2. The maximum jump time T$_{jump\_max}$ for the long jump J$_{LY}$ minus the layer switching time should be substituted into the right-hand side of these expressions as the jump time T$_{jump-3D}$. Next, the number of sectors from the end of the 3D extent EXTSS[1] to the top of the first 3D extent EXTSS[2] in the second 3D extent block 7002 should be equal to or less than the maximum jump distance S$_{jump\_max}$ for the long jump J$_{LY}$ specified in accordance with the capabilities of the 3D playback device.

Only the base-view data block L2 located at the front of the 2D extent EXT2D[1] is shared with the 3D extent EXTSS[1]. Accordingly, by appropriately enlarging the size S$_{2D}$ of the block exclusively for 2D playback (L3+L4)$_{2D}$, the size S$_{ext1}$[1] of the base-view data block L2 can be further limited while keeping the size S$_{ext2D}$[1]=S$_{ext1}$[1]+S$_{2D}$ of the 2D extent EXT2D[1] constant. As a result, the size S$_{ext2}$[1] of the right-view data block R2 can also be further limited.

Since the blocks exclusively for 3D playback L3$_{ss}$ and L4$_{ss}$ match the block exclusively for 2D playback (L3+L4)$_{2D}$ bit for bit, enlarging the size S$_{2D}$ of the block exclusively for 2D playback (L3+L4)$_{2D}$ enlarges the sizes of the right-view data blocks R3 and R4 respectively located immediately before the blocks exclusively for 3D playback L3$_{ss}$ and L4$_{ss}$. However, since there are two blocks exclusively for 3D playback L3$_{ss}$ and L4$_{ss}$ as compared to one block exclusively for 2D playback (L3+L4)$_{2D}$, the sizes of the right-view data blocks R3 and R4 can be made sufficiently smaller than the size of the right-view data block R2 located immediately before the layer boundary LB shown in FIG. 67A. The capacity of the read buffers 4021 and 4022 to be guaranteed in the playback device 102 in L/R mode can thus be brought even closer to the minimum amount necessary for seamless playback in L/R mode.

It is thus possible to set each data block in arrangement 2 to be a size at which seamless playback of video images during a long jump is possible in both 2D playback mode and L/R mode while keeping the read buffer capacity that is to be guaranteed in the playback device 102 to the minimum necessary. The same is also true for depth mode.

In arrangement 2, duplicate data of the block exclusively for 2D playback (L3+L4)$_{2D}$ is divided into two blocks exclusively for 3D playback L3$_{ss}$ and L4$_{ss}$. Alternatively, the duplicate data may be divided into three or more blocks exclusively for 3D playback.

[0-4] Arrangement 3

Figure 71A:
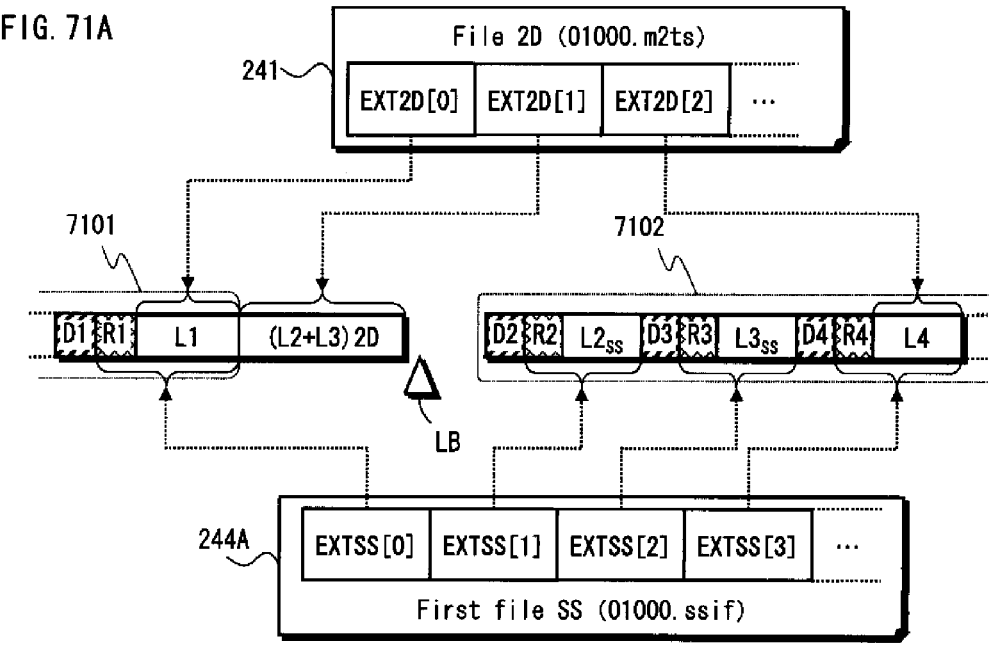
FIG. 71A is a schematic diagram showing a third example of a physical arrangement of data block groups recorded before and after a layer boundary LB on the BD-ROM disc 101 according to embodiment 1 of the present invention.

FIG. 71A is a schematic diagram showing a third example of a physical arrangement of data block groups recorded before and after a layer boundary LB on the BD-ROM disc 101. Hereinafter, this arrangement is referred to as "arrangement 3". As shown by comparing FIG. 71A with FIG. 70A, arrangement 3 differs from arrangement 2 in that the block exclusively for 2D playback (L2+L3)$_{2D}$ can be accessed as a single 2D extent EXT2D[1]. The block exclusively for 2D playback (L2+L3)$_{2D}$ matches bit-for-bit with the entirety of the blocks exclusively for 3D playback L2$_{ss}$+L3$_{ss}$ located immediately after the layer boundary LB. The other characteristics of arrangement 3 are the same as arrangement 2, and thus a detailed description thereof can be found in the description for arrangement 2.

The data blocks shown in FIG. 71A can be accessed as extents in either file 2D or file DEP, with the exception of the blocks exclusively for 3D playback L2$_{ss}$ and L3$_{ss}$. For example, the last base-view data block L1 in the first 3D extent block 7101, the block exclusively for 2D playback (L2+L3)$_{2D}$, and the third base-view data block L4 in the second 3D extent block 7102 can respectively be accessed as individual 2D extents EXT2D[0], EXT2D[1], and EXT2D[2] in the file 2D 241.

For the data block groups shown in FIG. 71A, cross-linking of AV stream files is performed as follows. Each pair of contiguous right-view and base-view data blocks R1+L1, R2+L2$_{ss}$, R3+L3$_{ss}$, and R4+L4 in the 3D extent blocks 7101 and 7102 can be accessed respectively as individual 3D extents EXTSS[0], EXTSS[1], EXTSS[2], and EXTSS[3] in the first file SS 244A. In this case, with the exception of the two 3D extents EXTSS[1] and EXTSS[2] immediately after the layer boundary LB, the 3D extents EXTSS[0] and EXTSS[4] respectively share base-view data blocks L1 and L4 with 2D extents EXT2D[0] and EXT2D[2]. On the other hand, the block exclusively for 2D playback (L2+L3)$_{2D}$ can be accessed as part of the 2D extent EXT2D[1]. Furthermore, the blocks exclusively for 3D playback L2$_{ss}$ and L3$_{ss}$ can be accessed as part of the 3D extents EXTSS[1] and EXTSS[2].

Figure 71B:
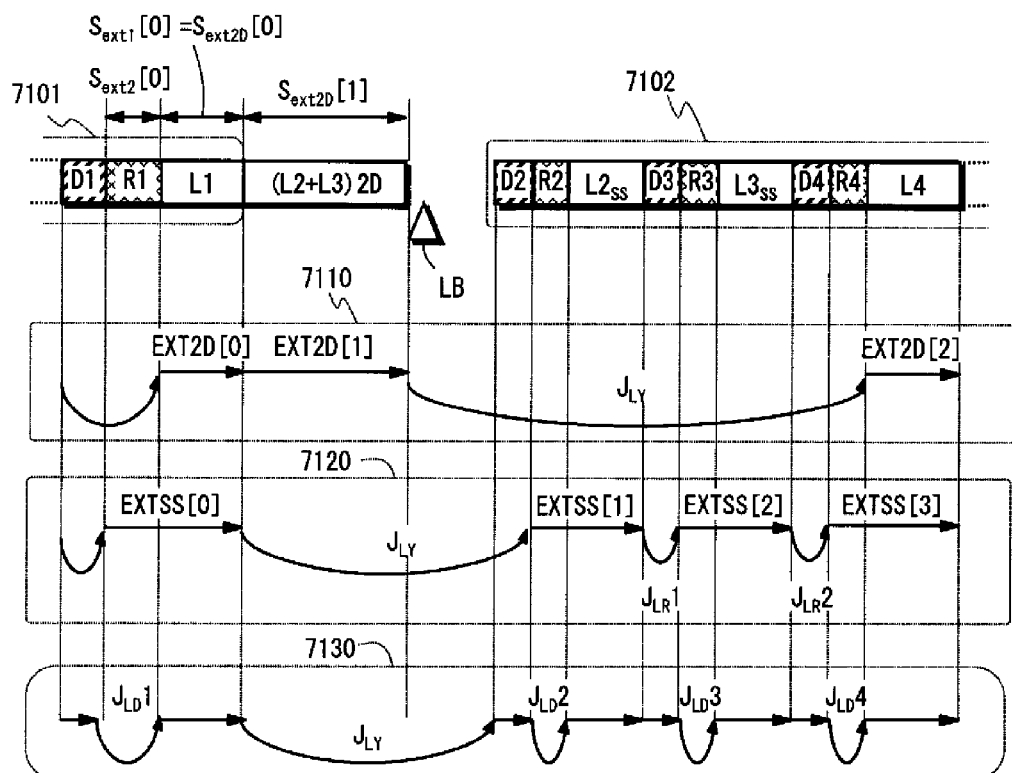
FIG. 71B is a schematic diagram showing a playback path 7110 in 2D playback mode, playback path 7120 in L/R mode, and a playback path 7130 in depth mode for the data block groups shown in FIG. 71A.

FIG. 71B is a schematic diagram showing a playback path 7110 in 2D playback mode, playback path 7120 in L/R mode, and a playback path 7130 in depth mode for the data block groups shown in FIG. 71A.

The playback device 102 in 2D playback mode plays back the file 2D 241. Accordingly, as shown by the playback path 7110 in 2D playback mode, the last base-view data block L1 in the first 3D extent block 7101 is read as the first 2D extent EXT2D[0]. Next, the immediately subsequent block exclusively for 2D playback (L2+L3)$_{2D}$ is read as the second 2D extent EXT2D[1]. A long jump J$_{LY}$ occurs at the immediately subsequent layer boundary LB, and reading of the eight data blocks D2, R2, L2$_{ss}$, D3, R3, L3$_{ss}$, D4, and R4, located at the top of the second 3D extent block 7102, is skipped. Next, the third base-view data block L4 in the second 3D extent block 7102 is read as the third 2D extent EXT2D[2].

The playback device 102 in L/R mode plays back the first file SS 244A. Accordingly, as shown by the playback path 7120 in L/R mode, first a pair R1+L1 of the top right-view data block R1 and the immediately subsequent base-view data block L1 is read continuously as the first 3D extent EXTSS[0]. A long jump J$_{LY}$ occurs immediately thereafter, and reading of the block exclusively for 2D playback (L2+L3)$_{2D}$ and the top depth map data block D2 in the second 3D extent block 7102 is skipped. Next, the top right-view data block R2 in the second 3D extent block 7102 and the immediately subsequent block exclusively for 3D playback L2$_{ss}$ are read continuously as the second 3D extent EXTSS[1], and reading of the immediately subsequent depth map data block D3 is skipped by a first jump J$_{LR}$1. Similarly, the next right-view data block R3 and the immediately subsequent block exclusively for 3D playback L3$_{ss}$ are read continuously as the third 3D extent EXTSS[2], and reading of the immediately subsequent depth map data block D4 is skipped by a second jump J$_{LR}$2. Furthermore, the next right-view data block R4 and the immediately subsequent base-view data block L4 are read continuously as the fourth 3D extent EXTSS[3].

As shown in FIG. 71B, in 2D playback mode, the block exclusively for 2D playback (L2+L3)$_{2D}$ is read, whereas reading of the blocks exclusively for 3D playback L2$_{ss}$ and L3$_{ss}$ is skipped. Conversely, in L/R mode, reading of the block exclusively for 2D playback (L2+L3)$_{2D}$ is skipped, whereas the blocks exclusively for 3D playback L2$_{ss}$ and L3$_{ss}$ are read. However, since the block exclusively for 2D playback (L2+L3)$_{2D}$ matches the blocks exclusively for 3D playback L2$_{ss}$ and L3$_{ss}$ bit-for-bit, the left-view video frames that are played back are the same in both playback modes. In arrangement 3, the playback path 7110 in 2D playback mode and the playback path 7120 in L/R mode are divided before and after the long jump J$_{LY}$ in this way. Accordingly, the size S$_{ext2D}$[1] of the 2D extent EXT2D[1] located immediately before the layer boundary LB and the size S$_{ext2}$[0] of the immediately preceding right-view data block R1 can be determined separately as follows. The same is also true for depth mode.

The sum of the sizes S$_{ext2D}$[0]+S$_{ext2D}$[1] of the 2D extents EXT2D[0] and EXT2D[1] equals S$_{ext1}$[0]+S$_{ext2D}$[1], the sum of the size S$_{ext1}$[0] of the base-view data block L1 and the size S$_{ext2D}$[1] of the block exclusively for 2D playback (L2+L3)$_{2D}$. Accordingly, for seamless playback in 2D playback mode, this sum S$_{ext1}$[0]+S$_{ext2D}$[1] should first satisfy expression 1. Next, the number of sectors from the end of the block exclusively for 2D playback (L2+L3)$_{2D}$ to the first 2D extent EXT2D[2]=L4 in the second 3D extent block 7102 should be equal to or less than the maximum jump distance S$_{jump\_max}$ for the long jump J$_{LY}$ specified in accordance with the capabilities of the 2D playback device.

On the other hand, for seamless playback in L/R mode, the sizes S$_{ext2}$[0] and S$_{ext1}$[0] of the right-view data block R1 and base-view data block L1 located immediately before the layer boundary LB should satisfy expressions 3 and 2. The maximum jump time T$_{jump\_max}$ for the long jump J$_{LY}$ minus the layer switching time should be substituted into the right-hand side of these expressions as the jump time T$_{jump-3D}$. Next, the number of sectors from the end of the 3D extent EXTSS[0] to the top of the first 3D extent EXTSS[1] in the second 3D extent block 7102 should be equal to or less than the maximum jump distance S$_{jump\_max}$ for the long jump J$_{LY}$ specified in accordance with the capabilities of the 3D playback device.

The base-view data block L1 and the block exclusively for 2D playback (L2+L3)$_{2D}$ belong to different 2D extents. Accordingly, by appropriately enlarging the size S$_{ext2D}$[1] of the block exclusively for 2D playback (L2+L3)$_{2D}$, the size S$_{ext2D}$[0]=S$_{ext1}$[0] of the base-view data block L1 can be further limited while keeping the sum of the sizes S$_{ext2D}$[0] S$_{ext2D}$[1] of the 2D extents EXT2D[0] and EXT2D[1] constant. As a result, the size S$_{ext2}$[0] of the right-view data block R1 can also be further limited.

Since the blocks exclusively for 3D playback L2$_{ss}$ and L3$_{ss}$ match the block exclusively for 2D playback (L2+L3)$_{2D}$ bit for bit, enlarging the size S$_{ext2D}$[1] of the block exclusively for 2D playback (L2+L3)$_{2D}$ enlarges the sizes of the right-view data blocks R2 and R3 respectively located immediately before the blocks exclusively for 3D playback L2$_{ss}$ and L3$_{ss}$. However, since there are two blocks exclusively for 3D playback L2$_{ss}$ and L3$_{ss}$ as compared to one block exclusively for 2D playback (L2+L3)$_{2D}$, the sizes of the right-view data blocks R2 and R3 can be made sufficiently smaller than the size of the right-view data block R2 located immediately before the layer boundary LB shown in FIG. 67A. The capacity of the read buffers 4021 and 4022 to be guaranteed in the playback device 102 in L/R mode can thus be brought even closer to the minimum amount necessary for seamless playback in L/R mode.

It is thus possible to set each data block in arrangement 3 to be a size at which seamless playback of video images during a long jump is possible in both 2D playback mode and L/R mode while keeping the read buffer capacity that is to be guaranteed in the playback device 102 to the minimum necessary. The same is also true for depth mode.

In arrangement 3, duplicate data of the block exclusively for 2D playback (L2+L3)$_{2D}$ is divided into two blocks exclusively for 3D playback L2$_{ss}$ and L3$_{ss}$. Alternatively, the duplicate data may be provided as a single block exclusively for 3D playback or divided into three or more blocks exclusively for 3D playback. Furthermore, the block exclusively for 2D playback may be accessible as two or more extents in the file 2D.

In arrangement 3, the contiguous base-view data block L1 and the block exclusively for 2D playback (L2+L3)$_{2D}$ may belong to different files 2D. In this case, in the main path of the 2D playlist file, the CC is set to 5 or 6 between the PIs that specify the playback section in each file 2D. Furthermore, the two 3D extent blocks 7101 and 7102 may belong to different files SS. Accordingly, in the main path of the 3D playlist file, the CC is set to 5 or 6 between the PIs that specify the playback section in the file 2D that shares base-view data blocks with the files SS. On the other hand, in the sub-path of the 3D playlist file, the SP connection condition (CC) is set to 5 or 6 between the SUB_PIs that specify the playback section in the file DEP that shares dependent-view data blocks with the files SS.

[0-5] Arrangement 4

Figure 72A:
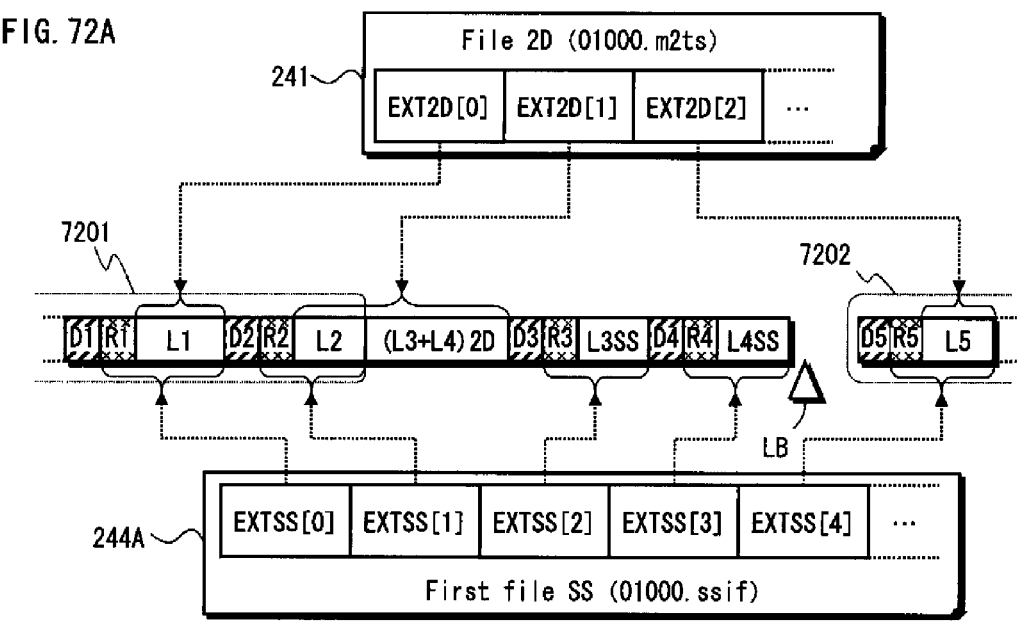
FIG. 72A is a schematic diagram showing a fourth example of a physical arrangement of data block groups recorded before and after a layer boundary LB on the BD-ROM disc 101 according to embodiment 1 of the present invention.

FIG. 72A is a schematic diagram showing a fourth example of a physical arrangement of data block groups recorded before and after a layer boundary LB on the BD-ROM disc 101. Hereinafter, this arrangement is referred to as "arrangement 4". As shown by comparing FIG. 72A with FIG. 70A, arrangement 4 differs from arrangement 2 in that a data block group in an interleaved arrangement that includes the blocks exclusively for 3D playback L3$_{ss}$ and L4$_{ss}$ is located immediately before the layer boundary LB. The other characteristics of arrangement 4 are the same as arrangement 2, and thus a detailed description thereof can be found in the description for arrangement 2.

Blocks exclusively for 3D playback L3$_{ss}$ and L4$_{ss}$, along with depth map data blocks D3 and D4 and right-view data blocks R3 and R4, are recorded in an interleaved arrangement between the end L2 of the first 3D extent block 7201 and the layer boundary LB. The content of each piece of stream data is continuous between the data blocks D2, R2, and L2 located at the end of the first 3D extent block 7201 and between the data blocks D5, R5, and L5 located at the top of the second 3D extent block 7202. The blocks exclusively for 3D playback L3$_{ss}$ and L4$_{ss}$ match the block exclusively for 2D playback (L3+L4)$_{2D}$ bit-for-bit.

The data blocks shown in FIG. 72A can be accessed as extents in either file 2D or file DEP, with the exception of the blocks exclusively for 3D playback L3$_{ss}$ and L4$_{ss}$. For example, the base-view data block L1 second from the end of the first 3D extent block 7201, the pair of the last base-view data block L2 in the first 3D extent block 7201 and the block exclusively for 2D playback (L3+L4)$_{2D}$, and the first base-view data block L5 in the second 3D extent block 7202 can respectively be accessed as individual 2D extents EXT2D[0], EXT2D[1], and EXT2D[2] in the file 2D 241.

For the data block groups shown in FIG. 72A, cross-linking of AV stream files is performed as follows. Each pair of contiguous right-view and base-view data blocks R1+L1, R2+L2, R3+L3$_{ss}$, R4+L4$_{ss}$, and R5+L5 in the 3D extent blocks 7201 and 7202 and the interleaved arrangement immediately before the layer boundary LB can be accessed respectively as individual 3D extents EXTSS[0], EXTSS[1], EXTSS[2], EXTSS[3], and EXTSS[4] in the first file SS 244A. In this case, with the exception of the two 3D extents EXTSS[2] and EXTSS[3] immediately before the layer boundary LB, the 3D extents EXTSS[0], EXTSS[1], and EXTSS[4] respectively share base-view data blocks L1, L2, and L5 with 2D extents EXT2D[0] EXT2D[1], and EXT2D [2]. On the other hand, the block exclusively for 2D playback (L3+L4)$_{2D}$ can be accessed as part of the 2D extent EXT2D [1]. Furthermore, the blocks exclusively for 3D playback L3$_{ss}$ and L4$_{ss}$ can be accessed as part of the 3D extents EXTSS[2] and EXTSS[3]

Figure 72B:
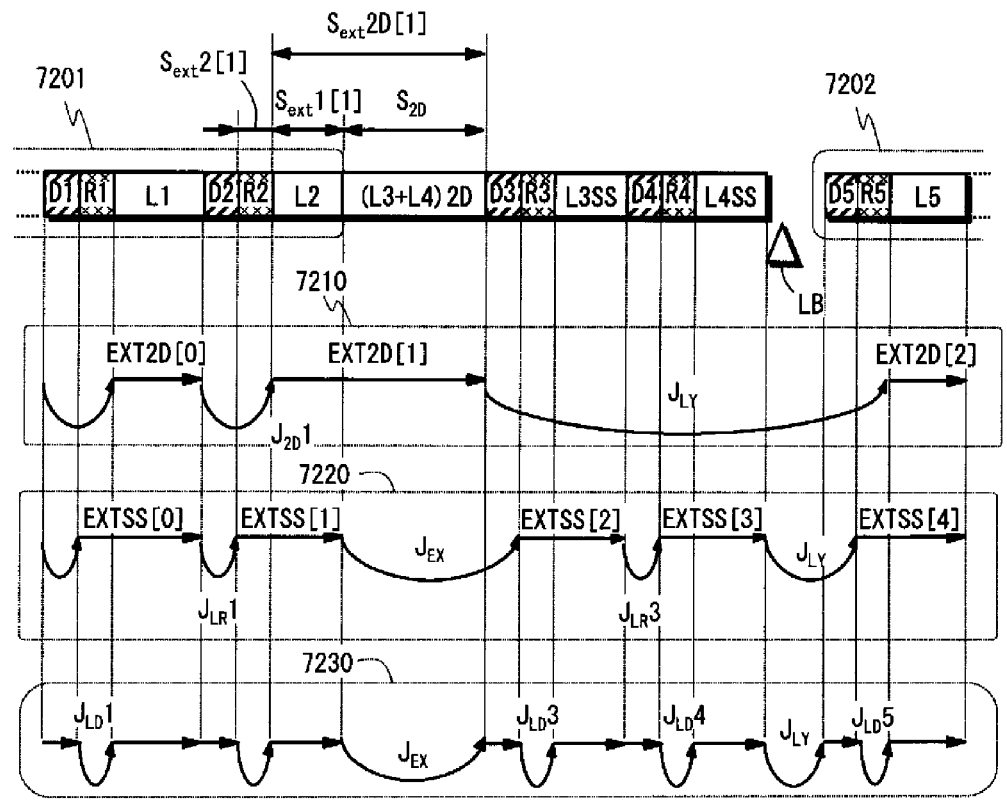
FIG. 72B is a schematic diagram showing a playback path 7210 in 2D playback mode, playback path 7220 in L/R mode, and a playback path 7230 in depth mode for the data block groups shown in FIG. 72A.

FIG. 72B is as schematic diagram showing a playback path 7210 in 2D playback mode, playback path 7220 in L/R mode, and a playback path 7230 in depth mode for the data block groups shown in FIG. 72A.

The playback device 102 in 2D playback mode plays back the file 2D 241. Accordingly, as shown by the playback path 7210 in 2D playback mode, first the base-view data block L1, which is second from the end of the first 3D extent block 7201, is read as the first 2D extent EXT2D[0], and reading of the immediately subsequent depth map data block D2 and right-view data block R2 is skipped by a first jump J$_{2D}$1. Next, a pair L2+(L3+L4)$_{2D}$ of the last base-view data block L2 in the first 3D extent block 7201 and the immediately subsequent block exclusively for 2D playback (L3+LA)$_{2D}$ is continuously read as the second 2D extent EXT2D[1]. A long jump J$_{LY}$ occurs immediately thereafter, and reading is skipped for the six data blocks D3, R3, L3$_{ss}$, D4, R4, and L4$_{ss}$ located immediately before the layer boundary LB, as well as the two data blocks D5 and R5 located at the top of the second 3D extent block 7202. Next, the first base-view data block L5 in the second 3D extent block 7202 is read as the third 2D extent EXT2D[2].

The playback device 102 in L/R mode plays back the first file SS 244A. Accordingly, as shown by the playback path 7220 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by a first jump J$_{LR}$1. Next, the second right-view data block R2 and the immediately subsequent base-view data block L2 are read continuously as the second 3D extent EXTSS[1], and reading of the immediately subsequent block exclusively for 2D playback (L3+L4)$_{2D}$ and the depth map data block D3 is skipped by a second jump J$_{EX}$. Subsequently, the right-view data block R3 and the immediately subsequent block exclusively for 3D playback L3$_{ss}$ are read continuously as the third 3D extent EXTSS[2], and reading of the immediately subsequent depth map data block D4 is skipped by a third jump J$_{LR}$3. Similarly, the next right-view data block R4 and the immediately subsequent block exclusively for 3D playback L4$_{ss}$ are read continuously as the fourth 3D extent EXTSS[3]. A long jump J$_{LY}$ occurs immediately thereafter, and reading of the first depth map data block D5 in the second 3D extent block 7202 is skipped. Furthermore, the next right-view data block R5 and the immediately subsequent base-view data block L5 are read continuously as the fifth 3D extent EXTSS[4].

As shown in FIG. 72B, in 2D playback mode, the block exclusively for 2D playback (L3+L4)$_{2D}$ is read, whereas reading of the blocks exclusively for 3D playback L3$_{ss}$ and L4$_{ss}$ is skipped. Conversely, in L/R mode, reading of the block exclusively for 2D playback (L3+L4)$_{2D}$ is skipped, whereas the blocks exclusively for 3D playback L3$_{ss}$ and L4$_{ss}$ are read. However, since the block exclusively for 2D playback (L3+ L4)$_{2D}$ matches the blocks exclusively for 3D playback L3$_{ss}$ and L4$_{ss}$ bit-for-bit, the left-view video frames that are played back are the same in both playback modes. In arrangement 4, the playback path 7210 in 2D playback mode and the playback path 7220 in L/R mode are divided immediately before the long jump J$_{LY}$ in this way. Accordingly, the size S$_{ext2D}$[1] of the 2D extent EXT2D[1] located immediately before the layer boundary LB and the size S$_{ext2}$[1] of the immediately preceding right-view data block R2 can be determined separately as follows. The same is also true for depth mode.

The size S$_{ext2D}$[1] of the 2D extent EXT2D[1] equals S$_{ext1}$[1]+S$_{2D}$, the sum of the size S$_{ext1}$[1] of the base-view data block L2 and the size S$_{2D}$ of the block exclusively for 2D playback $(L3+L4)_{2D}$. Accordingly, for seamless playback in 2D playback mode, this sum $S_{ext1}[1]+S_{2D}$ should first satisfy expression 1. Next, the number of sectors from the end of the block exclusively for 2D playback $(L3+L4)_{2D}$ to the first 2D extent EXT2D[2]=L5 in the second 3D extent block 7202 should be equal to or less than the maximum jump distance $S_{jump\_max}$ for the long jump $J_{LY}$ specified in accordance with the capabilities of the 2D playback device.

On the other hand, for seamless playback in L/R mode, the sizes $S_{ext2}[1]$ and $S_{ext1}[1]$ of the right-view data block R2 and base-view data block L2 located immediately before the block exclusively for 2D playback $(L3+L4)_{2D}$ should satisfy expressions 3 and 2. The value of the maximum jump time $T_{jump\_max}$ that is to be substituted into the right-hand side of these expressions as the jump time $T_{jump\text{-}3D}$ should correspond, as per the table in FIG. 57, to the number of sectors for the jump distance of the second jump $J_{EX}$ minus the size of the block exclusively for 2D playback $(L3+L4)_{2D}$. In other words, the sizes of the data blocks R2 and L2 substantially equal the minimum extent size calculated supposing that "the immediately subsequent block exclusively for 2D playback $(L3+L4)_{2D}$ is removed, and the depth map data block D3 follows thereafter". Next, the sizes of the right-view data block R3 and block exclusively for 3D playback $L3_{ss}$ located immediately after the block exclusively for 2D playback $(L3+L4)_{2D}$ should satisfy expressions 3 and 2. In this case, the jump time $T_{jump\text{-}3D}$ that should be substituted into the right-hand side of these expressions is the maximum jump time $T_{jump\_max}$ of the third jump $J_{LR}3$. However, rather than the size of the right-view data block R4, the size of the first right-view data block R5 in the second 3D extent block 7202 is substituted into the right-hand side of expression 2 as the size $S_{ext2}[n+1]$ of the next right-view extent. In other words, the sizes of the data blocks R3 and $L3_{ss}$ substantially equal the minimum extent size calculated supposing that "the second 3D extent block 7202 follows immediately thereafter". The sizes of the data blocks D4, R4, and $L4_{ss}$ located immediately before the layer boundary LB thus do not have to satisfy expressions 2-5. Furthermore, the number of sectors from the end of the block exclusively for 3D playback $L4_{ss}$ to the top of the next 3D extent EXTSS[4] should be equal to or less than the maximum jump distance $S_{jump\_max}$ for the long jump $J_{LY}$ specified in accordance with the capabilities of the 3D playback device.

Only the base-view data block L2 located at the front of the 2D extent EXT2D[1] is shared with the 3D extent EXTSS[1]. Accordingly, by appropriately enlarging the size $S_{2D}$ of the block exclusively for 2D playback $(L3+L4)_{2D}$, the size $S_{ext1}[1]$ of the base-view data block L2 can be further limited while keeping the size $S_{ext2D}[1]=S_{ext1}[1]+S_{2D}$ of the 2D extent EXT2D[1] constant. As a result, the size $S_{ext2}[1]$ of the right-view data block R2 can also be further limited.

Since the blocks exclusively for 3D playback $L3_{ss}$ and $L4_{ss}$ match the block exclusively for 2D playback $(L3+L4)_{2D}$ bit for bit, enlarging the size $S_{2D}$ of the block exclusively for 2D playback $(L3+L4)_{2D}$ enlarges the sizes of the right-view data blocks R3 and R4 respectively located immediately before the blocks exclusively for 3D playback $L3_{ss}$ and $L4_{ss}$. However, since there are two blocks exclusively for 3D playback $L3_{ss}$ and $L4_{ss}$ as compared to one block exclusively for 2D playback $(L3+L4)_{2D}$, the sizes of the right-view data blocks R3 and R4 can be made sufficiently smaller than the size of the right-view data block R2 located immediately before the layer boundary LB shown in FIG. 67A.

It is thus possible to set each data block in arrangement 4 to be a size at which seamless playback of video images during a long jump is possible in both 2D playback mode and L/R mode while keeping the read buffer capacity that is to be guaranteed in the playback device 102 to the minimum necessary. The same is also true for depth mode.

However, since the sizes of the data blocks D4, R4, and $L4_{ss}$ located immediately before the layer boundary LB in arrangement 4 do not satisfy expressions 2-5, the buffer margin amounts UL1 and UL2 to be maintained in the read buffers 4021 and 4022 are not evaluated via expressions 8 and 9, but rather as follows.

FIG. 73A is a graph showing changes in the data amount DA1 stored in the first read buffer 4021 during a read period of data blocks in accordance with the playback path 7220 in L/R mode shown in FIG. 72B. At the first time TA shown in FIG. 73A, reading of the last base-view data block L2 in the first 3D extent block 7201 starts. Afterwards, at the second time TB, reading of the first base-view data block L5 in the second 3D extent block 7202 starts. Expression 15 yields the maximum value DR1 of the data amount that can be read from the first read buffer 4021 from the first time TA until the second time TB.

$$DR1 = R_{max1} \times \left( \frac{T_{jump-EX} + 3 \times T_{jump-0} + T_{jump}[2] + T_{jump-LY} + S_{ext2}[2] + S_{ext2}[4]}{R_{ud-3D}} \right) \quad (15)$$

In this expression, the jump times $T_{jump\text{-}EX}$, $T_{jump}[2]$, and $T_{jump\text{-}LY}$ respectively represent the jump times for the second jump $J_{LR}2$, the third jump $J_{LR}3$, and the long jump $J_{LY}$. Furthermore, the sizes $S_{ext2}[2]$ and $S_{ext2}[4]$ of right-view extents respectively represent the sizes of the right-view data block R3 located immediately after the block exclusively for 2D playback $(L3+L4)_{2D}$ and the first right-view data block R5 in the second 3D extent block 7202. Note that for the purpose of seeking the maximum possible value of the necessary buffer margin amount, the sizes of the data blocks D4, R4, and $L4_{ss}$ located immediately before the layer boundary LB are assumed to be zero.

On the other hand, expression 16 yields the minimum value DI1 of the data amount that can be stored in the first read buffer 4021 from the first time TA until the second time TB.

$$DI1 = (R_{ud-3D} - R_{max1}) \times \frac{S_{ext1}[1] + S_{ext1}[2]}{R_{ud-3D}} \quad (16)$$

In this expression, the sizes $S_{ext1}[1]$ and $S_{ext1}[2]$ of base-view extents respectively represent the sizes of the last base-view data block L2 in the first 3D extent block 7201 and the block exclusively for 3D playback $L3_{ss}$ located immediately after the block exclusively for 2D playback $(L3+L4)_{2D}$.

To prevent underflow in the first read buffer 4021 during the long jump $J_{LY}$, the stored data amount DA1 should be equal to or greater than zero at the second time TB. Accordingly, the buffer margin amount UL1 should at least be the difference between the maximum value DR1 of the data amount that can be read from the first read buffer 4021 from the first time TA until the second time TB and the minimum value DI1 of the data amount that can be stored in the first read buffer 4021 in the same period. That is, the buffer margin amount UL1 is represented in expression 17.

$$UL1 \geq DR1 - DI1 = R_{max1} \times \begin{pmatrix} T_{jump-EX} + 3 \times T_{jump-0} + \\ T_{jump}[2] + T_{jump-LY} + \\ \dfrac{S_{ext2}[2] + S_{ext2}[4]}{R_{ud-3D}} \end{pmatrix} - \tag{17}$$

$$(R_{ud-3D} - R_{max1}) \times \dfrac{S_{ext1}[1] + S_{ext1}[2]}{R_{ud-3D}}$$

$$= R_{max1} \times \begin{pmatrix} T_{jump-EX} + T_{jump-0} - \\ T_{jump} + T_{jump-LY} \end{pmatrix} +$$

$$\left\{ R_{max1} \times \dfrac{\left(T_{jump} + \dfrac{S_{ext2}[2]}{R_{ud-3D}} + T_{jump-0}\right) -}{\dfrac{R_{ud-3D} - R_{max1}}{R_{ud-3D}} \times S_{ext1}[1]} \right\} +$$

$$\left\{ R_{max1} \times \dfrac{\left(T_{jump}[2] + \dfrac{S_{ext2}[4]}{R_{ud-3D}} + T_{jump-0}\right) -}{\dfrac{R_{ud-3D} - R_{max1}}{R_{ud-3D}} \times S_{ext1}[2]} \right\}$$

The jump time $T_{jump}$ in this expression equals the maximum jump time $T_{jump\_max}$, as per the table in FIG. 57, corresponding to the number of sectors of the jump distance for the second jump $J_{EX}$ minus the size of the block exclusively for 2D playback $(L3+L4)_{2D}$. In this case, since the sizes $S_{ext1}[1]$ and $S_{ext1}[2]$ of the base-view data blocks L2 and L3$_{ss}$ satisfy expression 2, the second and third terms in expression 16 are both equal to or less than zero. Therefore, the value of the buffer margin amount UL1 should at least satisfy expression 18.

$$UL1 = R_{max1} \times CEIL(T_{jump-EX} + T_{jump-LY} + T_{jump-0} - T_{jump}) \tag{18}$$

FIG. 73B is a graph showing changes in the data amount DA2 stored in the second read buffer 4022 during a read period of data blocks in accordance with the playback path 7220 in L/R mode shown in FIG. 72B. At the third time TC shown in FIG. 73B, reading of the last right-view data block R2 in the first 3D extent block 7201 starts. Afterwards, at the fourth time TD, reading of the first right-view data block R5 in the second 3D extent block 7202 starts.

The buffer margin amount UL2 should at least be the difference between the maximum value of the data amount that can be read from the second read buffer 4022 from the third time TC until the fourth time TD and the minimum value of the data amount that can be stored in the second read buffer 4022 in the same period. Accordingly, since the sizes of the right-view data blocks R2 and R3 satisfy expression 3, the value of the buffer margin amount UL2 should at least satisfy expression 19.

$$UL2 = R_{max2} \times CEIL(T_{jump-EX} + T_{jump-LY} + T_{jump-0} - T_{jump}) \tag{19}$$

In depth mode as well, for the same reasons the values of the buffer margin amounts UL1 and UL2 in the read buffers 4021 and 4022 should at least fulfill expressions 20 and 21.

$$UL1 = R_{max1} \times CEIL(T_{jump-EX} + T_{jump-LY} - T_{jump-0} + T_{jump}) \tag{20}$$

$$UL2 = R_{max3} \times CEIL(T_{jump-EX} + T_{jump-LY} - T_{jump-0} + T_{jump}) \tag{21}$$

In these expressions, the jump times $T_{jump-EX}$ and $T_{jump}$ respectively represent the jump times of the jump $J_{EX}$ to skip reading of the block exclusively for 2D playback $(L3+L4)_{2D}$ and the jump $J_{LD}3$ to skip reading of the right-view data block R4 located immediately before the layer boundary LB.

In arrangement 4, duplicate data of the block exclusively for 2D playback $(L3+L4)_{2D}$ is divided into two blocks exclusively for 3D playback L3$_{ss}$ and L4$_{ss}$. Alternatively, the duplicate data may be provided as a single block exclusively for 3D playback or divided into three or more blocks exclusively for 3D playback. Furthermore, the block exclusively for 2D playback may be accessible as two or more extents in the file 2D.

Figure 74:
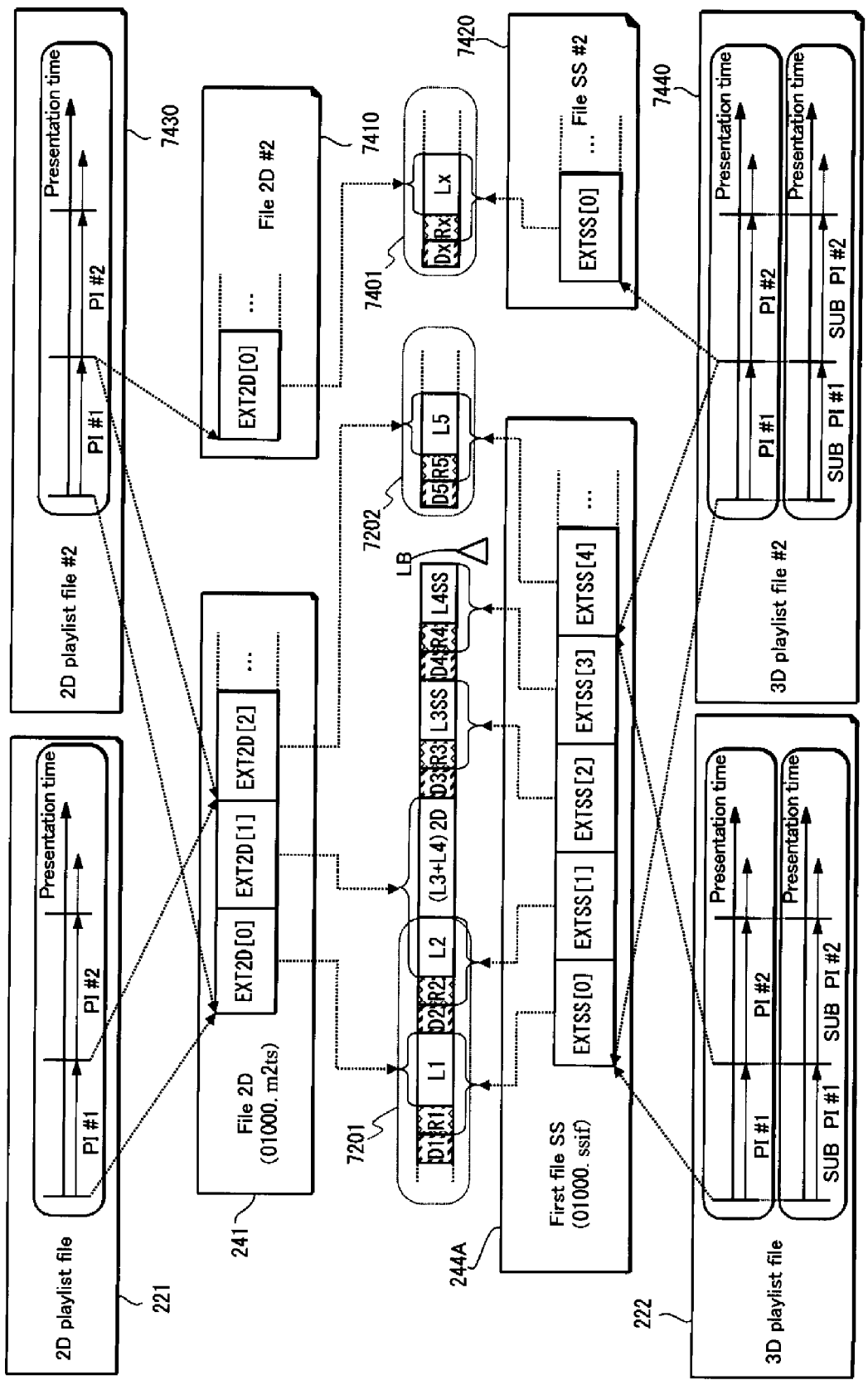
FIG. 74 is a schematic diagram showing a third 3D extent block 7401 that can be connected seamlessly to the first 3D extent block 7201 shown in FIG. 72A, the file 2D #2 7410 and the file SS #2 7420 that share the base-view data blocks therein, and playlist files 221, 222, 7430, and 7440 that define playback paths for each of the files 241, 244A, 7410, and 7420.

In arrangement 4, a third 3D extent block differing from the second 3D extent block 7202 may follow after the end of the first 3D extent block 7201. FIG. 74 is a schematic diagram showing a third 3D extent block 7401, the file 2D #2 7410 and the file SS #2 7420 that share the base-view data blocks therein, and playlist files 221, 222, 7430, and 7440 that define playback paths for each of the files 241, 244A, 7410, and 7420.

The first base-view data block Lx in the third 3D extent block 7401 is recorded at a distance from the end of the block exclusively for 2D playback $(L3+L4)_{2D}$ that is equal to or less than the maximum jump distance $S_{jump\_max}$ for the long jump $J_{LY}$ specified in accordance with the capabilities of the 2D playback device. Furthermore, the top of the third 3D extent block 7401 is recorded at a distance from the end of the first 3D extent block 7201 that is equal to or less than the maximum jump distance $S_{jump\_max}$ for the long jump $J_{LY}$ specified in accordance with the capabilities of the 3D playback device. The sizes of the two types of dependent-view data blocks Dx and Rx located at the top of the third 3D extent block 7401 are set, in expressions 4 and 2, so as to be compatible with the size of the block exclusively for 3D playback L3$_{ss}$ located immediately after the block exclusively for 2D playback $(L3+L4)_{2D}$.

In the main path of the 2D playlist file #2 7430, PI #1 specifies the playback section in the file 2D 241 corresponding to the first 3D extent block 7201. On the other hand, PI #2 specifies the playback section in the file 2D #2 7410 corresponding to the third 3D extent block 7401. Furthermore, a CC value of 5 or 6 is set in PI #2 with regards to PI #1. Accordingly, during playback of the 2D playlist file #2 7430, 2D video images are seamlessly played back from the third 3D extent block 7401 subsequently after the first 3D extent block 7201.

Similarly in the main path of the 3D playlist file #2 7440, the CC is set to 5 or 6 between the PIs that specify the playback section in each file 2D. On the other hand, in the sub-path of the 3D playlist file #2, the SUB_PI #1 and #2 respectively specify playback sections in the file DEP that shares dependent-view data blocks with each file SS. Furthermore, the SPCC is set to 5 or 6 between these SUB_PIs. Accordingly, during playback of the 3D playlist file #2 7440, 3D video images are seamlessly played back from the third 3D extent block 7401 subsequently after the first 3D extent block 7201.

[0-6] Arrangement 5

Figure 75A:
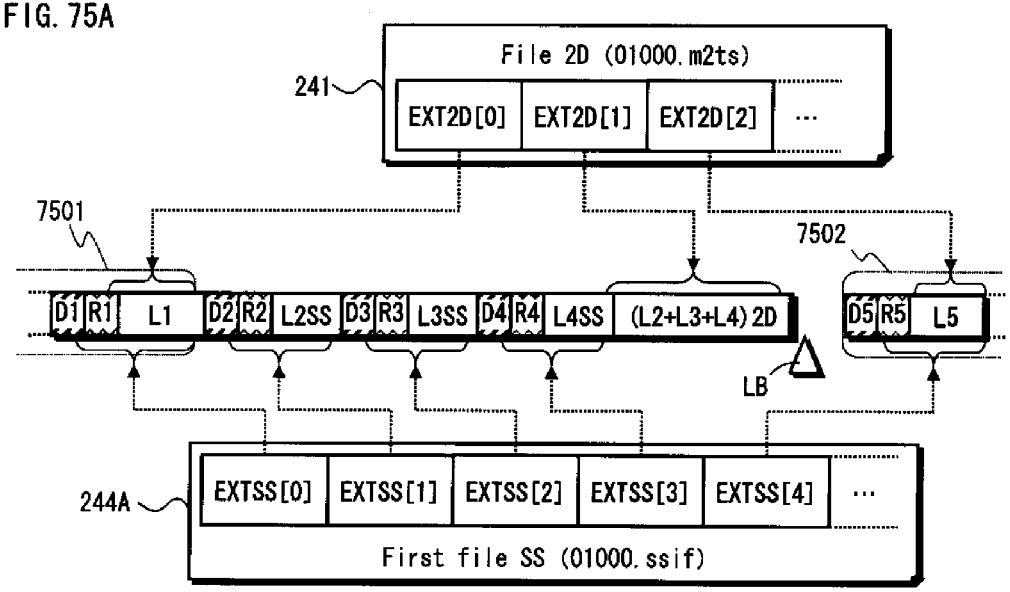
FIG. 75A is a schematic diagram showing a fifth example of a physical arrangement of data block groups recorded before and after a layer boundary LB on the BD-ROM disc 101 according to embodiment 1 of the present invention.

FIG. 75A is a schematic diagram showing a fifth example of a physical arrangement of data block groups recorded before and after a layer boundary LB on the BD-ROM disc 101. Hereinafter, this arrangement is referred to as "arrangement 5". As shown by comparing FIG. 75A with FIG. 71A, arrangement 5 differs from arrangement 3 in that a data block group in an interleaved arrangement that includes the blocks exclusively for 3D playback L2$_{ss}$, L3$_{ss}$, and L4$_{ss}$ is located immediately before the block exclusively for 2D playback $(L2+L3+L4)_{2D}$. The other characteristics of arrangement 5 are the same as arrangement 3, and thus a detailed description thereof can be found in the description for arrangement 3.

Blocks exclusively for 3D playback L2$_{ss}$, L3$_{ss}$, and L4$_{ss}$, along with depth map data blocks D2, D3, and D4 and right-view data blocks R2, R3, and R4, are recorded in an interleaved arrangement immediately after the end L1 of the first 3D extent block 7501. The content of each piece of stream data is continuous between the data blocks D2, R2, and L2 located at the end of the first 3D extent block 7501 and between the data blocks D5, R5, and L5 located at the top of the second 3D extent block 7502. A block exclusively for 2D playback $(L2+L3+L4)_{2D}$ is recorded between the block exclusively for 3D playback $L4_{ss}$ and the layer boundary LB. The blocks exclusively for 3D playback $L2_{ss}$, $L3_{ss}$, and $L4_{ss}$ match the block exclusively for 2D playback $(L2+L3+L4)_{2D}$ bit-for-bit.

The data blocks shown in FIG. 75A can be accessed as extents in either file 2D or file DEP, with the exception of the blocks exclusively for 3D playback $L2_{ss}$, $L3_{ss}$, and $L4_{ss}$. For example, the last base-view data block L1 in the first 3D extent block 7501, the block exclusively for 2D playback $(L2+L3+L4)_{2D}$, and the first base-view data block L5 in the second 3D extent block 7502 can respectively be accessed as individual 2D extents EXT2D[0], EXT2D[1], and EXT2D[2] in the file 2D 241.

For the data block groups shown in FIG. 75A, cross-linking of AV stream files is performed as follows. Each pair of contiguous right-view and base-view data blocks R1+L1, R2+L2$_{ss}$, R3+L3$_{ss}$, R4+L4$_{ss}$, and R5+L5 in the 3D extent blocks 7501 and 7502 and the interleaved arrangement immediately before the layer boundary LB can be accessed respectively as individual 3D extents EXTSS[0], EXTSS[1], EXTSS[2], EXTSS[3], and EXTSS[4] in the first file SS 244A. In this case, with the exception of the 3D extents EXTSS[1], EXTSS[2], and EXTSS[3] that include the blocks exclusively for 3D playback $L2_{ss}$, $L3_{ss}$, and $L4_{ss}$, the 3D extents EXTSS[0] and EXTSS[4] respectively share base-view data blocks L1 and L5 with 2D extents EXT2D[0] and EXT2D[2]. On the other hand, the block exclusively for 2D playback $(L2+L3+L4)_{2D}$ can be accessed as part of the 2D extent EXT2D[1]. Furthermore, the blocks exclusively for 3D playback $L2_{ss}$, $L3_{ss}$, and $L4_{ss}$ can be accessed as part of the 3D extents EXTSS[1], EXTSS[2], and EXTSS[3].

Figure 75B:
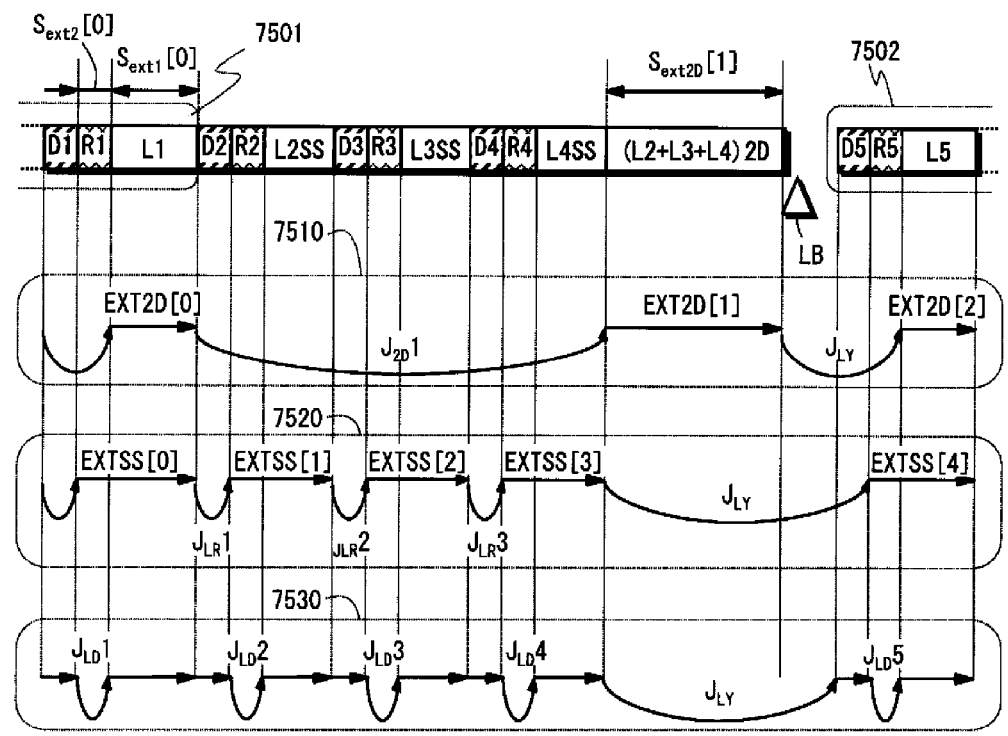
FIG. 75B is a schematic diagram showing a playback path 7510 in 2D playback mode, playback path 7520 in L/R mode, and a playback path 7530 in depth mode for the data block groups shown in FIG. 75A.

FIG. 75B is a schematic diagram showing a playback path 7510 in 2D playback mode, playback path 7520 in L/R mode, and a playback path 7530 in depth mode for the data block groups shown in FIG. 75A.

The playback device 102 in 2D playback mode plays back the file 2D 241. Accordingly, as shown by the playback path 7510 in 2D playback mode, the last base-view data block L1 in the first 3D extent block 7501 is read as the first 2D extent EXT2D[0], and reading of the immediately subsequent nine data blocks D2, R2, L2$_{ss}$, D3, R3, L3$_{ss}$, D4, R4, and L4$_{ss}$ is skipped by a jump $J_{2D}1$. Next, the block exclusively for 2D playback $(L2+L3+L4)_{2D}$ immediately before the layer boundary LB is read as the second 2D extent EXT2D[1]. A long jump $J_{LY}$ occurs immediately thereafter, and reading of the two data blocks D5 and R5 located at the top of the second 3D extent block 7502 is skipped. Subsequently, the first base-view data block L5 in the second 3D extent block 7502 is read as the third 2D extent EXT2D[2].

The playback device 102 in L/R mode plays back the first file SS 244A. Accordingly, as shown by the playback path 7520 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by a first jump $J_{LR}1$. Next, the second right-view data block R2 and the immediately subsequent block exclusively for 3D playback $L2_{ss}$ are read continuously as the second 3D extent EXTSS[1], and reading of the immediately subsequent depth map data block D3 is skipped by a second jump $J_{LR}2$. Subsequently, the right-view data block R3 and the immediately subsequent block exclusively for 3D playback $L3_{ss}$ are read continuously as the third 3D extent EXTSS[1], and reading of the immediately subsequent depth map data block D4 is skipped by a third jump $J_{LR}3$. Similarly, the right-view data block R4 and the immediately subsequent block exclusively for 3D playback $L4_{ss}$ are read continuously as the fourth 3D extent EXTSS[3]. Along jump $J_{LY}$ occurs immediately thereafter, and reading of the immediately subsequent block exclusively for 2D playback $(L2+L3+L4)_{2D}$ and of the first depth map data block D5 in the second 3D extent block 7502 is skipped. Furthermore, the next right-view data block R5 and the immediately subsequent base-view data block L5 are read continuously as the fifth 3D extent EXTSS[4].

As shown in FIG. 75B, in 2D playback mode, the block exclusively for 2D playback $(L2+L3+L4)_{2D}$ is read, whereas reading of the blocks exclusively for 3D playback $L2_{ss}$, $L3_{ss}$, and $L4_{ss}$ is skipped. Conversely, in L/R mode, reading of the block exclusively for 2D playback $(L2+L3+L4)_{2D}$ is skipped, whereas the blocks exclusively for 3D playback $L2_{ss}$, $L3_{ss}$, and $L4_{ss}$ are read. However, since the block exclusively for 2D playback $(L2+L3+L4)_{2D}$ matches the blocks exclusively for 3D playback $L2_{ss}$, $L3_{ss}$, and $L4_{ss}$ bit-for-bit, the left-view video frames that are played back are the same in both playback modes. In arrangement 5, the playback path 7510 in 2D playback mode and the playback path 7520 in L/R mode are divided immediately before the long jump $J_{LY}$ in this way. Accordingly, the size of the block exclusively for 2D playback $(L2+L3+L4)_{2D}$, i.e. the size $S_{ext2D}[1]$ of the 2D extent EXT2D[1], and the size $S_{ext2}[0]$ of the last right-view data block R1 in the first 3D extent block 7501 can be determined separately as follows. The same is also true for depth mode.

The block exclusively for 2D playback $(L2+L3+L4)_{2D}$ and the last base-view data block L1 in the first 3D extent block 7501 belong to different 2D extents EXT2D[0] and EXT2D[1]. Accordingly, for seamless playback in 2D playback mode, the size $S_{ext2D}[1]$ of the block exclusively for 2D playback $(L2+L3+L4)_{2D}$ should satisfy expression 1. Next, the number of sectors from the end of the block exclusively for 2D playback $(L2+L3+L4)_{2D}$ to the first 2D extent EXT2D[2]=L5 in the second 3D extent block 7502 should be equal to or less than the maximum jump distance $S_{jump\_max}$ for the long jump $J_{LY}$ specified in accordance with the capabilities of the 2D playback device. Furthermore, the size $S_{ext2D}[0]$ of the base-view data block L1 should fulfill expression 1. The maximum jump time $T_{jump\_max}$ for the jump $J_{2D}1$ should be substituted into the right-hand side of this expression as the jump time $T_{jump-2D}$.

On the other hand, for seamless playback in L/R mode, the sizes $S_{ext2}[0]$ and $S_{ext1}[0]$ of the last right-view data block R1 and base-view data block L1 in the first 3D extent block 7501 should satisfy expressions 3 and 2. The maximum jump time $T_{jump\_max}$ for the first jump $J_{LR}1$ should be substituted into the right-hand side of these expressions as the jump time $T_{jump-3D}$. Next, the sizes of the data blocks R2, L2$_{ss}$, R3, and L3$_{ss}$ located immediately after the first 3D extent block 7501 should satisfy expressions 3 and 2. However, with regards to the size of the block exclusively for 3D playback L3$_{ss}$ located last among these blocks, rather than the size of the right-view data block R4 located immediately after the block exclusively for 3D playback L3$_{ss}$, the size of the first right-view data block R5 in the second 3D extent block 7502 is substituted into the right-hand side of expression 2 as the size $S_{ext2}[n+1]$ of the next right-view extent. In other words, the sizes of the data blocks R3 and L3$_{ss}$ substantially equal the minimum extent size calculated supposing that "the second 3D extent block 7502 follows immediately thereafter". The sizes of the data blocks D4, R4, and L4$_{ss}$ located immediately before the layer boundary LB thus do not have to satisfy expressions 2-5.

Furthermore, the number of sectors from the end of the block exclusively for 3D playback $L4_{ss}$ to the top of the next 3D extent EXTSS[4] should be equal to or less than the maximum jump distance $S_{jump\_max}$ for the long jump $J_{LY}$ specified in accordance with the capabilities of the 3D playback device.

As in the above description, the size of the last base-view data block L1 in the first 3D extent block 7501 can be set independently of the size of the block exclusively for 2D playback $(L2+L3+L4)_{2D}$. Accordingly, the size $S_{ext1}[0]$ of the base-view data block L1 can be further limited while keeping the size $S_{ext2D}[1]$ of the block exclusively for 2D playback $(L2+L3+L4)_{2D}$ constant. As a result, the size $S_{ext2}[0]$ of the right-view data block R1 can also be further limited.

Since the entirety of the blocks exclusively for 3D playback $L2_{ss}+L3_{ss}+L4_{ss}$ match the block exclusively for 2D playback $(L2+L3+L4)_{2D}$ bit for bit, enlarging the size of the block exclusively for 2D playback $(L2+L3+L4)_{2D}$ enlarges the sizes of the right-view data blocks R2, R3, and R4 respectively located immediately before the blocks exclusively for 3D playback $L2_{ss}$, $L3_{ss}$, and $L4_{ss}$. However, since there are three blocks exclusively for 3D playback $L2_{ss}$, $L3_{ss}$, and $L4_{ss}$ as compared to one block exclusively for 2D playback $(L2+L3+L4)_{2D}$, the sizes of the right-view data blocks R2, R3, and R4 can be made sufficiently smaller than the size of the right-view data block R2 located immediately before the layer boundary LB shown in FIG. 67A.

It is thus possible to set each data block in arrangement 5 to be a size at which seamless playback of video images during a long jump is possible in both 2D playback mode and L/R mode while keeping the read buffer capacity that is to be guaranteed in the playback device 102 to the minimum necessary. The same is also true for depth mode.

However, for seamless playback of 2D video images from the data block groups in arrangement 5, the number of sectors from the base-view data block L1 located at the end of the first 3D extent block 7501 to the top of the block exclusively for 2D playback $(L2+L3+L4)_{2D}$ has to be kept equal to or less than the maximum jump distance $S_{jump\_max}$ for the jump $J_{2D}1$ specified in accordance with the capabilities of the 2D playback device. The size of the right-view data block R1 located immediately before the base-view data block L1 thus has to be kept small. If this condition is not met, then instead of arrangement 5, another arrangement such as arrangement 4 should be used. As is clear from expression 1, the minimum extent size of 2D extents depends on the system rate for the file 2D, which equals 188/192 times the maximum value $R_{max2D}$ of the mean transfer rate $R_{ext2D}$. Accordingly, during the authoring process of the file 2D, the above condition may be determined to be met when the system rate is equal to or less than a predetermined threshold.

Furthermore, since the sizes of the data blocks D4, R4, and $L4_{ss}$ located immediately before the layer boundary LB in arrangement 5 do not satisfy expressions 2-5, the buffer margin amounts UL1 and UL2 to be maintained in the read buffers 4021 and 4022 are not evaluated via expressions 8 and 9, but rather as follows.

FIG. 76A is a graph showing changes in the data amount DA1 stored in the first read buffer 4021 during a read period of data blocks in accordance with the playback path 7520 in L/R mode shown in FIG. 75B. At the first time TE shown in FIG. 76A, reading of the second block exclusively for 3D playback $L3_{ss}$ starts. Afterwards, at the second time TE reading of the first base-view data block L5 in the second 3D extent block 7502 starts. Expression 22 yields the maximum value DR1 of the data amount that can be read from the first read buffer 4021 from the first time TE until the second time TF.

$$DR1 = R_{max1} \times \left( T_{jump} + 2 \times T_{jump-0} + T_{jump-LY} + \frac{S_{ext2}[4]}{R_{ud-3D}} \right) \quad (22)$$

In this expression, the jump times $T_{jump}$ and $T_{jump-LY}$ respectively represent the jump times for the third jump $J_{LR}3$ and the long jump $L_{LY}$. Furthermore, the size $S_{ext2}[4]$ of the right-view extent represents the size of the first right-view data block R5 in the second 3D extent block 7502. Note that for the purpose of seeking the maximum possible value of the necessary buffer margin amount, the sizes of the data blocks D4, R4, and $L4_{ss}$ located immediately before the layer boundary LB are assumed to be zero.

On the other hand, expression 23 yields the minimum value DI1 of the data amount that can be stored in the first read buffer 4021 from the first time TE until the second time TF.

$$DI1 = (R_{ud-3D} - R_{max1}) \times \frac{S_{ext1}[2]}{R_{ud-3D}} \quad (23)$$

In this expression, the size $S_{ext1}[2]$ of the base-view extent represents the size of the second block exclusively for 3D playback $L3_{ss}$.

To prevent underflow in the first read buffer 4021 during the long jump $J_{LY}$, the stored data amount DA1 should be equal to or greater than zero at the second time TF. Accordingly, the buffer margin amount UL1 should at least be the difference between the maximum value DR1 of the data amount that can be read from the first read buffer 4021 from the first time TE until the second time TF and the minimum value DI1 of the data amount that can be stored in the first read buffer 4021 in the same period. That is, the buffer margin amount UL1 is represented in expression 24.

$$\begin{aligned} UL1 \geq DR1 - DI1 &= R_{max1} \times \begin{pmatrix} T_{jump} + 2 \times T_{jump-0} + \\ T_{jump-LY} + \frac{S_{ext2}[4]}{R_{ud-3D}} \end{pmatrix} - \\ & (R_{ud-3D} - R_{max1}) \times \frac{S_{ext1}[2]}{R_{ud-3D}} \\ &= R_{max1} \times (T_{jump-0} + T_{jump-LY}) + \\ & \left\{ R_{max1} \times \frac{\left( T_{jump} + \frac{S_{ext2}[4]}{R_{ud-3D}} + T_{jump-0} \right) -}{\frac{R_{ud-3D} - R_{max1}}{R_{ud-3D}} \times S_{ext1}[2]} \right\} \end{aligned} \quad (24)$$

In this case, since the size $S_{ext1}[2]$ of the second block exclusively for 3D playback $L3_{ss}$ satisfies expression 2, the second term in expression 24 is equal to or less than zero. Therefore, the value of the buffer margin amount UL1 should at least satisfy expression 25.

$$UL1 = R_{max1} \times CEIL(T_{jump-LY} + T_{jump-0}) \quad (25)$$

FIG. 76B is a graph showing changes in the data amount DA2 stored in the second read buffer 4022 during a read period of data blocks in accordance with the playback path 7520 in L/R mode shown in FIG. 75B. At the third time TG shown in FIG. 76B, reading of the right-view data block R3 located immediately before the second block exclusively for 3D playback $L3_{ss}$ starts. Afterwards, at the fourth time TH, reading of the first right-view data block R5 in the second 3D extent block 7502 starts.

The buffer margin amount UL2 should at least be the difference between the maximum value of the data amount that can be read from the second read buffer 4022 from the third time TG until the fourth time TH and the minimum value of the data amount that can be stored in the second read buffer 4022 in the same period. Accordingly, since the size of the right-view data block R3 satisfies expression 3, the value of the buffer margin amount UL2 should at least satisfy expression 26.

$$UL2 = R_{max2} \times CEIL(T_{jump-LY} + T_{jump-0}) \quad (26)$$

In depth mode as well, for the same reasons the values of the buffer margin amounts UL1 and UL2 in the read buffers 4021 and 4022 should at least fulfill expressions 27 and 28.

$$UL1 = R_{max1} \times CEIL(T_{jump-LY} + T_{jump}) \quad (27)$$

$$UL2 = R_{max3} \times CEIL(T_{jump-LY} + T_{jump}) \quad (28)$$

In these expressions, the jump time $T_{jump}$ represents the jump time of the jump $J_{LD}3$ to skip reading of the right-view data block R4 located immediately before the layer boundary LB.

As can be seen by comparing expressions 25 and 26 with expressions 19 and 20, the buffer margin amounts UL1 and UL2 in L/R mode are smaller in arrangement 5 than in arrangement 4. Accordingly, as is clear from expressions 12-14 in modification [N], it is possible to reduce the minimum capacity of the read buffers 4021 and 4022 in L/R mode.

In arrangement 5, duplicate data of the block exclusively for 2D playback $(L2+L3+L4)_{2D}$ is divided into three blocks exclusively for 3D playback $L2_{ss}$, $L3_{ss}$, and $L4_{ss}$. Alternatively, the duplicate data may be provided as a single block exclusively for 3D playback or divided into four or more blocks exclusively for 3D playback. Furthermore, the block exclusively for 2D playback may be accessible as two or more extents in the file 2D.

In arrangement 5, the base-view data blocks in the 3D extent block 7501 may belong to a different file 2D than the base-view data blocks in the 3D extent block 7502. In this case, in the main path of the 2D playlist file, the CC is set to 5 or 6 between the PIs that specify the playback section in each file 2D. Furthermore, the two 3D extent blocks 7501 and 7502 belong to different files SS. Accordingly, in the main path of the 3D playlist file, the CC is set to 5 or 6 between the PIs that specify the playback section in the file 2D that shares base-view data blocks with the files SS. On the other hand, in the sub-path of the 3D playlist file, the SP connection condition (CC) is set to 5 or 6 between the SUB_PIs that specify the playback section in the file DEP that shares dependent-view data blocks with the files SS.

[0-7] Arrangement 6

Figure 77A:
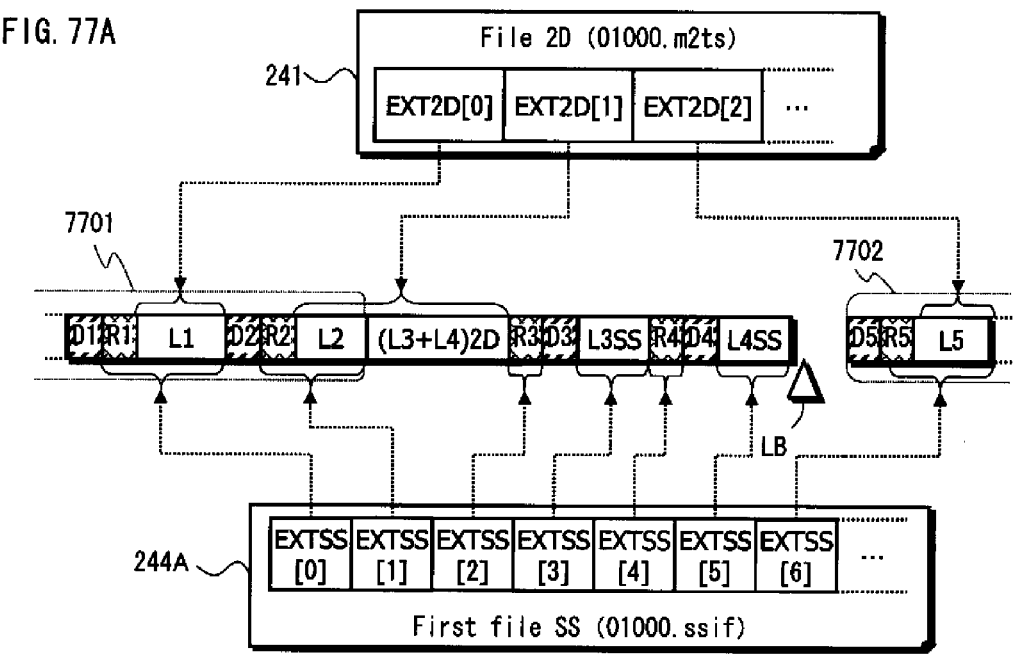
FIG. 77A is a schematic diagram showing a sixth example of a physical arrangement of data block groups recorded before and after a layer boundary LB on the BD-ROM disc 101 according to embodiment 1 of the present invention.

FIG. 77A is a schematic diagram showing a sixth example of a physical arrangement of data block groups recorded before and after a layer boundary LB on the BD-ROM disc 101. Hereinafter, this arrangement is referred to as "arrangement 6". As shown by comparing FIG. 77A with FIG. 72A, arrangement 6 differs from arrangement 4 in that, in the pairs of a right-view data block and a depth map data block R3+D3 and R4+D4, respectively located immediately before the blocks exclusively for 3D playback $L3_{ss}$ and $L4_{ss}$, the right-view data blocks and depth map data blocks are in reverse order. The other characteristics of arrangement 6 are the same as arrangement 4, and thus a detailed description thereof can be found in the description for arrangement 4.

For the data block groups shown in FIG. 77A, cross-linking of AV stream files is performed as follows. Each pair of contiguous right-view and base-view data blocks R1+L1, R2+L2, and R5+L5 in the 3D extent blocks 7701 and 7702 can be accessed respectively as individual 3D extents EXTSS [0], EXTSS[1], and EXTSS[6] in the first file SS 244A. In this case, the 3D extents EXTSS[0], EXTSS[1], and EXTSS[6] respectively share the base-view data blocks L1, L2, and L5 with the 2D extents EXT2D[0], EXT2D[1], and EXT2D[2]. On the other hand, the right-view data blocks R3 and R4 and the blocks exclusively for 3D playback $L3_{ss}$ and $L4_{ss}$, located within the interleaved arrangement immediately before the layer boundary LB, can respectively be accessed as individual 3D extents EXTSS[2], EXTSS[3], EXTSS[4], and EXTSS [5] in the first file SS 244A. Furthermore, the block exclusively for 2D playback $(L3+L4)_{2D}$ can be accessed as an individual 2D extent EXT2D[1].

Figure 77B:
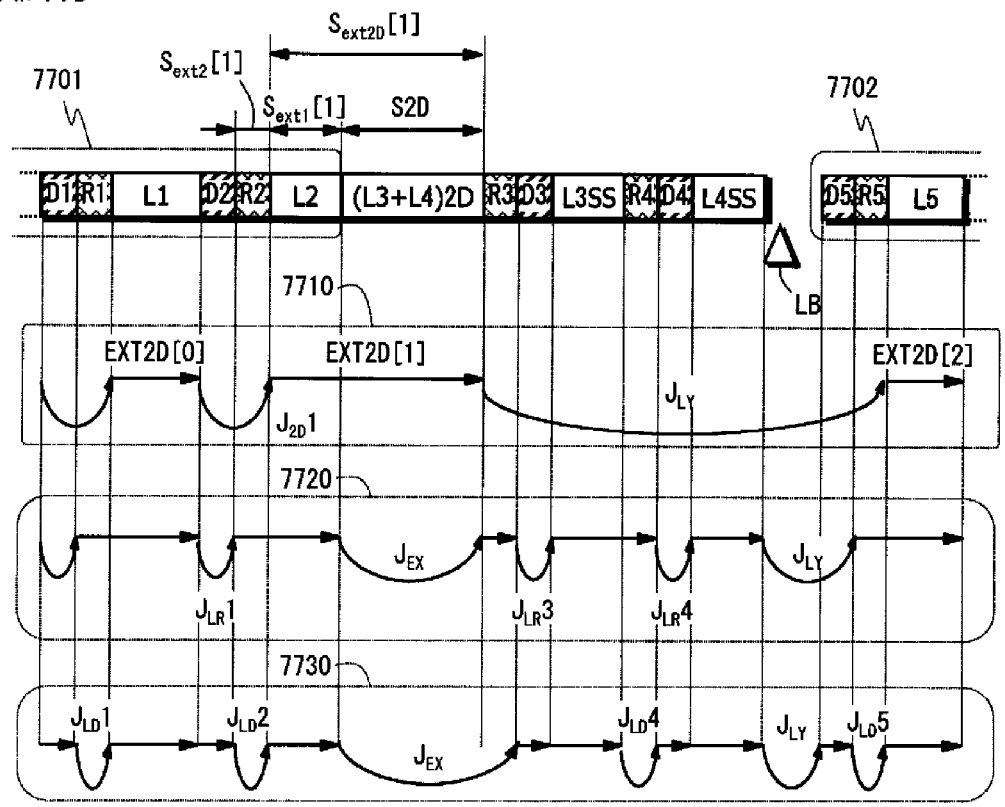
FIG. 77B is a schematic diagram showing a playback path 7710 in 2D playback mode, playback path 7720 in L/R mode, and a playback path 7730 in depth mode for the data block, groups shown in FIG. 77A.

FIG. 77B is a schematic diagram showing a playback path 7710 in 2D playback mode, playback path 7720 in L/R mode, and a playback path 7730 in depth mode for the data block groups shown in FIG. 77A.

The playback device 102 in 2D playback mode plays back the file 2D 241. Accordingly, as shown by the playback path 7710 in 2D playback mode, first the base-view data block L1, which is second from the end of the first 3D extent block 7701, is read as the first 2D extent EXT2D[0], and reading of the immediately subsequent depth map data block D2 and right-view data block R2 is skipped by a first jump $J_{2D}1$. Next, a pair $L2+(L3+L4)_{2D}$ of the last base-view data block L2 in the first 3D extent block 7701 and the immediately subsequent block exclusively for 2D playback $(L3+L4)_{2D}$ is continuously read as the second 2D extent EXT2D[1]. A long jump $J_{LY}$ occurs immediately thereafter, and reading is skipped for the six data blocks R3, D3, $L3_{ss}$, R4, D4, and $L4_{ss}$ located immediately before the layer boundary LB, as well as the two data blocks D5 and R5 located at the top of the second 3D extent block 7702. Next, the first base-view data block L5 in the second 3D extent block 7702 is read as the third 2D extent EXT2D[2].

The playback device 102 in L/R mode plays back the first file SS 244A. Accordingly, as shown by the playback path 7720 in L/R mode, first a pair R1+L1 of the top right-view data block R1 and the immediately subsequent base-view data block L1 is read continuously as the first 3D extent EXTSS[0], and reading of the immediately subsequent depth map data block D2 is skipped by a first jump $J_{LR}1$. Next, the second right-view data block R2 and the immediately subsequent base-view data block L2 are read continuously as the second 3D extent EXTSS[1], and reading of the immediately subsequent block exclusively for 2D playback $(L3+L4)_{2D}$ is skipped by a second jump $J_{EX}$. Subsequently, the right-view data block R3 is read as the third 3D extent EXTSS[2], and reading of the immediately subsequent depth map data block D3 is skipped by a third jump $J_{LR}3$. Furthermore, the immediately subsequent block exclusively for 3D playback $L3_{ss}$ is read as the fourth 3D extent EXTSS[3], and the next right-view data block R4 is read as the fifth 3D extent EXTSS[4]. Reading of the immediately subsequent depth map data block D4 is skipped by a fourth jump $J_{LR}4$. The immediately subsequent block exclusively for 3D playback $L4_{ss}$ is read as the sixth 3D extent EXTSS[5]. A long jump $J_{LY}$ occurs immediately thereafter, and reading of the first depth map data block D5 in the second 3D extent block 7702 is skipped. Furthermore, the next right-view data block R5 and the immediately subsequent base-view data block L5 are read continuously as the seventh 3D extent EXTSS[6].

As shown in FIG. 77B, the playback path 7710 in 2D playback mode and the playback path 7720 in L/R mode are divided immediately before the long jump $J_{LY}$ in arrangement 6 in the same way as in arrangement 4. Accordingly, the size $S_{ext2D}[1]$ of the 2D extent EXT2D[1] located immediately before the layer boundary LB and the size $S_{ext2}[1]$ of the immediately preceding right-view data block R2 can be determined separately as follows. The same is also true for depth mode.

The size $S_{ext2D}[1]$ of the 2D extent EXT2D[1] equals $S_{ext1}[1]+S_{2D}$, the sum of the size $S_{ext1}[1]$ of the base-view data block L2 and the size $S_{2D}$ of the block exclusively for 2D playback $(L3+L4)_{2D}$. Accordingly, for seamless playback in 2D playback mode, this sum $S_{ext1}[1]+S_{2D}$ should first satisfy expression 1. Next, the number of sectors from the end of the block exclusively for 2D playback $(L3+L4)_{2D}$ to the first 2D extent EXT2D[2]=L5 in the second 3D extent block 7702 should be equal to or less than the maximum jump distance $S_{jump\_max}$ for the long jump $J_{LY}$ specified in accordance with the capabilities of the 2D playback device.

On the other hand, for seamless playback in L/R mode, the sizes $S_{ext2}[1]$ and $S_{ext1}[1]$ of the right-view data block R2 and base-view data block L2 located immediately before the block exclusively for 2D playback $(L3+L4)_{2D}$ should satisfy expressions 3 and 2. The zero sector transition time $T_{jump-0}$ should be substituted into the right-hand side of these expressions as the jump time $T_{jump-3D}$. In other words, the sizes of the data blocks R2 and L2 substantially equal the minimum extent size calculated supposing that "the immediately subsequent block exclusively for 2D playback $(L3+L4)_{2D}$ is removed, and the right-view data block R3 follows thereafter". Next, the sizes of the right-view data block R3 and block exclusively for 3D playback $L3_{ss}$ located immediately after the block exclusively for 2D playback $(L3+L4)_{2D}$ should satisfy expressions 5 and 4, replacing the depth-map data block in these expressions with the right-view data block. However, rather than the size of the right-view data block R4, the size of the first right-view data block R5 in the second 3D extent block 7702 is substituted into the right-hand side of expression 4 as the size $S_{ext2}[n+1]$ of the next right-view extent. In other words, the sizes of the data blocks R3 and $L3_{ss}$ substantially equal the minimum extent size calculated supposing that "the second 3D extent block 7702 follows immediately thereafter". The sizes of the data blocks R4, D4, and $L4_{ss}$ located immediately before the layer boundary LB thus do not have to satisfy expressions 2-5. Furthermore, the number of sectors from the end of the block exclusively for 3D playback $L4_{ss}$ to the top of the next 3D extent EXTSS[4] should be equal to or less than the maximum jump distance $S_{jump\_max}$ for the long jump $J_{LY}$ specified in accordance with the capabilities of the 3D playback device.

Only the base-view data block L2 located at the front of the 2D extent EXT2D[1] is shared with the 3D extent EXTSS[1]. Accordingly, by appropriately enlarging the size $S_{2D}$ of the block exclusively for 2D playback $(L3+L4)_{2D}$, the size $S_{ext1}[1]$ of the base-view data block L2 can be further limited while keeping the size $S_{ext2D}[1]=S_{ext1}[1]+S_{2D}$ of the 2D extent EXT2D[1] constant. As a result, the size $S_{ext2}[1]$ of the right-view data block R2 can also be further limited.

Since the blocks exclusively for 3D playback $L3_{ss}$ and $L4_{ss}$ match the block exclusively for 2D playback $(L3+L4)_{2D}$ bit for bit, enlarging the size $S_{2D}$ of the block exclusively for 2D playback $(L3+L4)_{2D}$ enlarges the sizes of the right-view data blocks R3 and R4 respectively located immediately before the blocks exclusively for 3D playback $L3_{ss}$ and $L4_{ss}$. However, since there are two blocks exclusively for 3D playback $L3_{ss}$ and $L4_{ss}$ as compared to one block exclusively for 2D playback $(L3+L4)_{2D}$, the sizes of the right-view data blocks R3 and R4 can be made sufficiently smaller than the size of the right-view data block R2 located immediately before the layer boundary LB shown in FIG. 67A.

It is thus possible to set each data block in arrangement 6 to be a size at which seamless playback of video images during a long jump is possible in both 2D playback mode and L/R mode while keeping the read buffer capacity that is to be guaranteed in the playback device 102 to the minimum necessary. The same is also true for depth mode.

However, since the sizes of the data blocks R4, D4, and $L4_{ss}$ located immediately before the layer boundary LB in arrangement 6 do not satisfy expressions 2-5, the buffer margin amounts UL1 and UL2 to be maintained in the read buffers 4021 and 4022 are not evaluated via expressions 8 and 9, but rather as follows.

FIG. 78A is a graph showing changes in the data amount DA1 stored in the first read buffer 4021 during a read period of data blocks in accordance with the playback path 7720 in L/R mode shown in FIG. 77B. At the first time T1 shown in FIG. 78A, reading of the last base-view data block L2 in the first 3D extent block 7701 starts. Afterwards, at the second time TJ, reading of the first base-view data block L5 in the second 3D extent block 7702 starts. Expression 29 yields the maximum value DR1 of the data amount that can be read from the first read buffer 4021 from the first time T1 until the second time TJ.

$$DR1 = R_{max1} \times \begin{pmatrix} T_{jump-EX} + 2 \times T_{jump-0} + \\ T_{jump}[2] + T_{jump}[3] + \\ T_{jump-LY} + \dfrac{S_{ext2}[2] + S_{ext2}[4]}{R_{ud-3D}} \end{pmatrix} \quad (29)$$

In this expression, the jump times $T_{jump-EX}$, $T_{jump}[2]$, $T_{jump}[3]$, and $T_{jump-LY}$ respectively represent the jump times for the second jump $J_{LR}2$, the third jump $J_{LR}3$, the fourth jump $J_{LR}4$, and the long jump $J_{LY}$. Furthermore, the sizes $S_{ext2}[2]$ and $S_{ext2}[4]$ of right-view extents respectively represent the sizes of the right-view data block R3 located immediately after the block exclusively for 2D playback $(L3+L4)_{2D}$ and the first right-view data block R5 in the second 3D extent block 7702. Note that for the purpose of seeking the maximum possible value of the necessary buffer margin amount, the sizes of the data blocks R4, D4, and $L4_{ss}$ located immediately before the layer boundary LB are assumed to be zero.

On the other hand, expression 30 yields the minimum value DI1 of the data amount that can be stored in the first read buffer 4021 from the first time T1 until the second time TJ.

$$DI1 = (R_{ud-3D} - R_{max1}) \times \dfrac{S_{ext1}[1] + S_{ext1}[2]}{R_{ud-3D}} \quad (30)$$

In this expression, the sizes $S_{ext1}[1]$ and $S_{ext1}[2]$ of base-view extents respectively represent the sizes of the last base-view data block L2 in the first 3D extent block 7701 and the block exclusively for 3D playback $L3_{ss}$ located immediately after the block exclusively for 2D playback $(L3+L4)_{2D}$.

To prevent underflow in the first read buffer 4021 during the long jump $J_{LY}$ the stored data amount DA1 should be equal to or greater than zero at the second time TJ. Accordingly, the buffer margin amount UL1 should at least be the difference between the maximum value DR1 of the data amount that can be read from the first read buffer 4021 from the first time T1 until the second time TJ and the minimum value DI1 of the data amount that can be stored in the first read buffer 4021 in the same period. That is, the buffer margin amount UL1 is represented in expression 31.

$$UL1 \geq DR1 - DI1 = R_{max1} \times \begin{pmatrix} T_{jump-EX} + 2 \times T_{jump-0} + \\ T_{jump}[2] + T_{jump}[3] + T_{jump-LY} + \\ \dfrac{S_{ext2}[2] + S_{ext2}[4]}{R_{ud-3D}} \end{pmatrix} - \quad (31)$$

$$(R_{ud-3D} - R_{max1}) \times \dfrac{S_{ext1}[1] + S_{ext1}[2]}{R_{ud-3D}}$$

$$= R_{max1} \times (T_{jump-EX} + T_{jump-LY}) +$$

$$\left\{ R_{max1} \times \dfrac{\left(T_{jump-0} + \dfrac{S_{ext2}[2]}{R_{ud-3D}} + T_{jump}[2]\right) - }{\dfrac{R_{ud-3D} - R_{max1}}{R_{ud-3D}} \times S_{ext1}[1]} \right\} +$$

$$\left\{ R_{max1} \times \dfrac{\left(T_{jump-0} + \dfrac{S_{ext2}[4]}{R_{ud-3D}} + T_{jump}[3]\right) -}{\dfrac{R_{ud-3D} - R_{max1}}{R_{ud-3D}} \times S_{ext1}[2]} \right\}$$

In this case, since the sizes $S_{ext1}[1]$ and $S_{ext1}[2]$ of the base-view data blocks L2 and $L3_{ss}$ satisfy expression 4 replacing the depth map data block with the right-view data block, the second and third terms in expression 31 are both equal to or less than zero. Therefore, the value of the buffer margin amount UL1 should at least satisfy expression 32.

$$UL1 = R_{max1} \times CEIL(T_{jump-EX} + T_{jump-LY}) \quad (32)$$

FIG. 78B is a graph showing changes in the data amount DA2 stored in the second read buffer 4022 during a read period of data blocks in accordance with the playback path 7720 in L/R mode shown in FIG. 77B. At the third time TK shown in FIG. 78B, reading of the last right-view data block R2 in the first 3D extent block 7701 starts. Afterwards, at the fourth time TL, reading of the first right-view data block R5 in the second 3D extent block 7702 starts.

The buffer margin amount UL2 should at least be the difference between the maximum value of the data amount that can be read from the second read buffer 4022 from the third time TK until the fourth time TL and the minimum value of the data amount that can be stored in the second read buffer 4022 in the same period. Accordingly, since the sizes of the right-view data blocks R2 and R3 satisfy expression 5 replacing the depth map data block with the right-view data block, the value of the buffer margin amount UL2 should at least satisfy expression 33.

$$UL2 = R_{max2} \times CEIL(T_{jump-EX} + T_{jump-LY}) \quad (33)$$

In depth mode as well, for the same reasons the values of the buffer margin amounts UL1 and UL2 in the read buffers 4021 and 4022 should at least fulfill expressions 34 and 35.

$$UL1 = R_{max1} \times CEIL(T_{jump-EX} + T_{jump-LY}) \quad (34)$$

$$UL2 = R_{max3} \times CEIL(T_{jump-EX} + T_{jump-LY}) \quad (35)$$

As can be seen by comparing expressions 34 and 35 with expressions 20 and 21, the buffer margin amounts UL1 and UL2 in depth mode are smaller in arrangement 6 than in arrangement 4. Accordingly, as is clear from expressions 12-14 in modification [N], it is possible to reduce the minimum capacity of the read buffers 4021 and 4022 in depth mode.

In arrangement 6, duplicate data of the block exclusively for 2D playback $(L3+L4)_{2D}$ is divided into two blocks exclusively for 3D playback $L3_{ss}$ and $L4_{ss}$. Alternatively, the duplicate data may be provided as a single block exclusively for 3D playback or divided into three or more blocks exclusively for 3D playback. Furthermore, the block exclusively for 2D playback may be accessible as two or more extents in the file 2D.

In arrangement 6, the base-view data blocks in the 3D extent block 7701 may belong to a different file 2D than the base-view data blocks in the 3D extent block 7702. In this case, in the main path of the 2D playlist file, the CC is set to 5 or 6 between the PIs that specify the playback section in each file 2D. Furthermore, the two 3D extent blocks 7701 and 7702 belong to different files SS. Accordingly, in the main path of the 3D playlist file, the CC is set to 5 or 6 between the PIs that specify the playback section in the file 2D that shares base-view data blocks with the files SS. On the other hand, in the sub-path of the 3D playlist file, the SP connection condition (CC) is set to 5 or 6 between the SUB PIs that specify the playback section in the file DEP that shares dependent-view data blocks with the files SS.

[P] Conditional Expressions of Extent Size Referring to Extent ATC Time

In expressions 2-5, the size of base-view extents and dependent-view extents is restricted by the size of subsequently located extents. However, from the perspective of using extents in the authoring process, it is preferable that the conditions on the size of each extent be expressed in a form that does not depend on the size of other extents. Accordingly, expressions 2-5 are redefined by conditional expressions that refer to extent ATC time.

In the data block groups in the interleaved arrangements shown in FIG. 15 and other figures, three types of contiguous extents Dn, Rn, Ln (n=0, 1, 2, ...) all have the same extent ATC time $T_{ext}[n]$. The minimum value of these extent ATC times is set as the minimum extent ATC time $minT_{ext}$, and the maximum value as the maximum extent ATC time $maxT_{ext}$: $minT_{ext} \leq T_{ext}[n] \leq maxT_{ext}$. Let the difference between the maximum extent ATC time $maxT_{ext}$ and the minimum extent ATC time $minT_{ext}$ be a constant value Tm: $maxT_{ext} = minT_{ext} + Tm$. In this case, the sizes $S_{ext1}[n]$, $S_{ext2}[n]$ and $S_{ext3}[n]$ of the $n^{th}$ extents EXT1[n], EXT2[n], and EXT3[n] are limited to the ranges in expressions 36, 37, and 38.

$$CEIL(R_{ext1}[n] \times minT_{ext}/8) \leq S_{ext1}[n] \leq CEIL(R_{ext1}[n] \times maxT_{ext}/8) \quad (36)$$

$$CEIL(R_{ext2}[n] \times minT_{ext}/8) \leq S_{ext2}[n] \leq CEIL(R_{ext2}[n] \times maxT_{ext}/8) \quad (37)$$

$$CEIL(R_{ext3}[n] \times minT_{ext}/8) \leq S_{ext3}[n] \leq CEIL(R_{ext3}[n] \times maxT_{ext}/8) \quad (38)$$

In other words, the product of the mean transfer rate $R_{extk}[n]$ (k=1, 2, 3) and the minimum extent ATC time $minT_{ext}$ equals the minimum extent size minEXTk: $minEXTk = R_{extk}[n] \times minT_{ext}$. On the other hand, the mean transfer rate $R_{extk}[n]$ can be assumed to have a maximum value $R_{maxk}$, and thus the size $S_{extk}[n]$ of each extent can be assumed to have a maximum value of maxEXTk, which equals the product of the maximum value $R_{maxk}$ of the mean transfer rate and the maximum extent ATC time $maxT_{ext}$: $maxEXTk = R_{maxk} \times maxT_{ext} = R_{maxk} \times (minT_{ext} + Tm)$ (k=1, 2, 3). Hereinafter, this maximum value maxEXTk is referred to as the "maximum extent size". The minimum extent ATC time $minT_{ext}$ is calculated as follows, using the minimum extent size minEXTk and the maximum extent size maxEXTk.

Figure 79:
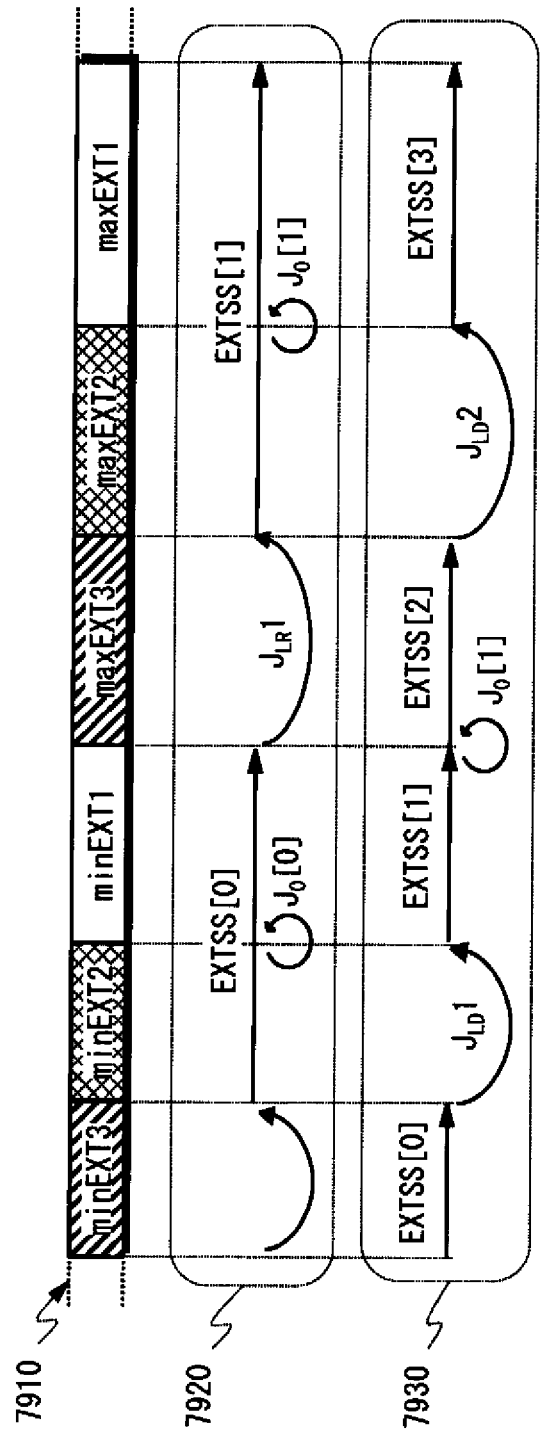
FIG. 79 is a schematic diagram showing the interleaved arrangement of an extent group 7901 used in calculation of the minimum extent size and showing corresponding playback paths 7920 and 7930 in 3D playback mode.

FIG. 79 is a schematic diagram showing the interleaved arrangement of an extent group 7901 used in calculation of the minimum extent size and showing corresponding playback paths 7920 and 7930 in 3D playback mode. In the extent group 7901, the sizes of the $n^{th}$ depth map extent EXT3[n], the right-view extent EXT2[n], and the base-view extent EXT1[n] respectively equal the minimum extent sizes minEXT3, minEXT2, and minEXT1. On the other hand, the sizes of the $(n+1)^{th}$ extents EXT3[$n$+1], EXT2[$n$+1], and EXT1[$n$+1] respectively equal the maximum extent sizes maxEXT3, maxEXT2, and maxEXT1. The playback path 7920 in L/R mode and the playback path 7930 in depth mode for the extent group 7901 are respectively the same as the playback paths 5920 and 6020 shown in FIGS. 59C and 60C.

Since the size of the $n^{th}$ base-view extent EXT1[1] equals the minimum extent size minEXT1, then based on expressions 2 and 36, the minimum extent ATC time min$T_{ext}$ satisfies expression 39.

$$R_{ext1}[n] \times \min T_{ext} \geq \qquad (39)$$

$$R_{ext1}[n] \times \frac{R_{ud-3D}}{R_{ud-3D} - R_{ext1}[n]} \times \left( T_{jump-3D}[n] + \frac{S_{ext2}[n+1]}{R_{ud-3D}} + T_{jump-0}[n+1] \right)$$

$$\therefore \min T_{ext} \geq \frac{R_{ud-3D}}{R_{ud-3D} - R_{ext1}[n]} \times \left( T_{jump-3D}[n] + \frac{S_{ext2}[n+1]}{R_{ud-3D}} + T_{jump-0}[n+1] \right).$$

The size $S_{ext2}[n+1]$ of the $(n+1)^{th}$ right-view extent EXT2 [$n$+1] equals the maximum extent size maxEXT2: $S_{ext2}[n-1]=$maxEXT2$=R_{max2} \times$max$T_{ext}=R_{max2} \times$(min$T_{ext}+$Tm). Furthermore, the base-view transfer rate $R_{ext1}[n]$ does not exceed the maximum value $R_{max1}$: $R_{ext1}[n] \leq R_{max1}$. By modifying expression 11 based on these considerations, it is clear that the minimum extent ATC time min$T_{ext}$ satisfies expression 40.

$$\min T_{ext} \geq \frac{R_{ud-3D}}{R_{ud-3D} - R_{ext1}[n]} \times \qquad (40)$$

$$\left( T_{jump-3D}[n] + \frac{R_{max2} \times \max T_{ext}}{R_{ud-3D}} + T_{jump-0}[n+1] \right)$$

$$= \frac{R_{ud-3D}}{R_{ud-3D} - R_{ext1}[n]} \times$$

$$\left( T_{jump-3D}[n] + \frac{R_{max2} \times (\min T_{ext} + Tm)}{R_{ud-3D}} + T_{jump-0}[n+1] \right)$$

$$\therefore \min T_{ext} \geq \frac{R_{ud-3D}}{R_{ud-3D} - R_{ext1}[n] - R_{max2}} \times$$

$$\left( T_{jump-3D}[n] + \frac{R_{max2} \times Tm}{R_{ud-3D}} + T_{jump-0}[n+1] \right)$$

$$\geq R_{ud-3D} - R_{max1} - R_{max2} \times$$

$$\left( T_{jump-3D}[n] + \frac{R_{max2} \times Tm}{R_{ud-3D}} + T_{jump-0}[n+1] \right)$$

If expression 4 is similarly modified instead of expression 2, it is clear that the minimum extent ATC time min$T_{ext}$ further satisfies expression 41:

$$\min T_{ext} \geq \frac{R_{ud-3D}}{R_{ud-3D} - R_{max1} - R_{max3}} \times \qquad (41)$$

$$\left( T_{jump-0}[n] + \frac{R_{max3} \times Tm}{R_{ud-3D}} + T_{jump-3D}[n+1] \right)$$

The size of the $n^{th}$ right-view extent EXT2[$n$] equals the minimum extent size minEXT2. Furthermore, the right-view transfer rate $R_{ext2}[n]$ does not exceed the maximum value $R_{max2}$, and the base-view transfer rate $R_{ext1}[n]$ does not exceed the maximum value $R_{max1}$: $R_{ext2}[n] \leq R_{max2}$, and $R_{ext1}[n] \leq R_{max1}$. Accordingly, based on expressions 3 and 37, the minimum extent ATC time min$T_{ext}$ satisfies expression 42.

$$R_{ext2}[n] \times \min T_{ext2} \geq R_{ext2}[n] \times \frac{R_{ud-3D}}{R_{ud-3D} - R_{ext2}[n]} \times \qquad (42)$$

$$\left( T_{jump-0}[n] + \frac{R_{ext1}[n] \times \min T_{ext}}{R_{ud-3D}} + T_{jump-3D}[n] \right)$$

$$= R_{ext2}[n] \frac{R_{ud-3D}}{R_{ud-3D} - R_{ext2}[n]} \times$$

$$\left( T_{jump-0}[n] + \frac{R_{ext1}[n] \times \min T_{ext}}{R_{ud-3D}} + T_{jump-3D}[n] \right)$$

$$\therefore \min T_{ext} \geq \frac{R_{ud-3D}}{R_{ud-3D} - R_{ext2}[n]} \times$$

$$\left( T_{jump-0}[n] + \frac{R_{ext1} \times \min T_{ext}}{R_{ud-3D}} + T_{jump-3D}[n] \right)$$

$$\therefore \min T_{ext} \geq \frac{R_{ud-3D}}{R_{ud-3D} - R_{ext1}[n] - R_{ext2}[n]} \times (T_{jump-0}[n] + T_{jump-3D}[n])$$

$$\geq \frac{R_{ud-3D}}{R_{ud-3D} - R_{max1} - R_{max2}} \times (T_{jump-0}[n] + T_{jump-3D}[n])$$

If expression 5 is used instead of expression 3, then similarly the minimum extent ATC time min$T_{ext}$ should satisfy expression 43.

$$\min T_{ext} \geq \frac{R_{ud-3D}}{R_{ud-3D} - R_{max1} - R_{max3}} \times (T_{jump-3D}[n] + T_{jump-0}[n]) \qquad (43)$$

As a result, the minimum extent ATC time min$T_{ext}$ is calculated as the maximum value among the right-hand side of expressions 40-43. In this case, the zero sector transition time $T_{jump-0}$, the jump time $T_{jump-3D}$, and the fluctuation range Tm of the extent ATC time can be restricted to predetermined, fixed values. In particular, in modification (L), the jump time $T_{jump-3D}$ may be assessed with reference to the maximum jump distance MAX_EXTJUMP3D. In this way, the minimum extent ATC time min$T_{ext}$ can substantially be determined only by constants such as the maximum value $R_{max}$ of the mean transfer time. Accordingly, the conditions on the extent size shown in expressions 36-38 are useful during the authoring process.

[Q] Conditions on the Maximum Extent ATC Time

For the data block groups in arrangements 4-6, the three data blocks D4, R4, and L4$_{ss}$ are located immediately before a layer boundary LB in a data block group read in 3D playback mode. The sizes of these data blocks do not fulfill expressions 2-5 for the following reason: as described in modification [P], the minimum extent size is defined as "the mean transfer rate $R_{extk}$ for an extent×the minimum extent ATC time min$T_{ext}$" (k=1, 2, 3), and the maximum extent size is defined as "the mean transfer rate $R_{extk}$ for an extent×the maximum extent ATC time max$T_{ext}$". In this case, depending on the playback time of the content, some data blocks may not meet the condition of "having an extent ATC time equal to or greater than the minimum extent ATC time". For example, suppose that both the minimum extent ATC time and the maximum extent ATC time are each two seconds, and that the ATC time of the entire multiplexed stream data is 11 seconds. In this case, dividing the multiplexed stream data sequentially from the top into data blocks with an extent ATC time of two seconds each leaves a data block with an extent ATC time of one second at the end. Even if such a data block is left over, these data blocks can be placed immediately before a layer boundary LB in arrangements 4-6 as per the above description.

As per the description of arrangements 4-6, however, in addition to a long jump, a jump is necessary for the left over data block in the playback path in 3D playback mode. As a result, as is clear from comparing expression 8 and 9 with expressions 18-21, 25-28, and 32-35, the buffer margin amounts UL1 and UL2 increase in 3D playback mode. Accordingly, to further reduce the minimum amounts of the read buffers 4021 and 4022, it is preferable that the extent ACT time of all data blocks be equal to or greater than the minimum extent ATC time.

Therefore, the following condition is placed on the maximum extent ATC time so that the size of a data block group located at the end of multiplexed stream data will be equal to or greater than the minimum extent size.

If the entire multiplexed stream data has an ATC time $T_{DR}$, the maximum extent ATC time fulfills expression 44.

$$\max T_{ext} \geq \min T_{ext} \times [T_{DR}/(T_{DR} - \min T_{ext})] \quad (44)$$

Figures 80A, 80B:
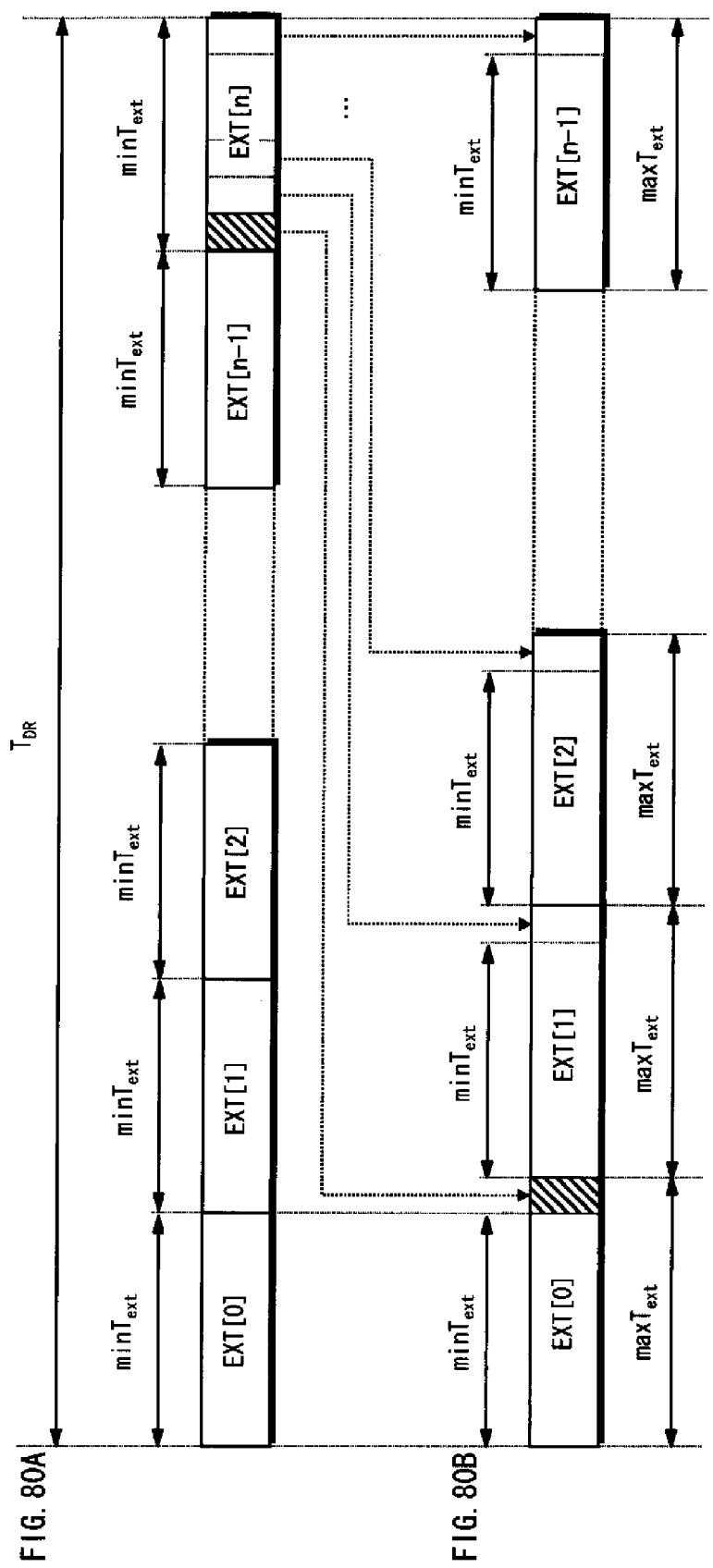
FIG. 80A is a schematic diagram showing multiplexed stream data divided in order from the top into data blocks EXT[0]-EXT[n−1] (n≥1) having a minimum extent ATC time $minT_{ext}$.
FIG. 80B is a schematic diagram showing multiplexed stream data when the extent ATC time for the data blocks EXT[0]-EXT[n−1] shown in FIG. 80A is lengthened beyond the minimum extent ATC time $minT_{ext}$.

Expression 44 has the following significance. FIG. 80A is a schematic diagram showing multiplexed stream data divided in order from the top into data blocks EXT[0]-EXT[n−1] (n≥1) having a minimum extent ATC time $\min T_{ext}$. As shown in FIG. 80A, the extent ATC time of the last data block EXT[n] does not meet the minimum extent ATC time $\min T_{ext}$. In this case, the extent ATC time of the last data block EXT[n] is distributed evenly among other data blocks EXT[0]-EXT[n−1], and each extent ATC time is thus lengthened beyond the minimum extent ATC time $\min T_{ext}$. FIG. 80B is a schematic diagram showing multiplexed stream data that has thus been lengthened. As shown in FIG. 80B, the extent ATC time of each lengthened data block is longer than the minimum extent ATC time $\min T_{ext}$. Furthermore, the extent ATC time of the last data block EXT[n] shown in FIG. 80A is at most equal to the minimum extent ATC time $\min T_{ext}$. Accordingly, the maximum extent ATC time $\max T_{ext}$ is set to be at least the maximum value of the lengthened extent ATC time. Expression 44 represents this condition.

For example, if the minimum extent ATC time $\min T_{ext}$ is two seconds, then for multiplexed stream data with an ATC time $T_{DR}$ of 20 or 30 seconds, the maximum extent ATC time is respectively 2.222 seconds or 2.142 seconds. As the maximum extent ATC time $\max T_{ext}$ grows larger, so does the size of the data blocks, and thus the buffer capacity necessary in the playback device increases. Accordingly, the relationship between the maximum extent ATC time $\max T_{ext}$ and the ATC time $T_{DR}$ of the entire multiplexed stream data is set appropriately in accordance with the jump capability of the playback device and other factors. In standards, for example, the ATC time $T_{DR}$ of the entire multiplexed stream data that is to be connected seamlessly may be restricted to 30 seconds or more, thus limiting the maximum extent ATC time $\max T_{ext}$ to 2.15 seconds. The extent ATC time of the last data block group in the multiplexed stream data can thus always be set to be equal to or greater than the minimum extent ATC time. As a result, the buffer margin amounts UL1 and UL2 in the 3D playback device can be further reduced.

[R] Guaranteeing the Buffer Margin Amount

The three following methods <<I>>, <<II>>, and <<III>> are preferable as methods for guaranteeing the buffer margin amounts UL1 and UL2.

[R-1] Method <<I>>

In method <<I>>, the buffer margin amounts UL1 and UL2 are guaranteed in the following way. First, the condition that "the extent ATC time $T_{ext}$ is equal to or greater than the minimum extent ATC time $\min T_{ext}$" is placed on the design of each data block. In this case, as shown in expressions 40-43, the minimum extent ATC time $\min T_{ext}$ is a value calculated when the mean transfer rates $R_{ext1}, R_{ext2},$ and $R_{ext3}$ equal their respective maximum values $R_{max1}, R_{max2},$ and $R_{max3}$. The actual mean transfer rates $R_{ext1}, R_{ext2}$ and $R_{ext3}$, however, are generally lower than their respective maximum values $R_{max1}, R_{max2}$ and $R_{max3}$. Accordingly, the actual sizes of the data blocks $R_{ext1} \times T_{ext}, R_{ext2} \times T_{ext},$ and $R_{ext3} \times T_{ext}$ are generally smaller than the values assumed in the above conditions, i.e. $R_{max1} \times T_{ext}, R_{max2} \times T_{ext},$ and $R_{max3} \times T_{ext}$. Therefore, after the start of reading of each data block, reading of the next data block begins before the extent ATC time $T_{ext}$ passes. In other words, the stored data amounts DA1 and DA2 in the read buffers 4021 and 4022 generally start to increase again before returning to their value at the start of reading, unlike the case shown in FIGS. 59A, 59B, 60A, and 60B. The stored data amounts DA1 and DA2 therefore increase by a predetermined amount each time a pair of a base-view and a dependent-view data block is read. As a result, by continuously reading a certain number of data blocks into the read buffers 4021 and 4022, the buffer margin amounts UL1 and UL2 are guaranteed.

Figure 81A:
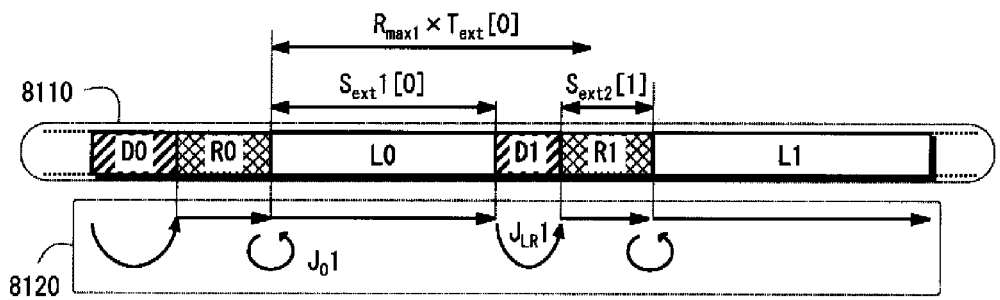
FIG. 81A is a schematic diagram showing the relationships between (i) a 3D extent block 8110 designed for the purpose of using method <<I>> during 3D playback mode and (ii) a playback path 8120 in L/R mode.

FIG. 81A is a graph showing the relationship between a 3D extent block 8110 and a playback path 8120 in L/R mode. As shown in FIG. 81A, the 3D extent block 8110 is composed of base-view data block groups Lk and dependent-view data block groups Dk and Rk (k=0, 1, 2, . . . ) in an interleaved arrangement. In accordance with the playback path 8120, each pair of contiguous right-view data blocks Rk and base-view data blocks Lk is read as one 3D extent, i.e. as a pair of a dependent-view extent and a base-view extent. The extent size $S_{ext1}[k]$ of the base-view extent Lk equals the product of the base-view transfer rate $R_{ext1}[k]$ and the extent ATC time $T_{ext}[k]$: $S_{ext1}[k] = R_{ext1}[k] \times T_{ext}[k]$. This extent size $S_{ext1}[k]$ is generally smaller than the product of the maximum value $R_{max1}$ of the base-view transfer rate and the extent ATC time $T_{ext}[k]$: $S_{ext1}[k] < R_{max1} \times T_{ext}[k]$. The same is true for the extent sizes $S_{ext3}[k]$ and $S_{ext2}[k]$ of the dependent-view extents Dk and Rk.

Figure 81B:
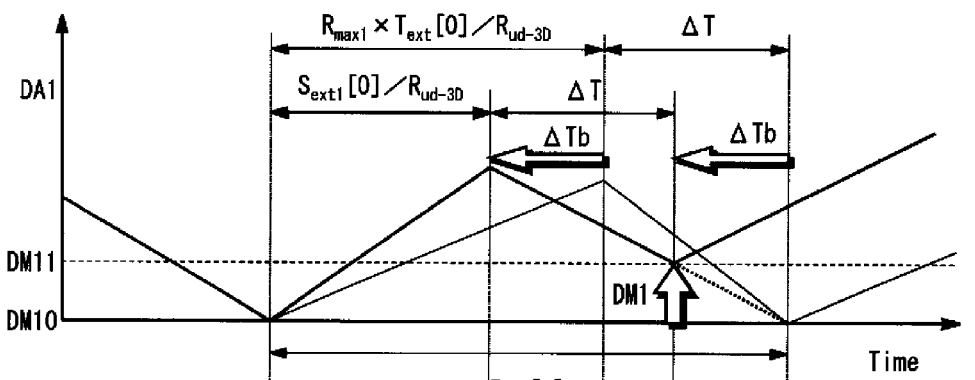
FIG. 81B is a graph showing changes in the stored data amount DA1 in the first read buffer 4021 when the 3D extent block 8110 is read according to the playback path 8120 in L/R mode.

FIG. 81B is a graph showing the change in the data amount DA1 in the first read buffer 4021 when the 3D extent block 8110 is read in accordance with the playback path 8120 in L/R mode. The thin line indicates changes when the mean transfer rates $R_{ext1}[k], R_{ext2}[k]$ and $R_{ext3}[k]$ equal the maximum values $R_{max1}, R_{max2},$ and $R_{max3}$. On the other hand, the thick line indicates changes when the transfer rate $R_{ext1}[0]$ of the top base-view extent L0 is lower than the maximum value $R_{max1}$. Note that for convenience of explanation, it is assumed that the dependent-view transfer rates $R_{ext2}[k]$ and $R_{ext3}[k]$ equal their respective maximum values $R_{max2}$ and $R_{max3}$. In this case, the sizes $R_{ext2}[k] \times T_{ext}[k]$ and $R_{ext3}[k] \times T_{ext}[k]$ of the dependent-view extents equal the maximum possible values, $R_{max2}[k] \times T_{ext}[k]$ and $R_{max3}[k] \times T_{ext}[k]$.

As shown in FIG. 81B, for the thin line, after an extent ATC time $T_{ext}[0]$ has passed from the start of reading of the top base-view extent L0, reading of the next base-view extent L1 begins. Accordingly, the stored data amount DA1 at this point is substantially equal to the value DM10 at the start of reading. Conversely, for the thick line, a time $S_{ext1}[0]/R_{ud-3D}$ is necessary to read the entire top base-view extent L0 from the BD-ROM disc 101 into the first read buffer 4021. This time is shorter than the time $R_{max1}[k] \times T_{ext}[0]/R_{ud-3D}$ in the thin line by a time $\Delta Tb$: $\Delta Tb = R_{max1} \times T_{ext}[0]/R_{ud-3D} - S_{ext1}[0]/R_{ud-3D} = (R_{max1} - R_{ext1}[0]) \times T_{ext}[0]/R_{ud-3D}$. Accordingly, the stored data amount DA1 reaches its peak in the thick line earlier than in the thin line by a time of $\Delta Tb$. On the other hand, the sizes $S_{ext2}[1]$ and $S_{ext3}[1]$ of the dependent-view extents D1 and R1 are the same for both lines: $R_{max2} \times T_{ext}[1]$ and $R_{max3} \times T_{ext}[1]$. Accordingly, the time $\Delta T$ from the peak of the stored data amount DA1 until the start of reading of the next base-view extent L1 is the same for both lines. As a result, unlike the thin line, reading of the next base-view extent L1 begins in the thick line at a time that is $\Delta Tb$ earlier than after the extent ATC time $T_{ext}$ has passed from the start of reading of the top base-view extent L0. Therefore, the value DM11 of the stored data amount DA1 at that point increases over the value DM10 at the start of reading of the top base-view extent L0 by an increment DM1[0]. As is clear from FIG. 81B, this increase DM1[0] equals the product of the actual rate of decrease $R_{ext1}[0]$ of the stored data amount DA1 and the time $\Delta Tb$: DM1[0]=$R_{ext1}[0] \times \Delta Tb = R_{ext1}[0] \times (R_{ext1}[0]-R_{max1}) \times T_{ext}[0]/R_{ud-3D}$.

Figure 81C:
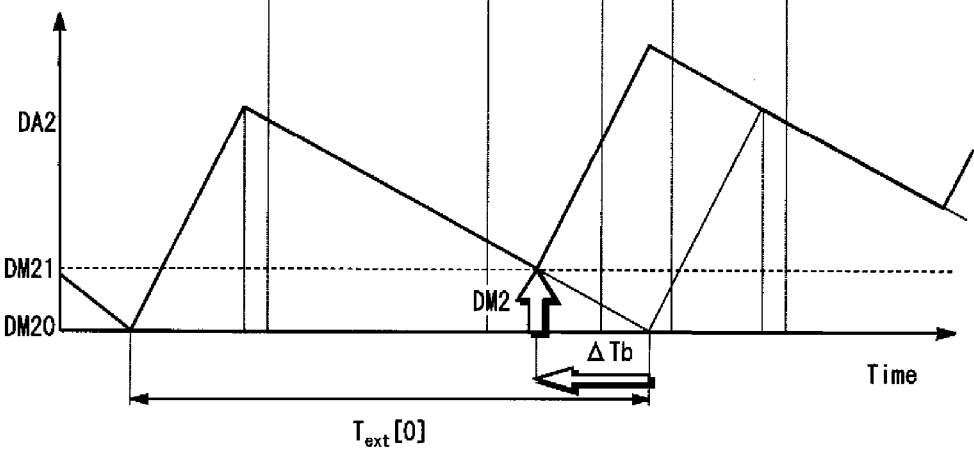
FIG. 81C is a graph showing changes in the stored data amount DA2 in the second read buffer 4022 when the stored data amount DA1 in the first read buffer 4021 exhibits the changes in FIG. 81B.

FIG. 81C is a graph showing the change in the data amount DA2 in the second read buffer 4022 while the data amount DA1 in the first read buffer 4021 changes as shown in FIG. 81B. The thin line indicates changes when the mean transfer rates $R_{ext1}[k]$ $R_{ext2}[k]$ and $R_{ext3}[k]$ equal the maximum values $R_{max1}$, $R_{max2}$, and $R_{max3}$. On the other hand, the thick line indicates changes when the transfer rate $R_{ext1}[0]$ of the top base-view extent L0 is lower than the maximum value $R_{max1}$. Note that for convenience of explanation, it is assumed that the dependent-view transfer rates $R_{ext2}[k]$ and $R_{ext3}[k]$ equal their respective maximum values $R_{max2}$ and $R_{max3}$.

As shown in FIG. 81C, for the thin line, after an extent ATC time $T_{ext}[0]$ has passed from the start of reading of the top right-view extent R0, reading of the next right-view extent R1 begins. Accordingly, the stored data amount DA2 at this point is substantially equal to the value DM20 at the start of reading. Conversely, for the thick line, the entire top base-view extent L0 is read from the BD-ROM disc 101 into the first read buffer 4021 earlier than in the thin line by a time $\Delta Tb$. Accordingly, reading of the next right-view extent R1 begins in the thick line earlier than in the thin line by a time $\Delta Tb$, i.e. at a time $\Delta Tb$ earlier than the extent ATC time $T_{ext}$ has passed from the start of reading of the top right-view extent R0. As a result, the value DM21 of the stored data amount DA2 at that point increases over the value DM20 at the start of reading of the top right-view extent R0 by an increment DM2[0]. As is clear from FIG. 81C, this increase DM2[0] equals the product of the actual rate of decrease $R_{ext2}[0]$ of the stored data amount DA2 and the time $\Delta Tb$ DM2[0]=$R_{ext2}[0] \times \Delta Tb = R_{ext2}[0] \times (R_{ext1}[0]-R_{max1}) \times T_{ext}[0]/R_{ud-3D}$.

In FIGS. 81B and 81C, it is assumed that the dependent-view transfer rates $R_{ext2}[k]$ and $R_{ext3}[k]$ equal their respective maximum values $R_{max2}$ and $R_{max3}$. The actual dependent-view transfer rates $R_{ext2}[k]$ and $R_{ext3}[k]$, however, are generally lower than their respective maximum values $R_{max2}$ and $R_{max3}$. In this case, as in FIG. 8B, the stored data amount DA2 in FIG. 81C reaches its peak earlier by a time $\Delta Td$: $\Delta Td = S_{ext2}[0]/R_{ud-3D}-R_{max2} \times T_{ext}[0]/R_{ud-3D} = (R_{ext2}[0]-R_{max2}) \times T_{ext}[0]/R_{ud-3D}$. In the graph in FIG. 81B, the time $\Delta T$ from the peak of the stored data amount DA1 to the start of reading of the next base-view extent L1 is shortened by the same time $\Delta Td$. In light of these changes, each time a pair of a base-view extent Lk and a right-view extent Rk is processed, the stored data amounts DA1 and DA2 in the read buffers increase by increments DM1[k] and DM2[k], as shown in expressions 45 and 46.

$$DM1[k] = R_{ext1}[k] \times (\Delta Tb + \Delta Td) \qquad (45)$$
$$= R_{ext1}[k] \times \{(R_{ext1}[k]-R_{max1}) + (R_{ext2}[k]-R_{max2})\} \times T_{ext}[k]/R_{ud-3D}$$

$$DM2[k] = R_{ext2}[k] \times (\Delta Tb + \Delta Td) \qquad (46)$$
$$= R_{ext2}[k] \times \{(R_{ext1}[k]-R_{max1}) + (R_{ext2}[k]-R_{max2})\} \times T_{ext}[k]/R_{ud-3D}$$

In L/R mode, each time a base-view extent Lk and a right-view extent Rk are read from a 3D extent EXTSS[k] into the read buffers 4021 and 4022, the stored data amounts DA1 and DA2 increase by increments DM1[k] and DM2[k]. Similarly in depth mode, each time a base-view extent Lk and a depth-map extent Dk are read into the read buffers 4021 and 4022, the stored data amounts DA1 and DA2 increase by increments DM3[k] and DM4[k]. These increments DM3[k] and DM4[k] are shown in expressions 47 and 48.

$$DM3[k]=R_{ext1}[k] \times \{(R_{ext1}[k]-R_{max1})+(R_{ext3}[k]-R_{max3})\} \times T_{ext}[k]/R_{ud-3D} \qquad (47)$$

$$DM4[k]=R_{ext3}[k] \times \{(R_{ext1}[k]-R_{max1})+(R_{ext3}[k]-R_{max3})\} \times T_{ext}[k]/R_{ud-3D} \qquad (48)$$

Accordingly, when the total Tsum=$T_{ext}[0]+T_{ext}[1]+T_{ext}[2]+\ldots$ of the extent ATC time for the entire 3D extent block 8110 satisfies expression 49, the buffer margin amounts UL1 and UL2 in the read buffers 4021 and 4022 can be guaranteed by reading the entire 3D extent block 8110.

$$UL1 \leq \min\left(\sum_k DM1[k], \sum_k DM3[k]\right) \qquad (49)$$

$$\approx \min\begin{pmatrix} R_{ext1-av} \times \frac{(R_{max1}+R_{max2})-(R_{ext1-av}+R_{ext2-av})}{R_{ud-3D}} \times T_{sum}, \\ R_{ext1-av} \times \frac{(R_{max1}+R_{max3})-(R_{ext1-av}+R_{ext3-av})}{R_{ud-3D}} \times T_{sum} \end{pmatrix}$$

$$UL2 \leq \min\left(\sum_k DM2[k], \sum_k DM4[k]\right)$$

$$\approx \min\begin{pmatrix} R_{ext2-av} \times \frac{(R_{max1}+R_{max2})-(R_{ext1-av}+R_{ext2-av})}{R_{ud-3D}} \times T_{sum}, \\ R_{ext3-av} \times \frac{(R_{max1}+R_{max3})-(R_{ext1-av}+R_{ext3-av})}{R_{ud-3D}} \times T_{sum} \end{pmatrix}$$

$$\therefore T_{sum} \geq \max\begin{pmatrix} \frac{UL1 \times R_{ud-3D}}{R_{ext1-av} \times \{(R_{max1}+R_{max2})-(R_{ext1-av}+R_{ext2-av})\}}, \\ \frac{UL1 \times R_{ud-3D}}{R_{ext1-av} \times \{(R_{max1}+R_{max3})-(R_{ext1-av}+R_{ext3-av})\}}, \\ \frac{UL2 \times R_{ud-3D}}{R_{ext2-av} \times \{(R_{max1}+R_{max2})-(R_{ext1-av}+R_{ext-av})\}}, \\ \frac{UL2 \times R_{ud-3D}}{R_{ext3-av} \times \{(R_{max1}+R_{max3})-(R_{ext1-av}+R_{ext3-av})\}} \end{pmatrix}$$

The following approximation is used here: throughout the 3D extent block 8110, the base-view transfer rate $R_{ext1}[k]$ equals the mean value $R_{ext1-av}$, and the dependent-view transfer rates $R_{ext2}[k]$ and $R_{ext3}[k]$ respectively equal the mean values $R_{ext2-av}$ and $R_{ext3-av}$.

Method <<II>>

In method <<II>>, the buffer margin amounts UL1 and UL2 are guaranteed as follows. First, the sizes of the data blocks in a sequence of 3D extent blocks satisfy expressions 50-53, which add a margin time $T_{margin}$ to the right-hand side of expressions 2-5.

$$S_{ext1}[n] \geq \text{CEIL}\left\{\begin{pmatrix}\frac{R_{ext1}[n]}{8} \times \frac{R_{ud-3D}}{R_{ud-3D} - R_{ext1}[n]} \times \\ \left(T_{jump-3D}[n] + \frac{S_{ext2}[n+1]}{R_{ud-3D}} + \\ T_{jump-0}[n+1] + T_{margin}\right)\end{pmatrix}\right\} \quad (50)$$

$$S_{ext2}[n] \geq \text{CEIL}\left\{\begin{pmatrix}\frac{R_{ext2}[n]}{8} \times \frac{R_{ud-3D}}{R_{ud-3D} - R_{ext2}[n]} \times \\ \left(T_{jump-0}[n] + \frac{S_{ext1}[n]}{R_{ud-3D}} + \\ T_{jump-3D}[n] + T_{margin}\right)\end{pmatrix}\right\} \quad (51)$$

$$S_{ext1}[n] \geq \text{CEIL}\left\{\begin{pmatrix}\frac{R_{ext1}[n]}{8} \times \frac{R_{ud-3D}}{R_{ud-3D} - R_{ext1}[n]} \times \\ \left(T_{jump-0}[n] + \frac{S_{ext3}[n+1]}{R_{ud-3D}} + \\ T_{jump-3D}[n+1] + T_{margin}\right)\end{pmatrix}\right\} \quad (52)$$

$$S_{ext3}[n] \geq \text{CEIL}\left\{\begin{pmatrix}\frac{R_{ext3}[n]}{8} \times \frac{R_{ud-3D}}{R_{ud-3D} - R_{ext3}[n]} \times \\ \left(T_{jump-3D}[n] + \frac{S_{ext1}[n]}{R_{ud-3D}} + \\ T_{jump-0}[n] + T_{margin}\right)\end{pmatrix}\right\} \quad (53)$$

FIGS. 82A and 82B are graphs showing changes in the data amounts DA1 and DA2 stored in the read buffers 4021 and 4022 when a sequence of 3D extent blocks that satisfy expressions 50-53 is read by the playback device 102 in L/R mode. As shown in FIGS. 82A and 82B, the effects of adding a margin time $T_{margin}$ to the right-hand side of expressions 2-5 can be interpreted as follows.

First, the effects of explicitly adding a margin time $T_{margin}$ in the right-hand side of expressions 50-53 can be described as follows: in expression 51, the value assumed for the jump time necessary from the start of reading of each right-view data block until the start of reading of the next right-view data block is longer than the actual value by the margin time $T_{margin}$. Accordingly, to prevent underflow in the second read buffer 4022 during this jump time, the size of each right-view data block includes an additional data amount that is read from the second read buffer 4022 during the margin time $T_{margin}$. As a result, each time a right-view data block is read, the stored data amount DA2 in the second read buffer 4022 increases by the product of the right-view transfer rate $R_{ext2}$ and the margin time $T_{margin}$. Similarly, each time a base-view data block is read, the stored data amount DA1 in the first read buffer 4021 increases by the product of the base-view transfer rate $R_{ext1}$ and the margin time $T_{margin}$.

Next, the effects of implicitly adding a margin time $T_{margin}$ in the right-hand side of expressions 50-53 via the sizes of other data blocks can be described as follows: the time assumed to be necessary for reading each right-view data block from the second read buffer 4022 is longer than the actual time by the margin time $T_{margin}$. On the other hand, during the period in which each right-view data block is being read from the second read buffer 4022, data is not read into the first read buffer 4021, and data that is already stored therein is simply read. Accordingly, the value assumed for the length of the read period is longer than the actual value by the margin time $T_{margin}$. As a result, each time a right-view data block is read, the stored data amount DA1 in the first read buffer 4021 increases by the product of the base-view transfer rate $R_{ext1}$ and the margin time $T_{margin}$. Similarly, each time a base-view data block is read, the stored data amount DA2 in the second read buffer 4022 increases by the product of the right-view transfer rate $R_{ext2}$ and the margin time $T_{margin}$.

Combining the above results, the increase in the stored data amount DA1 in the first read buffer 4021 caused by reading one base-view data block, i.e. DM1=DM11−DM10, equals two times the product of the base-view transfer rate $R_{ext1}$ and the margin time $T_{margin}$: DM1=2×$R_{ext1}$×$T_{margin}$. Similarly, the increase in the stored data amount DA2 in the second read buffer 4022 caused by reading one dependent-view data block, i.e. DM2=DM21−DM20, equals two times the product of the dependent-view transfer rate $R_{extk}$ and the margin time $T_{margin}$: DM2=2×$R_{extk}$×$T_{margin}$ (k=2, 3).

Accordingly, if the total extent ATC time of the entirety of a sequence of 3D extent blocks, i.e. Tsum=$T_{ext}[0]$+$T_{ext}[1]$+$T_{ext}[2]$+ . . . , satisfies expression 54, then the buffer margin amounts UL1 and UL2 can be guaranteed in the read buffers 4021 and 4022 by reading the 3D extent blocks in their entirety.

$$UL1 \leq \sum_k DM1[k] \approx 2 \times R_{ext1-av} \times T_{margin} \times \frac{T_{sum}}{T_{ext-av}} \quad (54)$$

$$UL2 \leq \sum_k DM2[k] \approx 2 \times R_{ext2-av} \times T_{margin} \times \frac{T_{sum}}{T_{ext-av}}$$

$$UL2 \leq \sum_k DM3[k] \approx 2 \times R_{ext3-av} \times T_{margin} \times \frac{T_{sum}}{T_{ext-av}}$$

$$\therefore T_{sum} \geq \max\begin{pmatrix}\frac{UL1 \times T_{ext-av}}{2 \times R_{ext1-av} \times T_{margin}}, \\ \frac{UL2 \times T_{ext-av}}{2 \times R_{ext2-av} \times T_{margin}}, \\ \frac{UL2 \times T_{ext-av}}{2 \times R_{ext3-av} \times T_{margin}}\end{pmatrix}$$

The following approximation is used in this expression: throughout the 3D extent blocks, the base-view transfer rate $R_{ext1}$ equals a mean value $R_{ext1-av}$ and the dependent-view transfer rates $R_{ext2}$ and $R_{ext3}$ equal mean values $R_{ext2-av}$ and $R_{ext3-av}$. Furthermore, the extent ATC time $T_{ext}$ of each data block equals a mean value $T_{ext-av}$.

[R-3] Method <<III>>

In method <<III>>, the buffer margin amounts UL1 and UL2 are guaranteed at the start of playback of the AV stream file. For example, at the start of playback, the playback device in L/R mode does not transfer the top right-view extent EXT2[0] from the second read buffer 4022 to the system target decoder 4023 until it has read the entire extent into the second read buffer 4022. Furthermore, in method <<III>>, transfer from the second read buffer 4022 to the system target decoder 4023 does not begin until a sufficient data amount has been stored from the top base-view extent EXT1[0] into the first read buffer 4021. As a result, the buffer margin amounts UL1 and UL2 are respectively stored in the read buffers 4021 and 4022.

[R-4] Methods <<I>> and <<II>> may be combined, and the extent ATC time Tsum of the 3D extent block in its entirety may be specified by expression 55.

$$\therefore T_{sum} \geq \max \begin{cases} \dfrac{UL1}{2 \times R_{ext1-av} \times \dfrac{T_{margin}}{T_{ext-av}} + \dfrac{R_{ext1-av}}{R_{ud-3D}} \times}{\{(R_{max1} + R_{max2}) - (R_{ext1-av} + R_{ext-av})\}}, \\ \dfrac{UL1}{2 \times R_{ext1-av} \times \dfrac{T_{margin}}{T_{ext-av}} + \dfrac{R_{ext1-av}}{R_{ud-3D}} \times}{\{(R_{max1} + R_{max3}) - (R_{ext1-av} + R_{ext3-av})\}}, \\ \dfrac{UL2}{2 \times R_{ext2-av} \times \dfrac{T_{margin}}{T_{ext-av}} + \dfrac{R_{ext2-av}}{R_{ud-3D}} \times}{\{(R_{max1} + R_{max2}) - (R_{ext1-av} + R_{ext-av})\}}, \\ \dfrac{UL2}{2 \times R_{ext-av} \times \dfrac{T_{margin}}{T_{ext-av}} + \dfrac{R_{ext3-av}}{R_{ud-3D}} \times}{\{(R_{max1} + R_{max3}) - (R_{ext1-av} + R_{ext3-av})\}} \end{cases} \quad (55)$$

[R-5] When a jump is performed after a 3D extent block and another data block is read continuously, the jump time for which these data blocks can be connected seamlessly is represented by the constant $T_{seamless}$. At such a point, the buffer margin amounts UL1 and UL2 are represented by the product of (i) the mean transfer rates $R_{ext1-av}$ $R_{ext2-av}$ and $R_{ext3-av}$ throughout the 3D extent blocks and (ii) the constant $T_{seamless}$: UL1=$R_{ext1-av} \times T_{seamless}$, UL2=$R_{ext2-av} \times T_{seamless}$ (L/R mode), and UL2=$R_{ext3-av} \times T_{seamless}$ (depth mode). When substituting these values into expressions 49 and 54, since the depth map transfer rate $R_{ext3-av}$ is generally lower than the right-view transfer rate $R_{ext2-av}$, conditions for the total Tsum of the extent ATC time throughout the 3D extent blocks can be expressed as follows.

$$T_{sum} \geq T_{seamless} \times \frac{R_{ud-3D}}{(R_{max1} + R_{max2}) - (R_{ext1-av} + R_{ext2-av})}$$

$$T_{sum} \geq T_{seamless} \times \frac{T_{ext-av}}{2 \times T_{margin}}$$

[R-6] In methods <<I>> and <<II>>, as long as a long jump does not occur during reading of a sequence of 3D extent blocks, the stored data amounts DA1 and DA2 continue to increase. Accordingly, when the stored data amounts DA1 and DA2 exceed a threshold, the playback device 102 makes the BD-ROM drive suspend reading/transfer operations. The read rate $R_{ud-3D}$ thereby decreases, thus suppressing an increase in the stored data amounts DA1 and DA2. The read buffers 4021 and 4022 can thus avoid overflow.

[R-7] Buffer Margin Amount in 2D Playback Mode

In the above embodiment, for example as in arrangement 1 shown in FIG. 68, a 2D extent of sufficient size is placed immediately before a location where a long jump is necessary, such as immediately before a layer boundary LB. A sufficient data amount is thereby stored in the read buffer 3621 immediately before the long jump, and 2D video images can thus be played back seamlessly. Long jumps, however, also occur when playback of multiplexed stream data is interrupted for processing to read from a file, such as a BD-J object file, other than the file for the multiplexed stream data. As described below, in order to seamless play back 2D video images despite these long jumps, the playback device 102 in 2D playback mode may maintain a buffer margin amount in the read buffer 3621 in the same way as the above-described methods <<I>> and <<II>>.

Figure 83A:
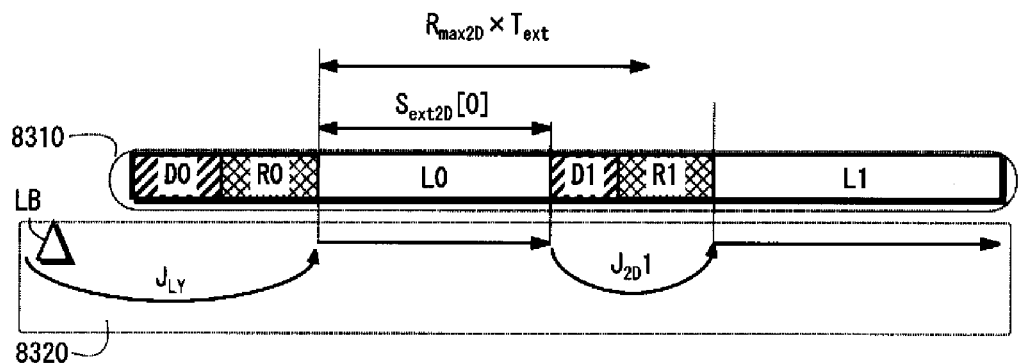
FIG. 83A is a schematic diagram showing the relationships between (i) a 3D extent block 8310 designed for the purpose of using method <<I>> or <<II>> during 2D playback mode and (ii) a playback path 8320 in 2D playback mode.

FIG. 83A is a schematic diagram showing the relationships between a 3D extent block 8310 and a playback path 8320 in 2D playback mode. As shown in FIG. 83A, the 3D extent block 8310 is composed of base-view data blocks Lk and dependent-view data blocks Dk and Rk (k=0, 1, 2, . . . ) in the interleaved arrangement. In accordance with the playback path 8320, each base-view data block Lk is read as a single 2D extent.

Figure 83B:
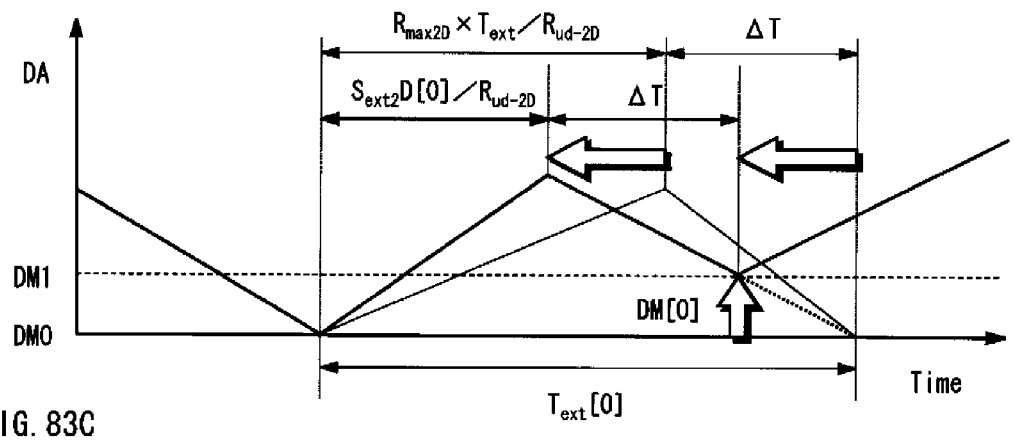
FIG. 83B is a graph showing changes in the stored data amount DA in the read buffer 3621 when the 3D extent block 8310 is read according to the playback path 8320 in 2D playback mode.

FIG. 83B is a graph showing changes in the stored data amount DA in the read buffer 3621 when the 3D extent block 8310 is read according to the playback path 8320 in 2D playback mode. The thin line indicates changes when the mean transfer rate $R_{ext2D}[k]$ equals the maximum value $R_{max2D}$. Conversely, the thick line indicates changes when the transfer rate $R_{ext2D}[0]$ of the top 2D extent L0 is lower than the maximum value $R_{max2D}$.

As shown in FIG. 83B, for the thin line, after an extent ATC time $T_{ext}[0]$ has passed from the start of reading of the top 2D extent L0, reading of the next 2D extent L1 begins. Accordingly, the stored data amount DA at this point is substantially equal to the value DM0 at the start of reading. Conversely, for the thick line, the time necessary to read the entire top 2D extent L0 from the BD-ROM disc 101 into the read buffer 3621 is shorter than the time in the thin line by a difference in time ΔT. Accordingly, the stored data amount DA reaches its peak in the thick line earlier than in the thin line by a time of ΔT. As a result, unlike the thin line, reading of the next 2D extent L1 begins in the thick line at a time that is ΔT earlier than after the extent ATC time $T_{ext}$ has passed from the start of reading of the top 2D extent L0. Therefore, the value DM1 of the stored data amount DA1 at that point increases over the value DM0 at the start of reading of the top 2D extent L0 by an increment DM [0].

Figure 83C:
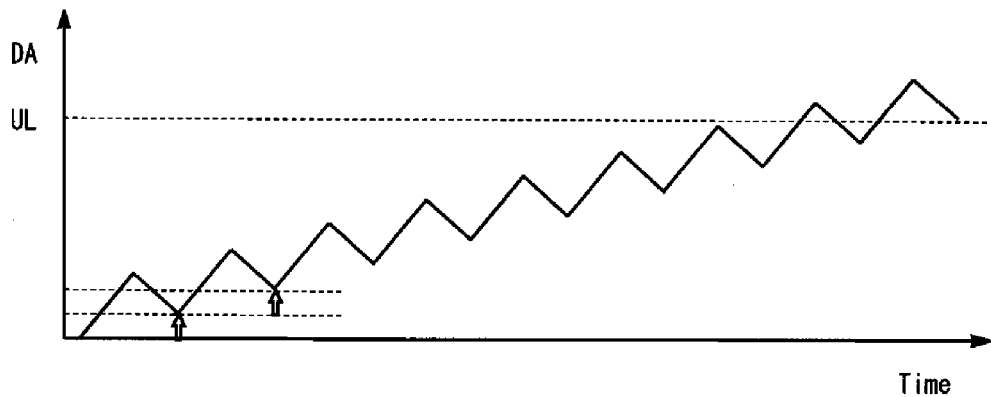
FIG. 83C is a graph showing changes in the stored data amount DA in the read buffer 3621 when the entire 3D extent block 8310 shown in FIG. 83A is read.

FIG. 83C is a graph showing changes in the stored data amount DA in the read buffer 3621 when the entire 3D extent block 8310 shown in FIG. 83A is read. As shown in FIG. 83C, each time a 2D extent Lk is read, the stored data amount DA in the read buffer 3621 increases. Accordingly, it is possible to store a sufficient buffer margin amount in the read buffer 3621 by reading a sufficient number of 2D extents from the 3D extent block 8310 before a layer switch and before reading of a BD-J object file or the like. Note that extent ATC time Tsum of the entire 3D extent block necessary for storing the buffer margin amount is represented, for example, by the following expression.

$$T_{sum} \geq T_{seamless} \times \frac{R_{ud-2D}}{R_{max2D} - R_{ext2D-av}}$$

[S] Reading of a BD-J Object File

Processing to read a BD-J object file may interrupt playback of video images from 3D extent blocks. In this case, the playback device 102 prevents underflow in the read buffers during interrupt processing as follows.

FIG. 84A is a schematic diagram showing the case when a BD-J object file is read during the period in which 3D video images are played back from a 3D extent block 8401 in accordance with a playback path 8420 in L/R mode. First, the playback device 102 in L/R mode reads data block groups from the 3D extent block 8401 in accordance with the playback path 8420. As shown in modification [R], while these data block groups are being read, buffer margin amounts UL1 and UL2 are stored in the read buffers 4201 and 4202. When processing to read a BD-J object file interrupts, a first long jump $J_{BDJ}1$ from the playback path 8420 to the recording area 8402 for the BD-J object file occurs. Subsequently, the BD-J object file is read from the recording area 8402. When reading is finished, a second long jump $J_{BDJ}2$ from this recording area 8402 to the playback path 8420 occurs. Playback processing of the 3D extent block 8401 thus restarts from the location at which the first long jump $J_{BDJ}1$ occurred.

During the processing to read the BD-J object file shown in FIG. 84A, the following conditions should be met to prevent underflow in the first read buffer 4021. First, the buffer margin amount UL1 should be equal to or greater than the data amount read from the first read buffer 4021 from the start of the first long jump $J_{BDJ}1$ until the end of the second long jump $J_{BDJ}2$. Accordingly, the condition the buffer margin amount UL1 should meet is represented in expression 56 in terms of the size $S_{JAVA}$ of the BD-J object file that is read, the jump time $T_{jump}$ of the long jumps $J_{BDJ}1$ and $J_{BDJ}2$, and the mean value $R_{ext1-av}$ of the base-view transfer rate for the entire 3D extent block 8401.

$$UL1 \geq R_{ext1-av} \times \left(2 \times T_{jump} + \frac{S_{JAVA}}{R_{ud-3D}}\right) \qquad (56)$$

Next, the condition that the time $T_R$ for read processing of the BD-J object file should fulfill is represented in expression 57 in terms of the minimum capacity RB1 of the first read buffer 4021.

$$T_R = 2 \times T_{jump} + \frac{S_{JAVA}}{R_{ud-3D}} + \frac{RB1}{R_{ext1-av}} \times \frac{R_{ud-3D} - (R_{max1} + R_{max2}) + (R_{ext1-av} + R_{ext2-av})}{(R_{max1} + R_{max2}) - (R_{ext1-av} + R_{ext2-av})} \qquad (57)$$

In this expression, the mean transfer rates $R_{ext1-av}$ and $R_{ext2-av}$ for the entire 3D extent block 8401 equal 192/188 times the mean transfer rates $R_{AV1}$ and $R_{AV2}$ of TS packets: $R_{extk-av} = R_{AVk} \times 192/188$ (k=1, 2). Furthermore, the maximum values $R_{max1}$ and $R_{max2}$ of the mean transfer rates $R_{ext1}$ and $R_{ext2}$ are respectively equal to the system rates for the file 2D and file DEP that refer to the 3D extent block 8401, i.e. 192/188 times the recording rates $R_{TS1}$ and $R_{TS2}$ of TS packets belonging to each file: $R_{maxk} = R_{TSk} \times 192/188$ (k=1, 2). Expression 57 is calculated the same way as expression 49.

Whether or not the playback device 102 in 3D playback mode can guarantee completion of processing to read the BD-J object file within the time $T_R$ may be expressed as a specific flag. By referring to this flag, an application program can determine whether or not to read the BD-J object file during playback of 3D video images. For example, suppose that the system rate $R_{TS1}+R_{TS2}$ for the file SS which refers to the 3D extent block 8401 is 60 Mbps, the sum of the mean transfer rates for the 3D extent block 8401 $R_{AV1}+R_{AV2}$ is 50 Mbps, and the time $T_R$ is 20 seconds. In this case, if the playback device 102 can guarantee reading of the BD-J object file within 20 seconds or less even when the sum of the mean transfer rates $R_{AV1}+R_{AV2}$ is equal to or less than 50 Mbps, it turns the flag on. Otherwise, the playback device 102 turns the flag off.

FIG. 84B is a schematic diagram showing the case when a BD-J object file is read while 2D video images are being played back from a 3D extent block 8401 in accordance with a playback path 8410 in 2D playback mode. First, the playback device 102 in 2D playback mode reads data block groups from the 3D extent block 8401 in accordance with the playback path 8410. As shown in modification [R], while these data block groups are being read, the buffer margin amount UL is stored in the read buffer 3621. When processing to read a BD-J object file interrupts, a first long jump $J_{BDJ}1$ from the playback path 8410 to the recording area 8402 for the BD-J object file occurs. Subsequently, the BD-J object file is read from the recording area 8402. When reading is finished, a second long jump $J_{BDJ}2$ from this recording area 8402 to the playback path 8410 occurs. Playback processing of the 3D extent block 8401 thus restarts from the location at which the first long jump $J_{BDJ}1$ occurred.

During the processing to read the BD-J object file shown in FIG. 84B, the following conditions should be met to prevent underflow in the read buffer 3621. The condition the buffer margin amount UL should meet is represented in expression 58 in terms of the size $S_{JAVA}$ of the BD-J object file that is read, the jump time $T_{jump}$ of the long jumps $J_{BDJ}1$ and $J_{BDJ}2$, and the mean transfer rate $R_{ext2D-av}$ for the entire 3D extent block 8401.

$$UL1 \geq R_{ext2D-av} \times \left(2 \times T_{jump} + \frac{S_{JAVA}}{R_{ud-2D}}\right) \qquad (58)$$

In this expression, the read rate Rud-2D of the BD-ROM drive 3601 is, for example, 54 Mbps. Also, when the jump distance of the long jumps $J_{BDJ}1$ and $J_{BDJ}2$ is, for example, ⅓ of a stroke, the jump time $T_{jump}$ equals 1020 ms, which is the sum of the maximum jump time $T_{jump\_max}$ (1000 ms) and the time necessary for error correction processing (20 ms).

Next, the condition the time $T_R$ for the reading of the BD-J object file should meet is represented in expression 59 in terms of the minimum capacity RB of the read buffer 3621.

$$T_R = 2 \times T_{jump} + \frac{S_{JAVA}}{R_{ud-2D}} + \frac{RB}{R_{ext2D-av}} \times \frac{R_{ud-2D} - R_{max2D} + R_{ext2D-av}}{R_{max2D} - R_{ext2D-av}} \qquad (59)$$

In this expression, the mean transfer rates $R_{ext2D-av}$ for the entire 3D extent block 8401 equals 192/188 times the mean transfer rates $R_{AV}$ of TS packets belonging to the file 2D: $R_{ext2D-av} = R_{AV} \times 192/188$. Furthermore, the maximum value $R_{max2D}$ of the mean transfer rate $R_{ext2D}$ equals the system rate for the file 2D that refers to the 3D extent block 8401, i.e. 192/188 times the recording rate $R_{TS}$ of TS packets belonging to the file 2D: $R_{max2D} = R_{TS} \times 192/188$. Expression 59 is calculated the same way as expression 57.

Whether or not the playback device 102 in 2D playback mode can guarantee completion of processing to read the BD-J object file within the time $T_R$ may be expressed as a specific flag. By referring to this flag, an application program can determine whether or not to read the BD-J object file during playback of 2D video images. For example, suppose that the system rate $R_{TS}$ for the file 2D which refers to the 3D extent block 8401 is 45 Mbps, the mean transfer rate for the 3D extent block 8401 $R_{AV}$ is 35 Mbps, and the time $T_R$ is 20 seconds. In this case, if the playback device 102 can guarantee reading of the BD-J object file within 20 seconds or less even when the mean transfer rate $R_{AV}$ is equal to or less than 35 Mbps, it turns the flag on. Otherwise, the playback device 102 turns the flag off.

[T] A clip information file may be provided for the file SS in the same way as for the file 2D and the file DEP. This file is useful for trickplay such as interrupt playback. In this file, SPNs for an entry map represent serial numbers for source packets in the entire file SS. Accordingly, the size of each 3D extent needs to be set to a common multiple, such as 6 KB, of the source packet size, 192 bytes, and the sector size, 2048 bytes.

FIG. 85A is a schematic diagram representing (k+1) source packets SP #0, SP #1, SP #2, ..., SP #k to be included in one 3D extent. In FIG. 85A, the length AT1 of the rectangles representing each source packet SP #0, SP #1, SP #2, ..., SP #k represents the ATC time of the source packet. This ATC time AT1 equals, in the playback processing system in 3D playback mode shown in FIG. 58, the amount of time necessary to transfer the source packet from either of the read buffers 4021 and 4022 to the system target decoder 4023. When a 3D extent consists of source packets SP #0-SP #k, first the total ATC time of the source packets is set to be equal to or less than the minimum extent ATC time $minT_{ext}$, as shown in FIG. 85A. This minimum extent ATC time $minT_{ext}$ equals, for example, the total ATC time for a 6 KB source packet group.

FIG. 85B is a schematic diagram showing the source packets SP #0-SP #k along an ATC time axis in order of ATS. Each of the positions ATS0-ATSk of the tops of the rectangles representing the source packets SP #0, SP #1, SP #2, ..., SP #k represents the value of the ATS for the source packet. During the process of creating a disc image, free space between the source packets SP #0-SP #k is first detected. In the example shown in FIG. 85B, there is a space between the time ATS0+AT1 when SP #0 is completely transferred from the read buffer 4021 or 4022 to the system target decoder 4023 and the time ATS1 when transfer of SP #1 begins. The same is true between SP #1 and SP #2. Furthermore, there is a space between the time ATSk+AT1 when SP #k is completely transferred from the read buffer 4021 or 4022 to the system target decoder 4023 and the time ATS0+$minT_{ext}$, i.e. the time once the minimum extent ATC time $minT_{ext}$ has passed after the time ATS0 indicated by the ATS of SP #0.

FIG. 85C is a schematic diagram showing NULL packets inserted into the empty regions shown in FIG. 85B. As shown in FIG. 85C, the process of creating a disc image also includes insertion of NULL packets into the detected free spaces between the source packets SP#0-SP#k. As a result, the total of the size of the source packets SP#0-SP#k and the NULL packets coincides with 6 KB. These packets are multiplexed into a single 3D extent. The size of each 3D extent is thus set to 6 KB.

[U] Multi-Angle

Figures 86A, 86B, 86C:
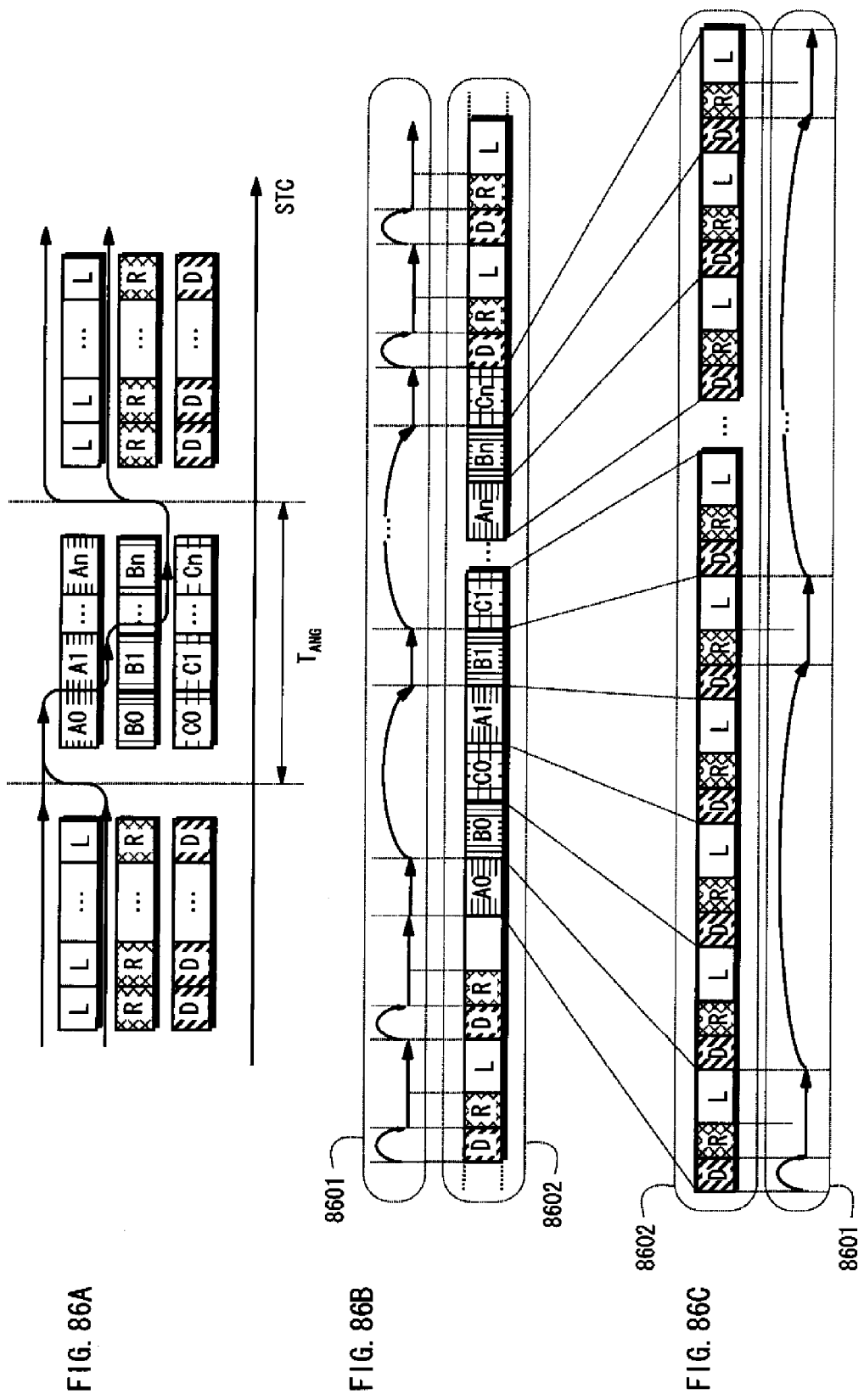
FIG. 86A is a schematic diagram showing a playback path for multiplexed stream data supporting multi-angle.
FIG. 86B is a schematic diagram showing a data block 8601 recorded on a BD-ROM disc according to modification [U] of embodiment 1 of the present invention and a corresponding playback path 8602 in L/R mode.
FIG. 86C is a schematic diagram showing the 3D extent blocks constituting pieces of stream data Ak, Bk, and Ck for different angles.

FIG. 86A is a schematic diagram showing a playback path for multiplexed stream data supporting multi-angle. As shown in FIG. 86A, three types of pieces of stream data L, R, and D respectively for a base-view, right-view, and depth map are multiplexed in the multiplexed stream data. For example, in L/R mode the base-view and right-view pieces of stream data L and R are played back in parallel. Furthermore, pieces of stream data Ak, Bk, and Ck (k=0, 1, 2, ..., n) for different angles are multiplexed in the section played back during a multi-angle playback period $T_{ANG}$. The stream data Ak, Bk, and Ck for different angles is divided into sections for which the playback time equals the angle change interval. Furthermore, stream data for the base-view, right-view and depth map is multiplexed in each of the pieces of data Ak, Bk, and Ck. During the multi-angle playback period $T_{ANG}$, playback can be switched between the pieces of stream data Ak, Bk, and Ck for different angles in response to user operation or instruction by an application program.

FIG. 86B is a schematic diagram showing a data block 8601 recorded on a BD-ROM disc and a corresponding playback path 8602 in L/R mode. This data block group 8601 includes the pieces of stream data L, R, D, Ak, Bk, and Ck shown in FIG. 86A. As shown in FIG. 86B, in addition to the regular pieces of stream data L, R, and D, the pieces of stream data Ak, Bk, and Ck for different angles are recorded in an interleaved arrangement. In L/R mode, as shown in the playback path 8602, the right-view and base-view data blocks R and L are read, and reading of the depth map data blocks D is skipped by jumps. Furthermore, from among the pieces of stream data Ak, Bk, and Ck for different angles, the data blocks for the selected angles A0, B1, ..., Cn are read, and reading of other data blocks is skipped by jumps.

FIG. 86C is a schematic diagram showing the 3D extent blocks constituting the pieces of stream data Ak, Bk, and Ck for different angles. As shown in FIG. 86C, the pieces of stream data Ak, Bk, and Ck for each angle are composed of three types of data blocks L, R, and D respectively for a base-view, right-view, and depth map. Furthermore, these data blocks L, R, and D are recorded in an interleaved arrangement. In L/R mode, as shown by the playback path 8602, from among the pieces of stream data Ak, Bk, and Ck for different angles, right-view and base-view data blocks R and L are read for selected angles A0, B1, ..., Cn. Conversely, the other data blocks are skipped by jumps.

The 3D extent blocks constituting the pieces of stream data Ak, Bk, and Ck for each angle may be arranged in the following three ways.

Figure 87A:
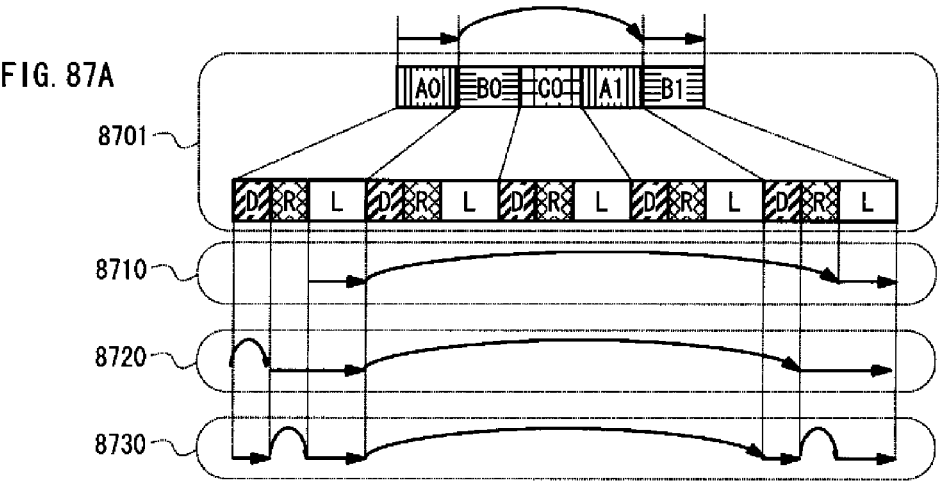
FIG. 87A is a schematic diagram showing a first 3D extent block 8701 supporting multi-angle and three types of corresponding playback paths 8710, 8720, and 8730.

FIG. 87A is a schematic diagram showing a first 3D extent block 8701 supporting multi-angle and three types of corresponding playback paths 8710, 8720, and 8730. The playback paths 8710, 8720, and 8730 respectively represent the paths for 2D playback mode, L/R mode, and depth mode. In the first 3D extent block 8701, the pieces of stream data Ak, Bk, and Ck for each angle are composed of three data blocks L, R, and D. In this case, the playback time for one data block equals the angle change interval. Accordingly, the angle change interval is small. On the other hand, the buffer margin amount necessary for a jump has to be guaranteed via reading of one data block. As a result, the mean transfer rate $R_{extk}$ (k=1, 2, 3) of each data block has to be maintained at a low level.

Figure 87B:
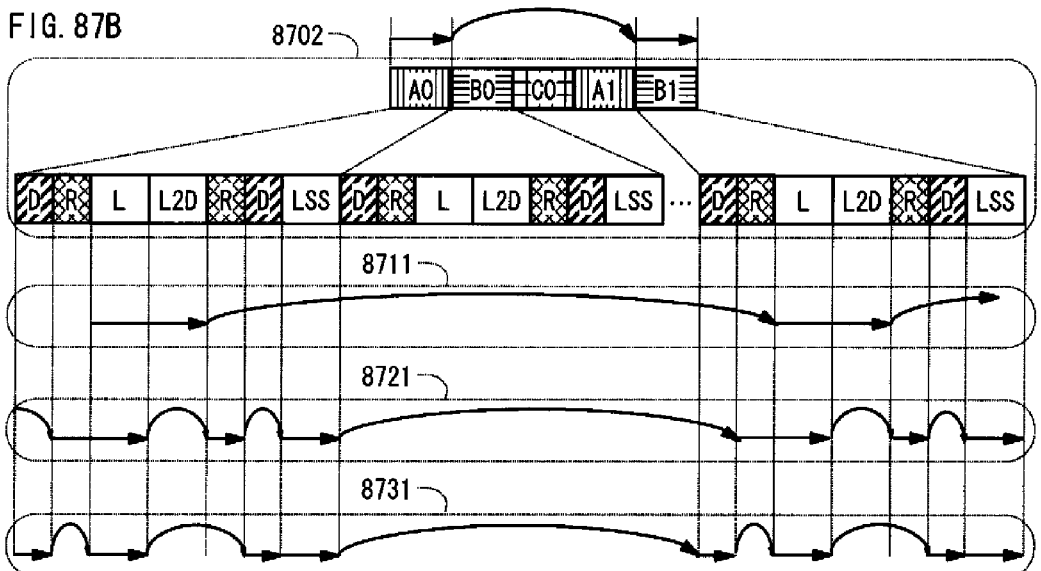
FIG. 87B is a schematic diagram showing a second 3D extent block 8702 supporting multi-angle and three types of corresponding playback paths 8711, 8721, and 8731.

FIG. 87B is a schematic diagram showing a second 3D extent block 8702 supporting multi-angle and three types of corresponding playback paths 8711, 8721, and 8731. In the second 3D extent block 8702, the pieces of stream data Ak, Bk, and Ck for each angle are composed of seven data blocks Rj, Dj, L, $L_{2D}$, and $L_{ss}$ (j=1, 2) in the same interleaved arrangement as in arrangement 6. Furthermore, the sum of the playback times for two data blocks equals the angle change interval. Accordingly, the angle change interval is large. Also, for seamless playback in 2D playback mode, the sum of the sizes of the base-view data block L and the block exclusively for 2D playback $L_{2D}$ has to be 1.5 times the size of the base-view data block L shown in FIG. 87A. In 3D playback mode, however, the buffer margin amount necessary for a jump should be guaranteed by reading two data blocks. For example, in the playback path 8712 in L/R mode, the pair R1 and L of the first right-view and base-view data blocks, the next right-view data block R2, and the block exclusively for 3D playback $L_{ss}$ are read. The same is true for depth mode. As a result, unlike the arrangement shown in FIG. 87A, the mean transfer rate $R_{extk}$ (k=1, 2, 3) of each data block can be maintained at a high value.

Figure 87C:
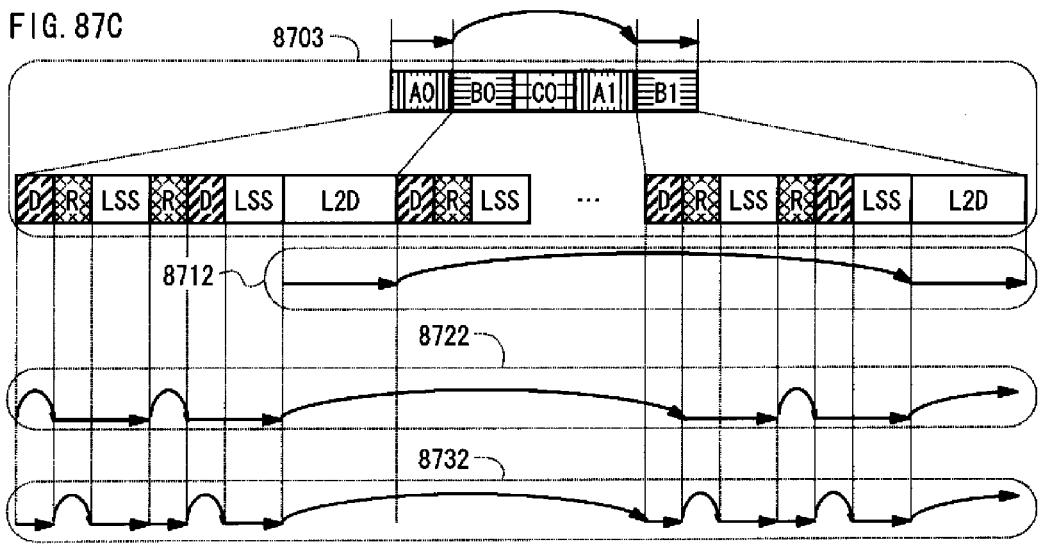
FIG. 87C is a schematic diagram showing a third 3D extent block 8703 supporting multi-angle and three types of corresponding playback paths 8712, 8722, and 8732.

FIG. 87C is a schematic diagram showing a third 3D extent block 8703 supporting multi-angle and three types of corresponding playback paths 8712, 8722, and 8732. In the third 3D extent block 8703, the pieces of stream data Ak, Bk, and Ck for each angle are composed of seven data blocks Rj, Dj, $L_{ss}$j, and $L_{2D}$, (j=1, 2). The arrangement of these data blocks differs from the arrangement shown in FIG. 87B in that the block exclusively for 2D playback $L_{2D}$ is located at the end, and that the playback path 8712 in 2D playback mode only traverses the block exclusively for 2D playback $L_{2D}$. In 3D playback mode, the sum of the playback times for two data blocks equals the angle change interval. Accordingly, the angle change interval is large. Also, for seamless playback in 2D playback mode, the size of the block exclusively for 2D playback $L_{2D}$ has to be two times the size of the base-view data block L shown in FIG. 87A. In 3D playback mode, however, the buffer margin amount necessary for a jump should be guaranteed by reading two data blocks. For example, in the playback path 8722 in L/R mode, the pair of the first right-view data block R1 and the block exclusively for 3D playback $L_{ss}$1 and the pair of the next right-view data block R2 and the block exclusively for 3D playback $L_{ss}$2 are read. The same is true for depth mode. As a result, unlike the arrangement shown in FIG. 87A, the mean transfer rate $R_{extk}$ (k=1, 2, 3) of each data block can be maintained at a high value. Furthermore, unlike the arrangement shown in FIG. 87B, the block exclusively for 2D playback $L_{2D}$ is located at the end of each piece of stream data Ak, Bk, and Ck for each angle. Accordingly, in 3D playback mode, the jump distances within each angle change interval are short, and thus the mean transfer rate $R_{extk}$ of each data block can be maintained at a higher value than in the arrangement shown in FIG. 87B.

Note that in the pieces of stream data Ak, Bk, and Ck for each angle, the stream data for the base-view, right-view, and depth map may be stored as single pieces of multiplexed stream data. However, the recording rate has to be limited to the range of the system rate for which playback is possible in the 2D playback device. Also, the number of pieces of stream data (TS) to be transferred to the system target decoder differs between such pieces of multiplexed stream data and multiplexed stream data for other 3D video images. Accordingly, each piece of playitem information (PI) may include a flag indicating the number of TS to be played back. By referring to this flag, the 3D playback device can switch between these pieces of multiplexed stream data within one playlist file. In the PI that specifies two TS for playback in 3D playback mode, this flag indicates 2TS. On the other hand, in the PI that specifies a single TS for playback, such as the above pieces of multiplexed stream data, the flag indicates 1TS. The 3D playback device can switch the setting of the system target decoder in accordance with the value of the flag. Furthermore, this flag may be expressed by the value of the connection condition (CC). For example, a CC of "7" indicates a transition from 2TS to 1TS, whereas a CC of "8" indicates a transition from 1TS to 2TS.

Embodiment 2

The following describes, as the second embodiment of the present invention, a recording device and a recording method for recording the recording medium of embodiment 1 of the present invention.

The recording device described here is called an authoring device. The authoring device, generally located at a creation studio that creates movie contents to be distributed, is used by authoring staff. First, in response to operations by the authoring staff, the recording apparatus converts movie content into a digital stream that is compression encoded in accordance with an MPEG specification, i.e. into an AV stream file. Next, the recording device generates a scenario, which is information defining how each title included in the movie content is to be played back. Specifically, the scenario includes the above-described dynamic scenario information and static scenario information. Then, the recording device generates a volume image or an update kit for a BD-ROM disc from the aforementioned digital stream and scenario. Lastly, the recording device records the volume image on the recording medium in accordance with the arrangements of extents explained in embodiment 1.

Figure 88:
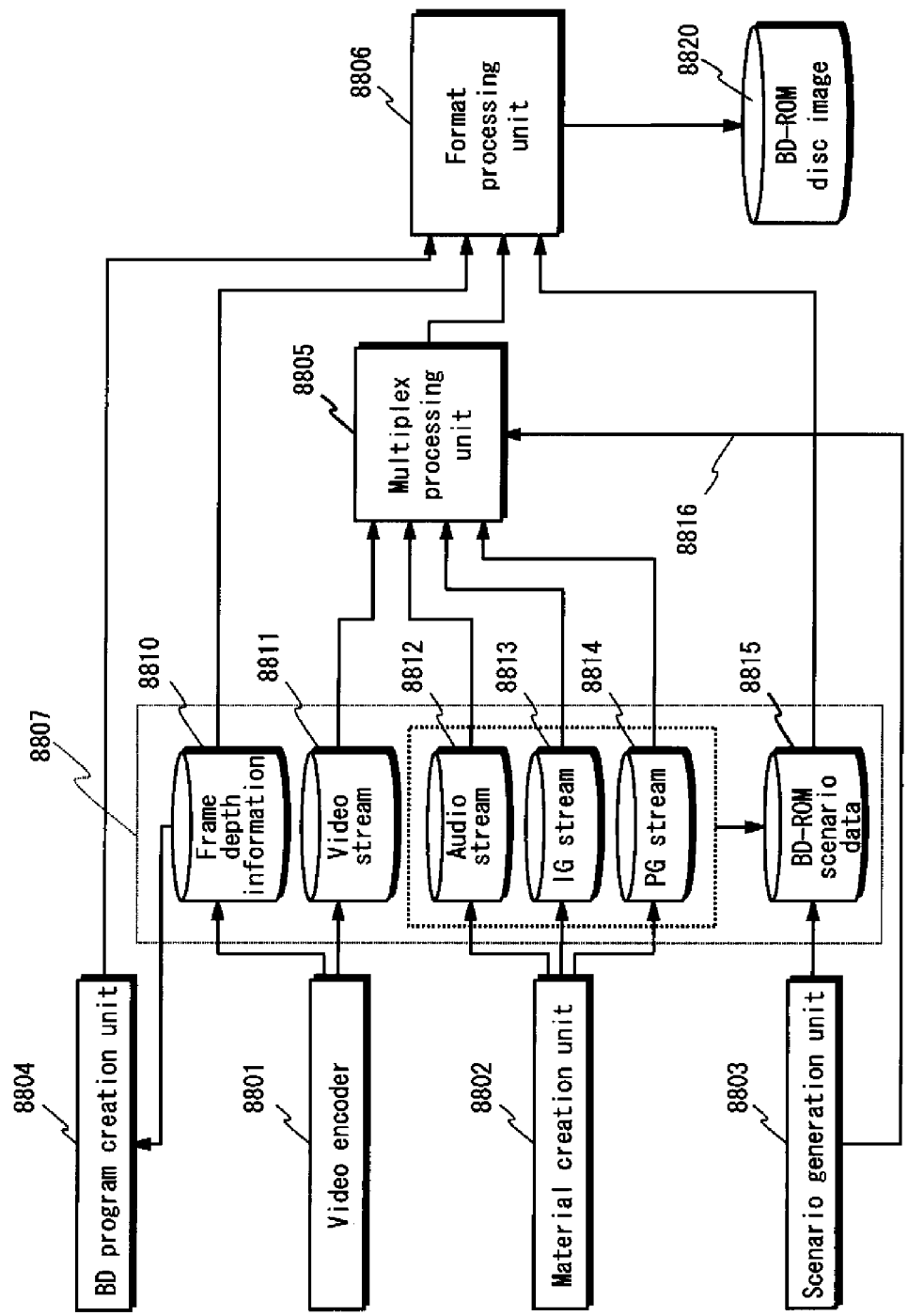
FIG. 88 is a block diagram showing the internal structure of a recording device according to embodiment 2 of the present invention.

FIG. 88 is a block diagram showing the internal structure of the above-described recording device. As shown in FIG. 88, the recording device includes a video encoder 8801, material creation unit 8802, scenario generation unit 8803, BD program creation unit 8804, multiplex processing unit 8805, format processing unit 8806, and database unit 8807.

The database unit 8807 is a nonvolatile storage device embedded in the recording device and is in particular a hard disk drive (HDD). Alternatively, the database unit 8807 may be an external HDD connected to the recording device, a nonvolatile semiconductor memory element embedded in the recording device, or an external nonvolatile semiconductor memory element connected to the recording device.

The video encoder 8801 receives video data, such as uncompressed bitmap data, from the authoring staff, and compresses the received video data in accordance with a compression/encoding scheme such as MPEG-4 AVC or MPEG-2. This process converts primary video data into a primary video stream and secondary video data into a secondary video stream. In particular, 3D video image data is converted into a base-view video stream and a dependent-view video stream. As shown in FIG. 7, the video encoder 8801 converts the left-view video stream into a base-view video stream by performing inter-picture predictive encoding with the pictures in the left-view video stream. On the other hand, the video encoder 8801 converts the right-view video stream into a dependent-view video stream by performing inter-picture predictive encoding with not only the pictures in the right-view video stream but also the pictures in the base-view video stream. Note that the right-view video stream may be converted into a base-view video stream. Furthermore, the left-view video stream may be converted into the dependent-view video stream. The converted video streams 8811 are stored in the database unit 8807.

During the above-described process of inter-picture predictive encoding, the video encoder 8801 further detects motion vectors between left video images and right video images and calculates depth information of each 3D video image based on the detected motion vectors. The calculated depth information of each 3D video image is organized into the frame depth information 8810 that is stored in the database unit 8807.

Figure 89:
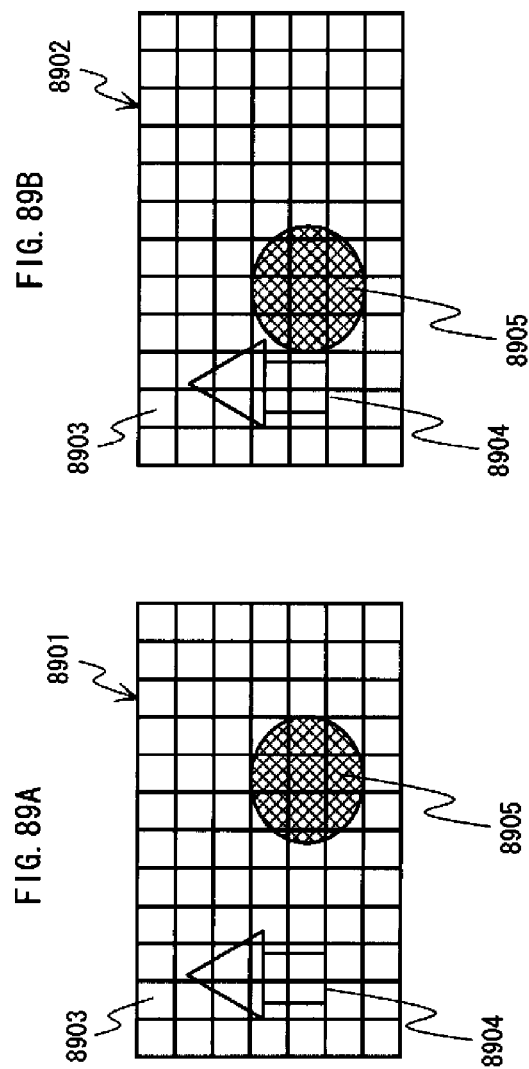
FIGS. 89A and 89B are schematic diagrams showing left-video image picture and a right-video image picture used in display of one scene in a 3D video image in a recording device according to embodiment 2 of the present invention.
FIG. 89C is a schematic diagram showing depth information calculated from these pictures by a video encoder 8801.

FIGS. 89A and 89B are schematic diagrams showing a left-video image picture and a right-video image picture used in display of one scene in a 3D video image, and FIG. 64C is a schematic diagram showing depth information calculated from these pictures by a video encoder 8801.

The video encoder 8801 first compresses each picture using the redundancy between the left and right pictures. At that time, the video encoder 8801 compares an uncompressed left picture and an uncompressed right picture on a per-macroblock basis (each macroblock containing a matrix of 8×8 or 16×16 pixels) so as to detect a motion vector for each image in the two pictures. Specifically, as shown in FIGS. 89A and 89B, a left video picture 8901 and a right video picture 8902 are each divided into macroblocks 8903, the entirety of which represents a matrix. Next, the areas occupied by the image data in picture 8901 and picture 8902 are compared for each macroblock 8903, and a motion vector between these pieces of image data is detected based on the result of the comparison. For example, the area occupied by image 8904 showing a "house" in picture 8901 is substantially the same as that in picture 8902. Accordingly, a motion vector is not detected from such areas. On the other hand, the area occupied by image 8905 showing a "circle" in picture 8901 is substantially different from the area in picture 8902. Accordingly, a motion vector indicating the displacement between the images 8905 showing the "circles" in the pictures 8901 and 8902 is detected from these areas.

The video encoder 8801 next makes use of the detected motion vector not only when compressing the pictures 8901 and 8902, but also when calculating the binocular parallax pertaining to a 3D video image constituted from the pieces of image data 8904 and 8905. Furthermore, in accordance with the binocular parallax thus obtained, the video encoder 8801 calculates the "depths" of each image, such as the images 8904 and 8905 of the "house" and "circle". The information indicating the depth of each image may be organized, for example, into a matrix 8906 the same size as the matrix of the macroblocks in pictures 8901 and 8902 as shown in FIG. 89C. The frame depth information 8810 shown in FIG. 88 includes this matrix 8906. In this matrix 8906, blocks 8907 are in one-to-one correspondence with the macroblocks 8903 in pictures 8901 and 8902. Each block 8907 indicates the depth of the image shown by the corresponding macroblocks 8903 by using, for example, a depth of eight bits. In the example shown in FIGS. 89A-C, the depth of the image 8905 of the "circle" is stored in each of the blocks in an area 8908 in the matrix 8906. This area 8908 corresponds to the entire areas in the pictures 8901 and 8902 that represent the image 8905.

Referring again to FIG. 88, the material creation unit 8802 creates elementary streams other than video streams, such as an audio stream 8812, PG stream 8813, and IG stream 8814 and stores the created streams into the database unit 8807. For example, the material creation unit 8802 receives uncompressed LPCM audio data from the authoring staff, encodes the uncompressed LPCM audio data in accordance with a compression/encoding scheme such as AC-3, and converts the encoded LPCM audio data into the audio stream 8812. The material creation unit 8802 additionally receives a subtitle information file from the authoring staff and creates the PG stream 8813 in accordance with the subtitle information file. The subtitle information file defines image data for showing subtitles, display timings of the subtitles, and visual effects to be added to the subtitles (e.g., fade-in and fade-out). Furthermore, the material creation unit 8802 receives bitmap data and a menu file from the authoring staff and creates the IG stream 8814 in accordance with the bitmap data and the menu file. The bitmap data shows images that are to be presented on a menu. The menu file defines how each button on the menu is to be transitioned from one status to another and defines visual effects to be added to each button.

The scenario generation unit 8803 creates BD-ROM scenario data 8815 in response to an instruction that has been issued by the authoring staff and received via GUI and then stores the created BD-ROM scenario data 8815 in the database unit 8807. The BD-ROM scenario data 8815 described here is a file group that defines methods of playing back the elementary streams 8811-8814 stored in the database unit 8807. Of the file group shown in FIG. 2, the BD-ROM scenario data 8815 includes the index file 211, the movie object file 212, and the playlist files 221-223. The scenario generation unit 8803 further creates a parameter file 8816 and transfers the created parameter file 8816 to the multiplex processing unit 8805. The parameter file 8816 defines, from among the elementary streams 8811-8814 stored in the database unit 8807, stream data to be multiplexed into the main TS and sub-TS.

The BD program creation unit 8804 provides the authoring staff with a programming environment for programming a BD-J object and Java application programs. The BD program creation unit 8804 receives a request from a user via GUI and creates each program's source code according to the request. The BD program creation unit 8804 further creates the BD-J object file 251 from the BD-J object and compresses the Java application programs in the JAR file 261. The files 251 and 261 are transferred to the format processing unit 8806.

Here, it is assumed that the BD-J object is programmed in the following way: the BD-J object causes the program execution units 3634 and 4034 shown in FIGS. 36 and 40 to transfer graphics data for GUI to the system target decoders 3622 and 4023. Furthermore, the BD-J object causes the system target decoders 3622 and 4023 to process graphics data as image plane data. In this case, the BD program creation unit 8804 may set the offset value corresponding to the image plane data in the BD-J object by using the frame depth information 8810 stored in the database unit 8807.

In accordance with the parameter file 8816, the multiplex processing unit 8805 multiplexes each of the elementary streams 8811-8814 stored in the database unit 8807 to form a stream file in MPEG-2 TS format. More specifically, as shown in FIG. 4, each of the elementary streams 8811-8814 is converted into a source packet sequence, and the source packets included in each sequence are assembled to construct a single piece of multiplexed stream data. In this manner, the main TS and sub-TS are created.

In parallel with the aforementioned processing, the multiplex processing unit 8805 creates the 2D clip information file and dependent-view clip information file by the following procedure. First, the entry map 2030 shown in FIG. 21 is generated for each file 2D and file DEP. Next, referring to each entry map, the extent start point list 2320 shown in FIG. 23 is created. Afterwards, the stream attribute information shown in FIG. 20 is extracted from each elementary stream to be multiplexed into the main TS and sub-TS. Furthermore, as shown in FIG. 20, a combination of an entry map, a piece of 3D meta data, and a piece of stream attribute information is associated with a piece of clip information.

The format processing unit 8806 creates a BD-ROM disc image 8820 of the directory structure shown in FIG. 2 from (i) the BD-ROM scenario data 8815 stored in the database unit 8807, (ii) a group of program files including, among others, a BD-J object file created by the BD program creation unit 8804, and (iii) multiplexed stream data and clip information files generated by the multiplex processing unit 8805. In this directory structure, UDF is used as a file system.

When creating file entries for each of the files 2D, files DEP, and files SS, the format processing unit 8806 refers to the entry maps and 3D meta data included in each of the 2D clip information files and dependent-view clip information files. The SPN for each entry point and extent start point is thereby used in creating each allocation descriptor. In particular, allocation descriptors are created so as to represent the interleaved arrangement shown in FIG. 15. The file SS and file 2D thus share each base-view data block, and the file SS and file DEP thus share each dependent-view data block. On the other hand, at locations where a long jump is necessary, allocation descriptors may be created so as to represent, for example, one of arrangements 1-6. In particular, some base-view data blocks are referred to by allocation descriptors in the file 2D as blocks exclusively for 2D playback, and duplicate data thereof is referred to by allocation descriptors in the file SS as blocks exclusively for 3D playback. Furthermore, the size of each extent for the base-view and the dependent-view is set so as to satisfy expressions 1-5, and the value of the logical address shown by each allocation descriptor is determined accordingly.

In addition, by using the frame depth information 8810 stored in the database unit 8807, the format processing unit 8806 creates the offset table shown in FIG. 22A for each secondary video stream 8811, PG stream 8813, and IG stream 8814. The format processing unit 8806 furthermore stores the offset table in the 3D meta data for the 2D clip information file. At this point, the positions of image data pieces within left and right video frames are automatically adjusted so that 3D video images represented by one stream avoid overlap with 3D video images represented by other streams in the same visual direction. Furthermore, the offset value for each video frame is also automatically adjusted so that depths of 3D video images represented by one stream avoid agreement with depths of 3D video images represented by other streams.

Thereafter, the BD-ROM disc image 8820 generated by the format processing unit 8806 is converted into data suited for pressing of a BD-ROM disc. This data is then recorded on a BD-ROM disc master. Mass production of the BD-ROM disc 101 pertaining to embodiment 1 of the present invention is made possible by pressing the master.

Embodiment 3

Figure 90:
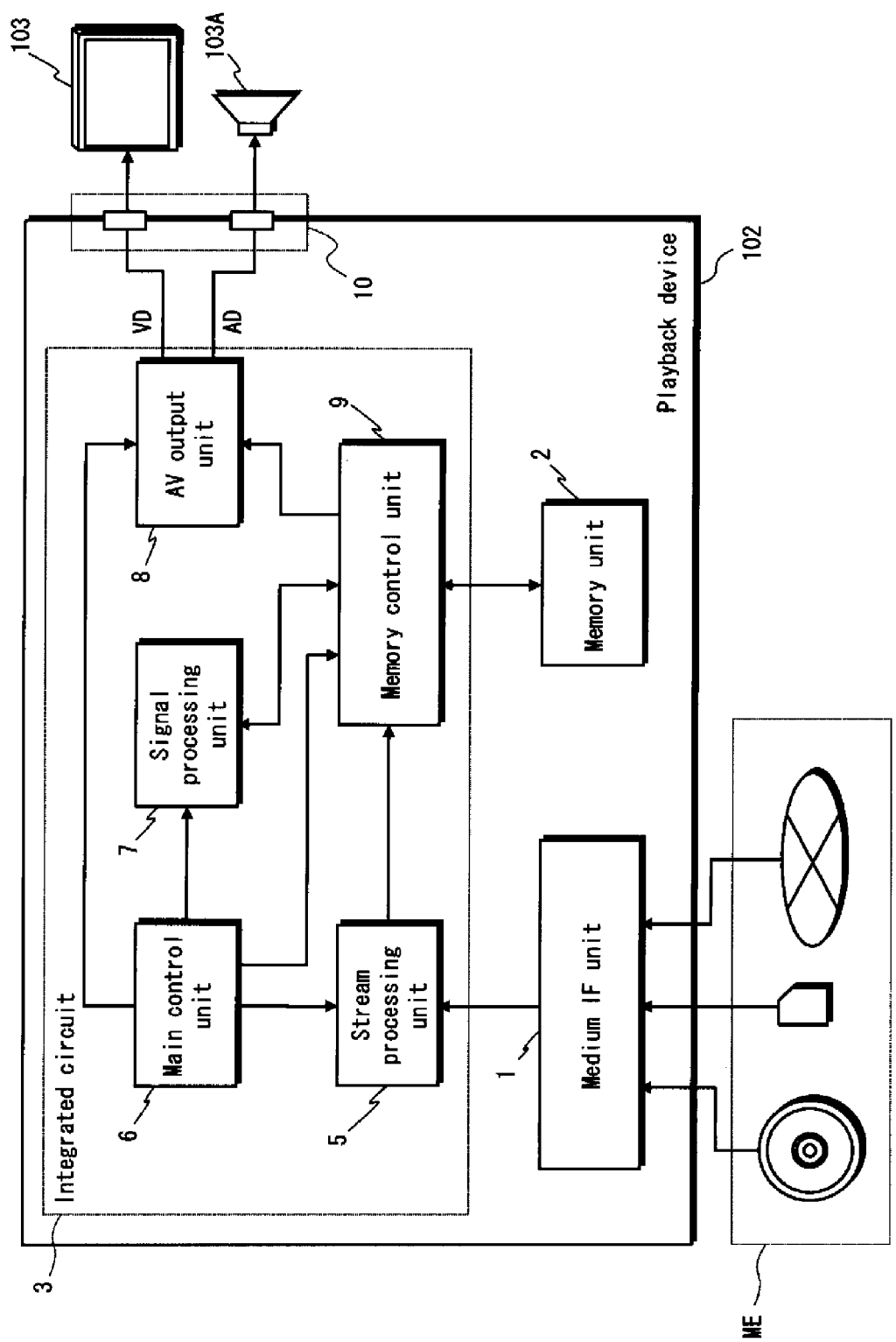
FIG. 90 is a functional block diagram of the integrated circuit 3 according to embodiment 3 of the present invention.

FIG. 90 is a functional block diagram of the integrated circuit 3 according to embodiment 3 of the present invention. As shown in FIG. 90, the integrated circuit 3 is mounted on a playback device 102 according to embodiment 1. This playback device 102 includes a medium interface (IF) unit 1, memory unit 2, and output terminal 10 in addition to the integrated circuit 3.

The medium IF unit 1 receives or reads data from an external medium ME and transmits the data to the integrated circuit 3. In particular, this data has the same structure as data on the BD-ROM disc 101 according to embodiment 1. Types of medium ME include disc recording media, such as optical discs, hard disks, etc.; semiconductor memory such as an SD card, USB memory, etc.; broadcast waves such as CATV or the like; and networks such as the Ethernet™, wireless LAN, and wireless public networks. In conjunction with the type of medium ME, types of medium IF unit 1 include a disc drive, card IF, CAN tuner, Si tuner, and network IF.

The memory unit 2 temporarily stores both the data that is received or read from the medium ME by the medium IF unit 1 and data that is being processed by the integrated circuit 3. A synchronous dynamic random access memory (SDRAM), double-data-rate x synchronous dynamic random access memory (DDRx SDRAM; x=1, 2, 3, . . . ), etc. is used as the memory unit 2. The memory unit 2 is a single memory element. Alternatively, the memory unit 2 may include a plurality of memory elements.

The integrated circuit 3 is a system LSI and performs video and audio processing on the data transmitted from the medium IF unit 1. As shown in FIG. 90, the integrated circuit 3 includes a main control unit 6, stream processing unit 5, signal processing unit 7, memory control unit 9, and AV output unit 8.

The main control unit 6 includes a processor core and program memory. The processor core includes a timer function and an interrupt function. The program memory stores basic software such as the OS. The processor core controls the entire integrated circuit 3 in accordance with the programs stored, for example, in the program memory.

Under the control of the main control unit 6, the stream processing unit 5 receives data from the medium ME transmitted via the medium IF unit 1. Furthermore, the stream processing unit 5 stores the received data in the memory unit 2 via a data bus in the integrated circuit 3. Additionally, the stream processing unit 5 separates visual data and audio data from the received data. As previously described, the data received from the medium ME includes data configured according to embodiment 1. In this case, "visual data" includes a primary video stream, secondary video streams, PG streams, and IG streams. "Audio data" includes a primary audio stream and secondary audio streams. In particular, the data configured according to embodiment 1 is separated into a plurality of extents for main-view data and sub-view data, and the extents are alternately arranged. When receiving data with this structure, under the control of the main control unit 6, the stream processing unit 5 extracts the main-view data and stores it in a first area in the memory unit 2. The stream processing unit 5 also extracts the sub-view stream and stores it in a second area in the memory unit 2. Main-view data includes the left-view video stream, and sub-view data includes the right-view video stream. The reverse may be true. Also, the combination of the main-view and sub-view may be a combination of 2D video images and corresponding depth maps. The first area and second area in the memory unit 2 referred to here are a logical division of a single memory element. Alternatively, each area may be included in physically different memory elements.

The visual data and audio data separated by the stream processing unit 5 are compressed via coding. Types of coding methods for visual data include MPEG-2, MPEG-4 AVC, MPEG-4 MVC, SMPTE VC-1, etc. In particular, in MPEG-4 AVC, context-adaptive variable length coding (CAVLC) and context-adaptive binary arithmetic coding (CABAC) are used as the picture coding method. Types of coding of audio data include Dolby AC-3, Dolby Digital Plus, MLP, DTS, DTS-HD, linear PCM, etc. Under the control of the main control unit 6, the signal processing unit 7 decodes the visual data and audio data via a method appropriate for the coding method used. The signal processing unit 7 corresponds, for example, to each of the decoders shown in FIG. 41.

The signal processing unit 7 selects the decoding method for pictures included in the main-view data (hereinafter, main-view pictures) and pictures included in the sub-view data (hereinafter, sub-view pictures) in accordance with the coding method, for example CAVLC/CABAC. Main-view and sub-view, pictures are in one-to-one correspondence. In particular, when decoding one of the sub-view pictures whose corresponding main-view picture is an I picture or a P picture, the signal processing unit 7 does not use a B picture as a reference picture. Also, when the signal processing unit 7 determines the decoding method in accordance with the coding method for each main-view picture, it refers to the header of the main-view picture but does not refer to the header of the sub-view picture. Conversely, when the signal processing unit 7 determines the decoding method in accordance with the coding method for each sub-view picture, it refers to the header of the sub-view picture but does not refer to the header of the main-view picture.

The memory control unit 9 arbitrates access to the memory unit 2 by the function blocks 5-8 in the integrated circuit 3.

Under the control of the main control unit 6, the AV output unit 8 processes the visual data and audio data decoded by the signal processing unit 7 into appropriate forms and, via separate output terminals 10, outputs the results to the display device 103 and to speakers in the display device 103. Such processing of data includes superimposing visual data, converting the format of each piece of data, mixing audio data, etc.

Figure 91:
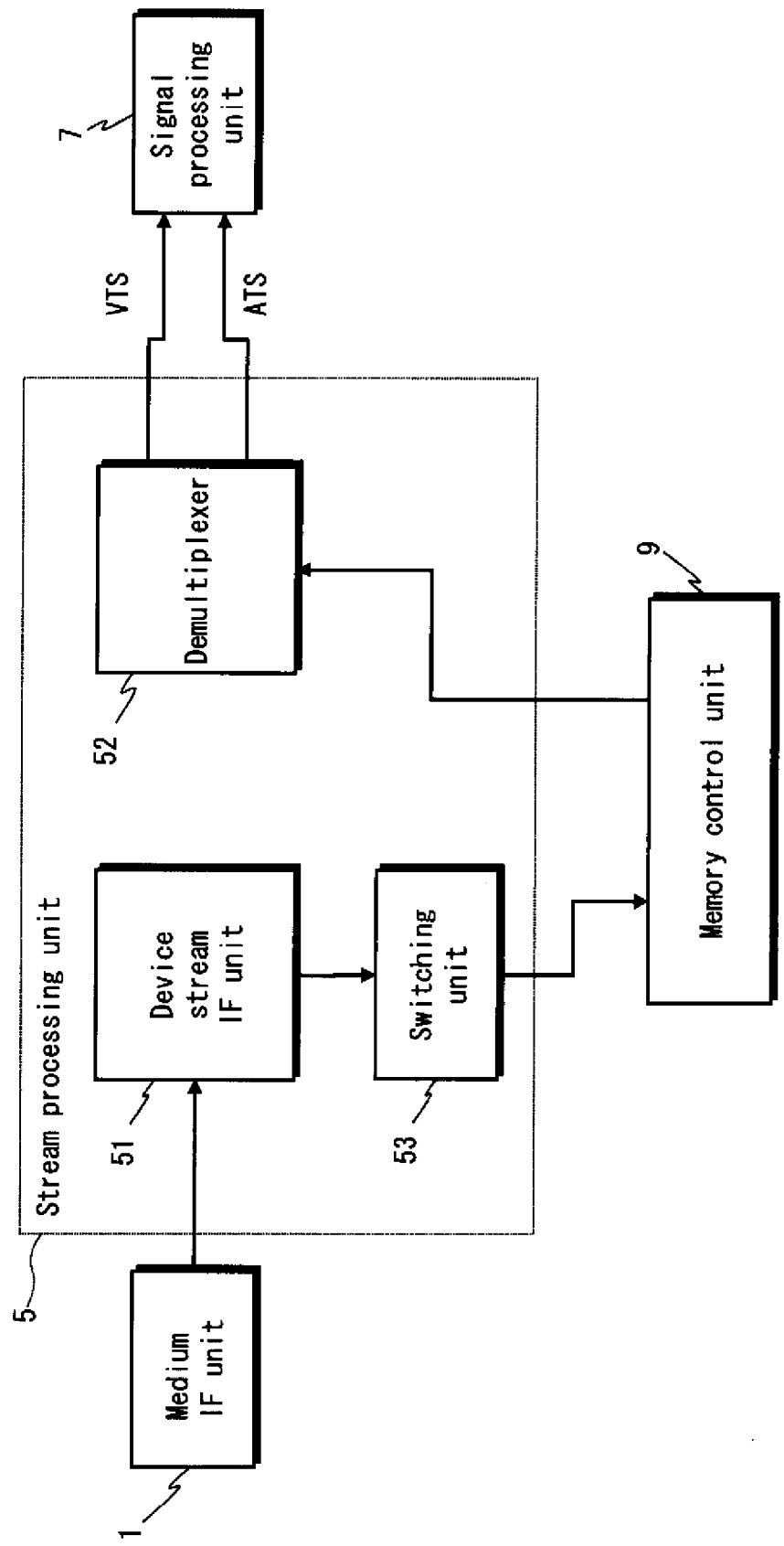
FIG. 91 is a functional block diagram showing a typical structure of the stream processing unit 5 shown in FIG. 90.

FIG. 91 is a functional block diagram showing a typical structure of the stream processing unit 5. As shown in FIG. 91, the stream processing unit 5 includes a device stream IF unit 51, a demultiplexer 52, and a switching unit 53.

The device stream IF unit 51 is an interface that transfers data between the medium IF unit 1 and the other function blocks 6-9 in the integrated circuit 3. For example, if the medium ME is an optical disc or a hard disk, the device stream IF unit 51 includes a serial advanced technology attachment (SATA), advanced technology attachment packet interface (ATAPI), or parallel advanced technology attachment (PATA). When the medium ME is a semiconductor memory such as an SD card, USB memory, etc., the device stream IF unit 51 includes a card IF. When the medium ME is a broadcast wave such as CATV or the like, the device stream IF unit 51 includes a tuner IF. When the medium ME is a network such as the Ethernet™, a wireless LAN, or wireless public network, the device stream IF unit 51 includes a network IF. Depending on the type of medium ME, the device stream IF unit 51 may achieve part of the functions of the medium IF unit 1. Conversely, when the medium IF unit 1 is internal to the integrated circuit 3, the device stream IF unit 51 may be omitted.

From the memory control unit 9, the demultiplexer 52 receives data transmitted from the medium ME to the memory unit 2 and separates visual data and audio data from the received data. Each extent included in data structured according to embodiment 1 consists of source packets for a video stream, audio stream, PG stream, IG stream, etc., as shown in FIG. 4. In some cases, however, the sub-view data may not include an audio stream. The demultiplexer 52 reads PIDs from source packets and, in accordance with the PIDs, separates a source packet group into visual TS packets $V_{TS}$ and audio TS packets $A_{TS}$. The separated TS packets $V_{TS}$ and $A_{TS}$ are transferred to the signal processing unit 7 either directly or after temporary storage in the memory unit 2. The demultiplexer 52 corresponds, for example, to the source depacketizers 4111 and 4112 and the PID filters 4113 and 4114 shown in FIG. 41.

The switching unit 53 switches the output destination in accordance with the type of data received by the device stream IF unit 51. For example, when the device stream IF unit 51 receives the main-view data, the switching unit 53 switches the storage location of the data to the first area in the memory unit 2. Conversely, when the device stream IF unit 51 receives the sub-view data, the switching unit 53 switches the storage location of the data to the second area in the memory unit 2.

Figure 92:
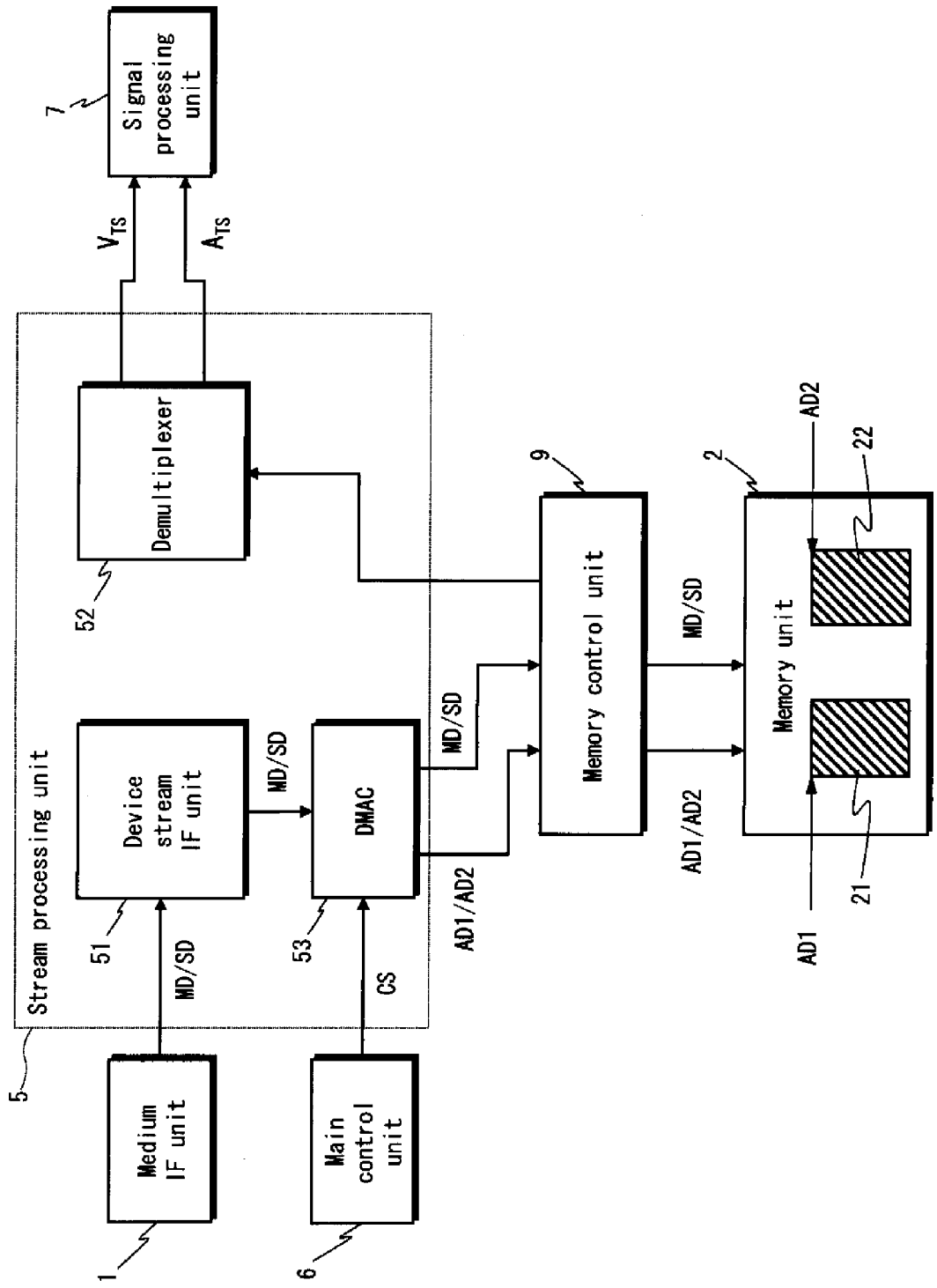
FIG. 92 is a schematic diagram showing the surrounding configuration when the switching unit 53 shown in FIG. 91 is a DMAC.

The switching unit 53 is, for example, a direct memory access controller (DMAC). FIG. 92 is a schematic diagram showing the surrounding configuration of the switching unit 53 in this case. Under the control of the main control unit 6, the DMAC 53 transmits data received by the device stream IF unit 51 as well as the address of the location for storage of the data to the memory control unit 9. Specifically, when the device stream IF unit 51 receives main-view data MD, the DMAC 53 transmits the main-view data MD along with an address 1 AD1. This "address 1" AD1 is data indicating the top address AD1 in the first storage area 21 in the memory unit 2. On the other hand, when the device stream IF unit 51 receives sub-view data SD, the DMAC 53 transmits the sub-view data SD along with an address 2 AD2. This "address 2" AD2 is data indicating the top address AD2 in the second storage area 22 in the memory unit 2. The DMAC 53 thus switches the output destination, in particular the storage location in the memory unit 2, in accordance with the type of data received by the device stream IF unit 51. The memory control unit 9 stores the main-view data MD and sub-view data SD received from the DMAC 53 in the respective areas 21 and 22 of the memory unit 2 shown by the addresses AD1 and AD2 received at the same time.

The main control unit 6 refers to the extent start points in the clip information file for the switching unit 53 to switch the storage location. In this case, the clip information file is received before the main-view data MD and sub-view data SD and is stored in the memory unit 2. In particular, the main control unit 6 refers to the file base to recognize that the data received by the device stream IF unit 51 is main-view data MD. Conversely, the main control unit 6 refers to the file DEP to recognize that the data received by the device stream IF unit 51 is sub-view data. Furthermore, the main control unit 6 transmits a control signal CS to the switching unit 53 in accordance with the results of recognition and causes the switching unit 53 to switch the storage location. Note that the switching unit 53 may be controlled by a dedicated control circuit separate from the main control unit 6.

In addition to the function blocks 51, 52, and 53 shown in FIG. 91, the stream processing unit 5 may be further provided with an encryption engine, a security control unit, and a controller for direct memory access. The encryption engine decrypts encrypted data, key data, etc. received by the device stream IF unit 51. The security control unit stores the private key and uses it to control execution of a device authentication protocol or the like between the medium ME and the playback device 102.

In the above example, when data received from the medium ME is stored in the memory unit 2, the storage location thereof is switched according to whether the data is main-view data MD or sub-view data SD. Alternatively, regardless of type, the data received from the medium ME may be temporarily stored in the same area in the memory unit 2 and separated into main-view data MD and sub-view data SD when subsequently being transferred to the demultiplexer 52.

Figure 93:
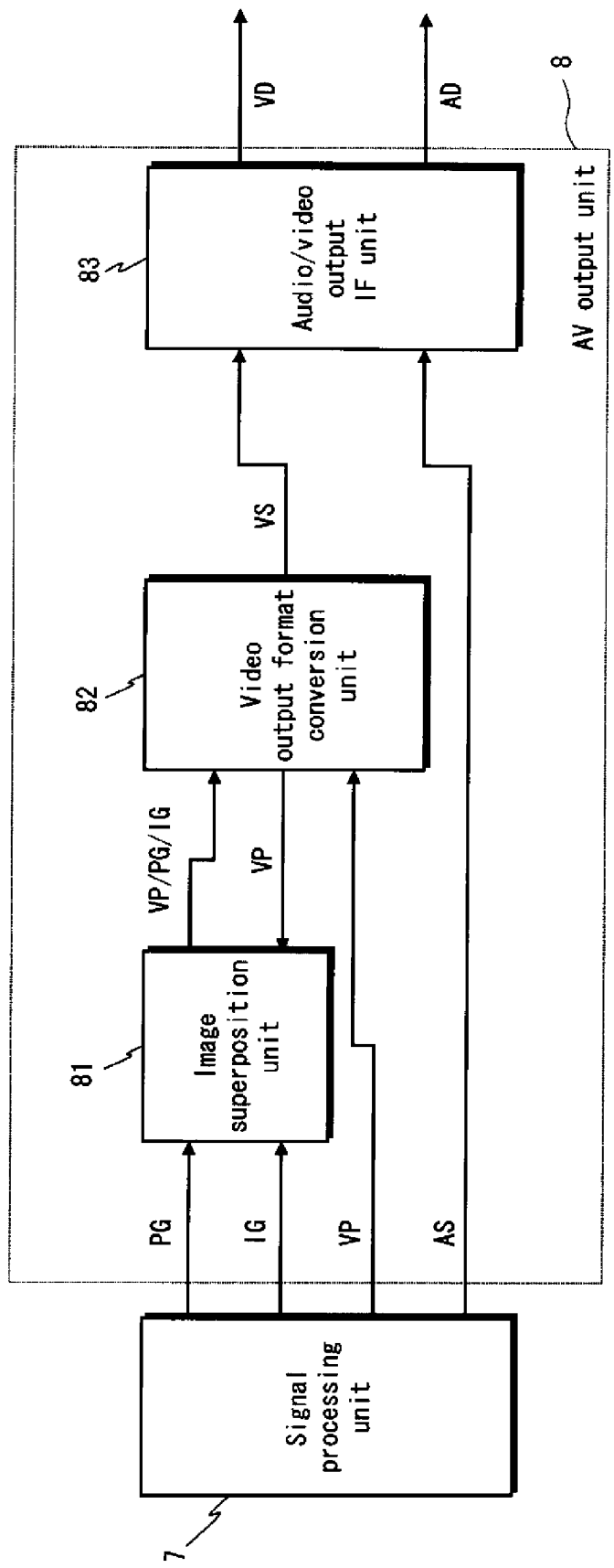
FIG. 93 is a functional block diagram showing a typical structure of the AV output unit 8 shown in FIG. 90.

FIG. 93 is a functional block diagram showing a typical structure of the AV output unit 8. As shown in FIG. 93, the AV output unit 8 is provided with an image superposition unit 81, video output format conversion unit 82, and audio/video output IF unit 83.

The image superposition unit 81 superimposes visual data VP, PG, and IG decoded by the signal processing unit 7. Specifically, the image superposition unit 81 first receives processed right-view or left-view video plane data from the video output format conversion unit 82 and decoded PG plane data PG and IG plane data IG from the signal processing unit 7. Next, the image superposition unit 81 superimposes PG plane data PG and IG plane data IG on the video plane data VP in units of pictures. The image superposition unit 81 corresponds, for example, to the plane adder 4024 shown in FIGS. 40, 41, and 43.

The video output format conversion unit 82 receives decoded video plane data VP from the signal processing unit 7 and superimposed visual data VP/PG/IG from the image superposition unit 81. Furthermore, the video output format conversion unit 82 performs various processing on the visual data VP and VP/PG/IG as necessary. Such processing includes resizing, IP conversion, noise reduction, and frame rate conversion. Resizing is processing to enlarge or reduce the size of the visual images. IP conversion is processing to convert the scanning method between progressive and interlaced. Noise reduction is processing to remove noise from the visual images. Frame rate conversion is processing to convert the frame rate. The video output format conversion unit 82 transmits processed video plane data VP to the image superposition unit 81 and transmits processed visual data VS to the audio/video output IF unit 83.

The audio/video output IF unit 83 receives visual data VS from the video output format conversion unit 82 and receives decoded audio data AS from the signal processing unit 7. Furthermore, the audio/video output IF unit 83 performs processing such as coding on the received data VS and AS in conjunction with the data transmission format. As described below, part of the audio/video output IF unit 83 may be provided externally to the integrated circuit 3.

Figure 94:
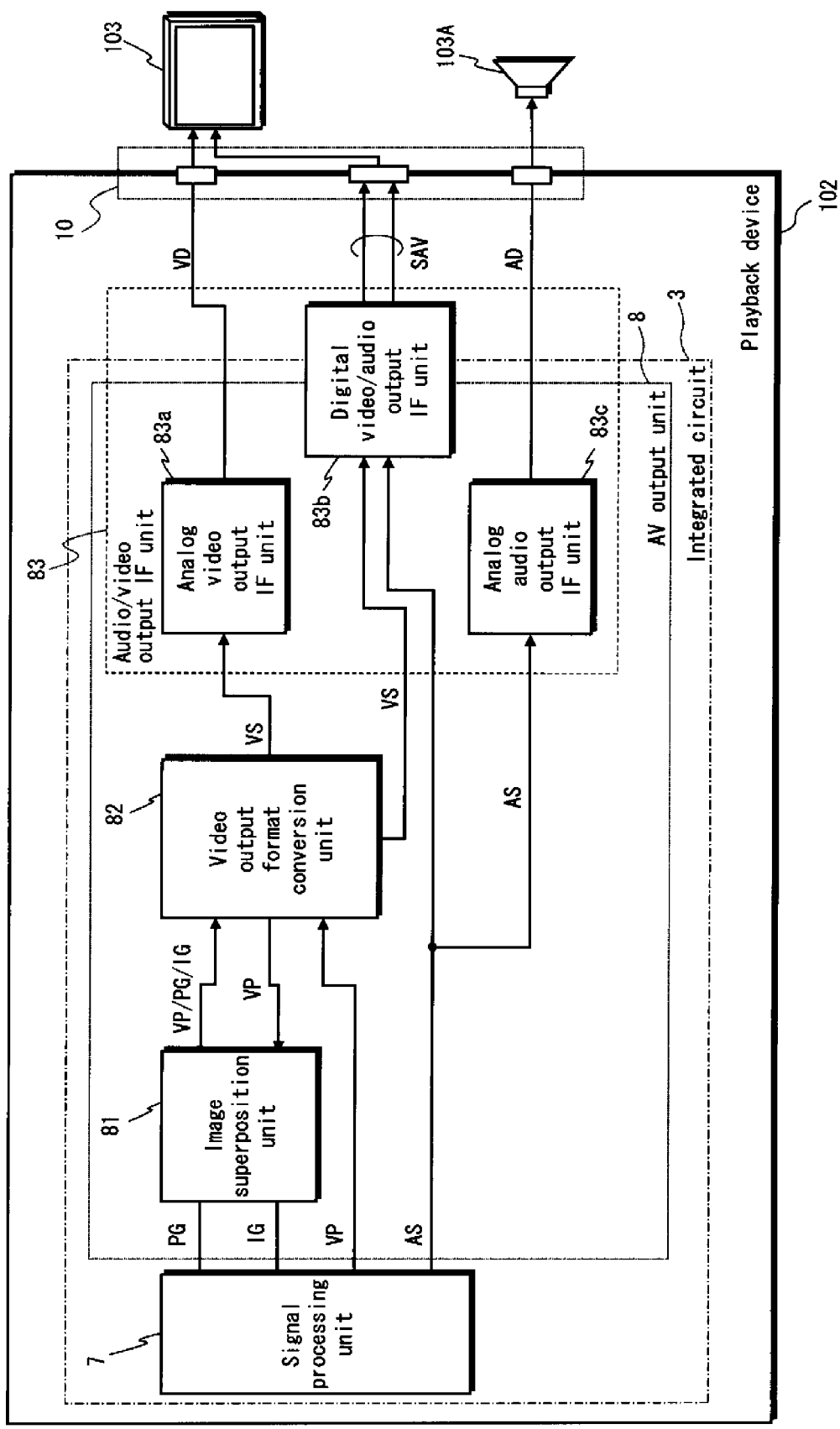
FIG. 94 is a schematic diagram showing details regarding data output by the playback device 102, which includes the AV output unit 8 shown in FIG. 93.

FIG. 94 is a schematic diagram showing details regarding data output by the playback device 102, which includes the AV output unit 8. As shown in FIG. 94, the audio/video output IF unit 83 includes an analog video output IF unit 83*a*, digital video/audio output IF unit 83*b*, and analog audio output IF unit 83*c*. The integrated circuit 3 and playback device 102 are thus compatible with various formats for transmitting visual data and audio data, as described below.

The analog video output IF unit 83*a* receives visual data VS from the video output format conversion unit 82, converts/encodes this data VS into data VD in analog video signal format, and outputs the data VD. The analog video output IF unit 83*a* includes a composite video encoder, S video signal (Y/C separation) encoder, component video signal encoder, D/A converter (DAC), etc. compatible with, for example, one of the following formats: NTSC, PAL, and SECAM.

The digital video/audio output IF unit 83*b* receives decoded audio data AS from the signal processing unit 7 and receives visual data VS from the video output format conversion unit 82. Furthermore, the digital video/audio output IF unit 83*b* unifies and encrypts the data AS and data VS. Afterwards, the digital video/audio output IF unit 83*b* encodes the encrypted data SVA in accordance with data transmission standards and outputs the result. The digital video/audio output IF unit 83*b* corresponds, for example, to a high-definition multimedia interface (HDMI) or the like.

The analog audio output IF unit 83*c* receives decoded audio data AS from the signal processing unit 7, converts this data into analog audio data AD via D/A conversion, and outputs the audio data AD. The analog audio output IF unit 83*c* corresponds, for example, to an audio DAC.

The transmission format for the visual data and audio data can switch in accordance with the type of the data reception device/data input terminal provided in the display device 103/speaker 103A. The transmission format can also be switched by user selection. Furthermore, the playback device 102 can transmit data for the same content not only in a single transmission format but also in multiple transmission formats in parallel.

The AV output unit 8 may be further provided with a graphics engine in addition to the function blocks 81, 82, and 83 shown in FIGS. 93 and 94. The graphics engine performs graphics processing, such as filtering, screen composition, curve rendering, and 3D presentation processing on the data decoded by the signal processing unit 7.

The above-described function blocks shown in FIGS. 90, 91, 93, and 94 are included in the integrated circuit 3. This is not a requirement, however, and part of the function blocks may be external to the integrated circuit 3. Also, unlike the structure shown in FIG. 90, the memory unit 2 may be included in the integrated circuit 3. Furthermore, the main control unit 6 and signal processing unit 7 need not be completely separate function blocks. The main control unit 6 may, for example, perform part of the processing corresponding to the signal processing unit 7.

Figure 95A:
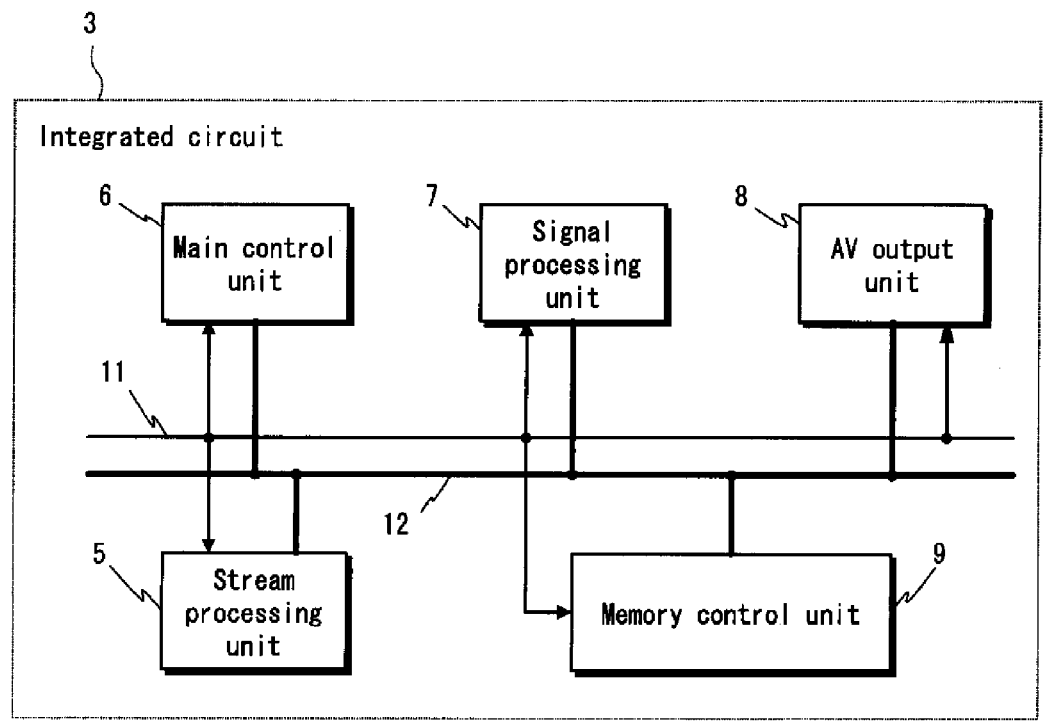
FIGS. 95A and 95B are schematic diagrams showing examples of the topology of a control bus and data bus in the integrated circuit 3 shown in FIG. 90.
Figure 95B:
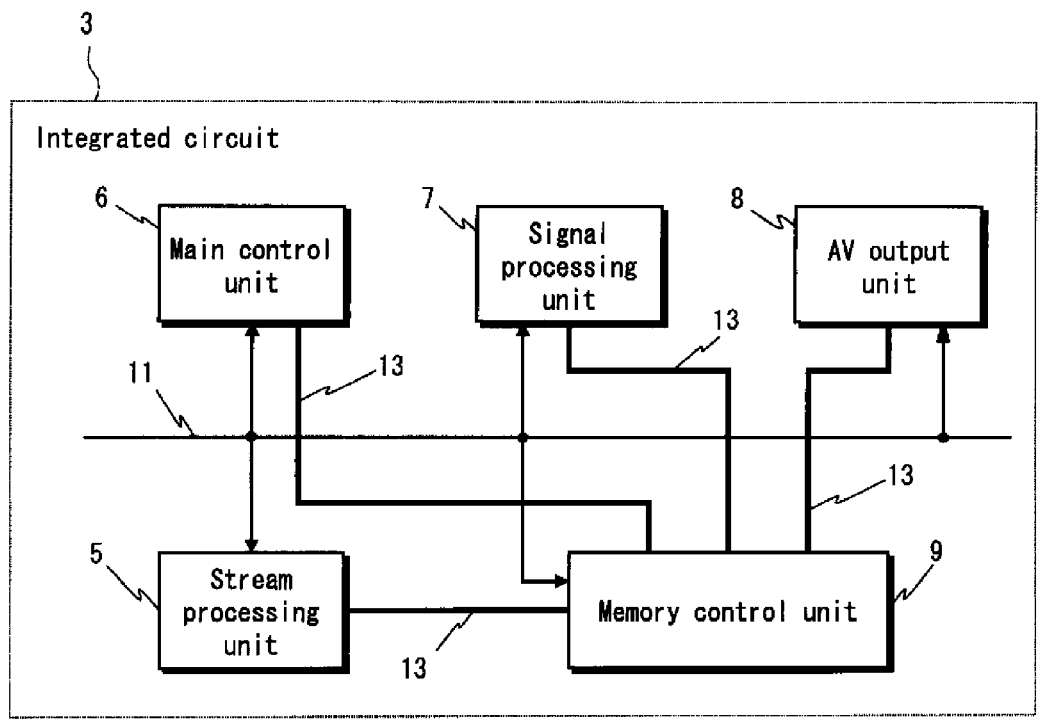

The topology of the control bus and data bus that connect the function blocks in the integrated circuit 3 may be selected in accordance with the order and the type of the processing by each function block. FIGS. 95A and 95B are schematic diagrams showing examples of the topology of a control bus and data bus in the integrated circuit 3. As shown in FIG. 95A, both the control bus 11 and data bus 12 are configured so as to directly connect each of the function blocks 5-9 with all of the other function blocks. Alternatively, as shown in FIG. 95B, the data bus 13 may be configured so as to directly connect each of the function blocks 5-8 with only the memory control unit 9. In this case, each of the function blocks 5-8 transmits data to the other function blocks via the memory control unit 9 and, additionally, the memory unit 2.

Instead of an LSI integrated on a single chip, the integrated circuit 3 may be a multi-chip module. In this case, since the plurality of chips composing the integrated circuit 3 are sealed in a single package, the integrated circuit 3 looks like a single LSI. Alternatively, the integrated circuit 3 may be configured using a field programmable gate array (FPGA) or a reconfigurable processor. An FPGA is an LSI that can be programmed after manufacture. A reconfigurable processor is an LSI whose connections between internal circuit cells and settings for each circuit cell can be reconfigured.

<Playback Processing by the Playback Device 102 Using the Integrated Circuit 3>

Figure 96:
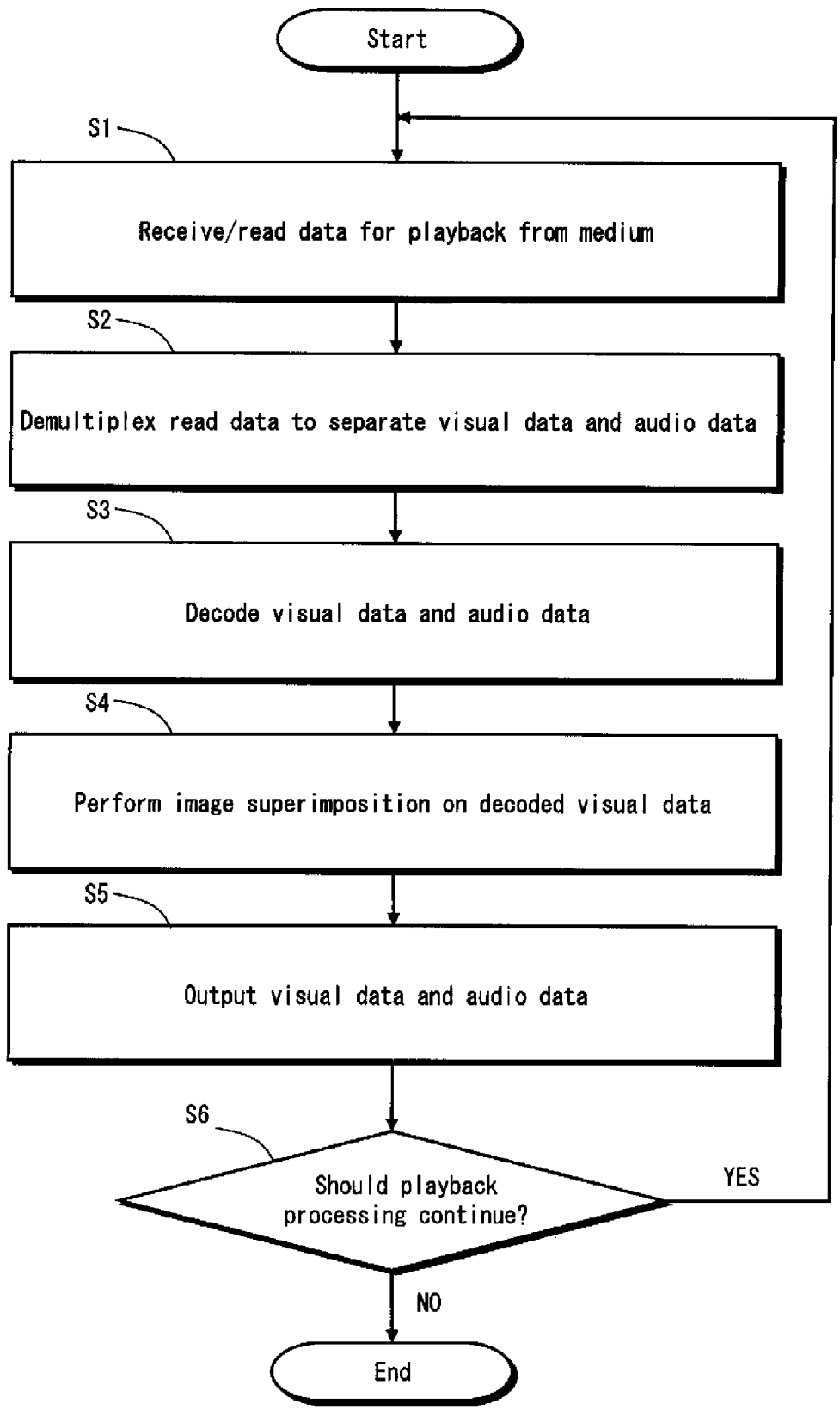
FIG. 96 is a flowchart of playback processing by a playback device 102 that uses the integrated circuit 3 shown in FIG. 90.

FIG. 96 is a flowchart of playback processing by a playback device 102 that uses the integrated circuit 3. This playback processing begins when the medium IF unit 1 is connected to the medium ME so as to be capable of data transmission, as for example when an optical disc is inserted into the disc drive. During this processing, the playback device 102 receives data from the medium ME and decodes the data. Subsequently, the playback device 102 outputs the decoded data as a video signal and an audio signal.

In step S1, the medium IF unit 1 receives or reads data from the medium ME and transmits the data to the stream processing unit 5. Processing then proceeds to step S2.

In step S2, the stream processing unit 5 separates the data received or read in step S1 into visual data and audio data. Processing then proceeds to step S3.

In step S3, the signal processing unit 7 decodes each piece of data separated in step S2 by the stream processing unit 5 using a method appropriate for the coding method. Processing then proceeds to step S4.

In step S4, the AV output unit 8 superimposes the pieces of visual data decoded by the signal processing unit 7 in step S3. Processing then proceeds to step S5.

In step S5, the AV output unit 8 outputs the visual data and audio data processed in steps S2-4. Processing then proceeds to step S6.

In step S6, the main control unit 6 determines whether the playback device 102 should continue playback processing. When, for example, data that is to be newly received or read from the medium ME via the medium IF unit 1 remains, processing is repeated starting at step S1. Conversely, processing ends if the medium IF unit 1 stops receiving or reading data from the medium ME due to the optical disc being removed from the disc drive, the user indicating to stop playback, etc.

Figure 97:
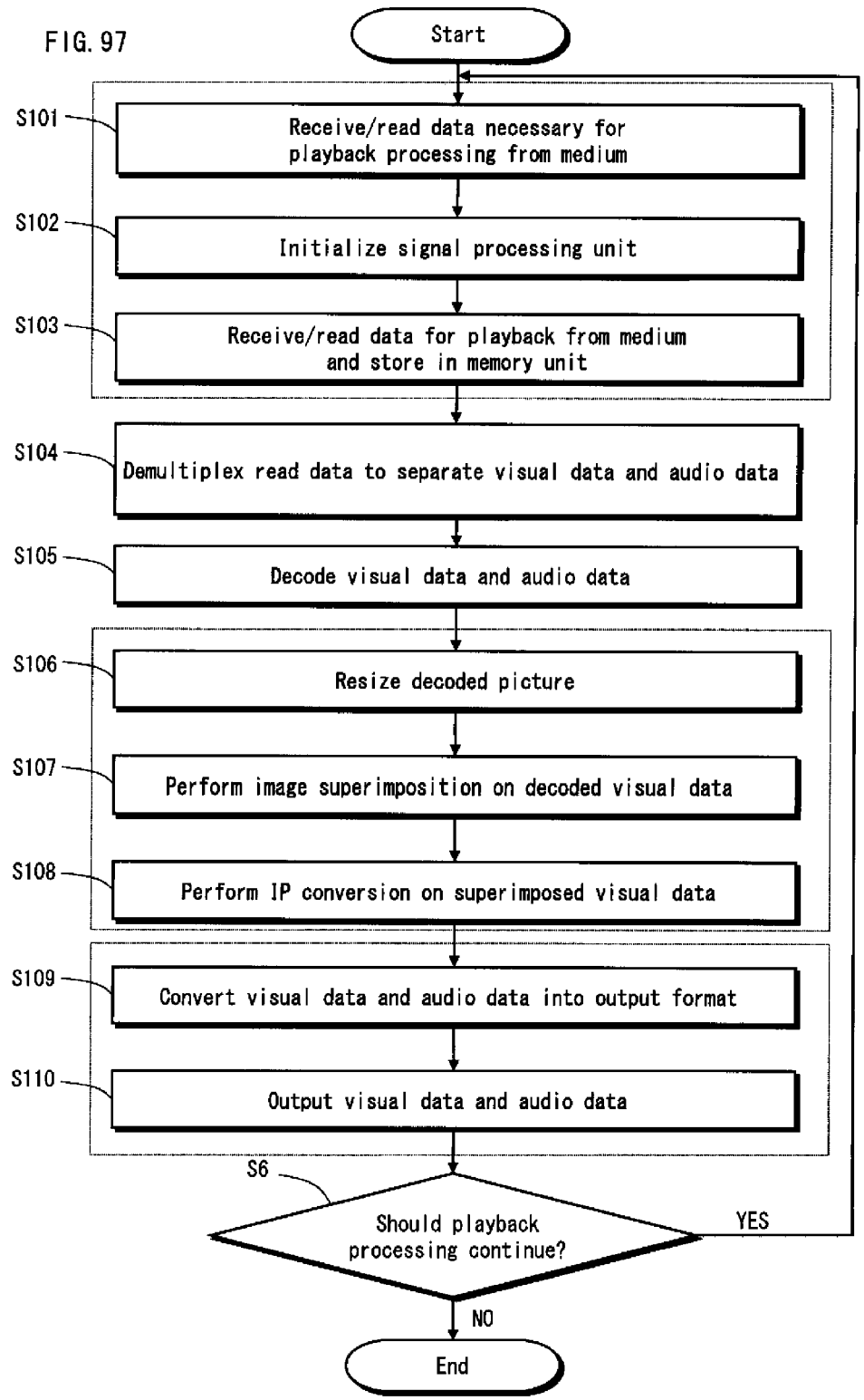
FIG. 97 is a flowchart showing details on steps S1-5 shown in FIG. 96.
Figure 98B:
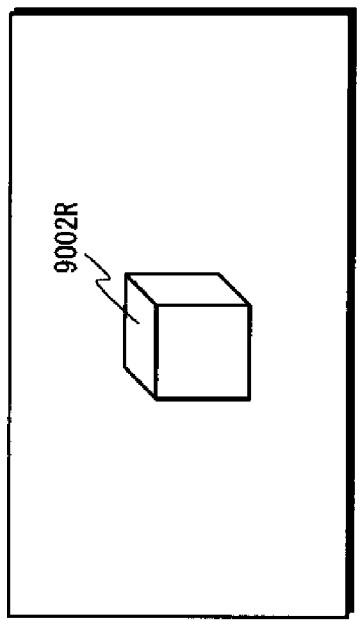
FIGS. 98A, 98B, and 98C are schematic diagrams illustrating the principle of playing back 3D video images according to a method using parallax video.
Figure 98C:
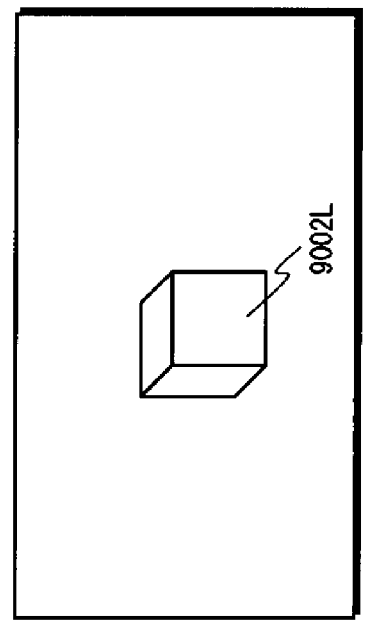
Figure 98A:
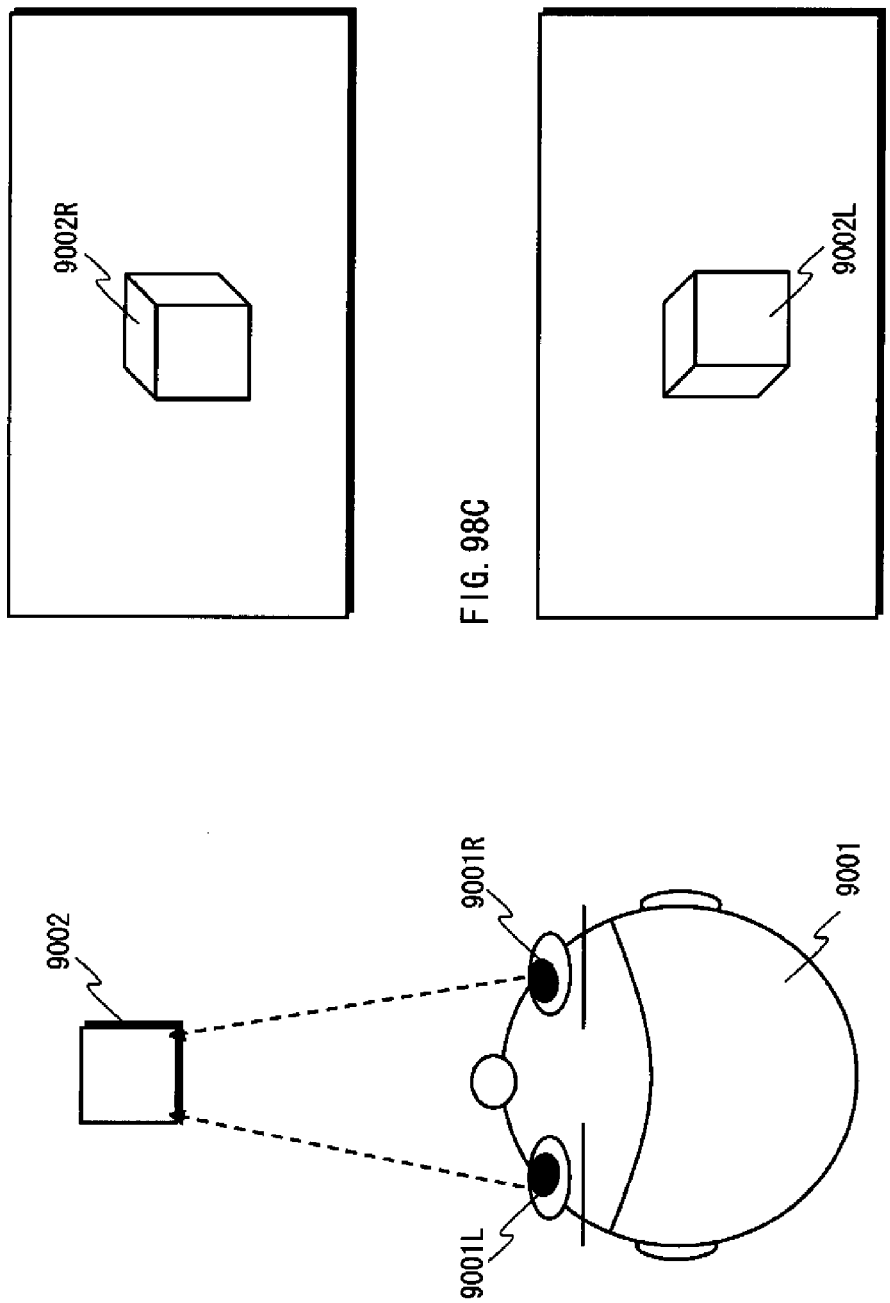

FIG. 97 is a flowchart showing details on steps S1-6 shown in FIG. 96. The steps S101-110 shown in FIG. 97 are performed under the control of the main control unit 6. Step S101 corresponds mainly to details on step S1, steps S102-S104 correspond mainly to details on step S2, step S105 corresponds mainly to details on step S3, steps S106-S108 correspond mainly to details on step S4, and steps S109 and S110 correspond mainly to details on step S5.

In step S101, before reading or receiving from the medium ME, via the medium IF unit 1, data to be played back, the device stream IF unit 51 reads or receives data necessary for such playback, such as a playlist and clip information file. Furthermore, the device stream IF unit 51 stores this data in the memory unit 2 via the memory control unit 9. Processing then proceeds to step S102.

In step S102, from the stream attribute information included in the clip information file, the main control unit 6 identifies the respective coding methods of the video data and audio data stored in the medium ME. Furthermore, the main control unit 6 initializes the signal processing unit 7 so that decoding can be performed in accordance with the identified coding method. Processing then proceeds to step S103.

In step S103, the device stream IF unit 51 receives or reads video data and audio data for playback from the medium ME via the medium IF unit 1. In particular, this data is received or read in units of extents. Furthermore, the device stream IF unit 51 stores this data in the memory unit 2 via the switching unit 53 and the memory control unit 9. In particular, when the main-view data is received or read, the main control unit 6 switches the storage location of the data to the first area in the memory unit 2 by controlling the switching unit 53. Conversely, when sub-view data is received or read; the main control unit 6 switches the storage location of the data to the second area in the memory unit 2 by controlling the switching unit 53. Processing then proceeds to step S104.

In step S104, the data stored in the memory unit 2 is transferred to the demultiplexer 52 in the stream processing unit 5. The demultiplexer 52 first reads a PID from each source packet composing the data. Next, in accordance with the PID, the demultiplexer 52 identifies whether the TS packets included in the source packet are visual data or audio data. Furthermore, in accordance with the results of identification, the demultiplexer 52 transmits each TS packet to the corresponding decoder in the signal processing unit 7. Processing then proceeds to step S105.

In step S105, each decoder in the signal processing unit 7 decodes transmitted TS packets using an appropriate method. Processing then proceeds to step S106.

In step S106, each picture in the left-view video stream and right-view video stream that were decoded in the signal processing unit 7 are transmitted to the video output format conversion unit 82. The video output format conversion unit 82 resizes these pictures to match the resolution of the display device 103. Processing then proceeds to step S107.

In step S107, the image superposition unit 81 receives video plane data, which is composed of pictures resized in step S106, from the video output format conversion unit 82. On the other hand, the image superposition unit 81 receives decoded PG plane data and IG plane data from the signal processing unit 7. Furthermore, the image superposition unit 81 superimposes these pieces of plane data. Processing then proceeds to step S108.

In step S108, the video output format conversion unit 82 receives the plane data superimposed in step S107 from the image superposition unit 81. Furthermore, the video output format conversion unit 82 performs IP conversion on this plane data. Processing then proceeds to step S109.

In step S109, the audio/video output IF unit 83 receives visual data that has undergone IP conversion in step S108 from the video output format conversion unit 82 and receives decoded audio data from the signal processing unit 7. Furthermore, the audio/video output IF unit 83 performs coding, D/A conversion, etc. on these pieces of data in accordance with the data output format in the display device 103/speaker 103A and with the format for transmitting data to the display device 103/speaker 103A. The visual data and audio data are thus converted into either an analog output format or a digital output format. Analog output formats of visual data include, for example, a composite video signal, S video signal, component video signal, etc. Digital output formats of visual data/audio data include HDMI or the like. Processing then proceeds to step S110.

In step S110, the audio/video output IF unit 83 transmits the audio data and visual data processed in step S109 to the display device 103/speaker 103A. Processing then proceeds to step S6, a description of which can be found above.

Each time data is processed in each of the above steps, the results are temporarily stored in the memory unit 2. The resizing and IP conversion by the video output format conversion unit 82 in steps S106 and S108 may be omitted as necessary. Furthermore, in addition to or in lieu of these processes, other processing such as noise reduction, frame rate conversion, etc. may be performed. The order of processing may also be changed wherever possible.

<Supplementary Explanation>
<<Principle of 3D Video Image Playback>>

Playback methods of 3D video images are roughly classified into two categories: methods using a holographic technique, and methods using parallax video.

A method using a holographic technique is characterized by allowing a viewer to perceive objects in video as stereoscopic by giving the viewer's visual perception substantially the same information as optical information provided to visual perception by human beings of actual objects. However, although a technical theory for utilizing these methods for moving video display has been established, it is extremely difficult to construct, with present technology, a computer that is capable of real-time processing of the enormous amount of calculation required for moving video display and a display device having super-high resolution of several thousand lines per 1 mm. Accordingly, at the present time, the realization of these methods for commercial use is hardly in sight.

"Parallax video" refers to a pair of 2D video images shown to each of a viewer's eyes for the same scene, i.e. the pair of a left-view and a right-view. A method using a parallax video is characterized by playing back the left-view and right-view of a single scene so that the viewer sees each view in only one eye, thereby allowing the user to perceive the scene as stereoscopic.

FIGS. 90A, 90B, 90C are schematic diagrams illustrating the principle of playing back 3D video images (stereoscopic video) according to a method using parallax video. FIG. 90A is a top view of a viewer 9001 looking at a cube 9002 placed directly in front of the viewer's face. FIGS. 90B and 90C are schematic diagrams showing the outer appearance of the cube 9002 as a 2D video image as perceived respectively by the left eye 9001L and the right eye 9001R of the viewer 9001. As is clear from comparing FIG. 90B and FIG. 90C, the outer appearances of the cube 9002 as perceived by the eyes are slightly different. The difference in the outer appearances, i.e., the binocular parallax allows the viewer 9001 to recognize the cube 9002 as three-dimensional. Thus, according to a method using parallax video, left and right 2D video images with different viewpoints are first prepared for a single scene. For example, for the cube 9002 shown in FIG. 90A, the left view of the cube 9002 shown in FIG. 90B and the right view shown in FIG. 90C are prepared. At this point, the position of each viewpoint is determined by the binocular parallax of the viewer 9001. Next, each video image is played back so as to be perceived only by the corresponding eye of the viewer 9001. Consequently, the viewer 9001 recognizes the scene played back on the screen, i.e., the video image of the cube 9002, as stereoscopic. Unlike methods using a holography technique, methods using parallax video thus have the advantage of requiring preparation of 2D video images from merely two viewpoints.

Several concrete methods for how to use parallax video have been proposed. From the standpoint of how these methods show left and right 2D video images to the viewer's eyes, the methods are divided into alternate frame sequencing methods, methods that use a lenticular lens, and two-color separation methods.

In alternate frame sequencing, left and right 2D video images are alternately displayed on a screen for a predetermined time, while the viewer observes the screen using shutter glasses. Here, each lens in the shutter glasses is, for example, formed by a liquid crystal panel. The lenses pass or block light in a uniform and alternate manner in synchronization with switching of the 2D video images on the screen. That is, each lens functions as a shutter that periodically blocks an eye of the viewer. More specifically, while a left video image is displayed on the screen, the shutter glasses make the left-side lens transmit light and the right-hand side lens block light. Conversely, while a right video image is displayed on the screen, the shutter glasses make the right-side glass transmit light and the left-side lens block light. As a result, the viewer sees afterimages of the right and left video images overlaid on each other and thus perceives a single 3D video image.

According to the alternate-frame sequencing, as described previously, right and left video images are alternately displayed in a predetermined cycle. For example, when 24 video frames are displayed per second for playing back a normal 2D movie, 48 video frames in total for both right and left eyes need to be displayed for a 3D movie. Accordingly, a display device capable of quickly executing rewriting of the screen is preferred for this method.

In a method using a lenticular lens, a right video frame and a left video frame are respectively divided into reed-shaped small and narrow areas whose longitudinal sides lie in the vertical direction of the screen. In the screen, the small areas of the right video frame and the small areas of the left video frame are alternately arranged in the landscape direction of the screen and displayed at the same time. Here, the surface of the screen is covered by a lenticular lens. The lenticular lens is a sheet-shaped lens constituted from parallel-arranged multiple long and thin hog-backed lenses. Each hog-backed lens lies in the longitudinal direction on the surface of the screen. When a viewer sees the left and right video frames through the lenticular lens, only the viewer's left eye perceives light from the display areas of the left video frame, and only the viewer's right eye perceives light from the display areas of the right video frame. This is how the viewer sees a 3D video image from the parallax between the video images respectively perceived by the left and right eyes. Note that according to this method, another optical component having similar functions, such as a liquid crystal device, may be used instead of the lenticular lens. Alternatively, for example, a longitudinal polarization filter may be provided in the display areas of the left image frame, and a lateral polarization filter may be provided in the display areas of the right image frame. In this case, the viewer sees the display through polarization glasses. Here, for the polarization glasses, a longitudinal polarization filter is provided for the left lens, and a lateral polarization filter is provided for the right lens. Consequently, the right and left video images are each perceived only by the corresponding eye, thereby allowing the viewer to perceive a stereoscopic video image.

In a method using parallax video, in addition to being constructed from the start by a combination of left and right video images, the 3D video content can also be constructed from a combination of 2D video images and a depth map. The 2D video images represent 3D video images projected on a hypothetical 2D picture plane, and the depth map represents the depth of each pixel in each portion of the 3D video image as compared to the 2D picture plane. When the 3D content is constructed from a combination of 2D video images with a depth map, the 3D playback device or the display device first constructs left and right video images from the combination of 2D video images with a depth map and then creates 3D video images from these left and right video images using one of the above-described methods.

FIG. 91 is a schematic diagram showing an example of constructing a left-view 9103L and a right-view 9103R from a combination of a 2D video image 9101 and a depth map 9102. As shown in FIG. 91, a circular plate 9111 is shown in the background 9112 of the 2D video image 9101. The depth map 9102 indicates the depth for each pixel in each portion of the 2D video image 9101. According to the depth map 9102, in the 2D video image 9101, the display area 9121 of the circular plate 9111 is closer to the viewer than the screen, and the display area 9122 of the background 9112 is deeper than the screen. The parallax video generation unit 9100 in the playback device 102 first calculates the binocular parallax for each portion of the 2D video image 9101 using the depth of each portion indicated by the depth map 9102. Next, the parallax video generation unit 9100 shifts the presentation position of each portion in the 2D video image 9101 in accordance with the calculated binocular parallax to construct the left-view 9103L and the right-view 9103R. In the example shown in FIG. 91, the parallax video generation unit 9100 shifts the presentation position of the circular plate 9111 in the 2D video image 9101 as follows: the presentation position of the circular plate 9131L in the left-view 9103L is shifted to the right by half of its binocular parallax, S1, and the presentation position of the circular plate 9131R in the right-view 9103R is shifted to the left by half of its binocular parallax, S1. In this way, the viewer perceives the circular plate 9111 as being closer than the screen. Conversely, the parallax video generation unit 9100 shifts the presentation position of the background 9112 in the 2D video image 9101 as follows: the presentation position of the background 9132L in the left-view 9103L is shifted to the left by half of its binocular parallax, S2, and the presentation position of the background 9132R in the right-view 9103R is shifted to the right by half of its binocular parallax, S2. In this way, the viewer perceives the background 9112 as being deeper than the screen.

A playback system for 3D video images with use of parallax video has already been established for use in movie theaters, attractions in amusement parks, and the like. Accordingly, this method is also useful for implementing home theater systems that can play back 3D video images. In the embodiments of the present invention, among methods using parallax video, an alternate-frame sequencing method or a method using polarization glasses is assumed to be used. However, apart from these methods, the present invention can also be applied to other, different methods, as long as they use parallax video. This will be obvious to those skilled in the art from the above explanation of the embodiments.

<<File System on the BD-ROM Disc>>

When UDF is used as the file system for the BD-ROM disc 101, the volume area 202B shown in FIG. 2 generally includes areas in which a plurality of directories, a file set descriptor, and a terminating descriptor are respectively recorded. Each "directory" is a data group composing the directory. A "file set descriptor" indicates the LBN of the sector in which a file entry for the root directory is stored. The "terminating descriptor" indicates the end of the recording area for the file set descriptor.

Each directory shares a common data structure. In particular, each directory includes a file entry, directory file, and a subordinate file group.

The "file entry" includes a descriptor tag, information control block (ICB) tag, and allocation descriptor. The "descriptor tag" indicates that the type of the data that includes the descriptor tag is a file entry. For example, when the value of the descriptor tag is "261", the type of that data is a file entry. The "ICB tag" indicates attribute information for the file entry itself. The "allocation descriptor" indicates the LBN of the sector on which the directory file belonging to the same directory is recorded.

The "directory file" typically includes several of each of a file identifier descriptor for a subordinate directory and a file identifier descriptor for a subordinate file. The "file identifier descriptor for a subordinate directory" is information for accessing the subordinate directory located directly below that directory. This file identifier descriptor includes identification information for the subordinate directory, directory name length, file entry address, and actual directory name. In particular, the file entry address indicates the LBN of the sector on which the file entry of the subordinate directory is recorded. The "file identifier descriptor for a subordinate file" is information for accessing the subordinate file located directly below that directory. This file identifier descriptor includes identification information for the subordinate file, file name length, file entry address, and actual file name. In particular, the file entry address indicates the LBN of the sector on which the file entry of the subordinate file is recorded. The "file entry of the subordinate file", as described below, includes address information for the data constituting the actual subordinate file.

By tracing the file set descriptors and the file identifier descriptors of subordinate directories/files in order, the file entry of an arbitrary directory/file recorded on the volume area 202B can be accessed. Specifically, the file entry of the root directory is first specified from the file set descriptor, and the directory file for the root directory is specified from the allocation descriptor in this file entry. Next, the file identifier descriptor for the directory immediately below the root directory is detected from the directory file, and the file entry for that directory is specified from the file entry address therein. Furthermore, the directory file for that directory is specified from the allocation descriptor in the file entry. Subsequently, from within the directory file, the file entry for the subordinate directory or subordinate file is specified from the file entry address in the file identifier descriptor for that subordinate directory or subordinate file.

"Subordinate files" include extents and file entries. The "extents" are a generally multiple in number and are data sequences whose logical addresses, i.e. LBNs, are consecutive on the disc. The entirety of the extents comprises the actual subordinate file. The "file entry" includes a descriptor tag, ICB tag, and allocation descriptors. The "descriptor tag" indicates that the type of the data that includes the descriptor tag is a file entry. The "ICB tag" indicates attribute information of the actual file entry. The "allocation descriptors" are provided in a one-to-one correspondence with each extent and indicate the arrangement of each extent on the volume area 202B, specifically the size of each extent and the LBN for the top of the extent. Accordingly, by referring to each allocation descriptor, each extent can be accessed. Also, the two most significant bits of each allocation descriptor indicate whether an extent is actually recorded on the sector for the LBN indicated by the allocation descriptor. More specifically, when the two most significant bits indicate "0", an extent has been assigned to the sector and has been actually recorded thereat. When the two most significant bits indicate "1", an extent has been assigned to the sector but has not been yet recorded thereat.

Like the above-described file system employing a UDF, when each file recorded on the volume area 202B is divided into a plurality of extents, the file system for the volume area 202B also generally stores the information showing the locations of the extents, as with the above-mentioned allocation descriptors, in the volume area 202B. By referring to the information, the location of each extent, particularly the logical address thereof, can be found.

<<Data Distribution Via Broadcasting or Communication Circuit>>

The recording medium according to embodiment 1 of the present invention may be, in addition to an optical disc, a general removable medium available as a package medium, such as a portable semiconductor memory element including an SD memory card. Also, embodiment 1 describes an example of an optical disc in which data has been recorded beforehand, namely, a conventionally available read-only optical disc such as a BD-ROM or a DVD-ROM. However, the embodiment of the present invention is not limited to these. For example, when a terminal device writes a 3D video content that has been distributed via broadcasting or a network into a conventionally available writable optical disc such as a BD-RE or a DVD-RAM, arrangement of the extents according to the above-described embodiment may be used. Here, the terminal device may be incorporated in a playback device, or may be a device different from the playback device.

<<Playback of Semiconductor Memory Card>>

The following describes a data read unit of a playback device in the case where a semiconductor memory card is used as the recording medium according to embodiment 1 of the present invention instead of an optical disc.

A part of the playback device that reads data from an optical disc is composed of, for example, an optical disc drive. Conversely, apart of the playback device that reads data from a semiconductor memory card is composed of an exclusive interface (I/F). Specifically, a card slot is provided with the playback device, and the I/F is mounted in the card slot. When the semiconductor memory card is inserted into the card slot, the semiconductor memory card is electrically connected with the playback device via the I/F. Furthermore, the data is read from the semiconductor memory card to the playback device via the I/F.

<<Copyright Protection Technique for Data Stored in BD-ROM Disc>>

Here, the mechanism for protecting copyright of data recorded on a BD-ROM disc is described, as an assumption for the following supplementary explanation.

From a standpoint, for example, of improving copyright protection or confidentiality of data, there are cases in which a part of the data recorded on the BD-ROM is encrypted. The encrypted data is, for example, a video stream, an audio stream, or other stream. In such a case, the encrypted data is decoded in the following manner.

The playback device has recorded thereon beforehand a part of data necessary for generating a "key" to be used for decoding the encrypted data recorded on the BD-ROM disc, namely, a device key. On the other hand, the BD-ROM disc has recorded thereon another part of the data necessary for generating the "key", namely, a media key block (MKB), and encrypted data of the "key", namely, an encrypted title key. The device key, the MKB, and the encrypted title key are associated with one another, and each are further associated with a particular ID written into a BCA 201 recorded on the BD-ROM disc 101 shown in FIG. 2, namely, a volume ID. When the combination of the device key, the MKB, the encrypted title key, and the volume ID is not correct, the encrypted data cannot be decoded. In other words, only when the combination is correct, the above-mentioned "key", namely the title key, can be generated. Specifically, the encrypted title key is first decrypted using the device key, the MKB, and the volume ID. Only when the title key can be obtained as a result of the decryption, the encrypted data can be decoded using the title key as the above-mentioned "key".

When a playback device tries to play back the encrypted data recorded on the BD-ROM disc, the playback device cannot play back the encrypted data unless the playback device has stored thereon a device key that has been associated beforehand with the encrypted title key, the MKB, the device, and the volume ID recorded on the BD-ROM disc. This is because a key necessary for decoding the encrypted data, namely a title key, can be obtained only by decrypting the encrypted title key based on the correct combination of the MKB, the device key, and the volume ID.

In order to protect the copyright of at least one of a video stream and an audio stream that are to be recorded on a BD-ROM disc, a stream to be protected is encrypted using the title key, and the encrypted stream is recorded on the BD-ROM disc. Next, a key is generated based on the combination of the MKB, the device key, and the volume ID, and the title key is encrypted using the key so as to be converted to an encrypted title key. Furthermore, the MKB, the volume ID, and the encrypted title key are recorded on the BD-ROM disc. Only a playback device storing thereon the device key to be used for generating the above-mentioned key can decode the encrypted video stream and/or the encrypted audio stream recorded on the BD-ROM disc using a decoder. In this manner, it is possible to protect the copyright of the data recorded on the BD-ROM disc.

The above-described mechanism for protecting the copyright of the data recorded on the BD-ROM disc is applicable to a recording medium other than the BD-ROM disc. For example, the mechanism is applicable to a readable and writable semiconductor memory element and in particular to a portable semiconductor memory card such as an SD card.

<<Recording Data on a Recording Medium Through Electronic Distribution>>

The following describes processing to transmit data, such as an AV stream file for 3D video images (hereinafter, "distribution data"), to the playback device according to embodiment 1 of the present invention via electronic distribution and to cause the playback device to record the distribution data on a semiconductor memory card. Note that the following operations may be performed by a specialized terminal device for performing the processing instead of the above-mentioned playback device. Also, the following description is based on the assumption that the semiconductor memory card that is a recording destination is an SD memory card.

The playback device includes the above-described card slot. An SD memory card is inserted into the card slot. The playback device in this state first transmits a transmission request of distribution data to a distribution server on a network. At this point, the playback device reads identification information of the SD memory card from the SD memory card and transmits the read identification information to the distribution server together with the transmission request. The identification information of the SD memory card is, for example, an identification number specific to the SD memory card and, more specifically, is a serial number of the SD memory card. The identification information is used as the above-described volume ID.

The distribution server has stored thereon pieces of distribution data. Distribution data that needs to be protected by encryption such as a video stream and/or an audio stream has been encrypted using a predetermined title key. The encrypted distribution data can be decrypted using the same title key.

The distribution server stores thereon a device key as a private key common with the playback device. The distribution server further stores thereon an MKB in common with the SD memory card. Upon receiving the transmission request of distribution data and the identification information of the SD memory card from the playback device, the distribution server first generates a key from the device key, the MKB, and the identification information and encrypts the title key using the generated key to generate an encrypted title key.

Next, the distribution server generates public key information. The public key information includes, for example, the MKB, the encrypted title key, signature information, the identification number of the SD memory card, and a device list. The signature information includes for example a hash value of the public key information. The device list is a list of devices that need to be invalidated, that is, devices that have a risk of performing unauthorized playback of encrypted data included in the distribution data. The device list specifies the device key and the identification number for the playback device, as well as an identification number or function (program) for each element in the playback device such as the decoder.

The distribution server transmits the distribution data and the public key information to the playback device. The playback device receives the distribution data and the public key information and records them in the SD memory card via the exclusive I/F of the card slot.

Encrypted distribution data recorded on the SD memory card is decrypted using the public key information in the following manner, for example. First, three types of checks are performed as authentication of the public key information. These checks may be performed in any order.

(1) Does the identification information of the SD memory card included in the public key information match the identification number stored in the SD memory card inserted into the card slot?

(2) Does a hash value calculated based on the public key information match the hash value included in the signature information?

(3) Is the playback device excluded from the device list indicated by the public key information, and specifically, is the device key of the playback device excluded from the device list?

If at least any one of the results of the checks (1) to (3) is negative, the playback device stops decryption processing of the encrypted data. Conversely, if all of the results of the checks (1) to (3) are affirmative, the playback device authorizes the public key information and decrypts the encrypted title key included in the public key information using the device key, the MKB, and the identification information of the SD memory card, thereby obtaining a title key. The playback device further decrypts the encrypted data using the title key, thereby obtaining, for example, a video stream and/or an audio stream.

The above mechanism has the following advantage. If a playback device, compositional elements, and a function (program) that have the risk of being used in an unauthorized manner are already known when data is transmitted via the electronic distribution, the corresponding pieces of identification information are listed in the device list and are distributed as part of the public key information. On the other hand, the playback device that has requested the distribution data inevitably needs to compare the pieces of identification information included in the device list with the pieces of identification information of the playback device, its compositional elements, and the like. As a result, if the playback device, its compositional elements, and the like are identified in the device list, the playback device cannot use the public key information for decrypting the encrypted data included in the distribution data even if the combination of the identification number of the SD memory card, the MKB, the encrypted title key, and the device key is correct. In this manner, it is possible to effectively prevent distribution data from being used in an unauthorized manner.

The identification information of the semiconductor memory card is desirably recorded in a recording area having high confidentiality included in a recording area of the semiconductor memory card. This is because if the identification information such as the serial number of the SD memory card has been tampered with in an unauthorized manner, it is possible to realize an illegal copy of the SD memory card easily. In other words, if the tampering allows generation of a plurality of semiconductor memory cards having the same identification information, it is impossible to distinguish between authorized products and unauthorized copy products by performing the above check (1). Therefore, it is necessary to record the identification information of the semiconductor memory card on a recording area with high confidentiality in order to protect the identification information from being tampered with in an unauthorized manner.

The recording area with high confidentiality is structured within the semiconductor memory card in the following manner, for example. First, as a recording area electrically disconnected from a recording area for recording normal data (hereinafter, "first recording area"), another recording area (hereinafter, "second recording area") is provided. Next, a control circuit exclusively for accessing the second recording area is provided within the semiconductor memory card. As a result, access to the second recording area can be performed only via the control circuit. For example, assume that only encrypted data is recorded on the second recording area and a circuit for decrypting the encrypted data is incorporated only within the control circuit. As a result, access to the data recorded on the second recording area can be performed only by causing the control circuit to store therein an address of each piece of data recorded in the second recording area. Also, an address of each piece of data recorded on the second recording area may be stored only in the control circuit. In this case, only the control circuit can identify an address of each piece of data recorded on the second recording area.

In the case where the identification information of the semiconductor memory card is recorded on the second recording area, then when an application program operating on the playback device acquires data from the distribution server via electronic distribution and records the acquired data in the semiconductor memory card, the following processing is performed. First, the application program issues an access request to the control circuit via the memory card I/F for accessing the identification information of the semiconductor memory card recorded on the second recording area. In response to the access request, the control circuit first reads the identification information from the second recording area. Then, the control circuit transmits the identification information to the application program via the memory card I/F. The application program transmits a transmission request of the distribution data together with the identification information. The application program further records, in the first recording area of the semiconductor memory card via the memory card I/F, the public key information and the distribution data received from the distribution server in response to the transmission request.

Note that it is preferable that the above-described application program check whether the application program itself has been tampered with before issuing the access request to the control circuit of the semiconductor memory card. The check may be performed using a digital certificate compliant with the X.509 standard. Furthermore, it is only necessary to record the distribution data in the first recording area of the semiconductor memory card, as described above. Access to the distribution data need not be controlled by the control circuit of the semiconductor memory card.

<<Application to Real-Time Recording>>

Embodiment 2 of the present invention is based on the assumption that an AV stream file and a playlist file are recorded on a BD-ROM disc using the prerecording technique of the authoring system, and the recorded AV stream file and playlist file are provided to users. Alternatively, it may be possible to record, by performing real-time recording, the AV stream file and the playlist file on a writable recording medium such as a BD-RE disc, a BD-R disc, a hard disk, or a semiconductor memory card (hereinafter, "BD-RE disc or the like") and provide the user with the recorded AV stream file and playlist file. In such a case, the AV stream file may be a transport stream that has been obtained as a result of real-time decoding of an analog input signal performed by a recording device. Alternatively, the AV stream file may be a transport stream obtained as a result of partialization of a digitally input transport stream performed by the recording device.

The recording device performing real-time recording includes a video encoder, an audio encoder, a multiplexer, and a source packetizer. The video encoder encodes a video signal to convert it into a video stream. The audio encoder encodes an audio signal to convert it into an audio stream. The multiplexer multiplexes the video stream and audio stream to convert them into a digital stream in the MPEG-2 TS format. The source packetizer converts TS packets in the digital stream in MPEG-2 TS format into source packets. The recording device stores each source packet in the AV stream file and writes the AV stream file on the BD-RE disc or the like.

In parallel with the processing of writing the AV stream file, the control unit of the recording device generates a clip information file and a playlist file in the memory and writes the files on the BD-RE disc or the like. Specifically, when a user requests performance of recording processing, the control unit first generates a clip information file in accordance with an AV stream file and writes the file on the BD-RE disc or the like. In such a case, each time a head of a GOP of a video stream is detected from a transport stream received from outside, or each time a GOP of a video stream is generated by the video encoder, the control unit acquires a PTS of an I picture positioned at the head of the GOP and an SPN of the source packet in which the head of the GOP is stored. The control unit further stores a pair of the PTS and the SPN as one entry point in an entry map of the clip information file. At this time, an "is_angle_change" flag is added to the entry point. The is_angle_change flag is set to "on" when the head of the GOP is an IDR picture, and "off" when the head of the GOP is not an IDR picture. In the clip information file, stream attribute information is further set in accordance with an attribute of a stream to be recorded. In this manner, after writing the AV stream file and the clip information file into the BD-RE disc or the like, the control unit generates a playlist file using the entry map in the clip information file, and writes the file on the BD-RE disc or the like.

<<Managed Copy>>

The playback device according to embodiment 1 of the present invention may write a digital stream recorded on the BD-ROM disc 101 on another recording medium via a managed copy. Here, managed copy refers to a technique for permitting copy of a digital stream, a playlist file, a clip information file, and an application program from a read-only recording medium such as a BD-ROM disc to a writable recording medium only in the case where authentication via communication with the server succeeds. This writable recording medium may be a writable optical disc, such as a BD-R, BD-RE, DVD-R, DVD-RW, or DVD-RAM, a hard disk, or a portable semiconductor memory element such as an SD memory card, Memory Stick™, Compact Flash™, Smart Media™ or Multimedia Card™. A managed copy allows for limitation of the number of backups of data recorded on a read-only recording medium and for charging a fee for backups.

When a managed copy is performed from a BD-ROM disc to a BD-R disc or a BD-RE disc and the two discs have an equivalent recording capacity, the bit streams recorded on the original disc may be copied in order as they are.

If a managed copy is performed between different types of recording media, a trans code needs to be performed. This "trans code" refers to processing for adjusting a digital stream recorded on the original disc to the application format of a recording medium that is the copy destination. For example, the trans code includes the process of converting an MPEG-2 TS format into an MPEG-2 program stream format and the process of reducing a bit rate of each of a video stream and an audio stream and re-encoding the video stream and the audio stream. During the trans code, an AV stream file, a clip information file, and a playlist file need to be generated in the above-mentioned real-time recording.

<<Method for Describing Data Structure>>

Among the data structures in embodiment 1 of the present invention, a repeated structure "there is a plurality of pieces of information having a predetermined type" is defined by describing an initial value of a control variable and a cyclic condition in a "for" sentence. Also, a data structure "if a predetermined condition is satisfied, predetermined information is defined" is defined by describing, in an "if" sentence, the condition and a variable to be set at the time when the condition is satisfied. In this manner, the data structure described in embodiment 1 is described using a high level programming language. Accordingly, the data structure is converted by a computer into a computer readable code via the translation process performed by a compiler, which includes "syntax analysis", "optimization", "resource allocation", and "code generation", and the data structure is then recorded on the recording medium. By being described in a high level programming language, the data structure is treated as a part other than the method of the class structure in an object-oriented language, specifically, as an array type member variable of the class structure, and constitutes apart of the program. In other words, the data structure is substantially equivalent to a program. Therefore, the data structure needs to be protected as a computer related invention.

<<Management of Playlist File and Clip Information File by Playback Program>>

When a playlist file and an AV stream file are recorded on a recording medium, a playback program is recorded on the recording medium in an executable format. The playback program makes the computer play back the AV stream file in accordance with the playlist file. The playback program is loaded from a recording medium to a memory element of a computer and is then executed by the computer. The loading process includes compile processing or link processing. By these processes, the playback program is divided into a plurality of sections in the memory element. The sections include a text section, a data section, a bss section, and a stack section. The text section includes a code array of the playback program, an initial value, and non-rewritable data. The data section includes variables with initial values and rewritable data. In particular, the data section includes a file, recorded on the recording device, that can be accessed at any time. The bss section includes variables having no initial value. The data included in the bss section is referenced in response to commands indicated by the code in the text section. During the compile processing or link processing, an area for the bss section is set aside in the computer's internal RAM. The stack section is a memory area temporarily set aside as necessary. During each of the processes by the playback program, local variables are temporarily used. The stack section includes these local variables. When the program is executed, the variables in the bss section are initially set at zero, and the necessary memory area is set aside in the stack section.

As described above, the playlist file and the clip information file are already converted on the recording device into computer readable code. Accordingly, at the time of execution of the playback program, these files are each managed as "non-rewritable data" in the text section or as a "file accessed at any time" in the data section. In other words, the playlist file and the clip information file are each included as a compositional element of the playback program at the time of execution thereof. Therefore, the playlist file and the clip information file fulfill a greater role in the playback program than mere presentation of data.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A method for recording a main-view stream and a sub-view stream on a recording medium,
    wherein the main-view stream is to be used for monoscopic playback,
    wherein the sub-view stream is to be used for playback of stereoscopic video images in combination with the main-view stream,
    wherein the main-view stream includes a plurality of main-view pictures and at least one main-view picture header,
    wherein the sub-view stream includes a plurality of sub-view pictures and at least one sub-view picture header,
    wherein the main-view picture header includes information indicating individual encoding methods of the plurality of main-view pictures,
    wherein the sub-view picture header includes information indicating individual encoding methods of the plurality of sub-view pictures, wherein the method for recording comprises:
encoding the plurality of main-view pictures;
encoding the plurality of sub-view pictures with reference to the plurality of main-view pictures;
storing information indicating the individual encoding methods of the plurality of main-view pictures into the main-view picture header;
storing information indicating the individual encoding methods of the plurality of sub-view pictures into the sub-view picture header;
embedding identification data for the main-view picture header and identification data for the sub-view picture header into the plurality of main-view pictures and the plurality of sub-view pictures under restrictive conditions that:
specify that identification data for a picture header is to be embedded into a picture that can be decoded by retrieving from the picture header information indicating a type of encoding method of the picture;
permit the identification data for the main-view picture header to be embedded only into the plurality of main-view pictures but forbid the identification data for the main-view picture header to be embedded into the plurality of sub-view pictures; and
permit the identification data for the sub-view picture header to be embedded only into the plurality of sub-view pictures but forbid the identification data for the sub-view picture header to be embedded into the plurality of main-view pictures;
multiplexing the plurality of main-view pictures and the main-view picture header into the main-view stream;
multiplexing the plurality of sub-view pictures and the sub-view picture header into the sub-view stream; and
recording the main-view stream and sub-view stream on the recording medium.

* * * * *